US010203762B2

(12) United States Patent
Bradski et al.

(10) Patent No.: US 10,203,762 B2
(45) Date of Patent: Feb. 12, 2019

(54) METHODS AND SYSTEMS FOR CREATING VIRTUAL AND AUGMENTED REALITY

(71) Applicant: Magic Leap, Inc., Dania Beach, FL (US)

(72) Inventors: Gary R. Bradski, Palo Alto, CA (US); Samuel A. Miller, Hollywood, FL (US); Rony Abovitz, Hollywood, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 14/738,877

(22) Filed: Jun. 13, 2015

(65) Prior Publication Data

US 2016/0026253 A1 Jan. 28, 2016

Related U.S. Application Data

(63) Continuation-in-part of application No. 14/331,218, filed on Jul. 14, 2014, now Pat. No. 9,671,566.

(Continued)

(51) Int. Cl.
*G06K 9/00* (2006.01)
*G06F 3/01* (2006.01)

(Continued)

(52) U.S. Cl.
CPC .............. *G06F 3/017* (2013.01); *A63F 13/00* (2013.01); *G02B 27/0093* (2013.01); *G02B 27/0172* (2013.01); *G02B 27/225* (2013.01); *G02B 27/2278* (2013.01); *G06F 3/011* (2013.01); *G06F 3/012* (2013.01); *G06F 3/013* (2013.01); *G06F 3/016* (2013.01); *G06F 3/0304* (2013.01); *G06F 3/0482* (2013.01); *G06K 9/00389* (2013.01); *G06K 9/00671* (2013.01);

(Continued)

(58) Field of Classification Search
None
See application file for complete search history.

(56) References Cited

U.S. PATENT DOCUMENTS 6,028,664 A 2/2000 Cheng et al.
6,256,400 B1 * 7/2001 Takata .............. G06K 9/00335 379/52

(Continued)

OTHER PUBLICATIONS

PCT International Search Report and Written Opinion for International Appln. No. PCT/US2015/035718, Applicant Magic Leap, Inc., forms PCT/ISA/210, 220, and 237, dated Nov. 4, 2015 (11 pages).

(Continued)

*Primary Examiner* — Shervin Nakhjavan
(74) *Attorney, Agent, or Firm* — Vista IP Law Group LLP

(57) ABSTRACT

Configurations are disclosed for presenting virtual reality and augmented reality experiences to users. The system may comprise an image capturing device to capture one or more images, the one or more images corresponding to a field of the view of a user of a head-mounted augmented reality device, and a processor communicatively coupled to the image capturing device to extract a set of map points from the set of images, to identify a set of sparse points and a set of dense points from the extracted set of map points, and to perform a normalization on the set of map points.

22 Claims, 355 Drawing Sheets

Related U.S. Application Data

(60) Provisional application No. 62/012,273, filed on Jun. 14, 2014.

(51) Int. Cl.

| | |
|---|---|
| ***G02B 27/01*** | (2006.01) |
| ***H04N 7/18*** | (2006.01) |
| ***G02B 27/22*** | (2018.01) |
| ***G06F 3/03*** | (2006.01) |
| ***G06F 3/0482*** | (2013.01) |
| ***H04N 13/04*** | (2006.01) |
| ***G02B 27/00*** | (2006.01) |
| ***G10L 19/00*** | (2013.01) |
| ***H04N 13/02*** | (2006.01) |
| ***A63F 13/00*** | (2014.01) |
| ***H04N 21/414*** | (2011.01) |
| *H04N 13/00* | (2018.01) |

(52) U.S. Cl.

CPC ............. *G10L 19/00* (2013.01); *H04N 7/185* (2013.01); *H04N 13/0278* (2013.01); *H04N 13/044* (2013.01); *H04N 13/0484* (2013.01); *H04N 13/0495* (2013.01); *H04N 13/0497* (2013.01); *H04N 21/414* (2013.01); *G02B 2027/014* (2013.01); *G02B 2027/0178* (2013.01); *G02B 2027/0187* (2013.01); *H04N 13/0059* (2013.01); *H04N 13/0239* (2013.01); *H04N 2013/0081* (2013.01)

(56) References Cited

U.S. PATENT DOCUMENTS

| | | | | |
|---|---|---|---|---|
| 7,308,112 | B2 * | 12/2007 | Fujimura | G06K 9/00355 382/103 |
| 7,760,182 | B2 * | 7/2010 | Ahmad | G06Q 30/00 345/156 |
| 8,050,465 | B2 * | 11/2011 | Ianculescu | G06K 9/00228 382/118 |
| 8,381,108 | B2 * | 2/2013 | Fuller | G06F 3/017 715/727 |
| 8,819,812 | B1 * | 8/2014 | Weber | G06F 3/017 726/18 |
| 8,824,802 | B2 * | 9/2014 | Kutliroff | G06K 9/00201 348/143 |
| 8,836,768 | B1 * | 9/2014 | Rafii | G06F 3/017 345/420 |
| 9,141,193 | B2 * | 9/2015 | Perez | G06F 3/017 |
| 9,285,872 | B1 * | 3/2016 | Raffle | G06F 3/012 |
| 9,310,559 | B2 | 4/2016 | Macnamara | |
| 9,417,452 | B2 | 8/2016 | Schowengerdt et al. | |
| 9,535,506 | B2 * | 1/2017 | Raffa | G06F 1/1694 |
| 2005/0256611 | A1 * | 11/2005 | Pretlove | B25J 9/1664 700/264 |
| 2007/0183653 | A1 | 8/2007 | Medioni et al. | |
| 2009/0316952 | A1 * | 12/2009 | Ferren | G06F 3/017 382/103 |
| 2010/0045705 | A1 * | 2/2010 | Vertegaal | A47G 19/2227 345/661 |
| 2010/0149177 | A1 | 6/2010 | Miller | |
| 2012/0059706 | A1 | 3/2012 | Goenka et al. | |
| 2012/0113223 | A1 | 5/2012 | Hilliges et al. | |
| 2012/0207384 | A1 | 8/2012 | Porikli et al. | |
| 2013/0004016 | A1 * | 1/2013 | Karakotsios | G06K 9/00355 382/103 |
| 2013/0069985 | A1 | 3/2013 | Wong et al. | |
| 2013/0095924 | A1 * | 4/2013 | Geisner | A63F 13/00 463/32 |
| 2013/0121570 | A1 | 5/2013 | Lin et al. | |
| 2013/0265218 | A1 * | 10/2013 | Moscarillo | G06F 3/017 345/156 |
| 2013/0271370 | A1 * | 10/2013 | Wang | G06K 9/00389 345/158 |
| 2013/0294651 | A1 * | 11/2013 | Zhou | G06K 9/00355 382/103 |
| 2014/0002444 | A1 | 1/2014 | Bennett et al. | |
| 2014/0043329 | A1 | 2/2014 | Wang et al. | |
| 2014/0068173 | A1 | 3/2014 | Cooke et al. | |
| 2014/0184475 | A1 * | 7/2014 | Tantos | H03M 13/356 345/8 |
| 2014/0267009 | A1 * | 9/2014 | DeLean | G06F 3/017 345/156 |
| 2014/0281946 | A1 * | 9/2014 | Avni | G06T 1/0021 715/268 |
| 2015/0012426 | A1 * | 1/2015 | Purves | G06Q 30/0623 705/41 |
| 2015/0016777 | A1 | 1/2015 | Abovitz et al. | |
| 2016/0188181 | A1 * | 6/2016 | Smith | G06F 3/048 715/765 |

OTHER PUBLICATIONS

Extended European Search Report for EP Application No. 15807476.5, dated Dec. 12, 2017.

PCT International Preliminary Report on Patentability for International Appln. No. PCT/US2015/035718 dated Dec. 22, 2016 (8 pages).

Response to Extended European Search Report for EP Application No. 15807476.5, dated Jul. 10, 2018.

* cited by examiner

7404

7700

7904

7906

8002

8004

8008

FIG. 89G
8914
8952
8901
Mario Batali
Simple Family Meals
Finocchi al Forno
Batali's Ingradients

FIG. 90
Help Desk
Fantasy
History
Horror

9000

9014

9001

9014

9014

9601 9603 9646

12308

12306

12314

AVATAR INPUT FUNCTIONS

| Action | How Do I Interact? | Where is the Content | How is Content Centered | Social Context | Input Behaviors | Empowerment |
|---|---|---|---|---|---|---|
| Activating avatar | Snap fingers | x | x | Public/Private | Active/Broad | |
| Activating menu | Wave down menu, avatar mimics and pulls down menu | Floating around avatar | Totem-Centric | Public/ Private | Active/Broad | |
| Scroll through menu | Gesture left and right with finger | "" | "" | Public/Private | Active/Broad | |
| Highlight menu items | Eye tracking and pointing | "" | "" | Public/Private | Active/Precise | |
| Select items | Pinch gesture | Held in avatar's hands | "" | Public/Private | Active/Broad | Avatar is physically interacting with content |
| Open app | Open gesture | Held in avatar's hands | "" | Private | Active/Broad | |
| Game open | x | Floating in air | Room-centric | X | Passive | |
| Re-open menu | Wave down menu, avatar mimics and pulls down menu | Floating around avatar | "" | Private | Active/Broad | |
| Scroll through menu | Gesture left and right with finger | "" | "" | Public/Private | Active/Broad | |
| Highlight menu items | Eye tracking and pointing | "" | "" | Public/Private | Active/Precise | |
| Select items | Pinch gesture | Held in avatar's hands | "" | Public/Private | Active/Broad | |
| Open friends list | Open gesture | Held in avatar's hands | "" | Private | Active/Broad | |
| Scroll through friends | Gesture left and right with finger | Floating around avatar | | Public/Private | Active/Broad | |
| Highlight menu items | Eye tracking and pointing | "" | | Public/Private | Active/Precise | |

EXTRUDE INPUT FUNCTIONS

| Action | How Do I Interact? | Where is the Content | How is Content Centered | Social Context | Input Behaviors | Empowerment |
|---|---|---|---|---|---|---|
| Activate menu | Put fingers together, then pull apart | x | x | Public/ private | active, broad | Menu appears along user-defined line |
| Menu appears | x | Along designated finger path floating in air | Room-Centric | Public/ private | X | |
| Show internet favorites(?) | Pull down from menu item | Floating in air | Room-Centric | Public/private | active, precise | |
| Rotate entire menu | Rotate/swipe gesture | "" | "" | Public/ private | active, broad | User able to see all open menus and content |
| Pull out websites | Pull out from menu item | "" | "" | Public/private | active, broad | Able to pull out sub-menus |
| Select website | Pluck out item from menu | "" | "" | private | active, precise | |
| Open web browser | Close hands, then pull open browser window | In hands | x | private | active, broad | |
| Close web browser | Smush content back into hands and re-open for icon | "" | x | private | active, broad | |
| Rotate entire menu | Rotate/swipe gesture | Floating in air | Room-Centric | Public/private | active, broad | |
| Show friends list | Pull down from menu item | "" | "" | Public/private | active, precise | |

GAUNTLET INPUT FUNCTIONS

| Action | How Do I Interact? | Where is the Content | How is Content Centered | Social Context | Input Behaviors | Empowerment |
|---|---|---|---|---|---|---|
| Activating menu | Roll up sleeve | x | x | Public/ Private | Active/Broad | Menu is placed on users arm and is readily available |
| Scroll through content | Slide fingers up/down wrist | On arm | Arm-Centric | Private | Active/Broad | |
| Selecting items | Slide icon downwards | "" | "" | Private | Active/Precise | |
| Selecting applications | Slide icon to back of hand | "" | "" | Private | Active/Precise | |
| Opening applications | "Release" or place into world | In air | Room-Centric | Private | Active/Broad | Content is thrown or placed into environment |
| Game opens | x | In air | Room-Centric | X | Passive | |
| Re-open menu | Roll up sleeve | x | x | Public/Private | Active/Broad | |
| Scroll through content | Slide fingers up/down wrist | On arm | Arm-Centric | Private | Active/Broad | |
| Select items | Slide icon downwards | "" | "" | Private | Active/Precise | |
| Select friend | Slide icon to back of hand | "" | "" | Private | Active/Precise | |
| Add friend to game | "Release" or place into world | In air | Room-Centric | Private | Active/Broad | |

FINGER BRUSH INPUT FUNCTIONS

| Action | How Do I Interact? | Where is the Content | How is Content Centered | Social Context | Input Behaviors | Empowerment |
|---|---|---|---|---|---|---|
| turn system on | create pinching sign with both hands/ place fingers together | X | X | public | active, precise | |
| create menu axis | separate hands to desired spacing | X | X | public | active, precise | menu is place along a user defined axis |
| menu appears along axis | X | floating in air | room centric | X | passive | |
| scroll through menu | gesture with hand | " | " | public/private | active, broad | |
| select contacts menu | point with finger and eye vector | " | " | public/private | passive, precise | |
| open contacts | gesture towards body | " | " | public/ private | active, broad | view layers of content along axis at varying depths |
| select friend | point with finger and eye vector | " | " | public/private | passive, precise | |
| open options | gesture towards body | " | " | public/private | active, broad | |
| call friend | touch icon | " | " | public/private | active, broad | |
| select main menu | point with finger and eye vector | " | " | public/private | passive, precise | |
| move menu | pinch gesture on axis pivot | " | " | private | active, precise | move menu items out of the way and change how they are displayed |
| scroll through menu | gesture with hand | " | " | public/private | active, broad | |
| select documents menu | point with finger and eye vector | " | " | public/private | passive, precise | |

PIVOT INPUT FUNCTIONS

| Action | How Do I Interact? | Where is the Content | How is Content Centered | Social Context | Input Behaviors | Empowerment |
|---|---|---|---|---|---|---|
| turn system on | create pinching sign with both hands/ place fingers together | X | X | public | active, precise | |
| create menu axis | separate hands to desired spacing | X | X | public | active, precise | menu is place along a user defined axis |
| menu appears along axis | X | floating in air | room centric | X | passive | |
| scroll through menu | gesture with hand | " | " | public/private | active, broad | |
| select contacts menu | point with finger and eye vector | " | " | public/private | passive, precise | |
| open contacts | gesture towards body | " | " | public/ private | active, broad | view layers of content along axis at varying depths |
| select friend | point with finger and eye vector | " | " | public/private | passive, precise | |
| open options | gesture towards body | " | " | public/private | active, broad | |
| call friend | touch icon | " | " | public/private | active, broad | |
| select main menu | point with finger and eye vector | " | " | public/private | passive, precise | |
| move menu | pinch gesture on axis pivot | " | " | private | active, precise | move menu items out of the way and change how they are displayed |
| scroll through menu | gesture with hand | " | " | public/private | active, broad | |
| select documents menu | point with finger and eye vector | " | " | public/private | passive, precise | |

PULL STRING INPUT FUNCTIONS

| Action | How Do I Interact? | Where is the Content | How is Content Centered | Social Context | Input Behaviors | Empowerment |
|---|---|---|---|---|---|---|
| Activating strings | Raise hand up towards the ceiling | X | X | private/ public | Active, broad | |
| Apps appear | X | on strings | room centric | X | Passive | All content files displayed at once |
| Move unwanted apps out of the way | Swipe hand across stings to move them | " | " | private/ public | Active, broad | |
| Apps attach themselves in their new places | X | " | " | X | Passive | Completely adjustable interface allows for total user customization |
| Pull music folder's string | Grab the folder's line and pull it to the foreground | " | " | private | Active, precise | |
| Open music folder | Pinch the icon and pull down | " | " | private/public | Active, precise | |
| Music sub categories appear | X | " | " | X | Passive | |
| select desired category | pinch wanted icon and pull it off the music string | " | " | private/public | Active, precise | |

SPIDER WEB INPUT FUNCTIONS

| Action | How Do I Interact? | Where is the Content | How is Content Centered | Social Context | Input Behaviors | Empowerment |
|---|---|---|---|---|---|---|
| Activating menu | Open hand towards direction of surface | x | x | Public/private | active, broad | |
| Menu appears | Menu appears in arc on intended surface | On wall | Room-Centric | X | Passive | User-defined location of where menu appears |
| Open Google+ | Pull string attached to G+ | "" | "" | Public/private | active, broad | |
| Lite Version Pulled Out | Lite version of website is pulled out at fixed distanced | On string | Object-Centric | X | passive | Different views of web pages allows for different interactions of content |
| Full Version Pulled Out | Full version of website pulled out at full distance | Floating in air | Room-Centric | X | passive | |
| Close web browser | Push website back into wall | x | x | Public/private | active, broad | |
| Pull out friend | Pull out friend to prep sharing of content | "" | "" | private | active, precise | |
| Open Music | Pull string attached to music | On wall | Object-Centric | Public/private | | |
| Lite Version Pulled Out | Lite version of music is pulled out at fixed distanced | On string | Object-Centric | X | passive | |
| Full Version Pulled Out | Full version of music pulled out at full distance | Floating in air | Room-Centric | X | passive | |

METHODS AND SYSTEMS FOR CREATING VIRTUAL AND AUGMENTED REALITY

CROSS-REFERENCE TO RELATED APPLICATION(S)

This application claims priority to U.S. Provisional Patent App. Ser. No. 62/012,273 filed on Jun. 14, 2014 entitled "METHODS AND SYSTEMS FOR CREATING VIRTUAL AND AUGMENTED REALITY," . This application is a continuation-in-part of U.S. patent application Ser. No. 14/331,218 filed on Jul. 14, 2014 entitled "PLANAR WAVEGUIDE APPARATUS WITH DIFFRACTION LENSING ELEMENT(S) AND SYSTEM EMPLOYING SAME,". This application is cross-related to U.S. patent application Ser. No. 14/555,585 filed on Nov. 27, 2014 entitled "VIRTUAL AND AR SYSTEMS AND METHODS," U.S. patent application Ser. No. 14/690,401 filed on Apr. 18, 2015 entitled "SYSTEMS AND METHOD FOR AUGMENTED REALITY" and to U.S. patent application Ser. No. 14/205,126 filed on Mar. 11, 2014 entitled "SYSTEM AND METHOD FOR AUGMENTED AND VIRTUAL REALITY,". The content of the aforementioned patent applications are hereby expressly incorporated by reference in their entirety for all purposes.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, an augmented reality scene may allow a user of AR technology may see one or more virtual objects super-imposed on or amidst real world objects (e.g., a real-world park-like setting featuring people, trees, buildings in the background, etc.).

The human visual perception system is very complex, and producing a VR or AR technology that facilitates a comfortable, natural-feeling, rich presentation of virtual image elements amongst other virtual or real-world imagery elements is challenging. Traditional stereoscopic wearable glasses generally feature two displays that are configured to display images with slightly different element presentation such that a three-dimensional perspective is perceived by the human visual system. Such configurations have been found to be uncomfortable for many users due to a mismatch between vergence and accommodation which may be overcome to perceive the images in three dimensions. Indeed, some users are not able to tolerate stereoscopic configurations.

Although a few optical configurations (e.g., head-mounted glasses) are available (e.g., GoogleGlass®, Occulus Rift®, etc.), none of these configurations is optimally suited for presenting a rich, binocular, three-dimensional augmented reality experience in a manner that will be comfortable and maximally useful to the user, in part because prior systems fail to address some of the fundamental aspects of the human perception system, including the photoreceptors of the retina and their interoperation with the brain to produce the perception of visualization to the user.

The human eye is an exceedingly complex organ, and typically comprises a cornea, an iris, a lens, macula, retina, and optic nerve pathways to the brain. The macula is the center of the retina, which is utilized to see moderate detail. At the center of the macula is a portion of the retina that is referred to as the "fovea", which is utilized for seeing the finest details of a scene, and which contains more photoreceptors (approximately 120 cones per visual degree) than any other portion of the retina.

The human visual system is not a passive sensor type of system; it actively scans the environment. In a manner somewhat akin to use of a flatbed scanner to capture an image, or use of a finger to read Braille from a paper, the photoreceptors of the eye fire in response to changes in stimulation, rather than constantly responding to a constant state of stimulation. Thus, motion is required to present photoreceptor information to the brain.

Indeed, experiments with substances such as cobra venom, which has been utilized to paralyze the muscles of the eye, have shown that a human subject will experience blindness if positioned with eyes open, viewing a static scene with venom-induced paralysis of the eyes. In other words, without changes in stimulation, the photoreceptors do not provide input to the brain and blindness is experienced. It is believed that this is at least one reason that the eyes of normal humans have been observed to move back and forth, or dither, in side-to-side motion, also known as "microsaccades".

As noted above, the fovea of the retina contains the greatest density of photoreceptors. While it is typically perceived that humans have high-resolution visualization capabilities throughout a field of view, in actuality humans only a small high-resolution center that is mechanically swept around almost constantly, along with a persistent memory of the high-resolution information recently captured with the fovea. In a somewhat similar manner, the focal distance control mechanism of the eye (e.g., ciliary muscles operatively coupled to the crystalline lens in a manner wherein ciliary relaxation causes taut ciliary connective fibers to flatten out the lens for more distant focal lengths; ciliary contraction causes loose ciliary connective fibers, which allow the lens to assume a more rounded geometry for more close-in focal lengths) dithers back and forth by approximately ¼ to ½ diopter to cyclically induce a small amount of "dioptric blur" on both the close side and far side of the targeted focal length. This is utilized by the accommodation control circuits of the brain as cyclical negative feedback that helps to constantly correct course and keep the retinal image of a fixated object approximately in focus.

The visualization center of the brain also gains valuable perception information from the motion of both eyes and components thereof relative to each other. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex (as is the case with most conventional stereoscopic AR or VR configurations) is known to produce eye fatigue, headaches, or other forms of discomfort in users.

Movement of the head, which houses the eyes, also has a key impact upon visualization of objects. Humans tend to move their heads to visualize the world around them, and are often are in a fairly constant state of repositioning and reorienting the head relative to an object of interest. Further, most people prefer to move their heads when their eye gaze needs to move more than about 20 degrees off center to focus on a particular object (e.g., people do not typically like to look at things "from the corner of the eye"). Humans also typically scan or move their heads in relation to sounds—to improve audio signal capture and utilize the geometry of the ears relative to the head. The human visual system gains powerful depth cues from what is called "head motion parallax", which is related to the relative motion of objects at different distances as a function of head motion and eye vergence distance. In other words, if a person moves his head from side to side and maintains fixation on an object, items farther out from that object will move in the same direction as the head, and items in front of that object will move opposite the head motion. These may be very salient cues for where objects are spatially located in the environment relative to the person. Head motion also is utilized to look around objects, of course.

Further, head and eye motion are coordinated with the "vestibulo-ocular reflex", which stabilizes image information relative to the retina during head rotations, thus keeping the object image information approximately centered on the retina. In response to a head rotation, the eyes are reflexively and proportionately rotated in the opposite direction to maintain stable fixation on an object. As a result of this compensatory relationship, many humans can read a book while shaking their head back and forth. Interestingly, if the book is panned back and forth at the same speed with the head approximately stationary, the same generally is not true—the person is not likely to be able to read the moving book. The vestibulo-ocular reflex is one of head and eye motion coordination, and is generally not developed for hand motion. This paradigm may be important for AR systems, because head motions of the user may be associated relatively directly with eye motions, and an ideal system preferably will be ready to work with this relationship.

Indeed, given these various relationships, when placing digital content (e.g., 3-D content such as a virtual chandelier object presented to augment a real-world view of a room; or 2-D content such as a planar/flat virtual oil painting object presented to augment a real-world view of a room), design choices may be made to control behavior of the objects. For example, a 2-D oil painting object may be head-centric, in which case the object moves around along with the user's head (e.g., as in a GoogleGlass® approach). In another example, an object may be world-centric, in which case it may be presented as though it is part of the real world coordinate system, such that the user may move his head or eyes without moving the position of the object relative to the real world.

Thus when placing virtual content into the augmented reality world presented with an AR system, choices are made as to whether the object should be presented as world centric, body-centric, head-centric or eye centric. In head-centric approaches, the virtual object stays in position in the real world so that the user may move his body, head, eyes around it without changing its position relative to the real world objects surrounding it, such as a real world wall. In body-centric approaches, a virtual element may be fixed relative to the user's torso, so that the user can move his head or eyes without moving the object, but that is slaved to torso movements, In head centric approaches, the displayed object (and/or display itself) may be moved along with head movements, as described above in reference to GoogleGlass®). In eye-centric approaches, as in a "foveated display" configuration, as is described below, content is slewed around as a function of the eye position.

With world-centric configurations, it may be desirable to have inputs such as accurate head pose measurement, accurate representation and/or measurement of real world objects and geometries around the user, low-latency dynamic rendering in the augmented reality display as a function of head pose, and a generally low-latency display.

The U.S. patent applications listed above present systems and techniques to work with the visual configuration of a typical human to address various challenges in virtual reality and augmented reality applications. The design of these virtual reality and/or AR systems presents numerous challenges, including the speed of the system in delivering virtual content, quality of virtual content, eye relief of the user, size and portability of the system, and other system and optical challenges.

The systems and techniques described herein are configured to work with the visual configuration of the typical human to address these challenges.

SUMMARY

Embodiments of the present invention are directed to devices, systems and methods for facilitating virtual reality and/or augmented reality interaction for one or more users. In one aspect, a system for displaying virtual content is disclosed.

In one aspect, an augmented reality system comprises an image capturing device to capture one or more images, the one or more images corresponding to a field of the view of a user of a head-mounted augmented reality device, and a processor communicatively coupled to the image capturing device to extract a set of map points from the set of images, to identify a set of sparse points and a set of dense points from the extracted set of map points, and to perform a normalization on the set of map points.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 108A-1080 illustrate example embodiments of ring and bracelet totems, according to one or more embodiments.

FIG. 119 shows yet another perspective of the eye and one or more cameras for gaze tracking, according to one embodiment.

FIG. 120 shows yet another perspective of the eye and one or more cameras for gaze tracking, according to one embodiment.

FIG. 121 shows a translational matrix view for gaze tracking, according to one embodiment.

FIG. 122 illustrates an example method of gaze tracking, according to one embodiment.

FIGS. 123A-123D illustrate a series of example user interface flows using avatars, according to one embodiment.

FIGS. 124A-124M illustrate a series of example user interface flows using extrusion, according to one embodiment.

FIGS. 125A-125M illustrate a series of example user interface flows using gauntlet, according to one embodiment.

FIGS. 126A-126L illustrate a series of example user interface flows using grow, according to one embodiment.

FIGS. 127A-127E illustrate a series of example user interface flows using brush, according to one embodiment.

FIGS. 128A-128P illustrate a series of example user interface flows using fingerbrush, according to one embodiment.

FIGS. 129A-129M illustrate a series of example user interface flows using pivot according to one embodiment.

FIGS. 130A-130I illustrate a series of example user interface flows using strings, according to one embodiment.

FIGS. 131A-131I illustrate a series of example user interface flows using spiderweb, according to one embodiment.

Figure 132:
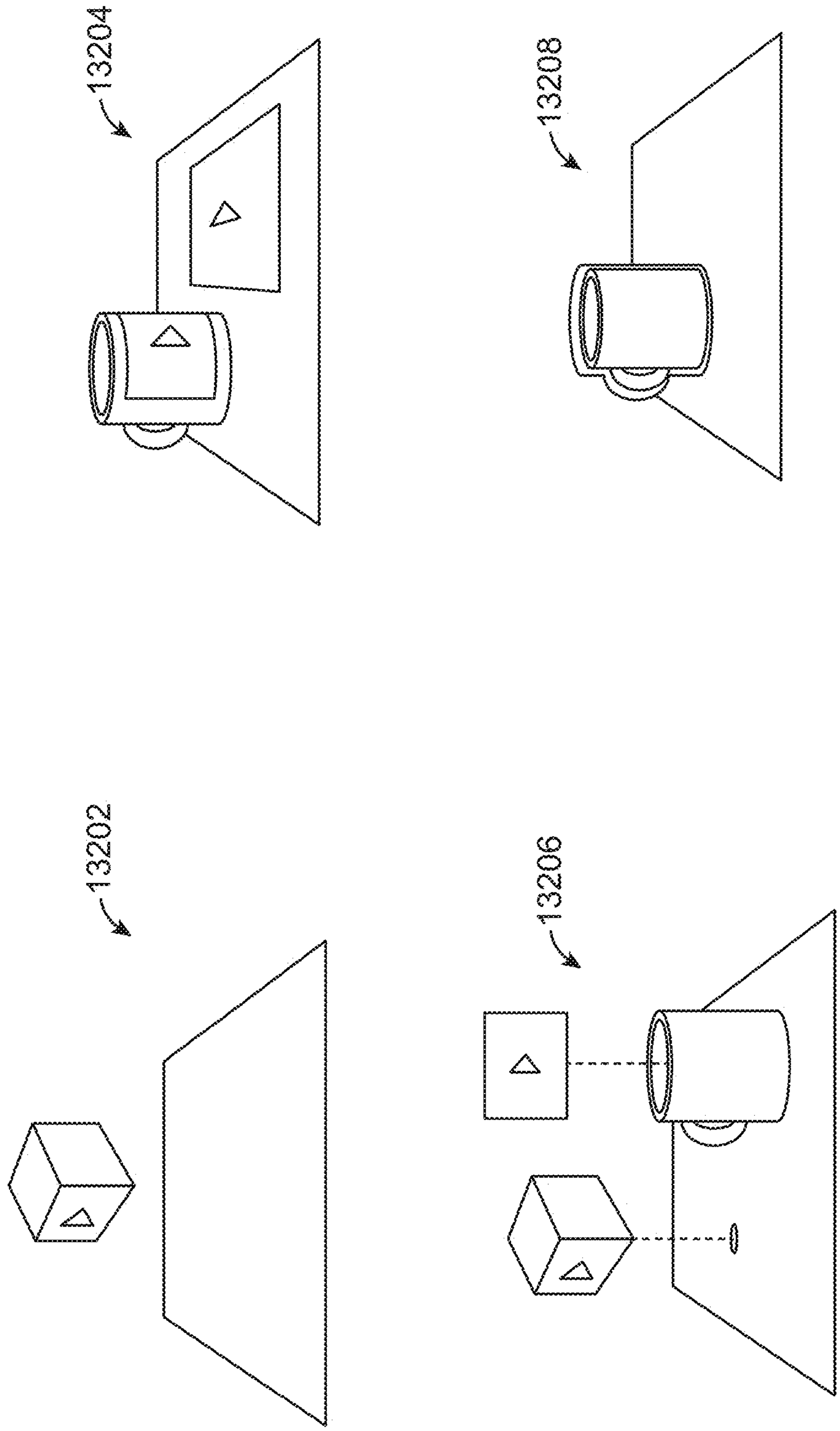

FIG. 132 is a plan view of various mechanisms by which a virtual object relates to one or more physical objects.

Figure 133:
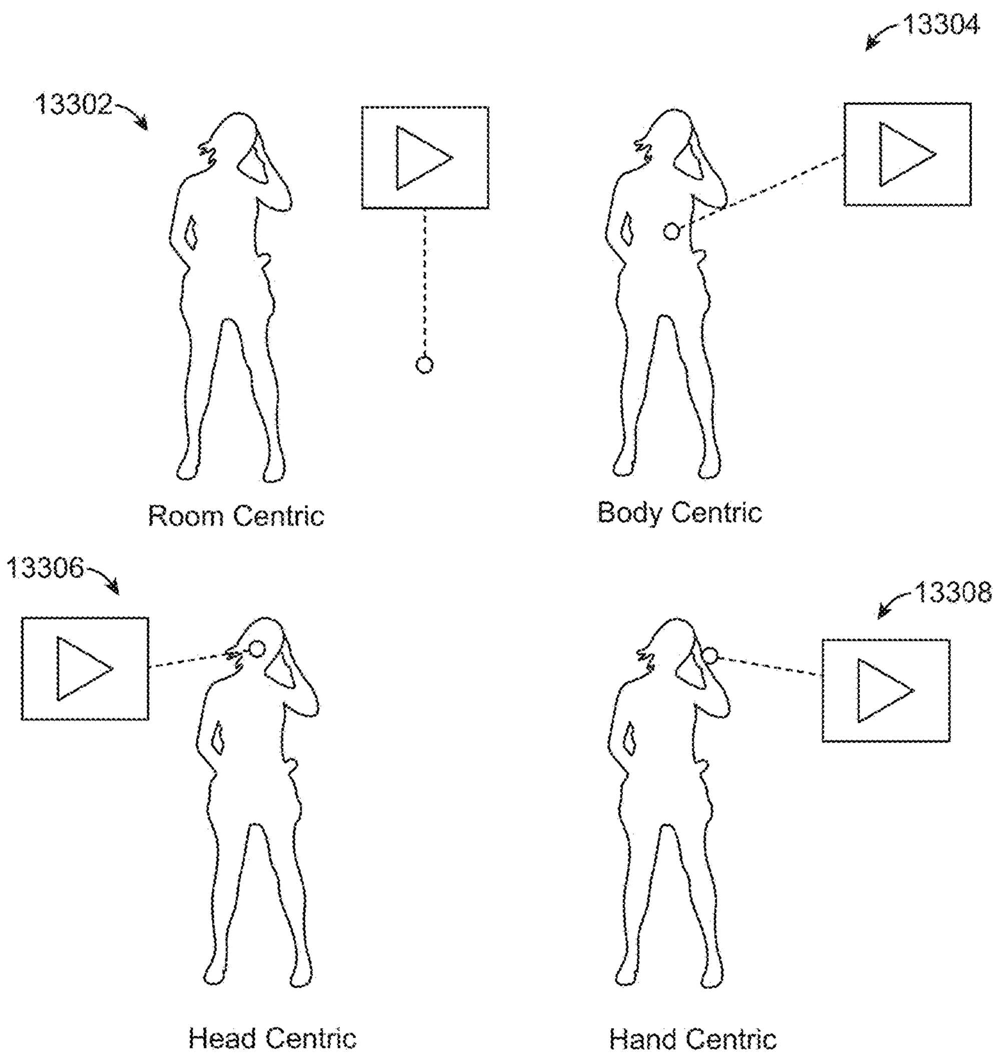

FIG. 133 is a plan view of various types of AR rendering, according to one or more embodiments.

Figure 134:
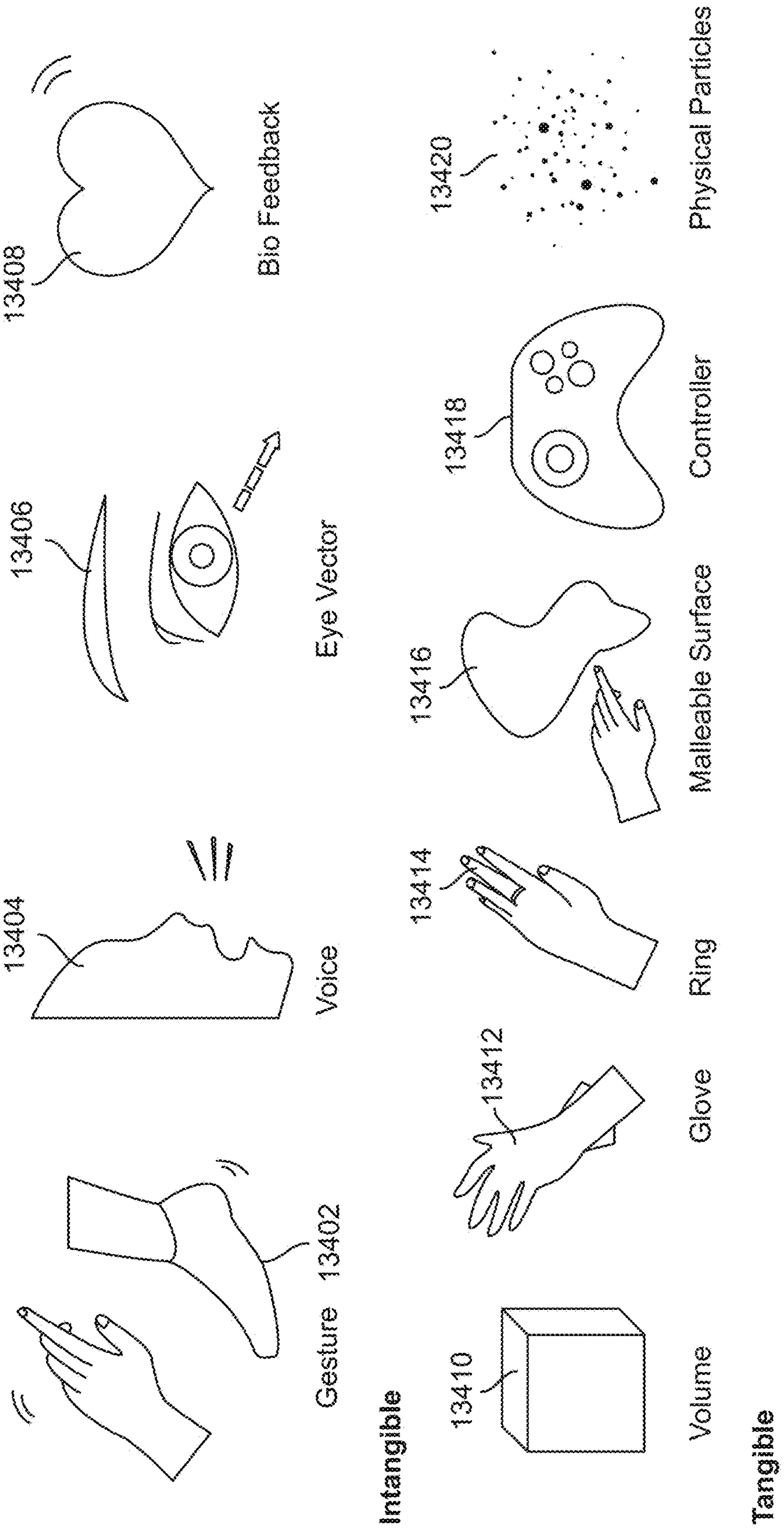

FIG. 134 illustrates various types of user input in an AR system, according to one or more embodiments.

FIGS. 135A-135J illustrates various embodiments pertaining to using gestures in an AR system, according to one or more embodiments.

Figure 136:
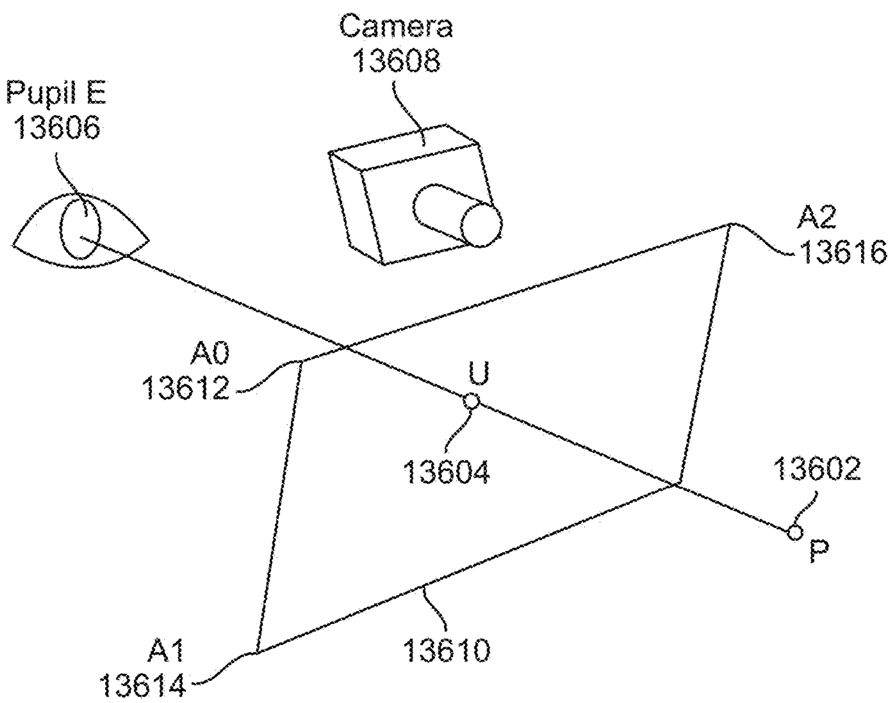

FIG. 136 illustrates a plan view of various components for a calibration mechanism of the AR system, according to one or more embodiments.

Figure 137:
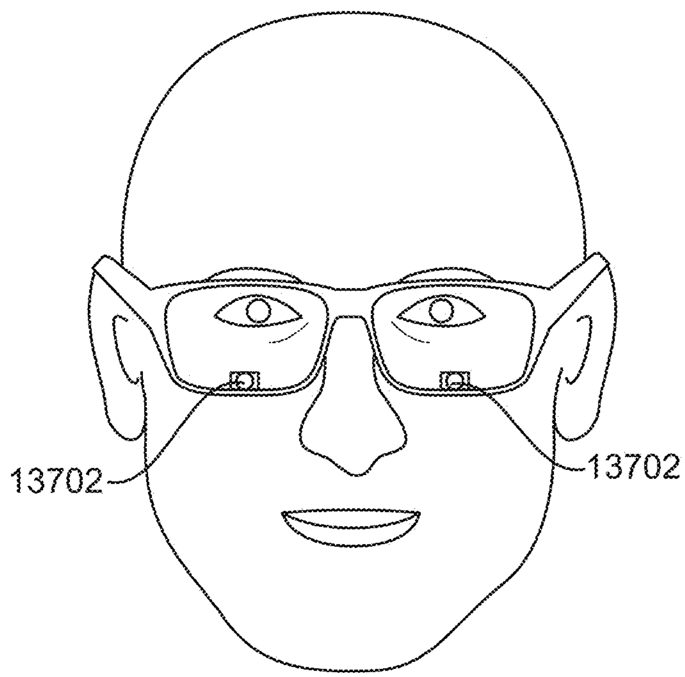

FIG. 137 illustrates a view of an AR device on a user's face, the AR device having eye tracking cameras, according to one or more embodiments.

Figure 138:
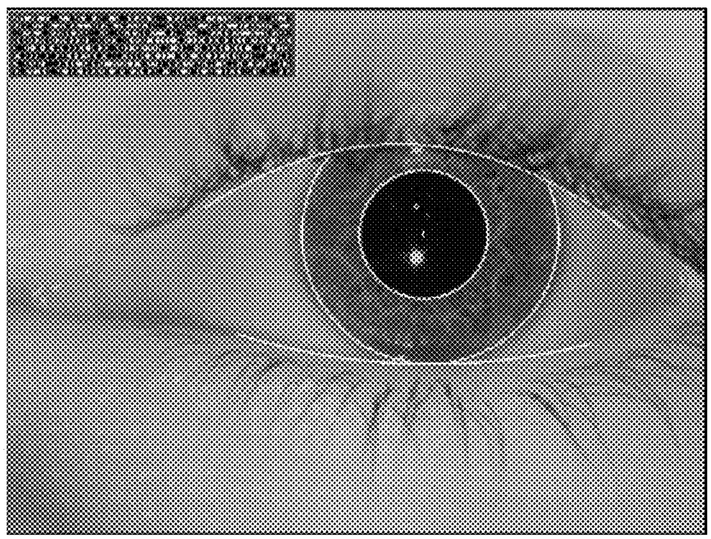

FIG. 138 illustrates an eye identification image of the AR system, according to one or more embodiments.

Figure 139:
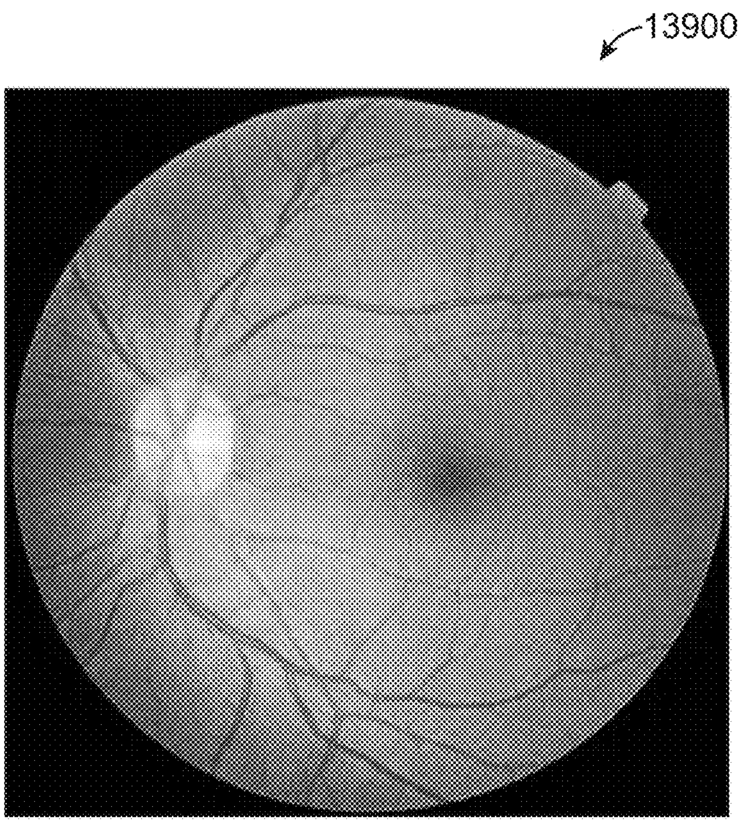

FIG. 139 illustrates a retinal image taken with an AR system, according to one or more embodiments.

Figure 140:
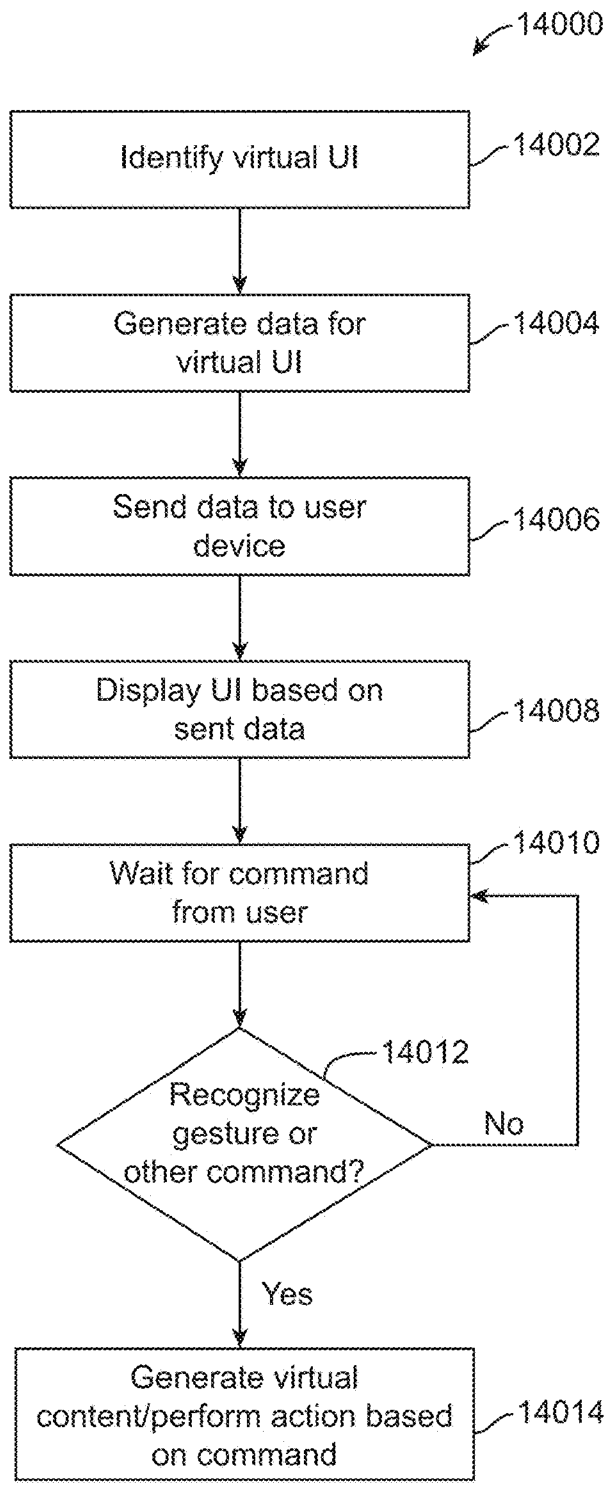

FIG. 140 is a process flow diagram of an example method of generating a virtual user interface, according to one illustrated embodiment.

Figure 141:
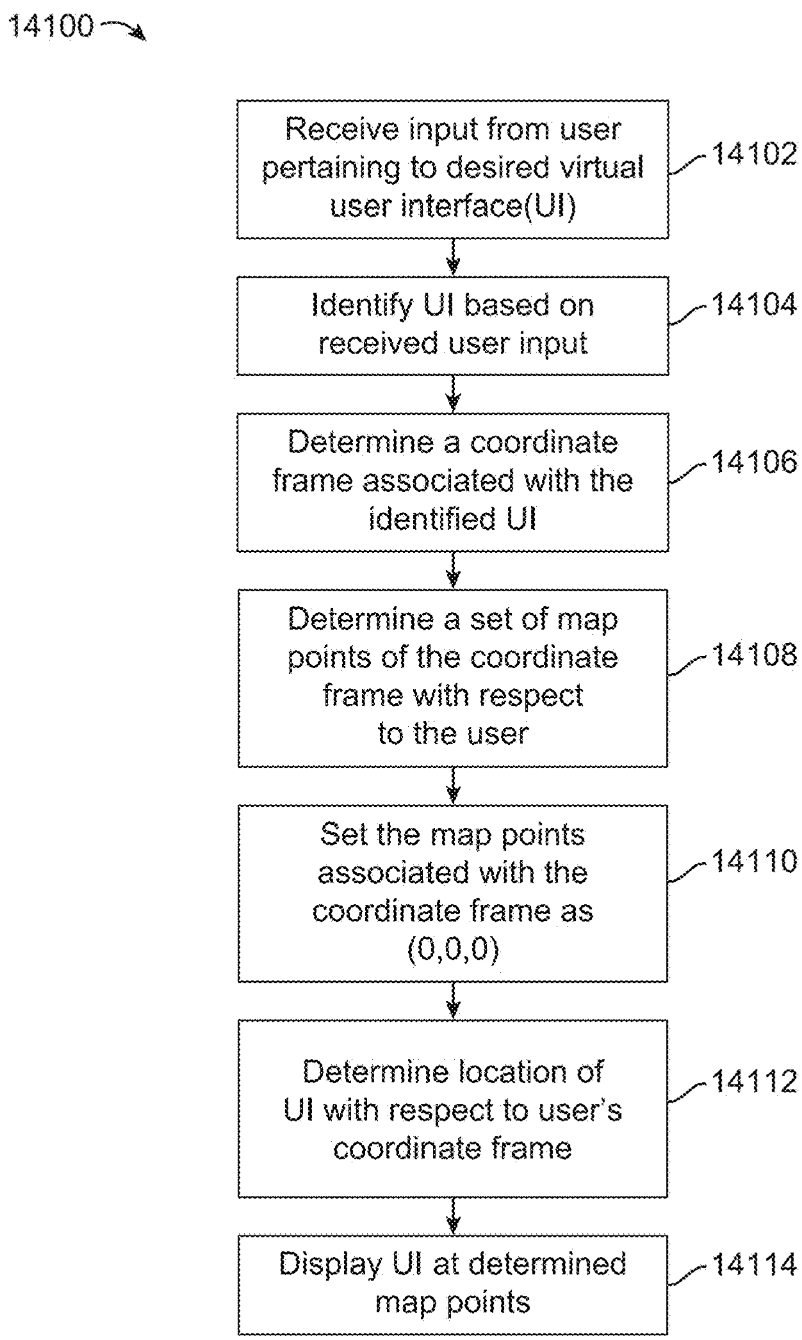

FIG. 141 is another process flow diagram of an example method of generating a virtual user interface based on a coordinate frame, according to one illustrated embodiment.

Figure 142:
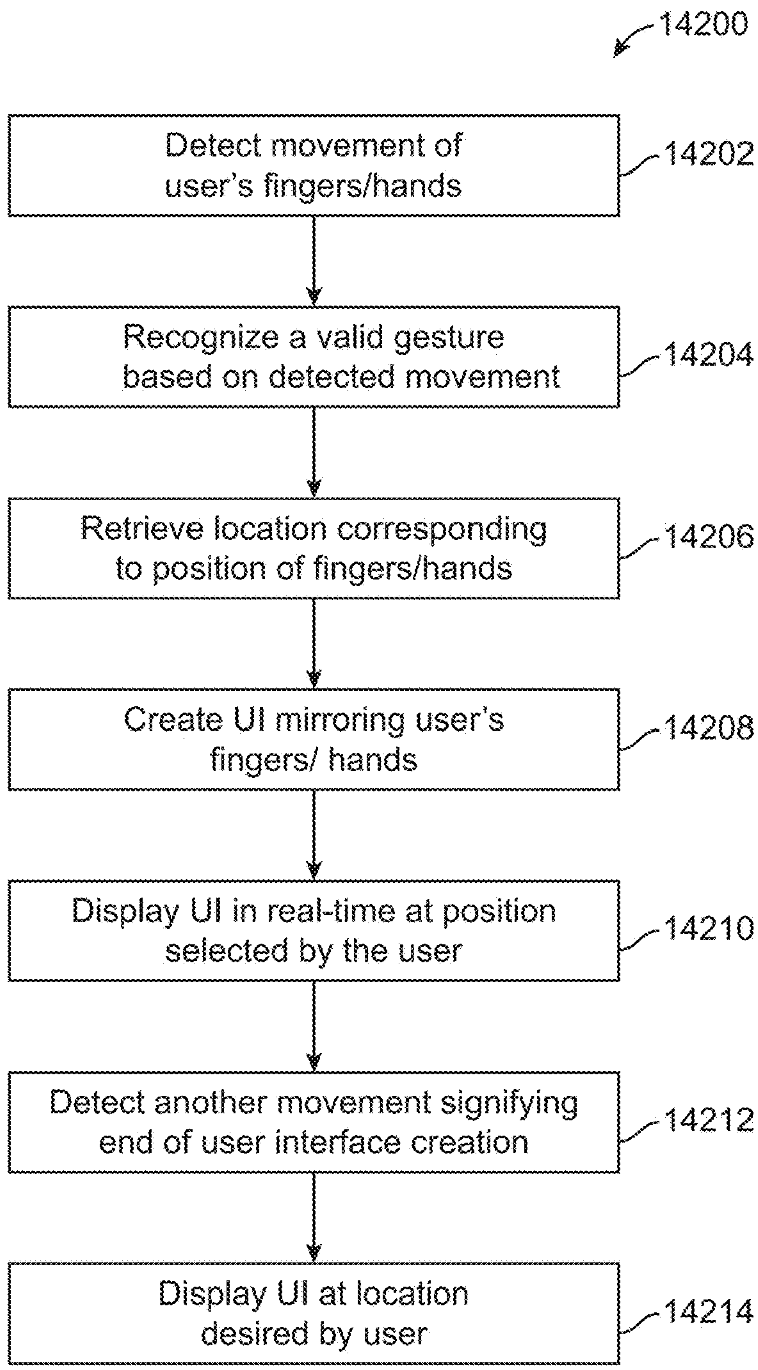

FIG. 142 is a process flow diagram of an example method of constructing a customized user interface, according to one illustrated embodiment.

Figure 143:
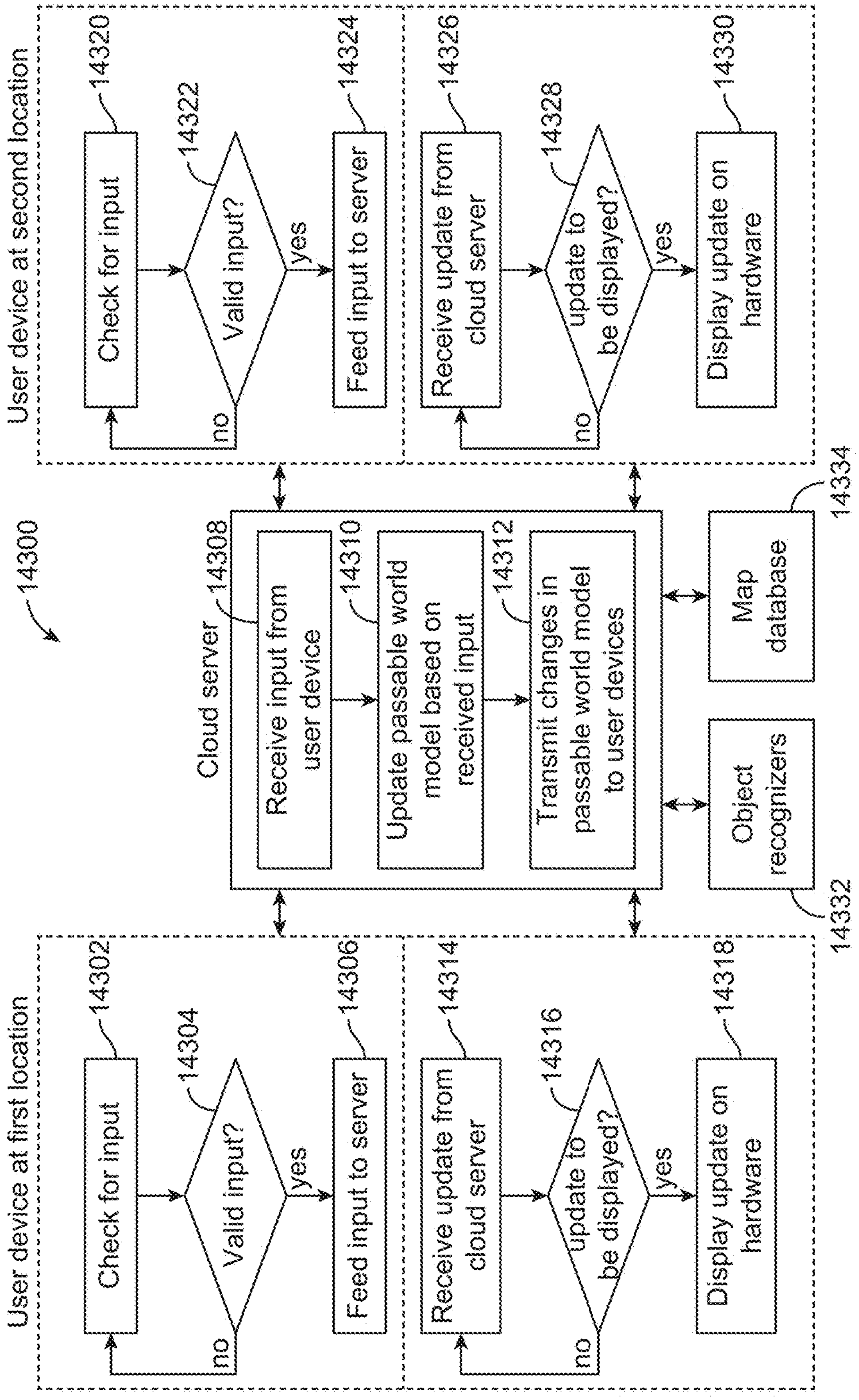

FIG. 143 is a process flow diagram of an example method of retrieving information from the passable world model and interacting with other users of the AR system, according to one illustrated embodiment.

Figure 144:
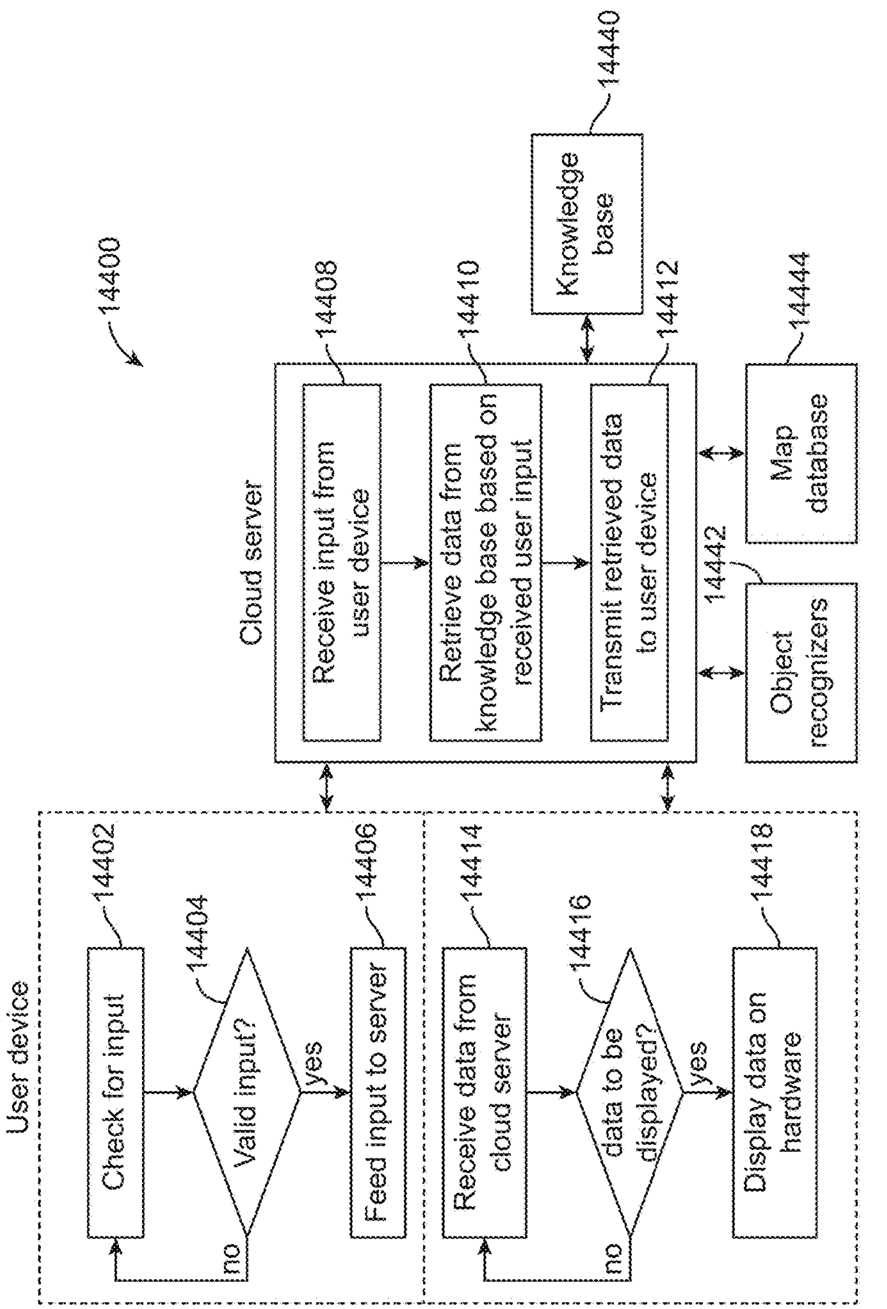

FIG. 144 is a process flow diagram of an example method of retrieving information from a knowledge based in the cloud based on received input, according to one illustrated embodiment.

Figure 145:
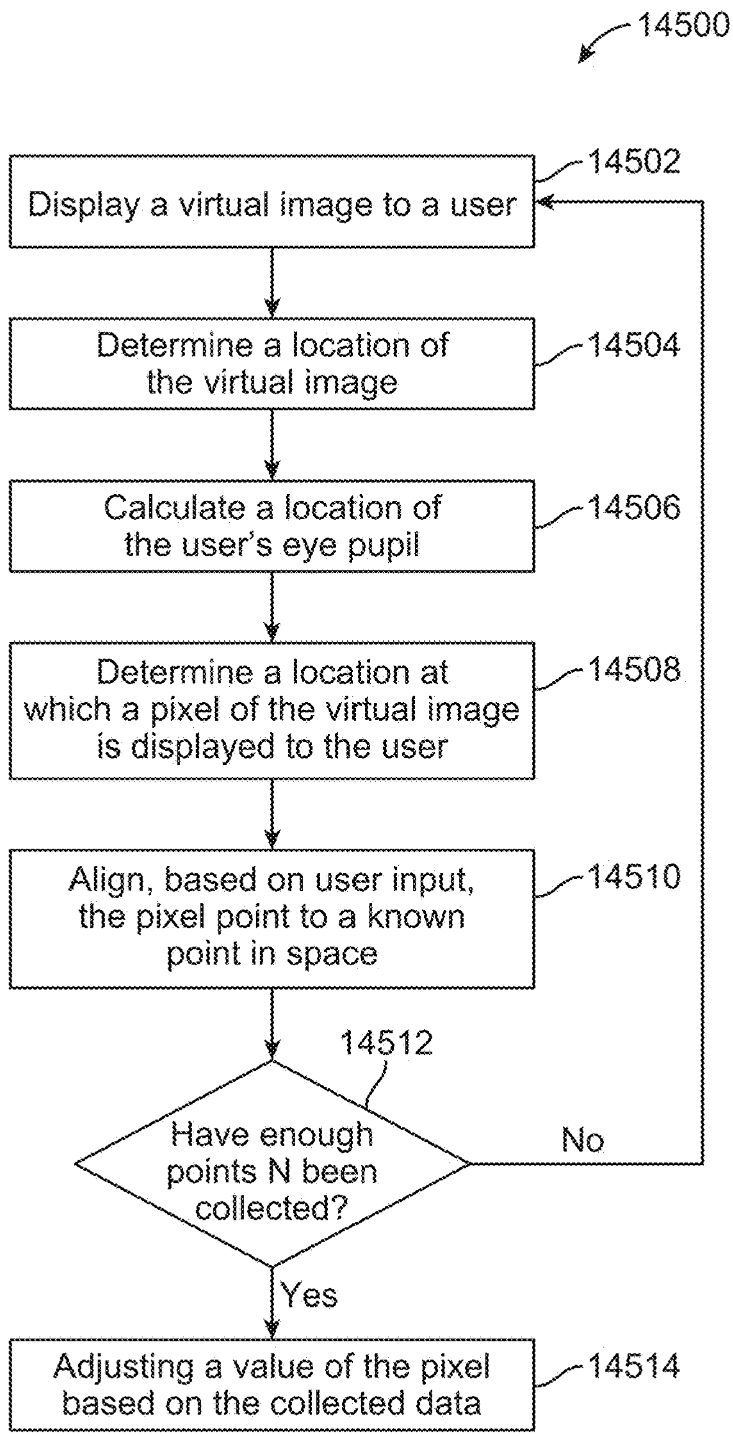

FIG. 145 is a process flow diagram of an example method of calibrating the AR system, according to one illustrated embodiment.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Disclosed are methods and systems for generating virtual and/or augmented reality. In order to provide a realistic and enjoyable virtual reality (VR) or augmented reality (AR) experience, virtual content may be strategically delivered to the user's eyes in a manner that is respectful of the human eye's physiology and limitations. The following disclosure will provide various embodiments of such optical systems that may be integrated into an AR system. Although most of the disclosures herein will be discussed in the context of AR systems, it should be appreciated that the same technologies may be used for VR systems also, and the following embodiments should not be read as limiting.

The following disclosure will provide details on various types of systems in which AR users may interact with each other through a creation of a map that comprises comprehensive information about the physical objects of the real world in real-time. The map may be advantageously consulted in order to project virtual images in relation to known real objects. The following disclosure will provide various approaches to understanding information about the real world, and using this information to provide a more realistic and enjoyable AR experience. Additionally, this disclosure will provide various user scenarios and applications in which AR systems such as the ones described herein may be realized.

System Overview

In one or more embodiments, the AR system 10 comprises a computing network 5, comprised of one or more computer servers 11 connected through one or more high bandwidth interfaces 15. The servers 11 in the computing network may or may not be co-located. The one or more servers 11 each comprise one or more processors for executing program instructions. The servers may also include memory for storing the program instructions and data that is used and/or generated by processes being carried out by the servers 11 under direction of the program instructions.

The computing network 5 communicates data between the servers 11 and between the servers and one or more user devices 12 over one or more data network connections 13. Examples of such data networks include, without limitation, any and all types of public and private data networks, both mobile and wired, including for example the interconnection of many of such networks commonly referred to as the Internet. No particular media, topology or protocol is intended to be implied by the figure.

User devices are configured for communicating directly with computing network 5, or any of the servers 11. Alternatively, user devices 12 communicate with the remote servers 11, and, optionally, with other user devices locally, through a specially programmed, local gateway 14 for processing data and/or for communicating data between the network 5 and one or more local user devices 12.

As illustrated, gateway 14 is implemented as a separate hardware component, which includes a processor for executing software instructions and memory for storing software instructions and data. The gateway has its own wired and/or wireless connection to data networks for communicating with the servers 11 comprising computing network 5. Alternatively, gateway 14 can be integrated with a user device 12, which is worn or carried by a user. For example, the gateway 14 may be implemented as a downloadable software application installed and running on a processor included in the user device 12. The gateway 14 provides, in one embodiment, one or more users access to the computing network 5 via the data network 13.

Servers 11 each include, for example, working memory and storage for storing data and software programs, microprocessors for executing program instructions, graphics processors and other special processors for rendering and generating graphics, images, video, audio and multi-media files. Computing network 5 may also comprise devices for storing data that is accessed, used or created by the servers 11.

Software programs running on the servers and optionally user devices 12 and gateways 14, are used to generate digital worlds (also referred to herein as virtual worlds) with which users interact with user devices 12. A digital world (or map)(as will be described in further detail below) is represented by data and processes that describe and/or define virtual, non-existent entities, environments, and conditions that can be presented to a user through a user device 12 for users to experience and interact with. For example, some type of object, entity or item that will appear to be physically present when instantiated in a scene being viewed or experienced by a user may include a description of its appearance, its behavior, how a user is permitted to interact with it, and other characteristics.

Data used to create an environment of a virtual world (including virtual objects) may include, for example, atmospheric data, terrain data, weather data, temperature data, location data, and other data used to define and/or describe a virtual environment. Additionally, data defining various conditions that govern the operation of a virtual world may include, for example, laws of physics, time, spatial relationships and other data that may be used to define and/or create various conditions that govern the operation of a virtual world (including virtual objects).

The entity, object, condition, characteristic, behavior or other feature of a digital world will be generically referred to herein, unless the context indicates otherwise, as an object (e.g., digital object, virtual object, rendered physical object, etc.). Objects may be any type of animate or inanimate object, including but not limited to, buildings, plants, vehicles, people, animals, creatures, machines, data, video, text, pictures, and other users. Objects may also be defined in a digital world for storing information about items, behaviors, or conditions actually present in the physical world. The data that describes or defines the entity, object or item, or that stores its current state, is generally referred to herein as object data. This data is processed by the servers 11 or, depending on the implementation, by a gateway 14 or user device 12, to instantiate an instance of the object and render the object in an appropriate manner for the user to experience through a user device.

Programmers who develop and/or curate a digital world create or define objects, and the conditions under which they are instantiated. However, a digital world can allow for others to create or modify objects. Once an object is instantiated, the state of the object may be permitted to be altered, controlled or manipulated by one or more users experiencing a digital world.

For example, in one embodiment, development, production, and administration of a digital world are generally provided by one or more system administrative programmers. In some embodiments, this may include development, design, and/or execution of story lines, themes, and events in the digital worlds as well as distribution of narratives through various forms of events and media such as, for example, film, digital, network, mobile, augmented reality, and live entertainment. The system administrative programmers may also handle technical administration, moderation, and curation of the digital worlds and user communities associated therewith, as well as other tasks typically performed by network administrative personnel.

Users interact with one or more digital worlds using some type of a local computing device, which is generally designated as a user device 12. Examples of such user devices include, but are not limited to, a smart phone, tablet device, heads-mounted display (HMD), gaming console, or any other device capable of communicating data and providing an interface or display to the user, as well as combinations of such devices. In some embodiments, the user device 12 may include, or communicate with, local peripheral or input/output components such as, for example, a keyboard, mouse, joystick, gaming controller, haptic interface device, motion capture controller, an optical tracking device, audio equipment, voice equipment, projector system, 3D display, and/or holographic 3D contact lens.

Figure 2:
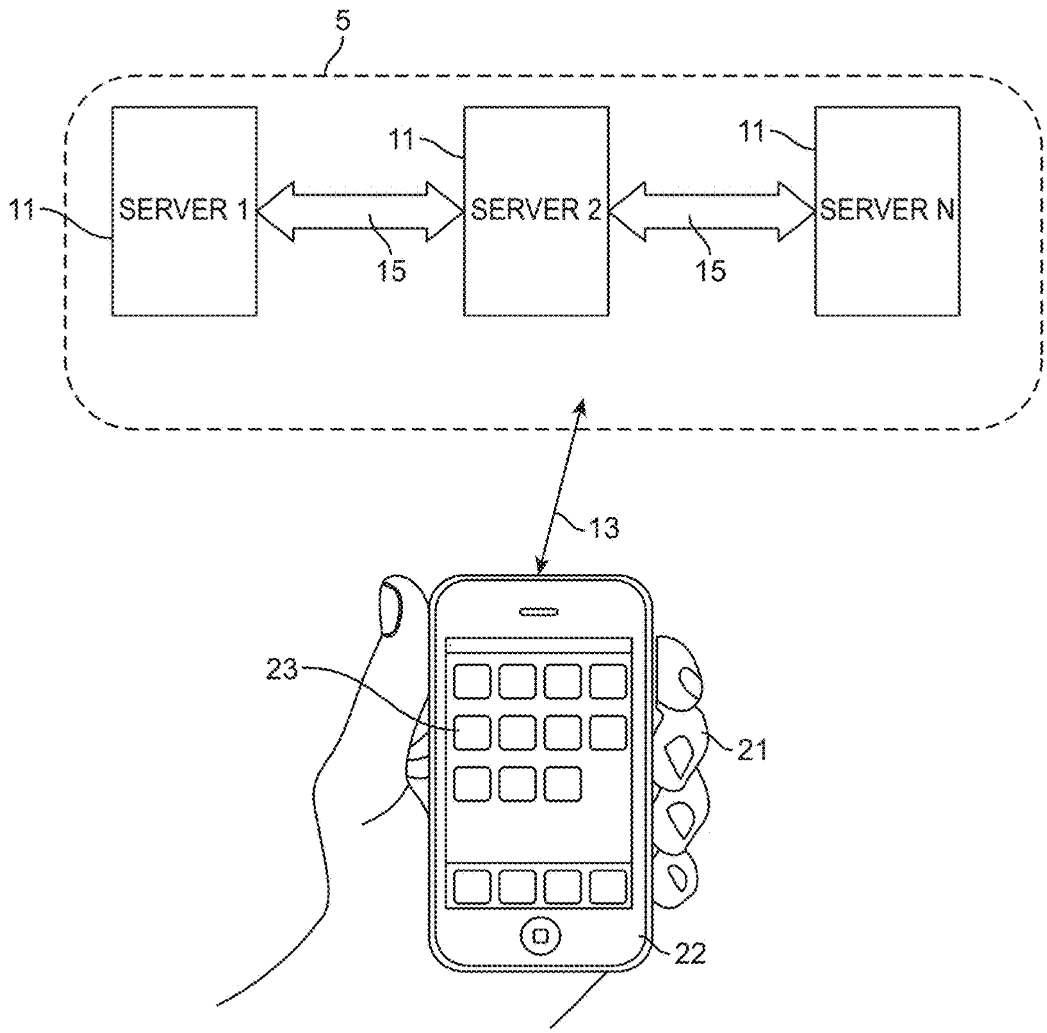
FIG. 2 illustrates a detailed view of a cell phone used as an AR device interacting with one or more servers, according to one illustrated embodiment.

An example of a user device 12 for interacting with the system 10 is illustrated in FIG. 2. In the example embodiment shown in FIG. 2, a user 21 may interface one or more digital worlds through a smart phone 22. The gateway is implemented by a software application 23 stored on and running on the smart phone 22. In this particular example, the data network 13 includes a wireless mobile network connecting the user device (e.g., smart phone 22) to the computer network 5.

In one implementation of a preferred embodiment, system 10 is capable of supporting a large number of simultaneous users (e.g., millions of users), each interfacing with the same digital world, or with multiple digital worlds, using some type of user device 12.

The user device provides to the user, an interface for enabling a visual, audible, and/or physical interaction between the user and a digital world generated by the servers 11, including other users and objects (real or virtual) presented to the user. The interface provides the user with a rendered scene that can be viewed, heard or otherwise sensed, and the ability to interact with the scene in real-time. The manner in which the user interacts with the rendered scene may be dictated by the capabilities of the user device. For example, if the user device is a smart phone, the user interaction may be implemented by a user contacting a touch screen. In another example, if the user device is a computer or gaming console, the user interaction may be implemented using a keyboard or gaming controller. User devices may include additional components that enable user interaction such as sensors, wherein the objects and information (including gestures) detected by the sensors may be provided as input representing user interaction with the virtual world using the user device.

The rendered scene can be presented in various formats such as, for example, two-dimensional or three-dimensional visual displays (including projections), sound, and haptic or tactile feedback. The rendered scene may be interfaced by the user in one or more modes including, for example, augmented reality, virtual reality, and combinations thereof. The format of the rendered scene, as well as the interface modes, may be dictated by one or more of the following: user device, data processing capability, user device connectivity, network capacity and system workload. Having a large number of users simultaneously interacting with the digital worlds, and the real-time nature of the data exchange, is enabled by the computing network 5, servers 11, the gateway component 14 (optionally), and the user device 12.

In one example, the computing network 5 is comprised of a large-scale computing system having single and/or multi-core servers (e.g., servers 11) connected through high-speed connections (e.g., high bandwidth interfaces 15). The computing network 5 may form a cloud or grid network. Each of the servers includes memory, or is coupled with computer readable memory for storing software for implementing data to create, design, alter, or process objects of a digital world. These objects and their instantiations may be dynamic, come in and out of existence, change over time, and change in response to other conditions. Examples of dynamic capabilities of the objects are generally discussed herein with respect to various embodiments. In some embodiments, each user interfacing the system 10 may also be represented as an object, and/or a collection of objects, within one or more digital worlds.

The servers 11 within the computing network 5 also store computational state data for each of the digital worlds. The computational state data (also referred to herein as state data) may be a component of the object data, and generally defines the state of an instance of an object at a given instance in time. Thus, the computational state data may change over time and may be impacted by the actions of one or more users and/or programmers maintaining the system 10. As a user impacts the computational state data (or other data comprising the digital worlds), the user directly alters or otherwise manipulates the digital world. If the digital world is shared with, or interfaced by, other users, the actions of the user may affect what is experienced by other users interacting with the digital world. Thus, in some embodiments, changes to the digital world made by a user will be experienced by other users interfacing with the system 10.

The data stored in one or more servers 11 within the computing network 5 is, in one embodiment, transmitted or deployed at a high-speed, and with low latency, to one or more user devices 12 and/or gateway components 14. In one embodiment, object data shared by servers may be complete or may be compressed, and contain instructions for recreating the full object data on the user side, rendered and visualized by the user's local computing device (e.g., gateway 14 and/or user device 12). Software running on the servers 11 of the computing network 5 may, in some embodiments, adapt the data it generates and sends to a particular user's device 12 for objects within the digital world (or any other data exchanged by the computing network 5 as a function of the user's specific device and bandwidth.

For example, when a user interacts with the digital world or map through a user device 12, a server 11 may recognize the specific type of device being used by the user, the device's connectivity and/or available bandwidth between the user device and server, and appropriately size and balance the data being delivered to the device to optimize the user interaction. An example of this may include reducing the size of the transmitted data to a low resolution quality, such that the data may be displayed on a particular user device having a low resolution display. In a preferred embodiment, the computing network 5 and/or gateway component 14 deliver data to the user device 12 at a rate sufficient to present an interface operating at 15 frames/second or higher, and at a resolution that is high definition quality or greater.

The gateway 14 provides local connection to the computing network 5 for one or more users. In some embodiments, it may be implemented by a downloadable software application that runs on the user device 12 or another local device, such as that shown in FIG. 2. In other embodiments, it may be implemented by a hardware component (with appropriate software/firmware stored on the component, the component having a processor) that is either in communication with, but not incorporated with or attracted to, the user device 12, or incorporated with the user device 12. The gateway 14 communicates with the computing network 5 via the data network 13, and provides data exchange between the computing network 5 and one or more local user devices 12. As discussed in greater detail below, the gateway component 14 may include software, firmware, memory, and processing circuitry, and may be capable of processing data communicated between the network 5 and one or more local user devices 12.

In some embodiments, the gateway component 14 monitors and regulates the rate of the data exchanged between the user device 12 and the computer network 5 to allow optimum data processing capabilities for the particular user device 12. For example, in some embodiments, the gateway 14 buffers and downloads both static and dynamic aspects of a digital world, even those that are beyond the field of view presented to the user through an interface connected with the user device. In such an embodiment, instances of static objects (structured data, software implemented methods, or both) may be stored in memory (local to the gateway component 14, the user device 12, or both) and are referenced against the local user's current position, as indicated by data provided by the computing network 5 and/or the user's device 12.

Instances of dynamic objects, which may include, for example, intelligent software agents and objects controlled by other users and/or the local user, are stored in a high-speed memory buffer. Dynamic objects representing a two-dimensional or three-dimensional object within the scene presented to a user can be, for example, broken down into component shapes, such as a static shape that is moving but is not changing, and a dynamic shape that is changing. The part of the dynamic object that is changing can be updated by a real-time, threaded high priority data stream from a server 11, through computing network 5, managed by the gateway component 14.

As one example of a prioritized threaded data stream, data that is within a 60 degree field-of-view of the user's eye may be given higher priority than data that is more peripheral. Another example includes prioritizing dynamic characters and/or objects within the user's field-of-view over static objects in the background.

In addition to managing a data connection between the computing network 5 and a user device 12, the gateway component 14 may store and/or process data that may be presented to the user device 12. For example, the gateway component 14 may, in some embodiments, receive compressed data describing, for example, graphical objects to be rendered for viewing by a user, from the computing network 5 and perform advanced rendering techniques to alleviate the data load transmitted to the user device 12 from the computing network 5. In another example, in which gateway 14 is a separate device, the gateway 14 may store and/or process data for a local instance of an object rather than transmitting the data to the computing network 5 for processing.

Figure 3:
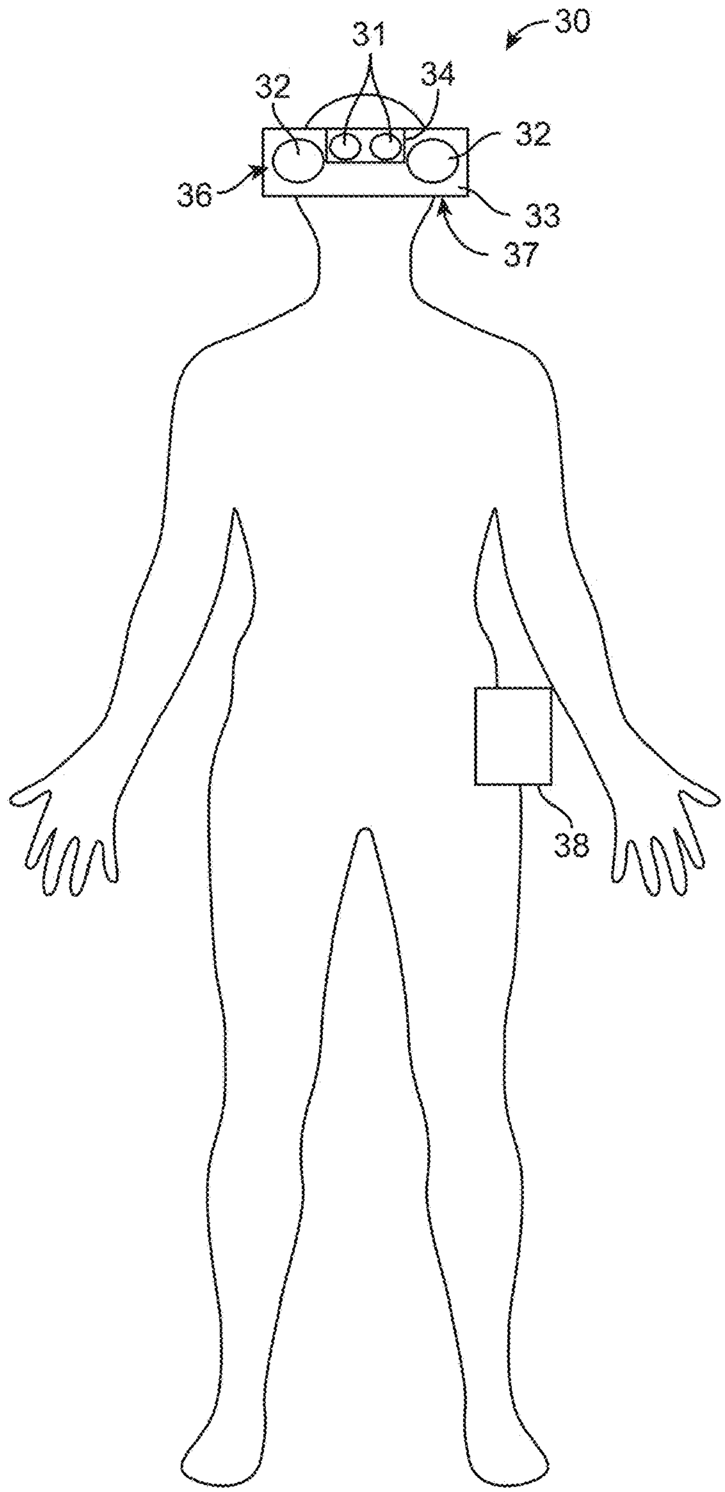
FIG. 3 illustrates a plan view of an example AR device mounted on a user's head, according to one illustrated embodiment.

Referring now to FIG. 3, virtual worlds may be experienced by one or more users in various formats that may depend upon the capabilities of the user's device. In some embodiments, the user device 12 may include, for example, a smart phone, tablet device, head-mounted display (HMD), gaming console, or a wearable device. Generally, the user device will include a processor for executing program code stored in memory on the device, coupled with a display, and a communications interface.

Figure 1:
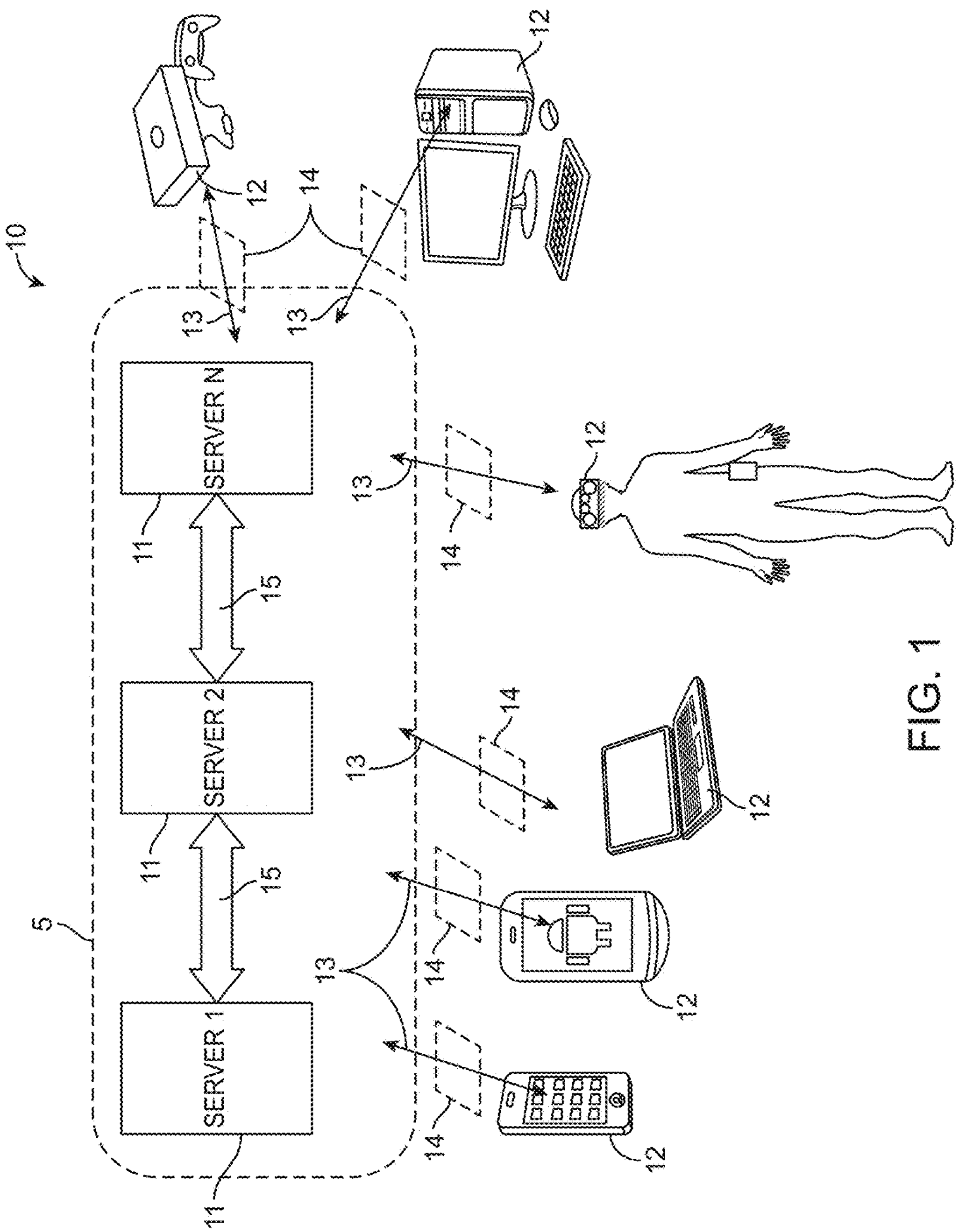
FIG. 1 illustrates a system architecture of an augmented reality (AR) system interacting with one or more servers, according one illustrated embodiment.

An example embodiment of a user device is illustrated in FIG. 3, wherein the user device comprises a mobile, wearable device, namely a head-mounted display system 30. In accordance with an embodiment of the present disclosure, the head-mounted display system 30 includes a user interface 37, user-sensing system 34, environment-sensing system 36, and a processor 38. Although the processor 38 is shown in FIG. 3 as an isolated component separate from the head-mounted system 30, in an alternate embodiment, the processor 38 may be integrated with one or more components of the head-mounted system 30, or may be integrated into other system 10 components such as, for example, the gateway 14, as shown in FIG. 1 and FIG. 2.

The user device 30 presents to the user an interface 37 for interacting with and experiencing a digital world. Such interaction may involve the user and the digital world, one or more other users interfacing the system 10, and objects within the digital world. The interface 37 generally provides image and/or audio sensory input (and in some embodiments, physical sensory input) to the user. Thus, the interface 37 may include speakers (not shown) and a display component 33 capable, in some embodiments, of enabling stereoscopic 3D viewing and/or 3D viewing which embodies more natural characteristics of the human vision system.

In some embodiments, the display component 33 may comprise a transparent interface (such as a clear OLED) which, when in an "off" setting, enables an optically correct view of the physical environment around the user with little-to-no optical distortion or computing overlay. As discussed in greater detail below, the interface 37 may include additional settings that allow for a variety of visual/interface performance and functionality.

The user-sensing system 34 may include, in some embodiments, one or more sensors 31 operable to detect certain features, characteristics, or information related to the individual user wearing the system 30. For example, in some embodiments, the sensors 31 may include a camera or optical detection/scanning circuitry capable of detecting real-time optical characteristics/measurements of the user.

The real-time optical characteristics/measurements of the user may, for example, be one or more of the following: pupil constriction/dilation, angular measurement/positioning of each pupil, spherocity, eye shape (as eye shape changes over time) and other anatomic data. This data may provide, or be used to calculate, information (e.g., the user's visual focal point) that may be used by the head-mounted system 30 and/or interface system 10 to optimize the user's viewing experience. For example, in one embodiment, the sensors 31 may each measure a rate of pupil contraction for each of the user's eyes. This data may be transmitted to the processor 38 (or the gateway component 14 or to a server 11), wherein the data is used to determine, for example, the user's reaction to a brightness setting of the interface display 33.

The interface 37 may be adjusted in accordance with the user's reaction by, for example, dimming the display 33 if the user's reaction indicates that the brightness level of the display 33 is too high. The user-sensing system 34 may include other components other than those discussed above or illustrated in FIG. 3. For example, in some embodiments, the user-sensing system 34 may include a microphone for receiving voice input from the user. The user sensing system 34 may also include one or more infrared camera sensors, one or more visible spectrum camera sensors, structured light emitters and/or sensors, infrared light emitters, coherent light emitters and/or sensors, gyros, accelerometers, magnetometers, proximity sensors, GPS sensors, ultrasonic emitters and detectors and haptic interfaces.

The environment-sensing system 36 includes one or more sensors 32 for obtaining data from the physical environment around a user. Objects or information detected by the sensors may be provided as input to the user device. In some embodiments, this input may represent user interaction with the virtual world. For example, a user viewing a virtual keyboard on a desk may gesture with fingers as if typing on the virtual keyboard. The motion of the fingers moving may be captured by the sensors 32 and provided to the user device or system as input, wherein the input may be used to change the virtual world or create new virtual objects.

For example, the motion of the fingers may be recognized (e.g., using a software program of the processor, etc.) as typing, and the recognized gesture of typing may be combined with the known location of the virtual keys on the virtual keyboard. The system may then render a virtual monitor displayed to the user (or other users interfacing the system) wherein the virtual monitor displays the text being typed by the user.

The sensors 32 may include, for example, a generally outward-facing camera or a scanner for interpreting scene information, for example, through continuously and/or intermittently projected infrared structured light. The environment-sensing system (36) may be used for mapping one or more elements of the physical environment around the user by detecting and registering the local environment, including static objects, dynamic objects, people, gestures and various lighting, atmospheric and acoustic conditions. Thus, in some embodiments, the environment-sensing system (36) may include image-based 3D reconstruction software embedded in a local computing system (e.g., gateway component 14 or processor 38) and operable to digitally reconstruct one or more objects or information detected by the sensors 32.

In one example embodiment, the environment-sensing system 36 provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors.

It should be appreciated that the environment-sensing system 36 may include other components other than those discussed above or illustrated in FIG. 3. For example, in some embodiments, the environment-sensing system 36 may include a microphone for receiving audio from the local environment. The user sensing system (36) may also include one or more infrared camera sensors, one or more visible spectrum camera sensors, structure light emitters and/or sensors, infrared light emitters, coherent light emitters and/or sensors gyros, accelerometers, magnetometers, proximity sensors, GPS sensors, ultrasonic emitters and detectors and haptic interfaces.

As discussed above, the processor 38 may, in some embodiments, be integrated with other components of the head-mounted system 30, integrated with other components of the interface system 10, or may be an isolated device (wearable or separate from the user) as shown in FIG. 3. The processor 38 may be connected to various components of the head-mounted system 30 and/or components of the interface system 10 through a physical, wired connection, or through a wireless connection such as, for example, mobile network connections (including cellular telephone and data networks), Wi-Fi or Bluetooth.

In one or more embodiments, the processor 38 may include a memory module, integrated and/or additional graphics processing unit, wireless and/or wired internet connectivity, and codec and/or firmware capable of transforming data from a source (e.g., the computing network 5, the user-sensing system 34, the environment-sensing system 36, or the gateway component 14) into image and audio data, wherein the images/video and audio may be presented to the user via the interface 37.

In one or more embodiments, the processor 38 handles data processing for the various components of the head-mounted system 30 as well as data exchange between the head-mounted system 30 and the gateway component 14 and, in some embodiments, the computing network 5. For example, the processor 38 may be used to buffer and process data streaming between the user and the computing network 5, thereby enabling a smooth, continuous and high fidelity user experience.

In some embodiments, the processor 38 may process data at a rate sufficient to achieve anywhere between 8 frames/second at 320×240 resolution to 24 frames/second at high definition resolution (1280×720), or greater, such as 60-120 frames/second and 4 k resolution and higher (10 k+resolution and 50,000 frames/second). Additionally, the processor 38 may store and/or process data that may be presented to the user, rather than streamed in real-time from the computing network 5.

For example, the processor 38 may, in some embodiments, receive compressed data from the computing network 5 and perform advanced rendering techniques (such as lighting or shading) to alleviate the data load transmitted to the user device 12 from the computing network 5. In another example, the processor 38 may store and/or process local object data rather than transmitting the data to the gateway component 14 or to the computing network 5.

The head-mounted system 30 may, in some embodiments, include various settings, or modes, that allow for a variety of visual/interface performance and functionality. The modes may be selected manually by the user, or automatically by components of the head-mounted system 30 or the gateway component 14. As previously described, one example mode of the head-mounted system 30 includes an "off" mode, wherein the interface 37 provides substantially no digital or virtual content. In the off mode, the display component 33 may be transparent, thereby enabling an optically correct view of the physical environment around the user with little-to-no optical distortion or computing overlay.

In one example embodiment, the head-mounted system 30 includes an "augmented" mode, wherein the interface 37 provides an augmented reality interface. In the augmented mode, the interface display 33 may be substantially transparent, thereby allowing the user to view the local, physical environment. At the same time, virtual object data provided by the computing network 5, the processor 38, and/or the gateway component 14 is presented on the display 33 in combination with the physical, local environment. The following section will go through various embodiments of example head-mounted user systems that may be used for virtual and augmented reality purposes.

User Systems

Referring to FIGS. 4A-4D, some general componentry options are illustrated. In the portions of the detailed description which follow the discussion of FIGS. 4A-4D, various systems, subsystems, and components are presented for addressing the objectives of providing a high-quality, comfortably-perceived display system for human VR and/or AR.

Figure 4A:
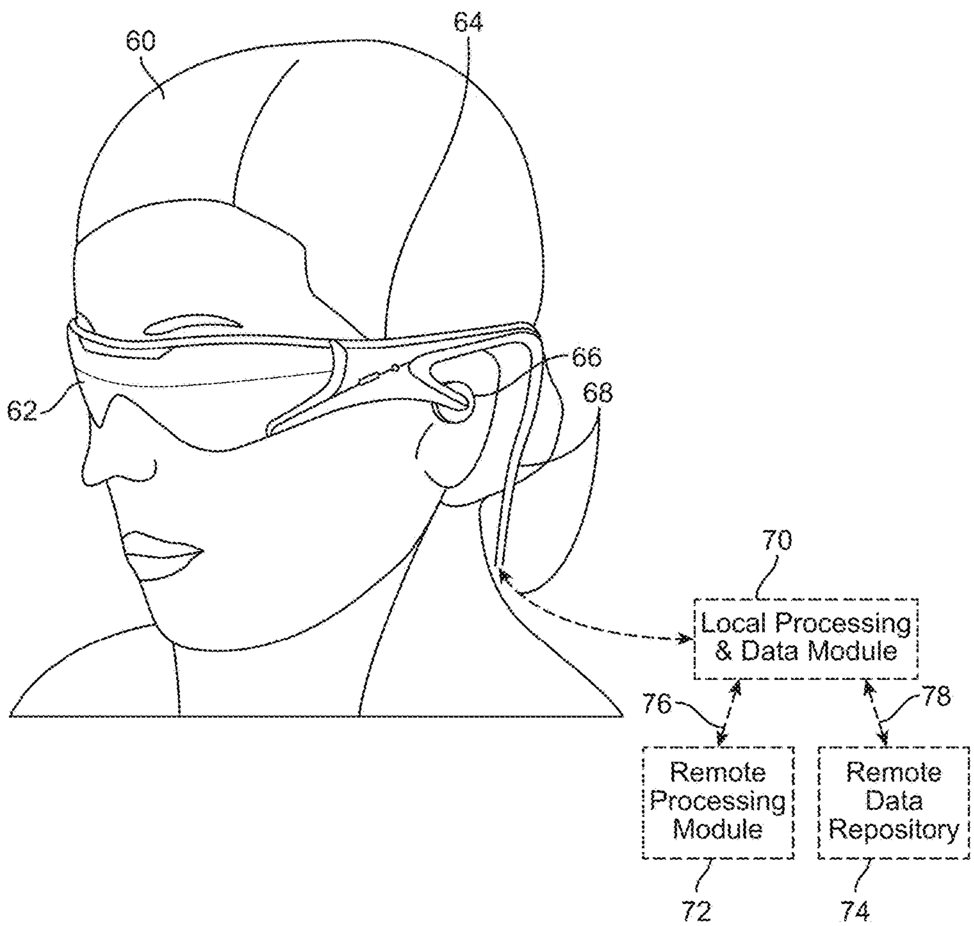
FIGS. 4A-4D illustrate one or more embodiments of various internal processing components of the wearable AR device.
Figure 4B:
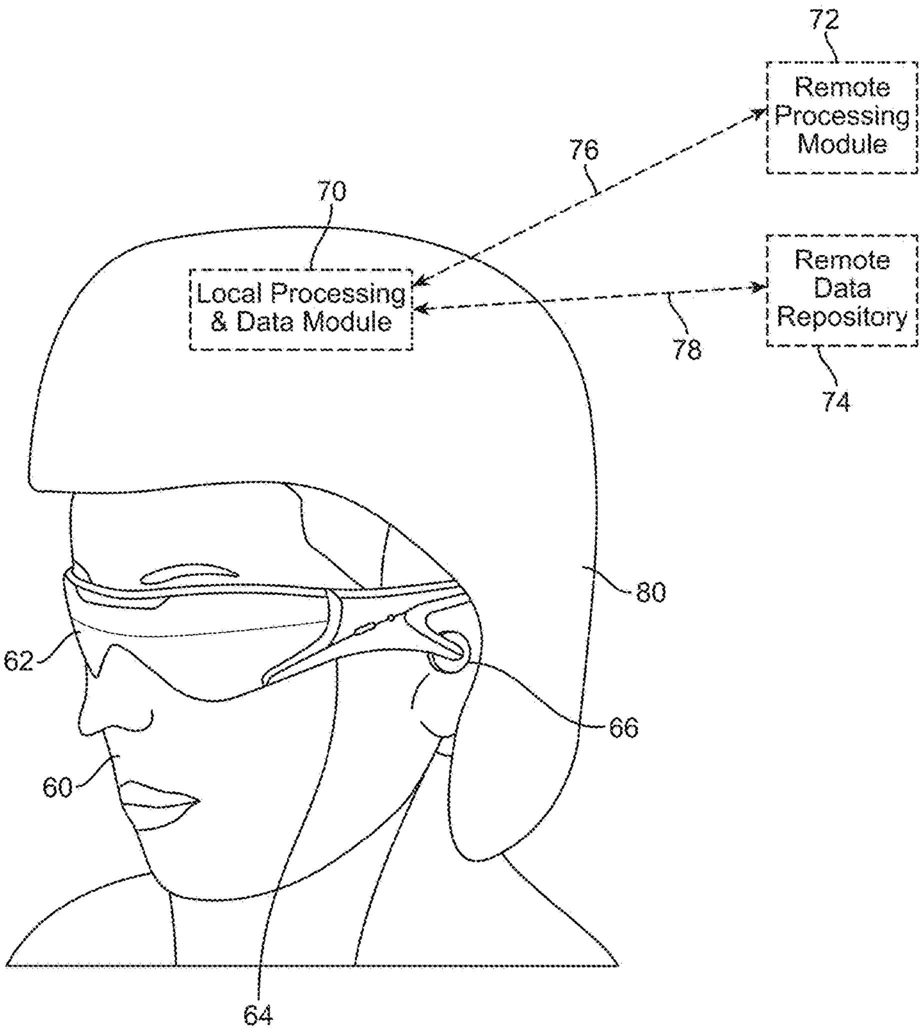
Figure 4C:
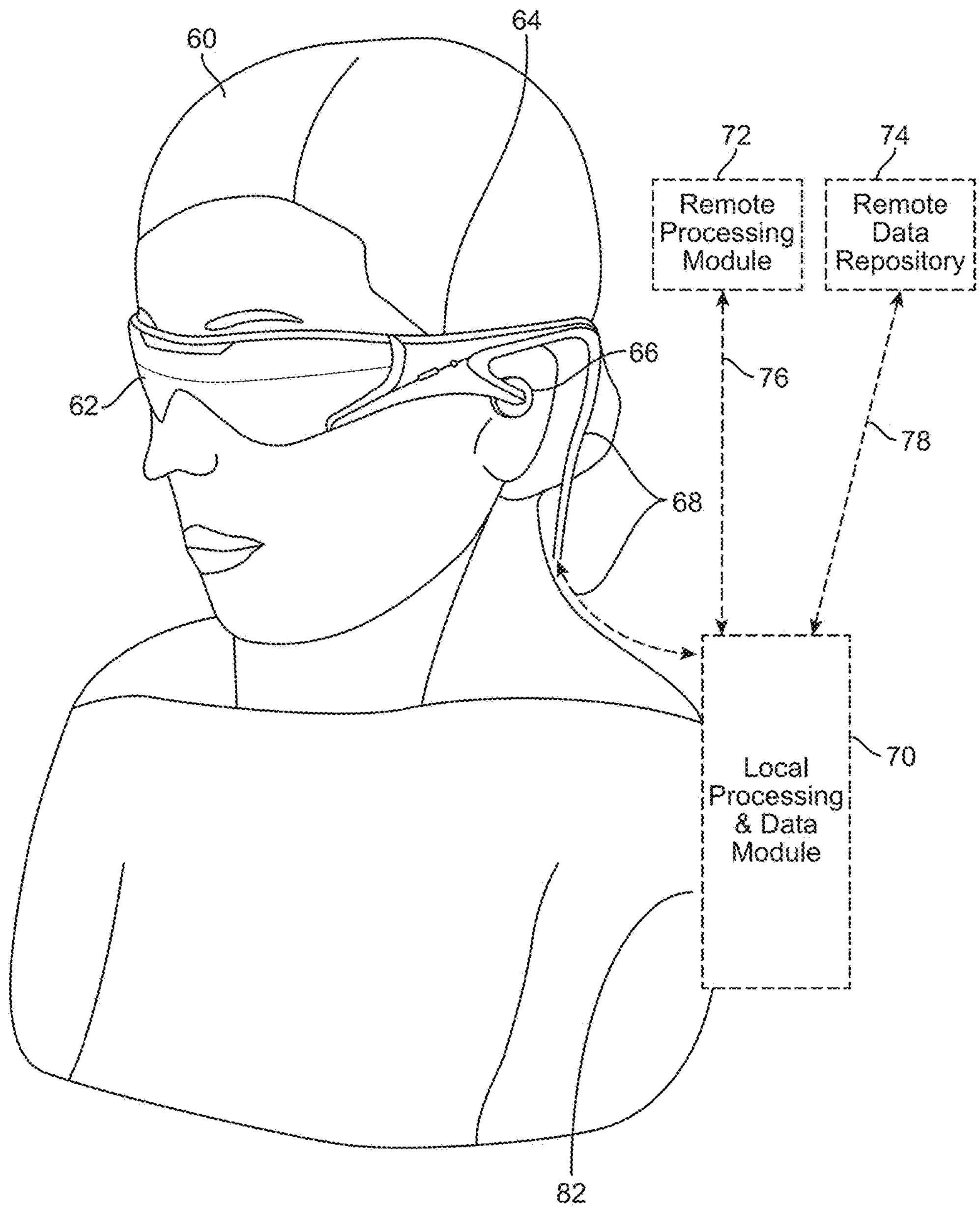
Figure 4D:
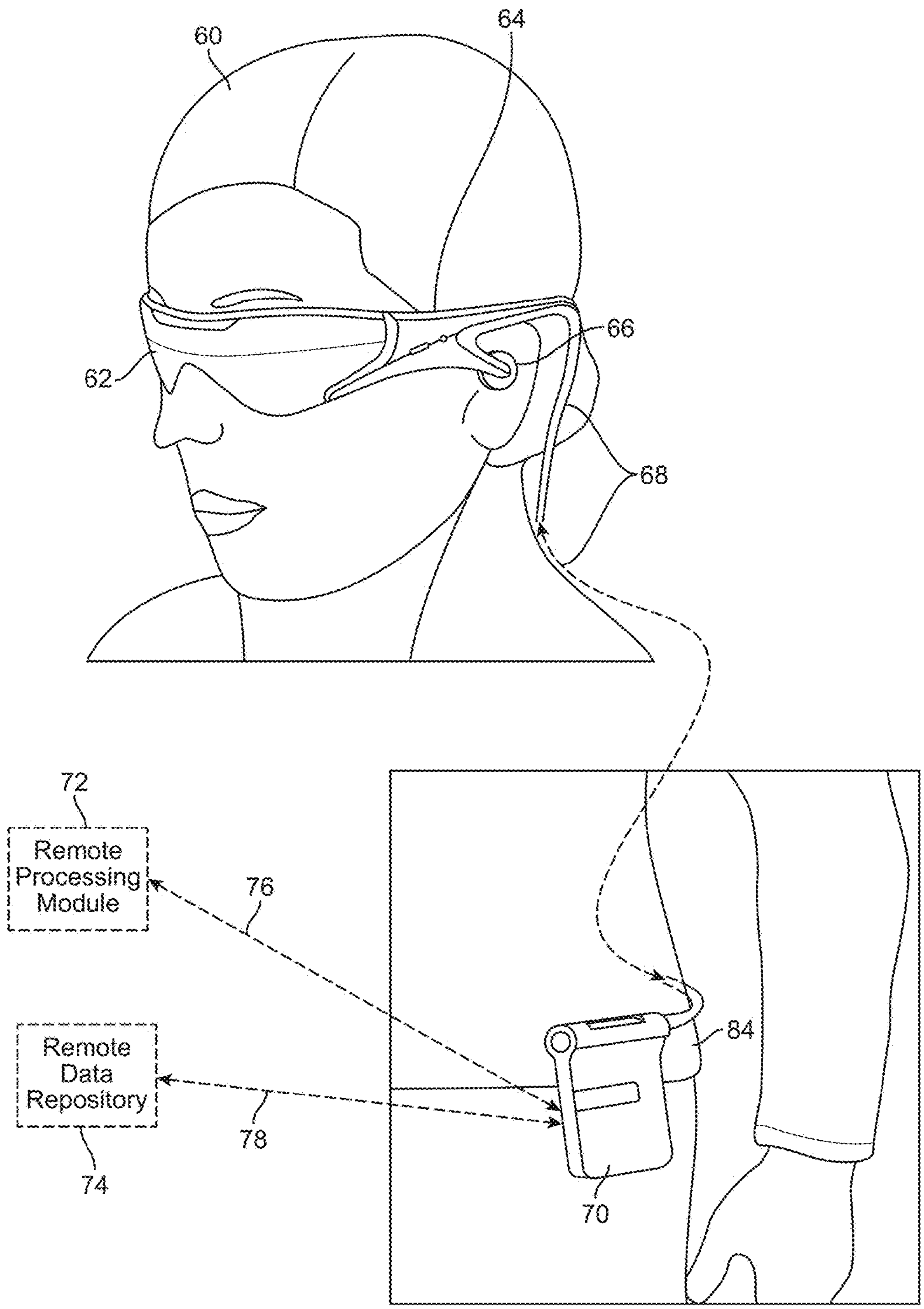

As shown in FIG. 4A, a user 60 of a head-mounted augmented reality system ("AR system") is depicted wearing a frame 64 structure coupled to a display system 62 positioned in front of the eyes of the user. A speaker 66 is coupled to the frame 64 in the depicted configuration and positioned adjacent the ear canal of the user 60 (in one embodiment, another speaker, not shown, is positioned adjacent the other ear canal of the user to provide for stereo/shapeable sound control). The display 62 is operatively coupled 68, such as by a wired lead or wireless connectivity, to a local processing and data module 70 which may be mounted in a variety of configurations, such as fixedly attached to the frame 64, fixedly attached to a helmet or hat 80 as shown in the embodiment of FIG. 4B, embedded in headphones, removably attached to the torso 82 of the user 60 in a configuration (e.g., placed in a backpack (not shown)) as shown in the embodiment of FIG. 4C, or removably attached to the hip 84 of the user 60 in a belt-coupling style configuration as shown in the embodiment of FIG. 4D.

The local processing and data module 70 may comprise a power-efficient processor or controller, as well as digital memory, such as flash memory, both of which may be utilized to assist in the processing, caching, and storage of data (a) captured from sensors which may be operatively coupled to the frame 64, such as image capture devices (such as cameras), microphones, inertial measurement units, accelerometers, compasses, GPS units, radio devices, and/or gyros; and/or (b) acquired and/or processed using the remote processing module 72 and/or remote data repository 74, possibly for passage to the display 62 after such processing or retrieval.

The local processing and data module 70 may be operatively coupled (76, 78), such as via a wired or wireless communication links, to the remote processing module 72 and remote data repository 74 such that these remote modules (72, 74) are operatively coupled to each other and available as resources to the local processing and data module 70. The processing module 70 may control the optical systems and other systems of the AR system, and execute one or more computing tasks, including retrieving data from the memory or one or more databases (e.g., a cloud-based server) in order to provide virtual content to the user.

In one embodiment, the remote processing module 72 may comprise one or more relatively powerful processors or controllers configured to analyze and process data and/or image information. In one embodiment, the remote data repository 74 may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Optical Embodiments

It should be appreciated that there may be many approaches in presenting 3D virtual content to the user's eyes through optical elements of the head-mounted user device. The following example embodiments may be used in combination with other approaches, and should not be read in a restrictive sense. The following example embodiments represent some example optical systems that may be integrated with the head-mounted user device (30) to allow the user to view virtual content in a comfortable and accommodation-friendly manner.

Referring to FIGS. 5A through 22Y, various display configurations are presented that are designed to present the human eyes with photon-based radiation patterns that can be comfortably perceived as augmentations to physical reality, with high-levels of image quality and three-dimensional perception, as well as being capable of presenting two-dimensional content.

Figure 5A:
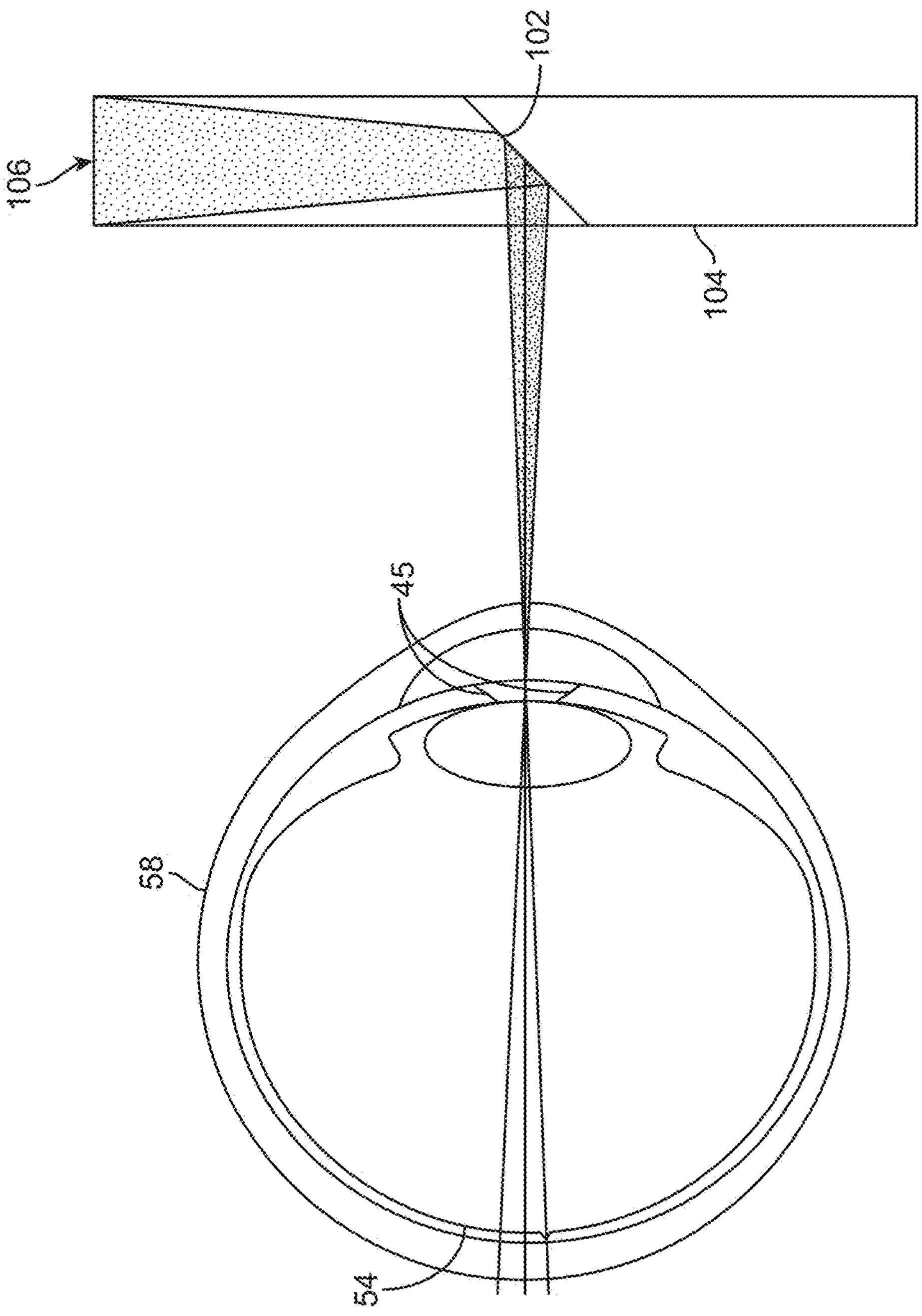
FIGS. 5A-5H illustrate embodiments of transmitting focused light to a user through a transmissive beamsplitter substrate.

Referring to FIG. 5A, in a simplified example, a transmissive beamsplitter substrate 104 with a 45-degree reflecting surface 102 directs incoming radiation 106, which may be output from a lens (not shown), through the pupil 45 of the eye 58 and to the retina 54. The field of view for such a system is limited by the geometry of the beamsplitter 104. To accommodate comfortable viewing with minimal hardware, in one embodiment, a larger field of view can be created by aggregating the outputs/reflections of various different reflective and/or diffractive surfaces. This may be achieved by using, e.g., a frame-sequential configuration in which the eye 58 is presented with a sequence of frames at high frequency that provides the perception of a single coherent scene.

As an alternative to, or in addition to, presenting different image data via different reflectors in a time-sequential fashion, the reflectors may separate content by other means, such as polarization selectivity or wavelength selectivity. In addition to being capable of relaying two-dimensional images, the reflectors may also relay the three-dimensional wavefronts associated with true-three-dimensional viewing of actual physical objects.

Figure 5B:
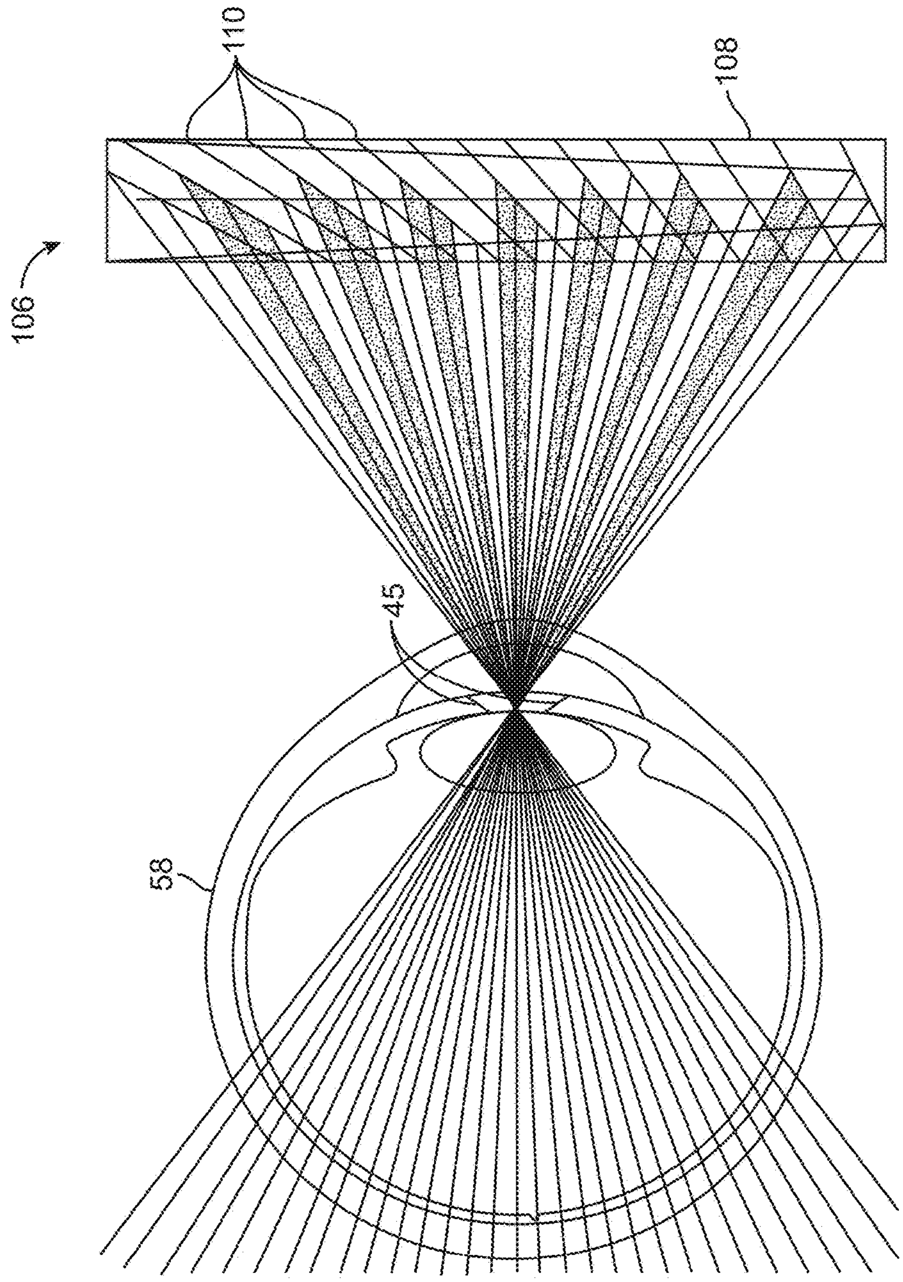

Referring to FIG. 5B, a substrate 108 comprising a plurality of reflectors at a plurality of angles 110 is shown, with each reflector actively reflecting in the depicted configuration for illustrative purposes. The reflectors may comprise switchable elements to facilitate temporal selectivity. In one embodiment, the reflective surfaces may be intentionally and sequentially activated with frame-sequential input information 106, in which each reflective surface presents a narrow field of view sub-image which is tiled with other narrow field of view sub-images presented by the other reflective surfaces to form a composite wide field of view image.

Figure 5C:
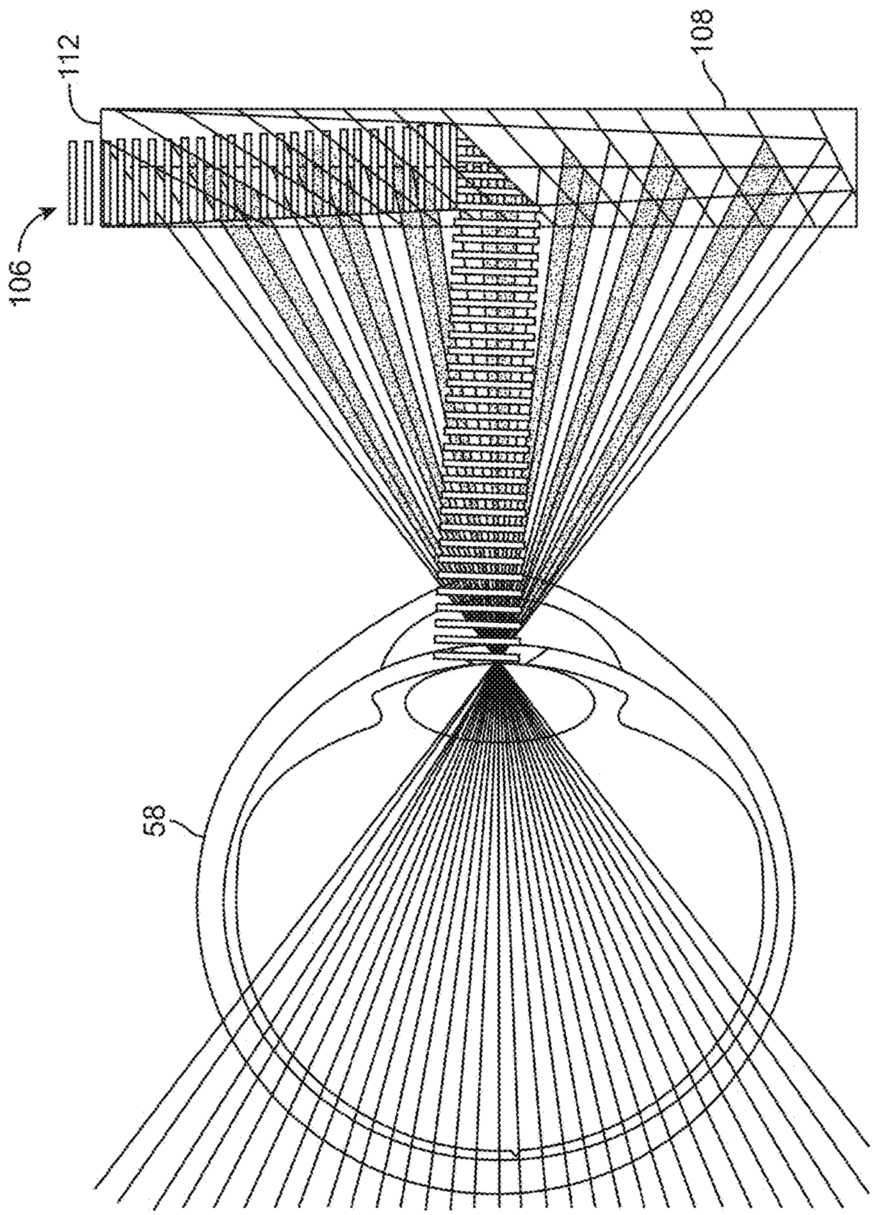
Figure 5D:
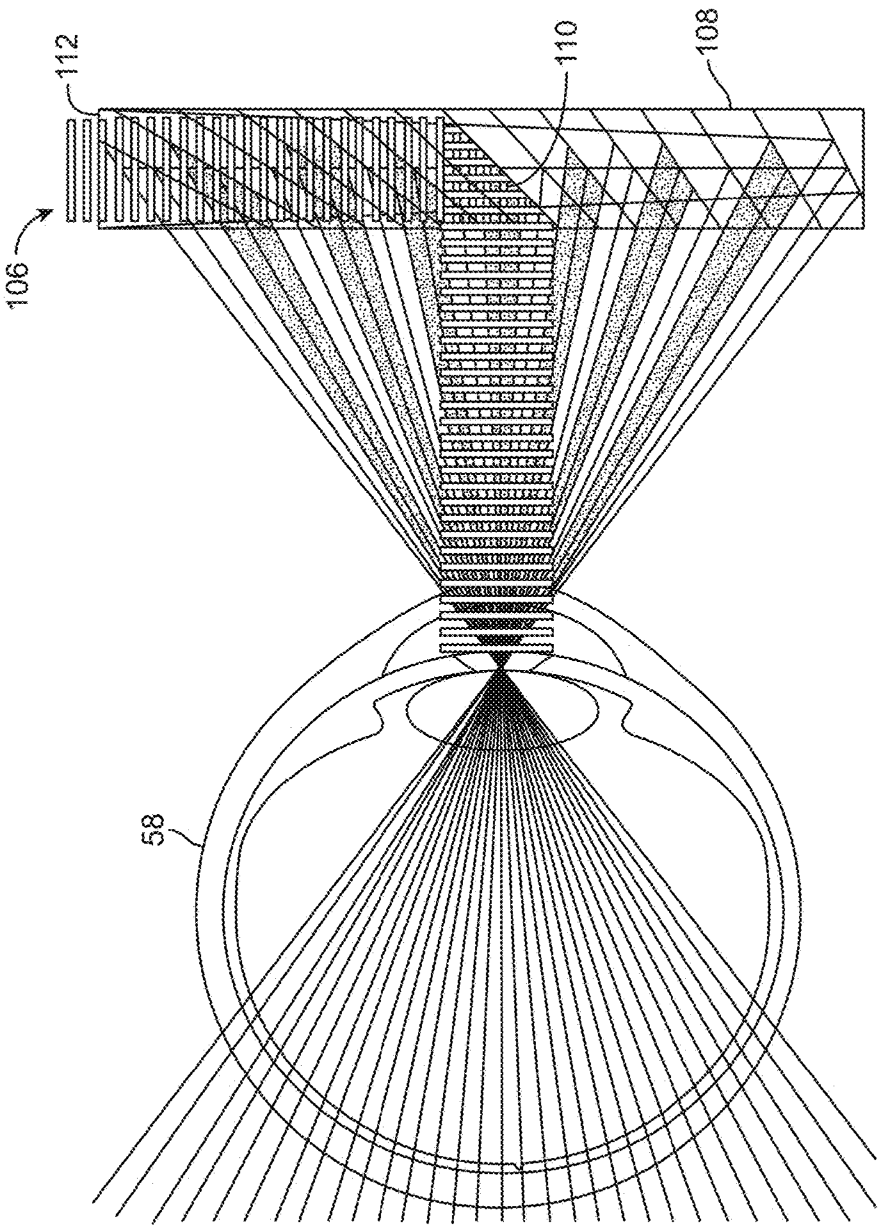
Figure 5E:
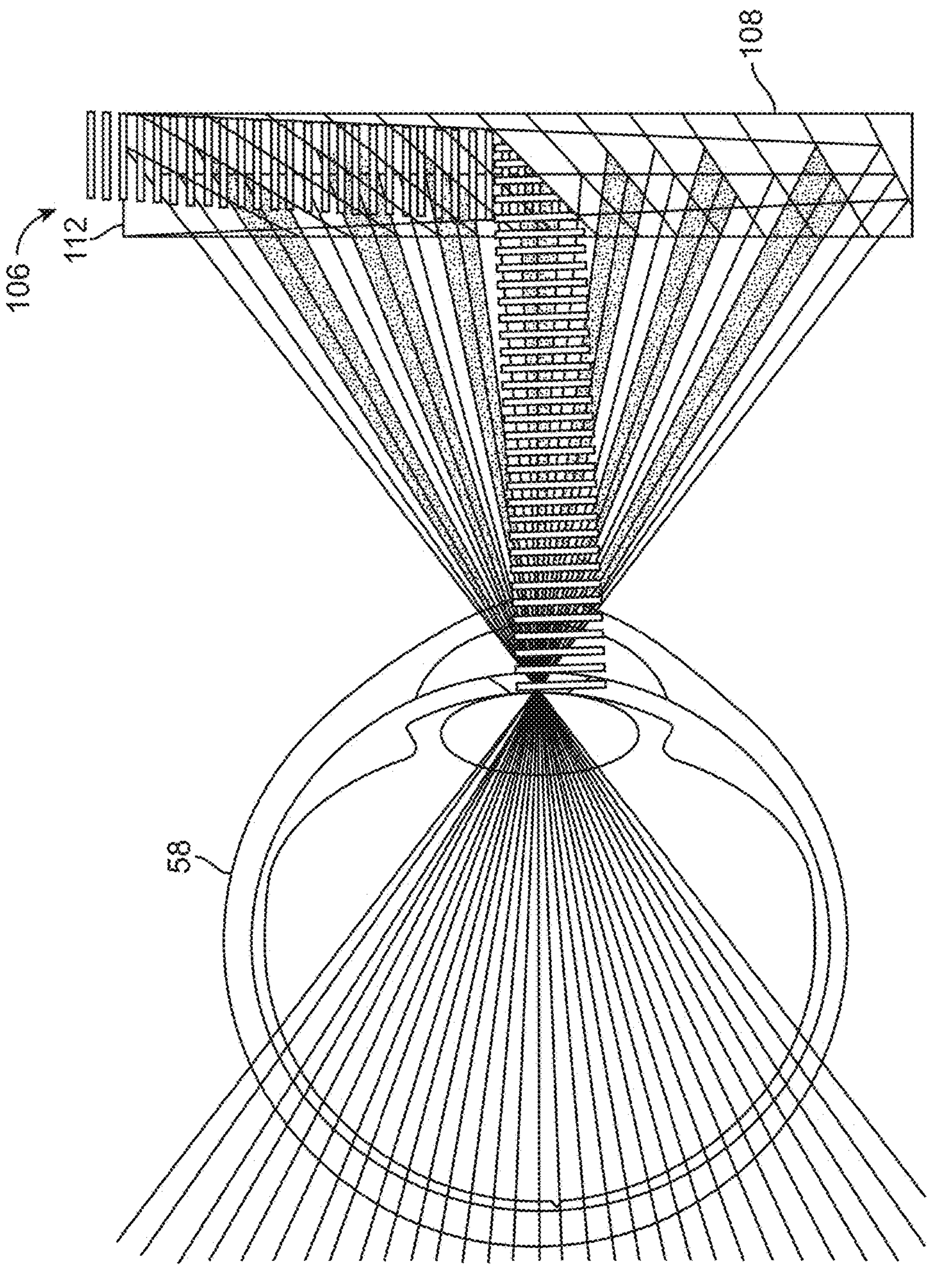

For example, referring to FIGS. 5C, 5D, and 5E, surface 110 (e.g., at the middle of substrate 108), is switched "on" to a reflecting state, such that it reflects incoming image information 106 to present a relatively narrow field of view sub-image in the middle of a larger field of view, while the other potential reflective surfaces are in a transmissive state.

Referring to FIG. 5C, incoming image information 106 coming from the right of the narrow field of view sub-image (as shown by the angle of incoming beams 106 relative to the substrate 108 at the input interface 112, and the resultant angle at which they exit the substrate 108) is reflected toward the eye 58 from reflective surface 110. FIG. 5D illustrates the same reflector 110 as being active, with image information coming from the middle of the narrow field of view sub-image, as shown by the angle of the input information 106 at the input interface 112 and its angle as it exits substrate 108.

Figure 5F:
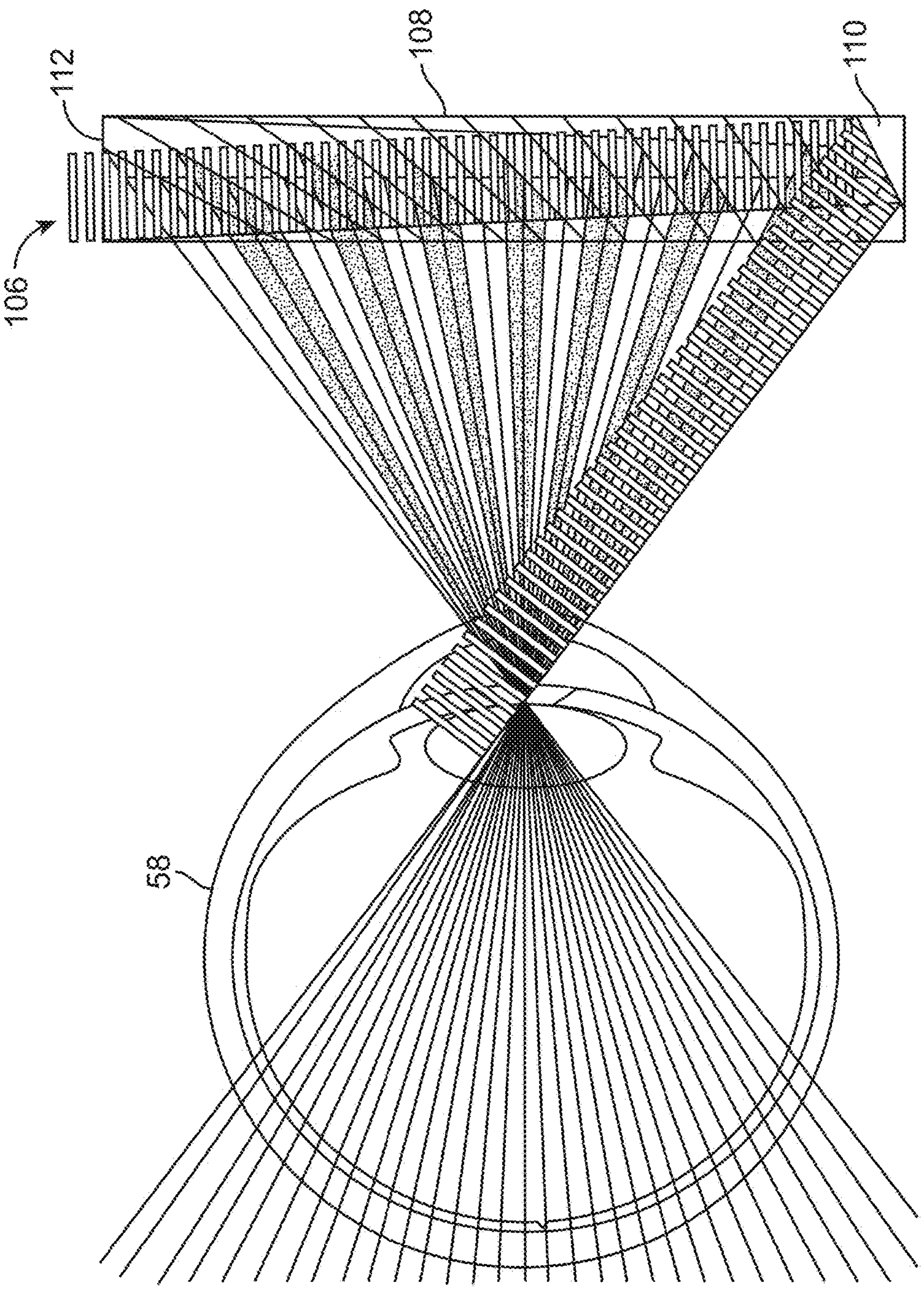

FIG. 5E illustrates the same reflector 110 active, with image information coming from the left of the field of view, as shown by the angle of the input information 106 at the input interface 112 and the resultant exit angle at the surface of the substrate 108. FIG. 5F illustrates a configuration wherein the bottom reflector 110 is active, with image information 106 coming in from the far right of the overall field of view. For example, FIGS. 5C, 5D, and 5E can illustrate one frame representing the center of a frame-sequential tiled image, and FIG. 5F can illustrate a second frame representing the far right of that tiled image.

In one embodiment, the light carrying the image information 106 may strike the reflective surface 110 directly after entering substrate 108 at input interface 112, without first reflecting from the surfaces of substrate 108. In one embodiment, the light carrying the image information 106 may reflect from one or more surfaces of substrate 108 after entering at input interface 112 and before striking the reflective surface 110. For instance, substrate 108 may act as a planar waveguide, propagating the light carrying image information 106 by total internal reflection. Light may also reflect from one or more surfaces of the substrate 108 from a partially reflective coating, a wavelength-selective coating, an angle-selective coating, and/or a polarization-selective coating.

In one embodiment, the angled reflectors may be constructed using an electro-active material, such that upon application of a voltage and/or current to a particular reflector, the refractive index of the material comprising such reflector changes from an index substantially matched to the rest of the substrate 108. When the refractive index matches that of the rest of the substrate 108, the reflector is in a transmissive configuration. When the refractive index does not match that of the rest of the substrate 108, the reflector is in reflective configuration such that a reflection effect is created. Example electro-active material includes lithium niobate and electro-active polymers. Suitable substantially transparent electrodes for controlling a plurality of such reflectors may comprise materials such as indium tin oxide, which is utilized in liquid crystal displays.

In one embodiment, the electro-active reflectors 110 may comprise liquid crystal, embedded in a substrate 108 host medium such as glass or plastic. In some variations, liquid crystal may be selected that changes refractive index as a function of an applied electric signal, so that more analog changes may be accomplished as opposed to binary (from one transmissive state to one reflective state). In an embodiment wherein 6 sub-images are to be presented to the eye frame-sequential to form a large tiled image with an overall refresh rate of 60 frames per second, it is desirable to have an input display that can refresh at the rate of about 360 Hz, with an electro-active reflector array that can keep up with such frequency.

In one embodiment, lithium niobate may be utilized as an electro-active reflective material as opposed to liquid crystal: lithium niobate is utilized in the photonics industry for high-speed switches and fiber optic networks and has the capability to switch refractive index in response to an applied voltage at a very high frequency. This high frequency may be used to steer line-sequential or pixel-sequential sub-image information, especially if the input display is a scanned light display, such as a fiber-scanned display or scanning mirror-based display.

In another embodiment, a variable switchable angled mirror configuration may comprise one or more high-speed mechanically repositionable reflective surfaces, such as a MEMS (micro-electro-mechanical system) device. A MEMS device may include what is known as a "digital mirror device", or "DMD", (often part of a "digital light processing", or "DLP" system, such as those available from Texas Instruments, Inc.). In another electromechanical embodiment, a plurality of air-gapped (or in vacuum) reflective surfaces could be mechanically moved in and out of place at high frequency. In another electromechanical embodiment, a single reflective surface may be moved up and down and re-pitched at very high frequency.

Figure 5G:
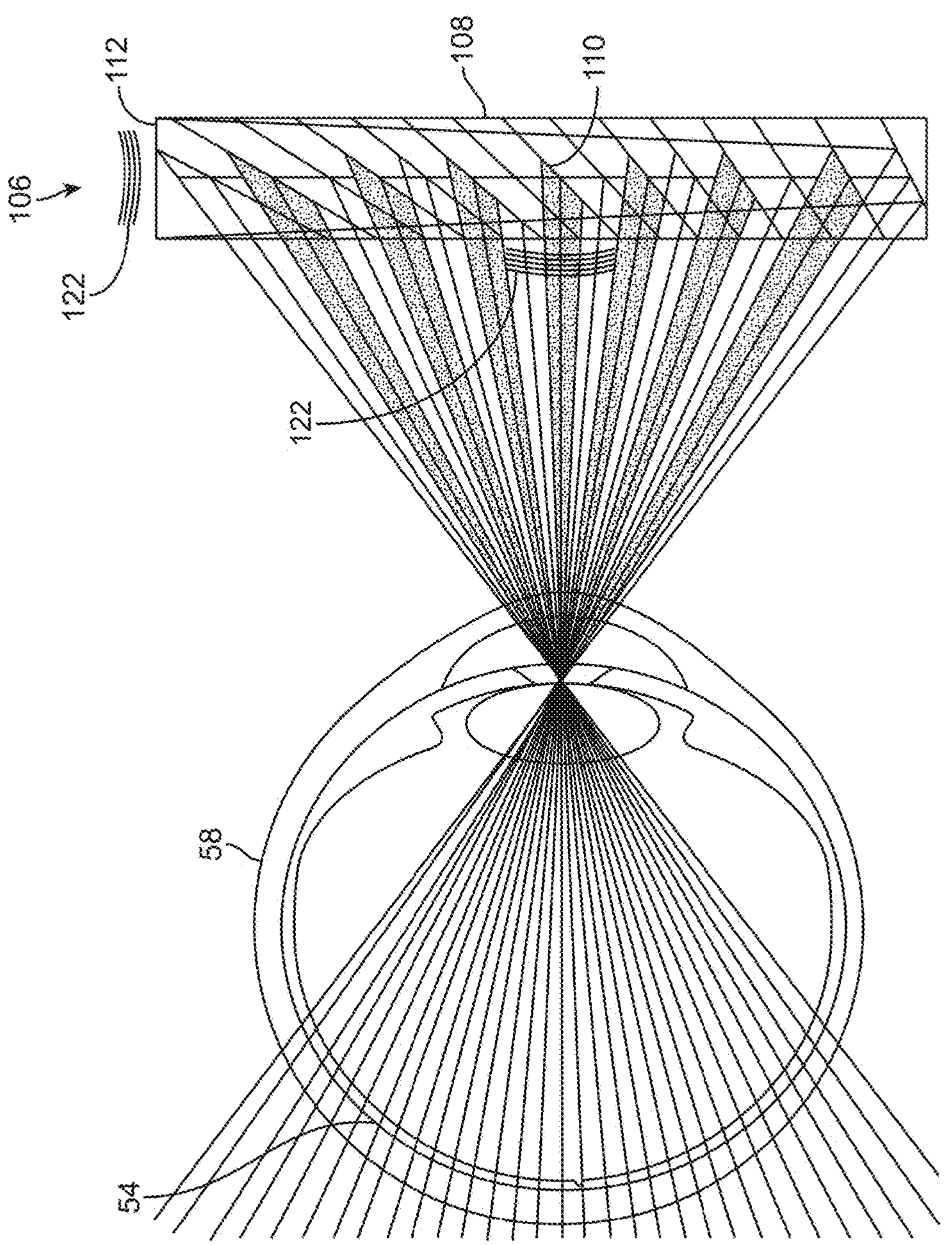

Referring to FIG. 5G, it is notable that the switchable variable angle reflector configurations described herein are capable of passing not only collimated or flat wavefront information to the retina 54 of the eye 58, but also a curved wavefront 122 image information, as shown in the illustration of FIG. 5G. This generally is not the case with other waveguide-based configurations, wherein total internal reflection of curved wavefront information causes undesirable complications, and therefore the inputs generally must be collimated. The ability to pass curved wavefront information facilitates the ability of configurations such as those shown in FIGS. 5B-5H to provide the retina 54 with input perceived as focused at various distances from the eye 58, not just optical infinity (which would be the interpretation of collimated light absent other cues).

Figure 5H:
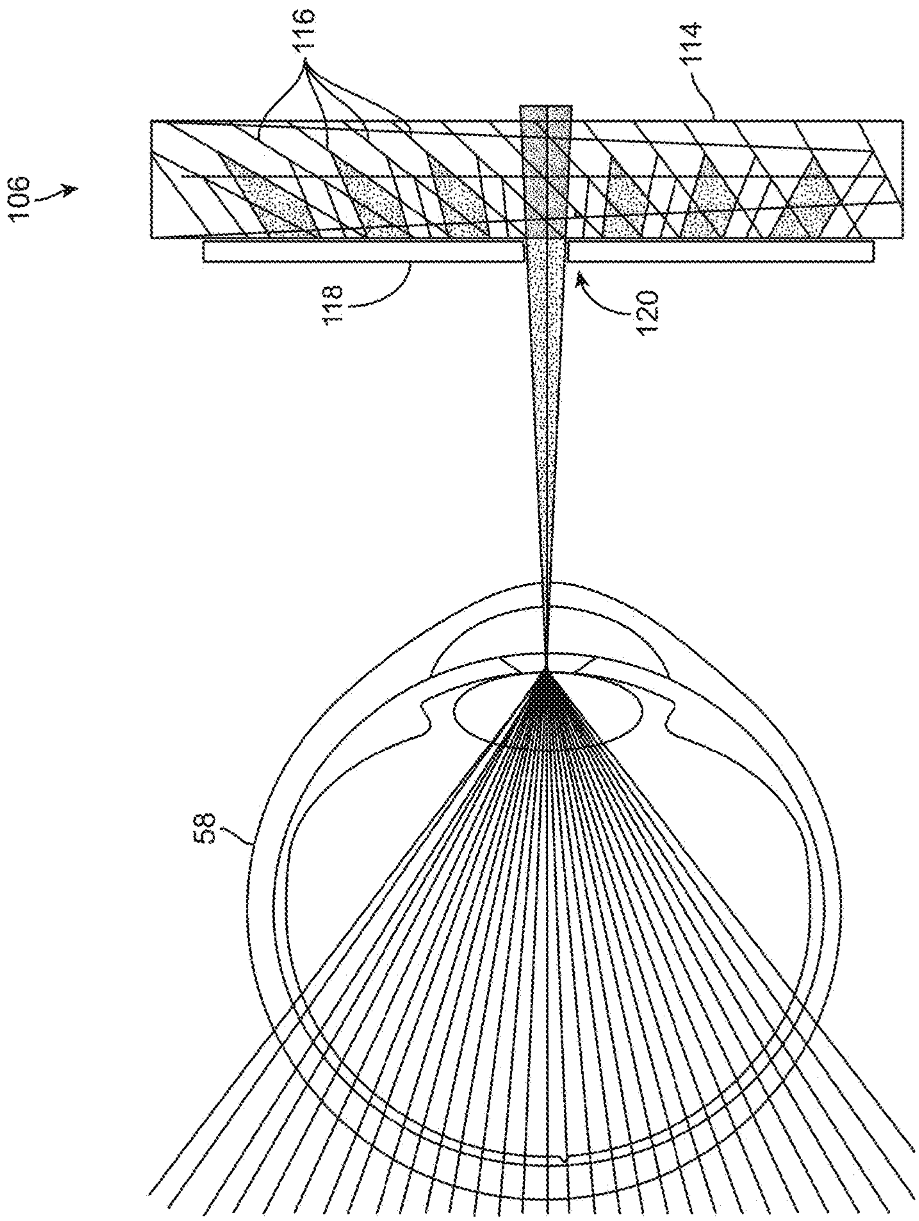

Referring to FIG. 5H, in another embodiment, an array of static partially reflective surfaces 116 (e.g., always in a reflective mode; in another embodiment, they may be electro-active, as above) may be embedded in a substrate 114 with a high-frequency gating layer 118 controlling outputs to the eye 58. The high-frequency gating layer 118 may only allow transmission through an aperture 120 which is controllably movable. In other words, everything may be selectively blocked except for transmissions through the aperture 120. The gating layer 118 may comprise a liquid crystal array, a lithium niobate array, an array of MEMS shutter elements, an array of DLP DMD elements, or an array of other MEMS devices configured to pass or transmit with relatively high-frequency switching and high transmissibility upon being switched to transmission mode.

Figure 6A:
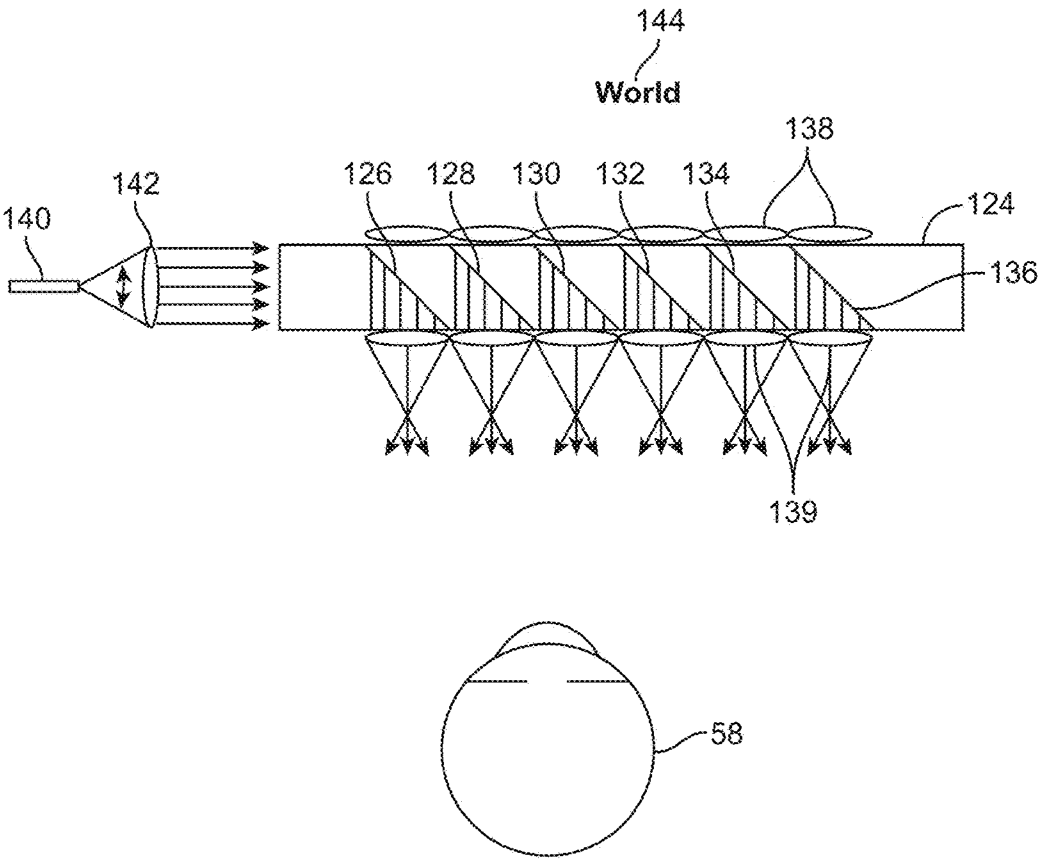
FIGS. 6A and 6B illustrate embodiments of coupling a lens element with the transmissive beamsplitter substrate of FIGS. 5A-5H.
Figure 6B:
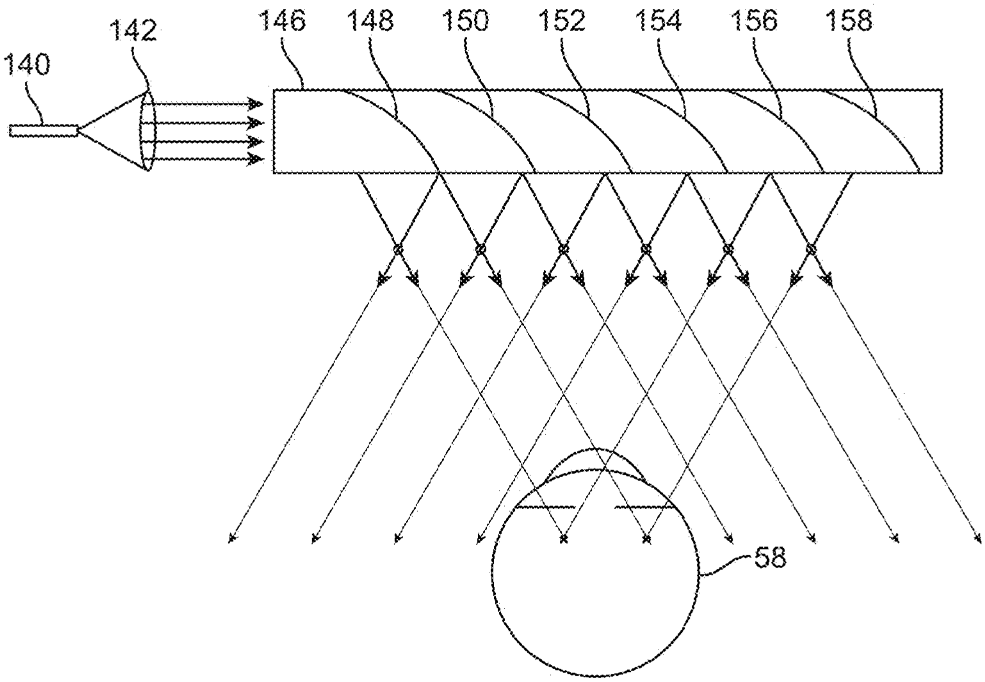

Referring to FIGS. 6A-6B, other embodiments are depicted wherein arrayed optical elements may be combined with exit pupil expansion configurations to assist with the comfort of the virtual or augmented reality experience of the user. With a larger "exit pupil" for the optics configuration, the user's eye positioning relative to the display (which, as in FIGS. 4A-4D, may be mounted on the user's head in an eyeglasses sort of configuration) is not as likely to disrupt his experience—because due to the larger exit pupil of the system, there is a larger acceptable area wherein the user's anatomical pupil may be located to still receive the information from the display system as desired. In other words, with a larger exit pupil, the system is less likely to be sensitive to slight misalignments of the display relative to the user's anatomical pupil, and greater comfort for the user may be achieved through less geometric constraint on his or her relationship with the display/glasses.

Referring now to FIGS. 6A and 6B, an alternate approach is illustrated. As shown in FIG. 6A, the display 140 on the left feeds a set of parallel rays into the substrate 124. In one embodiment, the display may be a scanned fiber display scanning a narrow beam of light back and forth at an angle as shown to project an image through the lens or other optical element 142, which may be utilized to collect the angularly-scanned light and convert it to a parallel bundle of rays. The rays may be reflected from a series of reflective surfaces (126, 128, 130, 132, 134, 136) which may partially reflect and partially transmit incoming light so that the light may be shared across the group of reflective surfaces (126, 128, 130, 132, 134, 136) approximately equally. With a small lens 138 placed at each exit point from the waveguide 124, the exiting light rays may be steered through a nodal point and scanned out toward the eye 58 to provide an array of exit pupils, or the functional equivalent of one large exit pupil that is usable by the user as he or she gazes toward the display system.

For virtual reality configurations wherein it is desirable to also be able to see through the waveguide to the real world 144, a similar set of lenses 139 may be presented on the opposite side of the waveguide 124 to compensate for the lower set of lenses; thus creating a the equivalent of a zero-magnification telescope. The reflective surfaces (126, 128, 130, 132, 134, 136) each may be aligned at approximately 45 degrees as shown, or may have different alignments, akin to the configurations of FIGS. 5B-5H, for example). The reflective surfaces (126, 128, 130, 132, 134, 136) may comprise wavelength-selective reflectors, band pass reflectors, half silvered mirrors, or other reflective configurations. The lenses (138, 139) shown are refractive lenses, but diffractive lens elements may also be utilized.

Referring to FIG. 6B, a somewhat similar configuration is depicted wherein a plurality of curved reflective surfaces (148, 150, 152, 154, 156, 158) may be utilized to effectively combine the lens (element 138 of FIG. 6A) and reflector (elements 126, 128, 130, 132, 134, 136 of FIG. 6A) functionality of the embodiment of FIG. 6A, thereby obviating the need for the two groups of lenses (element 138 of FIG. 6A).

The curved reflective surfaces (148, 150, 152, 154, 156, 158) may be various curved configurations selected to both reflect and impart angular change, such as parabolic or elliptical curved surfaces. With a parabolic shape, a parallel set of incoming rays will be collected into a single output point; with an elliptical configuration, a set of rays diverging from a single point of origin are collected to a single output point. As with the configuration of FIG. 6A, the curved reflective surfaces (148, 150, 152, 154, 156, 158) preferably partially reflect and partially transmit so that the incoming light is shared across the length of the waveguide 146. The curved reflective surfaces (148, 150, 152, 154, 156, 158) may comprise wavelength-selective notch reflectors, half silvered mirrors, or other reflective configurations. In another embodiment, the curved reflective surfaces (148, 150, 152, 154, 156, 158) may be replaced with diffractive reflectors that reflect and also deflect.

Figure 7A:
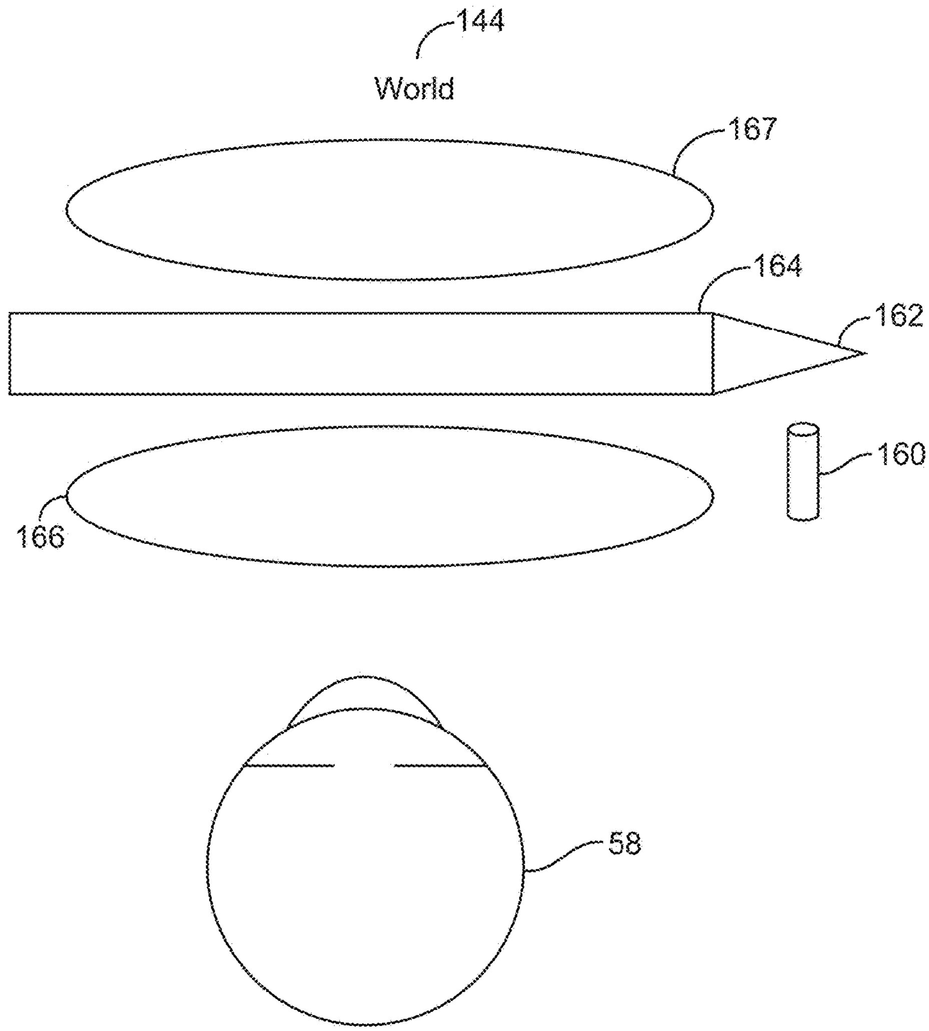
FIGS. 7A and 7B illustrate embodiments of using one or more waveguides to transmit light to a user.

Referring to FIG. 7A, perceptions of Z-axis difference (e.g., distance straight out from the eye along the optical axis) may be facilitated by using a waveguide in conjunction with a variable focus optical element configuration. As shown in FIG. 7A, image information from a display 160 may be collimated and injected into a waveguide 164 and distributed in a large exit pupil manner using, e.g., configurations such as those described in reference to FIGS. 6A and 6B, or other substrate-guided optics methods known to those skilled in the art—and then variable focus optical element capability may be utilized to change the focus of the wavefront of light emerging from the waveguide and provide the eye with the perception that the light coming from the waveguide 164 is from a particular focal distance.

In other words, since the incoming light has been collimated to avoid challenges in total internal reflection waveguide configurations, it will exit in collimated fashion, requiring a viewer's eye to accommodate to the far point to bring it into focus on the retina, and naturally be interpreted as being from optical infinity—unless some other intervention causes the light to be refocused and perceived as from a different viewing distance; one suitable such intervention is a variable focus lens.

In the embodiment of FIG. 7A, collimated image information from a display 160 is injected into a piece of glass 162 or other material at an angle such that it totally internally reflects and is passed into the adjacent waveguide 164. The waveguide 164 may be configured akin to the waveguides of FIG. 6A or 6B (124, 146, respectively) so that the collimated light from the display is distributed to exit somewhat uniformly across the distribution of reflectors or diffractive features along the length of the waveguide. Upon exiting toward the eye 58, in the depicted configuration the exiting light is passed through a variable focus lens element 166 wherein, depending upon the controlled focus of the variable focus lens element 166, the light exiting the variable focus lens element 166 and entering the eye 58 will have various levels of focus (a collimated flat wavefront to represent optical infinity, more and more beam divergence/wavefront curvature to represent closer viewing distance relative to the eye 58).

To compensate for the variable focus lens element 166 between the eye 58 and the waveguide 164, another similar variable focus lens element 167 is placed on the opposite side of the waveguide 164 to cancel out the optical effects of the lenses 166 for light coming from the world 144 for augmented reality (e.g., as described above, one lens compensates for the other, producing the functional equivalent of a zero-magnification telescope).

The variable focus lens element 166 may be a refractive element, such as a liquid crystal lens, an electro-active lens, a conventional refractive lens with moving elements, a mechanical-deformation-based lens (such as a fluid-filled membrane lens, or a lens akin to the human crystalline lens wherein a flexible element is flexed and relaxed by actuators), an electrowetting lens, or a plurality of fluids with different refractive indices.

The variable focus lens element 166 may also comprise a switchable diffractive optical element (such as one featuring a polymer dispersed liquid crystal approach wherein a host medium, such as a polymeric material, has microdroplets of liquid crystal dispersed within the material; when a voltage is applied, the molecules reorient so that their refractive indices no longer match that of the host medium, thereby creating a high-frequency switchable diffraction pattern).

One embodiment includes a host medium in which microdroplets of a Kerr effect-based electro-active material, such as lithium niobate, is dispersed within the host medium, enabling refocusing of image information on a pixel-by-pixel or line-by-line basis, when coupled with a scanning light display, such as a fiber-scanned display or scanning-mirror-based display. In a variable focus lens element 166 configuration wherein liquid crystal, lithium niobate, or other technology is utilized to present a pattern, the pattern spacing may be modulated to not only change the focal power of the variable focus lens element 166, but also to change the focal power of the overall optical system—for a zoom lens type of functionality.

In one embodiment, the lenses 166 could be telecentric, in that focus of the display imagery can be altered while keeping magnification constant—in the same way that a photography zoom lens may be configured to decouple focus from zoom position. In another embodiment, the lenses 166 may be non-telecentric, so that focus changes will also slave zoom changes. With such a configuration, such magnification changes may be compensated for in software with dynamic scaling of the output from the graphics system in sync with focus changes).

Referring back to the projector or other video display unit 160 and the issue of how to feed images into the optical display system, in a "frame sequential" configuration, a stack of sequential two-dimensional images may be fed to the display sequentially to produce three-dimensional perception over time; in a manner similar to a computed tomography system that uses stacked image slices to represent a three-dimensional structure.

A series of two-dimensional image slices may be presented to the eye, each at a different focal distance to the eye, and the eye/brain would integrate such a stack into a perception of a coherent three-dimensional volume. Depending upon the display type, line-by-line, or even pixel-by-pixel sequencing may be conducted to produce the perception of three-dimensional viewing. For example, with a scanned light display (such as a scanning fiber display or scanning mirror display), then the display is presenting the waveguide 164 with one line or one pixel at a time in a sequential fashion.

If the variable focus lens element 166 is able to keep up with the high-frequency of pixel-by-pixel or line-by-line presentation, then each line or pixel may be presented and dynamically focused through the variable focus lens element 166 to be perceived at a different focal distance from the eye 58. Pixel-by-pixel focus modulation generally requires an extremely fast/high-frequency variable focus lens element 166. For example, a 1080P resolution display with an overall frame rate of 60 frames per second typically presents around 125 million pixels per second. Such a configuration also may be constructed using a solid state switchable lens, such as one using an electro-active material, e.g., lithium niobate or an electro-active polymer. In addition to its compatibility with the system illustrated in FIG. 7A, a frame sequential multi-focal display driving approach may be used in conjunction with a number of the display system and optics embodiments described in this disclosure.

Figure 7B:
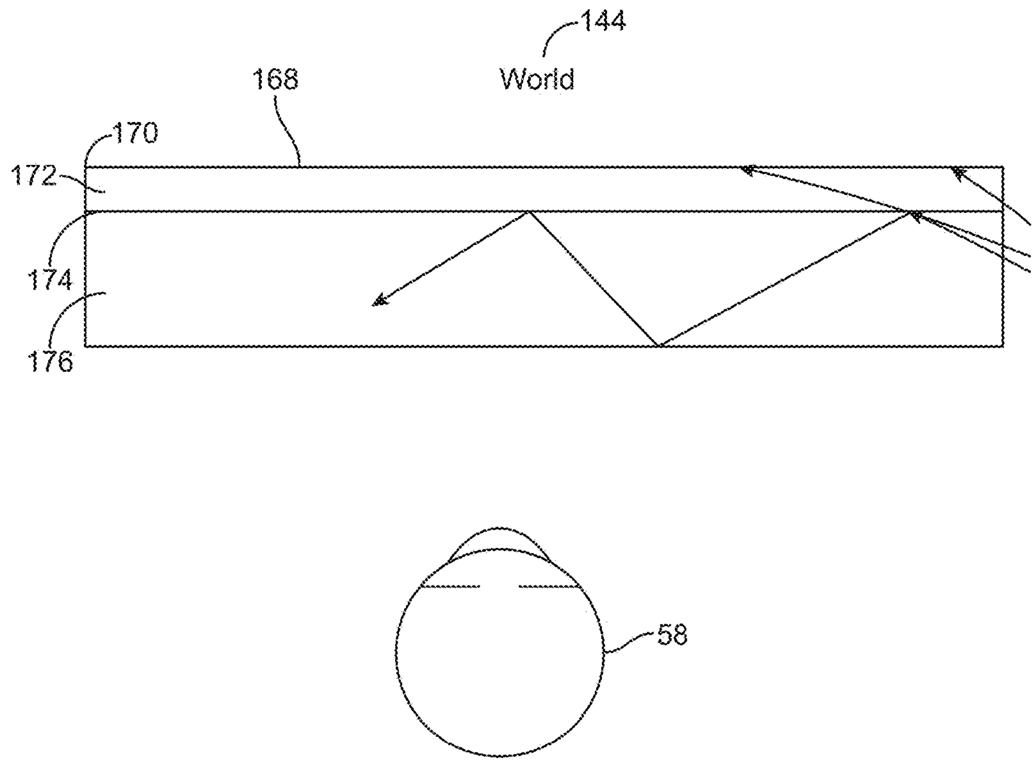

Referring to FIG. 7B, an electro-active layer 172 (such as one comprising liquid crystal or lithium niobate) may be surrounded by functional electrodes (170, 174) (which may be made of indium tin oxide) and a waveguide 168 with a conventional transmissive substrate 176. The waveguide may be made from glass or plastic with known total internal reflection characteristics and an index of refraction that matches the on or off state of the electro-active layer 172, in one or more embodiments. The electro-active layer 172 may be controlled such that the paths of entering beams may be dynamically altered to essentially create a time-varying light field.

Figure 8A:
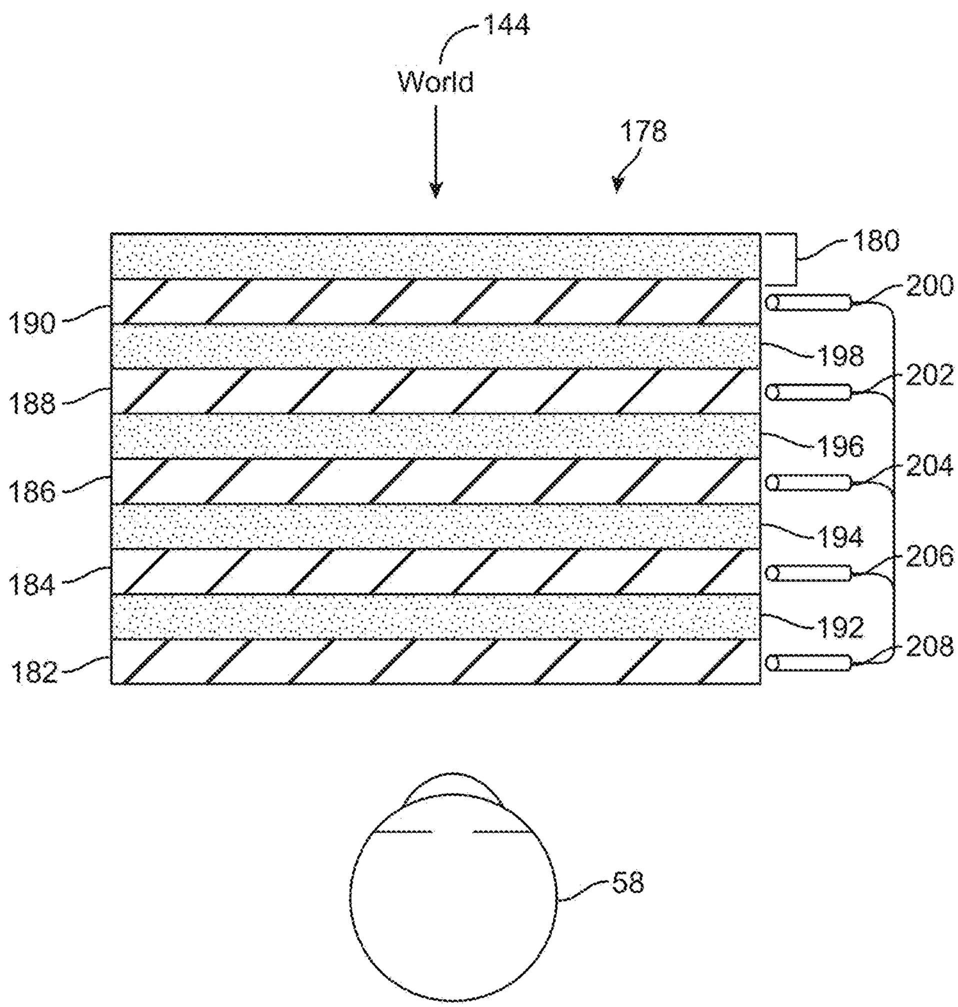
FIGS. 8A-8Q illustrate embodiments of a diffractive optical element (DOE).

Referring to FIG. 8A, a stacked waveguide assembly 178 may be utilized to provide three-dimensional perception to the eye/brain by having a plurality of waveguides (182, 184, 186, 188, 190) and a plurality of weak lenses (198, 196, 194, 192) configured together to send image information to the eye with various levels of wavefront curvature for each waveguide level indicative of focal distance to be perceived for that waveguide level. A plurality of displays (200, 202, 204, 206, 208), or in another embodiment a single multiplexed display, may be utilized to inject collimated image information into the waveguides (182, 184, 186, 188, 190), each of which may be configured, as described above, to distribute incoming light substantially equally across the length of each waveguide, for exit down toward the eye.

The waveguide 182 nearest the eye is configured to deliver collimated light, as injected into such waveguide 182, to the eye, which may be representative of the optical infinity focal plane. Another waveguide 184 is configured to send out collimated light which passes through the first weak lens (192; e.g., a weak negative lens) and is delivered to the user's eye 58. The first weak lens 192 may be configured to create a slight convex wavefront curvature so that the eye/brain interprets light coming from the waveguide 184 as coming from a first focal plane closer inward toward the person from optical infinity. Similarly, the next waveguide 186 passes its output light through both the first 192 and second 194 lenses before reaching the eye 58. The combined optical power of the first 192 and second 194 lenses may be configured to create another incremental amount of wavefront divergence so that the eye/brain interprets light coming from the waveguide 186 as coming from a second focal plane even closer inward toward the person from optical infinity than was light from the waveguide 184.

The other waveguide layers (188, 190) and weak lenses (196, 198) are similarly configured, with the highest waveguide 190 in the stack sending its output through all of the weak lenses between it and the eye for an aggregate focal power representative of the closest focal plane to the person. To compensate for the stack of lenses (198, 196, 194, 192) when viewing/interpreting light coming from the world 144 on the other side of the stacked waveguide assembly 178, a compensating lens layer (180) is disposed at the top of the stack to compensate for the aggregate power of the lens stack (198, 196, 194, 192) below.

Such a configuration provides as many perceived focal planes as there are available waveguide/lens pairings, again with a relatively large exit pupil configuration as described above. Both the reflective aspects of the waveguides and the focusing aspects of the lenses may be static (e.g., not dynamic or electro-active). In an alternative embodiment they may be dynamic using electro-active features as described above, enabling a small number of waveguides to be multiplexed in a time sequential fashion to produce a larger number of effective focal planes.

Referring to FIGS. 8B-8N, various aspects of diffraction configurations for focusing and/or redirecting collimated beams are depicted. Other aspects of diffraction systems for such purposes are disclosed in U.S. patent application Ser. No. 14/331,218, which is incorporated by reference herein in its entirety.

Figure 8B:
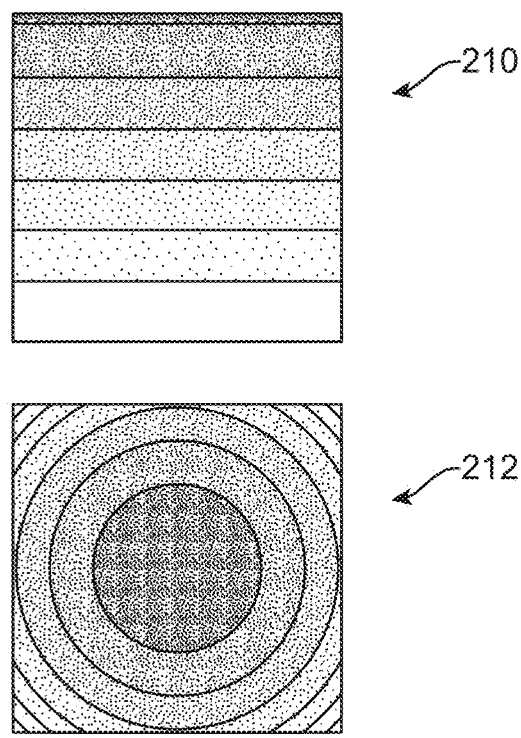
Figure 8C:
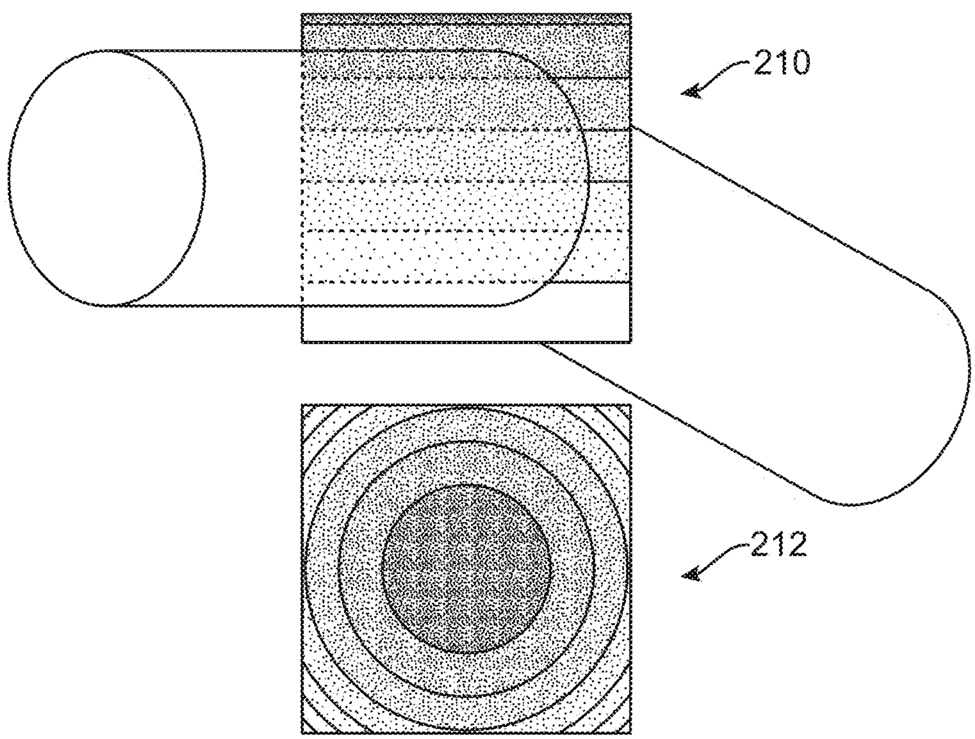
Figure 8D:
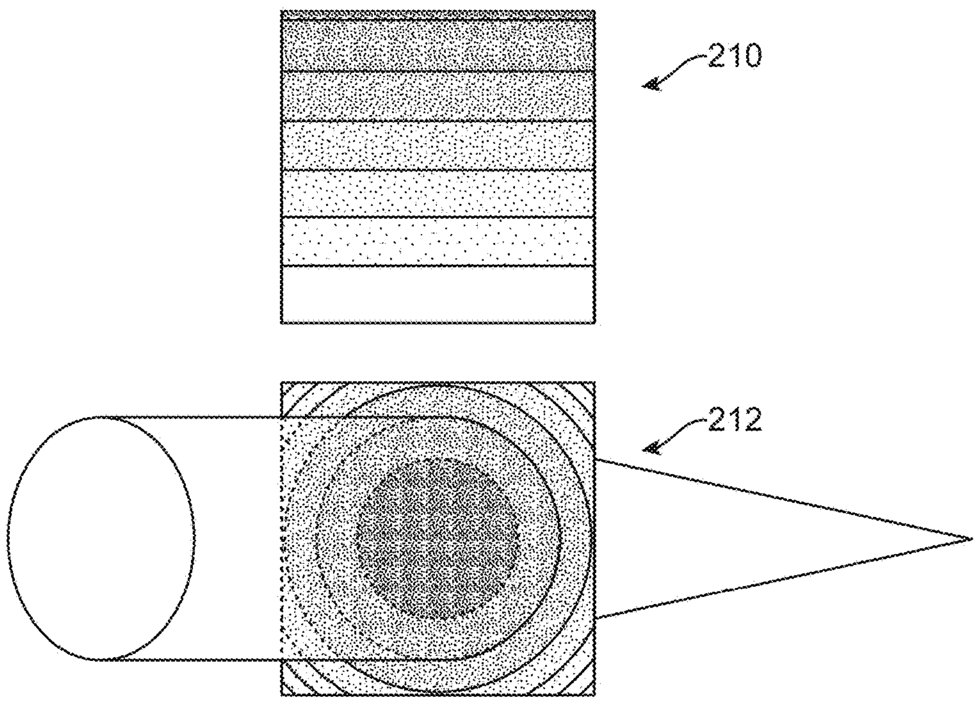

Referring to FIG. 8B, it should be appreciated that passing a collimated beam through a linear diffraction pattern 210, such as a Bragg grating, will deflect, or "steer", the beam. It should also be appreciated that passing a collimated beam through a radially symmetric diffraction pattern 212, or "Fresnel zone plate", will change the focal point of the beam. FIG. 8C illustrates the deflection effect of passing a collimated beam through a linear diffraction pattern 210. FIG. 8D illustrates the focusing effect of passing a collimated beam through a radially symmetric diffraction pattern 212.

Figure 8E:
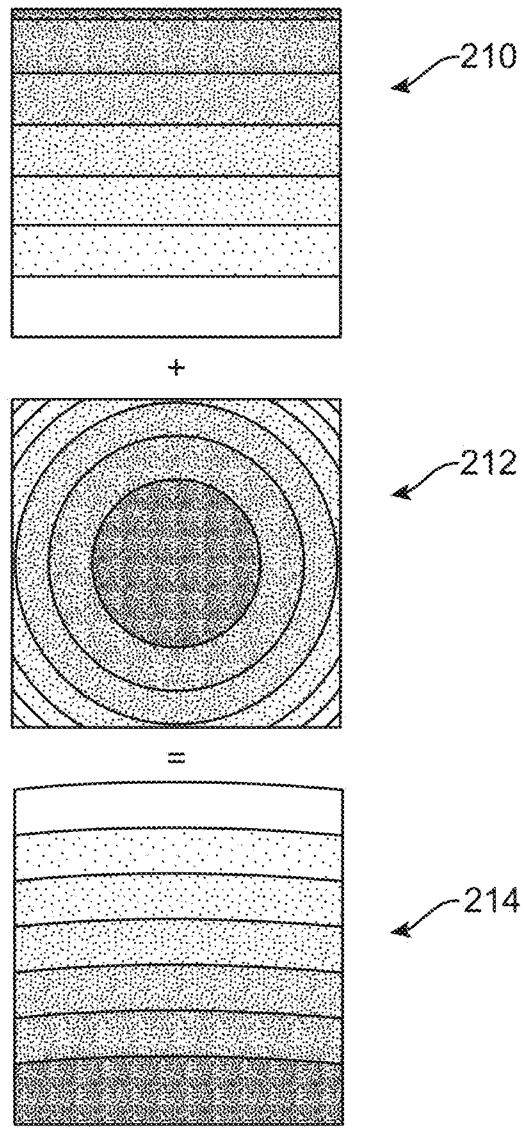
Figure 8F:
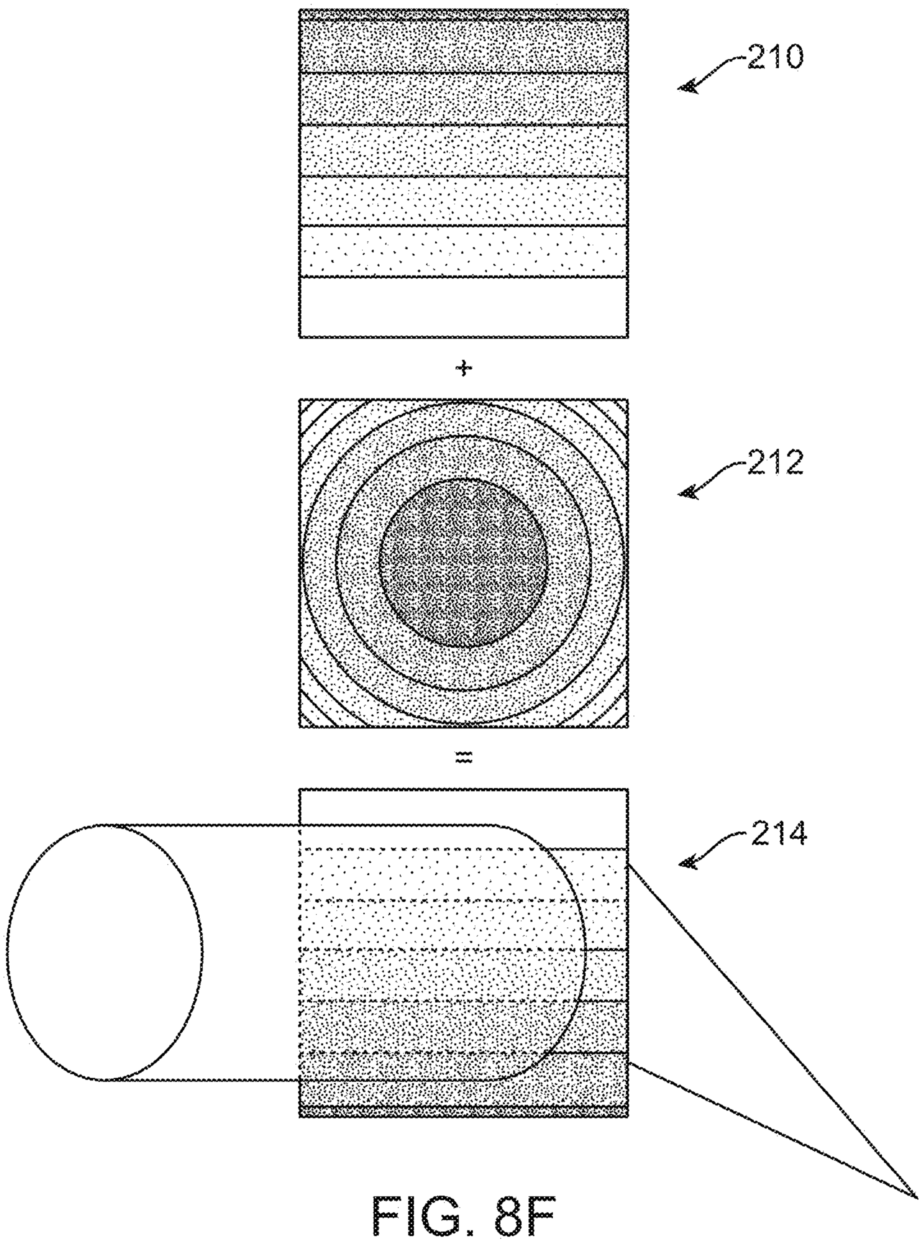
Figure 8G:
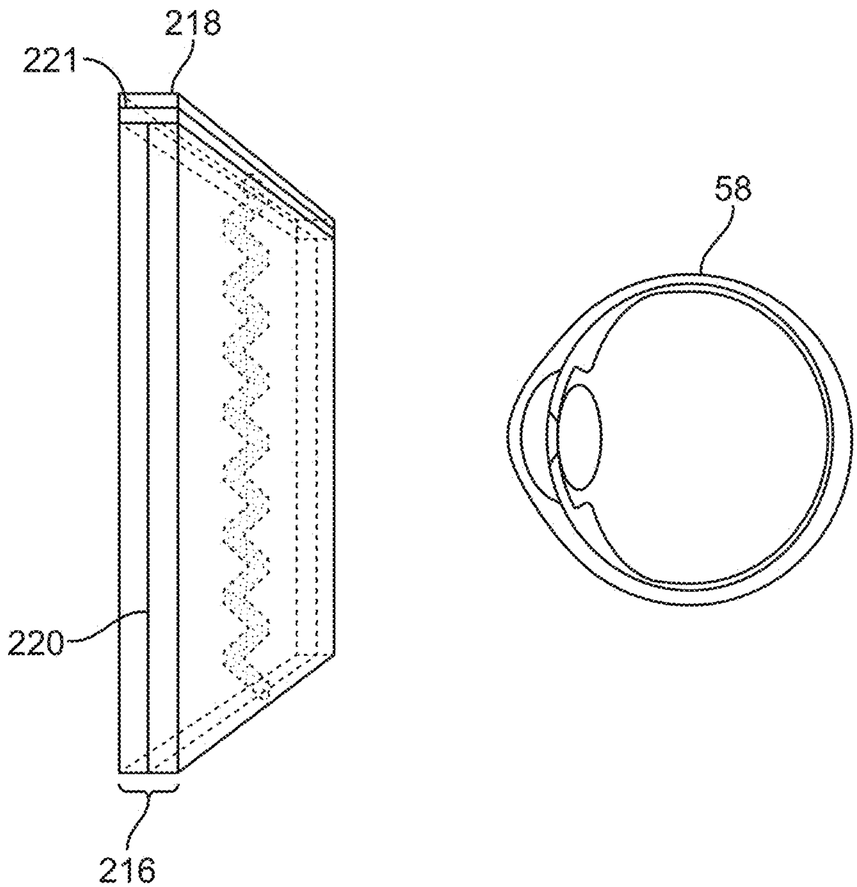

Referring to FIGS. 8E and 8F, a combination diffraction pattern that has both linear and radial elements 214 produces both deflection and focusing of a collimated input beam. These deflection and focusing effects can be produced in a reflective as well as transmissive mode. These principles may be applied with waveguide configurations to allow for additional optical system control, as shown in FIGS. 8G-8N, for example.

As shown in FIGS. 8G-8N, a diffraction pattern 220, or "diffractive optical element" (or "DOE") has been embedded within a planar waveguide 216 such that as a collimated beam is totally internally reflected along the planar waveguide 216, it intersects the diffraction pattern 220 at a multiplicity of locations.

Figure 8H:
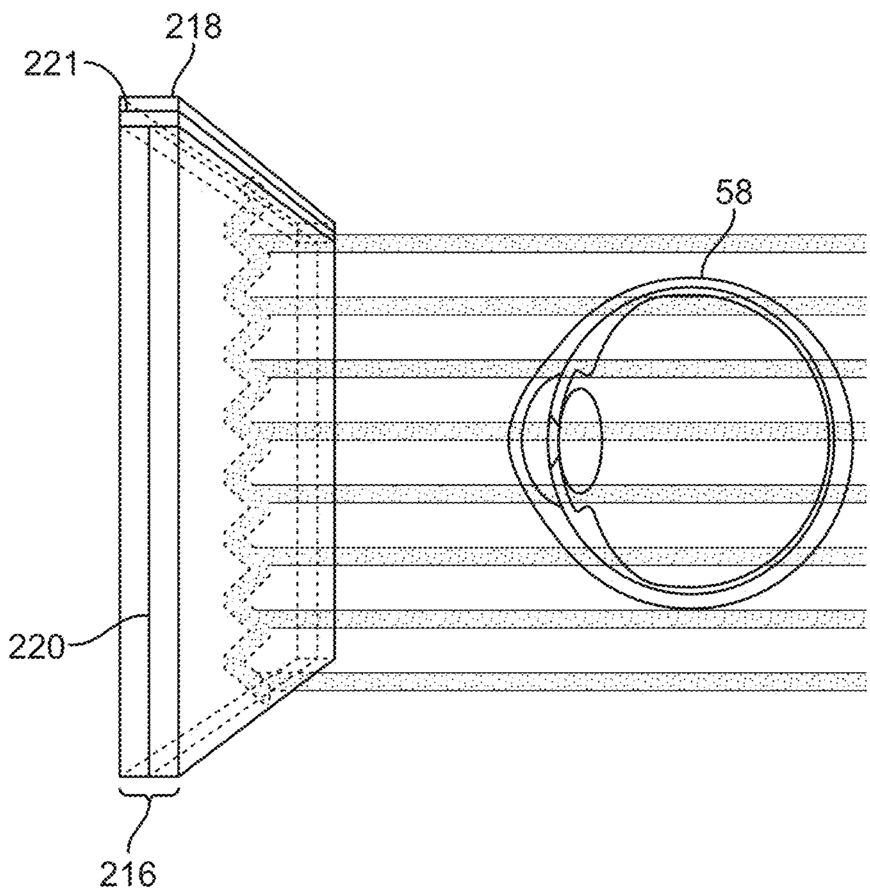

Preferably, the DOE 220 has a relatively low diffraction efficiency so that only a portion of the light of the beam is deflected away toward the eye 58 with each intersection of the DOE 220 while the rest continues to move through the planar waveguide 216 via total internal reflection. The light carrying the image information is thus divided into a number of related light beams that exit the waveguide at a multiplicity of locations and the result is a fairly uniform pattern of exit emission toward the eye 58 for this particular collimated beam bouncing around within the planar waveguide 216, as shown in FIG. 8H. The exit beams toward the eye 58 are shown in FIG. 8H as substantially parallel, because, in this case, the DOE 220 has only a linear diffraction pattern. As shown in the comparison between FIGS. 8L, 8M, and 8N, changes to this linear diffraction pattern pitch may be utilized to controllably deflect the exiting parallel beams, thereby producing a scanning or tiling functionality.

Figure 8I:
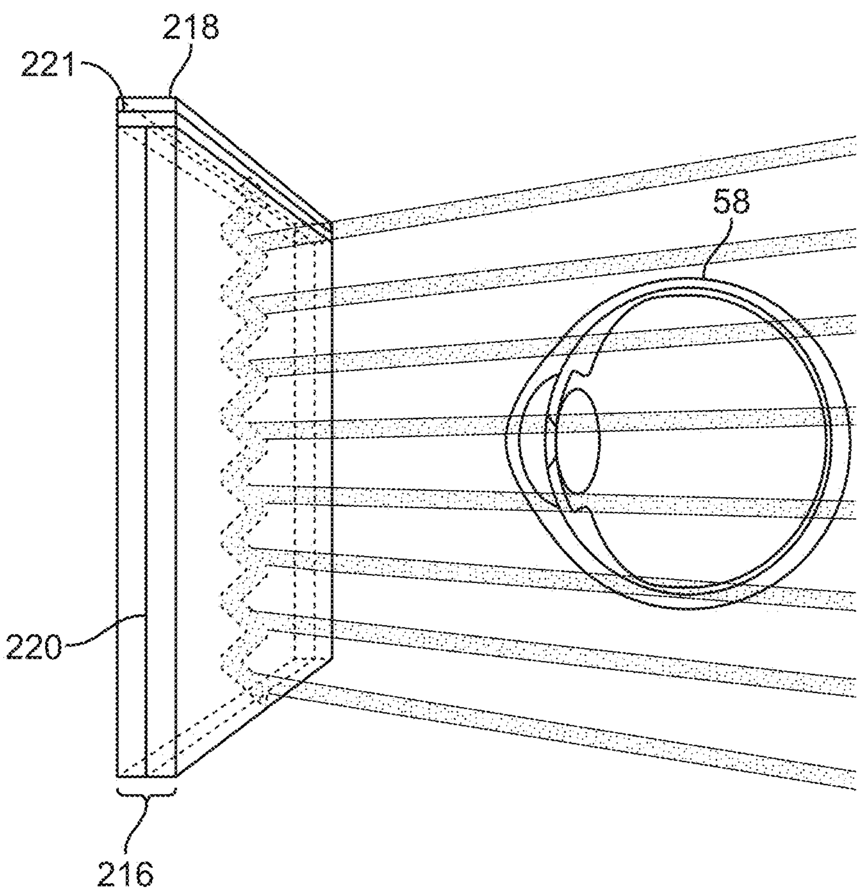
Figure 8J:
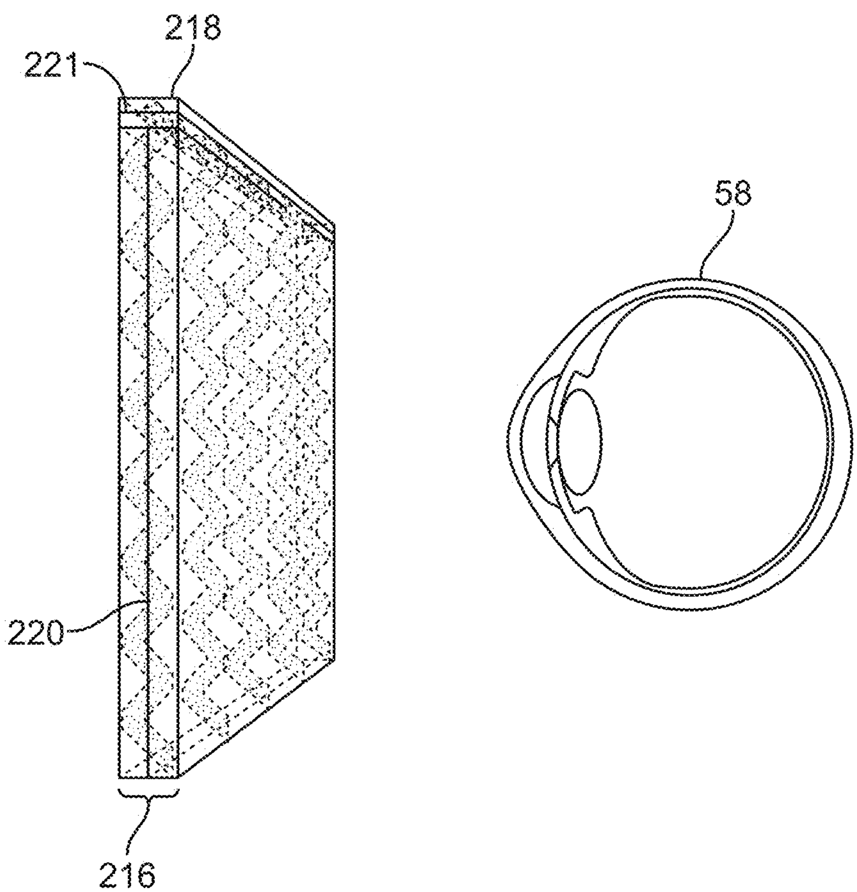

Referring to FIG. 8I, with changes in the radially symmetric diffraction pattern component of the embedded DOE 220, the exit beam pattern is more divergent, which would require the eye to accommodation to a closer distance to bring it into focus on the retina and would be interpreted by the brain as light from a viewing distance closer to the eye than optical infinity. Referring to FIG. 8J, with the addition of another waveguide 218 into which the beam may be injected (by a projector or display, for example), a DOE 221 embedded in this other waveguide 218, such as a linear diffraction pattern, may function to spread the light across the entire larger planar waveguide 216. This may provide the eye 58 with a very large incoming field of incoming light that exits from the larger planar waveguide 216, e.g., a large eye box, in accordance with the particular DOE configurations at work.

Figure 8K:
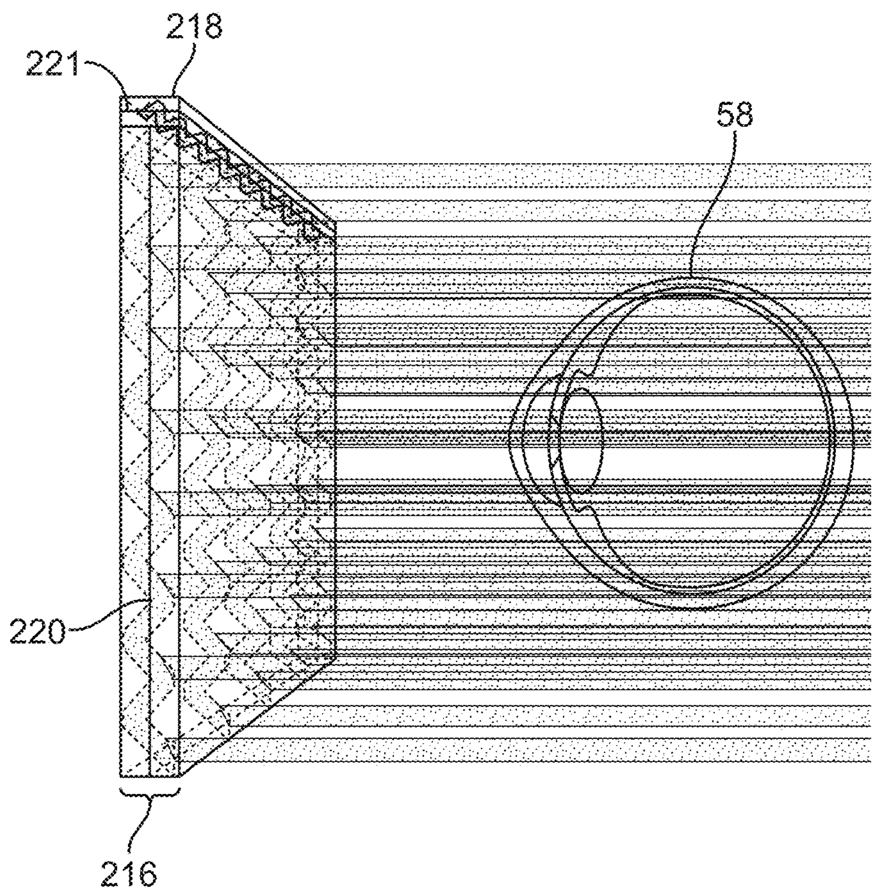

The DOEs (220, 221) are depicted bisecting the associated waveguides (216, 218) but this need not be the case. In one or more embodiments, they may be placed closer to, or upon, either side of either of the waveguides (216, 218) to have the same functionality. Thus, as shown in FIG. 8K, with the injection of a single collimated beam, an entire field of cloned collimated beams may be directed toward the eye 58. In addition, with a combined linear diffraction pattern/radially symmetric diffraction pattern scenario such as that depicted in FIGS. 8F 214 and 81220, a beam distribution waveguide optic (for functionality such as exit pupil functional expansion; with a configuration such as that of FIG. 8K, the exit pupil can be as large as the optical element itself, which can be a very significant advantage for user comfort and ergonomics) with Z-axis focusing capability is presented, in which both the divergence angle of the cloned beams and the wavefront curvature of each beam represent light coming from a point closer than optical infinity.

In one embodiment, one or more DOEs are switchable between “on” states in which they actively diffract, and “off” states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light). Or, the microdroplet can be switched to an index that does not match that of the host medium (in which case the pattern actively diffracts incident light).

Figure 8L:
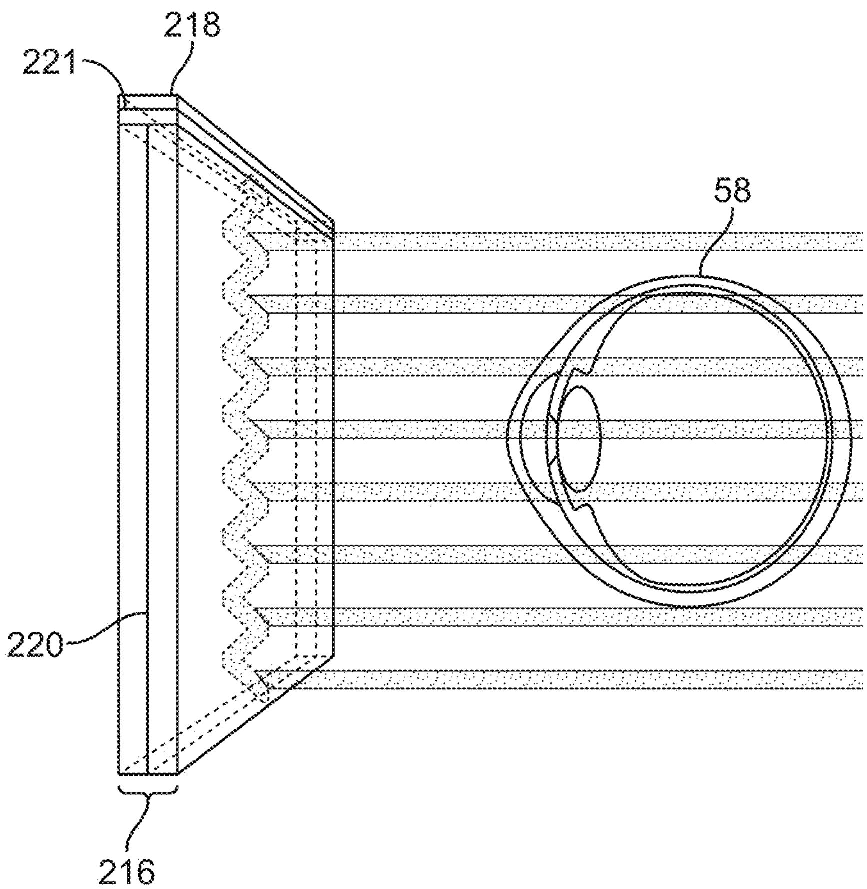
Figure 8M:
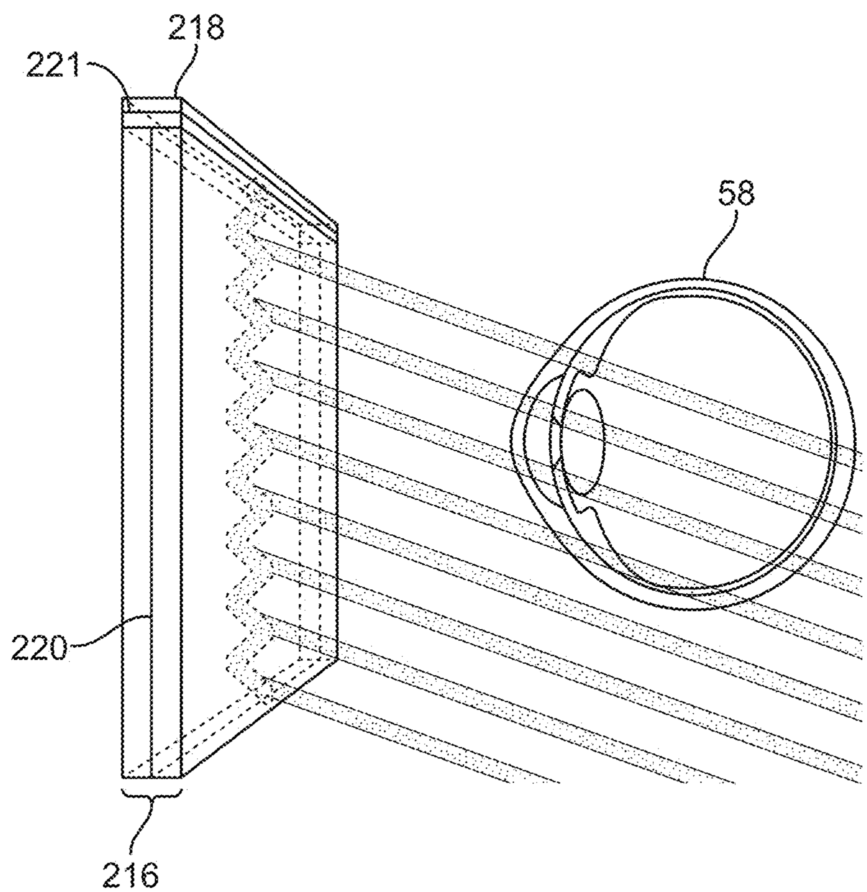
Figure 8N:
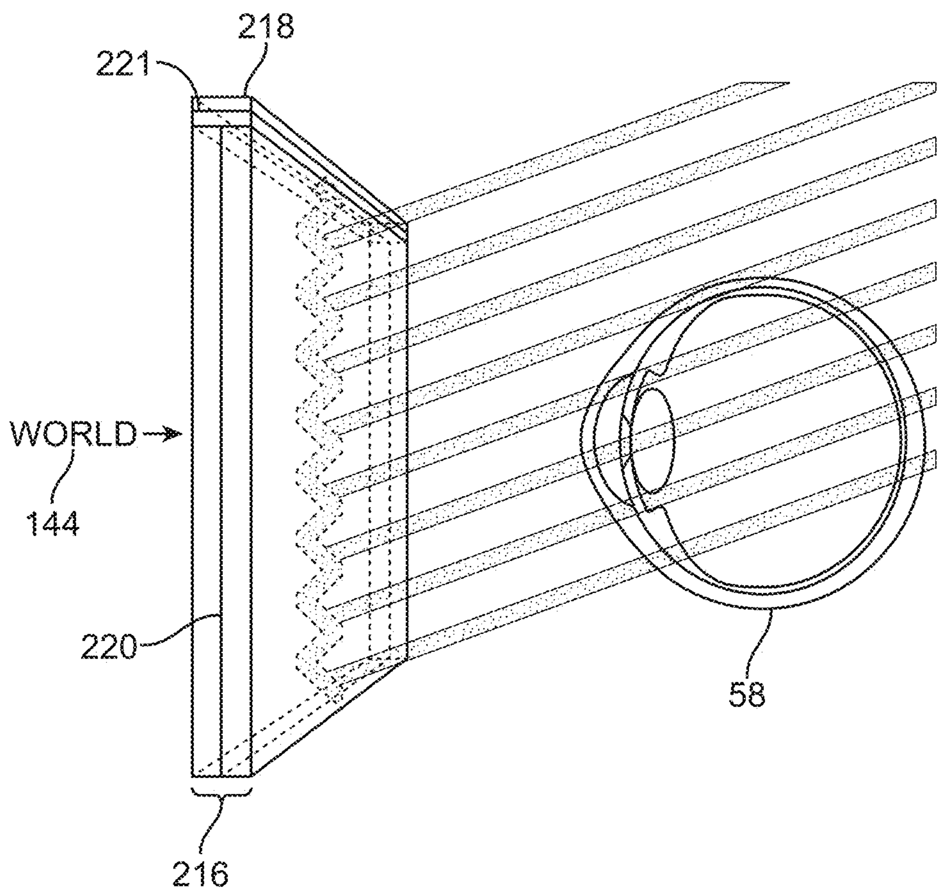

Further, with dynamic changes to the diffraction terms, such as the linear diffraction pitch term as in FIGS. 8L-8N, a beam scanning or tiling functionality may be achieved. As noted above, it may be desirable to have a relatively low diffraction grating efficiency in each of the DOEs (220, 221) because it facilitates distribution of the light. Also, because light coming through the waveguides that is desirably transmitted (for example, light coming from the world 144 toward the eye 58 in an augmented reality configuration) is less affected when the diffraction efficiency of the DOE that it crosses 220 is lower, a better view of the real world through such a configuration may be achieved.

Configurations such as those illustrated in FIG. 8K preferably are driven with injection of image information in a time sequential approach, with frame sequential driving being the most straightforward to implement. For example, an image of the sky at optical infinity may be injected at time1 and the diffraction grating retaining collimation of light may be utilized. Then an image of a closer tree branch may be injected at time2 while a DOE controllably imparts a focal change, say one diopter or 1 meter away, to provide the eye/brain with the perception that the branch light information is coming from the closer focal range.

This kind of paradigm may be repeated in rapid time sequential fashion such that the eye/brain perceives the input to be all part of the same image. While this is simply a two focal plane example, it should be appreciated that preferably the system will be configured to have more focal planes to provide a smoother transition between objects and their focal distances. This kind of configuration generally assumes that the DOE is switched at a relatively low speed (e.g., in sync with the frame-rate of the display that is injecting the images—in the range of tens to hundreds of cycles/second).

The opposite extreme may be a configuration wherein DOE elements can shift focus at tens to hundreds of MHz or greater, which facilitates switching of the focus state of the DOE elements on a pixel-by-pixel basis as the pixels are scanned into the eye 58 using a scanned light display type of approach. This is desirable because it means that the overall display frame-rate can be kept quite low; just low enough to make sure that “flicker” is not a problem (in the range of about 60-120 frames/sec).

In between these ranges, if the DOEs can be switched at KHz rates, then on a line-by-line basis the focus on each scan line may be adjusted, which may afford the user with a visible benefit in terms of temporal artifacts during an eye motion relative to the display, for example. For instance, the different focal planes in a scene may, in this manner, be interleaved, to minimize visible artifacts in response to a head motion (as is discussed in greater detail later in this disclosure). A line-by-line focus modulator may be operatively coupled to a line scan display, such as a grating light valve display, in which a linear array of pixels is swept to form an image; and may be operatively coupled to scanned light displays, such as fiber-scanned displays and mirror-scanned light displays.

A stacked configuration, similar to those of FIG. 8A, may use dynamic DOEs (rather than the static waveguides and lenses of the embodiment of FIG. 8A) to provide multi-planar focusing simultaneously. For example, with three simultaneous focal planes, a primary focus plane (based upon measured eye accommodation, for example) could be presented to the user, and a +margin and −margin (e.g., one focal plane closer, one farther out) could be utilized to provide a large focal range in which the user can accommodate before the planes need be updated. This increased focal range can provide a temporal advantage if the user switches to a closer or farther focus (e.g., as determined by accommodation measurement). Then the new plane of focus may be made to be the middle depth of focus, with the + and −margins again ready for a fast switchover to either one while the system catches up.

Figure 8O:
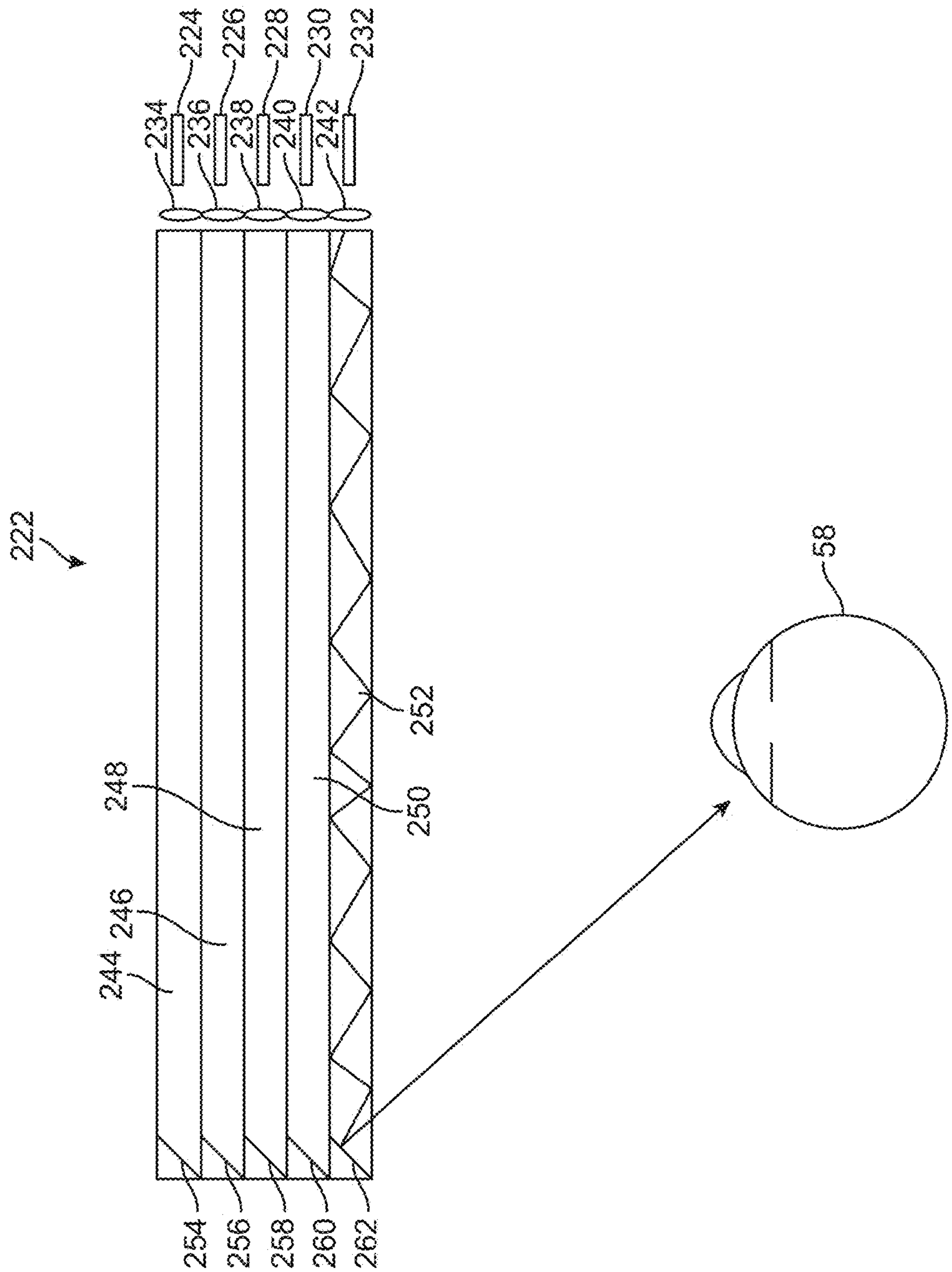

Referring to FIG. 8O, a stack 222 of planar waveguides (244, 246, 248, 250, 252) is shown, each having a reflector (254, 256, 258, 260, 262) at the end and being configured such that collimated image information injected in one end by a display (224, 226, 228, 230, 232) bounces by total internal reflection down to the reflector, at which point some or all of the light is reflected out toward an eye or other target. Each of the reflectors may have slightly different angles so that they all reflect exiting light toward a common destination such as a pupil. Such a configuration is somewhat similar to that of FIG. 5B, with the exception that each different angled reflector in the embodiment of FIG. 8O has its own waveguide for less interference when projected light is travelling to the targeted reflector. Lenses (234, 236, 238, 240, 242) may be interposed between the displays and waveguides for beam steering and/or focusing.

Figure 8P:
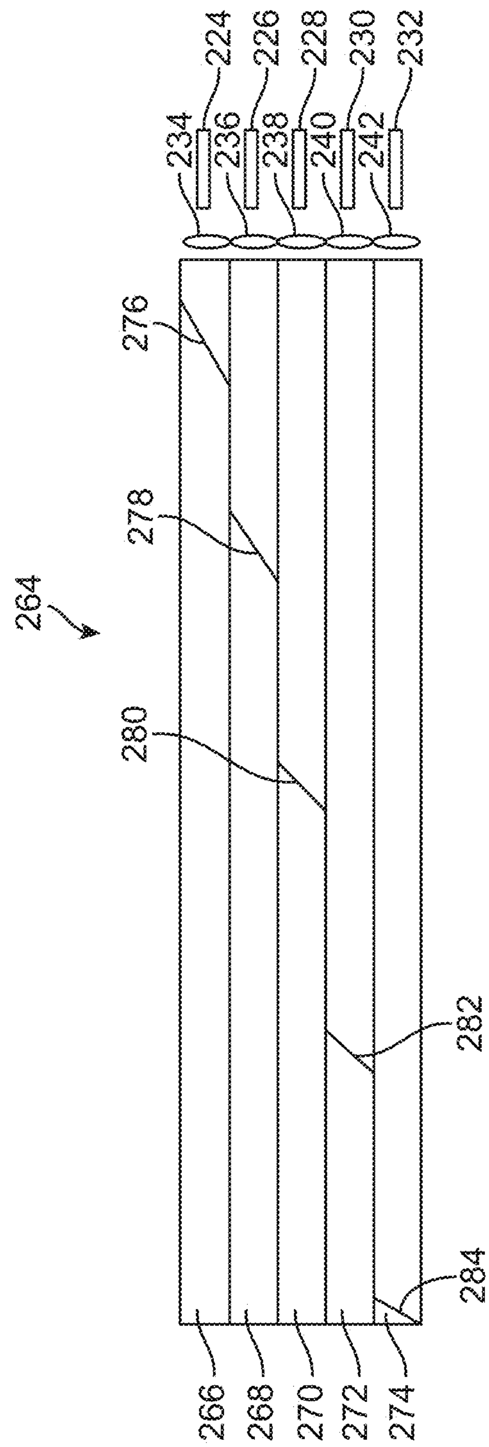

FIG. 8P illustrates a geometrically staggered version wherein reflectors (276, 278, 280, 282, 284) are positioned at staggered lengths in the waveguides (266, 268, 270, 272, 274) such that exiting beams may be relatively easily aligned with objects such as an anatomical pupil. Since a distance between the stack (264) and the eye is known (such as 28 mm between the cornea of the eye and an eyeglasses lens, a typical comfortable geometry), the geometries of the reflectors (276, 278, 280, 282, 284) and waveguides (266, 268, 270, 272, 274) may be set up to fill the eye pupil (typically about 8 mm across or less) with exiting light.

By directing light to an eye box larger than the diameter of the eye pupil, the viewer is free to make any number of eye movements while retaining the ability to see the displayed imagery. Referring back to the discussion related to FIGS. 5A and 5B about field of view expansion and reflector size, an expanded field of view is presented by the configuration of FIG. 8P as well, and it does not involve the complexity of the switchable reflective elements of the embodiment of FIG. 5B.

Figure 8Q:
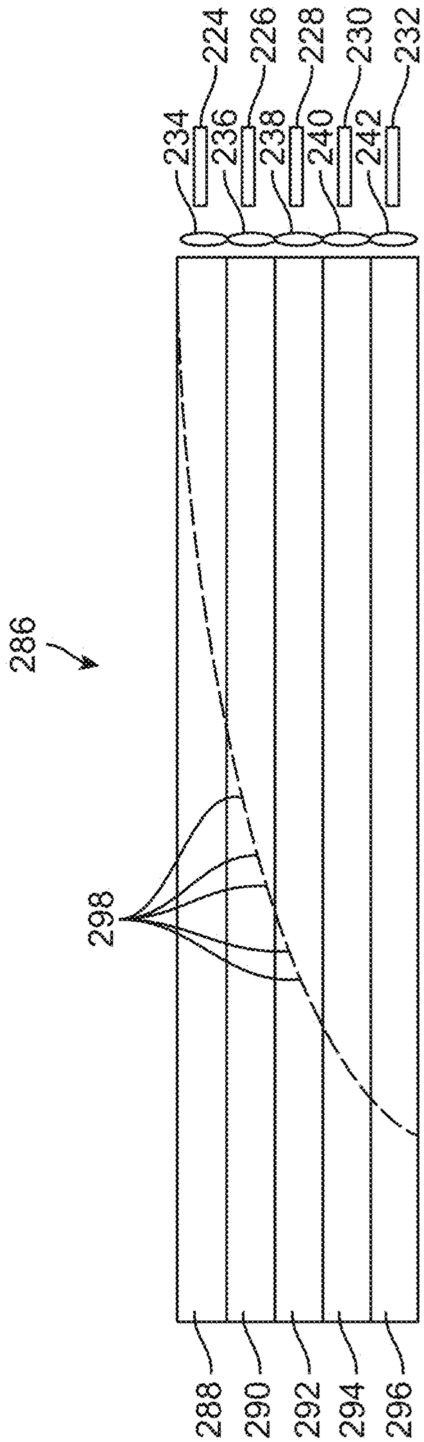

FIG. 8Q illustrates a version 286 wherein many reflectors 298 form a relatively continuous curved reflection surface in the aggregate or discrete flat facets that are oriented to align with an overall curve. The curve could a parabolic or elliptical curve and is shown cutting across a plurality of waveguides (288, 290, 292, 294, 296) to minimize any crosstalk issues, although it also could be utilized with a monolithic waveguide configuration.

In one implementation, a high-frame-rate and lower persistence display may be combined with a lower-frame-rate and higher persistence display and a variable focus element to comprise a relatively high-frequency frame sequential volumetric display. In one embodiment, the high-frame-rate display has a lower bit depth and the lower-frame-rate display has a higher bit depth, and are combined to comprise an effective high-frame-rate and high bit depth display, that is well suited to presenting image slices in a frame sequential fashion. With such an approach, a three-dimensional volume that is desirably represented is functionally divided into a series of two-dimensional slices. Each of those two-dimensional slices is projected to the eye frame sequentially, and in sync with this presentation, the focus of a variable focus element is changed.

In one embodiment, to provide enough frame rate to support such a configuration, two display elements may be integrated: a full-color, high-resolution liquid crystal display ("LCD"; a backlighted ferroelectric panel display also may be utilized in another embodiment; in a further embodiment a scanning fiber display may be utilized) operating at 60 frames per second, and aspects of a higher-frequency DLP system. Instead of illuminating the back of the LCD panel in a conventional manner (e.g., with a full size fluorescent lamp or LED array), the conventional lighting configuration may be removed to accommodate the DLP projector to project a mask pattern on the back of the LCD. In one embodiment, the mask pattern may be binary (e.g., the DLP is either illuminated or not-illuminated. In another embodiment described below, the DLP may be utilized to project a grayscale mask image.

It should be appreciated that DLP projection systems can be operated at very high frame rates. In one embodiment, for 6 depth planes at 60 frames per second, a DLP projection system can be operated against the back of the LCD display at 360 frames/second. Then the DLP projector may be utilized to selectively illuminate portions of the LCD panel in sync with a high-frequency variable focus element (such as a deformable membrane mirror) that is disposed between the viewing side of the LCD panel and the eye of the user, the variable focus element (VFE) configured to vary the global display focus on a frame by frame basis at 360 frames/second.

In one embodiment, the VFE is positioned to be optically conjugate to the exit pupil, in order to allow adjustments of focus without simultaneously affecting image magnification or "zoom." In another embodiment, the VFE is not conjugate to the exit pupil, such that image magnification changes accompany focus adjustments. In such embodiments, software may be used to compensate for optical magnification changes and any distortions by pre-scaling or warping the images to be presented.

Operationally, it's useful to consider an example in which a three-dimensional scene is to be presented to a user wherein the sky in the background is to be at a viewing distance of optical infinity, and a branch coupled to a tree extends from a tree truck so that the tip of the branch is closer to the user than is the proximal portion of the branch that joins the tree trunk. The tree may be at a location closer then optical infinity, and the branch may be even closer as compared to the tree trunk.

In one embodiment, for a given global frame, the system may be configured to present on an LCD a full-color, all in-focus image of the tree branch in front the sky. Then at subframe1, within the global frame, the DLP projector in a binary masking configuration (e.g., illumination or absence of illumination) may be used to only illuminate the portion of the LCD that represents the cloudy sky while functionally black-masking (e.g., failing to illuminate) the portion of the LCD that represents the tree branch and other elements that are not to be perceived at the same focal distance as the sky, and the VFE (such as a deformable membrane mirror) may be utilized to position the focal plane at optical infinity such that the eye sees a sub-image at subframe1 as being clouds that are infinitely far away.

Then at subframe2, the VFE may be switched to focus on a point about 1 meter away from the user's eyes (e.g., 1 meter for the branch location). The pattern of illumination from the DLP can be switched so that the system only illuminates the portion of the LCD that represents the tree branch while functionally black-masking (e.g., failing to illuminate) the portion of the LCD that represents the sky and other elements that are not to be perceived at the same focal distance as the tree branch.

Thus, the eye gets a quick flash of cloud at optical infinity followed by a quick flash of tree at 1 meter, and the sequence is integrated by the eye/brain to form a three-dimensional perception. The branch may be positioned diagonally relative to the viewer, such that it extends through a range of viewing distances, e.g., it may join with the trunk at around 2 meters viewing distance while the tips of the branch are at the closer position of 1 meter.

In this case, the display system can divide the 3-D volume of the tree branch into multiple slices, rather than a single slice at 1 meter. For instance, one focus slice may be used to represent the sky (using the DLP to mask all areas of the tree during presentation of this slice), while the tree branch is divided across 5 focus slices (using the DLP to mask the sky and all portions of the tree except one, for each part of the tree branch to be presented). Preferably, the depth slices are positioned having a spacing equal to or smaller than the depth of focus of the eye, such that the viewer will be unlikely to notice the transition between slices, and instead perceive a smooth and continuous flow of the branch through the focus range.

In another embodiment, rather than utilizing the DLP in a binary (illumination or darkfield only) mode, it may be utilized to project a grayscale (for example, 256 shades of grayscale) mask onto the back of the LCD panel to enhance three-dimensional perception. The grayscale shades may be utilized to impart to the eye/brain a perception that something resides in between adjacent depth or focal planes.

Referring back to the above scenario, if the leading edge of the branch closest to the user is to be projected on focalplane1, then at subframe1, that portion on the LCD may be lit up with full intensity white from the DLP system with the VFE at focalplane1.

Then at subframe2, when the VFE at focalplane2 is right behind the part that was lit up, there will be no illumination. These are similar steps to the binary DLP masking configuration above. However, if there is a portion of the branch that is to be perceived at a position between focalplane1 and focalplane1, e.g., halfway, grayscale masking may be utilized. The DLP can project an illumination mask to that portion during both subframe1 and subframe2, but at half-illumination (such as at level 128 out of 256 grayscale) for each subframe.

This provides the perception of a blending of depth of focus layers, with the perceived focal distance being proportional to the illuminance ratio between subframe1 and subframe2. For instance, for a portion of the tree branch that should lie ¾ths of the way between focalplane1 and focalplane2, an about 25% intensity grayscale mask can be used to illuminate that portion of the LCD at subframe1 and an about 75% grayscale mask can be used to illuminate the same portion of the LCD at subframe2.

In one embodiment, the bit depths of both the low-frame-rate display and the high-frame-rate display can be combined for image modulation, to create a high dynamic range display. The high dynamic range driving may be conducted in tandem with the focus plane addressing function described above, to comprise a high dynamic range multi-focal 3-D display.

In another more efficient embodiment, only a certain portion of the display (e.g., LCD) output may be mask-illuminated by the projector (e.g., DLP, DMD, etc.) and may be variably focused en route to the user's eye. For example, the middle portion of the display may be mask illuminated, with the periphery of the display providing uniform accommodation cues to the user (e.g. the periphery could be uniformly illuminated by the DLP DMD, while a central portion is actively masked and variably focused en route to the eye).

In the above described embodiment, a refresh rate of about 360 Hz allows for 6 depth planes at about 60 frames/second each. In another embodiment, even higher refresh rates may be achieved by increasing the operating frequency of the DLP. A standard DLP configuration uses a MEMS device and an array of micro-mirrors that toggle between a mode of reflecting light toward the display or user to a mode of reflecting light away from the display or user, such as into a light trap—thus DLPs are inherently binary. DLPs typically create grayscale images using a pulse width modulation schema wherein the mirror is left in the "on" state for a variable amount of time for a variable duty cycle in order to create a brighter pixel, or pixel of interim brightness. Thus, to create grayscale images at moderate frame rate, DLPs are running at a much higher binary rate.

In the above described configurations, such setup works well for creating grayscale masking. However, if the DLP drive scheme is adapted such that it is flashing subimages in a binary pattern, then the frame rate may be increased significantly—by thousands of frames per second, which allows for hundreds to thousands of depth planes being refreshed at 60 frames/second, which may be utilized to obviate the between-depth-plane grayscale interpolating as described above. A typical pulse width modulation scheme for a Texas Instruments DLP system has an 8-bit command signal (first bit is the first long pulse of the mirror; second bit is a pulse that is half as long as the first; third bit is half as long again; and so on)—such that the configuration can create $2^8$ (2 to the 8th power) different illumination levels. In one embodiment, the backlighting from the DLP may have its intensity varied in sync with the different pulses of the DMD to equalize the brightness of the subimages that are created. This may be a practical approach by which to use existing DMD drive electronics to produce significantly higher frame rates.

In another embodiment, direct control changes to the DMD drive electronics and software may be utilized to have the mirrors always have an equal on-time instead of the variable on-time configuration that is conventional, which would facilitate higher frame rates. In another embodiment, the DMD drive electronics may be configured to present low bit depth images at a frame rate above that of high bit depth images but lower than the binary frame rate, enabling some grayscale blending between focus planes, while moderately increasing the number of focus planes.

In another embodiment, when limited to a finite number of depth planes, such as 6 in the example above, it may be desirable to functionally move these 6 depth planes around to be maximally useful in the scene that is being presented to the user. For example, if a user is standing in a room and a virtual monster is to be placed into his augmented reality view, the virtual monster being about 2 feet deep in the Z axis straight away from the user's eyes, it may make be more useful to cluster all 6 depth planes around the center of the monster's current location (and dynamically move them with him as he moves relative to the user). This may provide more rich accommodation cues to the user, with all six depth planes in the direct region of the monster (for example, 3 in front of the center of the monster, 3 in back of the center of the monster). Such allocation of depth planes is content dependent.

For example, in the scene above the same monster may be presented in the same room, but also to be presented to the user is a virtual window frame element, and then a virtual view to optical infinity out of the virtual window frame, it will be useful to spend at least one depth plane on optical infinity, one on the depth of the wall that is to house the virtual window frame, and then perhaps the remaining four depth planes on the monster in the room. If the content causes the virtual window to disappear, then the two depth planes may be dynamically reallocated to the region around the monster. Thus, content-based dynamic allocation of focal plane resources may provide the richest experience to the user given computing and presentation resources.

Figure 9A:
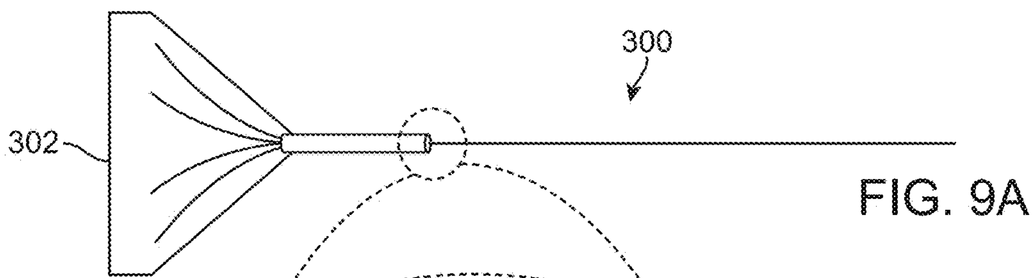
FIGS. 9A and 9B illustrate a wavefront produced from a light projector, according to one illustrated embodiment.
Figure 9B:
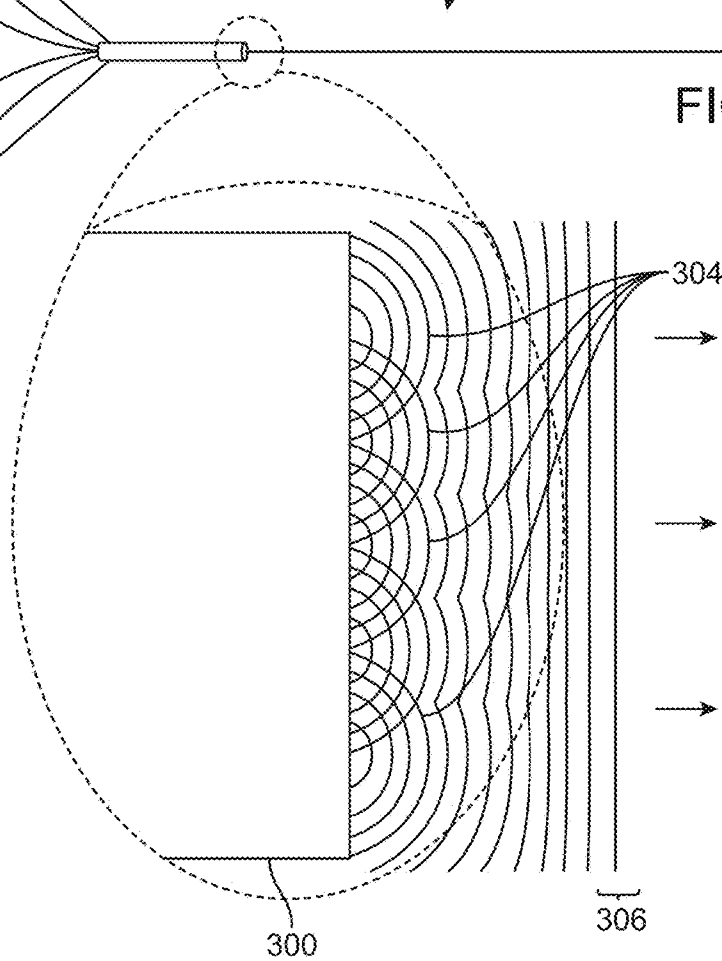

In another embodiment, phase delays in a multicore fiber or an array of single-core fibers may be utilized to create variable focus light wavefronts. Referring to FIG. 9A, a multicore fiber (300) may comprise the aggregation of multiple individual fibers (302). FIG. 9B shows a close-up view of a multicore assembly, which emits light from each core in the form of a spherical wavefront (304) from each. If the cores are transmitting coherent light, e.g., from a shared laser light source, these small spherical wavefronts ultimately constructively and destructively interfere with each other, and if they were emitted from the multicore fiber in phase, they will develop an approximately planar wavefront (306) in the aggregate, as shown.

However, if phase delays are induced between the cores (using a conventional phase modulator such as one using lithium niobate, for example, to slow the path of some cores relative to others), then a curved or spherical wavefront may be created in the aggregate, to represent at the eyes/brain an object coming from a point closer than optical infinity. This may be another approach that may be used to present multiple focal planes without the use of a VFE, as was the case in the previous embodiments discussed above. In other words, such a phased multicore configuration, or phased array, may be utilized to create multiple optical focus levels from a light source.

In another embodiment related to the use of optical fibers, a known Fourier transform aspect of multi-mode optical fiber or light guiding rods or pipes may be utilized for control of the wavefronts that are output from such fibers. Optical fibers typically are available in two categories: single mode and multi-mode. A multi-mode optical fiber typically has larger core diameters and allows light to propagate along multiple angular paths, rather than just the one of single mode optical fiber. It is known that if an image is injected into one end of a multi-mode fiber, angular differences that are encoded into that image will be retained to some degree as it propagates through the multi-mode fiber. In some configurations the output from the fiber will be significantly similar to a Fourier transform of the image that was input into the fiber.

Thus in one embodiment, the inverse Fourier transform of a wavefront (such as a diverging spherical wavefront to represent a focal plane nearer to the user than optical infinity) may be input such that, after passing through the fiber that optically imparts a Fourier transform, the output is the desired shaped, or focused, wavefront. Such output end may be scanned about to be used as a scanned fiber display, or may be used as a light source for a scanning mirror to form an image, for instance.

Thus such a configuration may be utilized as yet another focus modulation subsystem. Other kinds of light patterns and wavefronts may be injected into a multi-mode fiber, such that on the output end, a certain spatial pattern is emitted. This may be utilized to provide an equivalent of a wavelet pattern (in optics, an optical system may be analyzed in terms of the Zernicke coefficients; images may be similarly characterized and decomposed into smaller principal components, or a weighted combination of comparatively simpler image components). Thus if light is scanned into the eye using the principal components on the input side, a higher resolution image may be recovered at the output end of the multi-mode fiber.

In another embodiment, the Fourier transform of a hologram may be injected into the input end of a multi-mode fiber to output a wavefront that may be used for three-dimensional focus modulation and/or resolution enhancement. Certain single fiber core, multi-core fibers, or concentric core+cladding configurations also may be utilized in the aforementioned inverse Fourier transform configurations.

In another embodiment, rather than physically manipulating the wavefronts approaching the eye of the user at a high frame rate without regard to the user's particular state of accommodation or eye gaze, a system may be configured to monitor the user's accommodation and rather than presenting a set of multiple different light wavefronts, present a single wavefront at a time that corresponds to the accommodation state of the eye.

Accommodation may be measured directly (such as by infrared autorefractor or eccentric photorefraction) or indirectly (such as by measuring the convergence level of the two eyes of the user; as described above, vergence and accommodation are strongly linked neurologically, so an estimate of accommodation can be made based upon vergence geometry). Thus with a determined accommodation of, say, 1 meter from the user, then the wavefront presentations at the eye may be configured for a 1 meter focal distance using any of the above variable focus configurations. If an accommodation change to focus at 2 meters is detected, the wavefront presentation at the eye may be reconfigured for a 2 meter focal distance, and so on.

Thus in one embodiment that incorporates accommodation tracking, a VFE may be placed in the optical path between an outputting combiner (e.g., a waveguide or beamsplitter) and the eye of the user, such that the focus may be changed along with (e.g., preferably at the same rate as) accommodation changes of the eye. Software effects may be utilized to produce variable amounts blur (e.g., Gaussian) to objects which should not be in focus to simulate the dioptric blur expected at the retina as if an object were at that viewing distance. This enhances the three-dimensional perception by the eyes/brain.

Figure 10:
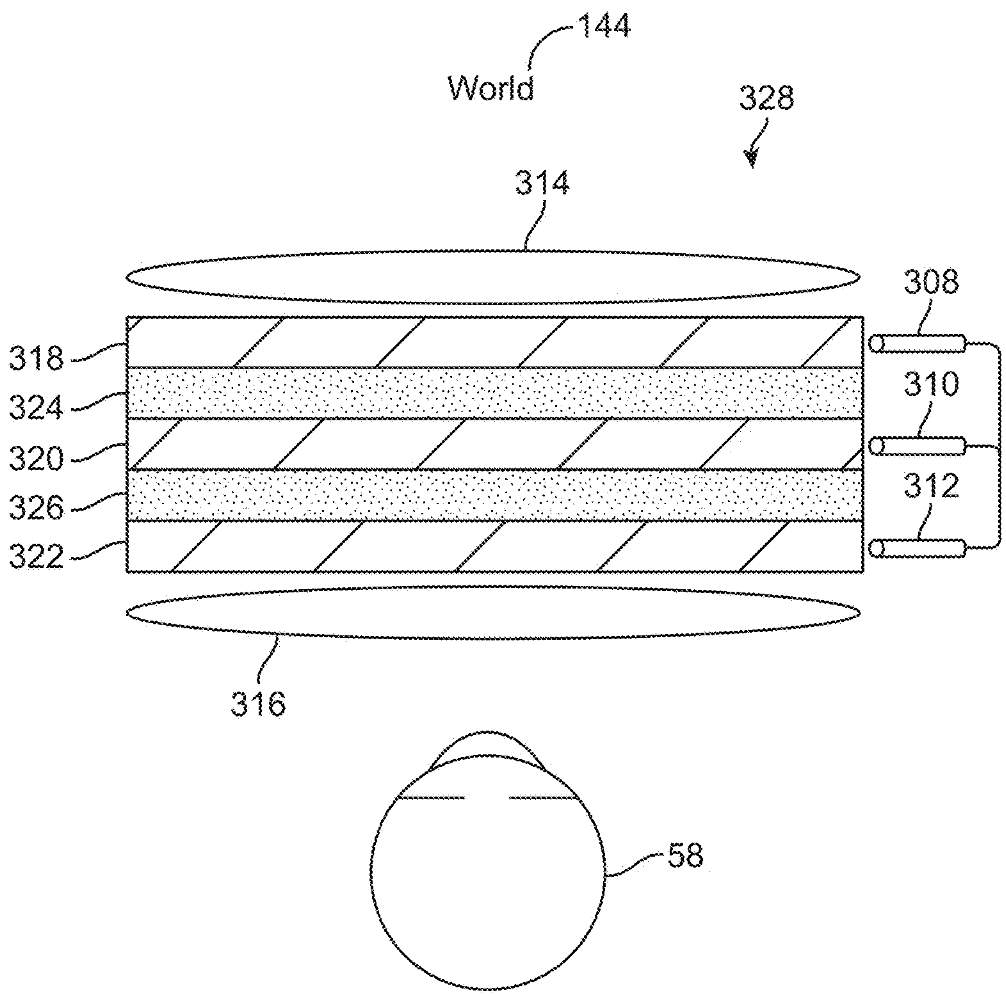
FIG. 10 illustrates an embodiment of a stacked configuration of multiple transmissive beamsplitter substrate coupled with optical elements, according to one illustrated embodiment.

A simple embodiment is a single plane whose focus level is slaved to the viewer's accommodation level. However, the performance demands on the accommodation tracking system can be relaxed if even a low number of multiple planes is used. Referring to FIG. 10, in another embodiment, a stack 328 of about 3 waveguides (318, 320, 322) may be utilized to create three focal planes of wavefronts simultaneously. In one embodiment, the weak lenses (324, 326) may have static focal distances, and a variable focal lens 316 may be slaved to the accommodation tracking of the eyes such that one of the three waveguides (say the middle waveguide 320) outputs what is deemed to be the in-focus wavefront, while the other two waveguides (322, 318) output a +margin wavefront and a −margin wavefront (e.g., a little farther than detected focal distance, a little closer than detected focal distance). This may improve three-dimensional perception and also provide enough difference for the brain/eye accommodation control system to sense some blur as negative feedback, which, in turn, enhances the perception of reality, and allows a range of accommodation before a physical adjustment of the focus levels if necessary.

A variable focus compensating lens 314 is also shown to ensure that light coming in from the real world 144 in an augmented reality configuration is not refocused or magnified by the assembly of the stack 328 and output lens 316. The variable focus in the lenses (316, 314) may be achieved, as discussed above, with refractive, diffractive, or reflective techniques.

In another embodiment, each of the waveguides in a stack may contain their own capability for changing focus (such as by having an included electronically switchable DOE) such that the VFE need not be centralized as in the stack 328 of the configuration of FIG. 10.

In another embodiment, VFEs may be interleaved between the waveguides of a stack (e.g., rather than fixed focus weak lenses as in the embodiment of FIG. 10) to obviate the need for a combination of fixed focus weak lenses plus whole-stack-refocusing variable focus element. Such stacking configurations may be used in accommodation tracked variations as described herein, and also in a frame-sequential multi-focal display approach.

In a configuration wherein light enters the pupil with a small exit pupil, such as ½ mm diameter or less, one has the equivalent of a pinhole lens configuration wherein the beam is always interpreted as in-focus by the eyes/brain—e.g., a scanned light display using a 0.5 mm diameter beam to scan images to the eye. Such a configuration is known as a Maxwellian view configuration, and in one embodiment, accommodation tracking input may be utilized to induce blur using software to image information that is to be perceived as at a focal plane behind or in front of the focal plane determined from the accommodation tracking. In other words, if one starts with a display presenting a Maxwellian view, then everything theoretically can be in focus. In order to provide a rich and natural three-dimensional perception, simulated dioptric blur may be induced with software, and may be slaved to the accommodation tracking status.

In one embodiment a scanning fiber display is well suited to such configuration because it may be configured to only output small-diameter beams in a Maxwellian form. In another embodiment, an array of small exit pupils may be created to increase the functional eye box of the system (and also to reduce the impact of a light-blocking particle which may reside in the vitreous or cornea of the eye), such as by one or more scanning fiber displays. Or, this may be achieved through a DOE configuration such as that described in reference to FIG. 8K, with a pitch in the array of presented exit pupils that ensure that only one will hit the anatomical pupil of the user at any given time (for example, if the average anatomical pupil diameter is 4 mm, one configuration may comprise ½ mm exit pupils spaced at intervals of approximate 4 mm apart).

Such exit pupils may also be switchable in response to eye position, such that only the eye always receives one, and only one, active small exit pupil at a time; allowing a denser array of exit pupils. Such user will have a large depth of focus to which software-based blur techniques may be added to enhance perceived depth perception.

As discussed above, an object at optical infinity creates a substantially planar wavefront. An object closer, such as 1 m away from the eye, creates a curved wavefront (with about 1 m convex radius of curvature). It should be appreciated that the eye's optical system is required to possess sufficient optical power to bend the incoming rays of light such that the light rays are focused on the retina (convex wavefront gets turned into concave, and then down to a focal point on the retina). These are basic functions of the eye.

In many of the embodiments described above, light directed to the eye has been treated as being part of one continuous wavefront, some subset of which would hit the pupil of the particular eye. In another approach, light directed to the eye may be effectively discretized or broken down into a plurality of beamlets or individual rays, each of which has a diameter less than about 0.5 mm and a unique propagation pathway as part of a greater aggregated wavefront that may be functionally created with the an aggregation of the beamlets or rays. For example, a curved wavefront may be approximated by aggregating a plurality of discrete neighboring collimated beams, each of which is approaching the eye from an appropriate angle to represent a point of origin. The point of origin may match the center of the radius of curvature of the desired aggregate wavefront.

When the beamlets have a diameter of about 0.5 mm or less, this configuration is akin to a pinhole lens configuration. In other words, each individual beamlet is always in relative focus on the retina, independent of the accommodation state of the eye—however the trajectory of each beamlet will be affected by the accommodation state. For instance, if the beamlets approach the eye in parallel, representing a discretized collimated aggregate wavefront, then an eye that is correctly accommodated to infinity will deflect the beamlets to converge upon the same shared spot on the retina, and will appear in focus. If the eye accommodates to, say, 1 m, the beams will be converged to a spot in front of the retina, cross paths, and fall on multiple neighboring or partially overlapping spots on the retina—appearing blurred.

If the beamlets approach the eye in a diverging configuration, with a shared point of origin 1 meter from the viewer, then an accommodation of 1 m will steer the beams to a single spot on the retina, and will appear in focus. If the viewer accommodates to infinity, the beamlets will converge to a spot behind the retina, and produce multiple neighboring or partially overlapping spots on the retina, producing a blurred image. Stated more generally, the accommodation of the eye determines the degree of overlap of the spots on the retina, and a given pixel is "in focus" when all of the spots are directed to the same spot on the retina and "defocused" when the spots are offset from one another. This notion that all of the 0.5 mm diameter or less beamlets are always in focus, and that the beamlets may be aggregated to be perceived by the eyes/brain as coherent wavefronts, may be utilized in producing configurations for comfortable three-dimensional virtual or augmented reality perception.

In other words, a set of multiple narrow beams may be used to emulate a larger diameter variable focus beam. If the beamlet diameters are kept to a maximum of about 0.5 mm, then a relatively static focus level may be maintained. To produce the perception of out-of-focus when desired, the beamlet angular trajectories may be selected to create an effect much like a larger out-of-focus beam (such a defocusing treatment may not be the same as a Gaussian blur treatment as for the larger beam, but will create a multimodal point spread function that may be interpreted in a similar fashion to a Gaussian blur).

In a preferred embodiment, the beamlets are not mechanically deflected to form this aggregate focus effect, but rather the eye receives a superset of many beamlets that includes both a multiplicity of incident angles and a multiplicity of locations at which the beamlets intersect the pupil; to represent a given pixel from a particular viewing distance, a subset of beamlets from the superset that comprise the appropriate angles of incidence and points of intersection with the pupil (as if they were being emitted from the same shared point of origin in space) are turned on with matching color and intensity, to represent that aggregate wavefront, while beamlets in the superset that are inconsistent with the shared point of origin are not turned on with that color and intensity (but some of them may be turned on with some other color and intensity level to represent, e.g., a different pixel).

Figure 11A:
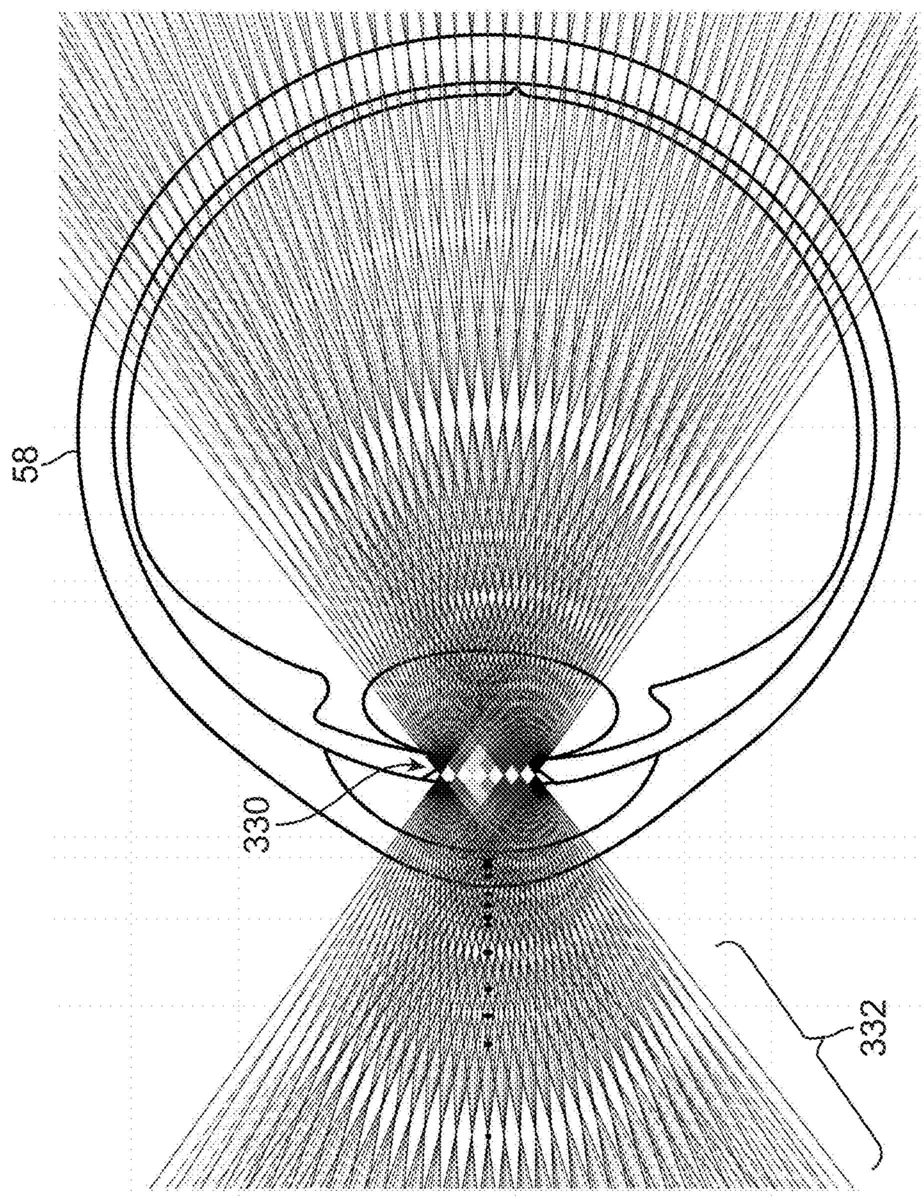
FIGS. 11A-11C illustrate a set of beamlets projected into a user's pupil, according to the illustrated embodiments.
Figure 11B:
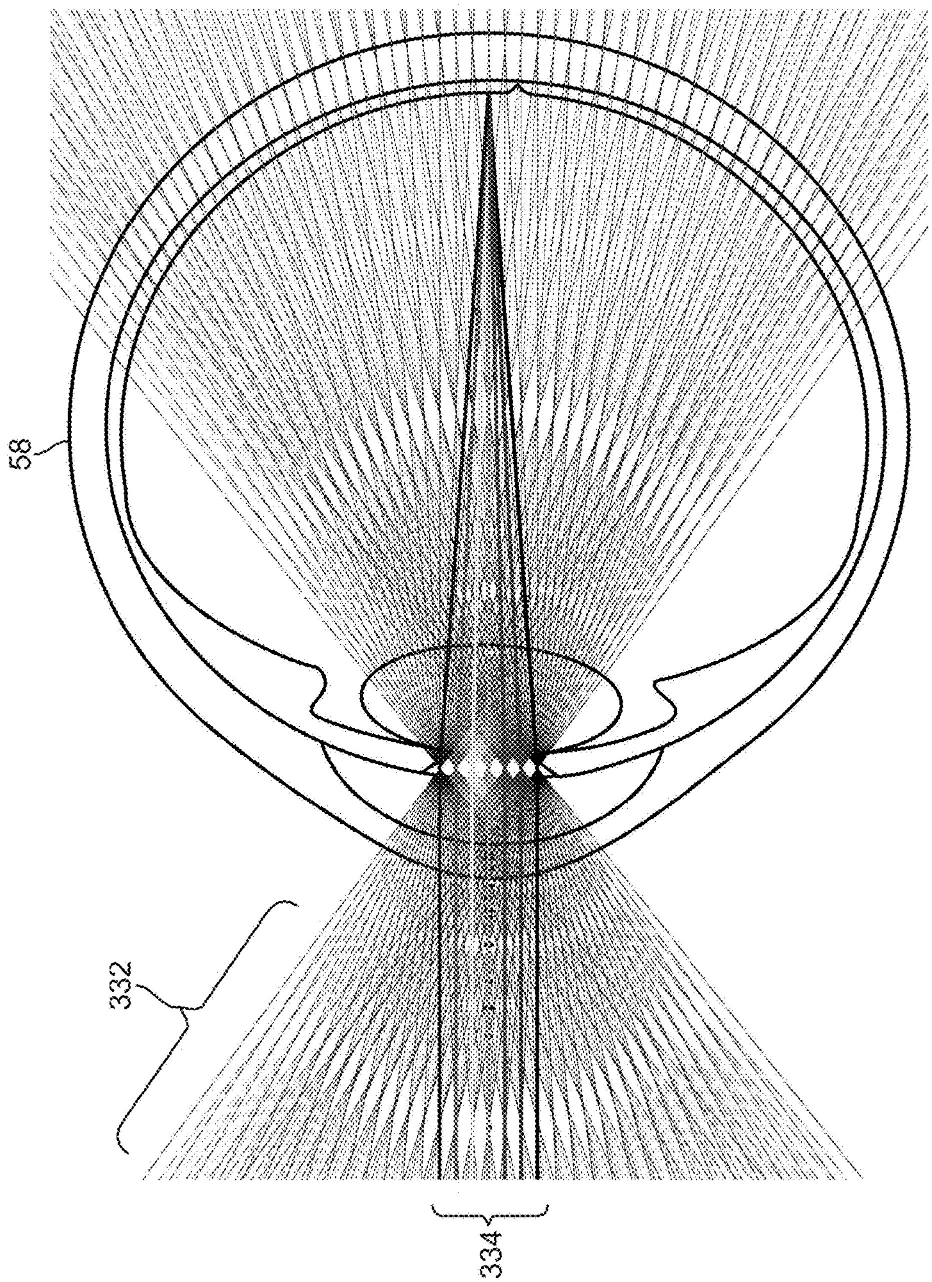

Referring to FIG. 11A, each of a multiplicity of incoming beamlets (332) is passing through a small exit pupil (330) relative to the eye 58 in a discretized wavefront display configuration. Referring to FIG. 11B, a subset (334) of the group of beamlets (332) may be driven with matching color and intensity levels to be perceived as though they are part of the same larger-sized ray (the bolded subgroup (334) may be deemed an "aggregated beam"). In this case, the subset of beamlets are parallel to one another, representing a collimated aggregate beam from optical infinity (such as light coming from a distant mountain). The eye is accommodated to infinity, so the subset of beamlets are deflected by the eye's cornea and lens to all fall substantially upon the same location of the retina and are perceived to comprise a single in focus pixel.

Figure 11C:
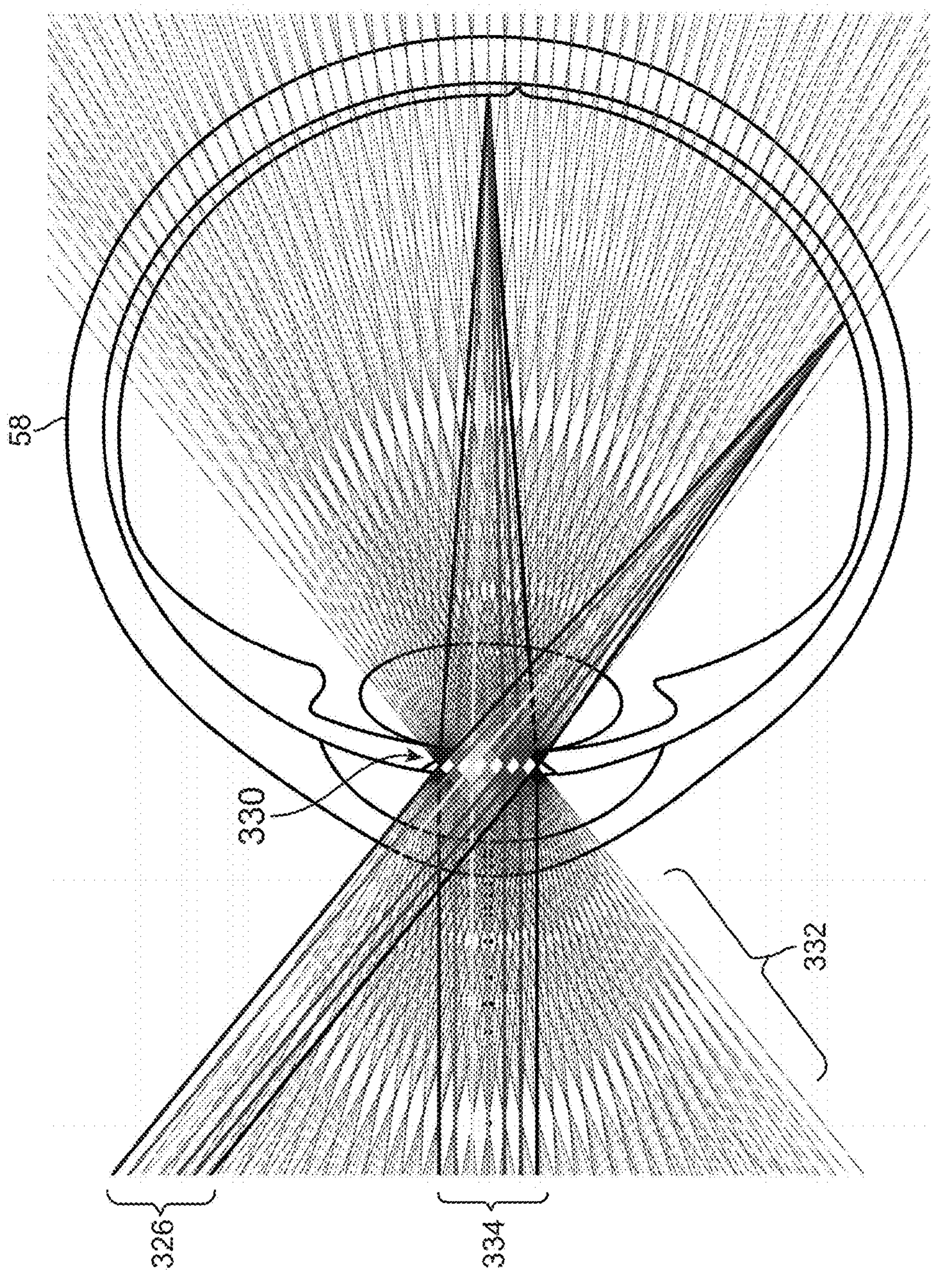

FIG. 11C shows another subset of beamlets representing an aggregated collimated beam (336) coming in from the right side of the field of view of the user's eye 58 if the eye 58 is viewed in a coronal-style planar view from above. Again, the eye is shown accommodated to infinity, so the beamlets fall on the same spot of the retina, and the pixel is perceived to be in focus. If, in contrast, a different subset of beamlets were chosen that were reaching the eye as a diverging fan of rays, those beamlets would not fall on the same location of the retina (and be perceived as in focus) until the eye were to shift accommodation to a near point that matches the geometrical point of origin of that fan of rays.

Figure 12A:
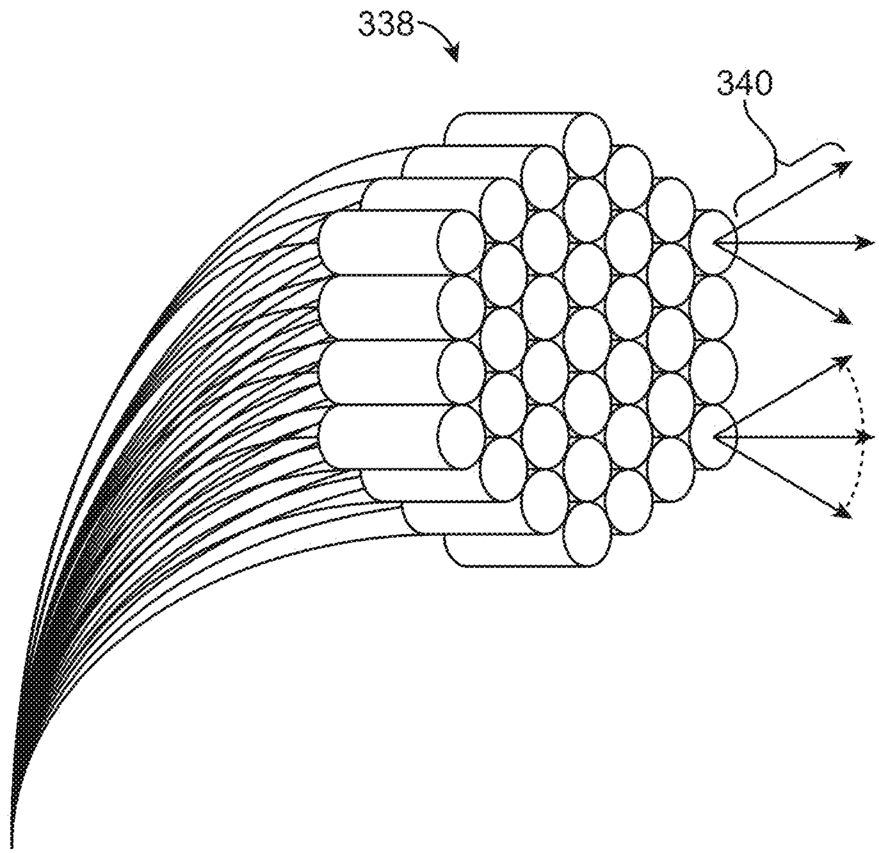
FIGS. 12A and 12B illustrate configurations of an array of microprojectors, according to the illustrated embodiments.

With regards to patterns of points of intersection of beamlets with the anatomical pupil of the eye (e.g., the pattern of exit pupils), the points of intersection may be organized in configurations such as a cross-sectionally efficient hex-lattice (for example, as shown in FIG. 12A) or a square lattice or other two-dimensional array. Further, a three-dimensional array of exit pupils could be created, as well as time-varying arrays of exit pupils.

Discretized aggregate wavefronts may be created using several configurations, such as an array of microdisplays or microprojectors placed optically conjugate with the exit pupil of viewing optics, microdisplay or microprojector arrays coupled to a direct field of view substrate (such as an eyeglasses lens) such that they project light to the eye directly, without additional intermediate viewing optics, successive spatial light modulation array techniques, or waveguide techniques such as those described in relation to FIG. 8K.

Referring to FIG. 12A, in one embodiment, a lightfield may be created by bundling a group of small projectors or display units (such as scanned fiber displays). FIG. 12A depicts a hexagonal lattice projection bundle 338 which may, for example, create a 7 mm-diameter hex array with each fiber display outputting a sub-image (340). If such an array has an optical system, such as a lens, placed in front of it such that the array is placed optically conjugate with the eye's entrance pupil, this will create an image of the array at the eye's pupil, as shown in FIG. 12B, which essentially provides the same optical arrangement as the embodiment of FIG. 11A.

Each of the small exit pupils of the configuration is created by a dedicated small display in the bundle 338, such as a scanning fiber display. Optically, it's as though the entire hex array 338 is positioned right into the anatomical pupil 45. Such embodiments may be used for driving different subimages to different small exit pupils within the larger anatomical entrance pupil 45 of the eye, comprising a superset of beamlets with a multiplicity of incident angles and points of intersection with the eye pupil. Each of the separate projectors or displays may be driven with a slightly different image, such that subimages may be created that pull out different sets of rays to be driven at different light intensities and colors.

Figure 12B:
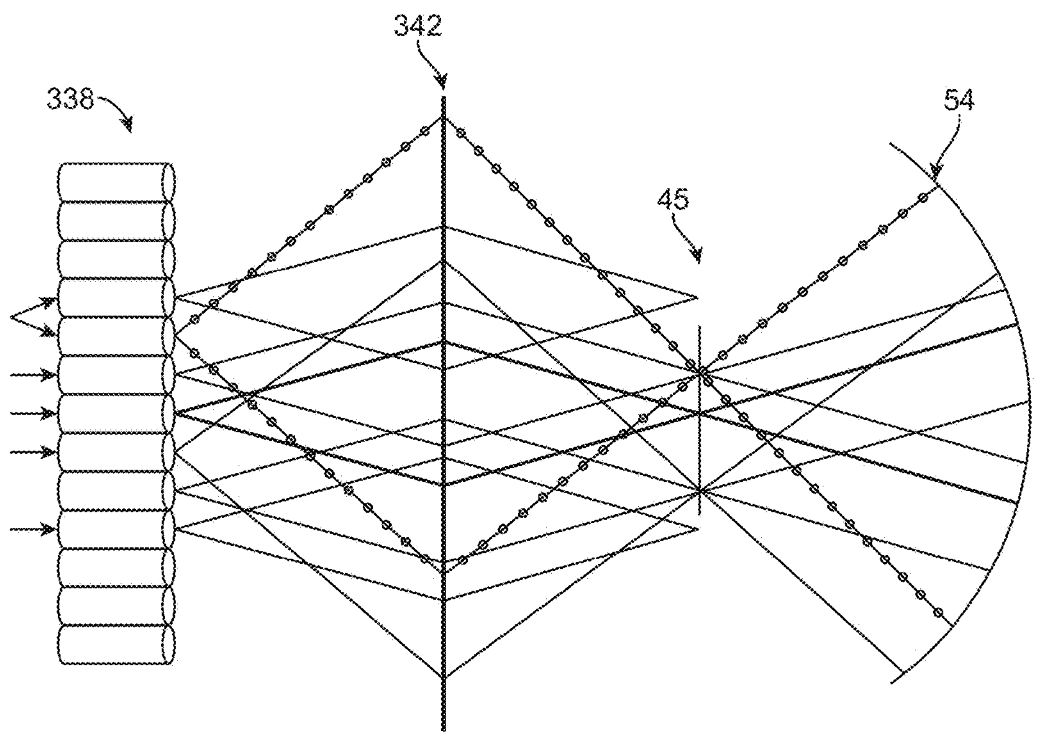

In one variation, a strict image conjugate may be created, as in the embodiment of FIG. 12B, wherein there is direct 1-to-1 mapping of the array 338 with the pupil 45. In another variation, the spacing may be changed between displays in the array and the optical system (lens (342), in FIG. 12B) such that instead of receiving a conjugate mapping of the array to the eye pupil, the eye pupil may be catching the rays from the array at some other distance. With such a configuration, one would still get an angular diversity of beams through which one could create a discretized aggregate wavefront representation, but the mathematics regarding how to drive which ray and at which power and intensity may become more complex (although, on the other hand, such a configuration may be considered simpler from a viewing optics perspective). The mathematics involved with light field image capture may be leveraged for these calculations.

Figure 13A:
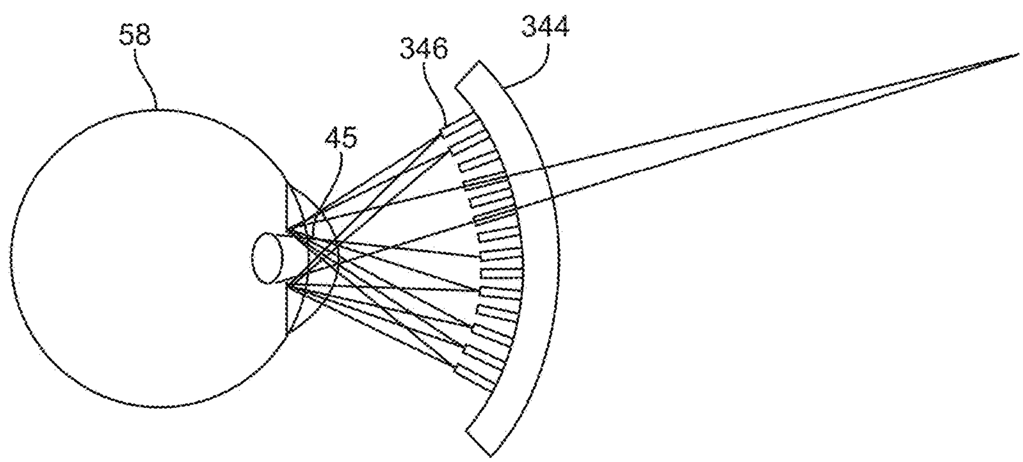
FIGS. 13A-13M illustrate embodiments of coupling microprojectors with optical elements, according to the illustrated embodiments.

Referring to FIG. 13A, another lightfield creating embodiment is depicted wherein an array of microdisplays or microprojectors 346 may be coupled to a frame (344), such as an eyeglasses frame. This configuration may be positioned in front of the eye 58. The depicted configuration is a nonconjugate arrangement wherein there are no large-scale optical elements interposed between the displays (for example, scanning fiber displays) of the array 346 and the eye 58. One can imagine a pair of glasses, and coupled to those glasses are a plurality of displays, such as scanning fiber engines, positioned orthogonal to the eyeglasses surface, and all angled inward so they are pointing at the pupil of the user. Each display may be configured to create a set of rays representing different elements of the beamlet superset.

Figure 13B:
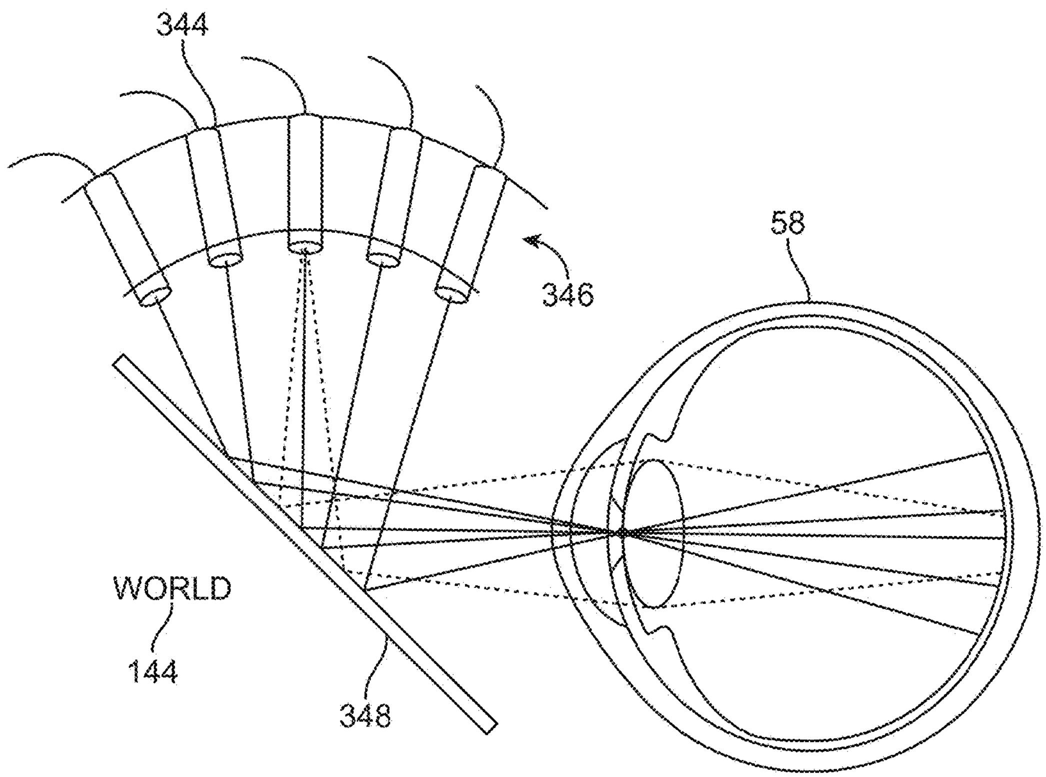

With such a configuration, at the anatomical pupil 45 the user may receive a similar result as received in the embodiments discussed in reference to FIG. 11A, in which every point at the user's pupil is receiving rays with a multiplicity of angles of incidence and points of intersection that are being contributed from the different displays. FIG. 13B illustrates a nonconjugate configuration similar to that of FIG. 13A, with the exception that the embodiment of FIG. 13B features a reflecting surface (348) to facilitate moving the display array 346 away from the eye's 58 field of view, while also allowing views of the real world 144 through the reflective surface (348).

Thus another configuration for creating the angular diversity necessary for a discretized aggregate wavefront display is presented. To optimize such a configuration, the sizes of the displays may be decreased to the maximum. Scanning fiber displays which may be utilized as displays may have baseline diameters in the range of 1 mm, but reduction in enclosure and projection lens hardware may decrease the diameters of such displays to about 0.5 mm or less, which is less disturbing for a user. Another downsizing geometric refinement may be achieved by directly coupling a collimating lens (which may, for example, comprise a gradient refractive index, or "GRIN", lens, a conventional curved lens, or a diffractive lens) to the tip of the scanning fiber itself in a case of a fiber scanning display array. For example, referring to FIG. 13D, a GRIN lens (354) is shown fused to the end of a single mode optical fiber. An actuator 350, such as a piezoelectric actuator, may be coupled to the fiber 352 and may be used to scan the fiber tip.

In another embodiment the end of the fiber may be shaped into a hemispherical shape using a curved polishing treatment of an optical fiber to create a lensing effect. In another embodiment a standard refractive lens may be coupled to the end of each optical fiber using an adhesive. In another embodiment a lens may be built from a dab of transmissive polymeric material or glass, such as epoxy. In another embodiment the end of an optical fiber may be melted to create a curved surface for a lensing effect.

Figures 1, 2, 13C:
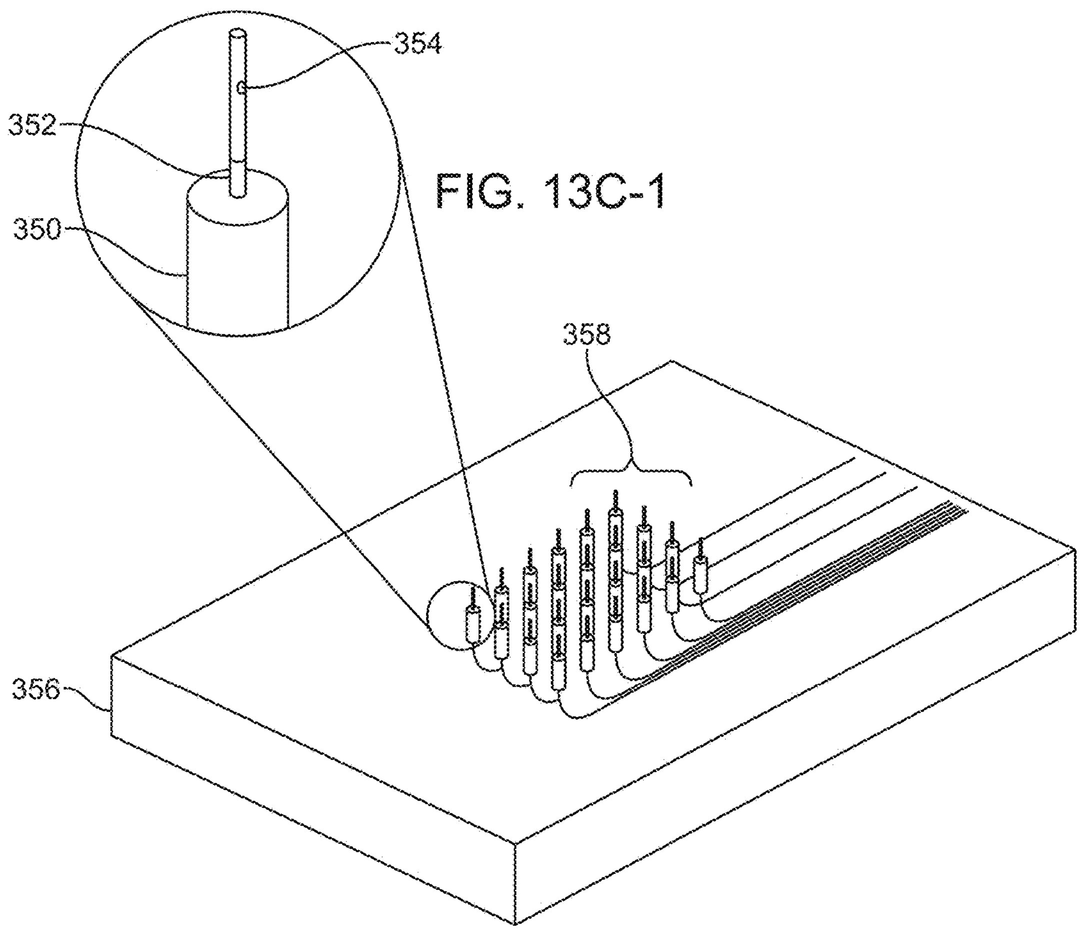
Figure 13D:
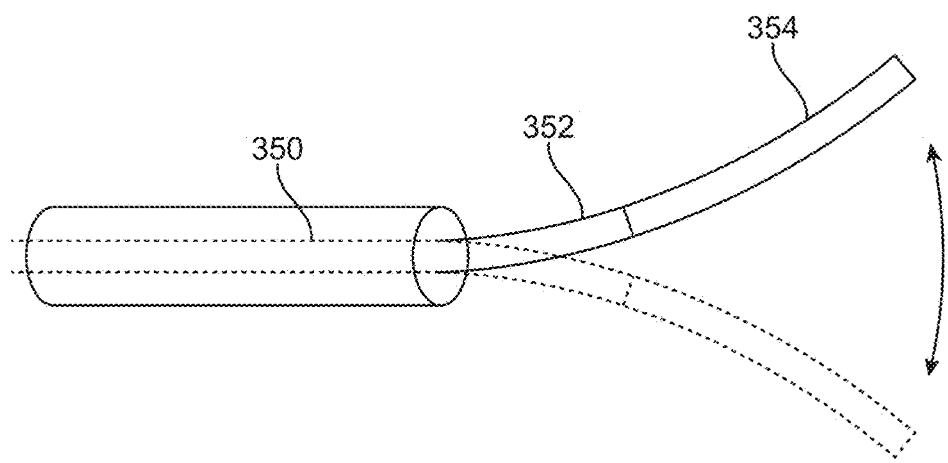

FIG. 13C-2 shows an embodiment wherein display configurations (e.g., scanning fiber displays with GRIN lenses, shown in close-up view of FIG. 13C-1) such as that shown in FIG. 13D may be coupled together through a single transparent substrate 356 preferably having a refractive index that closely matches the cladding of the optical fibers 352 such that the fibers themselves are not substantially visible for viewing of the outside world across the depicted assembly. It should be appreciated that if the index matching of the cladding is done precisely, then the larger cladding/housing becomes transparent and only the small cores, which preferably are about 3 microns in diameter, will be obstructing the view. In one embodiment the matrix 358 of displays may all be angled inward so they are directed toward the anatomic pupil of the user (in another embodiment, they may stay parallel to each other, but such a configuration is less efficient).

Figure 13E:
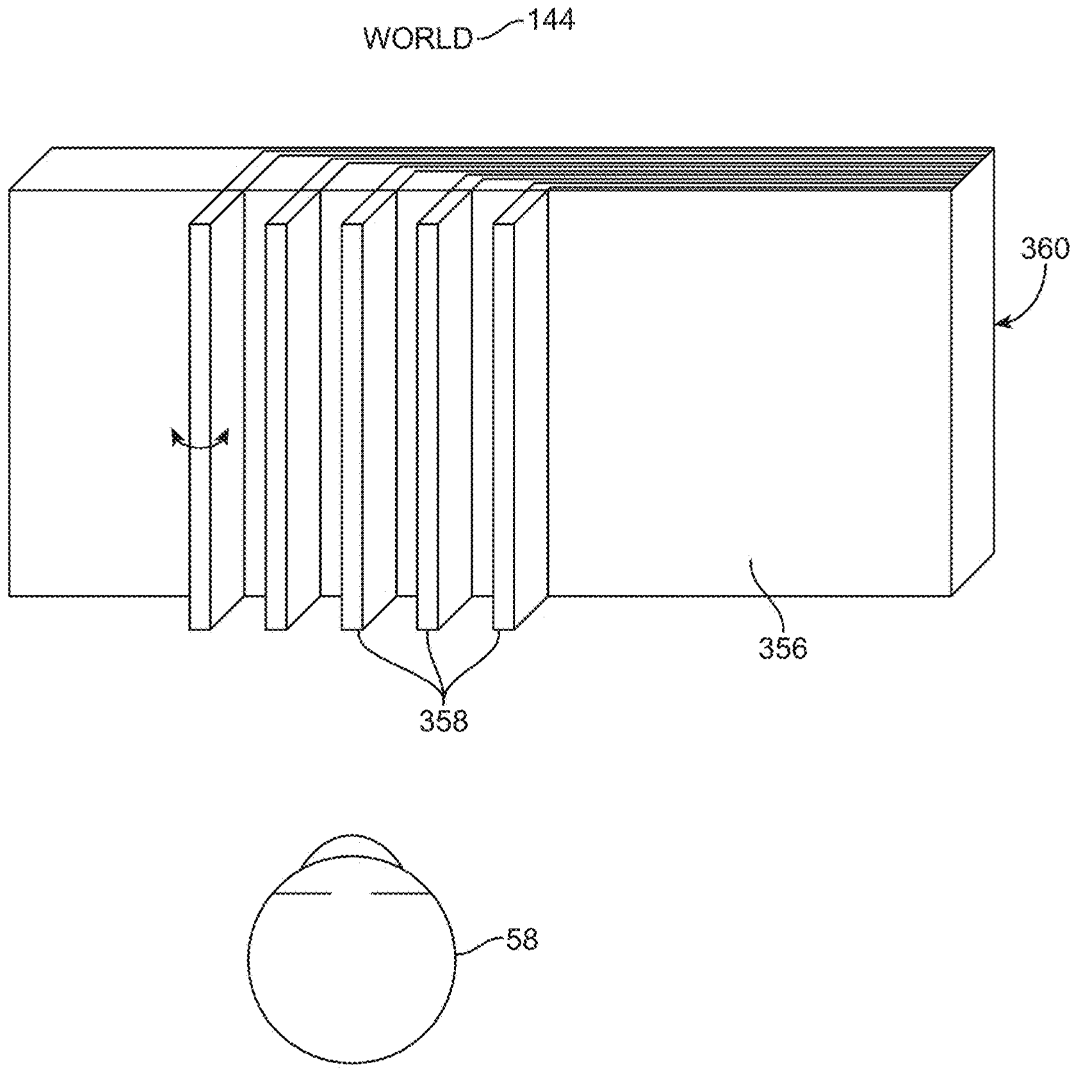

Referring to FIG. 13E, another embodiment is depicted wherein rather than using circular fibers to move cyclically, a thin series of planar waveguides (358) are configured to be cantilevered relative to a larger substrate structure 356. In one variation, the substrate 356 may be moved to produce cyclic motion (e.g., at the resonant frequency of the cantilevered members 358) of the planar waveguides relative to the substrate structure. In another variation, the cantilevered waveguide portions 358 may be actuated with piezoelectric or other actuators relative to the substrate. Image illumination information may be injected, for example, from the right side (360) of the substrate structure to be coupled into the cantilevered waveguide portions (358). In one embodiment the substrate 356 may comprise a waveguide configured (such as with an integrated DOE configuration as described above) to totally internally reflect incoming light 360 along its length and then redirect it to the cantilevered waveguide portions 358. As a person gazes toward the cantilevered waveguide portions (358) and through to the real world 144 behind, the planar waveguides are configured to minimize any dispersion and/or focus changes with their planar shape factors.

Figures 1, 13F:
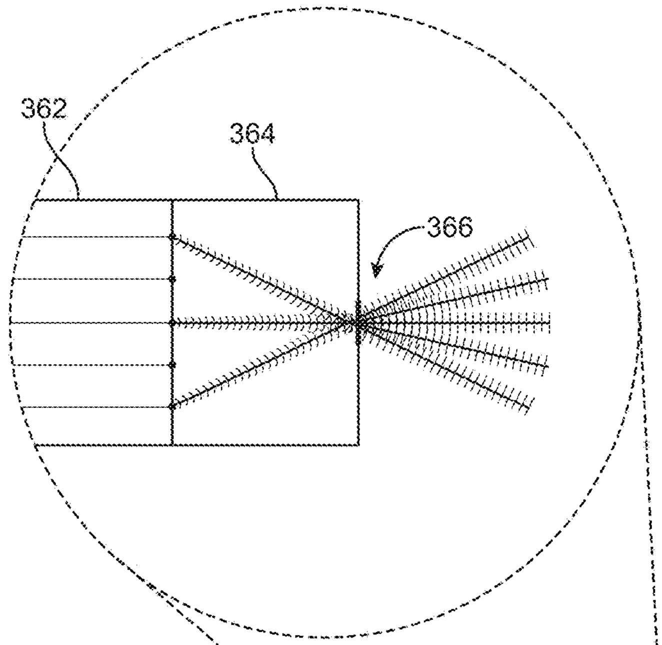
Figures 2, 13F:
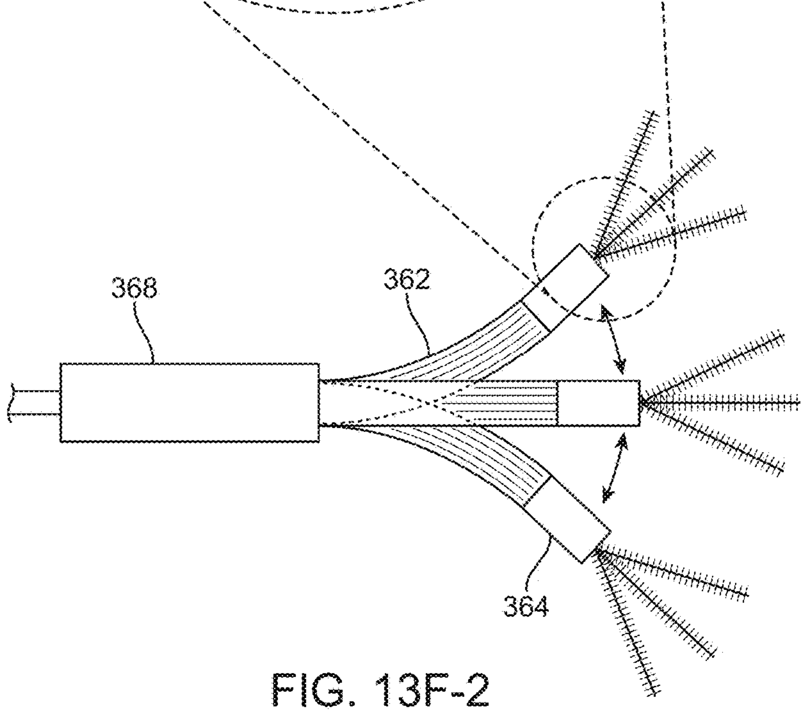

In the context of discretized aggregate wavefront displays, there may be value in having some angular diversity created for every point in the exit pupil of the eye. In other words, it is desirable to have multiple incoming beams to represent each pixel in a displayed image. Referring to FIGS. 13F-1 and 13F-2, one approach to gain further angular and spatial diversity is to use a multicore fiber and place a lens at the exit point, such as a GRIN lens. This may cause exit beams to be deflected through a single nodal point 366. This nodal point 366 may then be scanned back and forth in a scanned fiber type of arrangement (such as by a piezoelectric actuator 368). If a retinal conjugate is placed at the plane defined at the end of the GRIN lens, a display may be created that is functionally equivalent to the general case discretized aggregate wavefront configuration described above.

Figure 13G:
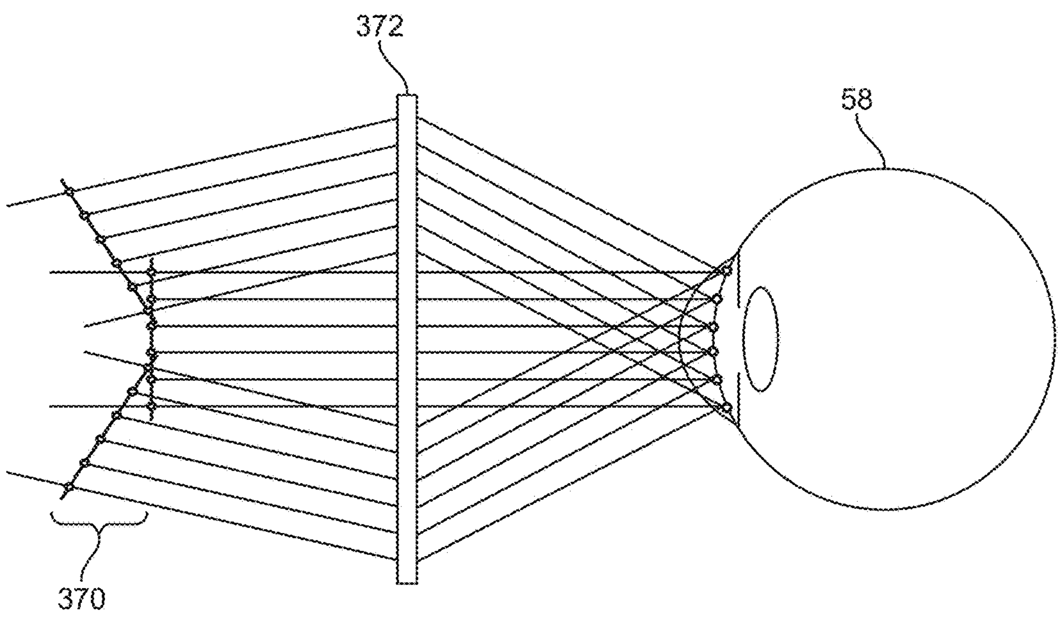
Figure 13H:
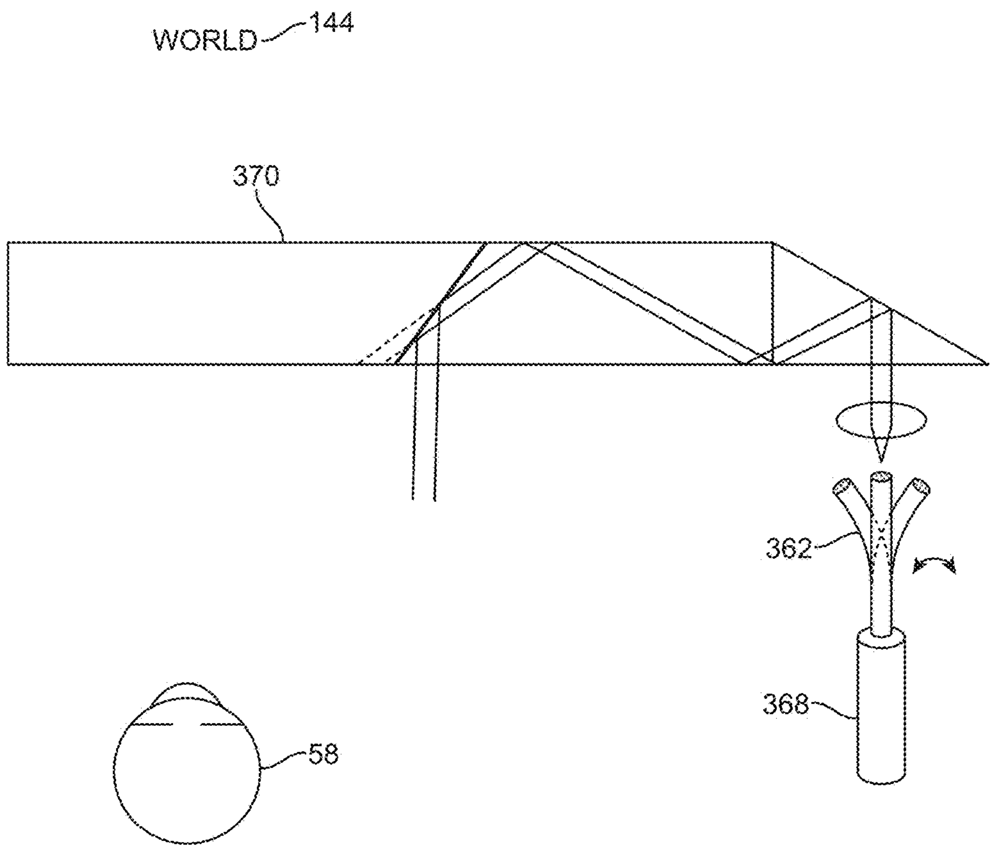
Figure 13I:
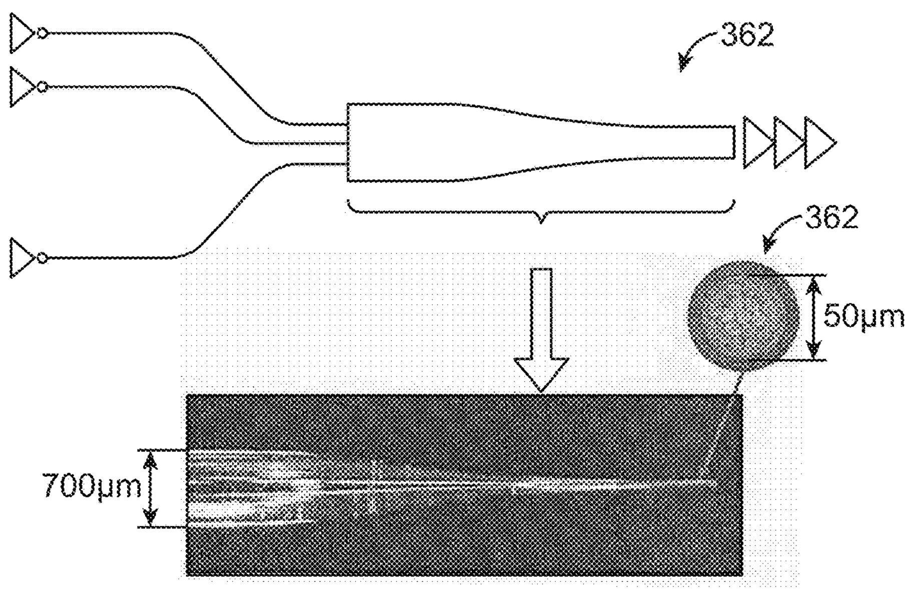
Figure 13J:
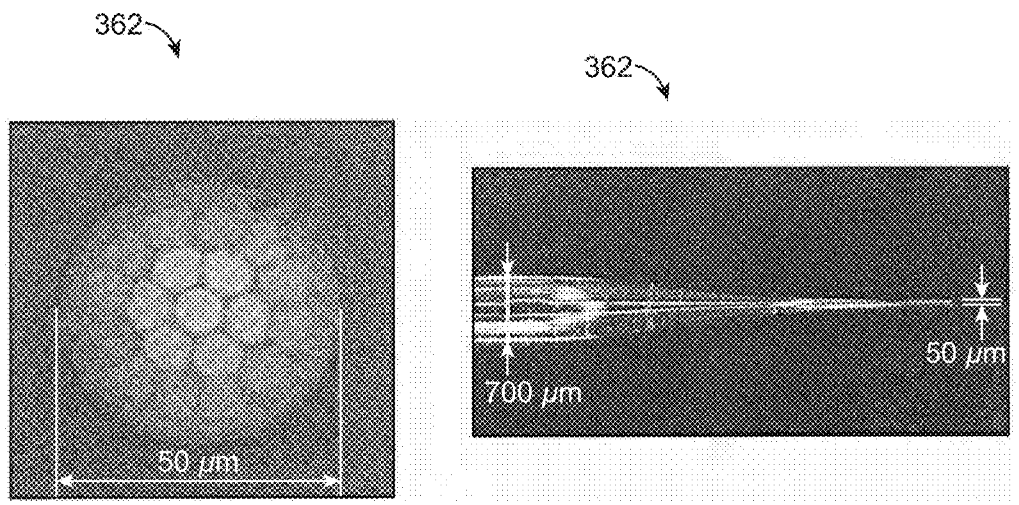
Figure 13K:
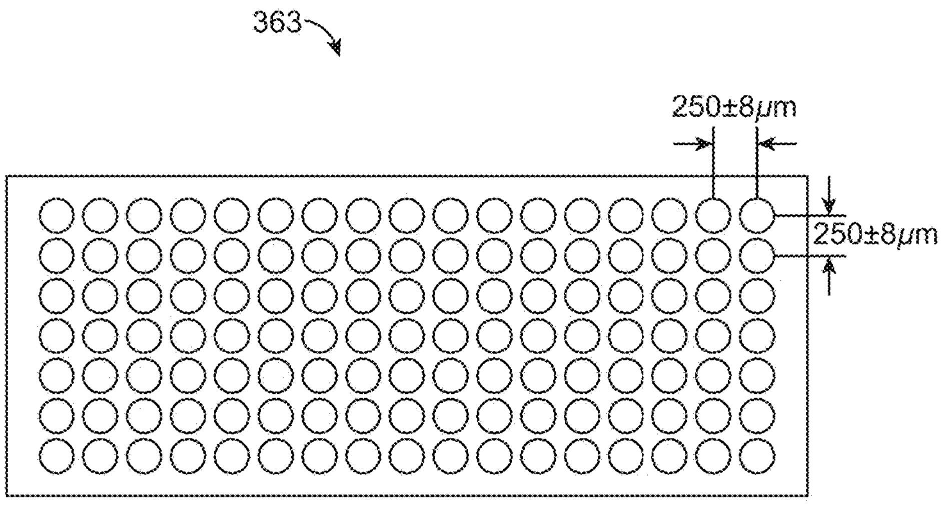
Figure 13L:
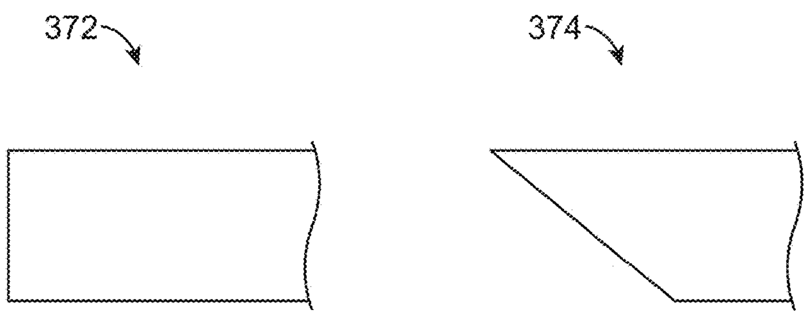

Referring to FIG. 13G, a similar effect may be achieved not by using a lens, but by scanning the face of a multicore system at the correct conjugate of an optical system 372 in order to create a higher angular and spatial diversity of beams. In other words, rather than having a plurality of separately scanned fiber displays (as shown in the bundled example of FIG. 12A described above), some of this requisite angular and spatial diversity may be created through the use of multiple cores to create a plane which may be relayed by a waveguide. Referring to FIG. 13H, a multicore fiber 362 may be scanned (such as by a piezoelectric actuator 368) to create a set of beamlets with a multiplicity of angles of incidence and points of intersection which may be relayed to the eye 58 by a waveguide 370. Thus in one embodiment a collimated lightfield image may be injected into a waveguide, and without any additional refocusing elements, that lightfield display may be translated directly to the human eye.

FIGS. 13I-13L depict certain commercially available multicore fiber 362 configurations (from vendors such as Mitsubishi Cable Industries, Ltd. of Japan), including one variation 363 with a rectangular cross section, as well as variations with flat exit faces 372 and angled exit faces 374.

Figure 13M:
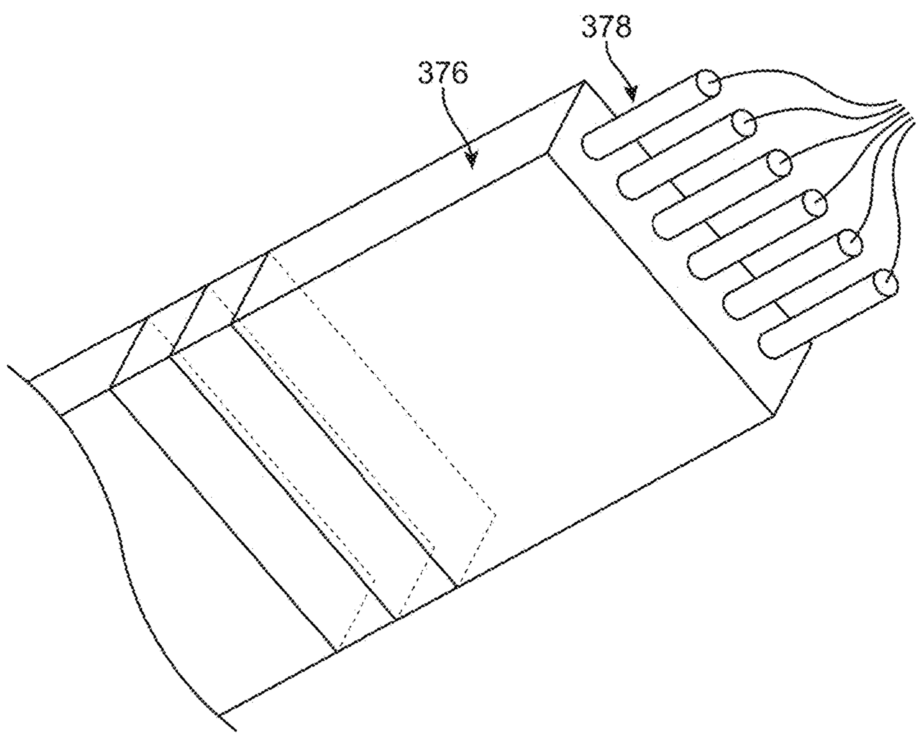

Referring to FIG. 13M, some additional angular diversity may be created by having a waveguide 376 fed with a linear array of displays 378, such as scanning fiber displays.

Referring to FIGS. 14A-14F, another group of configurations for creating a fixed viewpoint lightfield display is described. Referring back to FIG. 11A, if a two-dimensional plane was created that was intersecting all of the small beams coming in from the left, each beamlet would have a certain point of intersection with that plane. If another plane was created at a different distance to the left, then all of the beamlets would intersect that plane at a different location. Referring back to FIG. 14A, if various positions on each of two or more planes are allowed to selectively transmit or block the light radiation directed through it, such a multiplanar configuration may be utilized to selectively create a lightfield by independently modulating individual beamlets.

Figure 14A:
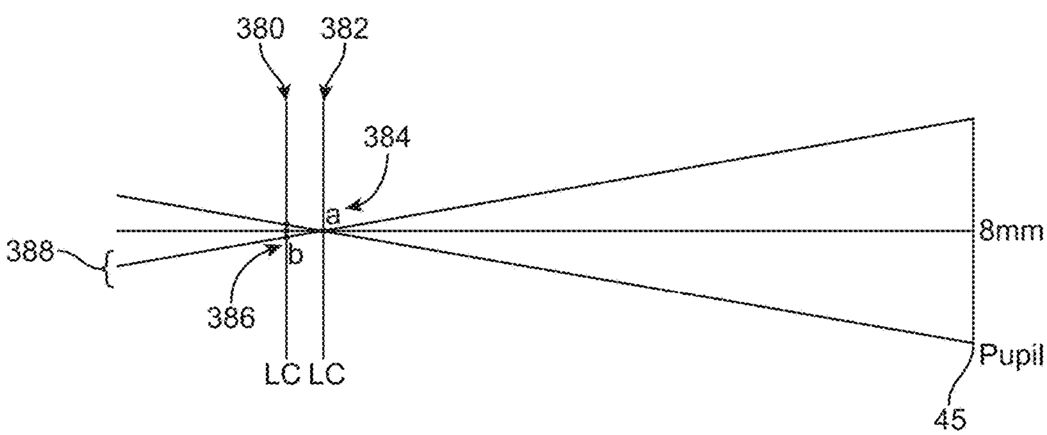
FIGS. 14A-14F illustrate embodiments of spatial light modulators coupled with optical elements, according to the illustrated embodiments.

The basic embodiment of FIG. 14A shows two spatial light modulators, such as liquid crystal display panels (380, 382). In other embodiments, the spatial light modulators may be MEMS shutter displays or DLP DMD arrays. The spatial light modulators may be independently controlled to block or transmit different rays on a high-resolution basis. For example, referring to FIG. 14A, if the second panel 382 blocks or attenuates transmission of rays at point "a" 384, all of the depicted rays will be blocked. However, if only the first panel 380 blocks or attenuates transmission of rays at point "b" 386, then only the lower incoming ray 388 will be blocked/attenuated, while the rest will be transmitted toward the pupil 45.

Each of the controllable panels or planes may be deemed a "spatial light modulator" or "fatte". The intensity of each transmitted beam passed through a series of SLMs will be a function of the combination of the transparency of the various pixels in the various SLM arrays. Thus without any sort of lens elements, a set of beamlets with a multiplicity of angles and points of intersection (or a "lightfield") may be created using a plurality of stacked SLMs. Additional numbers of SLMs beyond two provides more opportunities to control which beams are selectively attenuated.

As noted briefly above, in addition to using stacked liquid crystal displays as SLMs, planes of DMD devices from DLP systems may be stacked to function as SLMs. In one or more embodiments, they may be preferred over liquid crystal systems as SLMs due to their ability to more efficiently pass light (e.g., with a mirror element in a first state, reflectivity to the next element on the way to the eye may be quite efficient; with a mirror element in a second state, the mirror angle may be moved by an angle such as 12 degrees to direct the light away from the path to the eye).

Figure 14B:
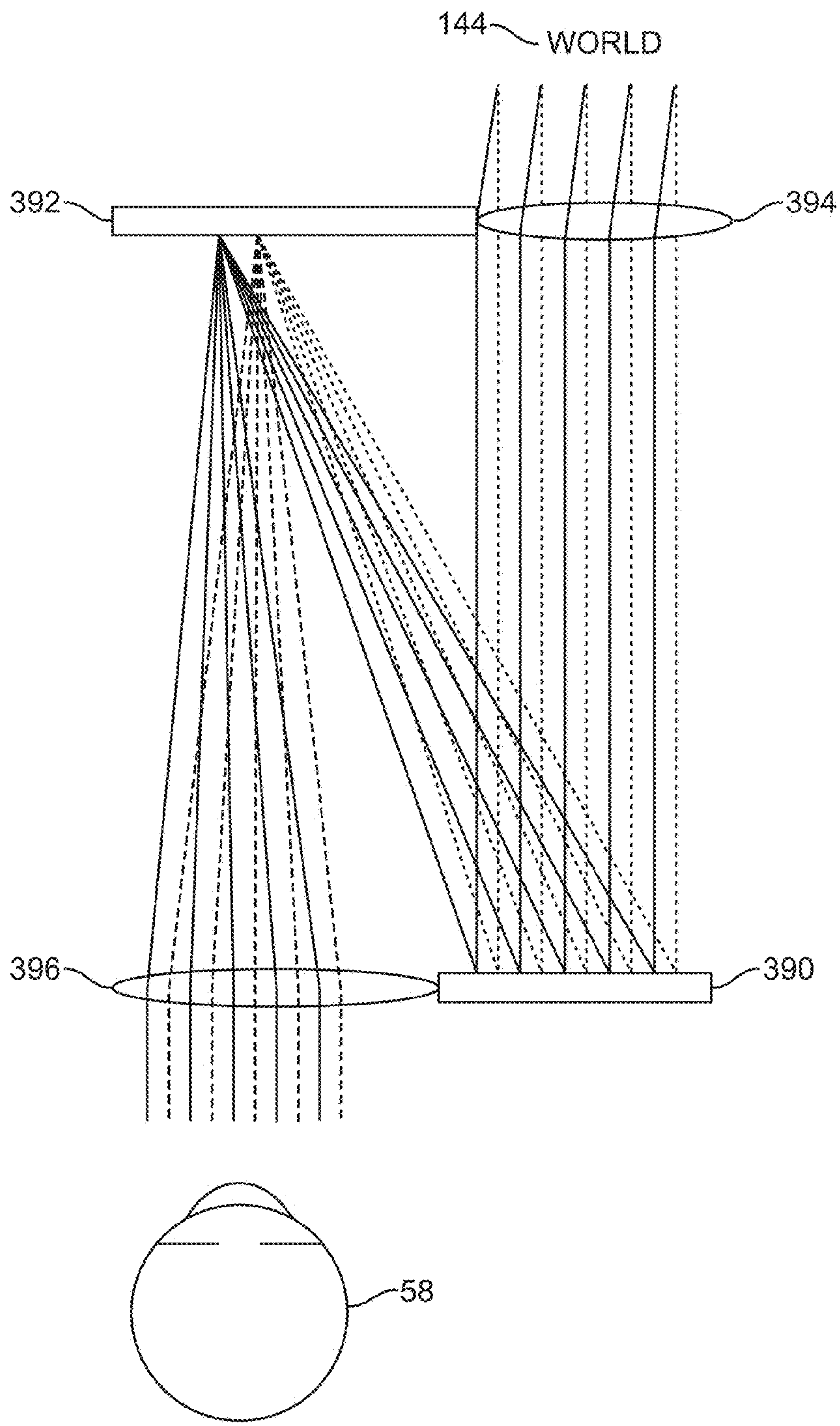
Figure 14C:
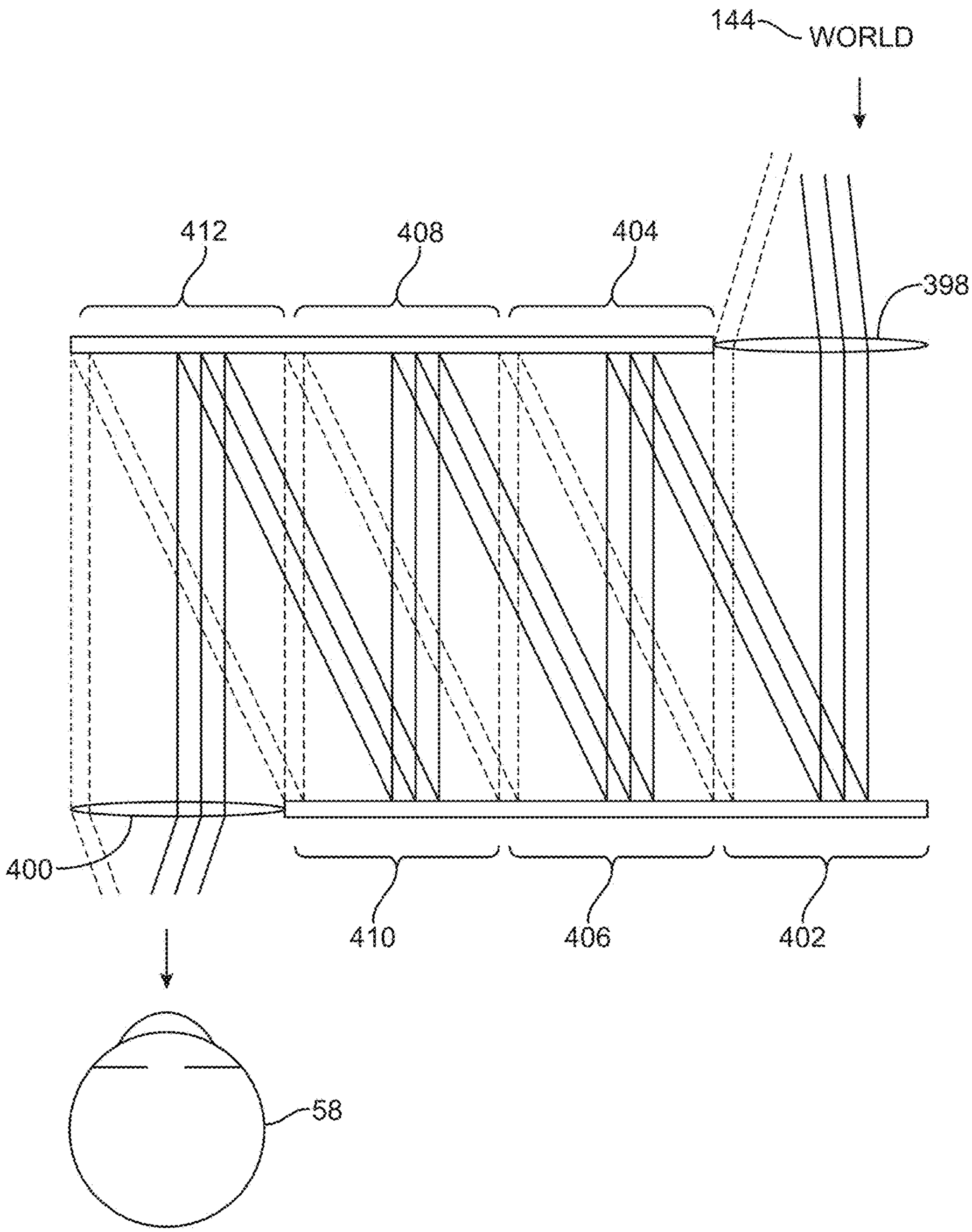

Referring to FIG. 14B, in one DMD embodiment, two DMDs (390, 390) may be utilized in series with a pair of lenses (394, 396) in a periscope type of configuration to maintain a high amount of transmission of light from the real world 144 to the eye 58 of the user. The embodiment of FIG. 14C provides six different DMD (402, 404, 406, 408, 410, 412) plane opportunities to intercede from an SLM functionality as beams are routed to the eye 58, along with two lenses (398, 400) for beam control.

Figure 14D:
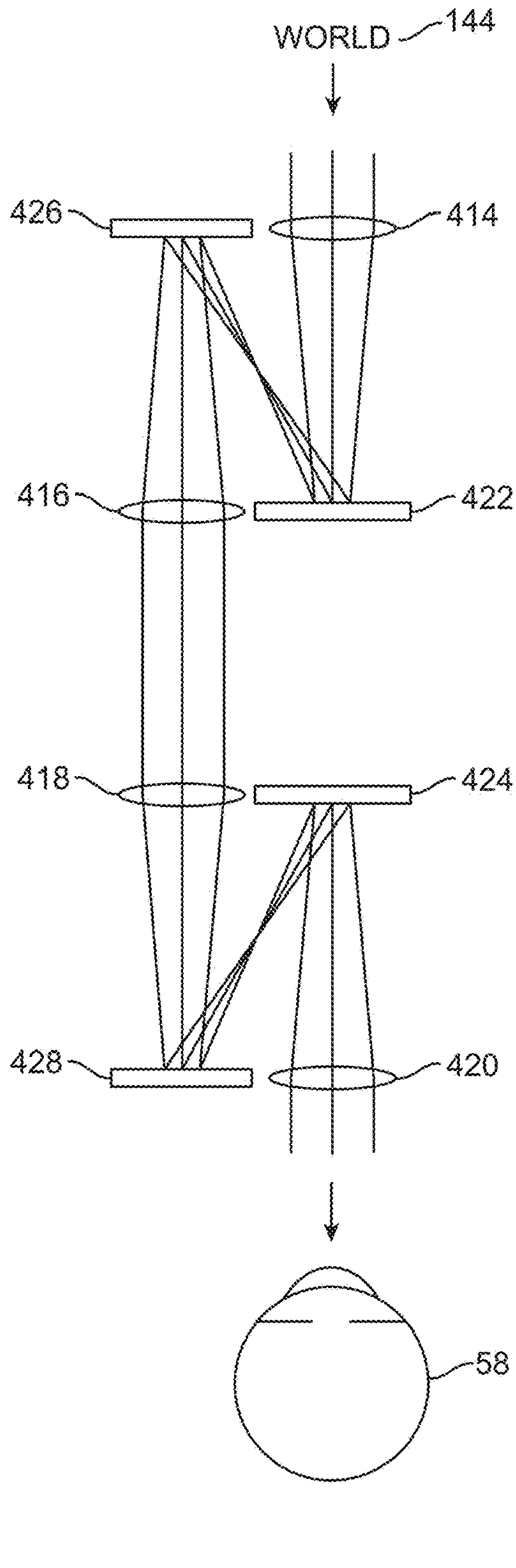
Figure 14E:
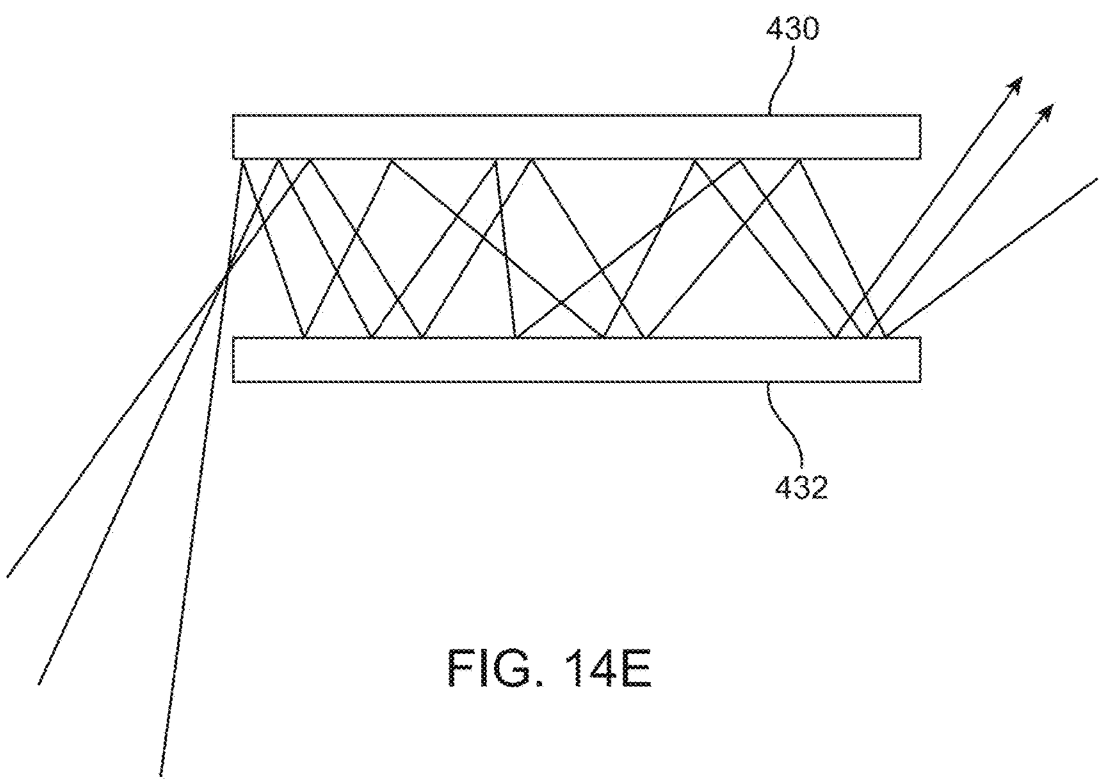

FIG. 14D illustrates a more complicated periscope type arrangement with up to four DMDs (422, 424, 426, 428) for SLM functionality and four lenses (414, 420, 416, 418). This configuration is designed to ensure that the image does not flip upside down as it travels through to the eye 58. FIG. 14E illustrates in embodiment in which light may be reflected between two different DMD devices (430, 432) without any intervening lenses (the lenses in the above designs are useful in such configurations for incorporating image information from the real world), in a hall-of-mirrors type of arrangement wherein the display may be viewed through the "hall of mirrors" and operates in a mode substantially similar to that illustrated in FIG. 14A.

Figure 14F:
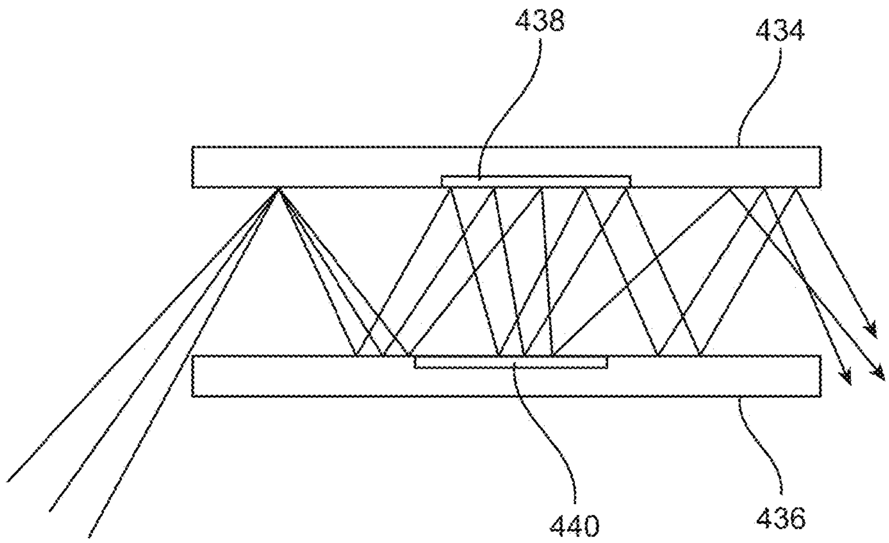

FIG. 14F illustrates an embodiment wherein a the non-display portions of two facing DMD chips (434, 436) may be covered with a reflective layer to propagate light to and from active display regions (438, 440) of the DMD chips. In other embodiments, in place of DMDs for SLM functionality, arrays of sliding MEMS shutters (such as those available from vendors such as Pixtronics, a division of Qualcomm, Inc.) may be utilized to either pass or block light. In another embodiment, arrays of small louvers that move out of place to present light-transmitting apertures may similarly be aggregated for SLM functionality.

A lightfield of many small beamlets (say, less than about 0.5 mm in diameter) may be injected into and propagated through a waveguide or other optical system. For example, a conventional "birdbath" type of optical system may be suitable for transferring the light of a lightfield input, or a freeform optics design, as described below, or any number of waveguide configurations.

Figure 15A:
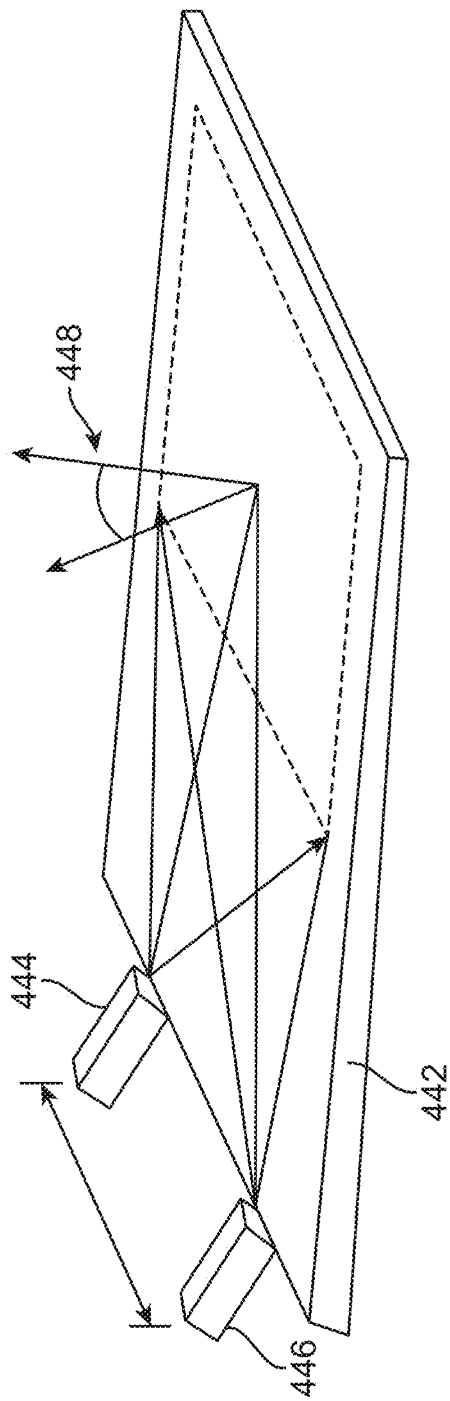
FIGS. 15A-15C illustrate the use of a wedge type waveguides along with a plurality of light sources, according to the illustrated embodiments.
Figure 15B:
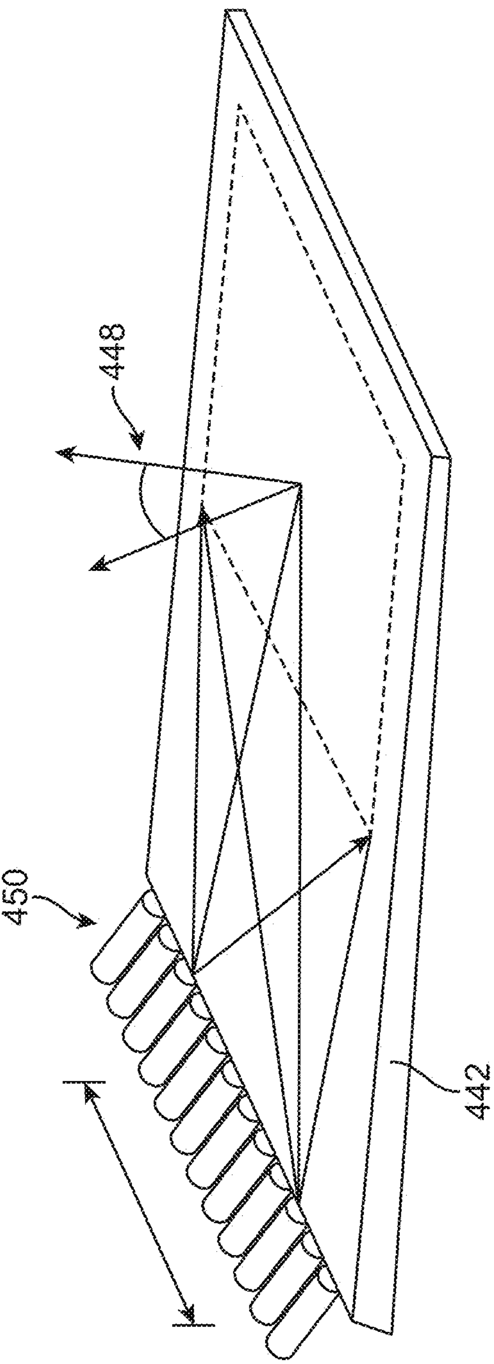
Figure 15C:
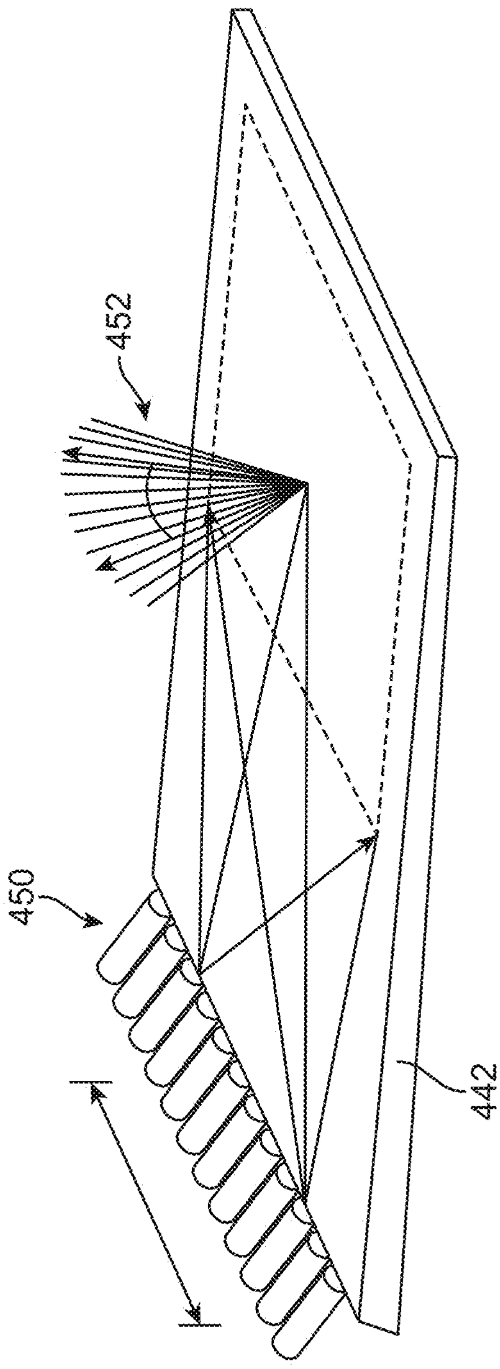

FIGS. 15A-15C illustrate the use of a wedge type waveguide 442 along with a plurality of light sources as another configuration useful in creating a lightfield. Referring to FIG. 15A, light may be injected into the wedge-shaped waveguide 442 from two different locations/displays (444, 446), and will emerge according to the total internal reflection properties of the wedge-shaped waveguide at different angles 448 based upon the points of injection into the waveguide.

Referring to FIG. 15B, if a linear array 450 of displays (such as scanning fiber displays) is created, projecting into the end of the waveguide as shown, then a large angular diversity of beams 452 will be exiting the waveguide in one dimension, as shown in FIG. 15C. Indeed, if yet another linear array of displays injecting into the end of the waveguide is added but at a slightly different angle, then an angular diversity of beams may be created that exits similarly to the fanned out exit pattern shown in FIG. 15C, but at an orthogonal axis. Together, these beams may be utilized to create a two-dimensional fan of rays exiting each location of the waveguide. Thus another configuration is presented for creating angular diversity to form a lightfield display using one or more scanning fiber display arrays (or alternatively using other displays which will meet the space requirements, such as miniaturized DLP projection configurations).

Alternatively, as an input to the wedge-shaped waveguides shown herein, a stack of SLM devices may be utilized, In this embodiment, rather than the direct view of SLM output as described above, the lightfield output from the SLM configuration may be used as an input to a configuration such as that shown in FIG. 15C. It should be appreciated that while a conventional waveguide is best suited to relay beams of collimated light successfully, with a lightfield of small-diameter collimated beams, conventional waveguide technology may be utilized to further manipulate the output of such a lightfield system as injected into the side of a waveguide, such as a wedge-shaped waveguide, due to the beam size/collimation.

In another related embodiment, rather than projecting with multiple separate displays, a multicore fiber may be used to generate a lightfield and inject it into the waveguide. Further, a time-varying lightfield may be utilized as an input, such that rather than creating a static distribution of beamlets coming out of a lightfield, dynamic elements that are methodically changing the path of the set of beams may also be introduced. This may be accomplished by using components such as waveguides with embedded DOEs (e.g., such as those described above in reference to FIGS. 8B-8N, or liquid crystal layers, as described in reference to FIG. 7B), in which two optical paths are created.

One path is a smaller total internal reflection path wherein a liquid crystal layer is placed in a first voltage state to have a refractive index mismatch with the other substrate material that causes total internal reflection down just the other substrate material's waveguide. Another path is a larger total internal reflection optical path wherein the liquid crystal layer is placed in a second voltage state to have a matching refractive index with the other substrate material, such that the light totally internally reflects through the composite waveguide which includes both the liquid crystal portion and the other substrate portion.

Similarly a wedge-shaped waveguide may be configured to have a bi-modal total internal reflection paradigm. For example, in one variation, wedge-shaped elements may be configured such that when a liquid crystal portion is activated, not only is the spacing changed, but also the angle at which the beams are reflected.

One embodiment of a scanning light display may be characterized simply as a scanning fiber display with a lens at the end of the scanned fiber. Many lens varieties are suitable, such as a GRIN lens, which may be used to collimate the light or to focus the light down to a spot smaller than the fiber's mode field diameter providing the advantage of producing a numerical aperture (or "NA") increase and circumventing the optical invariant, which is correlated inversely with spot size.

Smaller spot size generally facilitates a higher resolution opportunity from a display perspective, which generally is preferred. In one embodiment, a GRIN lens may be long enough relative to the fiber that it may comprise the vibrating element (e.g., rather than the usual distal fiber tip vibration with a scanned fiber display).

In another embodiment, a diffractive lens may be utilized at the exit end of a scanning fiber display (e.g., patterned onto the fiber). In another embodiment, a curved mirror may be positioned on the end of the fiber that operates in a reflecting configuration. Essentially any of the configurations known to collimate and focus a beam may be used at the end of a scanning fiber to produce a suitable scanned light display.

Two significant utilities to having a lens coupled to or comprising the end of a scanned fiber (e.g., as compared to configurations wherein an uncoupled lens may be utilized to direct light after it exits a fiber) are (a) the light exiting may be collimated to obviate the need to use other external optics to do so, and (b) the NA, or the angle of the cone at which light sprays out the end of the single-mode fiber core, may be increased, thereby decreasing the associated spot size for the fiber and increasing the available resolution for the display.

As described above, a lens such as a GRIN lens may be fused to or otherwise coupled to the end of an optical fiber or formed from a portion of the end of the fiber using techniques such as polishing. In one embodiment, a typical optical fiber with an NA of about 0.13 or 0.14 may have a spot size (also known as the "mode field diameter" for the optical fiber given the numerical aperture (NA)) of about 3 microns. This provides for relatively high resolution display possibilities given the industry standard display resolution paradigms (for example, a typical microdisplay technology such as LCD or organic light emitting diode, or "OLED" has a spot size of about 5 microns). Thus the aforementioned scanning light display may have 3/5 of the smallest pixel pitch available with a conventional display. Further, using a lens at the end of the fiber, the aforementioned configuration may produce a spot size in the range of 1-2 microns.

In another embodiment, rather than using a scanned cylindrical fiber, a cantilevered portion of a waveguide (such as a waveguide created using microfabrication processes such as masking and etching, rather than drawn microfiber techniques) may be placed into scanning oscillatory motion, and may be fitted with lensing at the exit ends.

In another embodiment, an increased numerical aperture for a fiber to be scanned may be created using a diffuser (e.g., one configured to scatter light and create a larger NA) covering the exit end of the fiber. In one variation, the diffuser may be created by etching the end of the fiber to create small bits of terrain that scatter light. In another variation, a bead or sandblasting technique, or direct sanding/scuffing technique may be utilized to create scattering terrain. In yet another variation, an engineered diffuser, similar to a diffractive element, may be created to maintain a clean spot size with desirable NA.

Figure 16A:
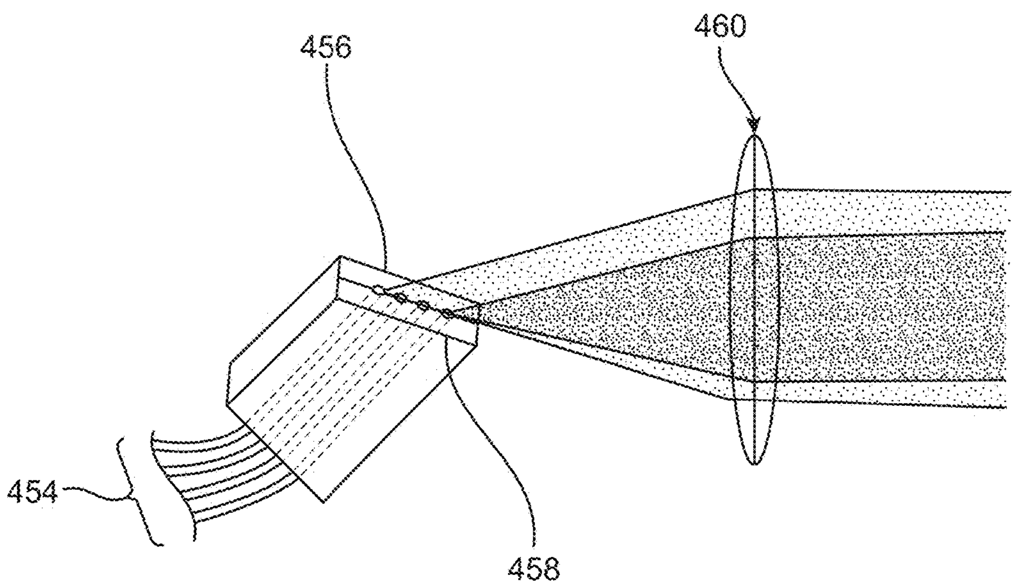
FIGS. 16A-16O illustrate embodiments of coupling optical elements to optical fibers, according to the illustrated embodiments.
Figure 16B:
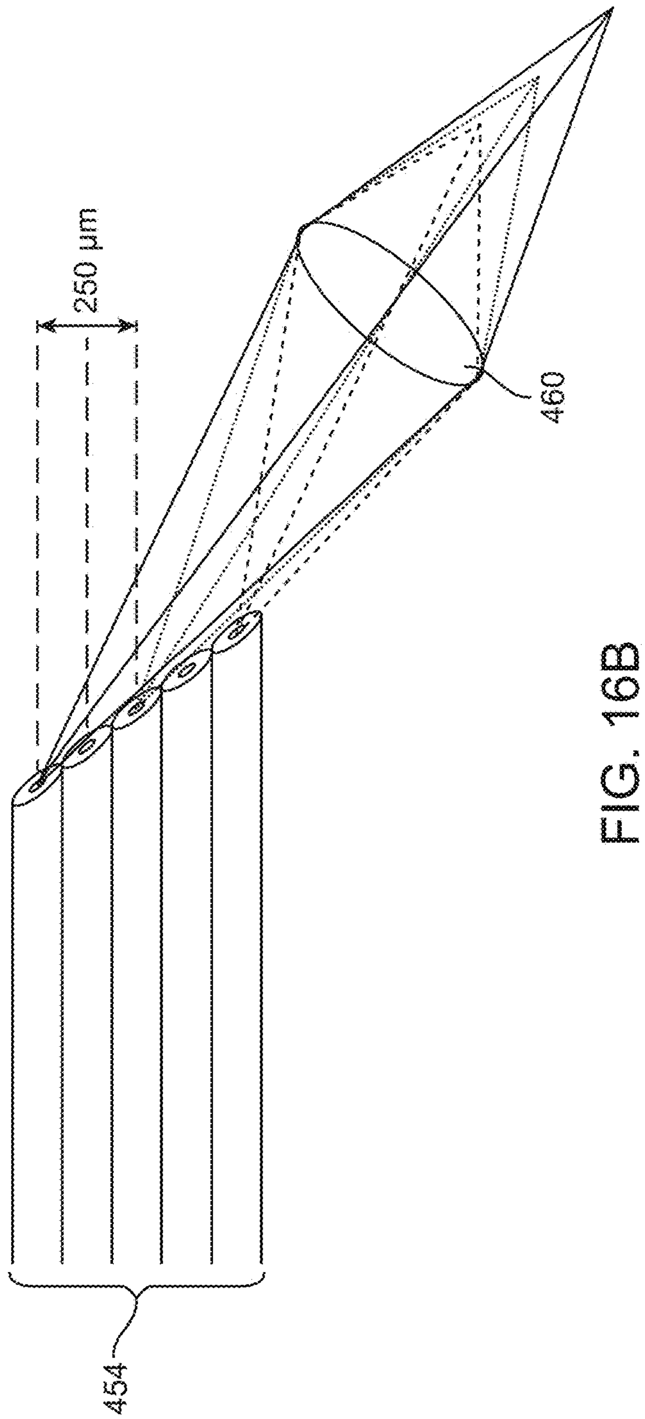

Referring to FIG. 16A, an array of optical fibers 454 is shown coupled in to a coupler 456 configured to hold them in parallel together so that their ends may be ground and polished to have an output edge at a critical angle (458; 42 degrees for most glass, for example) to the longitudinal axes of the input fibers, such that the light exiting the angled faces will exit as though it had been passing through a prism, and will bend and become nearly parallel to the surfaces of the polished faces. The beams exiting the fibers 460 in the bundle will become superimposed, but will be out of phase longitudinally due to the different path lengths (referring to FIG. 16B, for example, the difference in path lengths from angled exit face to focusing lens for the different cores is visible).

What was an X axis type of separation in the bundle before exit from the angled faces, will become a Z axis separation. This fact is helpful in creating a multifocal light source from such a configuration. In another embodiment, rather than using a bundled/coupled plurality of single mode fibers, a multicore fiber, such as those available from Mitsubishi Cable Industries, Ltd. of Japan, may be angle polished.

In one embodiment, if a 45 degree angle is polished into a fiber and then covered with a reflective element, such as a mirror coating, the exiting light may be reflected from the polished surface and emerge from the side of the fiber (in one embodiment at a location wherein a flat-polished exit window has been created in the side of the fiber) such that as the fiber is scanned, it is functionally scanned in an equivalent of an X-Y scan rather than an X-Y scan, with the distance changing during the course of the scan. Such a configuration may be beneficially utilized to change the focus of the display as well.

Multicore fibers may be configured to play a role in display resolution enhancement (e.g., higher resolution). For example, in one embodiment, if separate pixel data is sent down a tight bundle of 19 cores in a multicore fiber, and that cluster is scanned around in a sparse spiral pattern with the pitch of the spiral being approximately equal to the diameter of the multicore, then sweeping around will effectively create a display resolution that is approximately 19× the resolution of a single core fiber being similarly scanned around. Indeed, it may be more practical to arrange the fibers more sparsely positioned relative to each other, as in the configuration of FIG. 16C, which has 7 clusters 464. It should be appreciated that seven clusters is used for illustrative purposes because it is an efficient tiling/hex pattern, and other patterns or numbers may be utilized (e.g., a cluster of 19). The configuration is scalable (up or down) of 3 fibers each housed within a conduit 462.

Figure 16C:
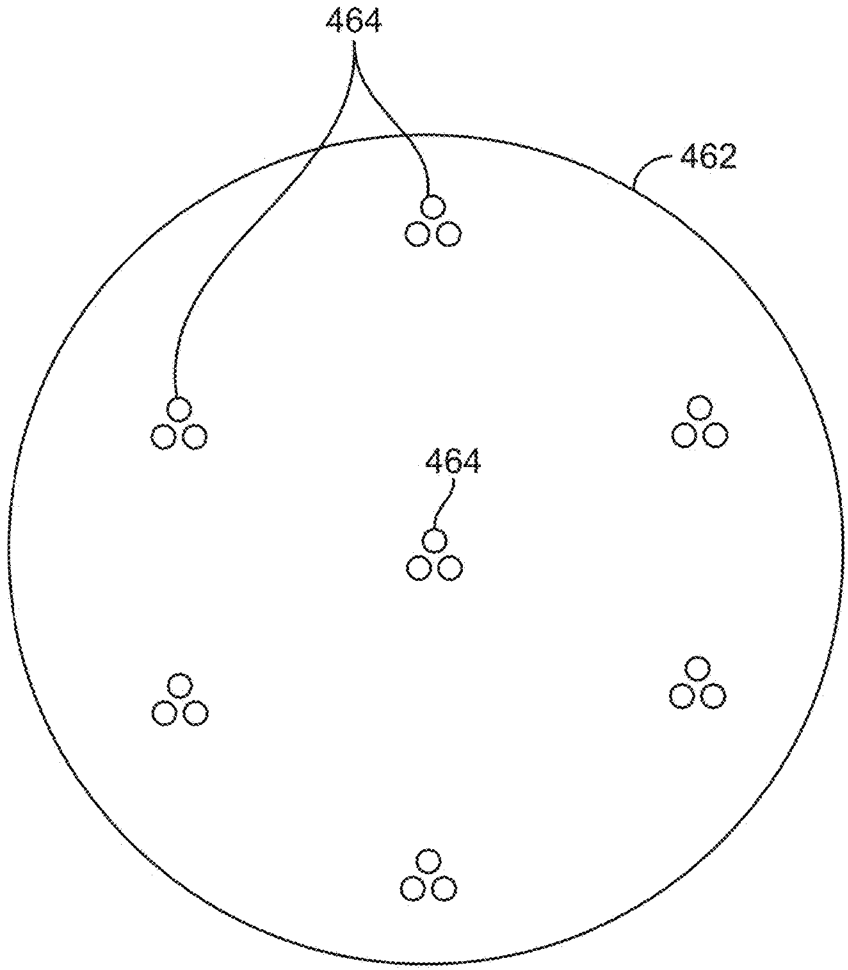

With a sparse configuration as shown in FIG. 16C, scanning of the multicore scans each of the cores through its own local region, as opposed to a configuration wherein the cores are all packed tightly together and scanned. The cores may overlap with scanning if the cores are overly proximate to each other, and the NA of the core is not large enough, the very closely packed cores may cause blurring with each other, thereby not creating as discriminable a spot for display. Thus, for resolution increases, it is preferable to have sparse tiling rather than highly dense tiling, although both approaches may be utilized.

The notion that densely packed scanned cores can create blurring at the display may be utilized as an advantage in one embodiment wherein a plurality (say a triad or cores to carry red, green, and blue light) of cores are intentionally packed together densely such that each triad forms a triad of overlapped spots featuring red, green, and blue light. With such a configuration, one is able to have an RGB display without having to combine red, green, and blue into a single-mode core, which is an advantage, because conventional mechanisms for combining a plurality (such as three) wavelets of light into a single core are subject to significant losses in optical energy.

Referring to FIG. 16C, in one embodiment each tight cluster of 3 fiber cores contains one core that relays red light, one core that relays green light, and one core that relays blue light, with the 3 fiber cores close enough together that their positional differences are not resolvable by the subsequent relay optics, forming an effectively superimposed RGB pixel; thus, the sparse tiling of 7 clusters produces resolution enhancement while the tight packing of 3 cores within the clusters facilitates seamless color blending without the need to utilize glossy RGB fiber combiners (e.g., those using wavelength division multiplexing or evanescent coupling techniques).

Figure 16D:
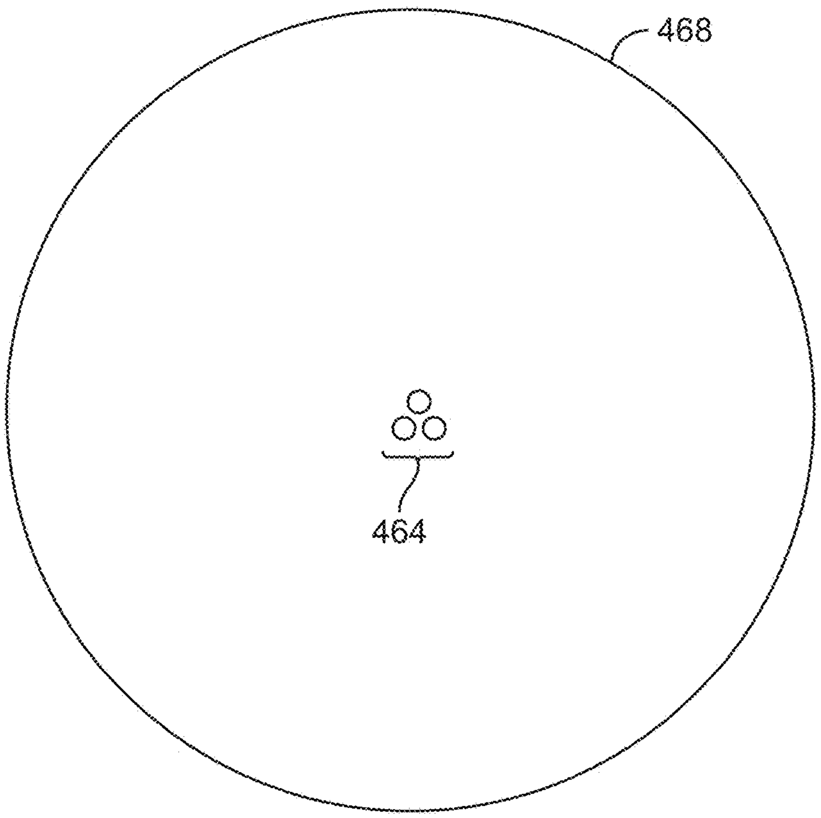

Referring to FIG. 16D, in another more simple variation, one may have just one cluster 464 housed in a conduit 468 for, say, red/green/blue (and in another embodiment, another core may be added for infrared for uses such as eye tracking). In another embodiment, additional cores may be placed in the tight cluster to carrying additional wavelengths of light to comprise a multi-primary display for increased color gamut.

Figure 16E:
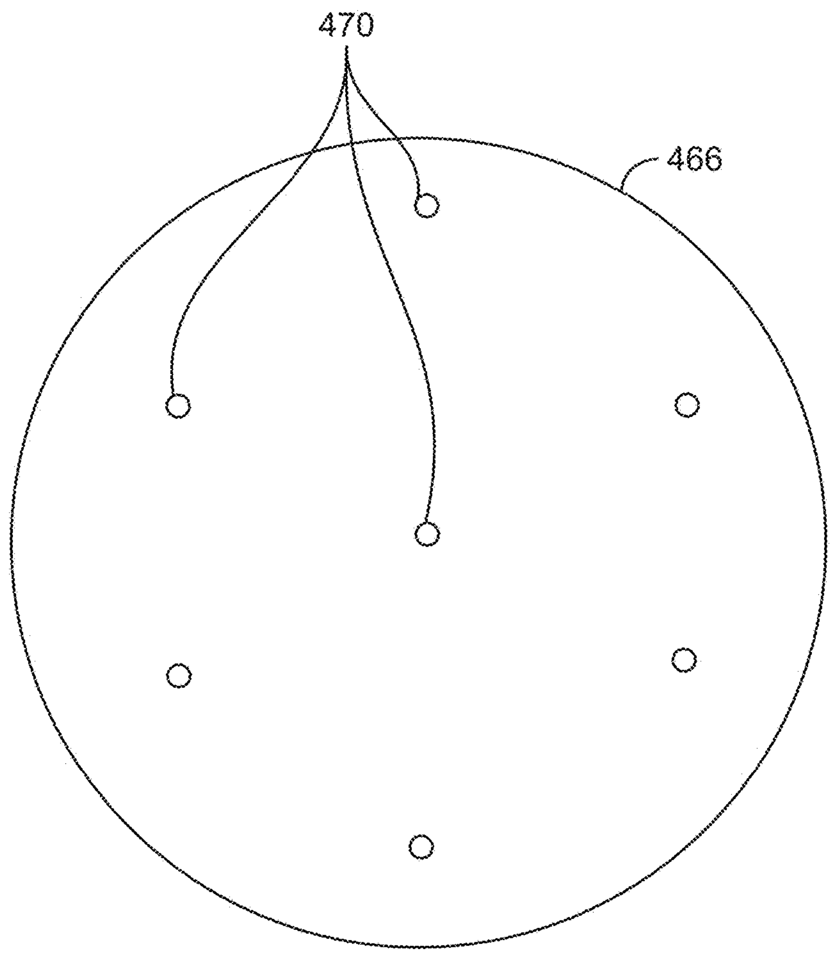

Referring to FIG. 16E, in another embodiment, a sparse array of single cores 470 within a conduit 466 may be utilized (e.g., in one variation with red, green, and blue combined down each of them). Such a configuration is workable albeit somewhat less efficient for resolution increase, but not optimum for red/green/blue combining.

Multicore fibers also may be utilized for creating lightfield displays. Indeed, rather than keeping the cores separated enough from each other such that the cores do not scan on each other's local area at the display panel, as described above in the context of creating a scanning light display, with a lightfield display, it may be desirable to scan around a densely packed plurality of fibers. This is because each of the beams produced represents a specific part of the lightfield. The light exiting from the bundled fiber tips can be relatively narrow if the fibers have a small NA.

Lightfield configurations may take advantage of this and utilize an arrangement in which a plurality of slightly different beams are being received from the array at the anatomic pupil. Thus there are optical configurations with scanning a multicore that are functionally equivalent to an array of single scanning fiber modules, and thus a lightfield may be created by scanning a multicore rather than scanning a group of single mode fibers.

In one embodiment, a multi-core phased array approach may be used to create a large exit pupil variable wavefront configuration to facilitate three-dimensional perception. A single laser configuration with phase modulators is described above. In a multicore embodiment, phase delays may be induced into different channels of a multicore fiber, such that a single laser's light is injected into all of the cores of the multicore configuration so that there is mutual coherence.

Figure 16F:
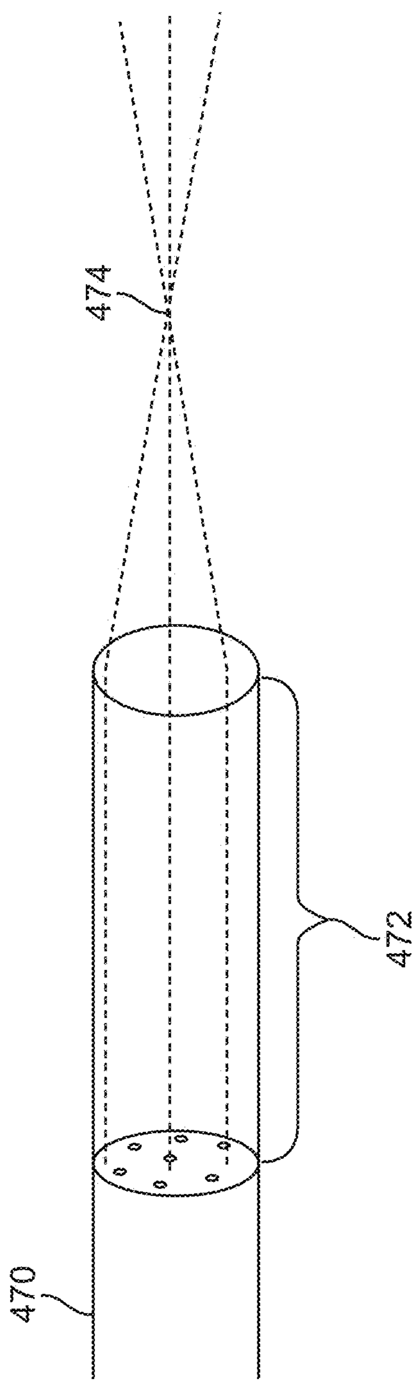

In one embodiment, a multi-core fiber may be combined with a lens, such as a GRIN lens. Such a lens may be, for example, a refractive lens, diffractive lens, or a polished edge functioning as a lens. The lens may be a single optical surface, or may comprise multiple optical surfaces stacked up. Indeed, in addition to having a single lens that extends the diameter of the multicore, a smaller lenslet array may be desirable at the exit point of light from the cores of the multicore, for example. FIG. 16F shows an embodiment wherein a multicore fiber 470 is emitting multiple beams into a lens 472, such as a GRIN lens. The lens collects the beams down to a focal point 474 in space in front of the lens. In many conventional configurations, the beams exiting the multicore fiber may be diverging. The GRIN or other lens is configured to function to direct them down to a single point and collimate them, such that the collimated result may be scanned around for a lightfield display, for instance.

Figure 16G:
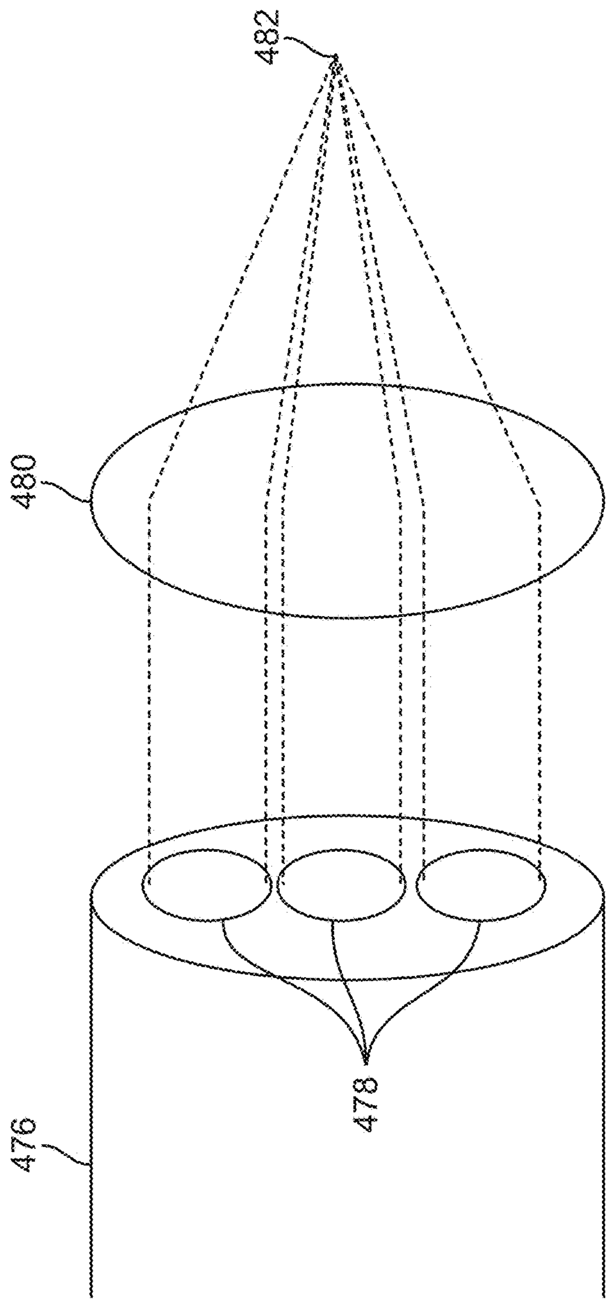

Referring to FIG. 16G, smaller lenses 478 may be placed in front of each of the cores of a multicore 476 configuration, and these lenses may be utilized to collimate the rays. In addition, a shared lens 480 may be configured to focus the collimated beams down to a diffraction limited spot 482 that is aligned for all of the three spots. By combining three collimated, narrow beams with narrow NA together as shown, one effectively combines all three into a much larger angle of emission which translates to a smaller spot size in, for example, a head mounted optical display system.

Figure 16H:
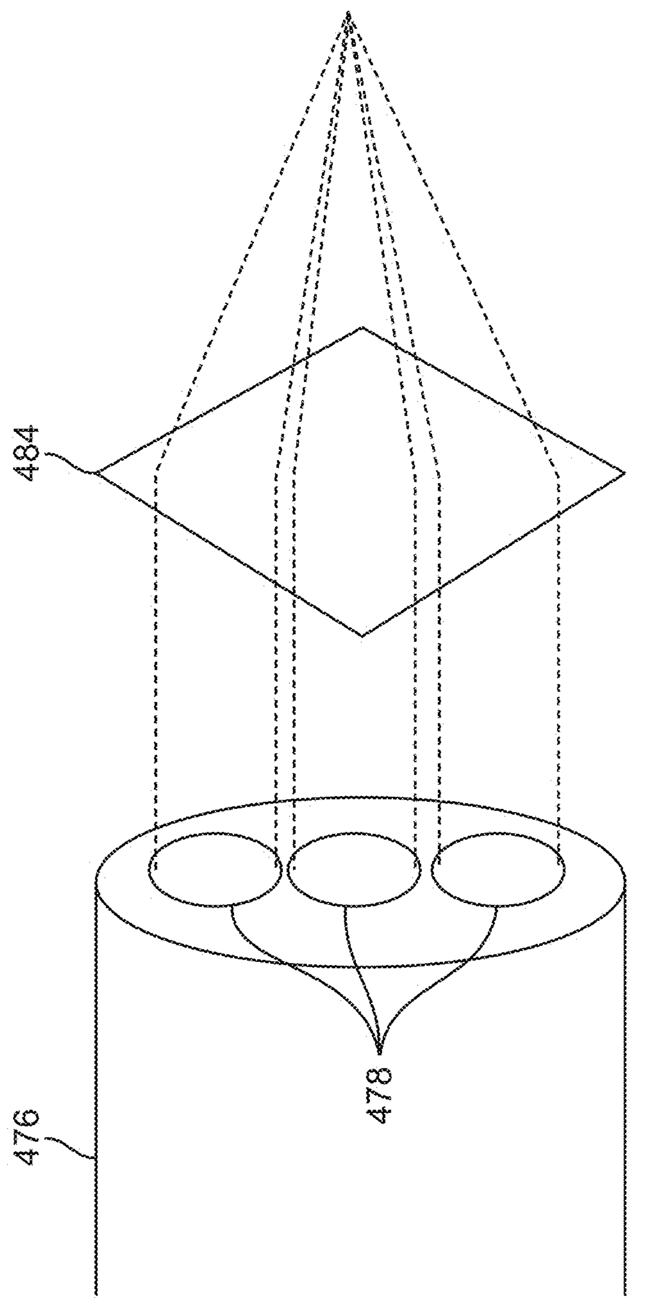

Referring to FIG. 16H, one embodiment features a multicore fiber 476 with a lenslet 478 array feeding the light to a small prism array 484 that deflects the beams generated by the individual cores to a common point. Alternatively one may have the small lenslet array shifted relative to the cores such that the light is being deflected and focused down to a single point. Such a configuration may be utilized to increase the NA.

Figure 16I:
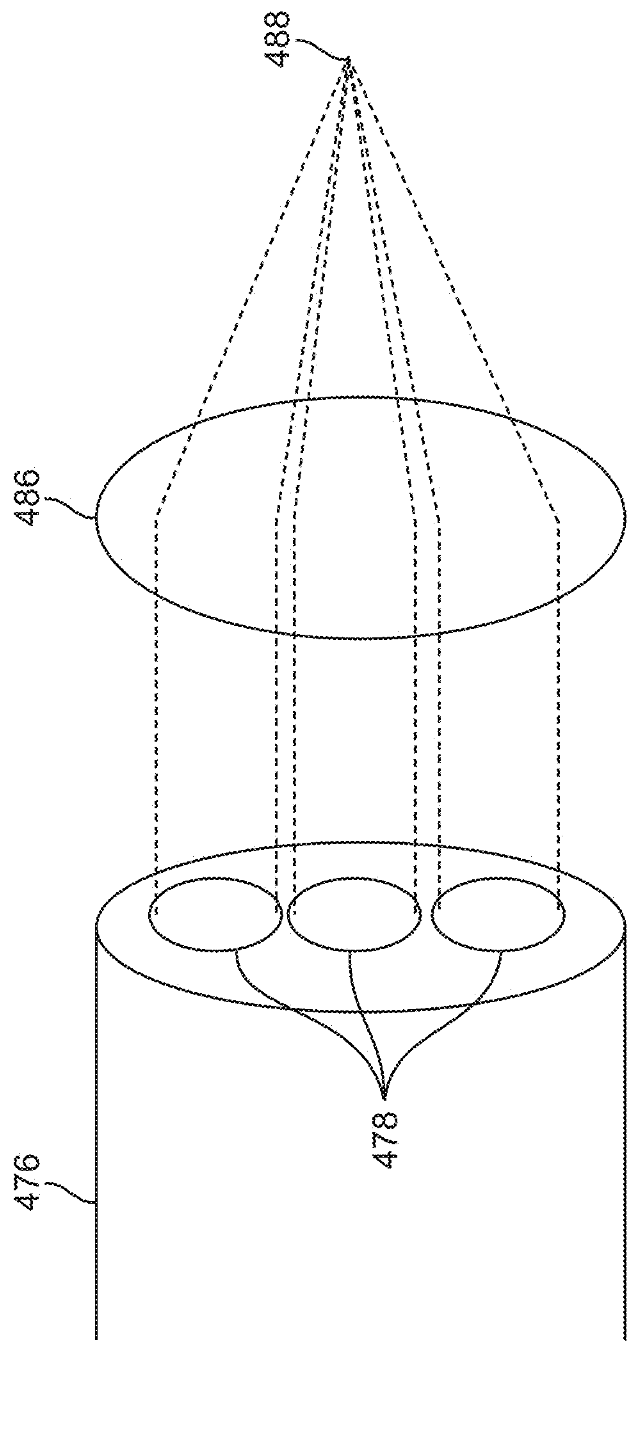

Referring to FIG. 16I, a two-step configuration is shown with a small lenslet 478 array capturing light from the multicore fiber 476, followed sequentially by a shared lens 486 to focus the beams to a single point 488. Such a configuration may be utilized to increase the numerical aperture. As discussed above, a larger NA corresponds to a smaller pixel size and higher possible display resolution.

Figure 16J:
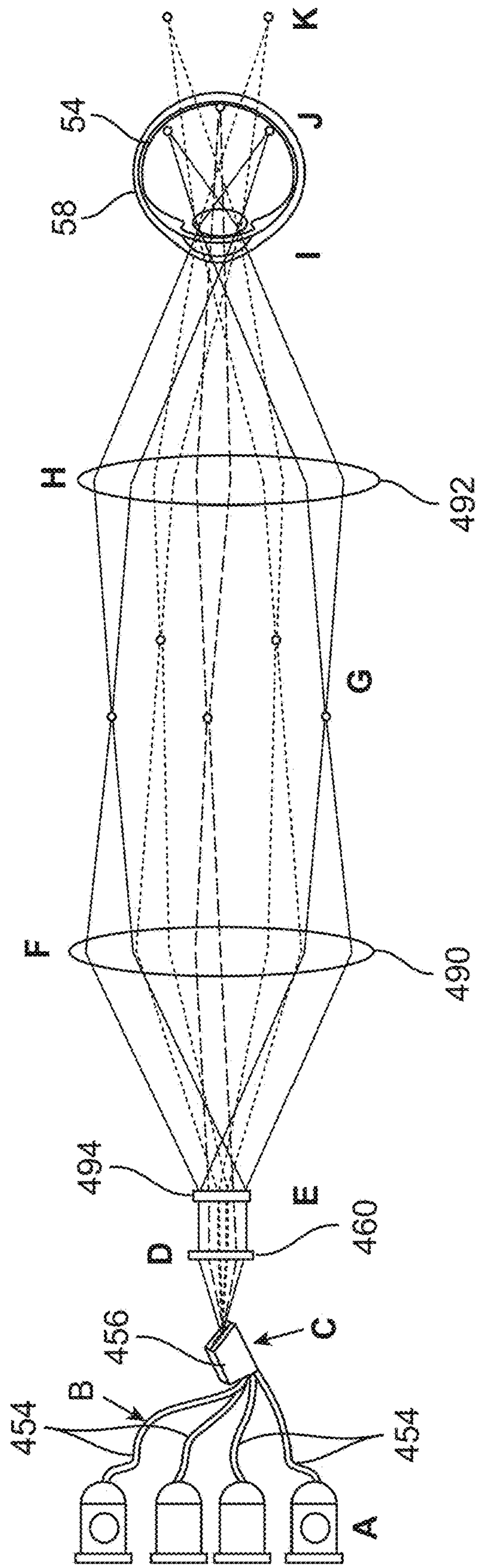

Referring to FIG. 16J, a beveled fiber array which may be held together with a coupler 456, such as those described above, may be scanned with a reflecting device 494 such as a DMD module of a DLP system. With multiple single fibers 454 coupled into the array, or a multicore instead, the superimposed light can be directed through one or more focusing lenses (490, 492) to create a multifocal beam. With the superimposing and angulation of the array, the different sources are at different distances from the focusing lens, which creates different focus levels in the beams as they emerge from the lens 492 and are directed toward the retina 54 of the eye 58 of the user. For example, the farthest optical route/beam may be set up to be a collimated beam representative of optical infinity focal positions. Closer routes/beams may be associated with diverging spherical wavefronts of closer focal locations.

The multifocal beam may be passed into a scanning mirror which may be configured to create a raster scan (or, for example, a Lissajous curve scan pattern or a spiral scan pattern) of the multifocal beam which may be passed through a series of focusing lenses and then to the cornea and crystalline lens of the eye. The various beams emerging from the lenses create different pixels or voxels of varying focal distances that are superimposed.

Figure 16K:
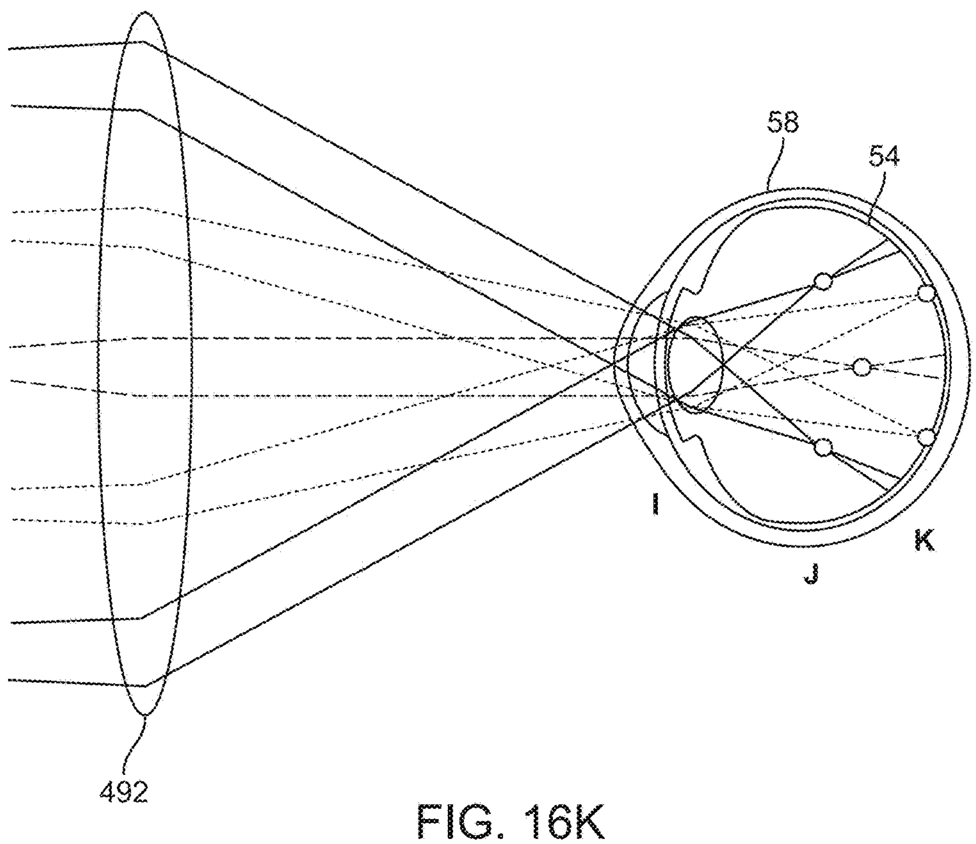
Figure 16L:
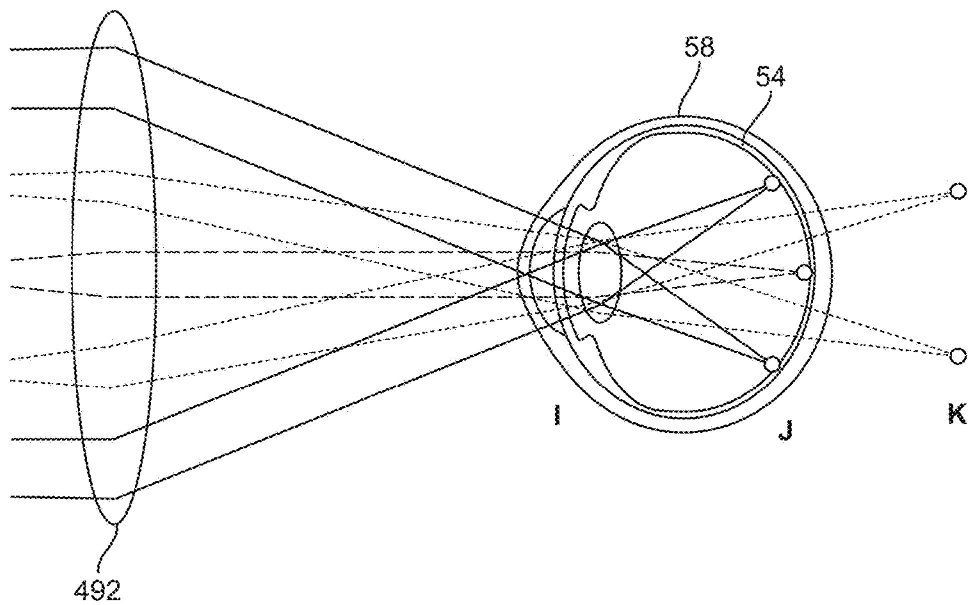

In one embodiment, one may write different data to each of the light modulation channels at the front end, thereby creating an image that is projected to the eye with one or more focus elements. By changing the focal distance of the crystalline lens (e.g., by accommodating), different incoming pixels may be brought into and out of focus, as shown in FIGS. 16K and 16L wherein the crystalline lens is in different Z axis positions.

In another embodiment, the fiber array may be actuated/moved around by a piezoelectric actuator. In another embodiment, a relatively thin ribbon array may be resonated in cantilevered form along the axis perpendicular to the arrangement of the array fibers (e.g., in the thin direction of the ribbon) when a piezoelectric actuator is activated. In one variation, a separate piezoelectric actuator may be utilized to create a vibratory scan in the orthogonal long axis. In another embodiment, a single mirror axis scan may be employed for a slow scan along the long axis while the fiber ribbon is vibrated resonantly.

Figure 16M:
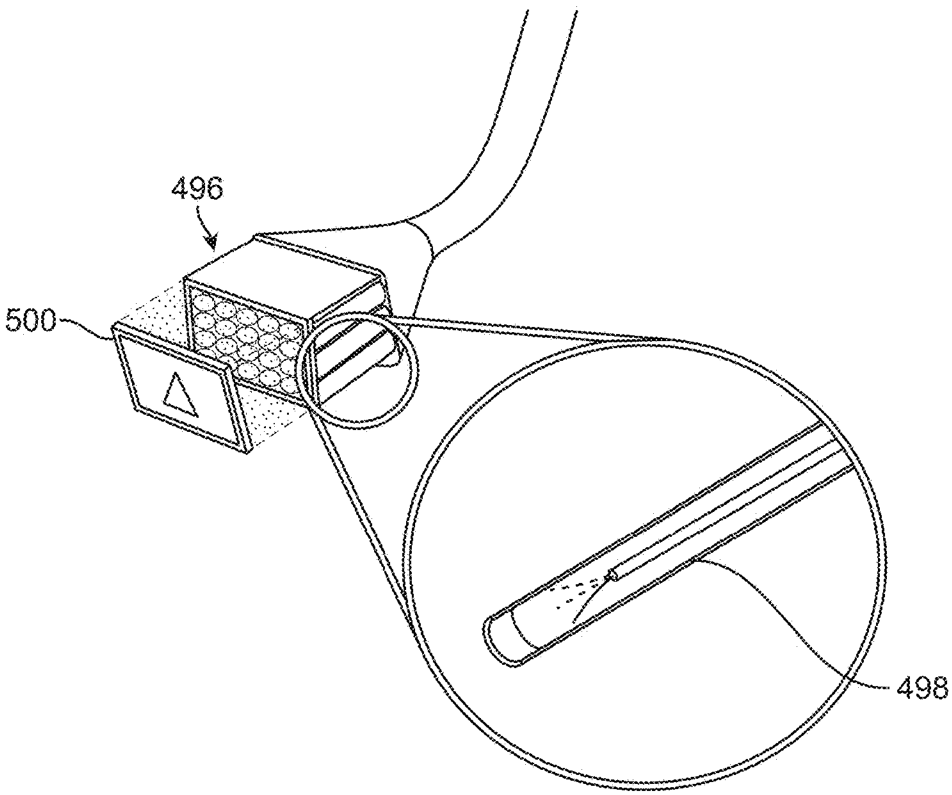
Figure 16N:
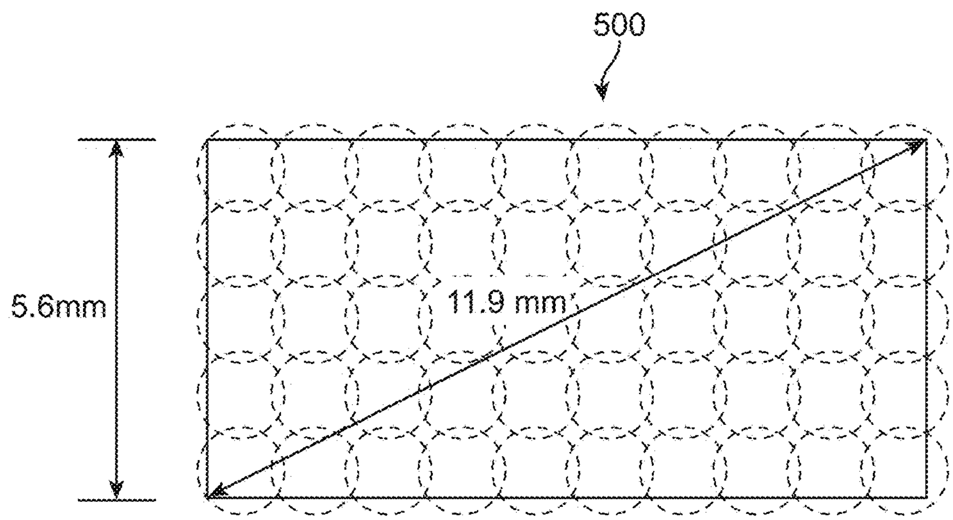

Referring to FIG. 16M, an array 496 of scanning fiber displays 498 may be beneficially bundled/tiled for an effective resolution increase. It is anticipated that with such as configuration, each scanning fiber of the bundle is configured to write to a different portion of the image plane 500, as shown, for example, in FIG. 16N. Referring now to FIG. 16N, each portion of the image plane is addressed by the emissions from a least one bundle. In other embodiments, optical configurations may be utilized that allow for slight magnification of the beams as the beams exit the optical fiber such that there is some overlap in the hexagonal, or other lattice pattern, that hits the display plane. This may allow for a better fill factor while also maintaining an adequately small spot size in the image plane while maintaining a subtle magnification in that image plane.

Rather than utilizing individual lenses at the end of each scanned fiber enclosure housing, in one embodiment a monolithic lenslet array may be utilized, so that the lenses may be arranged as closely packed as possible. This allows for even smaller spot sizes in the image plane because one may use a lower amount of magnification in the optical system. Thus, arrays of fiber scan displays may be used to increase the resolution of the display, or in other words, they may be used to increase the field of view of the display, because each engine is being used to scan a different portion of the field of view.

For a lightfield configuration, the emissions may be more desirably overlapped at the image plane. In one embodiment, a lightfield display may be created using a plurality of small diameter fibers scanned around in space. For example, instead of all of the fibers addressing a different part of an image plane as described above, the configuration may allow for more overlapping (e.g., more fibers angled inward, etc.). Or, in another embodiment, the focal power of the lenses may be changed such that the small spot sizes are not conjugate with a tiled image plane configuration. Such a configuration may be used to create a lightfield display to scan a plurality of smaller diameter rays around that become intercepted in the same physical space.

Referring back to FIG. 12B, it was discussed that one way of creating a lightfield display involves making the output of the elements on the left collimated with narrow beams, and then making the projecting array conjugate with the eye pupil on the right.

Figure 16O:
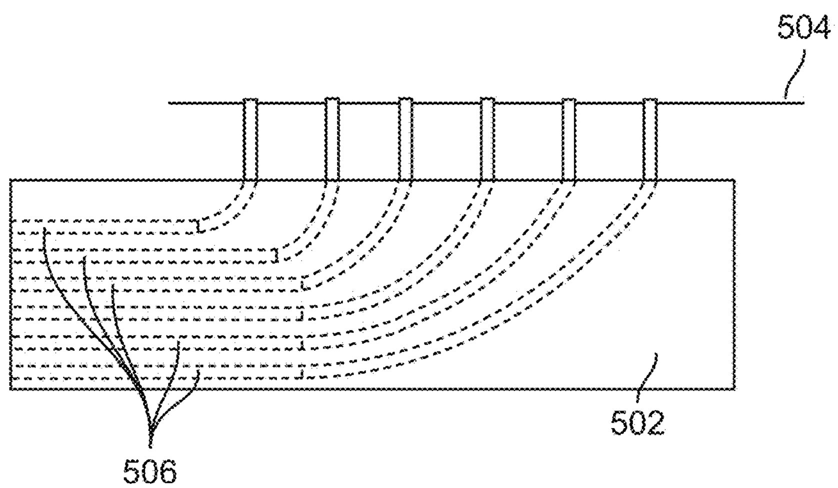

Referring to FIG. 16O, with a common substrate block 502, a single actuator may be utilized to actuate a plurality of fibers 506 in unison together, which is similar to the configuration discussed above in reference to FIGS. 13-C-1 and 13-C-2. It may be practically difficult to have all of the fibers retain the same resonant frequency, vibrate in a desirable phase relationship to each other, or have the same dimensions of cantilevering from the substrate block. To address this challenge, the tips of the fibers may be mechanically coupled with a lattice or sheet 504, such as a graphene sheet that is very thin, rigid, and light in weight. With such a coupling, the entire array may vibrate similarly and have the same phase relationship. In another embodiment a matrix of carbon nanotubes may be utilized to couple the fibers, or a piece of very thin planar glass (such as the kind used in creating liquid crystal display panels) may be coupled to the fiber ends. Further, a laser or other precision cutting device may be utilized to cut all associated fibers to the same cantilevered length.

Figure 17:
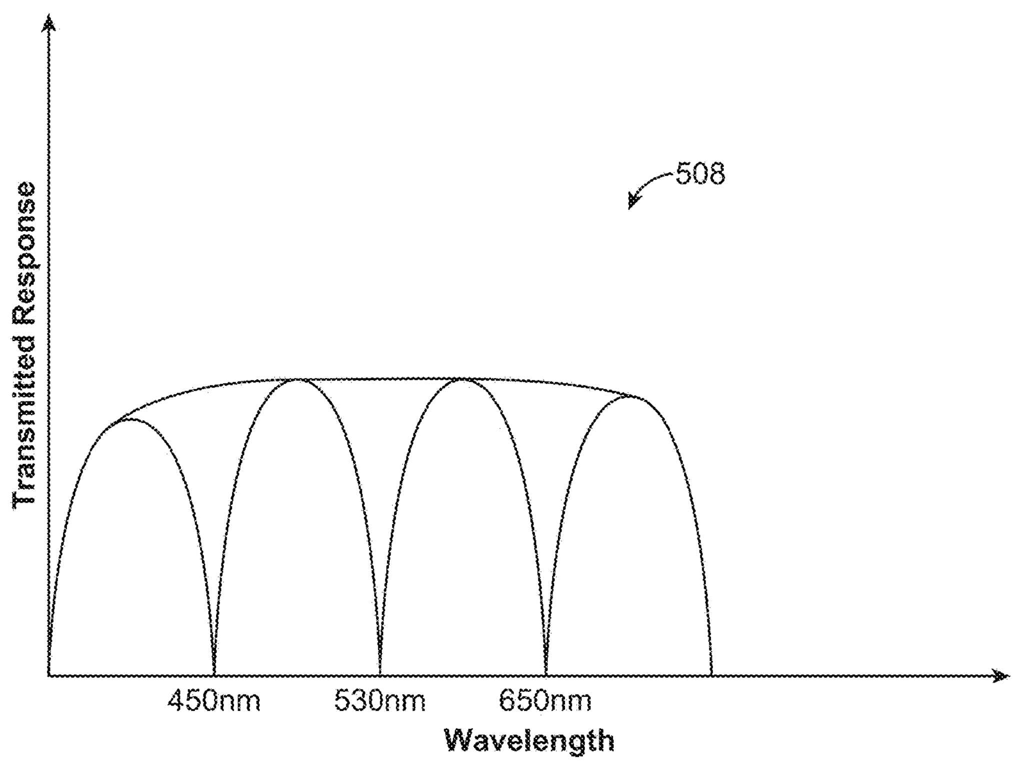
FIG. 17 illustrates a notch filter, according to one illustrated embodiment.

Referring to FIG. 17, in one embodiment it may be desirable to have a contact lens directly interfaced with the cornea, and configured to facilitate the eye focusing on a display that is quite close (such as the typical distance between a cornea and an eyeglasses lens). Rather than placing an optical lens as a contact lens, in one variation the lens may comprise a selective filter. FIG. 17 depicts a plot 508 or a "notch filter", which, due to its design blocks only certain wavelength bands, such as 450 nm (peak blue), 530 nm (green), and 650 nm and generally passes or transmits other wavelengths. In one embodiment several layers of dielectric coatings may be aggregated to provide the notch filtering functionality.

Such a filtering configuration may be coupled with a scanning fiber display that is producing a very narrow band illumination for red, green, and blue, and the contact lens with the notch filtering will block out all of the light coming from the display (such as a minidisplay, such as an OLED display, mounted in a position normally occupied by an eyeglasses lens) except for the transmissive wavelengths.

A narrow pinhole may be created in the middle of the contact lens filtering layers/film such that the small aperture (e.g., less than about 1.5 mm diameter) does allow passage of the otherwise blocked wavelengths. Thus a pinhole lens configuration is created that functions in a pinhole manner for red, green, and blue only to intake images from the mini-display, while light from the real world, which generally is broadband illumination, will pass through the contact lens relatively unimpeded. Thus a large depth of focus virtual display configuration may be assembled and operated. In another embodiment, a collimated image exiting from a waveguide would be visible at the retina because of the pinhole large-depth-of-focus configuration.

It may be useful to create a display that can vary its depth of focus over time. For example, in one embodiment, a display may be configured to have different display modes that may be selected (preferably rapidly toggling between the two at the command of the operator) by an operator, such as a first mode combining a very large depth of focus with a small exit pupil diameter (e.g., so that everything is in focus all of the time), and a second mode featuring a larger exit pupil and a more narrow depth of focus.

In operation, if a user is to play a three-dimensional video game with objects to be perceived at many depths of field, the operator may select the first mode. Alternatively, if a user is to type in a long essay (e.g., for a relatively long period of time) using a two-dimensional word processing display configuration, it may be more desirable to switch to the second mode to have the convenience of a larger exit pupil, and a sharper image.

In another embodiment, it may be desirable to have a multi-depth of focus display configuration wherein some subimages are presented with a large depth of focus while other subimages are presented with small depth of focus. For example, one configuration may have red wavelength and blue wavelength channels presented with a very small exit pupil so that they are always in focus. Then, a green channel only may be presented with a large exit pupil configuration with multiple depth planes (e.g., because the human accommodation system tends to preferentially target green wavelengths for optimizing focus level).

Thus, in order to reduce costs associated with including too many elements to represent with full depth planes in red, green, and blue, the green wavelength may be prioritized and represented with various different wavefront levels. Red and blue may be relegated to being represented with a more Maxwellian approach (and, as described above in reference to Maxwellian displays, software may be utilized to induce Gaussian levels of blur). Such a display would simultaneously present multiple depths of focus.

As described above, there are portions of the retina which have a higher density of light sensors. The fovea portion, for example, generally is populated with approximately 120 cones per visual degree. Display systems have been created in the past that use eye or gaze tracking as an input, and to save computation resources by only creating really high resolution rendering based on where the person is gazing at the time. However, lower resolution rendering is presented to the rest of the retina. The locations of the high versus low resolution portions may be dynamically slaved to the tracked gaze location in such a configuration, which may be termed a "foveated display".

Figure 18:
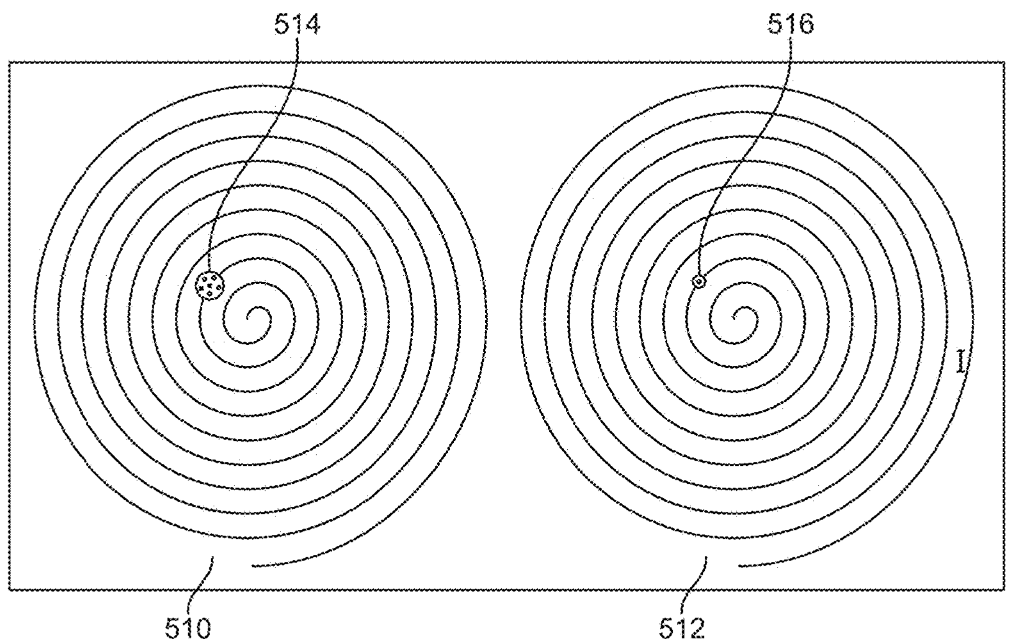
FIG. 18 illustrates a spiral pattern of a fiber scanning display, according to one illustrated embodiment.

An improvement on such configurations may comprise a scanning fiber display with pattern spacing that may be dynamically slaved to tracked eye gaze. For example, with a typical scanning fiber display operating in a spiral pattern, as shown in FIG. 18 (the leftmost portion 510 of the image in FIG. 18 illustrates a spiral motion pattern of a scanned multicore fiber 514; the rightmost portion 512 of the image in FIG. 18 illustrates a spiral motion pattern of a scanned single fiber 516 for comparison), a constant pattern pitch provides for a uniform display resolution.

In a foveated display configuration, a non-uniform scanning pitch may be utilized, with smaller/tighter pitch (and therefore higher resolution) dynamically slaved to the detected gaze location. For example, if the user's gaze is detected as moving toward the edge of the display screen, the spirals may be clustered more densely in such location, which would create a toroid-type scanning pattern for the high-resolution portions, and the rest of the display being in a lower-resolution mode. In a configuration wherein gaps may be created in the portions of the display in a lower-resolution mode, blur could be intentionally and dynamically created to smooth out the transitions between scans, as well as between transitions from high-resolution to lower-resolution scan pitch.

The term lightfield may be used to describe a volumetric 3-D representation of light traveling from an object to a viewer's eye. However, an optical see-through display can only reflect light to the eye, not the absence of light, and ambient light from the real world will add to any light representing a virtual object. That is, if a virtual object presented to the eye contains a black or very dark portion, the ambient light from the real world may pass through that dark portion and obscure that it was intended to be dark.

It is nonetheless desirable to be able to present a dark virtual object over a bright real background, and for that dark virtual object to appear to occupy a volume at a desired viewing distance; e.g., it is useful to create a "darkfield" representation of that dark virtual object, in which the absence of light is perceived to be located at a particular point in space. With regard to occlusion elements and the presentation of information to the eye of the user so that he or she can perceive darkfield aspects of virtual objects, even in well lighted actual environments, certain aspects of the aforementioned spatial light modulator, or "SLM", configurations are pertinent.

As described above, with a light-sensing system such as the eye, one approach for selective perception of dark field is to selectively attenuate light from such portions of the display. In other words, darkfield cannot be specifically projected—it's the lack of illumination that may be perceived as darkfield. The following discussion will present various configurations for selective attenuation of illumination.

Referring back to the discussion of SLM configurations, one approach to selectively attenuate for a darkfield perception is to block all of the light coming from one angle, while allowing light from other angles to be transmitted. This may be accomplished with a plurality of SLM planes comprising elements such as liquid crystal (which may not be the most optimal due to its relatively low transparency when in the transmitting state), DMD elements of DLP systems (which have relative high transmission/reflection ratios when in such mode), and MEMS arrays or shutters that are configured to controllably shutter or pass light radiation, as described above.

With regard to suitable liquid crystal display ("LCD") configurations, a cholesteric LCD array may be utilized for a controlled occlusion/blocking array. As opposed to the conventional LCD paradigm wherein a polarization state is changed as a function of voltage, with a cholesteric LCD configuration, a pigment is being bound to the liquid crystal molecule, and then the molecule is physically tilted in response to an applied voltage. Such a configuration may be designed to achieve greater transparency when in a transmissive mode than conventional LCD, and a stack of polarizing films may not be needed.

In another embodiment, a plurality of layers of controllably interrupted patterns may be utilized to controllably block selected presentation of light using moiré effects. For example, in one configuration, two arrays of attenuation patterns, each of which may comprise, for example, fine-pitched sine waves printed or painted upon a transparent planar material such as a glass substrate, may be presented to the eye of a user at a distance close enough that when the viewer looks through either of the patterns alone, the view is essentially transparent, but if the viewer looks through both patterns lined up in sequence, the viewer will see a spatial beat frequency moiré attenuation pattern, even when the two attenuation patterns are placed in sequence relatively close to the eye of the user.

The beat frequency is dependent upon the pitch of the patterns on the two attenuation planes, so in one embodiment, an attenuation pattern for selectively blocking certain light transmission for darkfield perception may be created using two sequential patterns, each of which otherwise would be transparent to the user, but which together in series create a spatial beat frequency moiré attenuation pattern selected to attenuate in accordance with the darkfield perception desired in the AR system.

In another embodiment a controlled occlusion paradigm for darkfield effect may be created using a multi-view display style occluder. For example, one configuration may comprise one pin-holed layer that fully occludes with the exception of small apertures or pinholes, along with a selective attenuation layer in series, which may comprise an LCD, DLP system, or other selective attenuation layer configuration, such as those described above. In one scenario, with the pinhole array placed at a typical eyeglasses lens distance from the cornea (about 30 mm), and with a selective attenuation panel located opposite the pinhole array from the eye, a perception of a sharp mechanical edge out in space may be created.

In essence, if the configuration will allow certain angles of light to pass, and others to be blocked or occluded, than a perception of a very sharp pattern, such as a sharp edge projection, may be created. In another related embodiment, the pinhole array layer may be replaced with a second dynamic attenuation layer to provide a somewhat similar configuration, but with more controls than the static pinhole array layer (the static pinhole layer could be simulated, but need not be).

In another related embodiment, the pinholes may be replaced with cylindrical lenses. The same pattern of occlusion as in the pinhole array layer configuration may be achieved, but with cylindrical lenses, the array is not restricted to the very tiny pinhole geometries. To prevent the eye from being presented with distortions due to the lenses when viewing through to the real world, a second lens array may be added on the side of the aperture or lens array opposite of the side nearest the eye to compensate and provide the view-through illumination with basically a zero power telescope configuration.

In another embodiment, rather than physically blocking light for occlusion and creation of darkfield perception, the light may be bent or redirected. Or, a polarization of the light may be changed if a liquid crystal layer is utilized. For example, in one variation, each liquid crystal layer may act as a polarization rotator such that if a patterned polarizing material is incorporated on one face of a panel, then the polarization of individual rays coming from the real world may be selectively manipulated so they catch a portion of the patterned polarizer. There are polarizers known in the art that have checkerboard patterns wherein half of the "checker boxes" have vertical polarization and the other half have horizontal polarization. In addition, if a material such as liquid crystal is used in which polarization may be selectively manipulated, light may be selectively attenuated with this.

As described above, selective reflectors may provide greater transmission efficiency than LCD. In one embodiment, if a lens system is placed such that light coming in from the real world is focused on an image plane, and if a DMD (e.g., DLP technology) is placed at that image plane to reflect light when in an "on" state towards another set of lenses that pass the light to the eye, and those lenses also have the DMD at their focal length, then an attenuation pattern that is in focus for the eye may be created. In other words, DMDs may be used in a selective reflector plane in a zero magnification telescope configuration, such as is shown in FIG. 19A, to controllably occlude and facilitate creating darkfield perception.

Figure 19A:
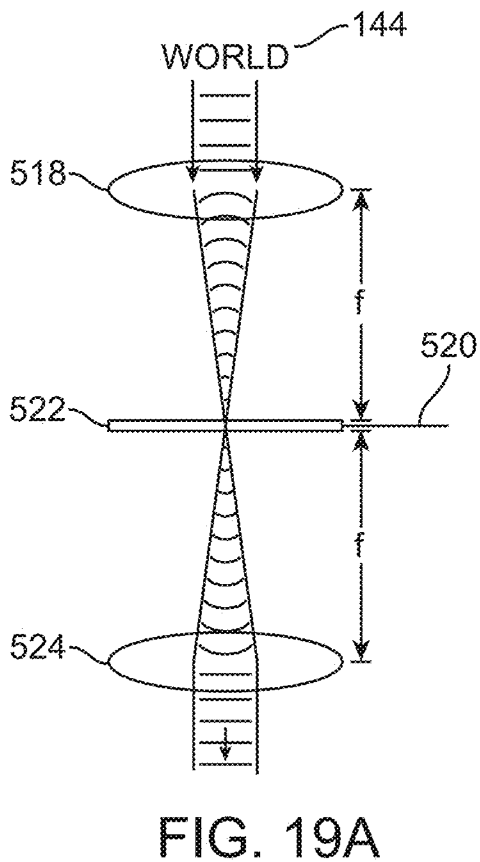
FIGS. 19A-19N illustrate occlusion effects in presenting a darkfield to a user, according to the illustrated embodiments.

As shown in FIG. 19A, a lens (518) is taking light from the real world 144 and focusing it down to an image plane 520. If a DMD (or other spatial attenuation device) 522 is placed at the focal length of the lens (e.g., at the image plane 520), the lens 518 utilizes the light coming from optical infinity and focus it onto the image plane 520. Then the spatial attenuator 522 may be utilized to selectively block out content that is to be attenuated.

FIG. 19A shows the attenuator DMDs in the transmissive mode wherein they pass the beams shown crossing the device. The image is then placed at the focal length of the second lens 524. Preferably the two lenses (518, 524) have the same focal power such that the light from the real world 144 is not magnified. Such a configuration may be used to present unmagnified views of the world while also allowing selective blocking/attenuation of certain pixels.

Figure 19B:
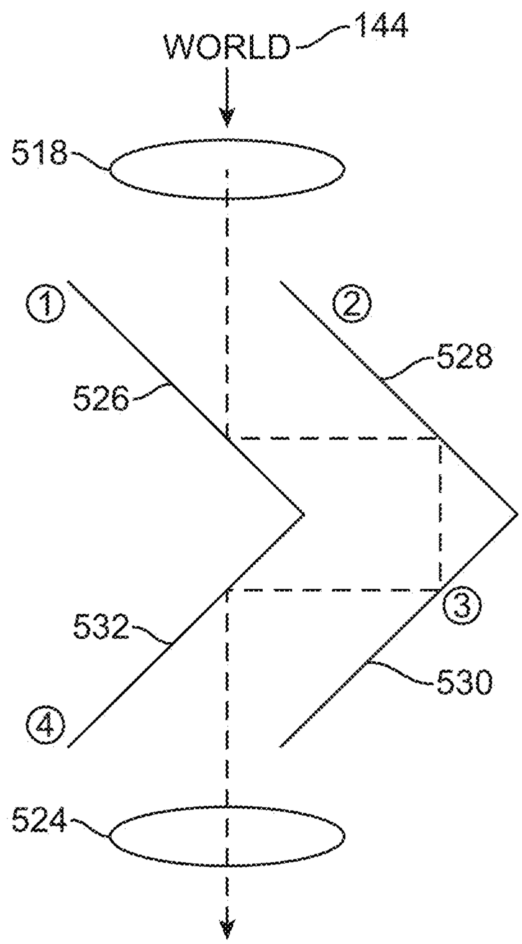
Figure 19C:
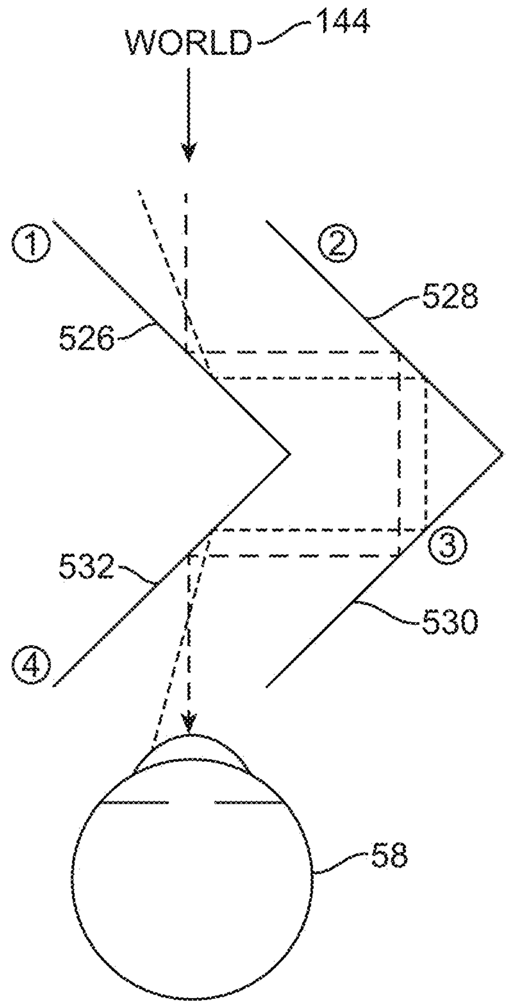

In another embodiment, as shown in FIGS. 19B and 19C, additional DMDs may be added such that light reflects from each of four DMDs (526, 528, 530, 532) before passing to the eye. FIG. 19B shows an embodiment with two lenses preferably with the same focal power (focal length "F") placed at a 2F relationship from one another (the focal length of the first being conjugate to the focal length of the second) to have the zero-power telescope effect; FIG. 19C shows an embodiment without lenses. The angles of orientation of the four reflective panels (526, 528, 530, 532) in the depicted embodiments of FIGS. 19B and 19C are shown to be around 45 degrees for simple illustration purposes, but specific relative orientation may be required (for example, a typical DMD reflect at about a 12 degree angle) in one or more embodiments.

In another embodiment, the panels may also be ferroelectric, or may be any other kind of reflective or selective attenuator panel or array. In one embodiment similar to those depicted in FIGS. 19B and 19C, one of the three reflector arrays may be a simple mirror, such that the other 3 are selective attenuators, thus still providing three independent planes to controllably occlude portions of the incoming illumination in furtherance of darkfield perception. By having multiple dynamic reflective attenuators in series, masks at different optical distances relative to the real world may be created.

Alternatively, referring back to FIG. 19C, one may create a configuration wherein one or more DMDs are placed in a reflective periscope configuration without any lenses. Such a configuration may be driven in lightfield algorithms to selectively attenuate certain rays while others are passed.

In another embodiment, a DMD or similar matrix of controllably movable devices may be created upon a transparent substrate as opposed to a generally opaque substrate, for use in a transmissive configuration such as virtual reality.

In another embodiment, two LCD panels may be utilized as lightfield occluders. In one variation, the two LCD panels may be considered attenuators due to their attenuating capability as described above. Alternatively, they may be considered polarization rotators with a shared polarizer stack. Suitable LCDs may comprise components such as blue phase liquid crystal, cholesteric liquid crystal, ferroelectric liquid crystal, and/or twisted nematic liquid crystal.

One embodiment may comprise an array of directionally-selective occlusion elements, such as a MEMS device featuring a set of louvers that can change rotation such that the majority of light that is coming from a particular angle is passed, but in a manner such that a broad face is presented to light that is coming from a different angle. This somewhat similar to the manner in which plantation shutters may be utilized with a typical human scale window. The MEMS/louvers configuration may be placed upon an optically transparent substrate, with the louvers substantially opaque.

Ideally such a configuration would comprise a louver pitch fine enough to selectively occlude light on a pixel-by-pixel basis. In another embodiment, two or more layers or stacks of louvers may be combined to provide further controls. In another embodiment, rather than selectively blocking light, the louvers may be polarizers configured to change the polarization state of light on a controllably variable basis.

As described above, another embodiment for selective occlusion may comprise an array of sliding panels in a MEMS device such that the sliding panels may be controllably opened (e.g., by sliding in a planar fashion from a first position to a second position; or by rotating from a first orientation to a second orientation; or, for example, combined rotational reorientation and displacement) to transmit light through a small frame or aperture, and controllably closed to occlude the frame or aperture and prevent transmission. The array may be configured to open or occlude the various frames or apertures such that rays that are to be attenuated are maximally attenuate, and rays that are to be transmitted are only minimally attenuated.

In an embodiment in which a fixed number of sliding panels can either occupy a first position occluding a first aperture and opening a second aperture, or a second position occluding the second aperture and opening the first aperture, there may always be the same amount of light transmitted overall (because 50% of the apertures are occluded, and the other 50% are open, with such a configuration), but the local position changes of the shutters or doors may create targeted moiré or other effects for darkfield perception with the dynamic positioning of the various sliding panels. In one embodiment, the sliding panels may comprise sliding polarizers. If the sliding panels are placed in a stacked configuration with other polarizing elements, the panel may be either static or dynamic, and may be utilized to selectively attenuate.

Figure 19D:
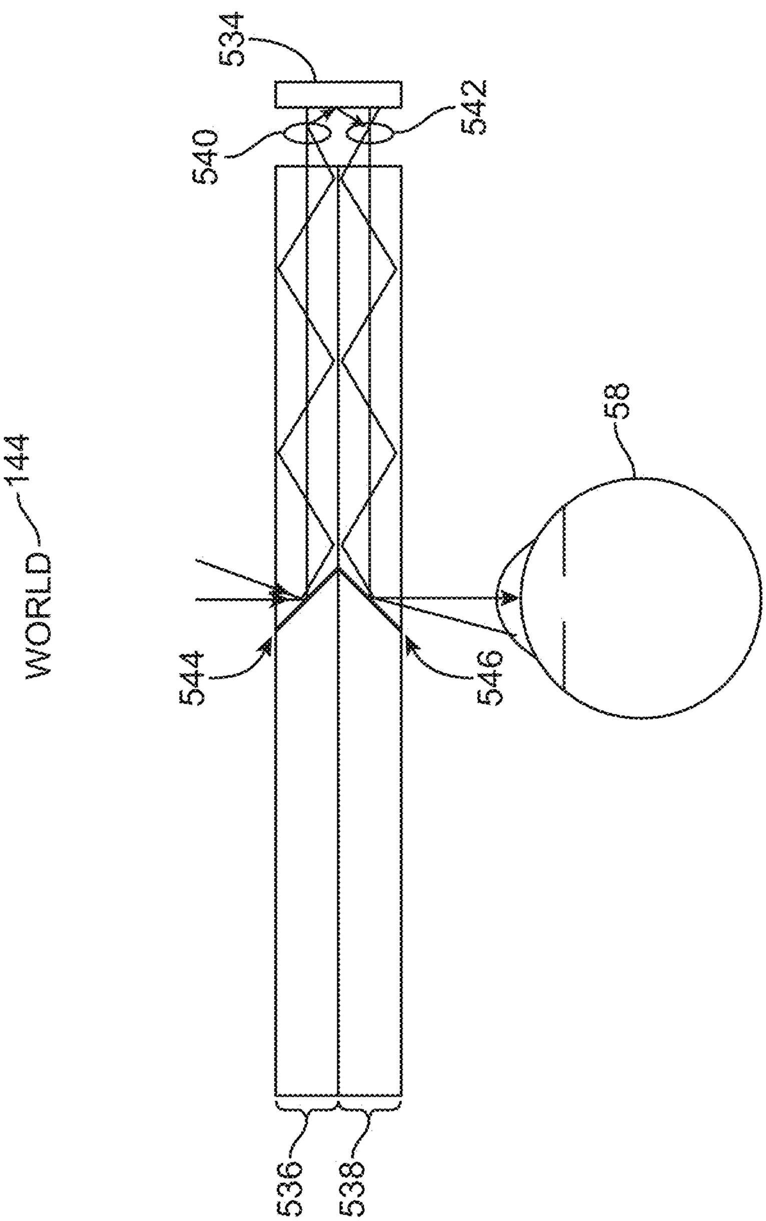

Referring to FIG. 19D, another configuration providing an opportunity for selective reflection, such as via a DMD style reflector array (534), is shown, such that a stacked set of two waveguides (536, 538) along with a pair of focus elements (540, 542) and a reflector (534; such as a DMD) may be used to capture a portion of incoming light with an entrance reflector (544). The reflected light may be totally internally reflected down the length of the first waveguide (536), into a focusing element (540) to bring the light into focus on a reflector (534) such as a DMD array. The DMD may selectively attenuate and reflect a portion of the light back through a focusing lens (542; the lens configured to facilitate injection of the light back into the second waveguide) and into the second waveguide (538) for total internal reflection down to an exit reflector (546) configured to exit the light out of the waveguide and toward the eye 58.

Such a configuration may have a relatively thin shape factor, and may be designed to allow light from the real world 144 to be selectively attenuated. As waveguides work most cleanly with collimated light, such a configuration may be well suited for virtual reality configurations wherein focal lengths are in the range of optical infinity. For closer focal lengths, a lightfield display may be used as a layer on top of the silhouette created by the aforementioned selective attenuation/darkfield configuration to provide other cues to the eye of the user that light is coming from another focal distance. In another embodiment, an occlusion mask may be out of focus, even non-desirably so. In yet another embodiment, a lightfield on top of the masking layer may be used such that the user does not detect that the darkfield may be at a wrong focal distance.

Figure 19E:
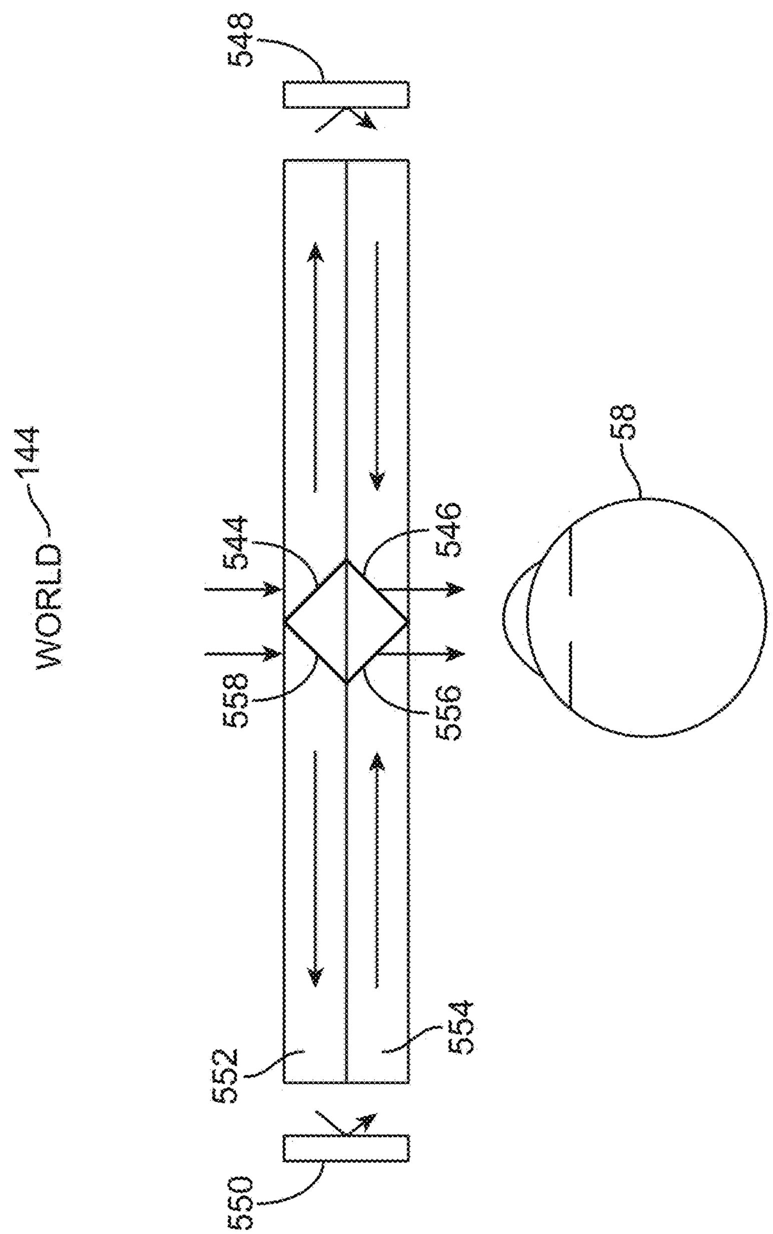

Referring to FIG. 19E, an embodiment is shown featuring two waveguides (552, 554) each having two angled reflectors (558, 544 and 556, 546) for illustrative purposes shown at approximately 45 degrees. It should be appreciated that in actual configurations, the angle may differ depending upon the reflective surface, reflective/refractive properties of the waveguides, etc. The angled reflectors direct a portion of light incoming from the real world down each side of a first waveguide (or down two separate waveguides if the top layer is not monolithic) such that it hits a reflector (548, 550) at each end, such as a DMD which may be used for selective attenuation. The reflected light may be injected back into the second waveguide (or into two separate waveguides if the bottom layer is not monolithic) and back toward two angled reflectors (again, they need not be at 45 degrees as shown) for exit out toward the eye 58.

Focusing lenses may also be placed between the reflectors at each end and the waveguides. In another embodiment the reflectors (548, 550) at each end may comprise standard mirrors (such as alumized mirrors). Further, the reflectors may be wavelength selective reflectors, such as dichroic mirrors or film interference filters. Further, the reflectors may be diffractive elements configured to reflect incoming light.

Figure 19F:
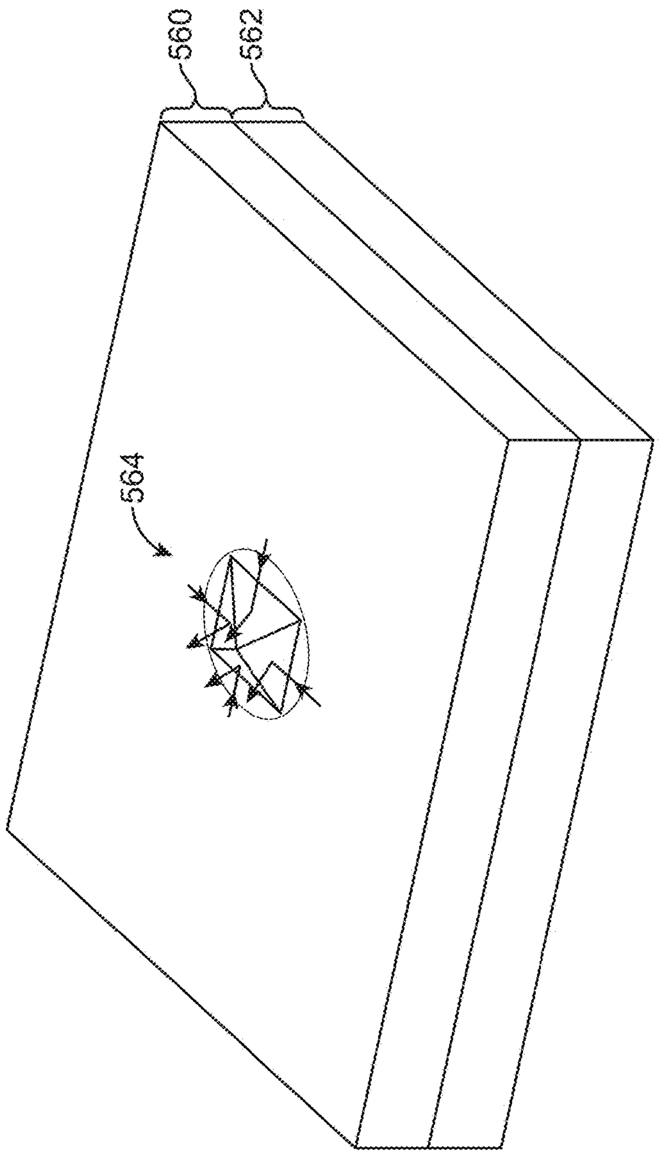

FIG. 19F illustrates a configuration in which four reflective surfaces in a pyramid type configuration are utilized to direct light through two waveguides (560, 562), in which incoming light from the real world may be divided up and reflected to four difference axes. The pyramid-shaped reflector (564) may have more than four facets, and may be resident within the substrate prism, as with the reflectors of the configuration of FIG. 19E. The configuration of FIG. 19F is an extension of that of FIG. 19E.

Figure 19G:
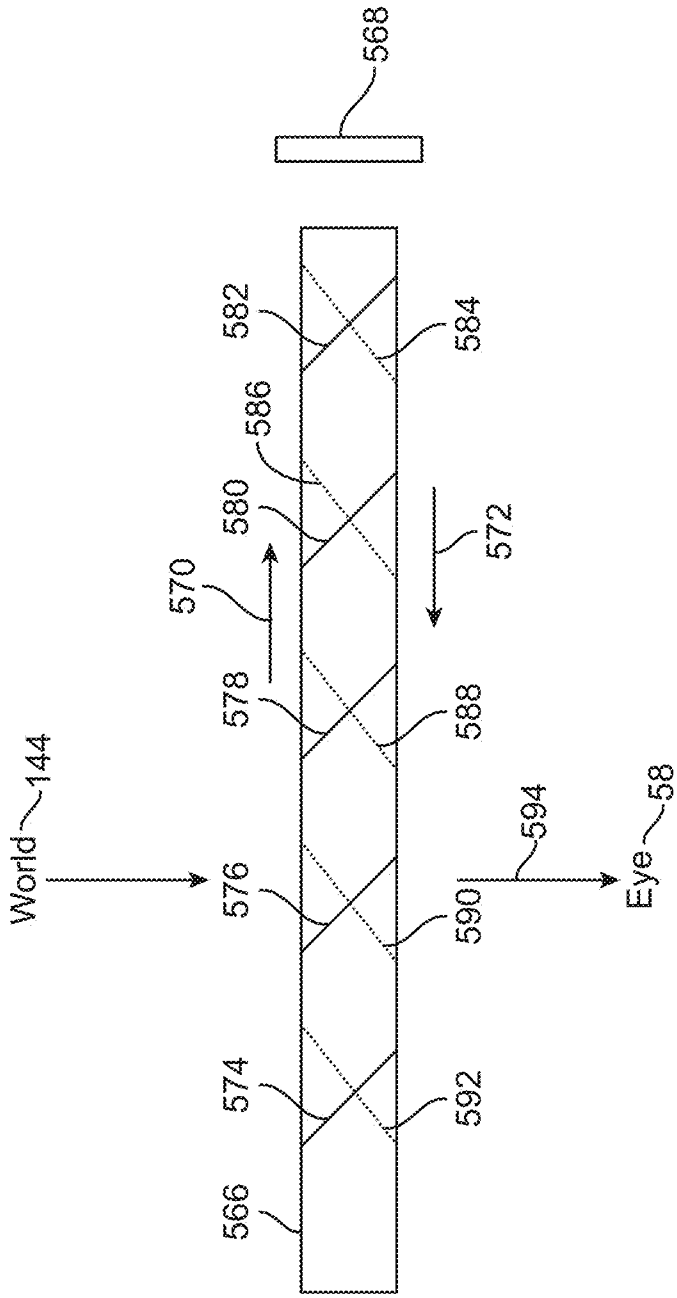

Referring to FIG. 19G, a single waveguide (566) may be utilized to capture light from the world 144 with one or more reflective surfaces (574, 576, 578, 580, 582), relay it 570 to a selective attenuator (568; such as a DMD array), and recouple it back into the same waveguide such that it propagates 572 and encounters one or more other reflective surfaces (584, 586, 588, 590, 592) that cause it to at least partially exit (594) the waveguide on a path toward the eye 58 of the user. Preferably the waveguide comprises selective reflectors such that one group (574, 576, 578, 580, 582) may be switched on to capture incoming light and direct it down to the selective attenuator, while separate another group (584, 586, 588, 590, 592) may be switched on to exit light returning from the selective attenuator out toward the eye 58.

For simplicity the selective attenuator is shown oriented substantially perpendicularly to the waveguide; in other embodiments, various optics components, such as refractive or reflective optics, may be utilized to plane the selective attenuator at a different and more compact orientation relative to the waveguide.

Figure 19H:
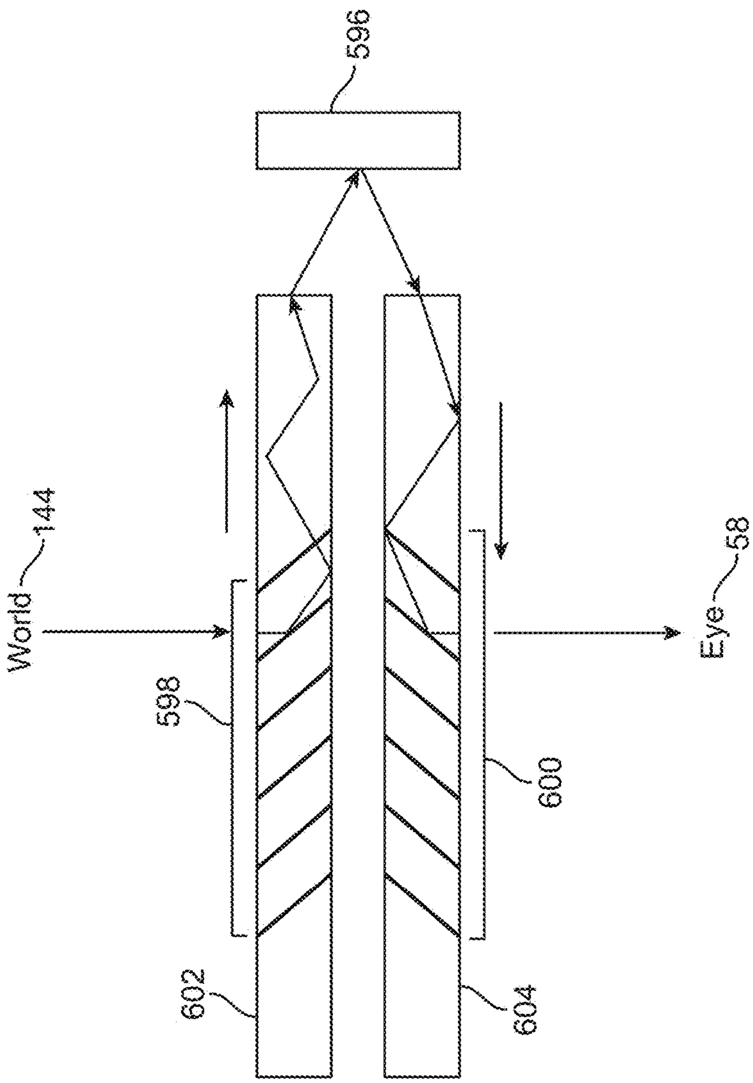

Referring to FIG. 19H, a variation on the configuration described in reference to FIG. 19D is illustrated. This configuration is somewhat analogous to that discussed above in reference to FIG. 5B, wherein a switchable array of reflectors may be embedded within each of a pair of waveguides (602, 604). Referring to FIG. 19H, a controller may be configured to turn the reflectors (598, 600) on and off in sequence, such that multiple reflectors are operated on a frame sequential basis. Then the DMD or other selective attenuator (594) may also be sequentially driven in sync with the different mirrors being turned on and off.

Figure 19I:
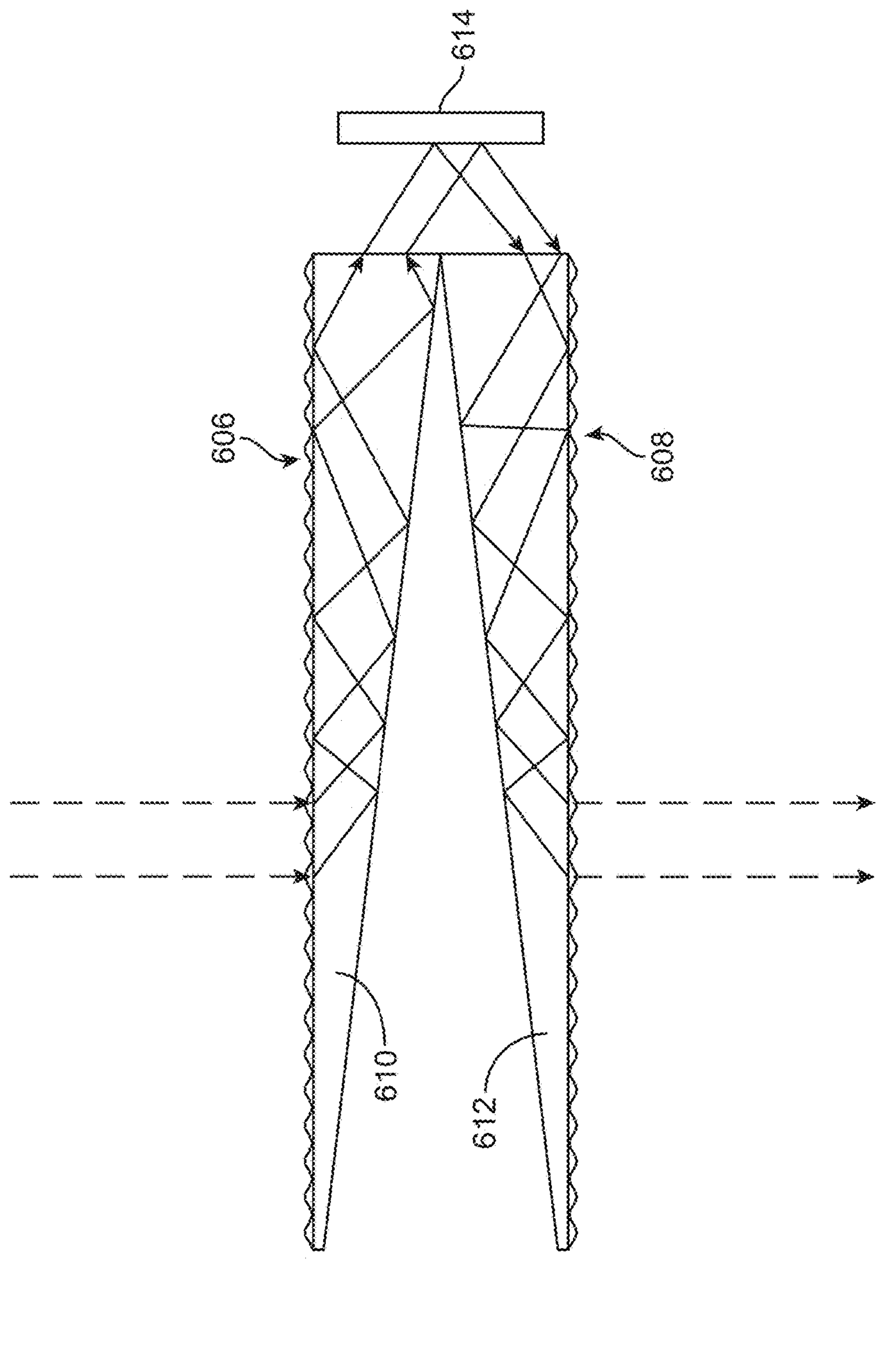

Referring to FIG. 19I, a pair of wedge-shaped waveguides similar to those described above (for example, in reference to FIGS. 15A-15C) are shown in side or sectional view to illustrate that the two long surfaces of each wedge-shaped waveguide (610, 612) are not co-planar. A "turning film" (606, 608; such as that available from 3M corporation under the trade name, "TRAF", which in essence comprises a microprism array), may be utilized on one or more surfaces of the wedge-shaped waveguides to either turn incoming rays at an angle such that the rays will be captured by total internal reflection, or to redirect outgoing rays exiting the waveguide toward an eye or other target. Incoming rays are directed down the first wedge and toward the selective attenuator 614 such as a DMD, LCD (such as a ferroelectric LCD), or an LCD stack to act as a mask).

After the selective attenuator (614), reflected light is coupled back into the second wedge-shaped waveguide which then relays the light by total internal reflection along the wedge. The properties of the wedge-shaped waveguide are intentionally such that each bounce of light causes an angle change. The point at which the angle has changed enough to be the critical angle to escape total internal reflection becomes the exit point from the wedge-shaped waveguide. Typically the exit will be at an oblique angle. Therefore, another layer of turning film may be used to "turn" the exiting light toward a targeted object such as the eye 58.

Figure 19J:
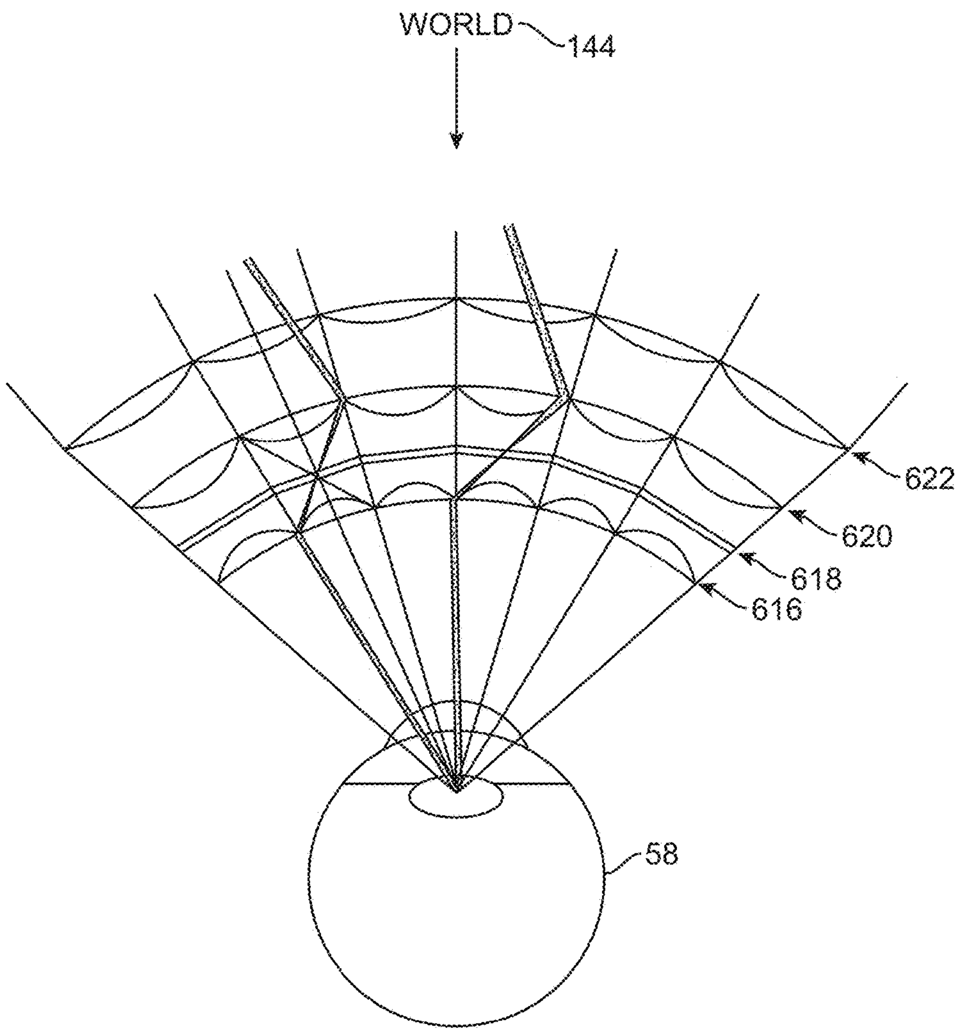

Referring to FIG. 19J, several arcuate lenslet arrays (616, 620, 622) are positioned relative to an eye and configured such that a spatial attenuator array 618 is positioned at a focal/image plane such that it may be in focus with the eye 58. The first 616 and second 620 arrays are configured such that in the aggregate, light passing from the real world to the eye is essentially passed through a zero power telescope. The embodiment of FIG. 19J shows a third array 622 of lenslets which may be utilized for improved optical compensation, but the general case does not require such a third layer. As discussed above, utilizing telescopic lenses that possess the diameter of the viewing optic may create an undesirably large form factor (somewhat akin to having a bunch of small sets of binoculars in front of the eyes).

One way to optimize the overall geometry is to reduce the diameter of the lenses by splitting them out into smaller lenslets, as shown in FIG. 19J (e.g., an array of lenses rather than one single large lens). The lenslet arrays (616, 620, 622) are shown wrapped radially or arcuately around the eye 58 to ensure that beams incoming to the pupil are aligned through the appropriate lenslets (else the system may suffer from optical problems such as dispersion, aliasing, and/or lack of focus). Thus all of the lenslets are oriented "toed in" and pointed at the pupil of the eye 58, and the system facilitates avoidance of scenarios wherein rays are propagated through unintended sets of lenses on route to the pupil.

Figure 19K:
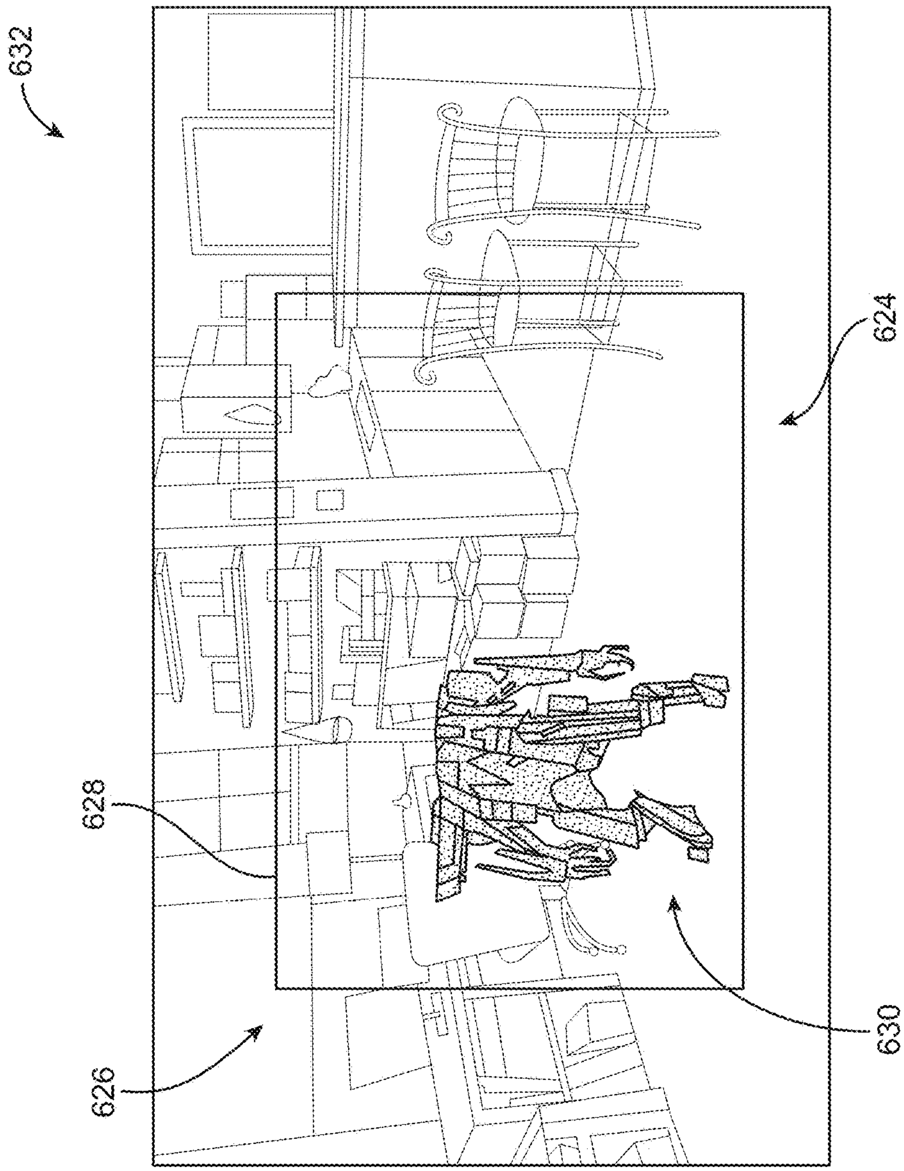
Figure 19L:
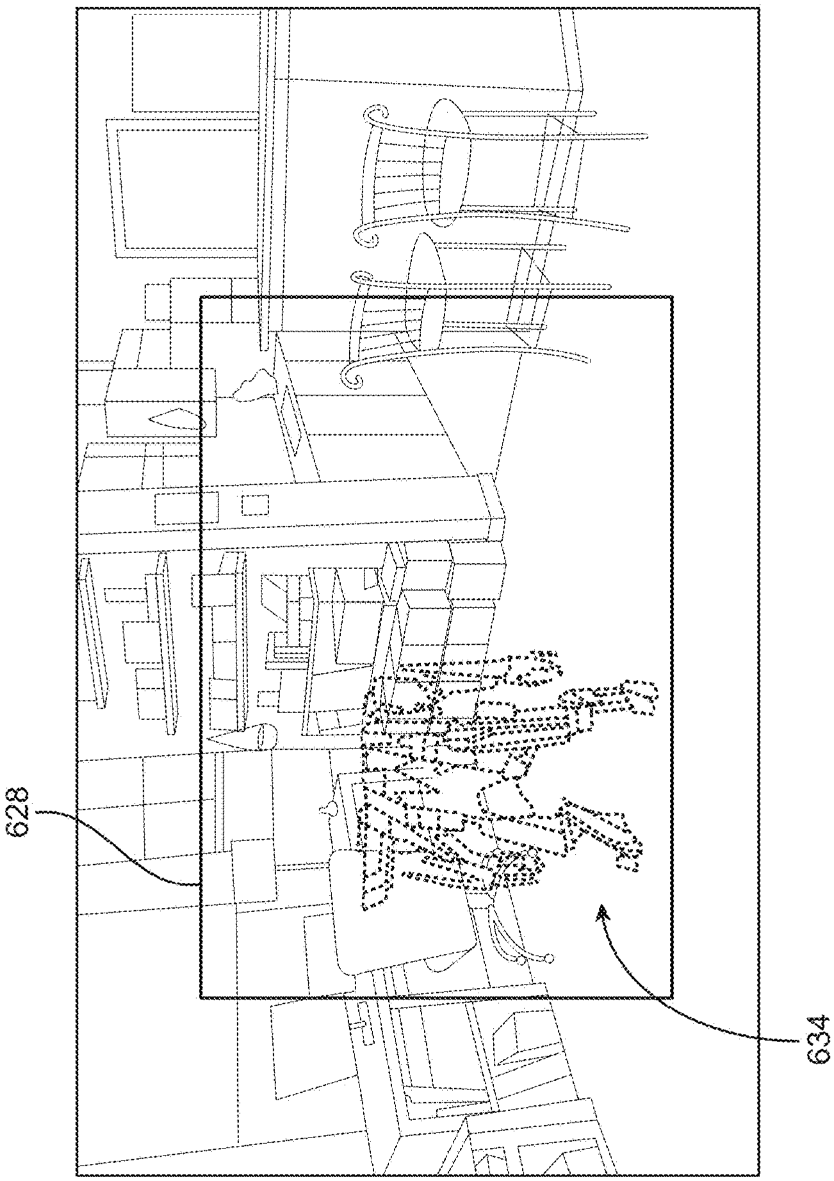

Referring to FIGS. 19K-19N, various software approaches may be utilized to assist in the presentation of darkfield in a virtual or augmented reality displace scenario. Referring to FIG. 19K, a typical challenging scenario for augmented reality is depicted 632, with a textured carpet 624 and non-uniform background architectural features 626, both of which are lightly-colored. The black box 628 depicted indicates the region of the display in which one or more augmented reality features are to be presented to the user for three-dimensional perception, and in the black box a robot creature 630 is being presented that may, for example, be part of an augmented reality game in which the user is engaged. In the depicted example, the robot character 630 is darkly-colored, which makes for a challenging presentation in three-dimensional perception, particularly with the background selected for this example scenario.

As discussed briefly above, one of the main challenges for a presenting darkfield augmented reality object is that the system generally cannot add or paint in "darkness"; generally the display is configured to add light. Thus, referring to FIG. 19L, without any specialized software treatments to enhance darkfield perception, presentation of the robot character in the augmented reality view results in a scene wherein portions of the robot character that are to be essentially flat black in presentation are not visible, and portions of the robot character that are to have some lighting (such as the lightly-pigmented cover of the shoulder gun of the robot character) are only barely visible (634). These portions may appear almost like a light grayscale disruption to an otherwise normal background image.

Figure 19M:
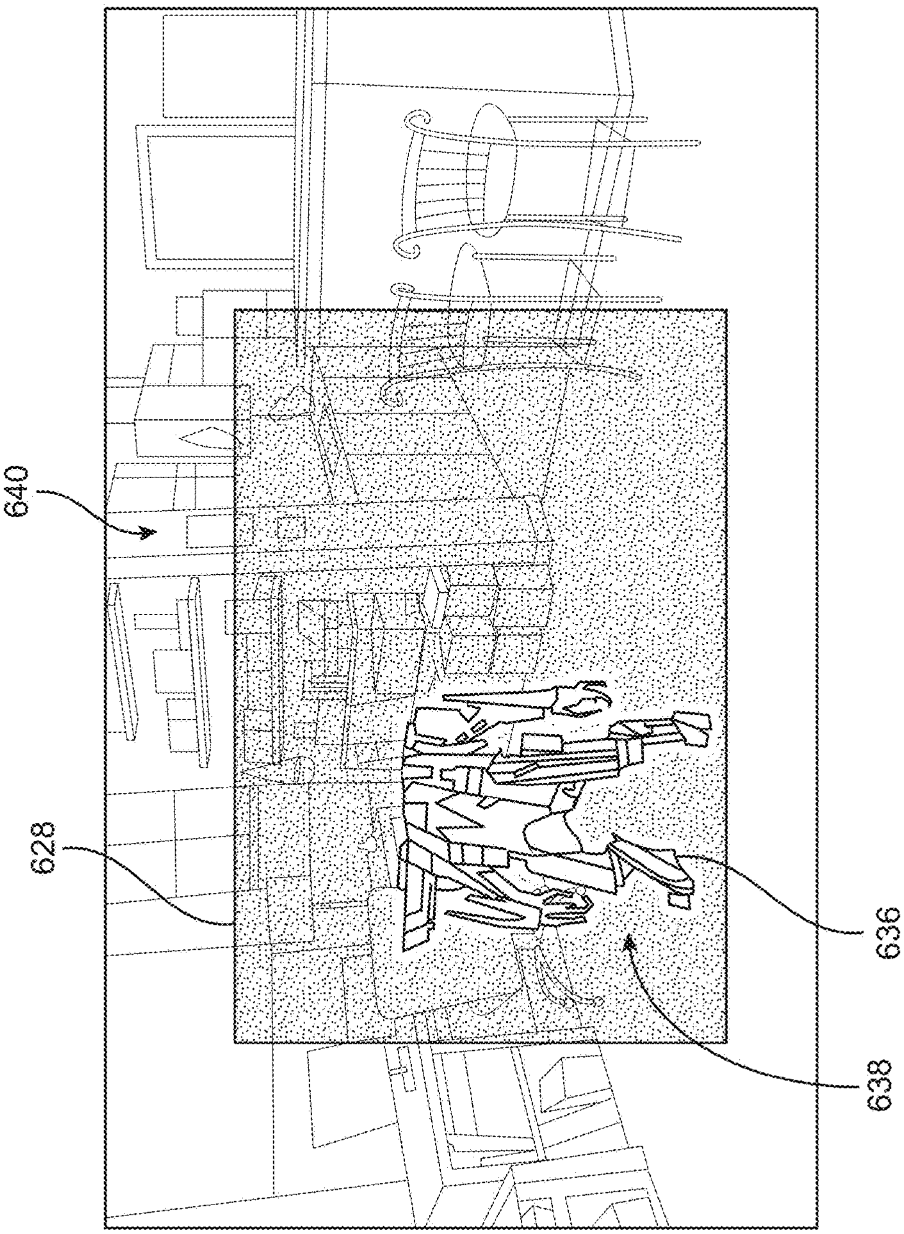

Referring to FIG. 19M, using a software-based global attenuation treatment (akin to digitally putting on a pair of sunglasses) provides enhanced visibility to the robot character because the brightness of the nearly black robot character is effective increased relative to the rest of the space, which now appears more dark 640. Also shown in FIG. 19M is a digitally-added light halo 636 which may be added to enhance and distinguish the now-more-visible robot character shapes 638 from the background. With the halo treatment, even the portions of the robot character that are to be presented as flat black become visible with the contrast to the white halo, or "aura" presented around the robot character.

Preferably the halo may be presented to the user with a perceived focal distance that is behind the focal distance of the robot character in three-dimensional space. In a configuration wherein single panel occlusion techniques such as those described above is being utilized to present darkfield, the light halo may be presented with an intensity gradient to match the dark halo that may accompany the occlusion, minimizing the visibility of either darkfield effect. Further, the halo may be presented with blurring to the background behind the presented halo illumination for further distinguishing effect. A more subtle aura or halo effect may be created by matching, at least in part, the color and/or brightness of a relatively light-colored background.

Figure 19N:
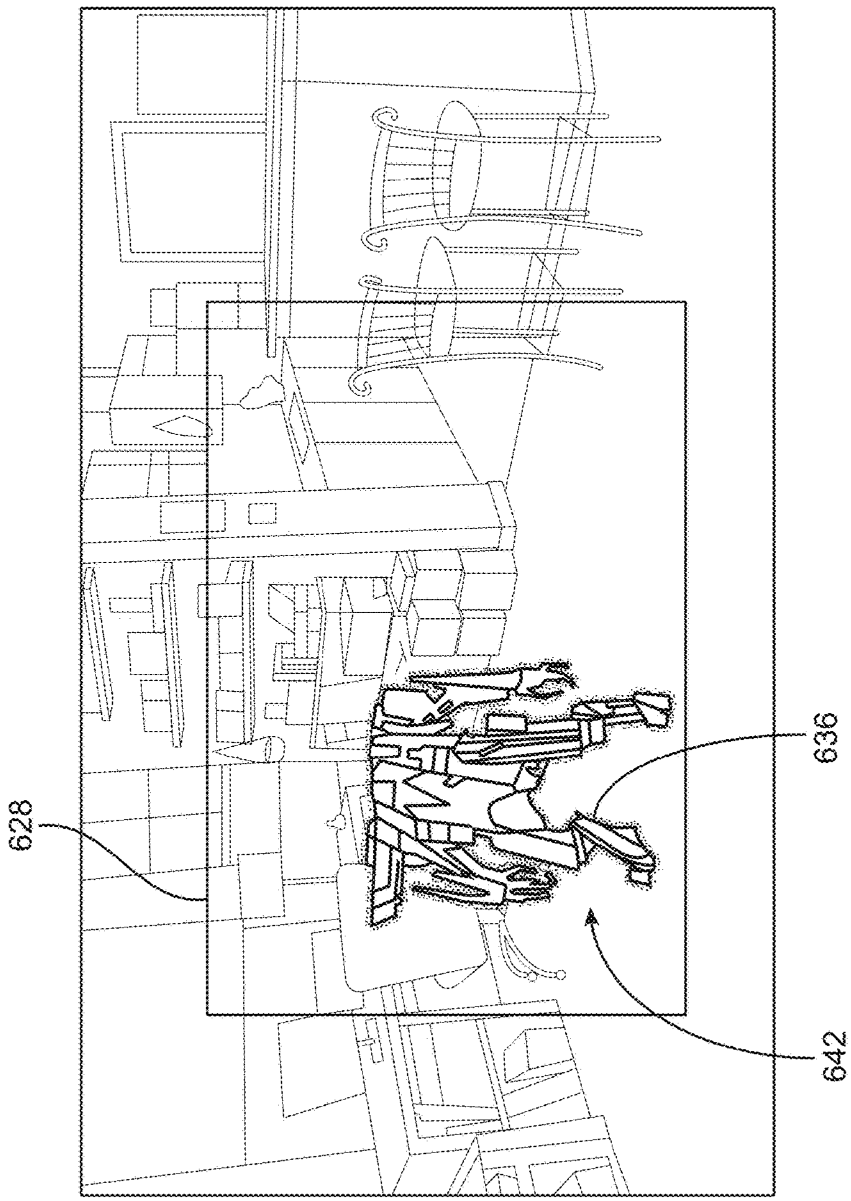

Referring to FIG. 19N, some or all of the black intonations of the robot character may be changed to dark, cool blue colors to provide a further distinguishing effect relative to the background, and relatively good visualization of the robot 642.

Wedge-shaped waveguides have been described above, such as in reference to FIGS. 15A-15D and FIG. 19I. A key aspect of wedge-shaped waveguides is that every time a ray bounces off of one of the non-coplanar surfaces, a change in the angle is created, which ultimately results in the ray exiting total internal reflection when its approach angle to one of the surfaces is greater than the critical angle. Turning films may be used to redirect exiting light so that exiting beams leave with a trajectory that is more or less perpendicular to the exit surface, depending upon the geometric and ergonomic issues at play.

With a series or array of displays injecting image information into a wedge-shaped waveguide, as shown in FIG. 15C, for example, the wedge-shaped waveguide may be configured to create a fine-pitched array of angle-biased rays emerging from the wedge. Somewhat similarly, it has been discussed above that a lightfield display, or a variable wavefront creating waveguide, both may produce a multiplicity of beamlets or beams to represent a single pixel in space such that wherever the eye is positioned, the eye is hit by a plurality of different beamlets or beams that are unique to that particular eye position in front of the display panel.

As was further discussed above in the context of lightfield displays, a plurality of viewing zones may be created within a given pupil, and each may be used for a different focal distance, with the aggregate producing a perception similar to that of a variable wavefront creating waveguide, or similar to the actual optical physics of reality of the objects viewed were real. Thus a wedge-shaped waveguide with multiple displays may be utilized to generate a lightfield. In an embodiment similar to that of FIG. 15C with a linear array of displays injecting image information, a fan of exiting rays is created for each pixel. This concept may be extended in an embodiment wherein multiple linear arrays are stacked to all inject image information into the wedge-shaped waveguide (in one variation, one array may inject at one angle relative to the wedge-shaped waveguide face, while the second array may inject at a second angle relative to the wedge-shaped waveguide face), in which case exit beams fan out at two different axes from the wedge.

Thus such a configuration may be utilized to produce pluralities of beams spraying out at a plurality of different angles, and each beam may be driven separately due to the fact that under such configuration, each beam is driven using a separate display. In another embodiment, one or more arrays or displays may be configured to inject image information into wedge-shaped waveguide through sides or faces of the wedge-shaped waveguide other than that shown in FIG. 15C, such as by using a diffractive optic to bend injected image information into a total internal reflection configuration relative to the wedge-shaped waveguide.

Various reflectors or reflecting surfaces may also be utilized in concert with such a wedge-shaped waveguide embodiment to out-couple and manage light from the wedge-shaped waveguide. In one embodiment, an entrance aperture to a wedge-shaped waveguide, or injection of image information through a different face other than shown in FIG. 15C, may be utilized to facilitate staggering (geometric and/or temporal) of different displays and arrays such that a Z-axis delta may also be developed as a means for injecting three-dimensional information into the wedge-shaped waveguide. For a greater than three-dimensions array configuration, various displays may be configured to enter a wedge-shaped waveguide at multiple edges in multiple stacks with staggering to get higher dimensional configurations.

Figure 20A:
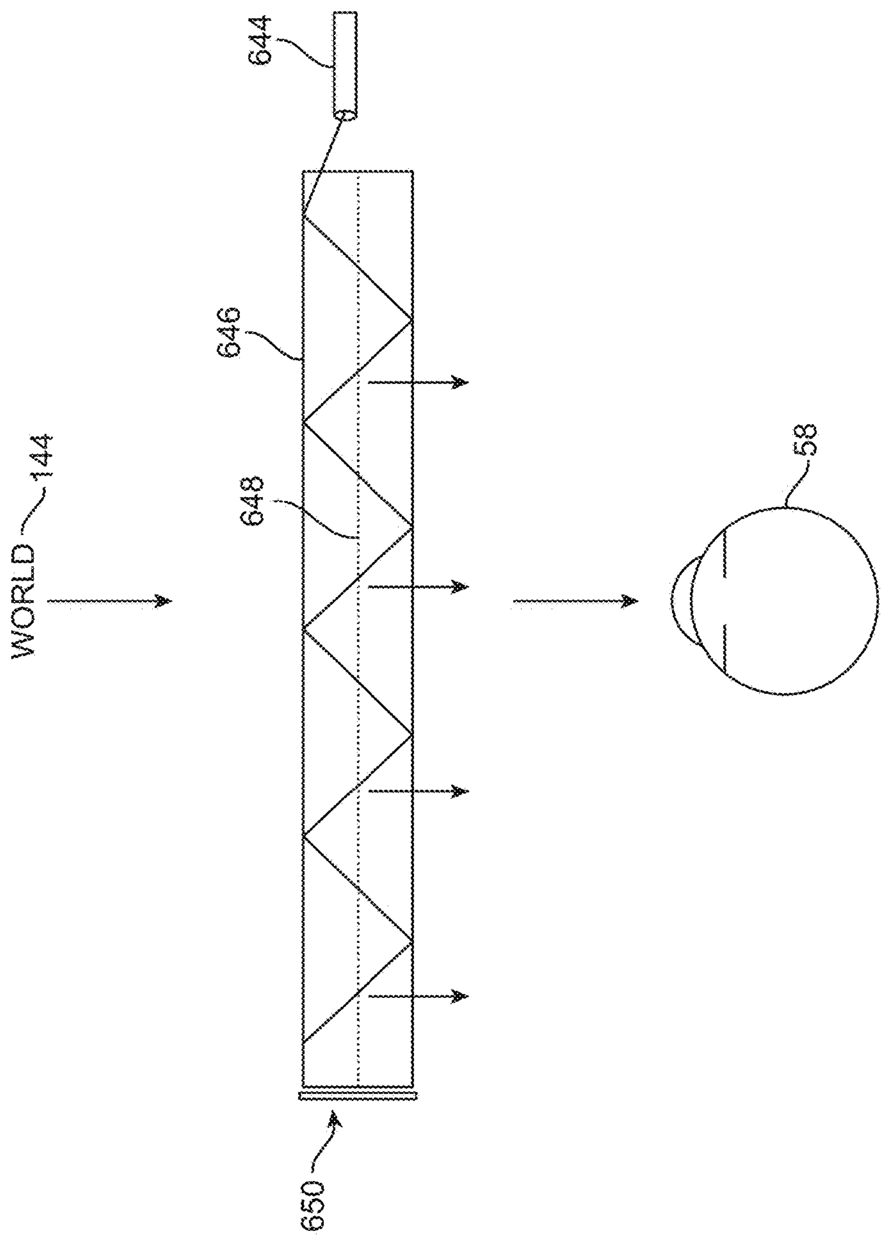
FIGS. 20A-20O illustrate embodiments of various waveguide assemblies, according to the illustrated embodiments.
Figure 20B:
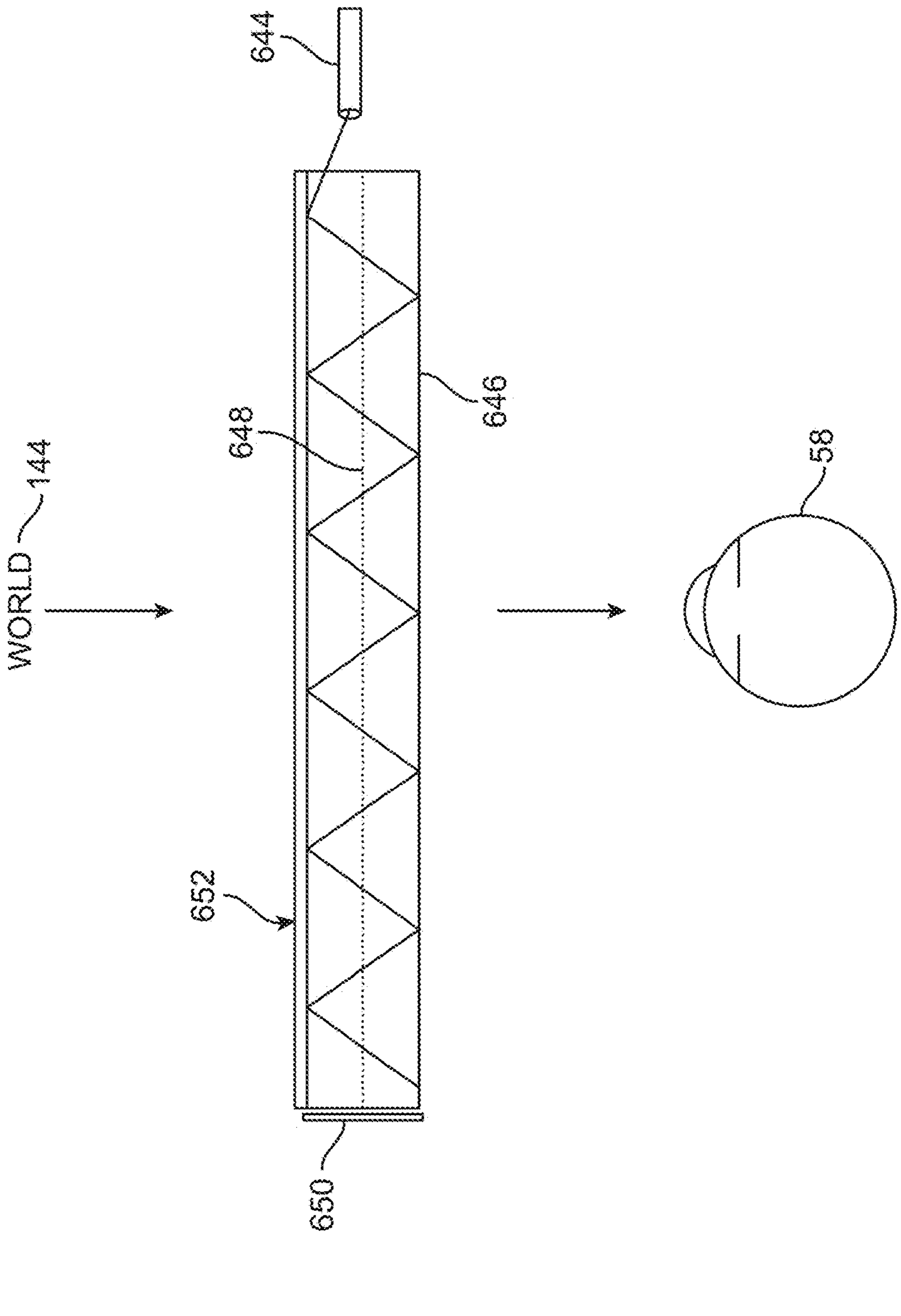

Referring to FIG. 20A, a configuration similar to that depicted in FIG. 8H is shown wherein a waveguide 646 has a diffractive optical element (648; or "DOE", as noted above) sandwiched in the middle (alternatively, as described above, the diffractive optical element may reside on the front or back face of the depicted waveguide). A ray may enter the waveguide 646 from the projector or display 644. Once in the waveguide 646, each time the ray intersects the DOE 648, part of the ray is exited out of the waveguide 646.

As described above, the DOE may be designed such that the exit illuminance across the length of the waveguide 646 is somewhat uniform. For example, the first such DOE intersection may be configured to exit about 10% of the light. Then, the second DOE intersection may be configured to exit about 10% of the remaining light such that 81% is passed on, and so on. In another embodiment, a DOE may be designed to comprise a variable diffraction efficiency, such as linearly-decreasing diffraction efficiency, along its length to map out a more uniform exit illuminance across the length of the waveguide.

To further distribute remaining light that reaches an end (and in one embodiment to allow for selection of a relatively low diffraction efficiency DOE which would be favorable from a view-to-the-world transparency perspective), a reflective element (650) at one or both ends may be included. Further, referring to the embodiment of FIG. 20B, additional distribution and preservation may be achieved by including an elongate reflector 652 across the length of the waveguide as shown (comprising, for example, a thin film dichroic coating that is wavelength-selective); preferably such reflector would be blocking light that accidentally is reflected upward (back toward the real world 144 for exit in a way that it would not be utilized by the viewer). In some embodiments, such an elongate reflector may contribute to a "ghosting" effect perception by the user.

Figure 20C:
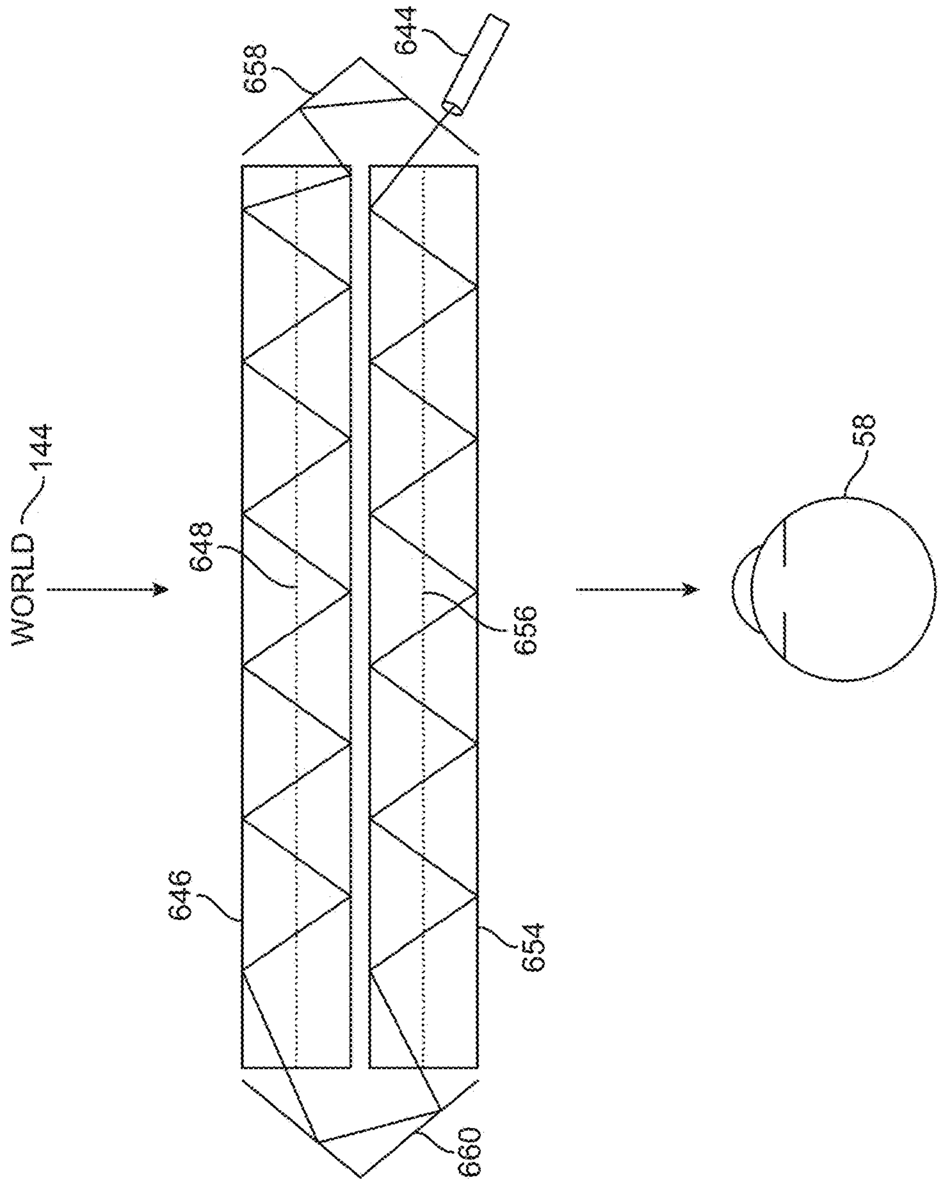

In one embodiment, this ghosting effect may be eliminated by having a dual-waveguide (646, 654) circulating reflection configuration, such as that shown in FIG. 20C, which is designed to keep the light moving around until it has been exited toward the eye 58 in a preferably substantially equally distributed manner across the length of the waveguide assembly. Referring to FIG. 20C, light may be injected with a projector or display 644, and as it travels across the DOE 656 of the first waveguide 654, it ejects a preferably substantially uniform pattern of light out toward the eye 58. Light that remains in the first waveguide is reflected by a first reflector assembly 660 into the second waveguide 646. In one embodiment, the second waveguide 646 may be configured to not have a DOE, such that it merely transports or recycles the remaining light back to the first waveguide, using the second reflector assembly.

Figure 20D:
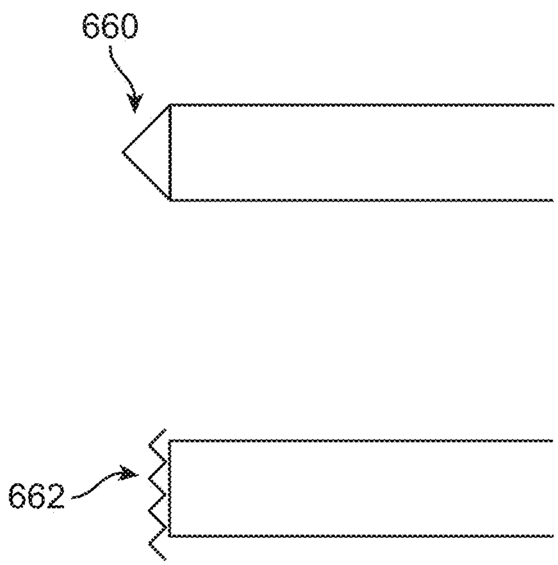

In another embodiment (as shown in FIG. 20C) the second waveguide 646 may also have a DOE 648 configured to uniformly eject fractions of travelling light to provide a second plane of focus for three-dimensional perception. Unlike the configurations of FIGS. 20A and 20B, the configuration of FIG. 20C is designed for light to travel the waveguide in one direction, which avoids the aforementioned ghosting problem that is related to passing light backwards through a waveguide with a DOE. Referring to FIG. 20D, rather than including a mirror or box style reflector assembly 660 at the ends of a waveguide for recycling the light, an array of smaller retro-reflectors 662, or a retro-reflective material, may be utilized.

Figure 20E:
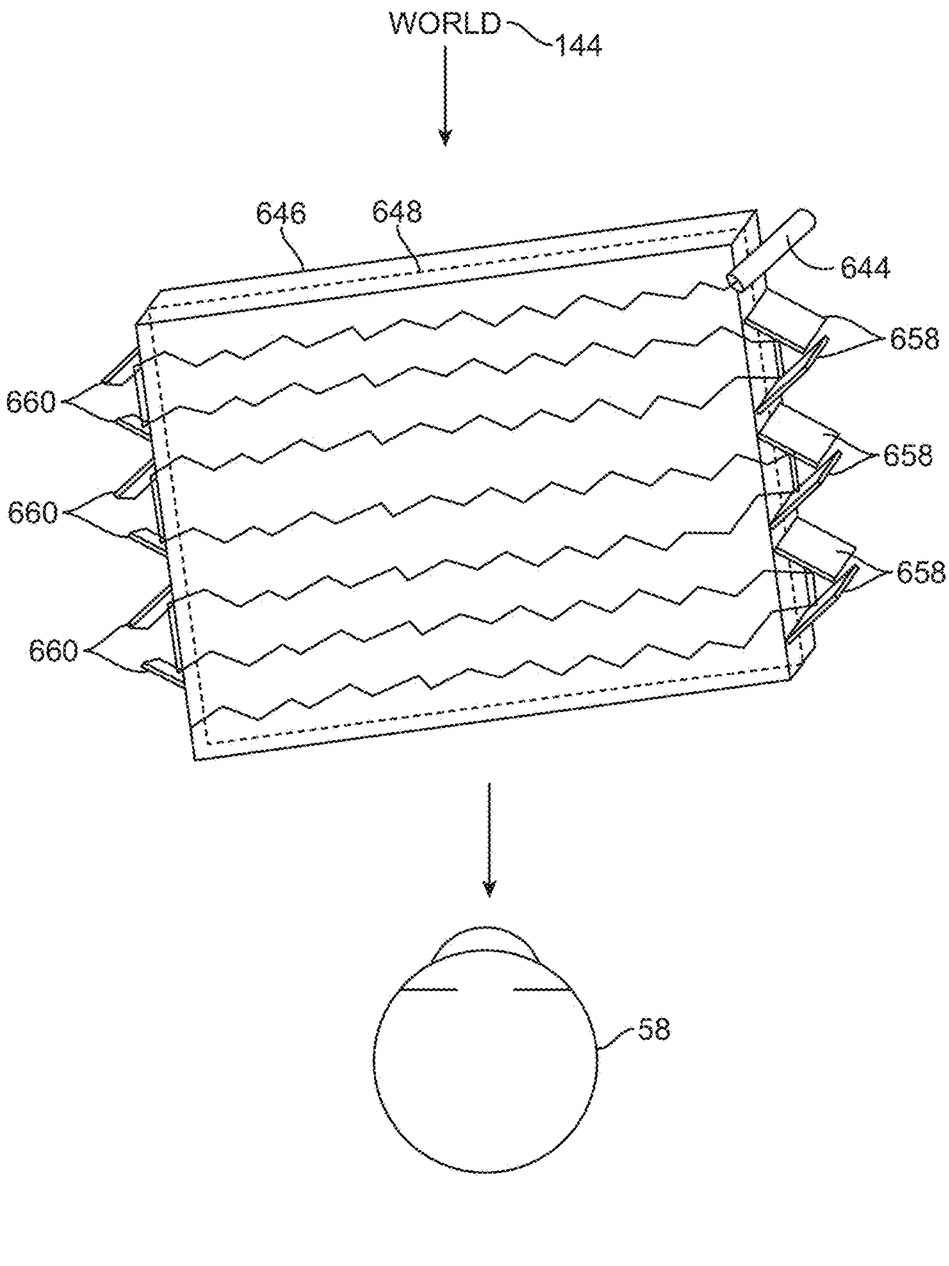

Referring to FIG. 20E, an embodiment is shown that utilizes some of the light recycling configurations of the embodiment of FIG. 20C to "snake" the light down through a waveguide 646 having a sandwiched DOE 648 after it has been injected with a display or projector 644 such that it crosses the waveguide 646 multiple times back and forth before reaching the bottom, at which point it may be recycled back up to the top level for further recycling. Such a configuration not only recycles the light and facilitates use of relatively low diffraction efficiency DOE elements for exiting light toward the eye 58, but also distributes the light, to provide for a large exit pupil configuration akin to that described in reference to FIG. 8K.

Figure 20F:
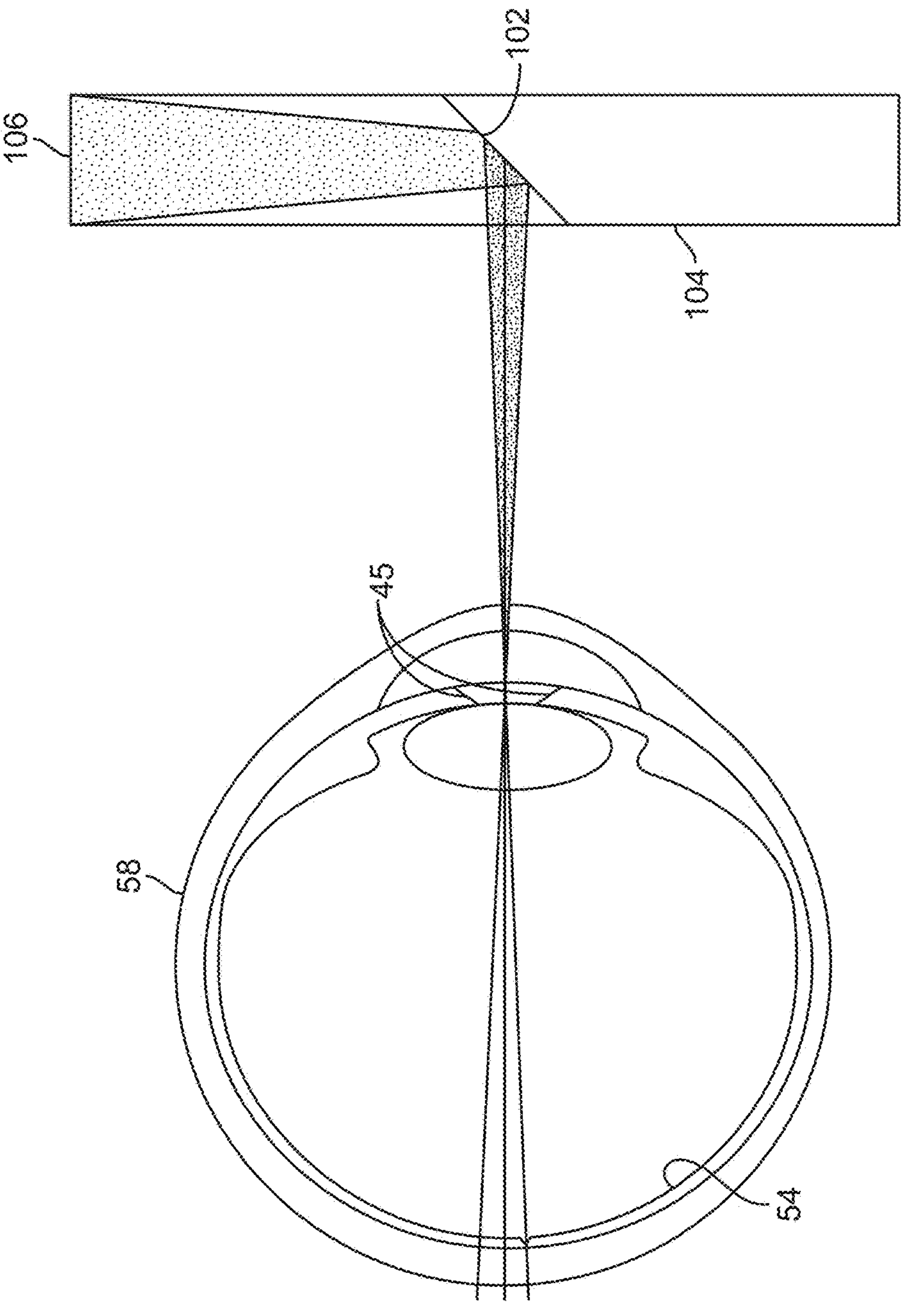

Referring to FIG. 20F, an illustrative configuration similar to that of FIG. 5A is shown, with incoming light injected along a conventional prism or beamsplitter substrate 104 to a reflector 102 without total internal reflection (e.g., without the prism being considered a waveguide) because the input projection 106, scanning or otherwise, is kept within the bounds of the prism. This means that the geometry of such prism becomes a significant constraint. In another embodiment, a waveguide may be utilized in place of the simple prism of FIG. 20F, which facilitates the use of total internal reflection to provide more geometric flexibility.

Other configurations described above are configured to benefit from the inclusion of waveguides for similar manipulations and light. For example, referring back to FIG. 7A, the general concept illustrated therein is that a collimated image injected into a waveguide may be refocused before transfer out toward an eye, in a configuration also designed to facilitate viewing light from the real world. In place of the refractive lens shown in FIG. 7A, a diffractive optical element may be used as a variable focus element.

Referring back to FIG. 7B, another waveguide configuration is illustrated in the context of having multiple layers stacked upon each other with controllable access toggling between a smaller path (total internal reflection through a waveguide) and a larger path (total internal reflection through a hybrid waveguide comprising the original waveguide and a liquid crystal isolated region with the liquid crystal switched to a mode wherein the refractive indices are substantially matched between the main waveguide and the auxiliary waveguide). This allows the controller to be able to tune which path is being taken on a frame-by-frame basis. High-speed switching electro-active materials, such as lithium niobate, facilitate path changes with such a configuration at large rates (e.g., in the order of GHz), which allows one to change the path of light on a pixel-by-pixel basis.

Referring back to FIG. 8A, a stack of waveguides paired with weak lenses is illustrated to demonstrate a multifocal configuration wherein the lens and waveguide elements may be static. Each pair of waveguide and lens may be functionally replaced with waveguide having an embedded DOE element (which may be static, in a closer analogy to the configuration of FIG. 8A, or dynamic), such as that described in reference to FIG. 8I.

Figure 20G:
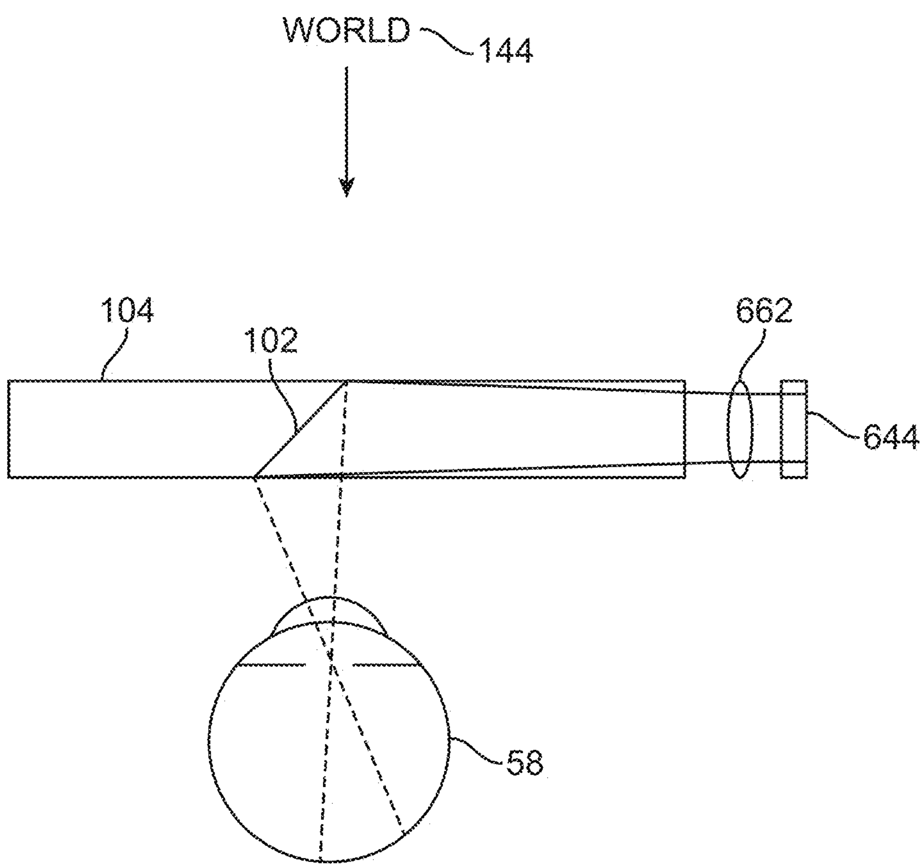

Referring to FIG. 20G, if a transparent prism or block 104 (e.g., not a waveguide) is utilized to hold a mirror or reflector 102 in a periscope type of configuration to receive light from other components, such as a lens 662 and projector or display 644, the field of view is limited by the size of that reflector 102.

Figure 20H:
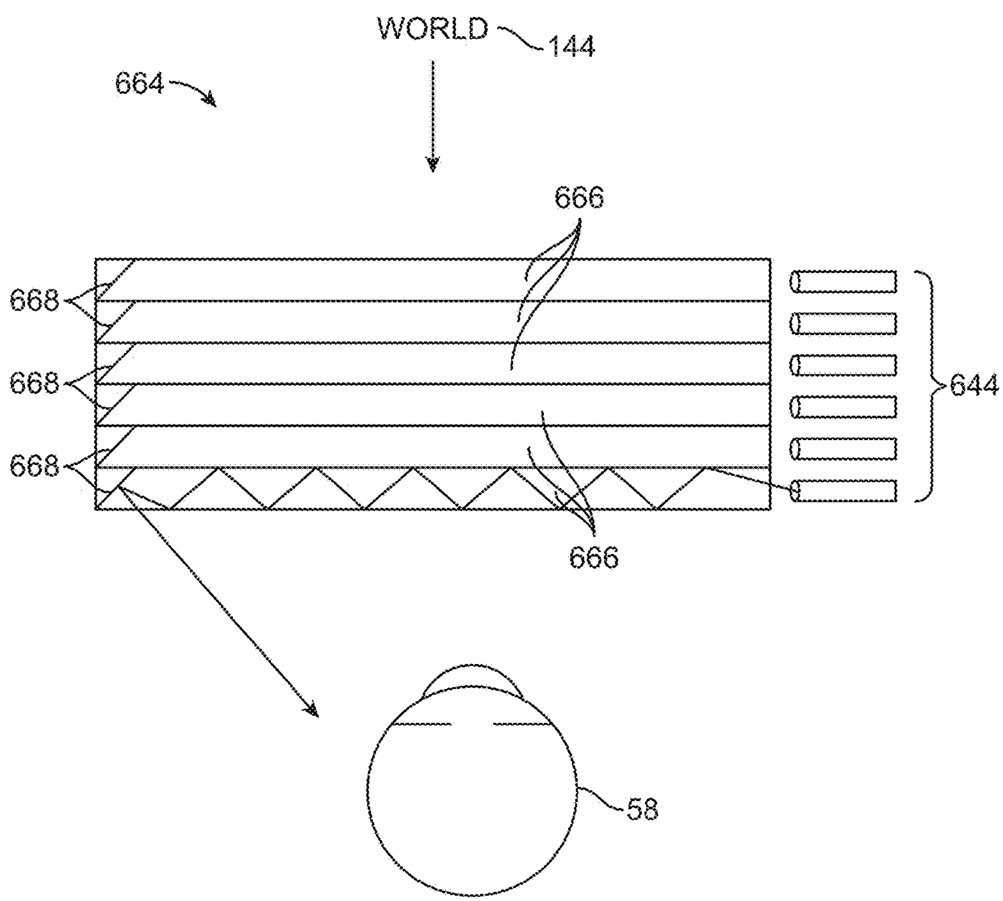

It should be appreciated that the bigger the reflector, the wider the field of view. Thus to accommodate a larger field of view with such configuration, a thicker substrate may be needed to hold a larger reflector. Otherwise, the functionality of an aggregated plurality of reflectors may be utilized to increase the functional field of view, as described in FIGS. 8O, 8P, and 8Q. Referring to FIG. 20H, a stack 664 of planar waveguides 666, each fed with a display or projector (644; or in another embodiment a multiplexing of a single display) and having an exit reflector 668, may be utilized to aggregate toward the function of a larger single reflector. The exit reflectors may be at the same angle in some cases, or not the same angle in other cases, depending upon the positioning of the eye 58 relative to the assembly.

Figure 20I:
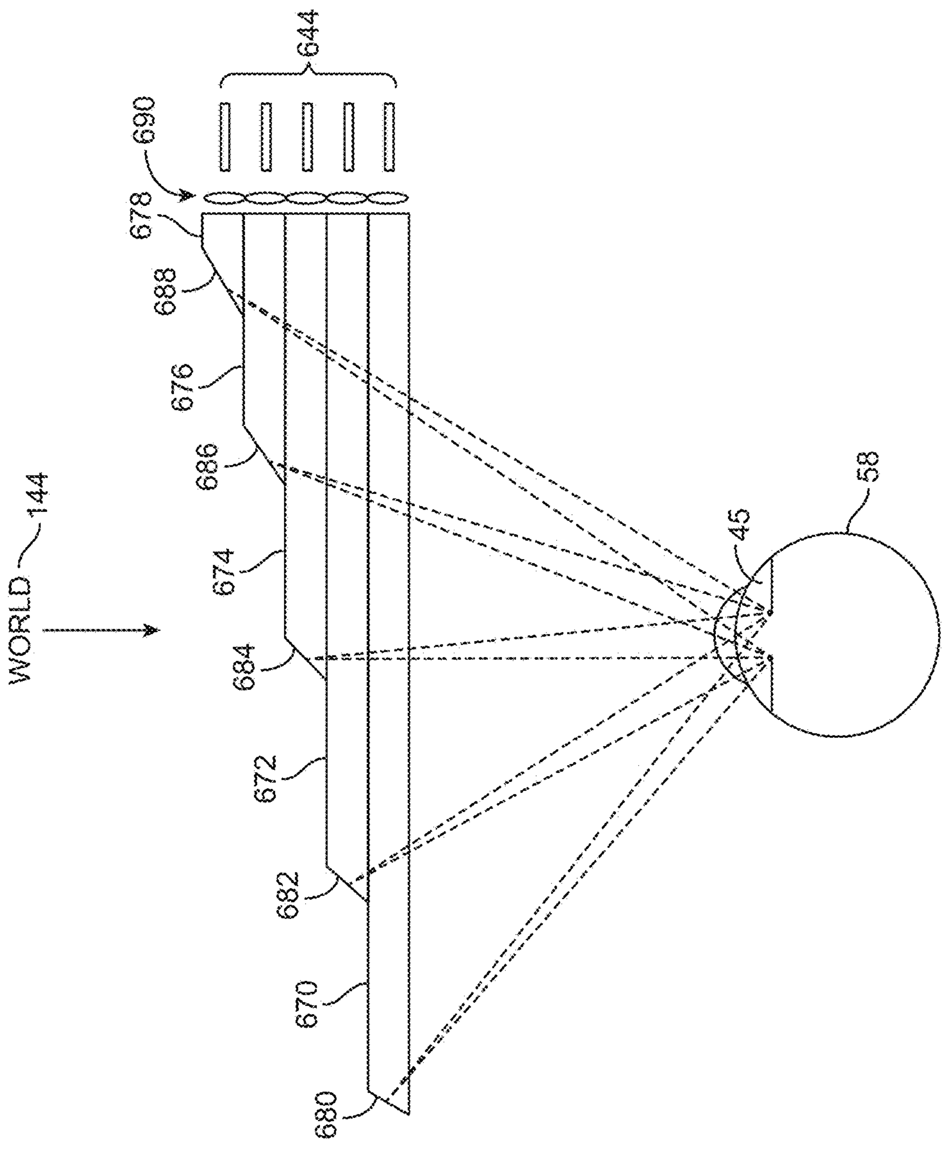

FIG. 20I illustrates a related configuration, in which the reflectors (680, 682, 684, 686, 688) in each of the planar waveguides (670, 672, 674, 676, 678) have been offset from each other. Each waveguide receives light from a projector or display 644 which may be sent through a lens 690 to ultimately transmit exiting light to the pupil 45 of the eye 58 by virtue of the reflectors (680, 682, 684, 686, 688) in each of the planar waveguides (670, 672, 674, 676, 678). If one can create a total range of all of the angles that would be expected to be seen in the scene (e.g., preferably without blind spots in the key field of view), then a useful field of view may have been achieved.

As described above, the eye 58 functions based at least in part on the angle at which light rays enter the eye. This may be advantageously simulated. The rays need not pass through the exact same point in space at the pupil—rather the light rays just need to get through the pupil and be sensed by the retina. FIG. 20K illustrates a variation 692 wherein the shaded portion of the optical assembly may be utilized as a compensating lens to functionally pass light from the real world 144 through the assembly as though it has been passed through a zero power telescope.

Figure 20J:
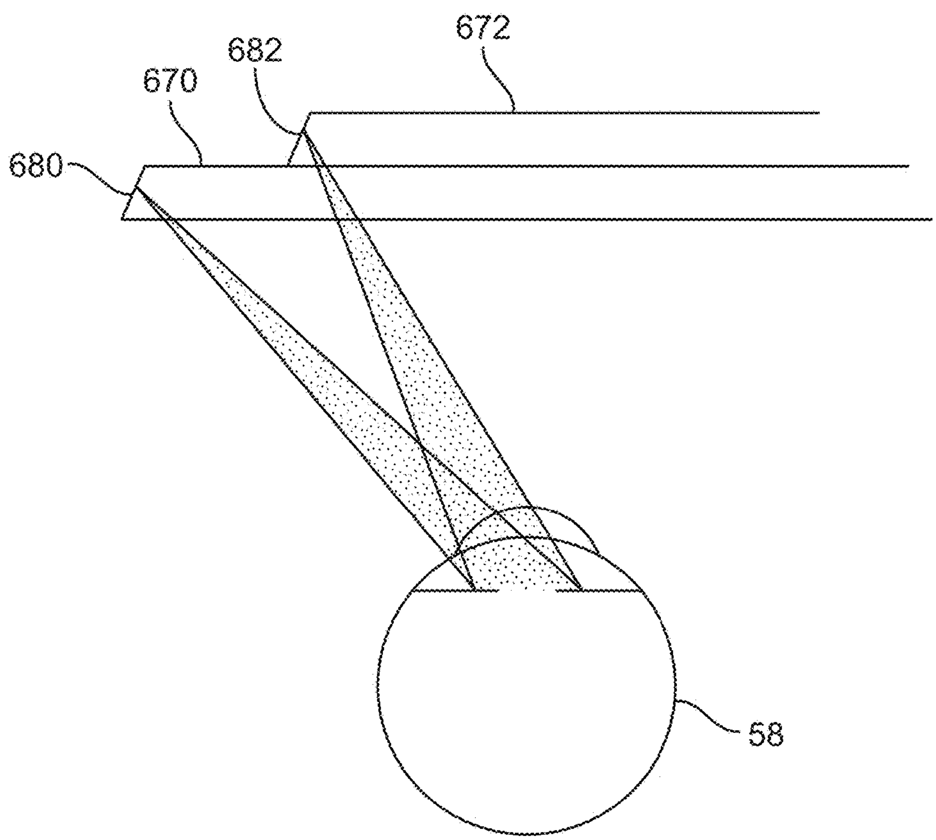
Figure 20K:
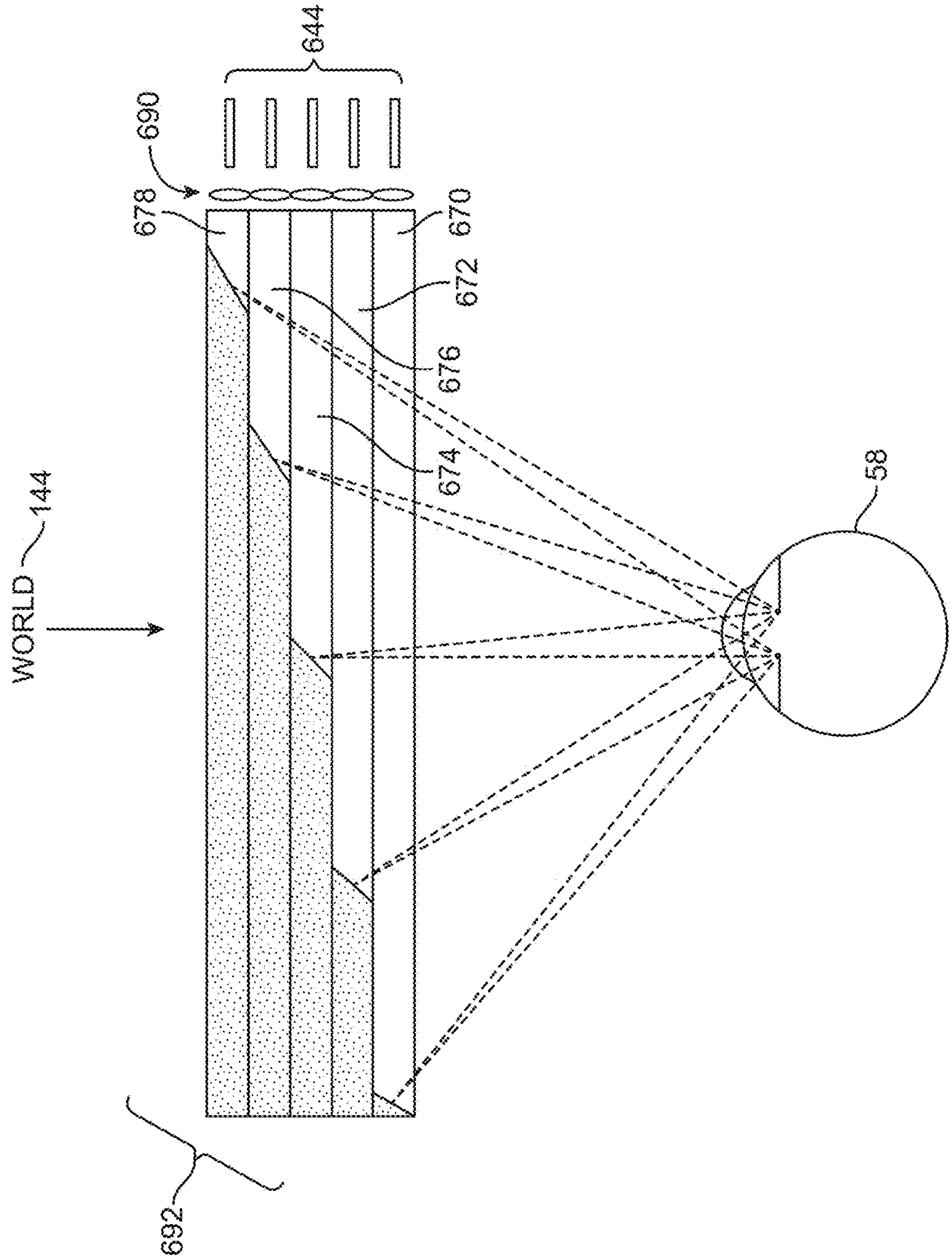

Referring to FIG. 20J, each of the aforementioned rays may also be a relative wide beam that is being reflected through the pertinent waveguide (670, 672) by total internal reflection. The reflector (680, 682) facet size will determine a width of the exiting beam.

Figure 20L:
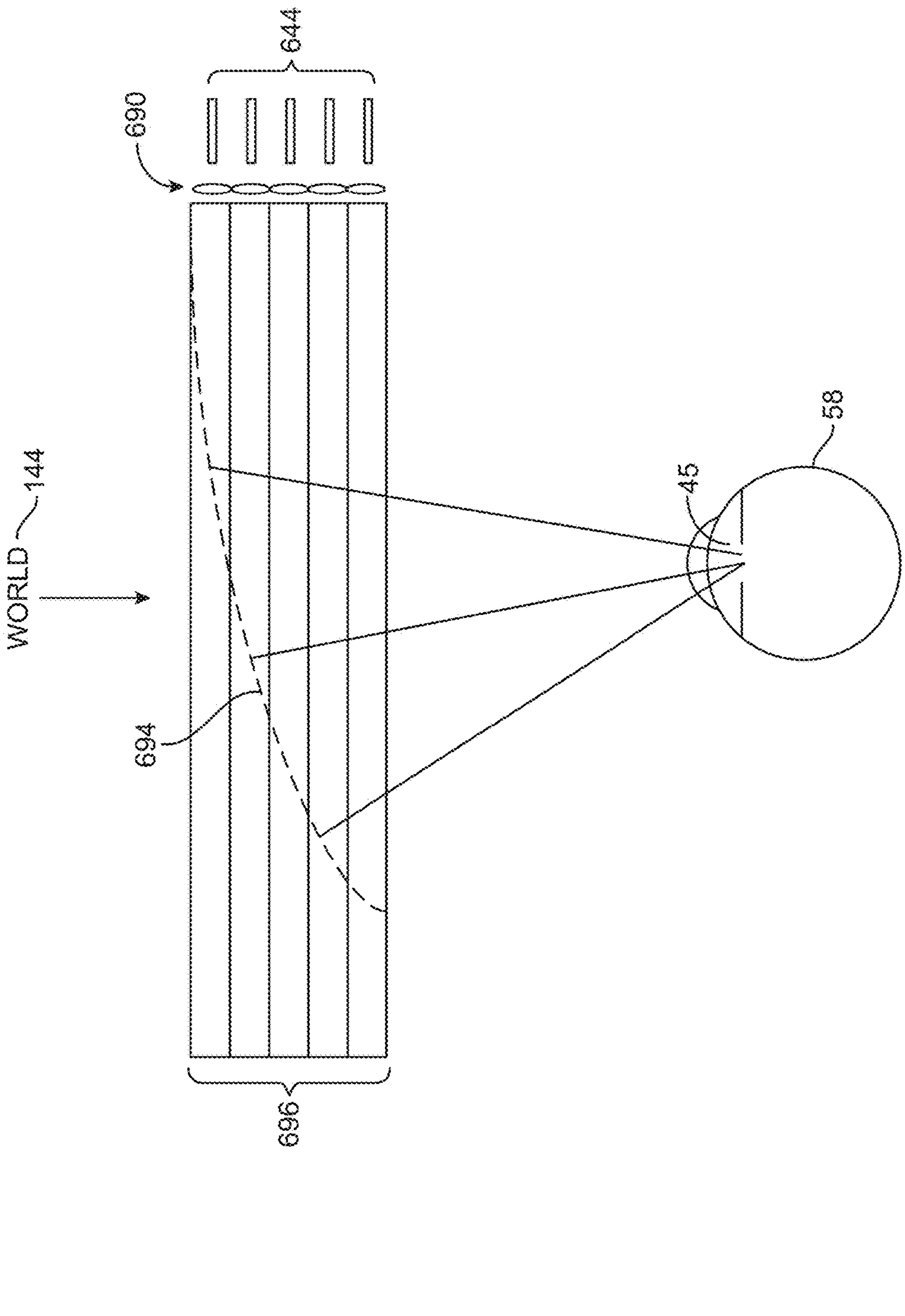

Referring to FIG. 20L, a further discretization of the reflector is shown, wherein a plurality of small straight angular reflectors may form a roughly parabolic reflecting surface 694 in the aggregate through a waveguide or stack thereof 696. Light coming in from the displays (644; or single MUXed display, for example), such as through a lens 690, is all directed toward the same shared focal point at the pupil 45 of the eye 58.

Referring back to FIG. 13M, a linear array of displays 378 injects light into a shared waveguide 376. In another embodiment a single display may be multiplexed to a series of entry lenses to provide similar functionality as the embodiment of FIG. 13M, with the entry lenses creating parallel paths of rays running through the waveguide.

In a conventional waveguide approach wherein total internal reflection is relied upon for light propagation, the field of view is restricted because there is only a certain angular range of rays propagating through the waveguide (others may escape out). In one embodiment, if a red/green/blue (or "RGB") laserline reflector is placed at one or both ends of the planar surfaces, akin to a thin film interference filter that is highly reflective for only certain wavelengths and poorly reflective for other wavelengths, then one can functionally increase the range of angles of light propagation. Windows (without the coating) may be provided for allowing light to exit in predetermined locations. Further, the coating may be selected to have a directional selectivity (somewhat like reflective elements that are only highly reflective for certain angles of incidence). Such a coating may be most relevant for the larger planes/sides of a waveguide.

Referring back to FIG. 13E, a variation on a scanning fiber display was discussed, which may be deemed a scanning thin waveguide configuration, such that a plurality of very thin planar waveguides 358 may be oscillated or vibrated such that if a variety of injected beams is coming through with total internal reflection, the configuration functionally would provide a linear array of beams escaping out of the edges of the vibrating elements 358. The depicted configuration has approximately five externally-projecting planar waveguide portions 358 in a host medium or substrate 356 that is transparent, but which preferably has a different refractive index so that the light will stay in total internal reflection within each of the substrate-bound smaller waveguides that ultimately feed (in the depicted embodiment there is a 90 degree turn in each path at which point a planar, curved, or other reflector may be utilized to transmit the light outward) the externally-projecting planar waveguide portions 358.

The externally-projecting planar waveguide portions 358 may be vibrated individually, or as a group along with oscillatory motion of the substrate 356. Such scanning motion may provide horizontal scanning, and for vertical scanning, the input 360 aspect of the assembly (e.g., such as one or more scanning fiber displays scanning in the vertical axis) may be utilized. Thus a variation of the scanning fiber display is presented.

Referring back to FIG. 13H, a waveguide 370 may be utilized to create a lightfield. With waveguides working best with collimated beams that may be associated with optical infinity from a perception perspective, all beams staying in focus may cause perception discomfort (e.g., the eye will not make a discernible difference in dioptric blur as a function of accommodation; in other words, the narrow diameter, such as 0.5 mm or less, collimated beamlets may open loop the eye's accommodation/vergence system, causing discomfort).

In one embodiment, a single beam may be fed in with a number of cone beamlets coming out, but if the introduction vector of the entering beam is changed (e.g., laterally shift the beam injection location for the projector/display relative to the waveguide), one may control where the beam exits from the waveguide as it is directed toward the eye. Thus one may use a waveguide to create a lightfield by creating a bunch of narrow diameter collimated beams, and such a configuration is not reliant upon a true variation in a light wavefront to be associated with the desired perception at the eye.

If a set of angularly and laterally diverse beamlets is injected into a waveguide (for example, by using a multicore fiber and driving each core separately; another configuration may utilize a plurality of fiber scanners coming from different angles; another configuration may utilize a high-resolution panel display with a lenslet array on top of it), a number of exiting beamlets can be created at different exit angles and exit locations. Since the waveguide may scramble the lightfield, the decoding is preferably predetermined.

Figure 20M:
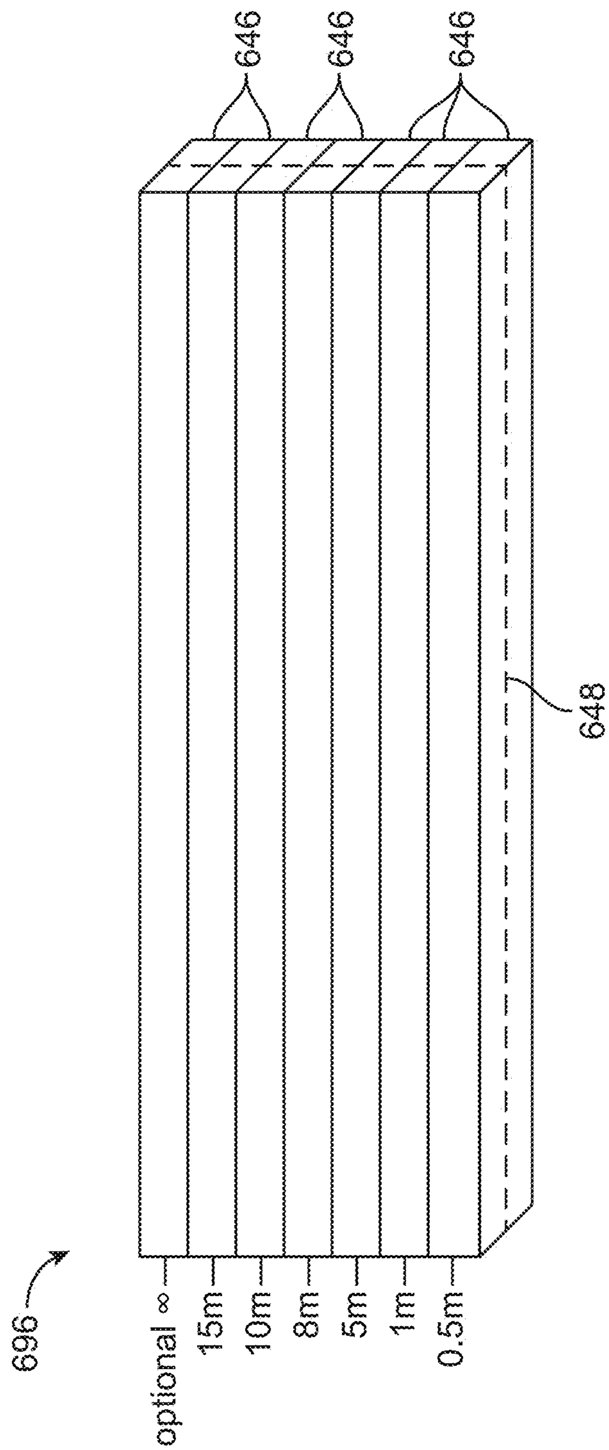
Figure 20N:
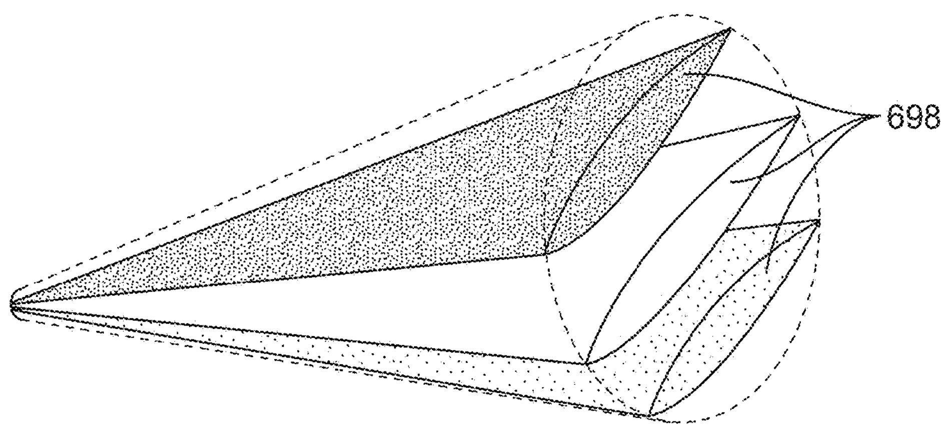

Referring to FIGS. 20M and 20N, a waveguide 646 assembly 696 is shown that comprises stacked waveguide components in the vertical or horizontal axis. Rather than having one monolithic planar waveguide, the waveguide assembly 696 stacks a plurality of smaller waveguides 646 immediately adjacent each other such that light introduced into one waveguide, in addition to propagating down (e.g., propagating along a Z axis with total internal reflection in +X,−X) such waveguide by total internal reflection, also totally internally reflects in the perpendicular axis (+y, −Y) as well, such that it does not overflow into other areas.

In other words, if total internal reflection is from left to right and back during Z axis propagation, the configuration will be set up to totally internally reflect any light that hits the top or bottom sides as well. Each layer may be driven separately without interference from other layers. Each waveguide may have a DOE 648 embedded and configured to eject out light with a predetermined distribution along the length of the waveguide, as described above, with a predetermined focal length configuration (shown in FIG. 20M as ranging from 0.5 meters to optical infinity).

In another variation, a very dense stack of waveguides with embedded DOEs may be produced such that it spans the size of the anatomical pupil of the eye (e.g., such that multiple layers 698 of the composite waveguide may be required to cross the exit pupil, as illustrated in FIG. 20N). With such a configuration, one may feed a collimated image for one wavelength, and then the portion located the next millimeter down producing a diverging wavefront that represents an object coming from a focal distance of, say, 15 meters away, and so on. The concept here is that an exit pupil is coming from a number of different waveguides as a result of the DOEs and total internal reflection through the waveguides and across the DOEs. Thus rather than creating one uniform exit pupil, such a configuration creates a plurality of stripes that, in the aggregate, facilitate the perception of different focal depths with the eye/brain.

Such a concept may be extended to configurations comprising a waveguide with a switchable/controllable embedded DOE (e.g. that is switchable to different focal distances), such as those described in relation to FIGS. 8B-8N, which allows more efficient light trapping in the axis across each waveguide. Multiple displays may be coupled into each of the layers, and each waveguide with DOE would emit rays along its own length. In another embodiment, rather than relying on total internal reflection, a laserline reflector may be used to increase angular range. In between layers of the composite waveguide, a completely reflective metallized coating may be utilized, such as aluminum, to ensure total reflection, or alternatively dichroic style or narrow band reflectors may be utilized.

Figure 20O:
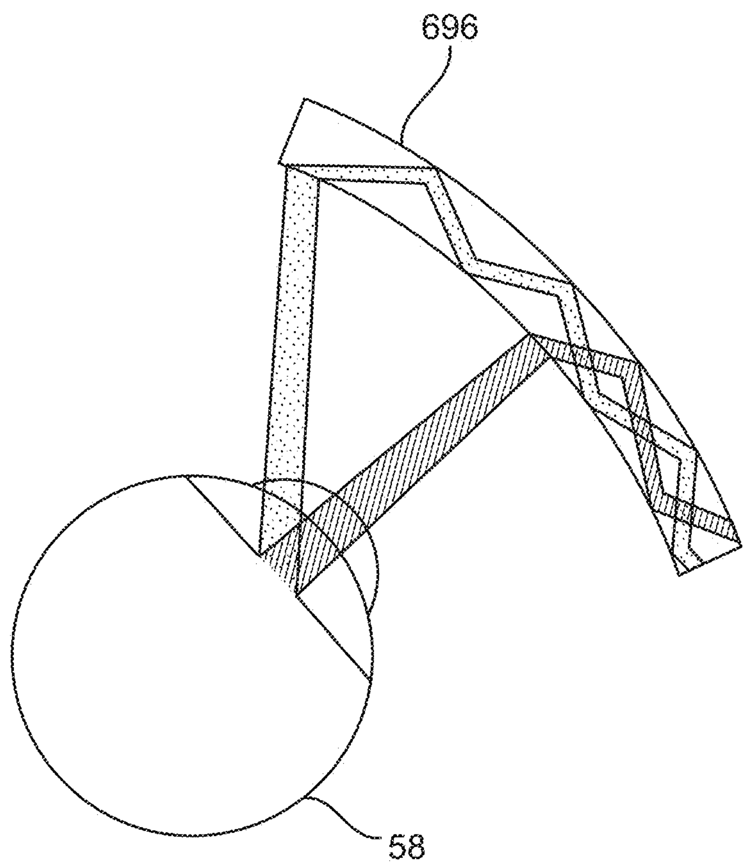

Referring to FIG. 20O, the whole composite waveguide assembly 696 maybe be curved concavely toward the eye 58 such that each of the individual waveguides is directed toward the pupil. In other words, the configuration may be designed to more efficiently direct the light toward the location where the pupil is likely to be present. Such a configuration also may be utilized to increase the field of view.

Figure 21A:
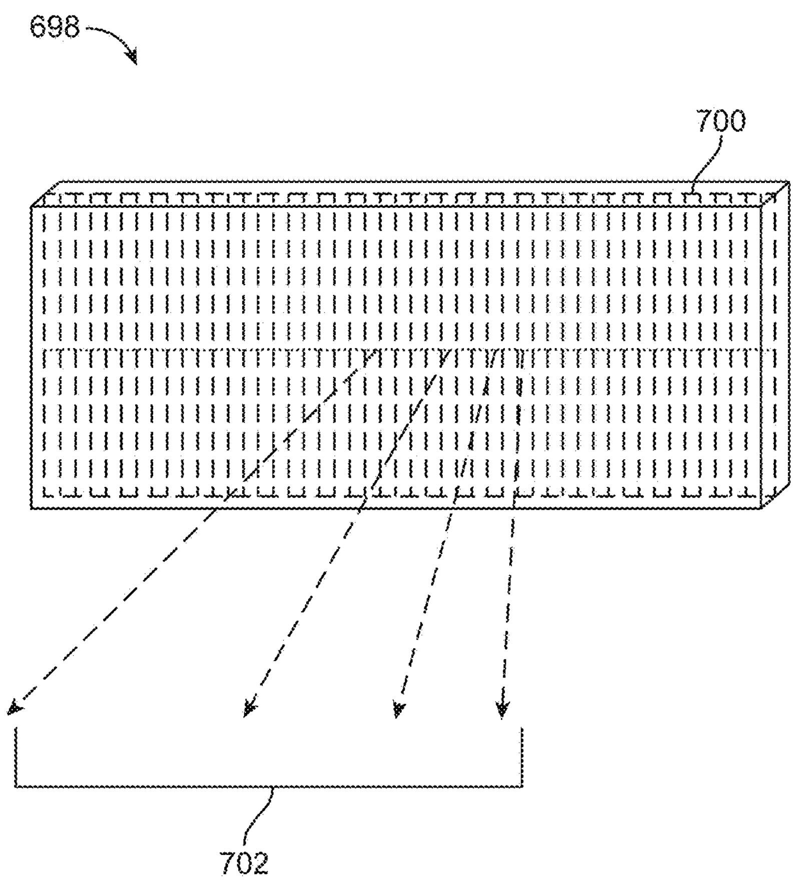
FIGS. 21A-21N illustrate various configurations of DOEs coupled to other optical elements, according to the illustrated embodiments.

As was discussed above in relation to FIGS. 8L, 8M, and 8N, a changeable diffraction configuration allows for scanning in one axis, somewhat akin to a scanning light display. FIG. 21A illustrates a waveguide 698 having an embedded (e.g., sandwiched within) DOE 700 with a linear grating term that may be changed to alter the exit angle of exiting light 702 from the waveguide, as shown. A high-frequency switching DOE material such as lithium niobate may be utilized. In one embodiment, such a scanning configuration may be used as the sole mechanism for scanning a beam in one axis; in another embodiment, the scanning configuration may be combined with other scanning axes, and may be used to create a larger field of view. For example, if a normal field of view is 40 degrees, and by changing the linear diffraction pitch one can steer over another 40 degrees, the effective usable field of view for the system is 80 degrees.

Figure 21B:
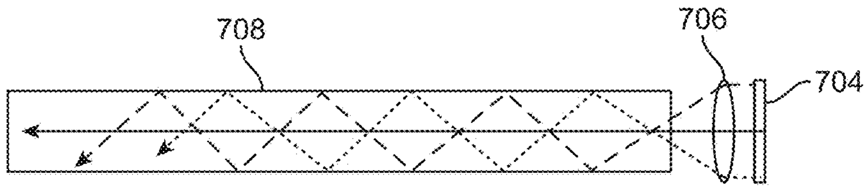

Referring to FIG. 21B, in a conventional configuration, a waveguide (708) may be placed perpendicular to a panel display 704, such as an LCD or OLED panel, such that beams may be injected from the waveguide 708, through a lens 706, and into the panel 704 in a scanning configuration to provide a viewable display for television or other purposes. Thus the waveguide may be utilized in such configuration as a scanning image source, in contrast to the configurations described in reference to FIG. 21A, wherein a single beam of light may be manipulated by a scanning fiber or other element to sweep through different angular locations, and in addition, another direction may be scanned using the high-frequency diffractive optical element.

In another embodiment, a uniaxial scanning fiber display (say scanning the fast line scan, as the scanning fiber is relatively high frequency) may be used to inject the fast line scan into the waveguide, and then the relatively slow DOE switching (e.g., in the range of 100 Hz) may be used to scan lines in the other axis to form an image.

In another embodiment, a DOE with a grating of fixed pitch may be combined with an adjacent layer of electro-active material having a dynamic refractive index (such as liquid crystal), such that light may be redirected into the grating at different angles. This is an application of the basic multipath configuration described above in reference to FIG. 7B, in which an electro-active layer comprising an electro-active material such as liquid crystal or lithium niobate may change its refractive index such that it changes the angle at which a ray emerges from the waveguide. A linear diffraction grating may be added to the configuration of FIG. 7B (in one embodiment, sandwiched within the glass or other material comprising the larger lower waveguide) such that the diffraction grating may remain at a fixed pitch, but such that the light is biased before it hits the grating.

Figure 21C:
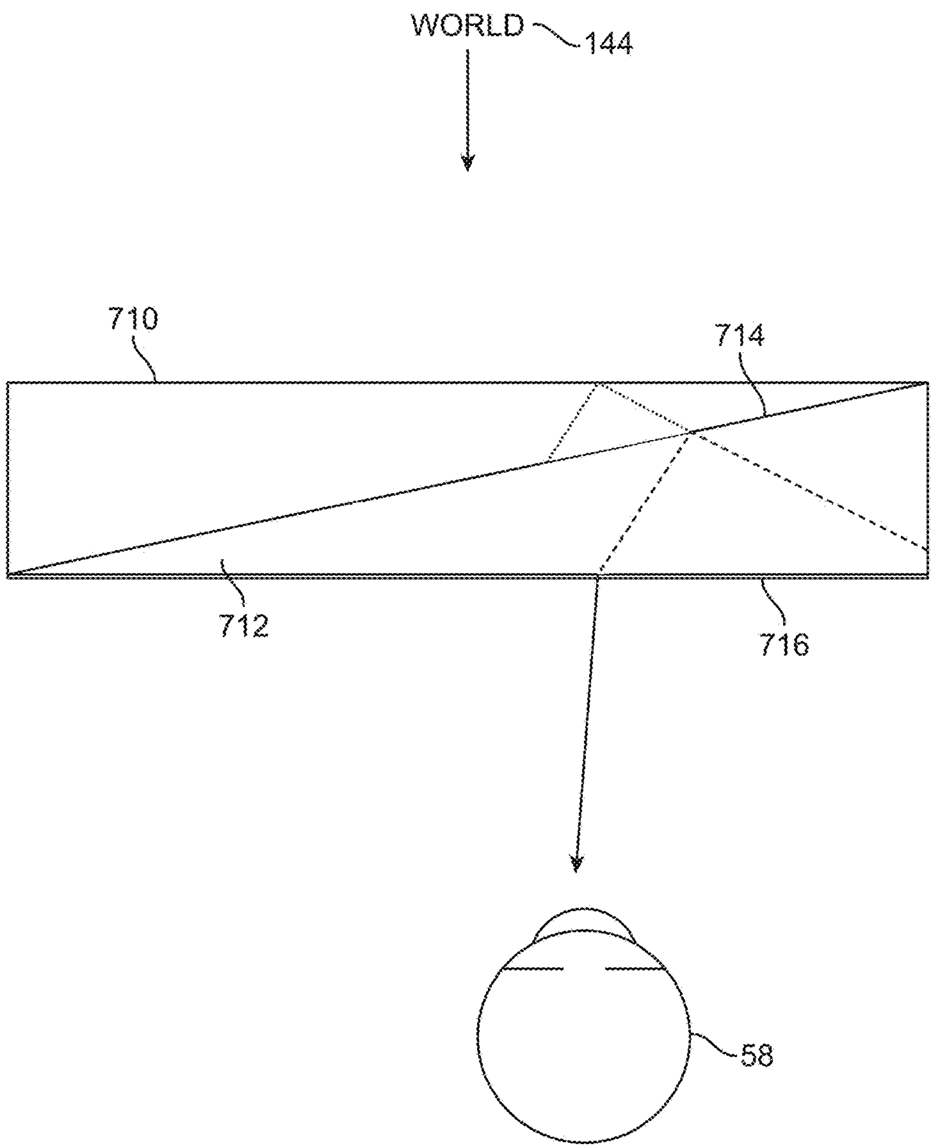
Figure 21D:
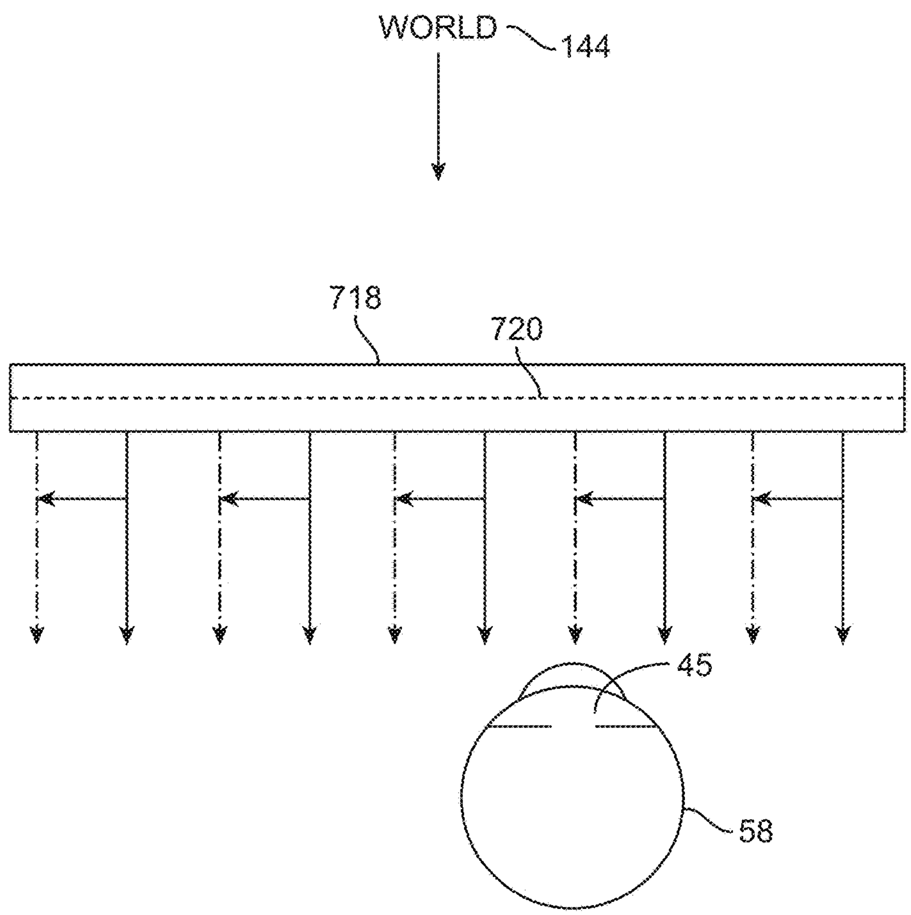

FIG. 21C shows another embodiment featuring two wedge-like waveguide elements (710, 712), wherein one or more of them may be electro-active so that the related refractive index may be changed. The elements may be configured such that when the wedges have matching refractive indices, the light totally internally reflects through the pair (which in the aggregate performs akin to a planar waveguide with both wedges matching) while the wedge interfaces have no effect. If one of the refractive indices is changed to create a mismatch, a beam deflection at the wedge interface 714 is caused, and total internal reflection is caused from that surface back into the associated wedge. Then, a controllable DOE 716 with a linear grating may be coupled along one of the long edges of the wedge to allow light to exit out and reach the eye at a desirable exit angle.

In another embodiment, a DOE such as a Bragg grating, may be configured to change pitch versus time, such as by a mechanical stretching of the grating (for example, if the grating resides on or comprises an elastic material), a moiré beat pattern between two gratings on two different planes (the gratings may be the same or different pitches), Z-axis motion (e.g., closer to the eye, or farther away from the eye) of the grating, which functionally is similar in effect to stretching of the grating, or electro-active gratings that may be switched on or off, such as one created using a polymer dispersed liquid crystal approach wherein liquid crystal droplets may be controllably activated to change the refractive index to become an active grating. This is contrast to turning the voltage off and allowing a switch back to a refractive index that matches that of the host medium.

In another embodiment, a time-varying grating may be utilized for field of view expansion by creating a tiled display configuration. Further, a time-varying grating may be utilized to address chromatic aberration (failure to focus all colors/wavelengths at the same focal point). One property of diffraction gratings is that they will deflect a beam as a function of its angle of incidence and wavelength (e.g., a DOE will deflect different wavelengths by different angles: somewhat akin to the manner in which a simple prism will divide out a beam into its wavelength components).

One may use time-varying grating control to compensate for chromatic aberration in addition to field of view expansion. Thus, for example, in a waveguide with embedded DOE type of configuration as described above, the DOE may be configured to drive the red wavelength to a slightly different place than the green and blue to address unwanted chromatic aberration. The DOE may be time-varied by having a stack of elements that switch on and off (e.g. to get red, green, and blue to be diffracted outbound similarly).

In another embodiment, a time-varying grating may be utilized for exit pupil expansion. For example, referring to FIG. 21D, it is possible that a waveguide 718 with embedded DOE 720 may be positioned relative to a target pupil such that none of the beams exiting in a baseline mode actually enter the target pupil 45—such that the pertinent pixel would be missed by the user. A time-varying configuration may be utilized to fill in the gaps in the outbound exit pattern by shifting the exit pattern laterally (shown in dashed/dotted lines) to effectively scan each of the 5 exiting beams to better ensure that one of them hits the pupil of the eye. In other words, the functional exit pupil of the display system is expanded.

In another embodiment, a time-varying grating may be utilized with a waveguide for one, two, or three axis light scanning. In a manner akin to that described in reference to FIG. 21A, one may use a term in a grating that is scanning a beam in the vertical axis, as well as a grating that is scanning in the horizontal axis. Further, if radial elements of a grating are incorporated, as is discussed above in relation to FIGS. 8B-8N, one may have scanning of the beam in the Z axis (e.g., toward/away from the eye), all of which may be time-sequential scanning.

Notwithstanding the discussions herein regarding specialized treatments and uses of DOEs generally in connection with waveguides, many of these uses of DOE are usable whether or not the DOE is embedded in a waveguide. For example, the output of a waveguide may be separately manipulated using a DOE. Or, a beam may be manipulated by a DOE before it is injected into a waveguide. Further, one or more DOEs, such as a time-varying DOE, may be utilized as an input for freeform optics configurations, as discussed below.

As discussed above in reference to FIGS. 8B-8N, an element of a DOE may have a circularly-symmetric term, which may be summed with a linear term to create a controlled exit pattern (e.g., as described above, the same DOE that outcouples light may also focus it). In another embodiment, the circular term of the DOE diffraction grating may be varied such that the focus of the beams representing those pertinent pixels is modulated. In addition, one configuration may have a second/separate circular DOE, obviating the need to have a linear term in the DOE.

Figure 21E:
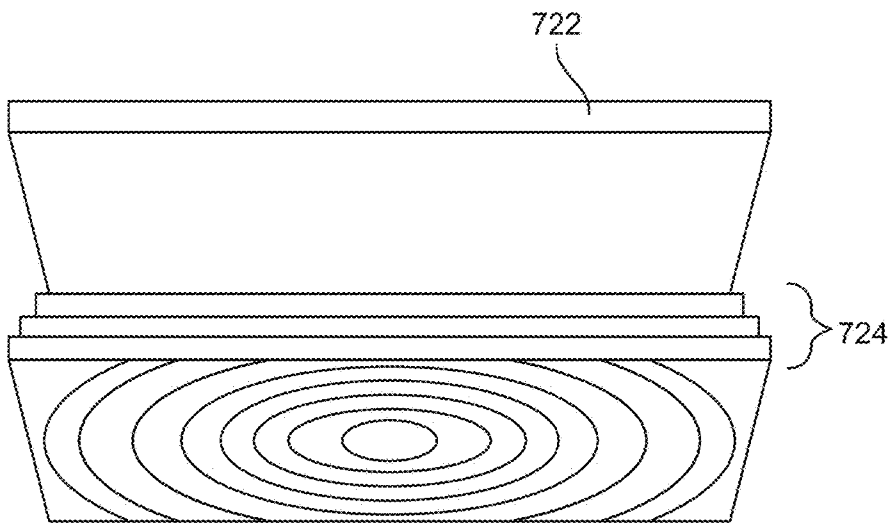
Figure 21F:
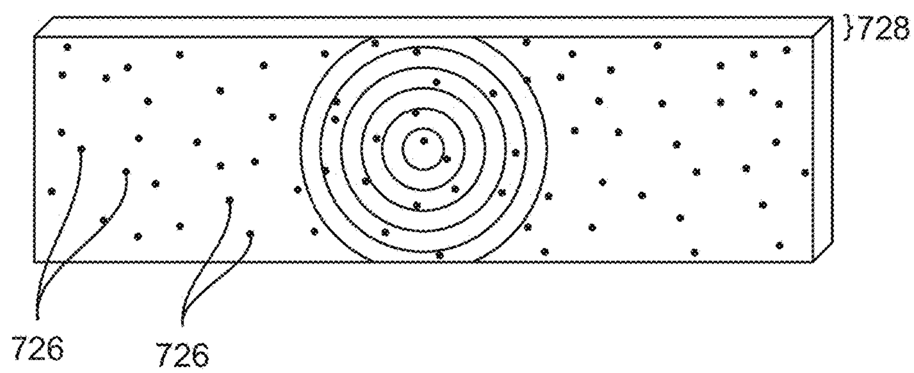

Referring to FIG. 21E, one may have a waveguide 722 outputting collimated light with no DOE element embedded, and a second waveguide that has a circularly-symmetric DOE that can be switched between multiple configurations—in one embodiment by having a stack 724 of such DOE elements (FIG. 21F shows another configuration wherein a functional stack 728 of DOE elements may comprise a stack of polymer dispersed liquid crystal elements 726, as described above, wherein without a voltage applied, a host medium refraction index matches that of a dispersed molecules of liquid crystal; in another embodiment, molecules of lithium niobate may be dispersed for faster response times; with voltage applied, such as through transparent indium tin oxide layers on either side of the host medium, the dispersed molecules change index of refraction and functionally form a diffraction pattern within the host medium) that can be switched on/off.

Figure 21G:
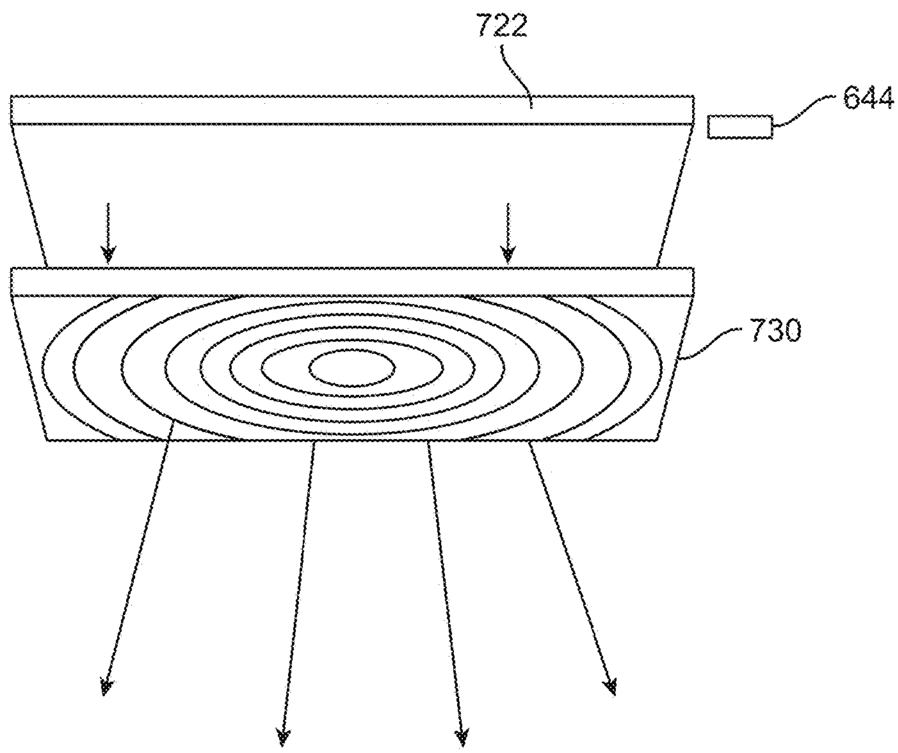
Figure 21H:
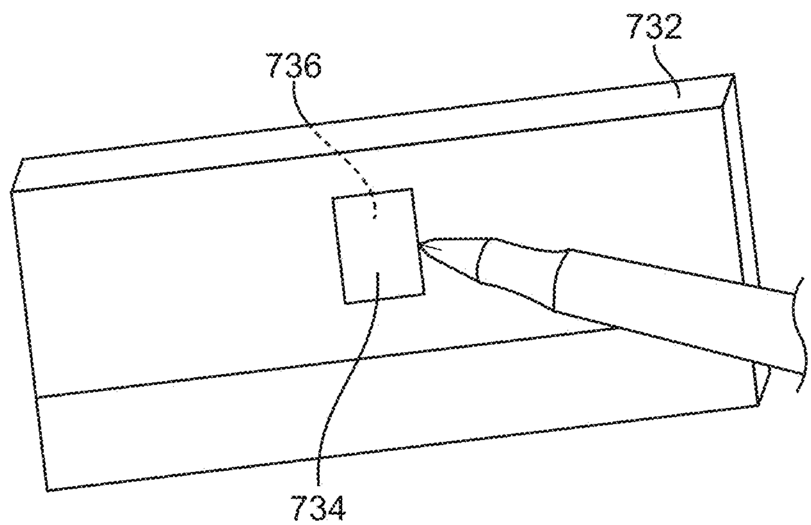

In another embodiment, a circular DOE may be layered in front of a waveguide for focus modulation. Referring to FIG. 21G, the waveguide 722 is outputting collimated light, which will be perceived as associated with a focal depth of optical infinity unless otherwise modified. The collimated light from the waveguide may be input into a diffractive optical element 730 which may be used for dynamic focus modulation (e.g., one may switch on and off different circular DOE patterns to impart various different focuses to the exiting light). In a related embodiment, a static DOE may be used to focus collimated light exiting from a waveguide to a single depth of focus that may be useful for a particular user application.

In another embodiment, multiple stacked circular DOEs may be used for additive power and many focus levels—from a relatively small number of switchable DOE layers. In other words, three different DOE layers may be switched on in various combinations relative to each other; the optical powers of the DOEs that are switched on may be added. In one embodiment wherein a range of up to 4 diopters is desired, for example, a first DOE may be configured to provide half of the total diopter range desired (in this example, 2 diopters of change in focus); a second DOE may be configured to induce a 1 diopter change in focus; then a third DOE may be configured to induce a ½ diopter change in focus. These three DOEs may be mixed and matched to provide ½, 1, 1.5, 2, 2.5, 3, and 3.5 diopters of change in focus. Thus a super large number of DOEs would not be required to get a relatively broad range of control.

In one embodiment, a matrix of switchable DOE elements may be utilized for scanning, field of view expansion, and/or exit pupil expansion. Generally in the above discussions of DOEs, it has been assume that a typical DOE is either all on or all off. In one variation, a DOE 732 may be subdivided into a plurality of functional subsections (such as the one labeled as element 734 in FIG. 21H), each of which preferably is uniquely controllable to be on or off (for example, referring to FIG. 21H, each subsection may be operated by its own set of indium tin oxide, or other control lead material, voltage application leads 736 back to a central controller). Given this level of control over a DOE paradigm, additional configurations are facilitated.

Figure 21I:
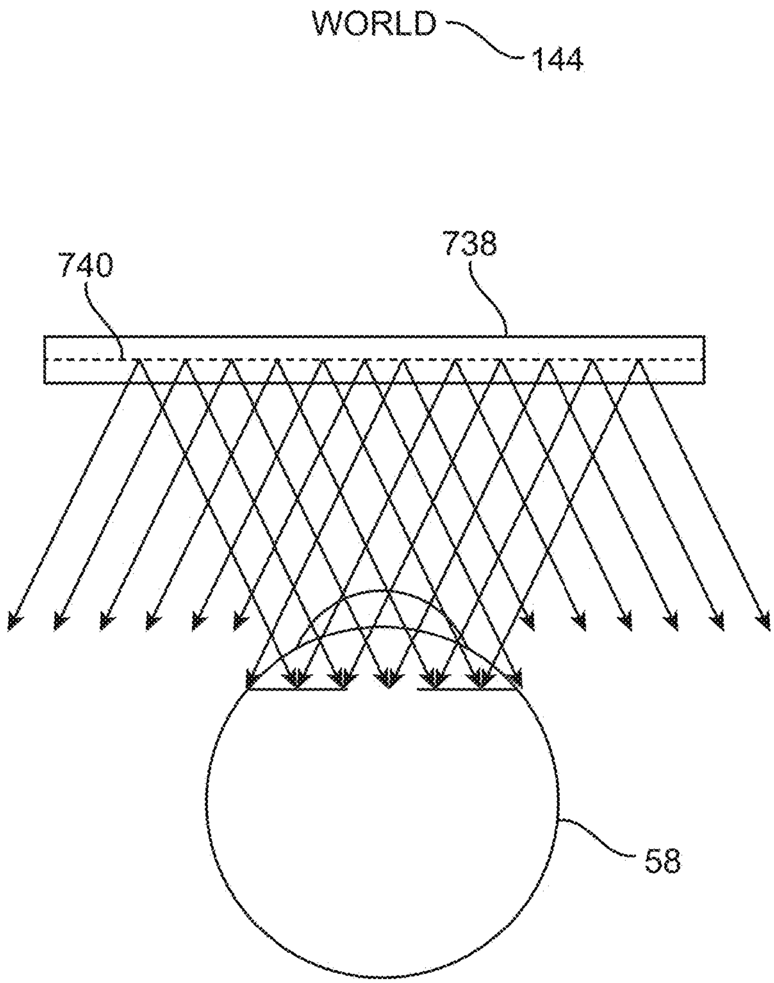
Figure 21J:
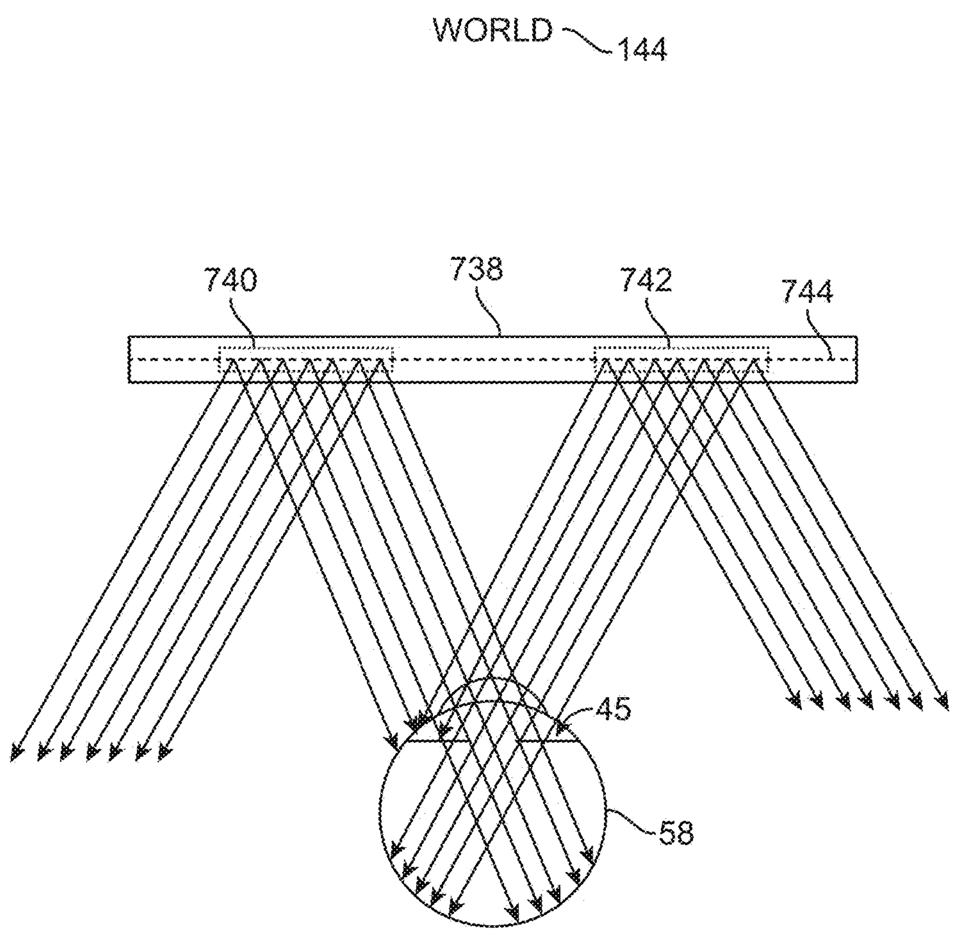

Referring to FIG. 21I, a waveguide 738 with embedded DOE 740 is viewed from the top down, with the user's eye positioned in front of the waveguide. A given pixel may be represented as a beam coming into the waveguide and totally internally reflecting along until it may be exited by a diffraction pattern to come out of the waveguide as a set of beams. Depending upon the diffraction configuration, the beams may come out parallel/collimated (as shown in FIG. 21I for convenience), or in a diverging fan configuration if representing a focal distance closer than optical infinity.

The depicted set of parallel exiting beams may represent, for example, the farthest left pixel of what the user is seeing in the real world as viewed through the waveguide, and light off to the rightmost extreme will be a different group of parallel exiting beams. Indeed, with modular control of the DOE subsections as described above, one may spend more computing resource or time creating and manipulating the small subset of beams that is likely to be actively addressing the user's pupil (e.g., because the other beams never reach the user's eye and are effectively wasted). Thus, referring to FIG. 21J, a waveguide 738 configuration is shown wherein only the two subsections (740, 742) of the DOE 744 are deemed to be likely to address the user's pupil 45 are activated. Preferably one subsection may be configured to direct light in one direction simultaneously as another subsection is directing light in a different direction.

Figure 21K:
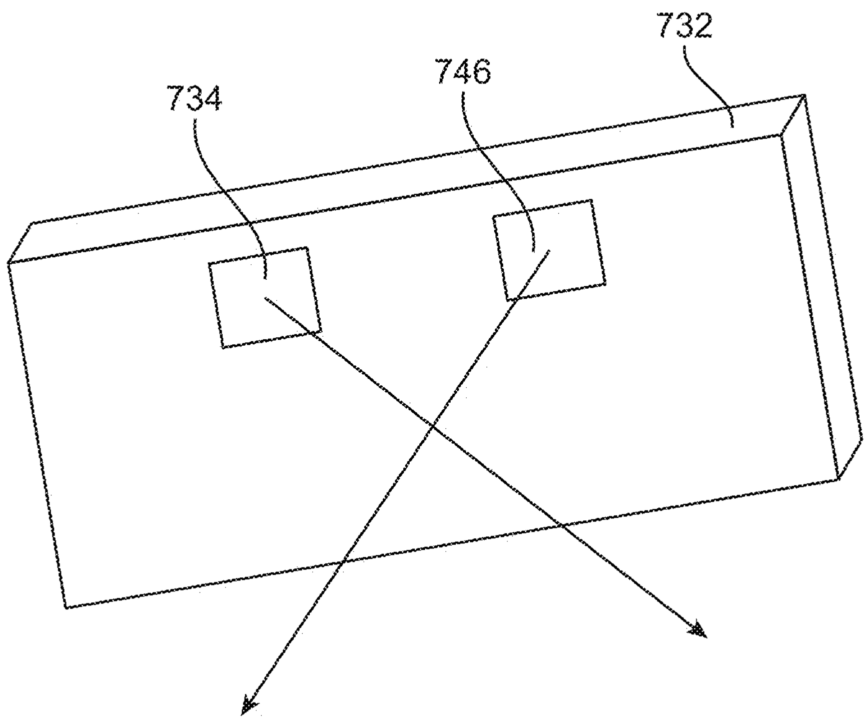
Figure 21L:
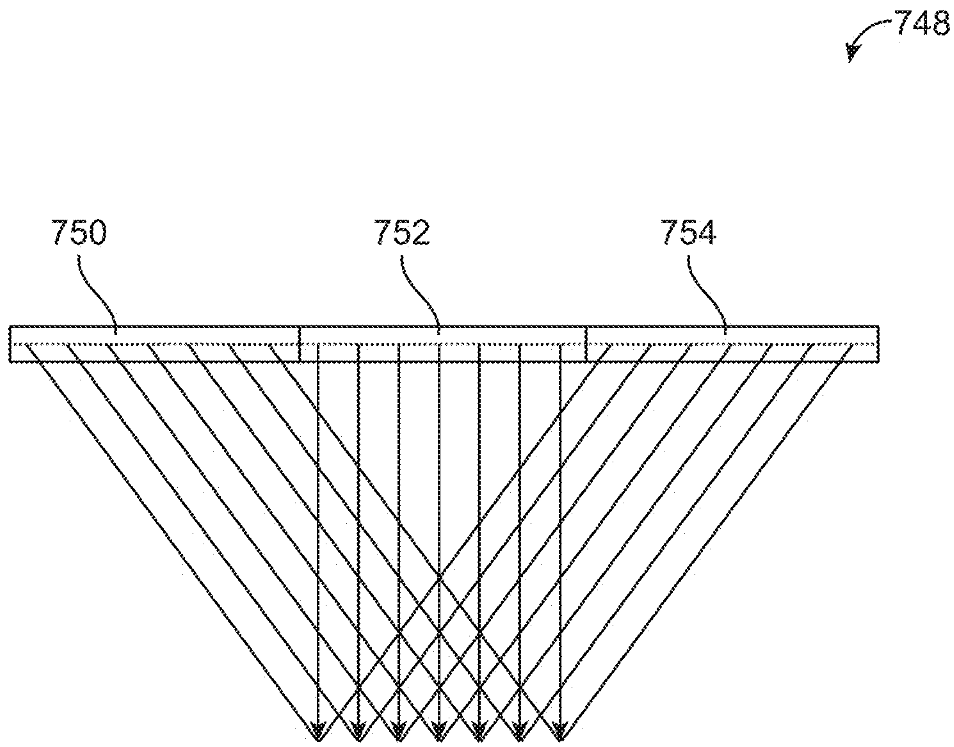

FIG. 21K shows an orthogonal view of two independently controlled subsections (734, 746) of a DOE 732. Referring to the top view of FIG. 21L, such independent control may be used for scanning or focusing light. In the configuration depicted in FIG. 21K, an assembly 748 of three independently controlled DOE/waveguide subsections (750, 752, 754) may be used to scan, increase the field of view, and/or increase the exit pupil region. Such functionality may arise from a single waveguide with such independently controllable DOE subsections, or a vertical stack of these for additional complexity.

In one embodiment, if a circular DOE may be controllably stretched radially-symmetrically, the diffraction pitch may be modulated, and the DOE may be utilized as a tunable lens with an analog type of control. In another embodiment, a single axis of stretch (for example, to adjust an angle of a linear DOE term) may be utilized for DOE control. Further, in another embodiment a membrane, akin to a drum head, may be vibrated, with oscillatory motion in the Z-axis (e.g., toward/away from the eye) providing Z-axis control and focus change over time.

Figure 21M:
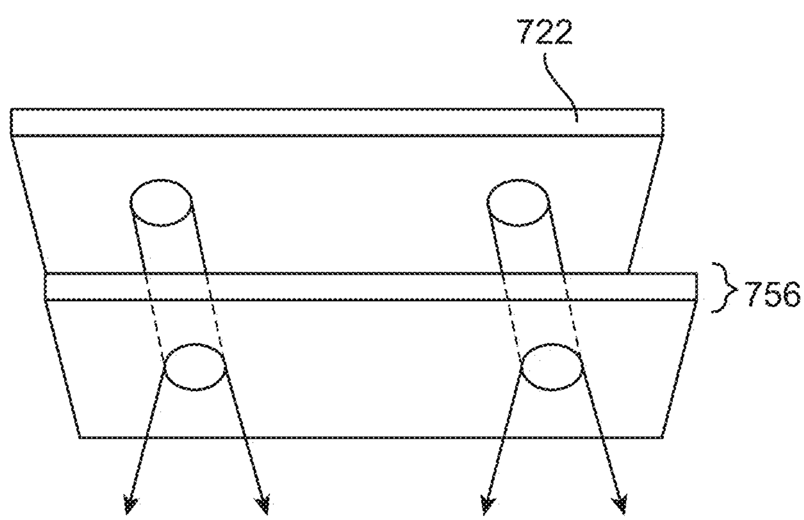

Referring to FIG. 21M, a stack of several DOEs 756 is shown receiving collimated light from a waveguide 722 and refocusing it based upon the additive powers of the activated DOEs. Linear and/or radial terms of DOEs may be modulated over time, such as on a frame sequential basis, to produce a variety of treatments (such as tiled display configurations or expanded field of view) for the light coming from the waveguide and exiting, preferably toward the user's eye. In configurations wherein the DOE or DOEs are embedded within the waveguide, a low diffraction efficiency is desired to maximize transparency for light passed from the real world. In configurations wherein the DOE or DOEs are not embedded, a high diffraction efficiency may be desired, as described above. In one embodiment, both linear and radial DOE terms may be combined outside of the waveguide, in which case high diffraction efficiency would be desired.

Figure 21N:
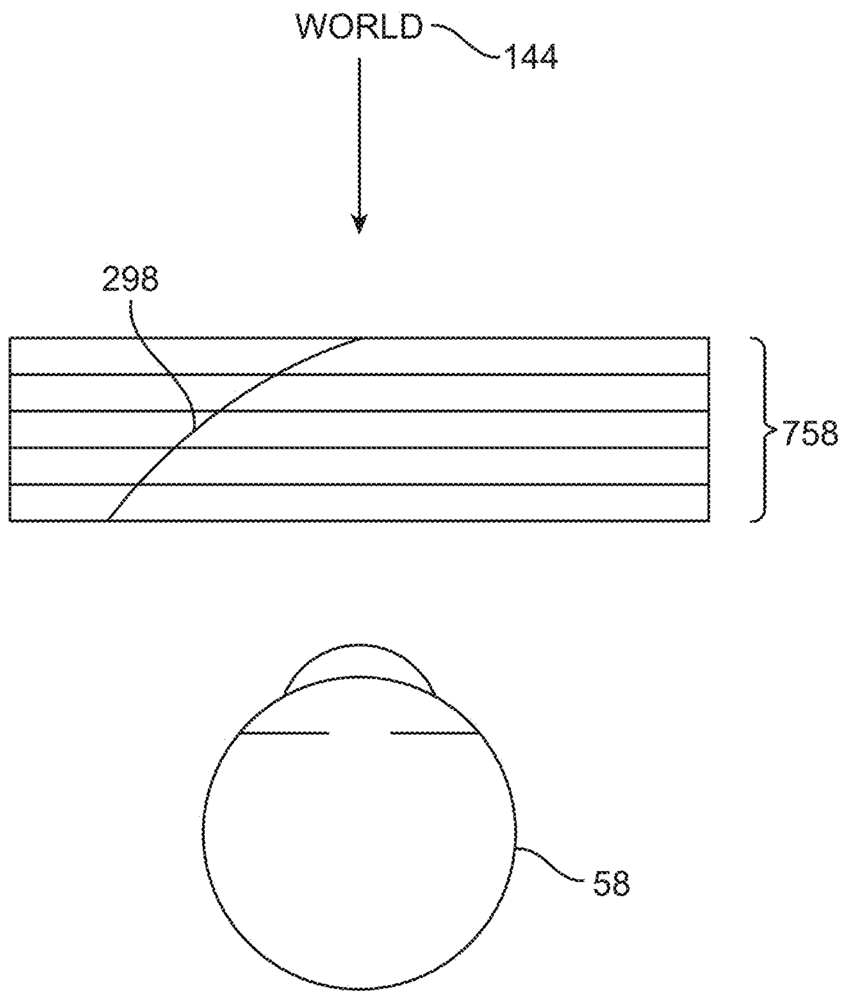

Referring to FIG. 21N, a segmented or parabolic reflector, such as those discussed above in FIG. 8Q, is shown. Rather than executing a segmented reflector by combining a plurality of smaller reflectors, in one embodiment the same functionality may result from a single waveguide with a DOE having different phase profiles for each section of it, such that it is controllable by subsection. In other words, while the entire segmented reflector functionality may be turned on or off together, generally the DOE may be configured to direct light toward the same region in space (e.g., the pupil of the user).

Figure 22A:
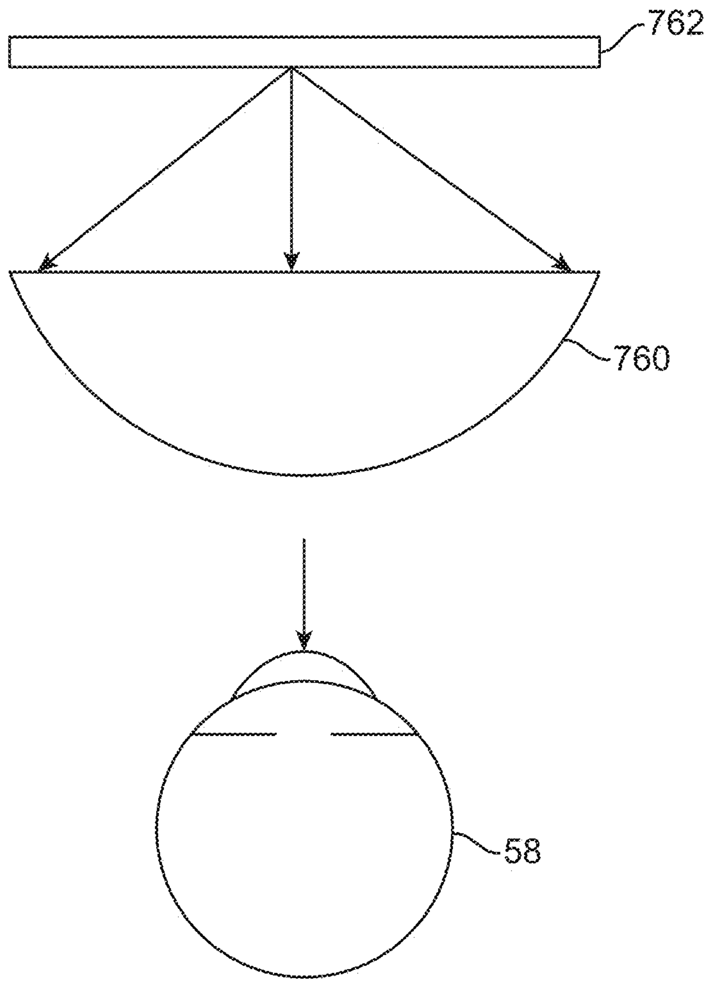
FIGS. 22A-22Y illustrate various configurations of freeform optics, according to the illustrated embodiments.

Referring to FIGS. 22A-22Z, optical configurations known as "freeform optics" may be utilized certain of the aforementioned challenges. The term "freeform" generally is used in reference to arbitrarily curved surfaces that may be utilized in situations wherein a spherical, parabolic, or cylindrical lens does not meet a design complexity such as a geometric constraint. For example, referring to FIG. 22A, one of the common challenges with display 762 configurations when a user is looking through a mirror (and also sometimes a lens 760) is that the field of view is limited by the area subtended by the final lens 760 of the system.

Figure 22B:
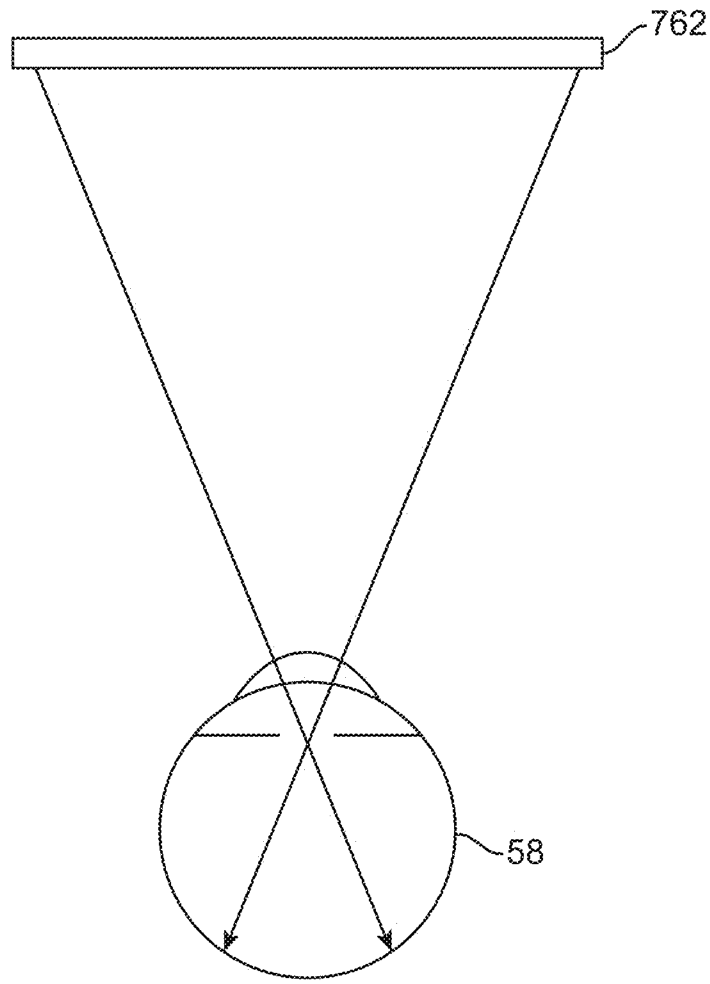
Figure 22C:
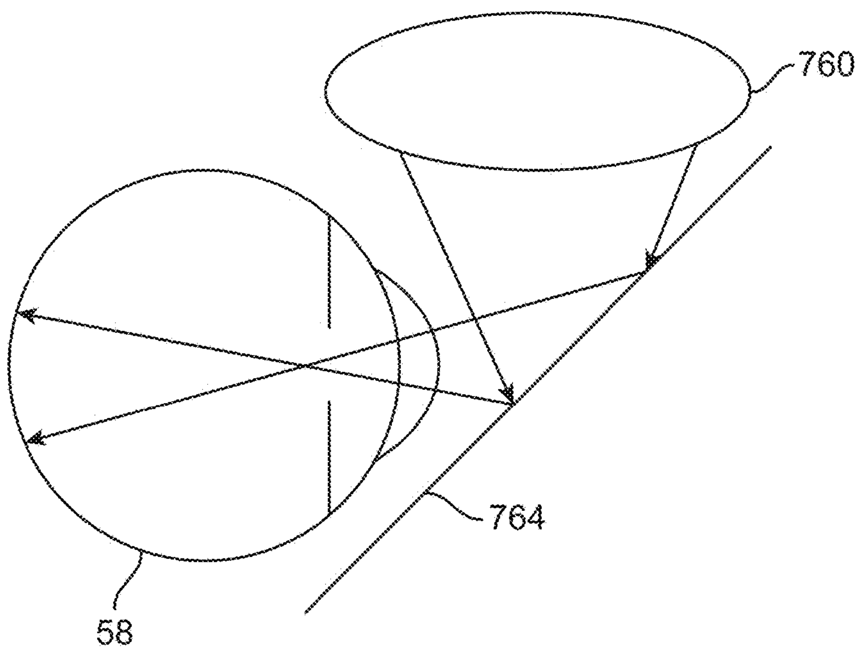

Referring to FIG. 22B, in more simple terms, if one has a display 762, which may include some lens elements, there is a straightforward geometric relationship such that the field of view cannot be larger than the angle subtended by the display (762). Referring to FIG. 22C, this challenge is exacerbated if the light from the real world is also be to passed through the optical system, because in such case, there often is a reflector 764 that leads to a lens 760. By interposing a reflector, the overall path length to get to the lens from the eye is increased, which tightens the angle and reduces the field of view.

Given this, if the field of view is to be increased, the size of the lens may also be increased. However, this may mean pushing a physical lens toward the forehead of the user from an ergonomic perspective. Further, the reflector may not catch all of the light from the larger lens. Thus, there is a practical limitation imposed by human head geometry, and it generally is a challenge to get more than a 40-degree field of view using conventional see-through displays and lenses.

Figure 22D:
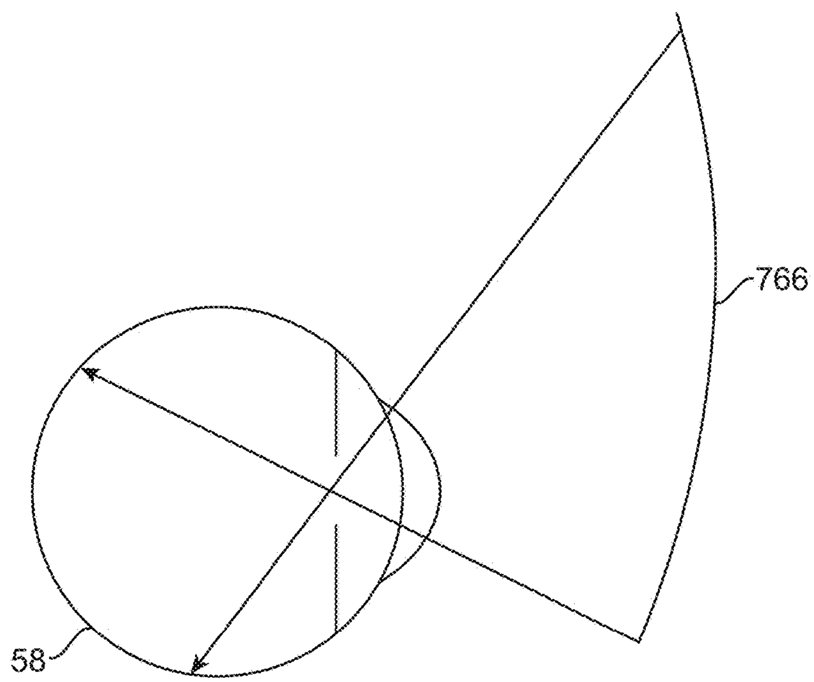

With freeform lenses, rather than having a standard planar reflector as described above, one has a combined reflector and lens with power (e.g., a curved reflector 766), which means that the curved lens geometry determines the field of view. Referring to FIG. 22D, without the circuitous path length of a conventional paradigm as described above in reference to FIG. 22C, it is possible for a freeform arrangement to realize a significantly larger field of view for a given set of optical requirements.

Figure 22E:
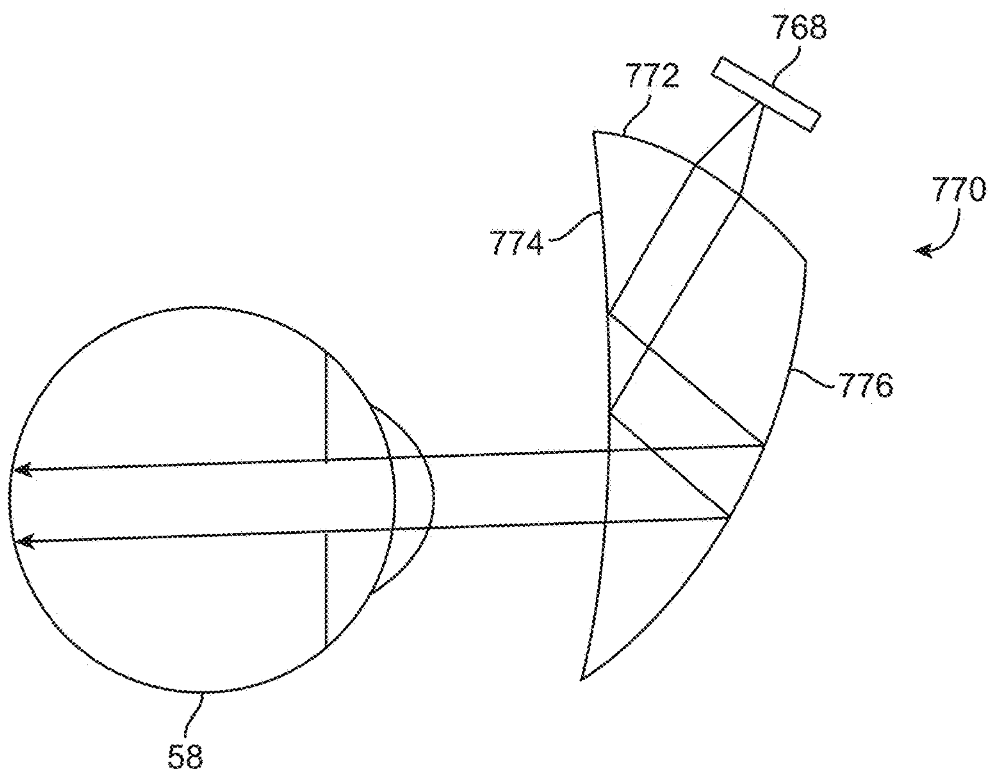

Referring to FIG. 22E, a typical freeform optic has three active surfaces. Referring to FIG. 22E, in one typical freeform optic 770 configuration, light may be directed toward the freeform optic from an image plane, such as a flat panel display 768, into the first active surface 772. This first active surface 772 may be a primarily transmissive freeform surface that refracts transmitted light and imparts a focal change (such as an added stigmatism, because the final bounce from the third surface may add a matching/opposite stigmatism and these are desirably canceled). The incoming light may be directed from the first surface to a second surface (774), wherein it may strike with an angle shallow enough to cause the light to be reflected under total internal reflection toward the third surface 776.

The third surface may comprise a half-silvered, arbitrarily-curved surface configured to bounce the light out through the second surface toward the eye, as shown in FIG. 22E. Thus in the depicted typical freeform configuration, the light enters through the first surface, bounces from the second surface, bounces from the third surface, and is directed out of the second surface. Due to the optimization of the second surface to have the requisite reflective properties on the first pass, as well as refractive properties on the second pass as the light is exited toward the eye, a variety of curved surfaces with higher-order shapes than a simple sphere or parabola are formed into the freeform optic.

Figure 22F:
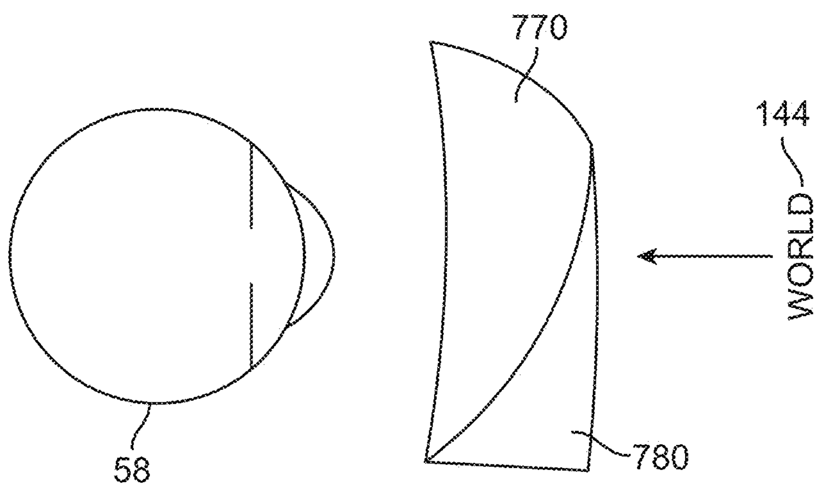

Referring to FIG. 22F, a compensating lens 780 may be added to the freeform optic 770 such that the total thickness of the optic assembly is substantially uniform in thickness, and preferably without magnification, to light incoming from the real world 144 in an augmented reality configuration.

Figure 22G:
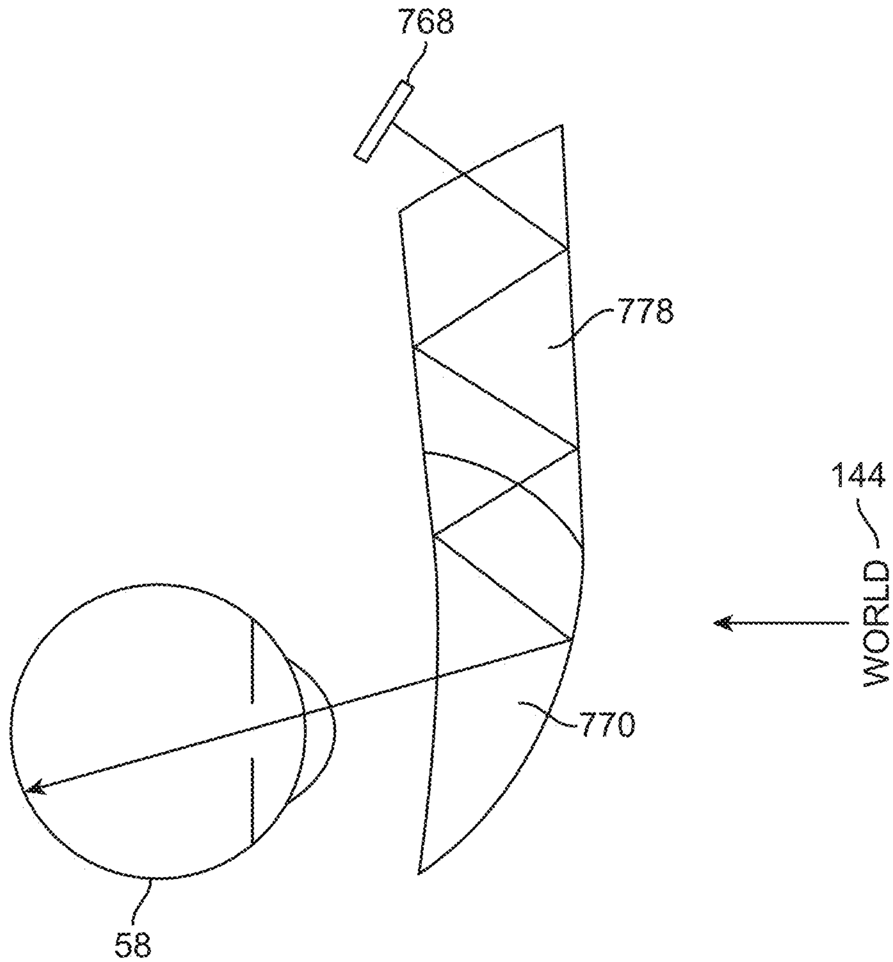

Referring to FIG. 22G, a freeform optic 770 may be combined with a waveguide 778 configured to facilitate total internal reflection of captured light within certain constraints. For example, as shown in FIG. 22G, light may be directed into the freeform/waveguide assembly from an image plane, such as a flat panel display, and totally internally reflected within the waveguide until it hits the curved freeform surface and escapes toward the eye of the user. Thus the light bounces several times in total internal reflection until it approaches the freeform wedge portion.

Figure 22H:
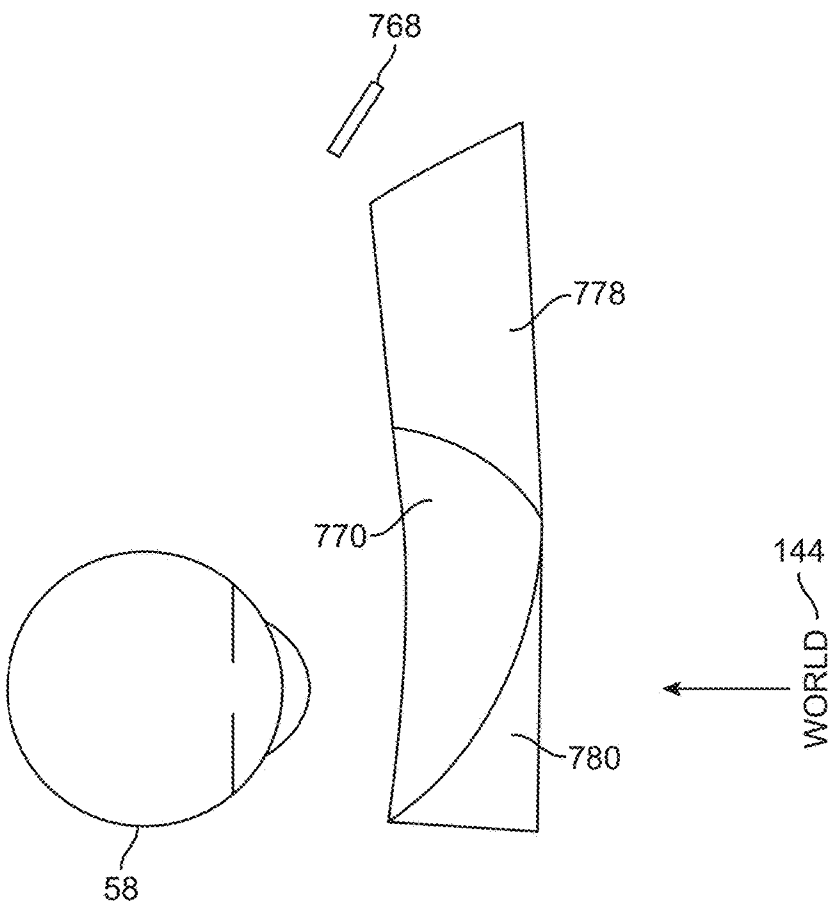

One of the main objectives with such an assembly is to lengthen the optic assembly while retaining as uniform a thickness as possible (to facilitate transport by total internal reflection, and also viewing of the world through the assembly without further compensation) for a larger field of view. FIG. 22H depicts a configuration similar to that of FIG. 22G, with the exception that the configuration of FIG. 22H also features a compensating lens portion to further extend the thickness uniformity and assist with viewing the world through the assembly without further compensation.

Figure 22I:
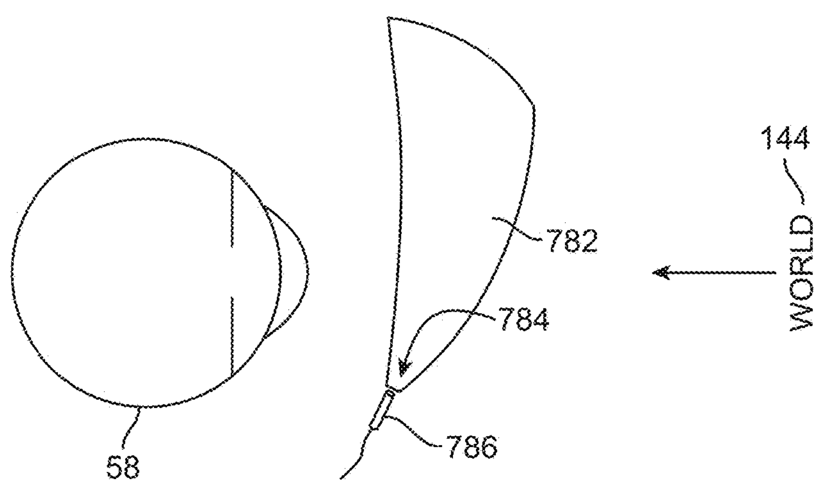

Referring to FIG. 22I, in another embodiment, a freeform optic 782 is shown with a small flat surface, or fourth face 784, at the lower left corner that is configured to facilitate injection of image information at a different location than is typically used with freeform optics. The input device 786 may comprise, for example, a scanning fiber display, which may be designed to have a very small output geometry. The fourth face may comprise various geometries itself and have its own refractive power, such as by use planar or freeform surface geometries.

Figure 22J:
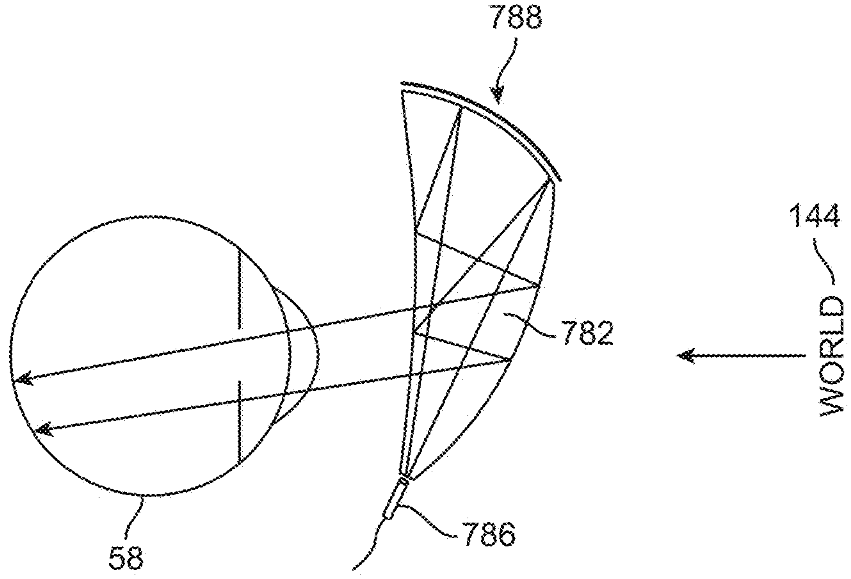

Referring to FIG. 22J, in practice, such a configuration may also feature a reflective coating 788 along the first surface such that it directs light back to the second surface, which then bounces the light to the third surface, which directs the light out across the second surface and to the eye 58. The addition of the fourth small surface for injection of the image information facilitates a more compact configuration. In an embodiment wherein a classical freeform input configuration and a scanning fiber display 790 are utilized, some lenses (792, 794) may be required in order to appropriately form an image plane 796 using the output from the scanning fiber display. These hardware components may add extra bulk that may not be desired.

Figure 22K:
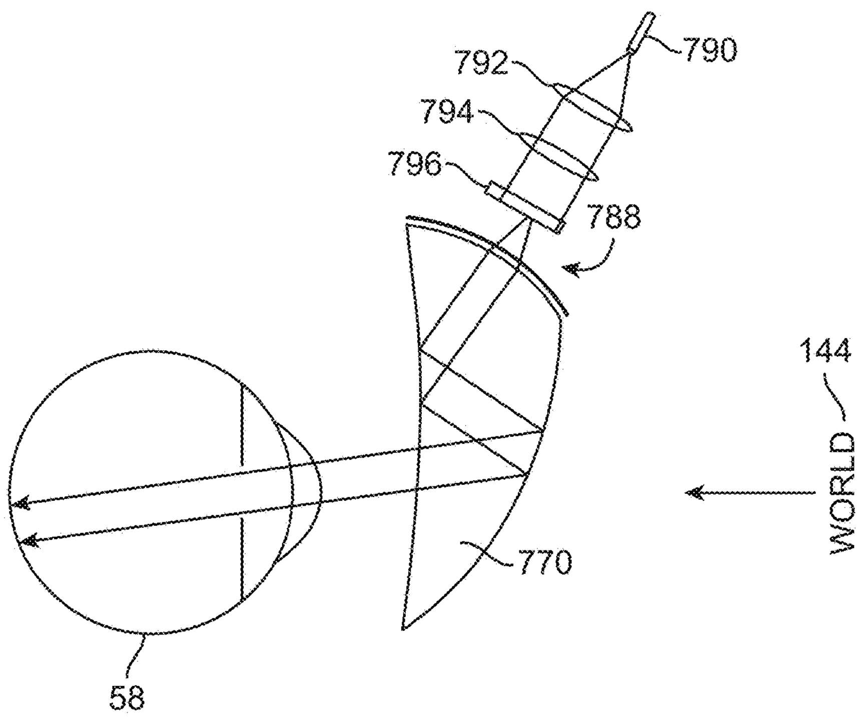

Referring to FIG. 22K, an embodiment is shown wherein light from a scanning fiber display 790 is passed through an input optics assembly (792, 794) to an image plane 796, and then directed across the first surface of the freeform optic 770 to a total internal reflection bounce off of the second surface, then another total internal reflection bounce from the third surface results in the light exiting across the second surface and being directed toward the eye 58.

An all-total-internal-reflection freeform waveguide may be created such that there are no reflective coatings (e.g., such that total-internal-reflection is being relied upon for propagation of light until a critical angle of incidence with a surface is met, at which point the light exits in a manner akin to the wedge-shaped optics described above). In other words, rather than having two planar surfaces, one may have a surface comprising one or more sub-surfaces from a set of conical curves, such as parabolas, spheres, ellipses, etc.).

Such a configuration angles that are shallow enough for total internal reflection within the optic. This approach may be considered to be a hybrid between a conventional freeform optic and a wedge-shaped waveguide. One motivation to have such a configuration is to avoid the use of reflective coatings, which may help product reflection, but also are known to prevent transmission of a relatively large portion (such as 50%) of the light transmitting through from the real world 144. Further, such coatings also may block an equivalent amount of the light coming into the freeform optic from the input device. Thus there are reasons to develop designs that do not have reflective coatings.

As described above, one of the surfaces of a conventional freeform optic may comprise a half-silvered reflective surface. Generally such a reflective surface will be of "neutral density", meaning that it will generally reflect all wavelengths similarly. In another embodiment, such as one wherein a scanning fiber display is utilized as an input, the conventional reflector paradigm may be replaced with a narrow band reflector that is wavelength sensitive, such as a thin film laserline reflector. Thus in one embodiment, a configuration may reflect particular red/green/blue wavelength ranges and remain passive to other wavelengths. This generally will increase transparency of the optic and therefore be preferred for augmented reality configurations wherein transmission of image information from the real world 144 across the optic also is valued.

Figure 22L:
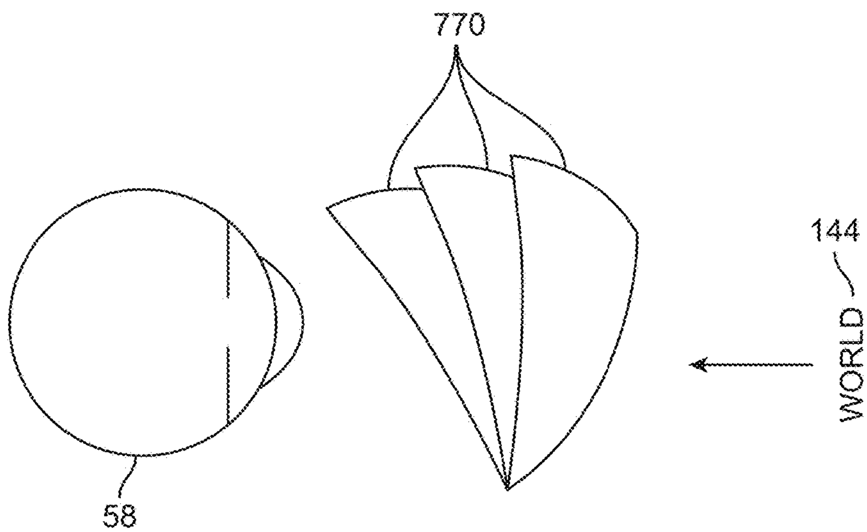

Referring to FIG. 22L, an embodiment is depicted wherein multiple freeform optics (770) may be stacked in the Z axis (e.g., along an axis substantially aligned with the optical axis of the eye). In one variation, each of the three depicted freeform optics may have a wavelength-selective coating (for example, one highly selective for blue, the next for green, the next for red) so that images may be injected into each to have blue reflected from one surface, green from another, and red from a third surface. Such a configuration may be utilized, for example, to address chromatic aberration issues, to create a lightfield, and/or to increase the functional exit pupil size.

Figure 22M:
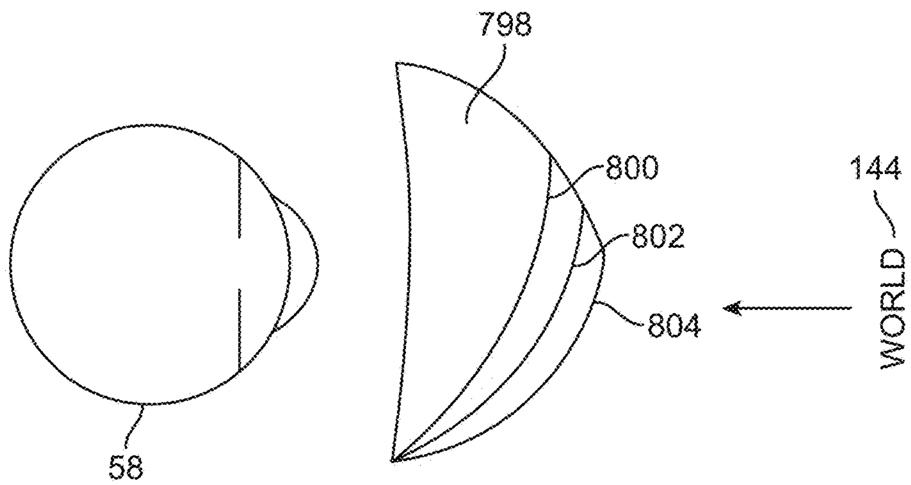

Referring to FIG. 22M, an embodiment is shown wherein a single freeform optic 798 has multiple reflective surfaces (800, 802, 804), each of which may be wavelength or polarization selective so that their reflective properties may be individually controlled.

Figure 22N:
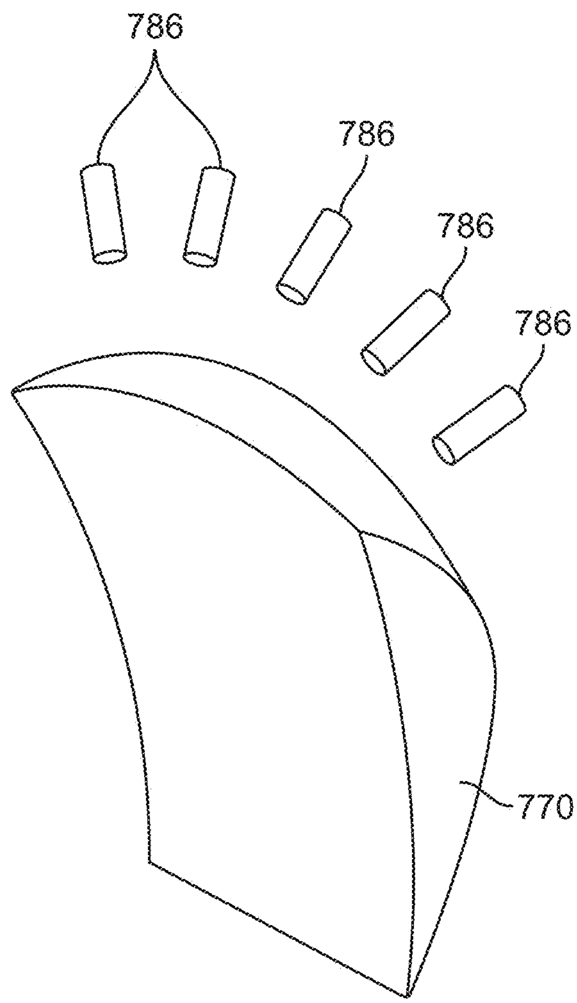

Referring to FIG. 22N, in one embodiment, multiple microdisplays, such as scanning light displays, 786 may be injected into a single freeform optic to tile images (thereby providing an increased field of view), increase the functional pupil size, or address challenges such as chromatic aberration (e.g., by reflecting one wavelength per display). Each of the depicted displays would inject light that would take a different path through the freeform optic due to the different positioning of the displays relative to the freeform optic, thereby providing a larger functional exit pupil output.

In one embodiment, a packet or bundle of scanning fiber displays may be utilized as an input to overcome one of the challenges in operatively coupling a scanning fiber display to a freeform optic. One such challenge with a scanning fiber display configuration is that the output of an individual fiber is emitted with a certain numerical aperture, or "NA". The NA is the projectional angle of light from the fiber; ultimately this angle determines the diameter of the beam that passes through various optics, and ultimately determines the exit functional exit pupil size.

Thus, in order to maximize exit pupil size with a freeform optic configuration, one may either increase the NA of the fiber using optimized refractive relationships, such as between core and cladding, or one may place a lens (e.g., a refractive lens, such as a gradient refractive index lens, or "GRIN" lens) at the end of the fiber or build one into the end of the fiber as described above. Another approach may be to create an array of fibers that is feeding into the freeform optic, in which case all of the NAs in the bundle remain small, thereby producing an array of small exit pupils at the exit pupil that in the aggregate forms the functional equivalent of a large exit pupil.

Figure 22O:
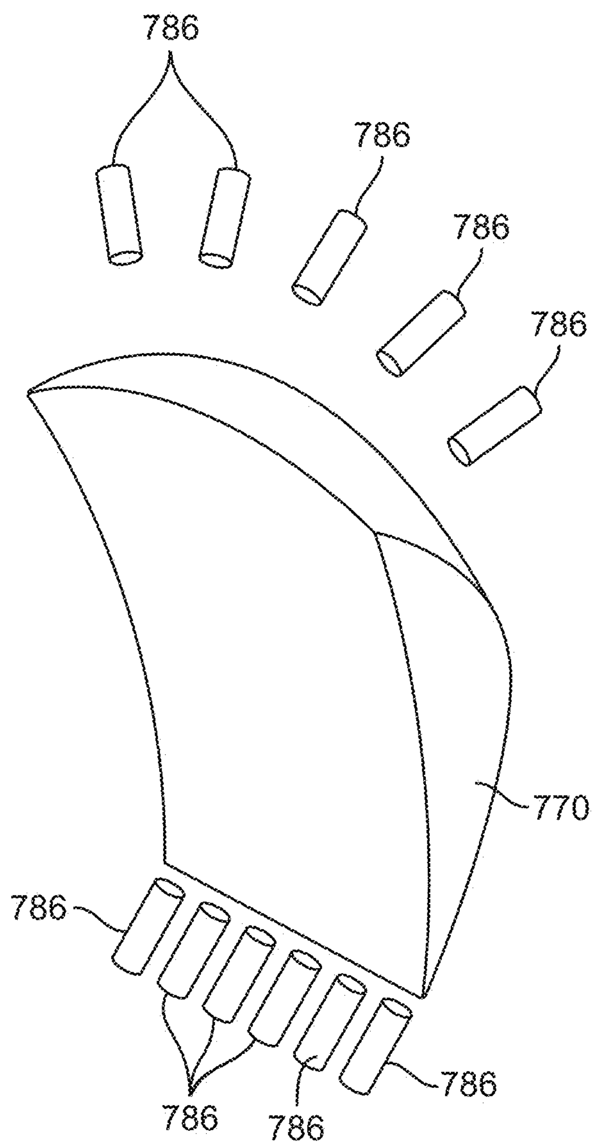
Figure 22P:
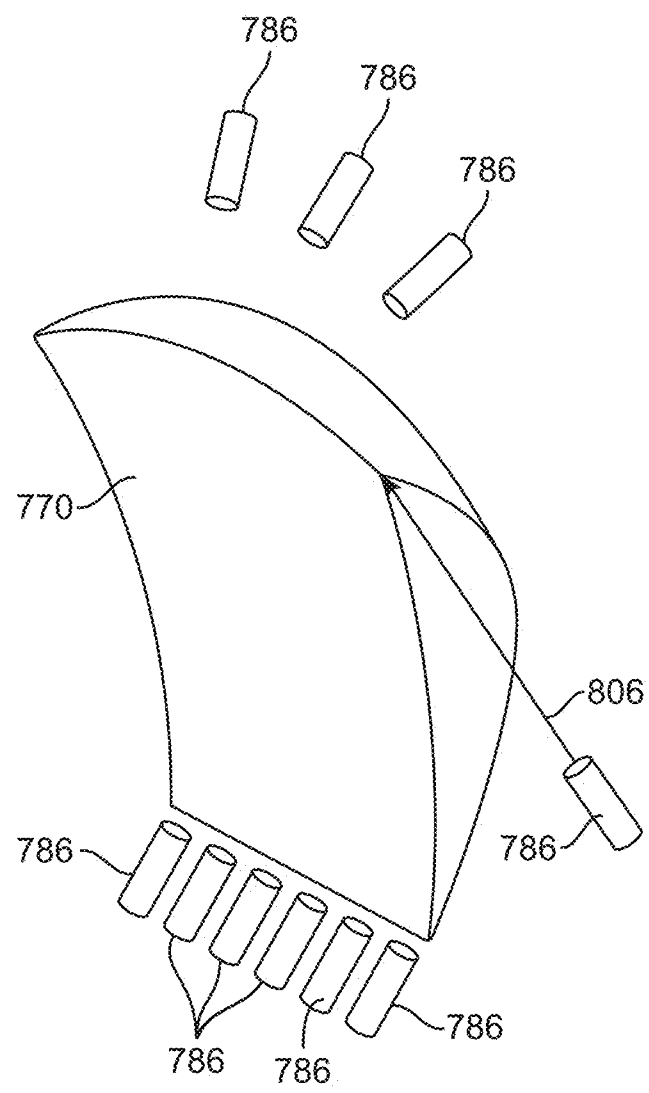

Alternatively, in another embodiment a more sparse array (e.g., not bundled tightly as a packet) of scanning fiber displays or other displays may be utilized to functionally increase the field of view of the virtual image through the freeform optic. Referring to FIG. 22O, in another embodiment, a plurality of displays or displays 786 may be injected through the top of a freeform optic 770, as well as another plurality 786 through the lower corner. The display arrays may be two or three dimensional arrays. Referring to FIG. 22P, in another related embodiment, image information also may be injected in from the side 806 of the freeform optic 770 as well.

In an embodiment wherein a plurality of smaller exit pupils is to be aggregated into a functionally larger exit pupil, one may elect to have each of the scanning fibers monochromatic, such that within a given bundle or plurality of projectors or displays, one may have a subgroup of solely red fibers, a subgroup of solely blue fibers, and a subgroup of solely green fibers. Such a configuration facilitates more efficiency in output coupling for bringing light into the optical fibers. For instance, this approach would not necessitate a superimposing of red, green, and blue into the same band.

Figure 22Q:
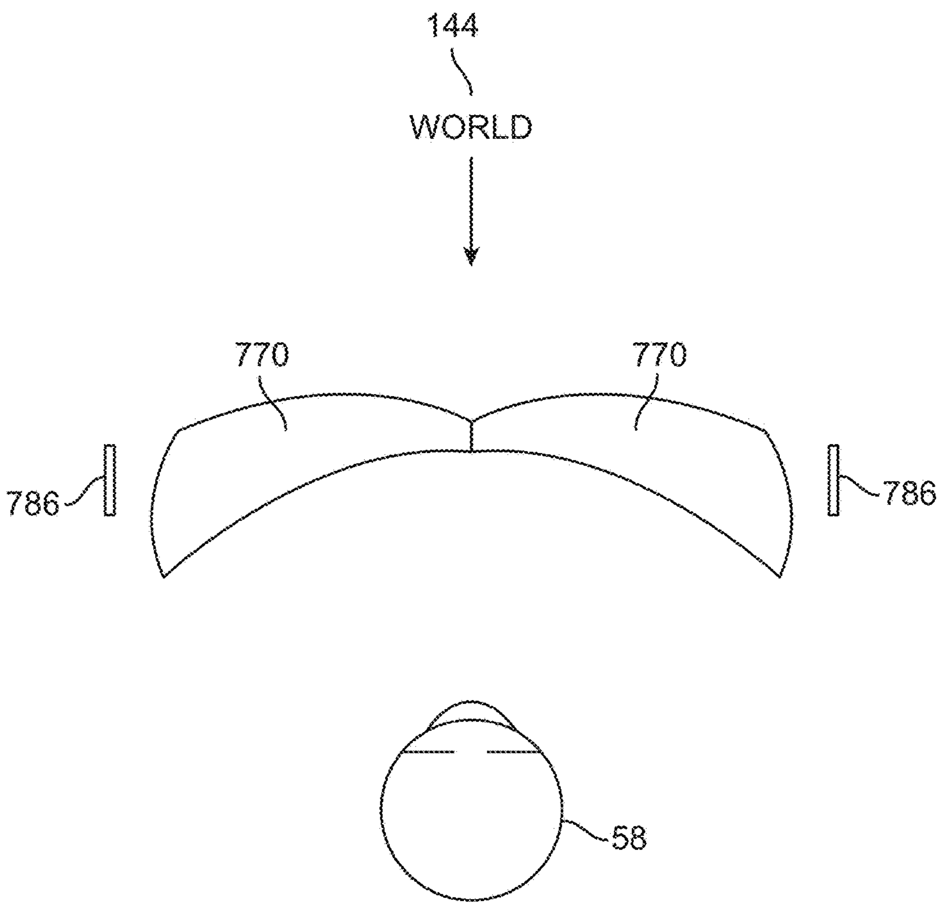

Referring to FIGS. 22Q-22V, various freeform optic tiling configurations are depicted. Referring to FIG. 22Q, an embodiment is depicted wherein two freeform optics are tiled side-by-side and a microdisplay, such as a scanning light display, 786 on each side is configured to inject image information from each side, such that one freeform optic wedge represents each half of the field of view.

Figure 22R:
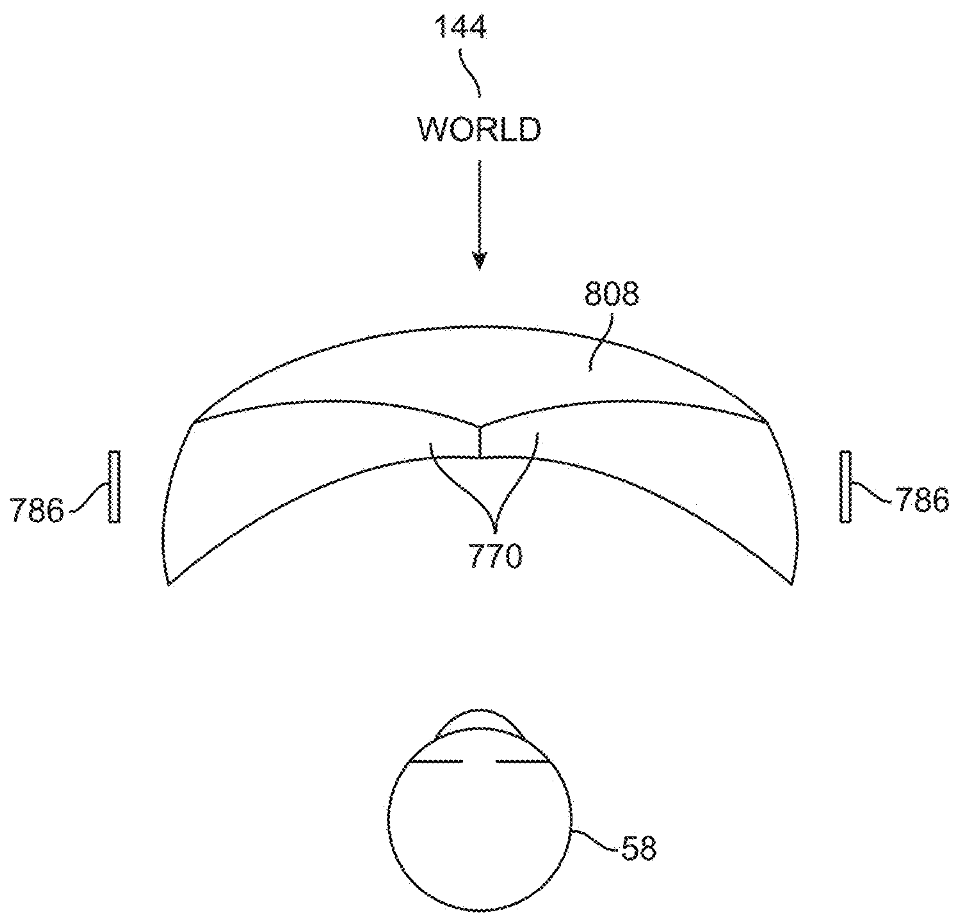
Figure 22S:
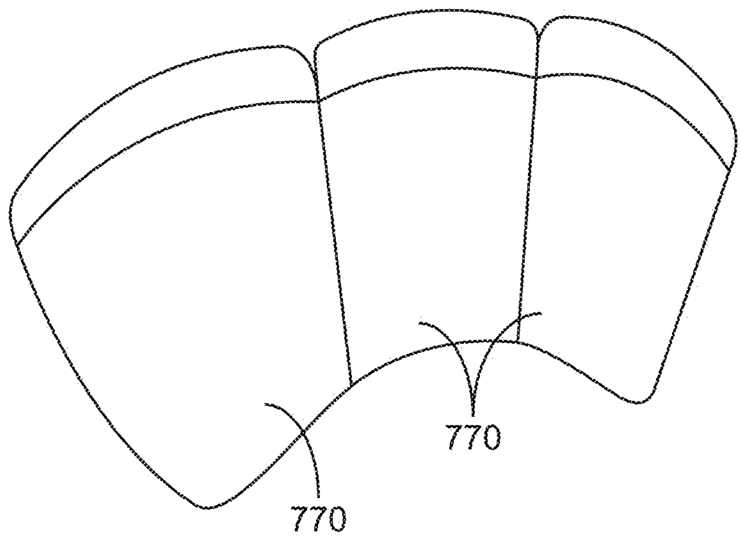

Referring to FIG. 22R, a compensator lens 808 may be included to facilitate views of the real world through the optics assembly. FIG. 22S illustrates a configuration wherein freeform optics wedges are tiled side by side to increase the functional field of view while keeping the thickness of such optical assembly relatively uniform.

Figure 22T:
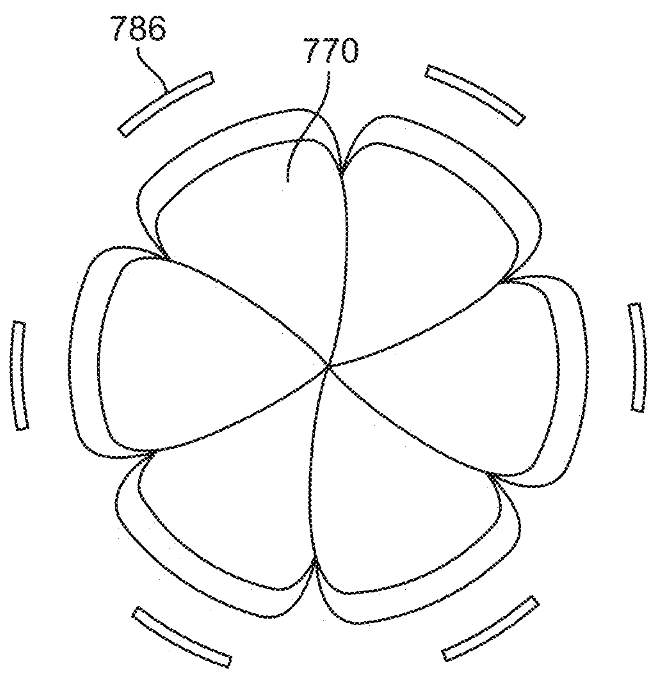

Referring to FIG. 22T, a star-shaped assembly comprises a plurality of freeform optics wedges (also shown with a plurality of displays for inputting image information) in a configuration that may provide a larger field of view expansion while also maintaining a relatively thin overall optics assembly thickness.

With a tiled freeform optics assembly, the optics elements may be aggregated to produce a larger field of view. The tiling configurations described above have addressed this notion. For example, in a configuration wherein two freeform waveguides are aimed at the eye such as that depicted in FIG. 22R, there are several ways to increase the field of view. One option is to "toe in" the freeform waveguides such that their outputs share, or are superimposed in, the space of the pupil. For example, the user may see the left half of the visual field through the left freeform waveguide, and the right half of the visual field through the right freeform waveguide.

With such a configuration, the field of view has been increased with the tiled freeform waveguides, but the exit pupil has not grown in size. Alternatively, the freeform waveguides may be oriented such that they do not toe in as much, such that they exit pupils that are side-by-side at the eye's anatomical pupil are created. In one example, the anatomical pupil may be 8 mm wide, and each of the side-by-side exit pupils may be 8 mm, such that the functional exit pupil is expanded by about two times. Thus such a configuration provides an enlarged exit pupil. However, if the eye is moved around in the "eyebox" defined by that exit pupil, that eye may lose parts of the visual field (e.g., lose either a portion of the left or right incoming light because of the side-by-side nature of such configuration).

In one embodiment using such an approach for tiling freeform optics, especially in the Z-axis relative to the eye of the user, red wavelengths may be driven through one freeform optic, green through another, and blue through another, such red/green/blue chromatic aberration may be addressed. Multiple freeform optical elements may be provided to such a configuration that are stacked up, each of which is configured to address a particular wavelength.

Figure 22U:
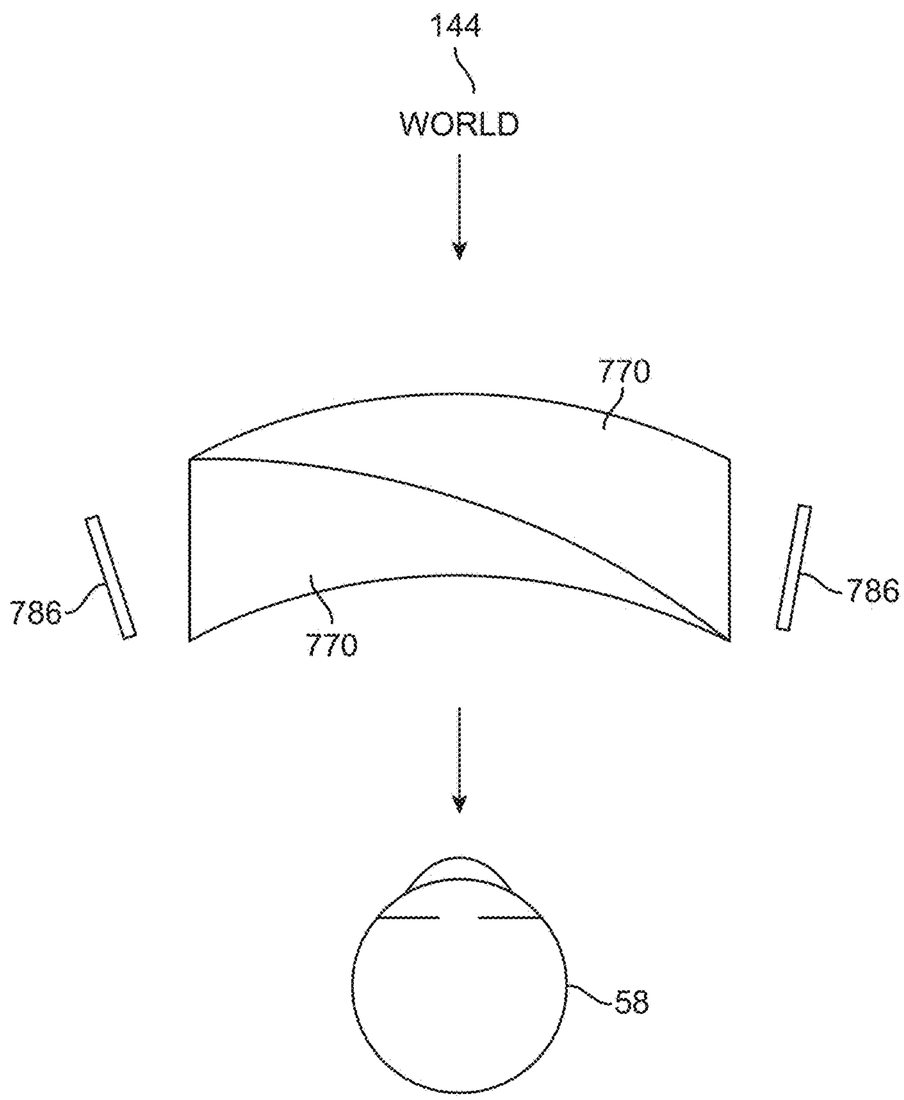
Figure 22V:
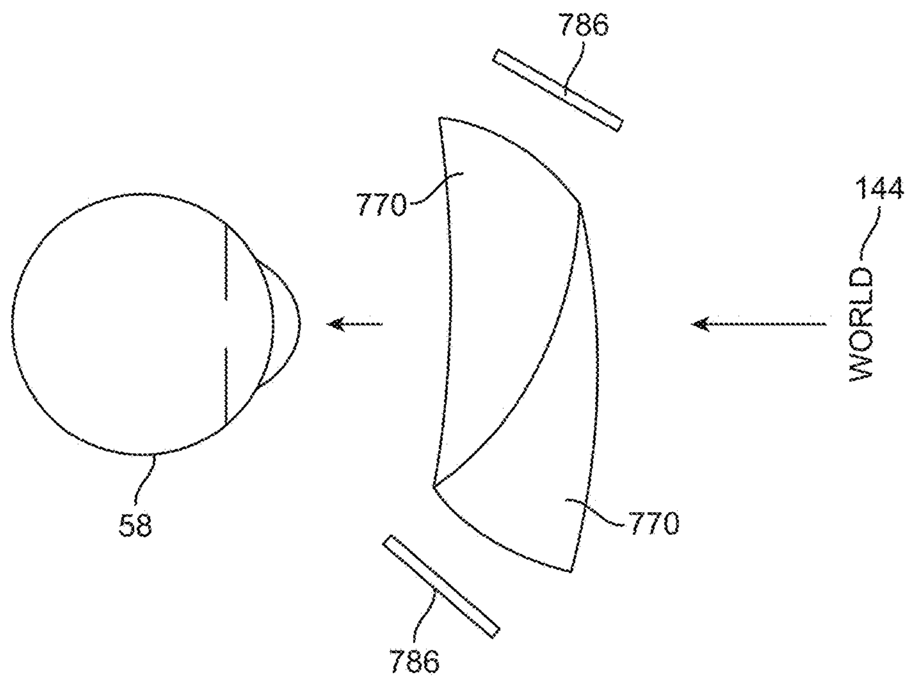

Referring to FIG. 22U, two oppositely-oriented freeform optics are shown stacked in the Z-axis (e.g., they are upside down relative to each other). With such a configuration, a compensating lens may not be required to facilitate accurate views of the world through the assembly. In other words, rather than having a compensating lens such as in the embodiment of FIG. 22F or FIG. 22R, an additional freeform optic may be utilized, which may further assist in routing light to the eye. FIG. 22V shows another similar configuration wherein the assembly of two freeform optical elements is presented as a vertical stack.

To ensure that one surface is not interfering with another surface in the freeform optics, one may use wavelength or polarization selective reflector surfaces. For example, referring to FIG. 22V, red, green, and blue wavelengths in the form of 650 nm, 530 nm, and 450 nm may be injected, as well as red, green, and blue wavelengths in the form of 620 nm, 550 nm, and 470 nm. Different selective reflectors may be utilized in each of the freeform optics such that they do not interfere with each other. In a configuration wherein polarization filtering is used for a similar purpose, the reflection/transmission selectivity for light that is polarized in a particular axis may be varied (e.g., the images may be pre-polarized before they are sent to each freeform waveguide, to work with reflector selectivity).

Figure 22W:
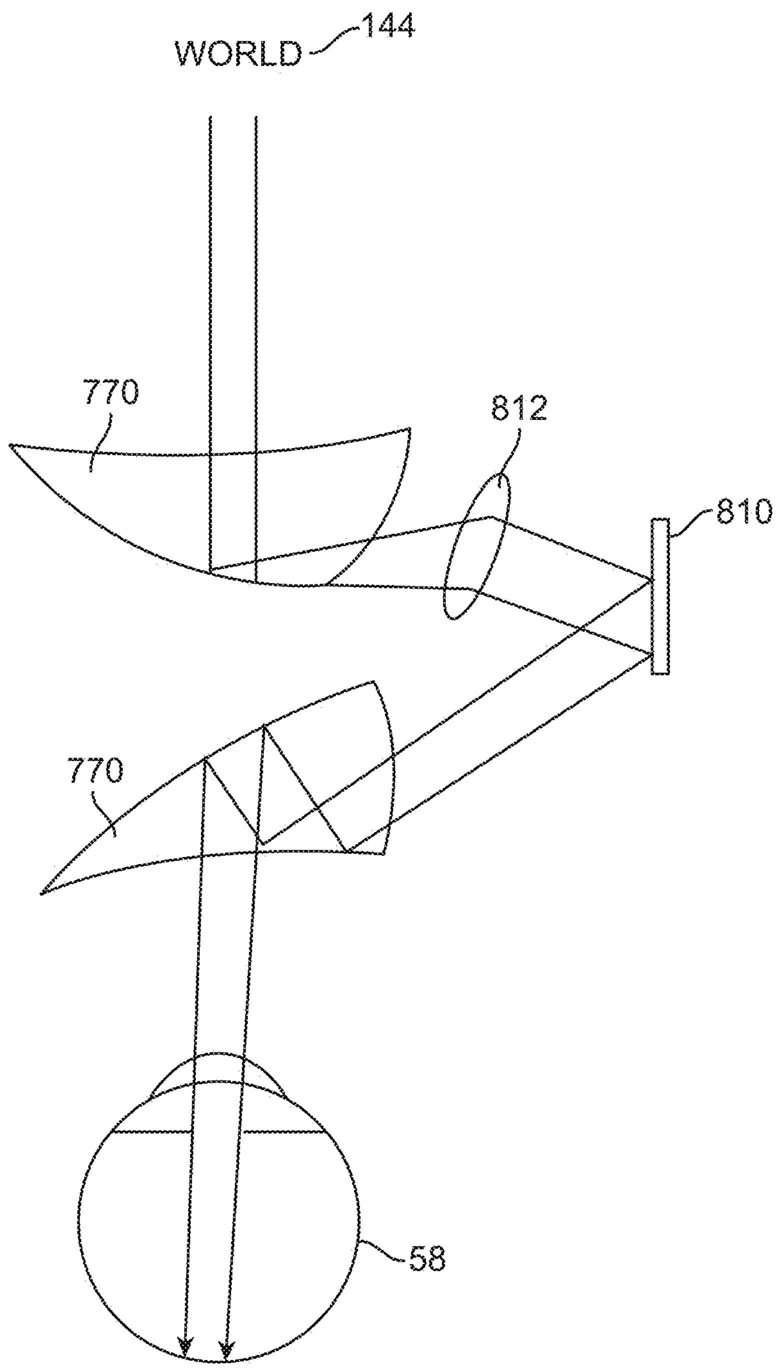
Figure 22X:
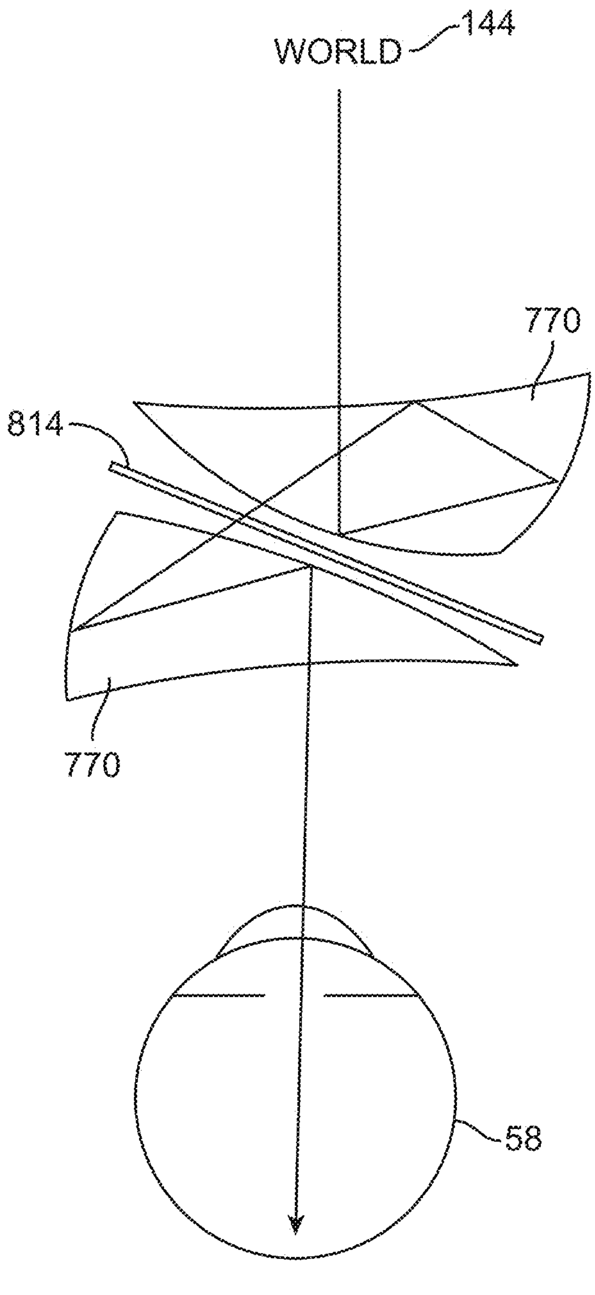

Referring to FIGS. 22W and 22X, configurations are illustrated wherein a plurality of freeform waveguides may be utilized together in series. Referring to FIG. 22W, light may enter from the real world and be directed sequentially through a first freeform optic 770, through an optional lens 812 which may be configured to relay light to a reflector 810 such as a DMD from a DLP system, which may be configured to reflect the light that has been filtered on a pixel by pixel basis (e.g., an occlusion mask may be utilized to block out certain elements of the real world, such as for darkfield perception, as described above; suitable spatial light modulators may be used which comprise DMDs, LCDs, ferroelectric LCOSs, MEMS shutter arrays, and the like, as described above) to another freeform optic 770 that is relaying light to the eye 28 of the user. Such a configuration may be more compact than one using conventional lenses for spatial light modulation.

Referring to FIG. 22X, in a scenario in which it is very important to keep overall thickness minimized, a configuration may be utilized that has one surface that is highly-reflective such that the highly-reflective surface may bounce light straight into another compactly positioned freeform optic. In one embodiment a selective attenuator 814 may be interposed between the two freeform optical elements 770.

Figure 22Y:
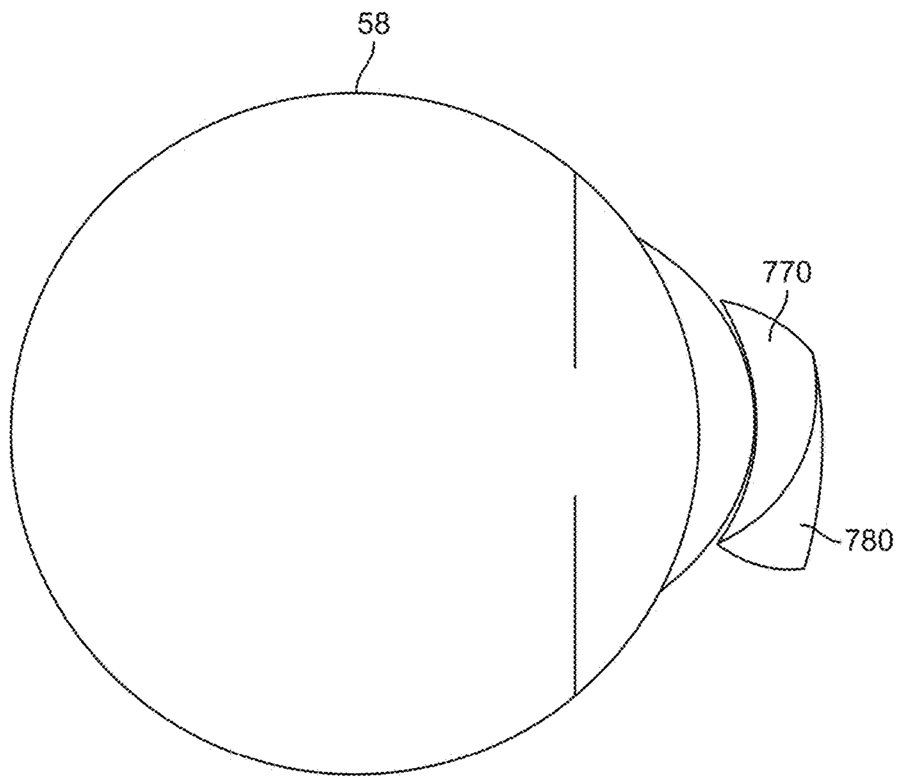

Referring to FIG. 22Y, an embodiment is depicted wherein a freeform optic 770 may comprise one aspect of a contact lens system. A miniaturized freeform optic is shown engaged against the cornea of a user's eye 58 with a miniaturized compensator lens portion 780, akin to that described in reference to FIG. 22F. Signals may be injected into the miniaturized freeform assembly using a tethered scanning fiber display which may, for example, be coupled between the freeform optic and a tear duct area of the user, or between the freeform optic and another head-mounted display configuration.

Interaction Between One or More Users and the AR System

User System Interaction with the Cloud

Figure 23:
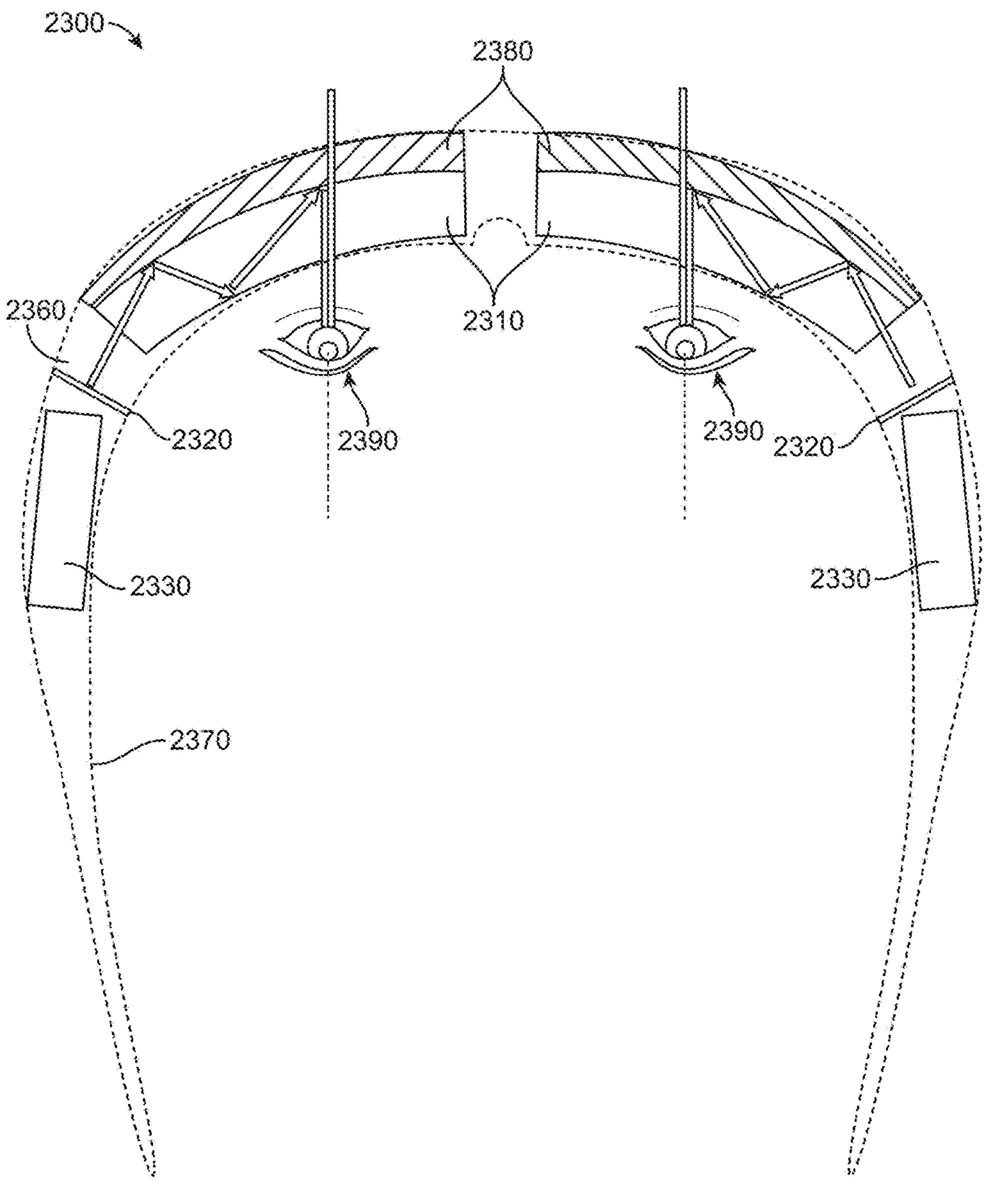
FIG. 23 illustrates a top view of components of a simplified individual AR device.
Figure 24:
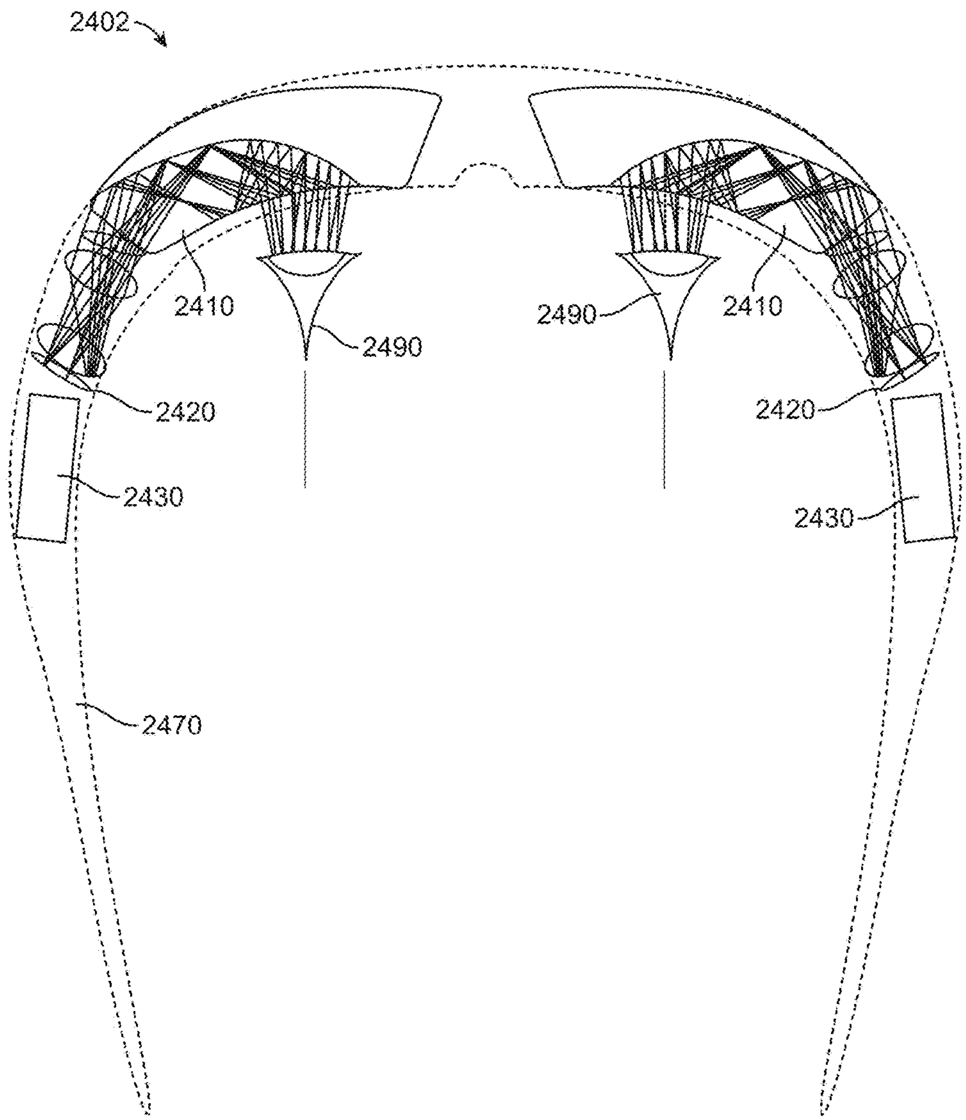
FIG. 24 illustrates an example embodiment of the optics of the individual AR system.

Having described various optical embodiments above, the following discussion will focus on an interaction between one or more AR systems and an interaction between the AR system and the physical world. As illustrated in FIGS. 23 and 24, the light field generation subsystem (e.g. 2300 and 2302 respectively) is preferably operable to produce a light field. For example, an optical apparatus 2360 or subsystem may generate or project light to simulate a four dimensional (4D) light field that would be produced by light reflecting from a real three-dimensional object or scene. For instance, an optical apparatus such as a wave guide reflector array projector (WRAP) apparatus 2310 or multiple depth plane three dimensional (3D) display system may generate or project multiple virtual depth planes at respective radial focal distances to simulate a 4D light field.

The optical apparatus 2360 in the form of a WRAP apparatus 2310 or multiple depth plane 3D display system may, for instance, project images into each eye of a user, either directly or indirectly. When the number and radial placement of the virtual depth planes is comparable to the depth resolution of the human vision system as a function of radial distance, a discrete set of projected depth planes mimics the psycho-physical effect that is produced by a real, continuous, three dimensional object or scene. In one or more embodiments, the system 2300 may comprise a frame 2370 that may be customized for each AR user. Additional components of the system 2300 may include electronics 2330 (as will be discussed in further detail below) to connect various electrical and electronic subparts of the AR system to each other.

The system 2300 may further comprise a microdisplay 2320 that projects light associated with one or more virtual images into the waveguide prism 2310. As shown in FIG. 23, the light produced from the microdisplay 2320 travels within the waveguide 2310, and some of light reaches the user's eyes 2390. In one or more embodiments, the system 2300 may further comprise one or more compensation lenses 2380 to alter the light associated with the virtual images. FIG. 24 illustrates the same components as FIG. 23, but illustrates how light from the microdisplays 2320 travels through the waveguides 2310 to reach the user's eyes 2390.

It should be appreciated that the optical apparatus 2360 may include a number of linear waveguides, each with a respective series of deconstructed curved spherical reflectors or mirrors embedded, located or formed within each of the linear wave guides. The series of deconstructed curved spherical reflectors or mirrors are designed to refocus infinity-focused light at specific radial distances. A convex spherical mirror can be used to produce an output spherical wave to represent a virtual point source which appears to be located at a defined distance behind the convex spherical mirror.

By concatenating in a linear or rectangular wave guide a series of micro-reflectors whose shapes (e.g., radii of curvature about two axes) and orientation together, it is possible to project a 3D image that corresponds to a spherical wave front produced by a virtual point source at a particular x, y, z coordinates. Each of the 2D wave guides or layers provides an independent optical path relative to the other wave guides, and shapes the wave front and focuses incoming light to project a virtual depth plane that corresponds to a respective radial distance.

With a sufficient number of 2D wave guides, a user viewing the projected virtual depth planes experiences a 3D effect. Such a device is described in U.S. patent application Ser. No. 13/915,530 filed on Jun. 11, 2013, which is herein incorporated by reference in its entirety for all purposes. Other embodiments may comprise other combinations of optical systems, and it should be appreciated that the embodiment(s) described in relation to FIGS. 23 and 24 are for illustrative purposes only.

The audio subsystem of the AR system may take a variety of forms. For instance, the audio subsystem may take the form of a simple two speaker 2 channel stereo system, or a more complex multiple speaker system (5.1, 7.1, 12.1 channels). In some implementations, the audio subsystem may be operable to produce a three-dimensional sound field.

The AR system may include one or more distinct components. For example, the AR system may include a head worn or mounted component, such as the one shown in the illustrated embodiment of FIGS. 23 and 24. The head worn or mounted component typically includes the visual system (e.g., such as the ones shown in FIGS. 23 and 24). The head worn component may also include audio transducers (e.g., speakers, microphones).

The audio transducers may integrate with the visual, for example each audio transducers supported from a common frame with the visual components. Alternatively, the audio transducers may be distinct from the frame that carries the visual components. For example, the audio transducers may be part of a belt pack, such as the ones shown in FIGS. 4D

As illustrated in FIGS. 23 and 24, the AR system may include a distinct computation component (e.g., the processing sub-system), separate from the head worn component (e.g., the optical sub-system as shown in FIGS. 23 and 24). The processing sub-system or computation component may, for example, take the form of the belt pack, which can be convenience coupled to a belt or belt line of pants during use. Alternatively, the computation component may, for example, take the form of a personal digital assistant or smartphone type device.

The computation component may include one or more processors, for example, one or more micro-controllers, microprocessors, graphical processing units, digital signal processors, application specific integrated circuits (ASICs), programmable gate arrays, programmable logic circuits, or other circuits either embodying logic or capable of executing logic embodied in instructions encoded in software or firmware. The computation component may include one or more nontransitory computer or processor-readable media, for example volatile and/or nonvolatile memory, for instance read only memory (ROM), random access memory (RAM), static RAM, dynamic RAM, Flash memory, EEPROM, etc.

As discussed above, the computation component may be communicatively coupled to the head worn component. For example, computation component may be communicatively tethered to the head worn component via one or more wires or optical fibers via a cable with appropriate connectors. The computation component and the head worn component may communicate according to any of a variety of tethered protocols, for example UBS®, USB2®, USB3®, Ethernet®, Thunderbolt®, Lightning® protocols.

Alternatively or additionally, the computation component may be wirelessly communicatively coupled to the head worn component. For example, the computation component and the head worn component may each include a transmitter, receiver or transceiver (collectively radio) and associated antenna to establish wireless communications there between. The radio and antenna(s) may take a variety of forms. For example, the radio may be capable of short range communications, and may employ a communications protocol such as BLUETOOTH®, WI-FI®, or some IEEE 802.11 compliant protocol (e.g., IEEE 802.11n, IEEE 802.11a/c).

As illustrated in FIGS. 23 and 24, the body or head worn components may include electronics and microdisplays, operable to deliver augmented reality content to the user, for example augmented reality visual and/or audio content. The electronics (e.g., part of 2320 in FIGS. 23 and 24) may include various circuits including electrical or electronic components. The various circuits are communicatively coupled to a number of transducers that either deliver augmented reality content, and/or which sense, measure or collect information about the ambient physical environment and/or about a user.

Figure 25:
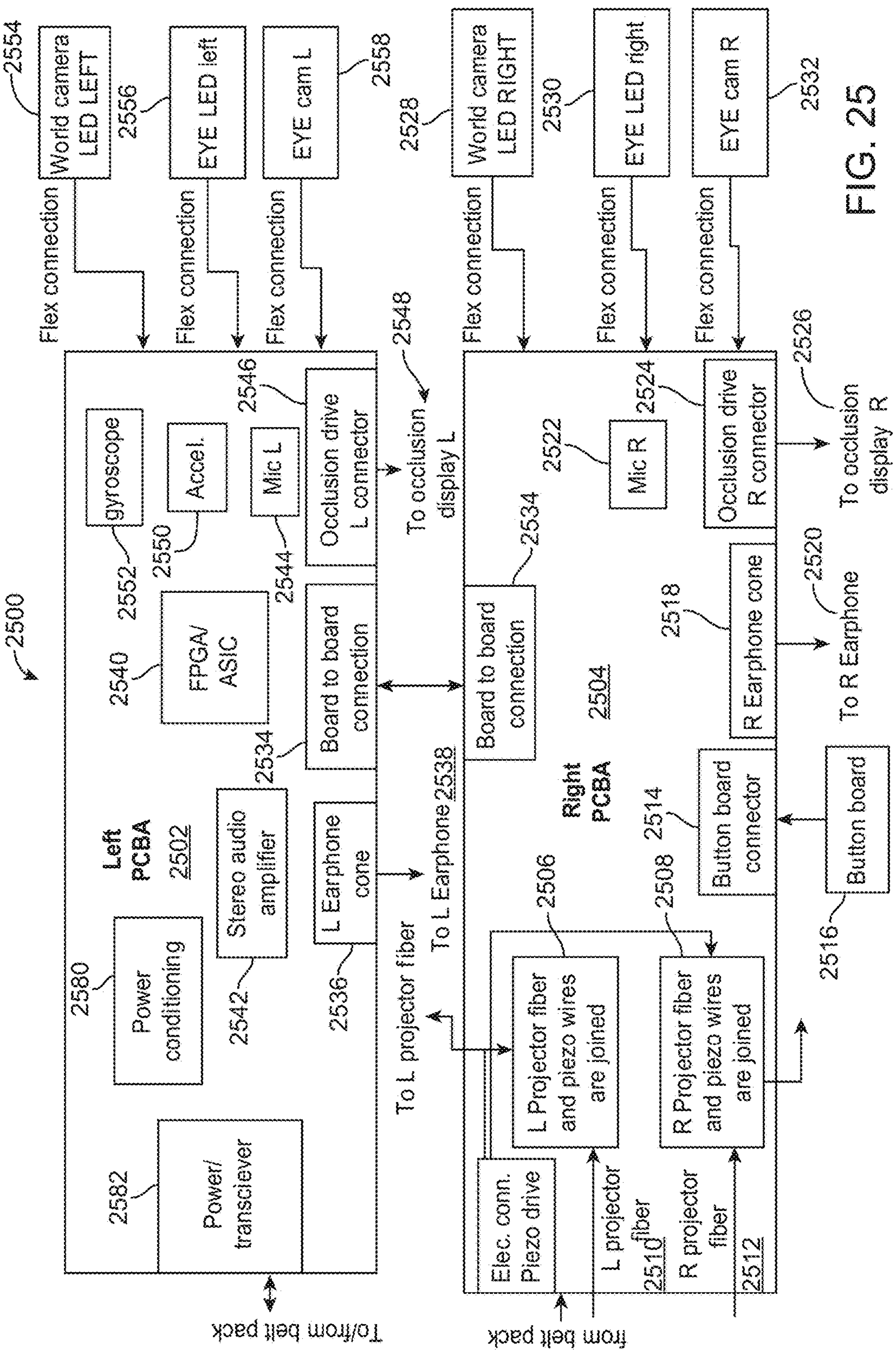
FIG. 25 illustrates a system architecture of the individual AR system, according to one embodiment.

FIG. 25 shows an example architecture 2500 for the electronics for an augmented reality device, according to one illustrated embodiment.

The AR device may include one or more printed circuit board components, for instance left (2502) and right (2504) printed circuit board assemblies (PCBA). As illustrated, the left PCBA 2502 includes most of the active electronics, while the right PCBA 604 supports principally supports the display or projector elements.

The right PCBA 2504 may include a number of projector driver structures which provide image information and control signals to image generation components. For example, the right PCBA 2504 may carry a first or left projector driver structure 2506 and a second or right projector driver structure 2508. The first or left projector driver structure 2506 joins a first or left projector fiber 2510 and a set of signal lines (e.g., piezo driver wires). The second or right projector driver structure 2508 joins a second or right projector fiber 2512 and a set of signal lines (e.g., piezo driver wires). The first or left projector driver structure 2506 is communicatively coupled to a first or left image projector, while the second or right projector drive structure 2508 is communicatively coupled to the second or right image projector.

In operation, the image projectors render virtual content to the left and right eyes (e.g., retina) of the user via respective optical components, for instance waveguides and/or compensation lenses (e.g., as shown in FIGS. 23 and 24).

The image projectors may, for example, include left and right projector assemblies. The projector assemblies may use a variety of different image forming or production technologies, for example, fiber scan projectors, liquid crystal displays (LCD), LCOS displays, digital light processing (DLP) displays. Where a fiber scan projector is employed, images may be delivered along an optical fiber, to be projected therefrom via a tip of the optical fiber. The tip may be oriented to feed into the waveguide (FIGS. 23 and 24). The tip of the optical fiber may project images, which may be supported to flex or oscillate. A number of piezoelectric actuators may control an oscillation (e.g., frequency, amplitude) of the tip. The projector driver structures provide images to respective optical fiber and control signals to control the piezoelectric actuators, to project images to the user's eyes.

Continuing with the right PCBA 2504, a button board connector 2514 may provide communicative and physical coupling to a button board 2516 which carries various user accessible buttons, keys, switches or other input devices. The right PCBA 2504 may include a right earphone or speaker connector 2518, to communicatively couple audio signals to a right earphone 2520 or speaker of the head worn component. The right PCBA 2504 may also include a right microphone connector 2522 to communicatively couple audio signals from a microphone of the head worn component. The right PCBA 2504 may further include a right occlusion driver connector 2524 to communicatively couple occlusion information to a right occlusion display 2526 of the head worn component. The right PCBA 2504 may also include a board-to-board connector to provide communications with the left PCBA 2502 via a board-to-board connector 2534 thereof.

The right PCBA 2504 may be communicatively coupled to one or more right outward facing or world view cameras 2528 which are body or head worn, and optionally a right cameras visual indicator (e.g., LED) which illuminates to indicate to others when images are being captured. The right PCBA 2504 may be communicatively coupled to one or more right eye cameras 2532, carried by the head worn component, positioned and orientated to capture images of the right eye to allow tracking, detection, or monitoring of orientation and/or movement of the right eye. The right PCBA 2504 may optionally be communicatively coupled to one or more right eye illuminating sources 2530 (e.g., LEDs), which as explained herein, illuminates the right eye with a pattern (e.g., temporal, spatial) of illumination to facilitate tracking, detection or monitoring of orientation and/or movement of the right eye.

The left PCBA 2502 may include a control subsystem, which may include one or more controllers (e.g., microcontroller, microprocessor, digital signal processor, graphical processing unit, central processing unit, application specific integrated circuit (ASIC), field programmable gate array (FPGA) 2540, and/or programmable logic unit (PLU)). The control system may include one or more non-transitory computer- or processor readable medium that stores executable logic or instructions and/or data or information. The non-transitory computer- or processor readable medium may take a variety of forms, for example volatile and nonvolatile forms, for instance read only memory (ROM), random access memory (RAM, DRAM, SD-RAM), flash memory, etc. The non-transitory computer or processor readable medium may be formed as one or more registers, for example of a microprocessor, FPGA or ASIC.

The left PCBA 2502 may include a left earphone or speaker connector 2536, to communicatively couple audio signals to a left earphone or speaker 2538 of the head worn component. The left PCBA 2502 may include an audio signal amplifier (e.g., stereo amplifier) 2542, which is communicative coupled to the drive earphones or speakers The left PCBA 2502 may also include a left microphone connector 2544 to communicatively couple audio signals from a microphone of the head worn component. The left PCBA 2502 may further include a left occlusion driver connector 2546 to communicatively couple occlusion information to a left occlusion display 2548 of the head worn component.

The left PCBA 2502 may also include one or more sensors or transducers which detect, measure, capture or otherwise sense information about an ambient environment and/or about the user. For example, an acceleration transducer 2550 (e.g., three axis accelerometer) may detect acceleration in three axis, thereby detecting movement. A gyroscopic sensor 2552 may detect orientation and/or magnetic or compass heading or orientation. Other sensors or transducers may be similarly employed.

The left PCBA 2502 may be communicatively coupled to one or more left outward facing or world view cameras 2554 which are body or head worn, and optionally a left cameras visual indicator (e.g., LED) 2556 which illuminates to indicate to others when images are being captured. The left PCBA may be communicatively coupled to one or more left eye cameras 2558, carried by the head worn component, positioned and orientated to capture images of the left eye to allow tracking, detection, or monitoring of orientation and/or movement of the left eye. The left PCBA 2502 may optionally be communicatively coupled to one or more left eye illuminating sources (e.g., LEDs) 2556, which as explained herein, illuminates the left eye with a pattern (e.g., temporal, spatial) of illumination to facilitate tracking, detection or monitoring of orientation and/or movement of the left eye.

The PCBAs 2502 and 2504 are communicatively coupled with the distinct computation component (e.g., belt pack) via one or more ports, connectors and/or paths. For example, the left PCBA 2502 may include one or more communications ports or connectors to provide communications (e.g., bi-directional communications) with the belt pack. The one or more communications ports or connectors may also provide power from the belt pack to the left PCBA 2502. The left PCBA 2502 may include power conditioning circuitry 2580 (e.g., DC/DC power converter, input filter), electrically coupled to the communications port or connector and operable to condition (e.g., step up voltage, step down voltage, smooth current, reduce transients).

The communications port or connector may, for example, take the form of a data and power connector or transceiver 2582 (e.g., Thunderbolt® port, USB® port). The right PCBA 2504 may include a port or connector to receive power from the belt pack. The image generation elements may receive power from a portable power source (e.g., chemical battery cells, primary or secondary battery cells, ultra-capacitor cells, fuel cells), which may, for example be located in the belt pack.

As illustrated, the left PCBA 2502 includes most of the active electronics, while the right PCBA 2504 supports principally supports the display or projectors, and the associated piezo drive signals. Electrical and/or fiber optic connections are employed across a front, rear or top of the body or head worn component of the AR system.

Both PCBAs 2502 and 2504 are communicatively (e.g., electrically, optically) coupled to the belt pack. The left PCBA 2502 includes the power subsystem and a high speed communications subsystem. The right PCBA 2504 handles the fiber display piezo drive signals. In the illustrated embodiment, only the right PCBA 2504 needs to be optically connected to the belt pack. In other embodiments, both the right PCBA and the left PCBA may be connected to the belt pack.

While illustrated as employing two PCBAs 2502 and 2504, the electronics of the body or head worn component may employ other architectures. For example, some implementations may use a fewer or greater number of PCBAs. Also for example, various components or subsystems may be arranged differently than illustrated in FIG. 25. For example, in some alternative embodiments some of the components illustrated in FIG. 25 as residing on one PCBA may be located on the other PCBA, without loss of generality.

As illustrated in FIGS. 4A-4D, each user may use his/her respective AR system (generally referred to as individual AR systems in the discussion below). In some implementations, the individual AR systems may communicate with one another. For example, two or more proximately located AR systems may communicate with one another. As described further herein, communications may occur after performance of a handshaking protocol, in one or more embodiments. The AR systems may communicate wirelessly via one or more radios. As discussed above, such radios may be capable of short range direct communications, or may be capable of longer range direct communications (e.g., without a repeater, extender, etc.). Additionally or alternatively, indirect longer range communications may be achieved via one or more intermediary devices (e.g., wireless access points, repeaters, extenders).

The head worn component of the AR system may have one or more "outward" facing cameras. In one or more embodiments, the head worn component may have one or more "inward" facing cameras. As used herein, "outward facing" means that the camera captures images of the ambient environment rather than the user who is wearing the head worn component. Notably, the "outward" facing camera could have a field of view that encompass areas to the front, the left, the right or even behind the user. This contrasts with an inward facing camera which captures images of the individual who is wearing the head worn component, for instance a camera that faces the user's face to capture facial expression or eye movements of the user.

In many implementations, the personal (or individual) AR system(s) worn by the user(s) may include one or more sensors, transducers, or other components. The sensors, transducers, or other components may be categorized into two general categories, (i) those that detect aspects of the user who wears the sensor(s) (e.g., denominated herein as inward facing sensors), and (ii) those that detect conditions in the ambient environment in which the user is located (e.g., denominated herein as outward facing sensors). These sensors may take a large variety of forms. For example, the sensor(s) may include one or more image sensors, for instance digital still or moving image cameras. Also for example, the sensor(s) may include one or more audio sensors or microphones. Other sensors may detect position, movement, temperature, heart rate, perspiration, etc.

As noted above, in one or more embodiments, sensors may be inward facing. For example, image sensors worn by a user may be positioned and/or oriented to detect eye movement of the user, facial expressions of the user, or limb (arms, legs, hands) of the user. For example, audio sensors or microphones worn by a user may be positioned and/or oriented to detect utterances made by the user. Such audio sensors or microphones may be directional and may be located proximate a mouth of the user during use.

As noted above, sensors may be outward facing. For example, image sensors worn by a user may be positioned and/or oriented to visually detect the ambient environment in which the user is located and/or objects with which the user is interacting. In one or more embodiments, image-based sensors may refer to cameras (e.g., field-of-view cameras, IR cameras, eye tracking cameras, etc.) Also for example, audio sensors or microphones worn by a user may be positioned and/or oriented to detect sounds in the ambient environment, whether from natural sources like other people, or generated from inanimate objects such as audio speakers. The outward facing sensors may detect other characteristics of the ambient environment. For example, outward facing sensors may include a temperature sensor or thermocouple that detects a temperature in the ambient environment.

Outward facing sensors may detect humidity, air quality, and/or air flow in the ambient environment. Outward facing sensors may include light detector (e.g., photodiodes) to detect an ambient light condition in the ambient environment. In one or more embodiments, light probes may also be used as part of the individual AR systems. Outward facing sensors may include one or more sensors that detect a presence and/or absence of an object, including other people, in the ambient environment and/or movement in the ambient environment.

Physical Space/Room Based Sensor System

Figure 26:
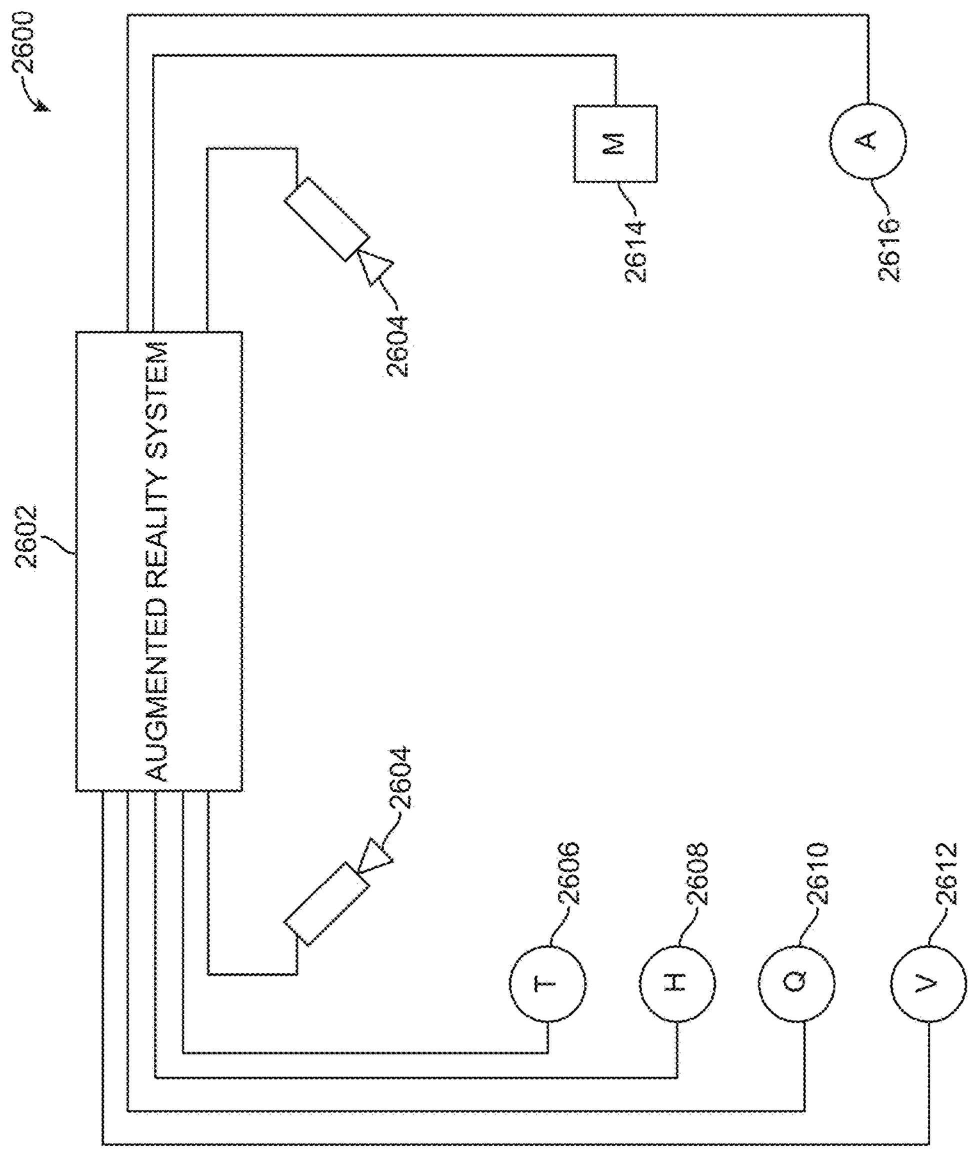
FIG. 26 illustrates a room based sensor system, according to one embodiment.

As illustrated in the system architecture 2600 of FIG. 26, in some implementations the AR system may include physical space or room based sensor systems. As illustrated in FIG. 26, the AR system 2602 not only draws from users' individual AR systems (e.g., head-mounted augmented reality display system, etc.) as shown in FIGS. 23 and 24, but also may use room-based sensor systems 2604 to collect information about rooms and physical spaces. The space or room based sensor systems 2604 detect and/or collect information from a physical environment, for example a space such as a room (e.g., an office, living room, media room, kitchen or other physical space). The space or room based sensor system(s) 2604 typically includes one or more image sensors 2606, for instance one or more cameras (e.g., digital still cameras, digital moving image or video cameras).

The image sensor(s) may be used in addition to image sensors which form part of the personal AR system(s) worn by the user(s), in one or more embodiments. The space or room based sensor systems may also include one or more audio sensors or transducers 2608, for example omni-directional or directional microphones. The audio sensors or transducers may detect sound from animate objects (e.g., one or more users or other people in the ambient environment. The audio sensors or transducers may detect sound from inanimate objects, for example footsteps, televisions, stereo systems, radios, or other appliances.

The space or room based sensor systems 2604 may also include other environmental sensors 2610, temperature 2612, humidity 2614, air quality 2616, air flow or velocity, ambient light sensing, presence absence, movement, etc., in the ambient environment. All these inputs feed back to the AR system 2602, as shown in FIG. 26. It should be appreciated that only some of the room-based sensors are shown in FIG. 26, and some embodiments may comprise fewer or greater sensor sub-systems, and the embodiment of FIG. 26 should not be seen as limiting.

The space or room based sensor system(s) 2604 may detect and/or collect information in with respect to a space or room based coordinate system. For example, visual or optical information and/or audio information may be referenced with respect to a location or source of such information within a reference frame that is different from a reference frame of the user. For example, the location of the source of such information may be identified within a reference frame of the space or room based sensor system or component thereof. The reference frame of the space or room based sensor system or component may be relatively fixed, and may be identical to a reference frame of the physical space itself. Alternatively, one or more transformations (e.g., translation and/or rotation matrices) may mathematically relate the reference frame of the space or room based sensor system or component with the reference frame of the physical space.

Figure 27:
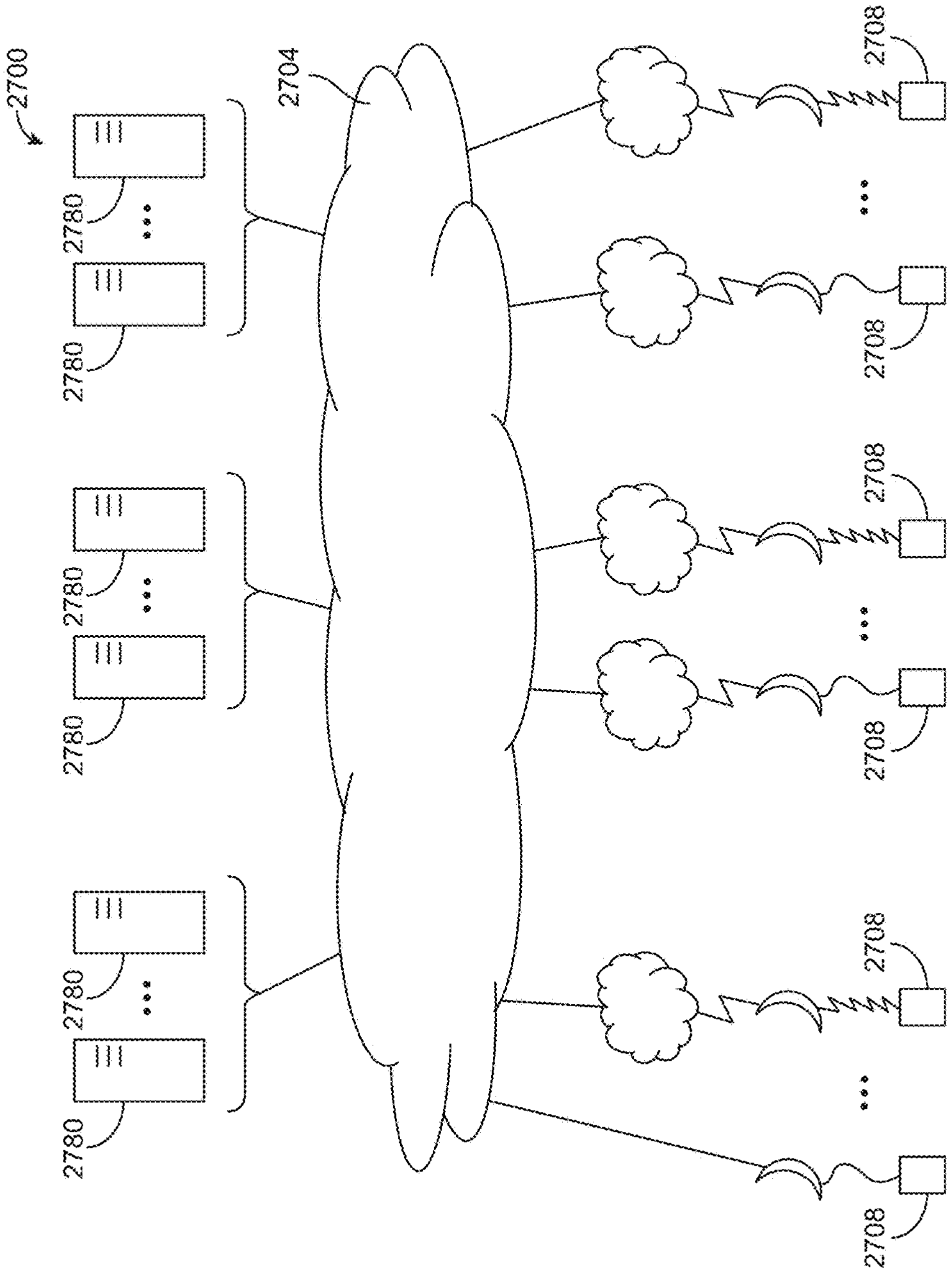
FIG. 27 illustrates a communication architecture of the augmented reality system and the interaction of the augmented reality systems of many users with the cloud.

FIG. 27 illustrates a communications architecture which employs one or more hub, central, or distributed, server computer systems and one or more individual AR systems communicatively coupled by one or more wired or wireless networks, according to one illustrated embodiment. In one or more embodiments, a cloud server may refer to a server that is accessed by the one or more individual AR systems through a network (e.g., wired network, wireless network, Bluetooth, cellular network, etc.) In the illustrated embodiment, the individual AR systems communicate with the cloud servers or server computer systems 2780 through a network 2704. In one or more embodiments, a cloud server may refer to a hosted server or processing system that is hosting at a different location, and is accessed by multiple users on demand through the Internet or some type of network. In one or more embodiments, a cloud server may be a set of multiple connected servers that comprise a cloud.

The server computer systems 2780 may, for example, be clustered. For instance, clusters of server computer systems may be located at various geographically dispersed locations. Such may facilitate communications, shortening transit paths and/or provide for redundancy.

Specific instances of personal AR systems 2708 may be communicatively coupled to the server computer system(s) 2780 through a cloud network 2704. The server computer system(s) 2780 may maintain information about a specific user's own physical and/or virtual worlds. The server computer system(s) 2780 may allow a given user to share information about the specific user's own physical and/or virtual worlds with other users. Additionally or alternatively, the server computer system(s) 2780 may allow other users to share information about their own physical and/or virtual worlds with the given or specific user. As described herein, server computer system(s) 2780 may allow mapping and/or characterizations of large portions of the physical worlds. Information may be collected via the personal AR system of one or more users. The models of the physical world may be developed over time, and by collection via a large number of users. This may allow a given user to enter a new portion or location of the physical world, yet benefit by information collected by others who either previously or are currently in the particular location. Models of virtual worlds may be created over time via user by a respective user.

The individual AR system(s) 2708 may be communicatively coupled to the server computer system(s). For example, the personal AR system(s) 2708 may be wirelessly communicatively coupled to the server computer system(s) 2780 via one or more radios. The radios may take the form of short range radios, as discussed above, or relatively long range radios, for example cellular chip sets and antennas. The individual AR system(s) 2708 will typically be communicatively coupled to the server computer system(s) 2780 indirectly, via some intermediary communications network or component. For instance, the individual AR system(s) 2708 will typically be communicatively coupled to the server computer system(s) 2780 via one or more telecommunications provider systems, for example one or more cellular communications provider networks.

In many implementations, the AR system may include additional components. In one or more embodiments, the AR devices may, for example, include one or more haptic devices or components. The haptic device(s) or component(s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents.

In some implementations, haptic devices or components may be worn by the user. An example of a haptic device in the form of a user wearable glove is described herein. In some implementations, haptic devices or components may be held the user. An example of a haptic device in the form of a user wearable glove (e.g., FIG. 34A) is described herein. Other examples of haptic devices in the form of various haptic totems are described further below. The AR system may additionally or alternatively employ other types of haptic devices or user input components.

The AR system may, for example, include one or more physical objects which are manipulable by the user to allow input or interaction with the AR system. These physical objects are referred to herein as totems, and will be described in further detail below. Some totems may take the form of inanimate objects, for example a piece of metal or plastic, a wall, a surface of table. Alternatively, some totems may take the form of animate objects, for example a hand of the user.

As described herein, the totems may not actually have any physical input structures (e.g., keys, triggers, joystick, trackball, rocker switch). Instead, the totem may simply provide a physical surface, and the AR system may render a user interface so as to appear to a user to be on one or more surfaces of the totem. For example, and as discussed in more detail further herein, the AR system may render an image of a computer keyboard and trackpad to appear to reside on one or more surfaces of a totem. For instance, the AR system may render a virtual computer keyboard and virtual trackpad to appear on a surface of a thin rectangular plate of aluminum which serves as a totem. The rectangular plate does not itself have any physical keys or trackpad or sensors. However, the AR system may detect user manipulation or interaction or touches with the rectangular plate as selections or inputs made via the virtual keyboard and/or virtual trackpad. Many of these components are described in detail further below.

Passable World Model

The passable world model allows a user to effectively pass over a piece of the user's world (e.g., ambient surroundings, interactions, etc.) to another user. Each user's respective individual AR system captures information as the user passes through or inhabits an environment, which the AR system processes to produce a passable world model.

The individual AR system may communicate or pass the passable world model to a common or shared collection of data at the cloud. The individual AR system may communicate or pass the passable world model to other users of the AR system, either directly or via the cloud. The passable world model provides the ability to efficiently communicate or pass information that essentially encompasses at least a field of view of a user. Of course, it should be appreciated that other inputs (e.g., sensory inputs, image inputs, eye-tracking inputs etc.) may additionally be transmitted to augment the passable world model at the cloud.

Figure 28:
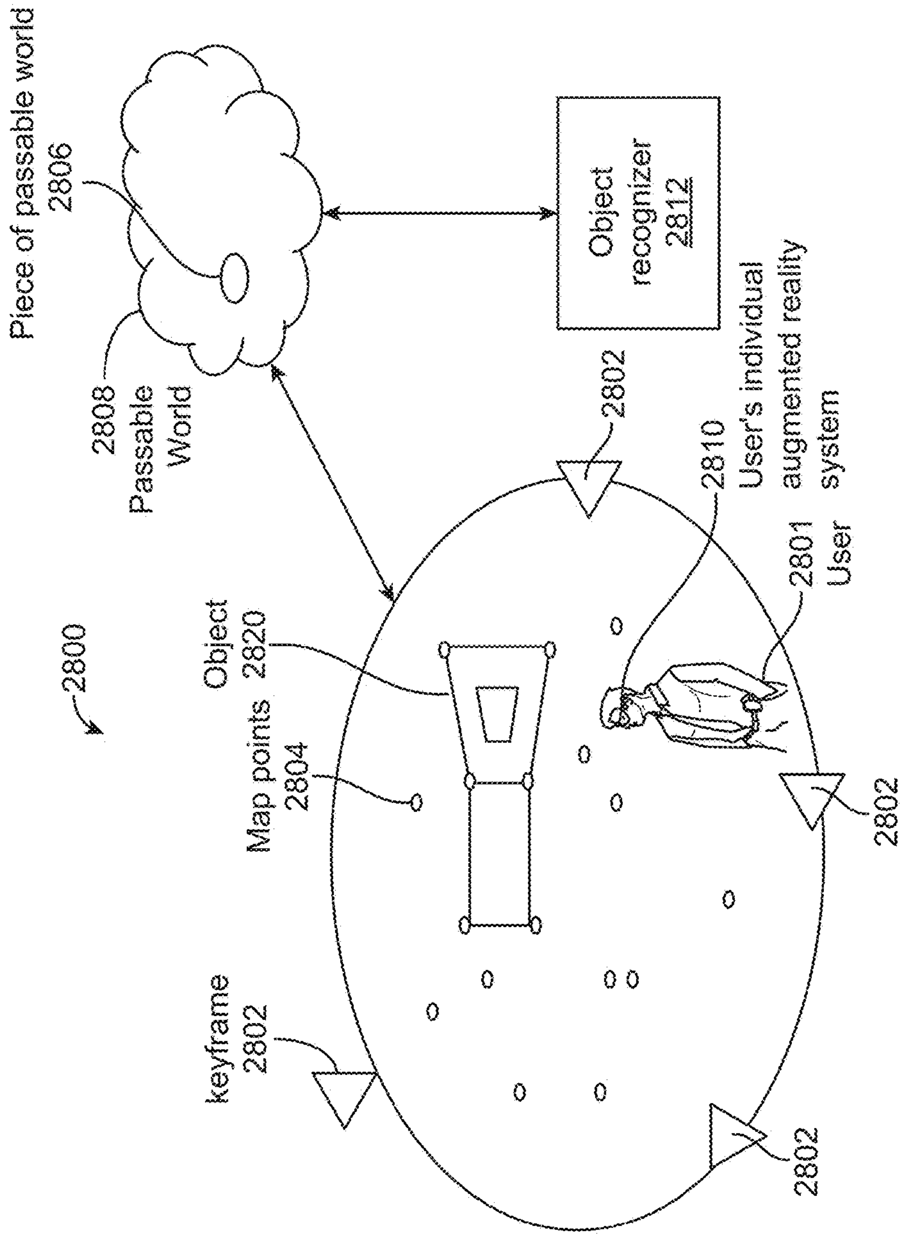
FIG. 28 illustrates a simplified view of the passable world model, according to one embodiment.

FIG. 28 illustrates the components of a passable world model 2800 according to one illustrated embodiment. As a user 2801 walks through an environment, the user's individual AR system 2810 captures information (e.g., images, location information, position and orientation information, etc.) and saves the information through posed tagged images. In the illustrated embodiment, an image may be taken of the object 2820 (which resembles a table) and map points 2804 may be collected based on the captured image. This forms the core of the passable world model, as shown by multiple keyframes (e.g., cameras) 2802 that have captured information about the environment.

As shown in FIG. 28, there may be multiple keyframes 2802 that capture information about a space at any given point in time. For example, a keyframe may be another user's AR system capturing information from a particular point of view. Another keyframe may be a room-based camera/sensor system that is capturing images and points 2804 through a stationary point of view. By triangulating images and points from multiple points of view, the position and orientation of real objects in a 3D space may be determined.

In one or more embodiments, the passable world model 2808 is a combination of raster imagery, point and descriptors clouds, and polygonal/geometric definitions (referred to herein as parametric geometry). All this information is uploaded to and retrieved from the cloud, a section of which corresponds to a particular space that the user may have walked into. As shown in FIG. 28, the passable world model also contains many object recognizers 2812 that work on the cloud or on the user's individual system 2810 to recognize objects in the environment based on points and pose-tagged images captured through the various keyframes of multiple users. Essentially by continually capturing information about the physical world through multiple keyframes 2802, the passable world is always growing, and may be consulted (continuously or as needed) in order to determine how to render virtual content in relation to existing physical objects of the real world. By collecting information from the user's environment, a piece of the passable world 2806 is constructed/augmented, and may be "passed" along to one or more AR users simultaneously or in the future.

Asynchronous communications is established between the user's respective individual AR system and the cloud based computers (e.g., server computers). In other words, the user's individual AR system is constantly updating information about the user's surroundings to the cloud, and also receiving information from the cloud about the passable world. Thus, rather than each AR user having to capture images and recognize objects based on the captured images, having an asynchronous system allows the system to be more efficient. Information that already exists about that part of the world is automatically communicated to the individual AR system while new information is updated to the cloud. It should be appreciated that the passable world model lives both on the cloud or other form of networking computing or peer to peer system, and also may live on the user's individual AR system.

In one or more embodiments, the AR system may employ different levels of resolutions for the local components (e.g., computational component such as the belt pack) and remote components (e.g., cloud based computers 2780). This is because the remote components (e.g., resources that reside on the cloud servers) are typically more computationally powerful than local components. The cloud based computers may pick data collected by the many different individual AR systems, and/or one or more space or room based sensor systems, and utilize this information to add on to the passable world model. The cloud based computers may aggregate only the best (e.g., most useful) information into a persistent world model. In other words, redundant information and/or less-than-optimal quality information may be timely disposed so as not to deteriorate the quality and/or performance of the system.

Figure 29:
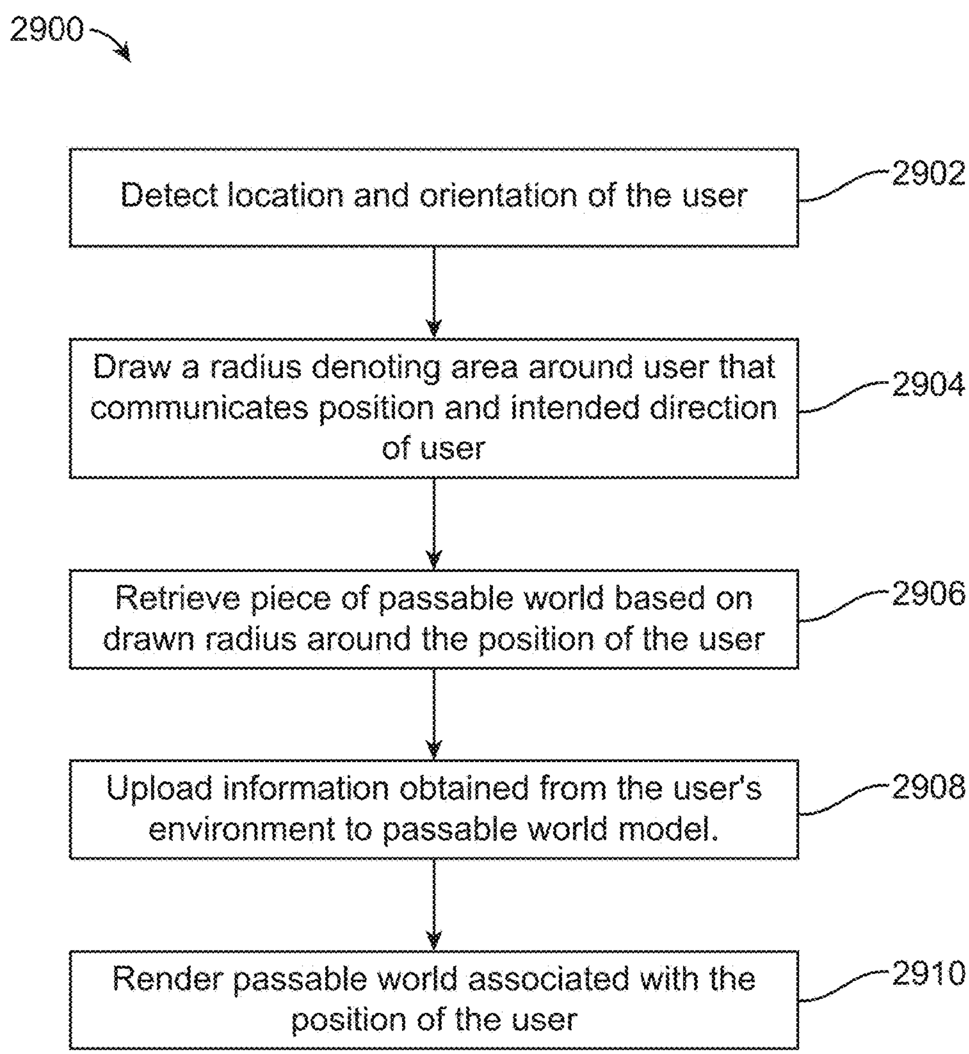
FIG. 29 illustrates an example method of rendering using the passable world model, according to one embodiment.

FIG. 29 illustrates an example method 2900 of interacting with the passable world model. At 2902, the user's individual AR system may detect a location and orientation of the user within the world. In one or more embodiments, the location may be derived by a topological map of the system, as will be described in further detail below. In other embodiments, the location may be derived by GPS or any other localization tool. It should be appreciated that the passable world may be constantly accessed by the individual AR system.

In another embodiment (not shown), the user may request access to another user's space, prompting the system to access that section of the passable world, and associated parametric information corresponding to the other user. Thus, there may be many triggers for the passable world. At the simplest level, however, it should be appreciated that the passable world is constantly being updated and accessed by multiple user systems, thereby constantly adding and receiving information from the cloud.

Following the above example, based on the known location of the user, at 2904, the system may draw a radius denoting a physical area around the user that communicates both the position and intended direction of the user. Next, at 2906, the system may retrieve a piece of the passable world based on the anticipated position of the user. In one or more embodiments, the piece of the passable world may contain information from the geometric map of the space acquired through previous keyframes and captured images and data stored in the cloud. At 2908, the AR system uploads information from the user's environment into the passable world model. At 2910, based on the uploaded information, the AR system renders the passable world associated with the position of the user to the user's individual AR system.

This information allows virtual content to meaningfully interact with the user's real surroundings in a coherent manner. For example, a virtual "monster" may be rendered to be originating from a particular building of the real world. Or, in another example, a user may leave a virtual object in relation to physical coordinates of the real world such that a friend (also wearing the AR system) finds the virtual object in the same physical coordinates. In order to allow such capabilities (and many more), it is important for the AR system to constantly access the passable world to retrieve and upload information. It should be appreciated that the passable world contains persistent digital representations of real spaces that is crucially utilized in rendering virtual and/or digital content in relation to real coordinates of a physical space. It should be appreciated that the AR system may maintain coordinates of the real world and/or virtual world. In some embodiments, a third party may maintain the map (e.g., coordinates) of the real world, and the AR system may consult the map to determine one or more parameters in order to render virtual content in relation to real objects of the world.

It should be appreciated that the passable world model does not itself render content that is displayed to the user. Rather it is a high level concept of dynamically retrieving and updating a persistent digital representation of the real world in the cloud. In one or more embodiments, the derived geometric information is loaded onto a game engine, which then renders content associated with the passable world. Thus, regardless of whether the user is in a particular space or not, that particular space has a digital representation in the cloud that can be accessed by any user. This piece of the passable world may contain information about the physical geometry of the space and imagery of the space, information about various avatars that are occupying the space, information about virtual objects and other miscellaneous information.

As described in detail further herein, one or more object recognizers may examine or "crawl" the passable world models, tagging points that belong to parametric geometry. Parametric geometry, points and descriptors may be packaged into passable world models, to allow low latency passing or communicating of information corresponding to a portion of a physical world or environment. In one or more embodiments, the AR system can implement a two tier structure, in which the passable world model allow fast pose processing in a first tier, but then inside that framework is a second tier (e.g., FAST features). In one or more embodiments, the second tier structure can increase resolution by performing a frame-to-frame based three-dimensional (3D) feature mapping.

Figure 30:
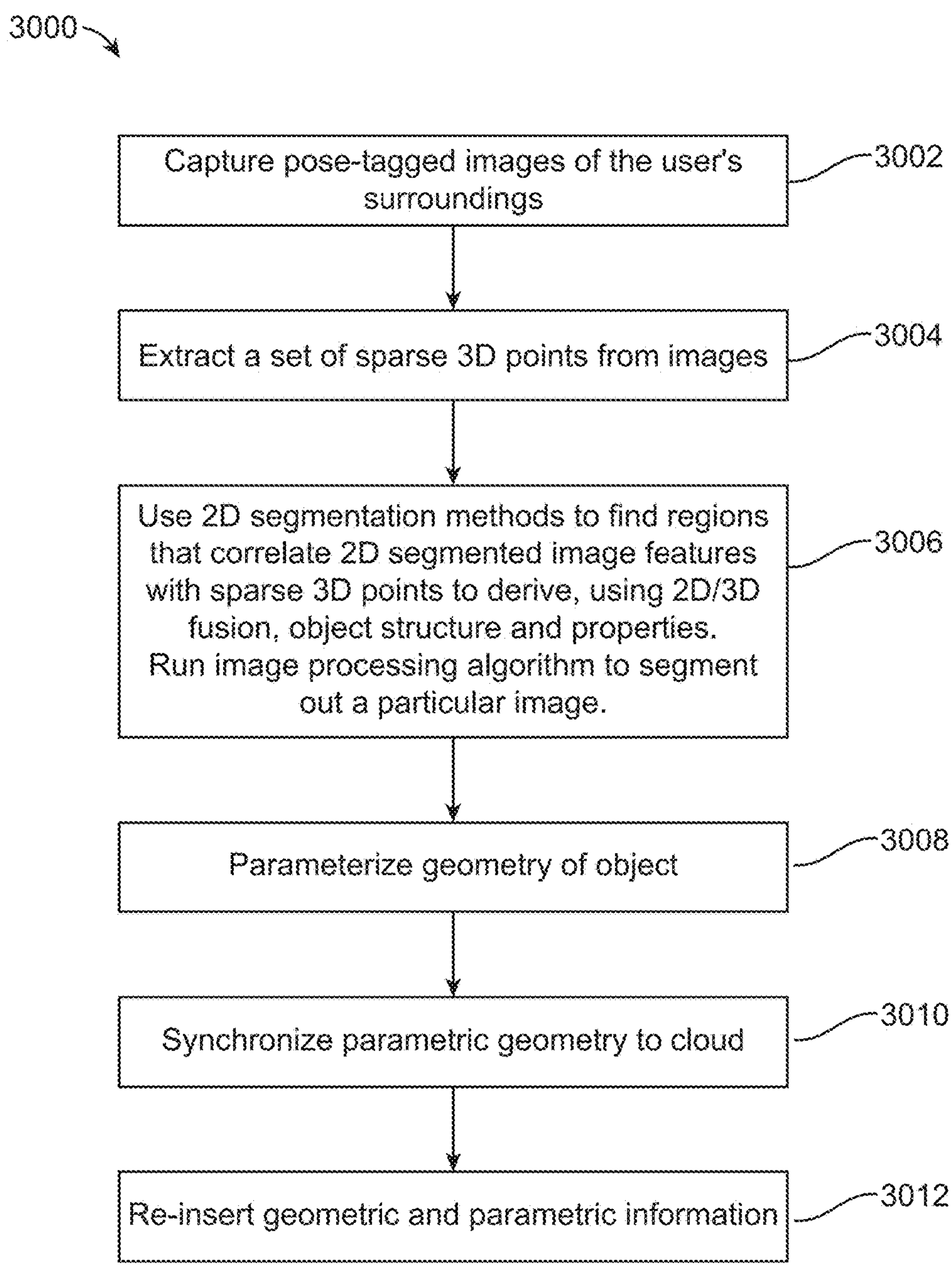
FIG. 30 illustrates a high level flow diagram for a process of recognizing an object, according to one embodiment.

FIG. 30 illustrates an example method 3000 of recognizing objects through object recognizers. At 3002, when a user walks into a room, the user's individual AR system captures information (e.g., images, sensor information, pose tagged images, etc.) about the user's surroundings from multiple points of view. At 3004, a set of 3D points may be extracted from the one or more captured images. For example, by the time the user walks into a section of a room, the user's individual AR system has already captured numerous keyframes and pose tagged images about the surroundings (similar to the embodiment shown in FIG. 28). It should be appreciated that in one or more embodiments, each keyframe may include information about the depth and color of the objects in the surroundings.

In one or more embodiments, the object recognizers (either locally or in the cloud) may use image segmentation techniques to find one or more objects. It should be appreciated that different objects may be recognized by their own object recognizers that have been written by developers and programmed to recognize that particular object. For illustrative purposes, the following example, will assume that the object recognizer recognizes doors. The object recognizer may be an autonomous and/or atomic software object or "robot" that utilizes the pose tagged images of the space, including key frames and 2D and 3D feature points taken from multiple keyframes, and uses this information, and geometry of the space to recognize one or more objects (e.g., the door)

It should be appreciated that multiple object recognizers may run simultaneously on a set of data, and multiple object recognizers may run independent of each other. It should be appreciated that the object recognizer takes 2D images of the object (2D color information, etc.), 3D images (depth information) and also takes 3D sparse points to recognize the object in a geometric coordinate frame of the world.

Next, at 3006, the object recognizer(s) may correlate the 2D segmented image features with the sparse 3D points to derive object structures and one or more properties about the object using 2D/3D data fusion. For example, the object recognizer may identify specific geometry of the door with respect to the keyframes. Next, at 3008, the object recognizer parameterizes the geometry of the object. For example, the object recognizer may attach semantic information to the geometric primitive (e.g., the door has a hinge, the door can rotate 90 degrees, etc.) of the object. Or, the object recognizer may reduce the size of the door, to match the rest of the objects in the surroundings, etc.

At 3010, the AR system may synchronize the parametric geometry of the objects to the cloud. Next, at 3012, the object recognizer may re-insert the geometric and parametric information into the passable world model. For example, the object recognizer may dynamically estimate the angle of the door, and insert it into the world. Thus, it can be appreciated that using the object recognizer allows the system to save computational power because, rather than constantly requiring real-time capture of information about the angle of the door or movement of the door, the object recognizer uses the stored parametric information to estimate the movement or angle of the door. This allows the system to function independently based on computational capabilities of the individual AR system without necessarily relying on information in the cloud servers. It should be appreciated that this information may be updated to the cloud, and transmitted to other AR systems such that virtual content may be appropriately displayed in relation to the recognized door.

As briefly discussed above, object recognizers are atomic autonomous software and/or hardware modules which ingest sparse points (e.g., not necessarily a dense point cloud), pose-tagged images, and geometry, and produce parametric geometry that has semantics attached. The semantics may take the form of taxonomical descriptors, for example "wall," "chair," "Aeron® chair," and properties or characteristics associated with the taxonomical descriptor. For example, a taxonomical descriptor such as a table may have associated descriptions such as "has a flat horizontal surface which can support other objects." Given an ontology, an object recognizer turns images, points, and optionally other geometry, into geometry that has meaning (e.g., semantics).

Since the individual AR systems are intended to operate in the real world environment, the points represent sparse, statistically relevant, natural features. Natural features are those that are inherent to the object (e.g., edges, holes), in contrast to artificial features added (e.g., printed, inscribed or labeled) to objects for the purpose of machine-vision recognition. The points do not necessarily need to be visible to humans. It should be appreciated that the points are not limited to point features, e.g., line features and high dimensional features.

In one or more embodiments, object recognizers may be categorized into two types, Type 1—Basic Objects (e.g., walls, cups, chairs) and Type 2—Detailed Objects (e.g., Aeron® chair, my wall, etc.). In some implementations, the Type 1 recognizers run across the entire cloud, whereas the Type 2 recognizers run against previously found Type 1 data (e.g., search all chairs for Aeron® chairs). In one or more embodiments, the object recognizers may use inherent properties of an object to facilitate object identification. Or, in other embodiments, the object recognizers may use ontological relationships between objects in order to facilitate implementation. For example, an object recognizer may use the fact that window may be "in" a wall to facilitate recognition of instances of windows.

In one or more embodiments, object recognizers may be bundled, partnered or logically associated with one or more applications. For example, a "cup finder" object recognizer may be associated with one, two or more applications in which identifying a presence of a cup in a physical space would be useful. For example, a coffee company may create its own "cup finder" application that allows for the recognition of cups provided by the coffee company. This may allow delivery of virtual content/advertisements, etc. related to the coffee company, and may directly and/or indirectly encourage participation or interest in the coffee company.

Applications can be logically connected for associated with defined recognizable visual data or models. For example, in response to a detection of any Aeron® chairs in an image, the AR system calls or executes an application from the Herman Miller Company, the manufacturer and/or seller of Aeron® chairs. Similarly, in response to detection of a Starbucks® signs or logo in an image, the AR system calls or executes a Starbucks® application.

In yet another example, the AR system may employ an instance of a generic wall finder object recognizer. The generic wall finder object recognizer identifies instances of walls in image information, without regard to specifics about a wall. Thus, the generic wall finder object recognizer may identify vertically oriented surfaces that constitute walls in the image data. The AR system may also employ an instance of a specific wall finder object recognizer, which is separate and distinct from the generic wall finder.

The specific wall finder object recognizer identifies vertically oriented surfaces that constitute walls in the image data and which have one or more specific characteristics beyond those of generic wall. For example, a given specific wall may have one or more windows in defined positions, one or more doors in defined positions, may have a defined paint color, may have artwork hung from the wall, etc., which visually distinguishes the specific wall from other walls. Such features allow the specific wall finder object recognizer to identify particular walls. For example, one instance of a specific wall finder object recognizer may identify a wall of a user's office. Other instances of specific wall finder object recognizers may identify respective walls of a user's living room or bedroom.

A specific object recognizer may stand independently from a generic object recognizer. For example, a specific wall finder object recognizer may run completely independently from a generic wall finder object recognizer, not employing any information produced by the generic wall finder object recognizer. Alternatively, a specific (e.g., more refined) object recognizer may be run nested against objects previously found by a more generic object recognizer. For example, a generic and/or a specific door finder object recognizer may run against a wall found by a generic and/or specific wall finder object recognizer, since a door must be in a wall. Likewise, a generic and/or a specific window finder object recognizer may run against a wall found by a generic and/or specific wall finder object recognizer, since a window must be "in" a wall.

In one or more embodiments, an object recognizer may not only identify the existence or presence of an object, but may also identify other characteristics associated with the object. For example, a generic or specific door finder object recognizer may identify a type of door, whether the door is hinged or sliding, where the hinge or slide is located, whether the door is currently in an open or a closed position, and/or whether the door is transparent or opaque, etc.

As noted above, each object recognizer is atomic, that is the object recognizer is autonomic, autonomous, asynchronous, and essentially a black box software object. This allows object recognizers to be community-built. Developers may be incentivized to build object recognizers. For example, an online marketplace or collection point for object recognizers may be established. Object recognizer developers may be allowed to post object recognizers for linking or associating with applications developed by other object recognizer or application developers.

Various other incentives may be similarly provided. Also for example, an incentive may be provided to an object recognizer developer or author based on the number of times an object recognizer is logically associated with an application and/or based on the total number of distributions of an application to which the object recognizer is logically associated. As a further example, an incentive may be provided to an object recognizer developer or author based on the number of times an object recognizer is used by applications that are logically associated with the object recognizer. The incentives may be monetary incentives, in one or more embodiments. In other embodiments, the incentive may comprise providing access to services or media behind a pay-wall, and/or providing credits for acquiring services, media, or goods.

It would, for example, be possible to instantiate any number of distinct generic and/or specific object recognizers. Some embodiments may require a very large number of generic and specific object recognizers. These generic and/or specific object recognizers can all be run against the same data. As noted above, some object recognizers can be nested such that they are essentially layered on top of each other.

In one or more embodiments, a control program may control the selection, use or operation of the various object recognizers, for example arbitrating the use or operation thereof. Some object recognizers may be placed in different regions, to ensure that the object recognizers do not overlap each other. As discussed above, the object recognizers may run locally at the individual AR system's belt back, or may be run on one or more cloud servers.

Ring Buffer of Object Recognizers

Figure 31:
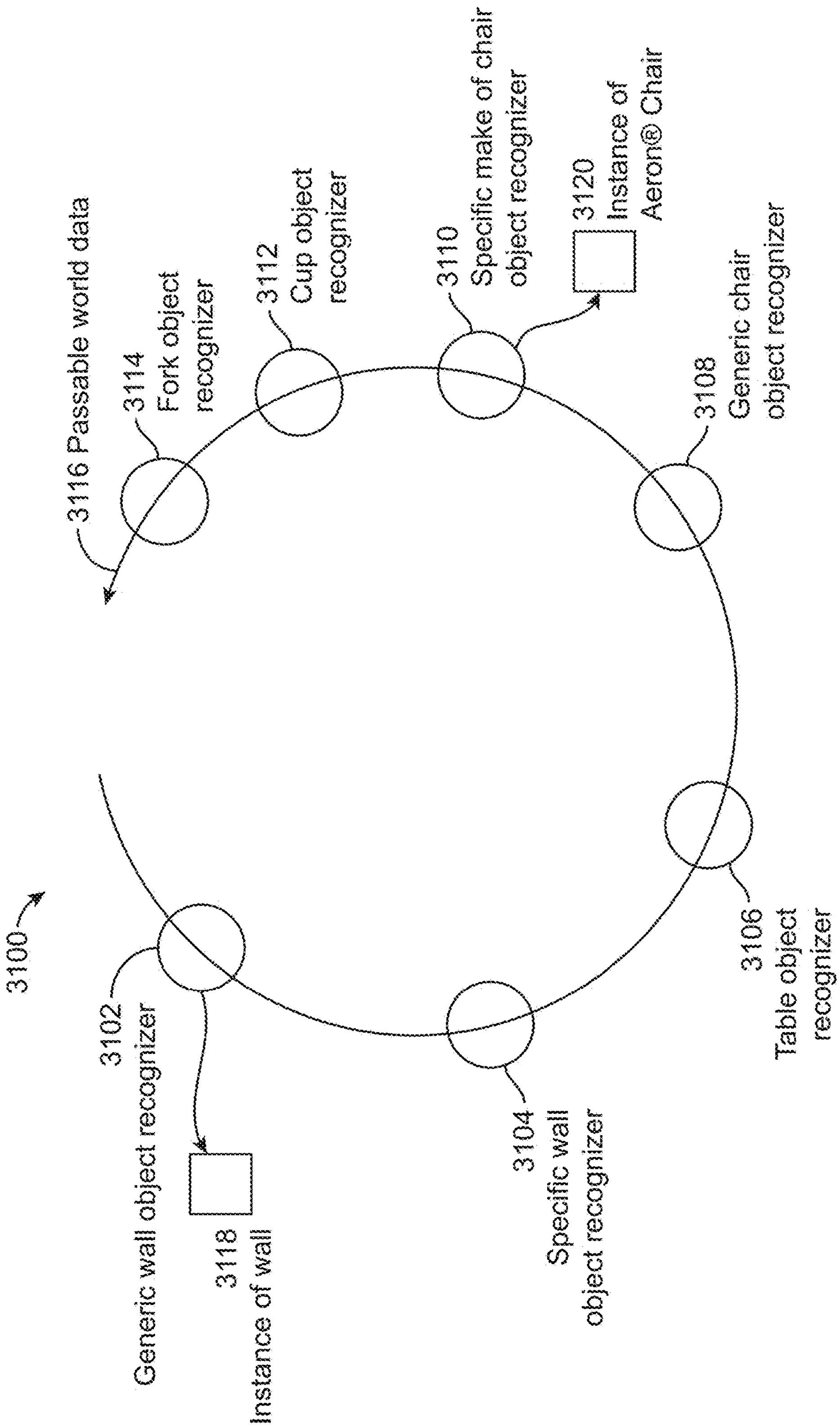
FIG. 31 illustrates a ring buffer approach employed by object recognizers to recognize objects in the passable world, according to one embodiment.

FIG. 31 shows a ring buffer 3100 of object recognizers, according to one illustrated embodiment. The AR system may organize the object recognizers in a ring topology, for example to achieve low disk-read utilization. The various object recognizers may sit on or along the ring, all running in parallel. Passable world model data (e.g., walls, ceiling, floor) may be run through the ring, in one or more embodiments. As the data rolls by, each object recognizer collects that data relevant to the object which the object recognizer recognizes. Some object recognizers may need to collect large amounts of data, while others may only need to collect small amounts of data. The respective object recognizers collect whatever data they require, and return results in the same manner described above.

In the illustrated embodiment, the passable world data 3116 runs through the ring. Starting clockwise, a generic wall object recognizer 3102 may first be run on the passable world data 3116. The generic wall object recognizer 3102 may recognize an instance of a wall 3118. Next, a specific wall object recognizer 3104 may run on the passable world data 3116. Similarly, a table object recognizer 3106, and a generic chair object recognizer 3108 may be run on the passable world data 3116.

Specific object recognizers may also be run on the data, such as the specific Aeron® object recognizer 3110 that successfully recognizes an instance of the Aeron chair 3120. In one or more embodiments, bigger, or more generic object recognizers may go through the data first, and smaller, and finer-detail recognizers may run through the data after the bigger ones are done. Going through the ring, a cup object recognizer 3112 and a fork object recognizer 3114 may be run on the passable world data 3116.

Avatars in the Passable World

As an extension of the passable world model, not only objects are recognized, but other users/people of the real world may be recognized and may be rendered as virtual objects. For example, as discussed above, a friend of a first user may be rendered as an avatar at the AR system of the first user.

In some implementations, in order to render an avatar that properly mimics the user, the user may train the AR system, for example by moving through a desired or prescribed set of movements. In response, the AR system may generate an avatar sequence in which an avatar replicates the movements, for example, by animating the avatar. Thus, the AR system captures or receives images of a user, and generates animations of an avatar based on movements of the user in the captured images. The user may be instrumented, for example, by wearing one or more sensors. In one or more embodiments, the AR system knows where the pose of the user's head, eyes, and/or hands based on data captured by various sensors of his/her individual AR system.

In one or more embodiments, the AR system may allow the user to "set-up" an avatar and "train" the avatar based on predetermined movements and/or patterns. The user can, for example, simply act out some motions for training purposes. In one or more embodiments, the AR system may perform a reverse kinematics analysis of the rest of user's body, and may create an animation based on the reverse kinematics analysis.

In one or more embodiments, the passable world may also contain information about various avatars inhabiting a space. It should be appreciated that every user may be rendered as an avatar in one embodiment. Or, a user operating an individual AR system from a remote location can create an avatar and digitally occupy a particular space as well. In either case, since the passable world is not a static data structure, but rather constantly receives information, avatar rendering and remote presence of users into a space may be based on the user's interaction with the user's individual AR system. Thus, rather than constantly updating an avatar's movement based on captured keyframes, as captured by cameras, avatars may be rendered based on a user's interaction with his/her individual augmented reality device. Advantageously, this reduces the need for individual AR systems to retrieve data from the cloud, and instead allows the system to perform a large number of computation tasks involved in avatar animation on the individual AR system itself.

More particularly, the user's individual AR system contains information about the user's head pose and orientation in a space, information about hand movement etc. of the user, information about the user's eyes and eye gaze, information about any totems that are being used by the user. Thus, the user's individual AR system already holds a lot of information about the user's interaction within a particular space that is transmitted to the passable world model. This information may then be reliably used to create avatars for the user and help the avatar communicate with other avatars or users of that space. It should be appreciated that in one or more embodiments, third party cameras may not be needed to animate the avatar. Rather, the avatar may be animated based on the user's individual AR system, and then transmitted to the cloud to be viewed/interacted with by other users of the AR system.

In one or more embodiments, the AR system captures a set of data pertaining to the user through the sensors of the AR system. For example, accelerometers, gyroscopes, depth sensors, IR sensors, image-based cameras, etc. may determine a movement of the user relative to the head mounted system. This movement may be computed through the processor and translated through one or more algorithms to produce a similar movement in a chose avatar. The avatar may be selected by the user, in one or more embodiments. Or, in other embodiments, the avatar may simply be selected by another user who is viewing the avatar. Or, the avatar may simply be a virtual, real-time, dynamic image of the user itself.

Based on captured set of data pertaining to the user (e.g., movement, emotions, direction of movement, speed of movement, physical attributes, movement of body parts relative to the head, etc.) a pose of the sensors (e.g., sensors of the individual AR system) relative to the user may be determined. The pose (e.g., position and orientation) allow the system to determine a point of view from which the movement/set of data was captured such that it can be translated/transformed accurately. Based on this information, the AR system may determine a set of parameters related to the user's movement (e.g., through vectors) and animate a desired avatar with the calculated movement.

Any similar method may be used to animate an avatar to mimic the movement of the user. It should be appreciated that the movement of the user and the movement of the avatar (e.g., in the virtual image being displayed at another user's individual AR device) are coordinated such that the movement is captured and transferred to the avatar in as little time as possible. Ideally, the time lag between the captured movement of the user, to the animation of the avatar should be minimal.

For example, if the user is not currently at a conference room, but wants to insert an avatar into that space to participate in a meeting at the conference room, the AR system takes information about the user's interaction with his/her own system and uses those inputs to render the avatar into the conference room through the passable world model. The avatar may be rendered such that the avatar takes the form of the user's own image such that it looks like the user himself/herself is participating in the conference. Or, based on the user's preference, the avatar may be any image chosen by the user. For example, the user may render himself/herself as a bird that flies around the space of the conference room.

At the same time, information about the conference room (e.g., key frames, points, pose-tagged images, avatar information of people in the conference room, recognized objects, etc.) may be rendered as virtual content to the user who is not currently in the conference room. In the physical space, the system may have captured keyframes that are geometrically registered and may then derive points from the captured keyframes. As mentioned before, based on these points, the system may calculate pose and may run object recognizers, and may reinsert parametric geometry into the keyframes, such that the points of the keyframes also have semantic information attached to them. Thus, with all this geometric and semantic information, the conference room may now be shared with other users. For example, the conference room scene may be rendered on the user's table. Thus, even if there is no camera at the conference room, the passable world model, using information collected through prior key frames etc., is able to transmit information about the conference room to other users and recreate the geometry of the room for other users in other spaces.

Topological Map

An integral part of the passable world model is to create maps of very minute areas of the real world. For example, in order to render virtual content in relation to physical objects, very detailed localization is required. Such localization may not be achieved simply through GPS or traditional location detection techniques. For example, the AR system may not only require coordinates of a physical location that a user is in, but may, for example, need to know exactly what room of a building the user is located in. Based on this information, the AR system may retrieve data (e.g., specific geometries of real objects in the room, map points for the room, geometric information of the room, etc.) for that room to appropriately display virtual content in relation to the real objects of the identified room. At the same time, however, this precise, granular localization may be done in a cost-effective manner such that not too many resources are consumed unnecessarily.

To this end, the AR system may use topological maps for localization purposes instead of GPS or retrieving detailed geometric maps created from extracted points and pose tagged images (e.g., the geometric points may be too specific, and hence most costly). In one or more embodiments, the topological map is a simplified representation of physical spaces in the real world that is easily accessible from the cloud and only presents a fingerprint of a space, and the relationship between various spaces. Further details about the topological map will be provided further below.

In one or more embodiments, the AR system may layer topological maps on the passable world model, for example to localize nodes. The topological map can layer various types of information on the passable world model, for instance: point cloud, images, objects in space, global positioning system (GPS) data, Wi-Fi data, histograms (e.g., color histograms of a room), received signal strength (RSS) data, etc. This allows various layers of information (e.g., a more detailed layer of information to interact with a more high-level layer) to be placed in context with each other, such that it can be easily retrieved. This information may be thought of as fingerprint data; in other words, it is designed to be specific enough to be unique to a location (e.g., a particular room).

As discussed above, in order to create a complete virtual world that can be reliably passed between various users, the AR system captures different types of information about the user's surroundings (e.g., map points, features, pose tagged images, objects in a scene, etc.). This information is processed and stored in the cloud such that it can be retrieved as needed. As mentioned previously, the passable world model is a combination of raster imagery, point and descriptors clouds, and polygonal/geometric definitions (referred to herein as parametric geometry). Thus, it should be appreciated that the sheer amount of information captured through the users' individual AR system allows for high quality and accuracy in creating the virtual world.

In other words, since the various AR systems (e.g., user-specific head-mounted systems, room-based sensor systems, etc.) are constantly capturing data corresponding to the immediate environment of the respective AR system, very detailed and accurate information about the real world in any point in time may be known with a high degree of certainty. Although this amount of information is highly useful for a host of AR applications, for localization purposes, sorting through that much information to find the piece of passable world most relevant to the user is highly inefficient and costs precious bandwidth.

To this end, the AR system creates a topological map that essentially provides less granular information about a particular scene or a particular place. In one or more embodiments, the topological map may be derived through global positioning system (GPS) data, Wi-Fi data, histograms (e.g., color histograms of a room), received signal strength (RSS) data, etc. For example, the topological map may be created by histograms (e.g., a color histogram) of various rooms/areas/spaces, and be reduced to a node on the topological map. For example, when a user walks into a room or space, the AR system may take a single image (or other information) and construct a color histogram of the image. It should be appreciated that on some level, the histogram of a particular space will be mostly constant over time (e.g., the color of the walls, the color of objects of the room, etc.). In other words, each room or space has a distinct signature that is different from any other room or place. This unique histogram may be compared to other histograms of other spaces/areas and identified. Now that the AR system knows what room the user is in, the remaining granular information may be easily accessed and downloaded.

Thus, although the histogram will not contain particular information about all the features and points that have been captured by various cameras (keyframes), the system may immediately detect, based on the histogram, where the user is, and then retrieve all the more particular geometric information associated with that particular room or place. In other words, rather than sorting through the vast amount of geometric and parametric information that encompasses that passable world model, the topological map allows for a quick and efficient way to localize the AR user. Based on the localization, the AR system retrieves the keyframes and points that are most relevant to the identified location. For example, after the system has determined that the user is in a conference room of a building, the system may then retrieve all the keyframes and points associated with the conference room rather than searching through all the geometric information stored in the cloud.

Figure 32:
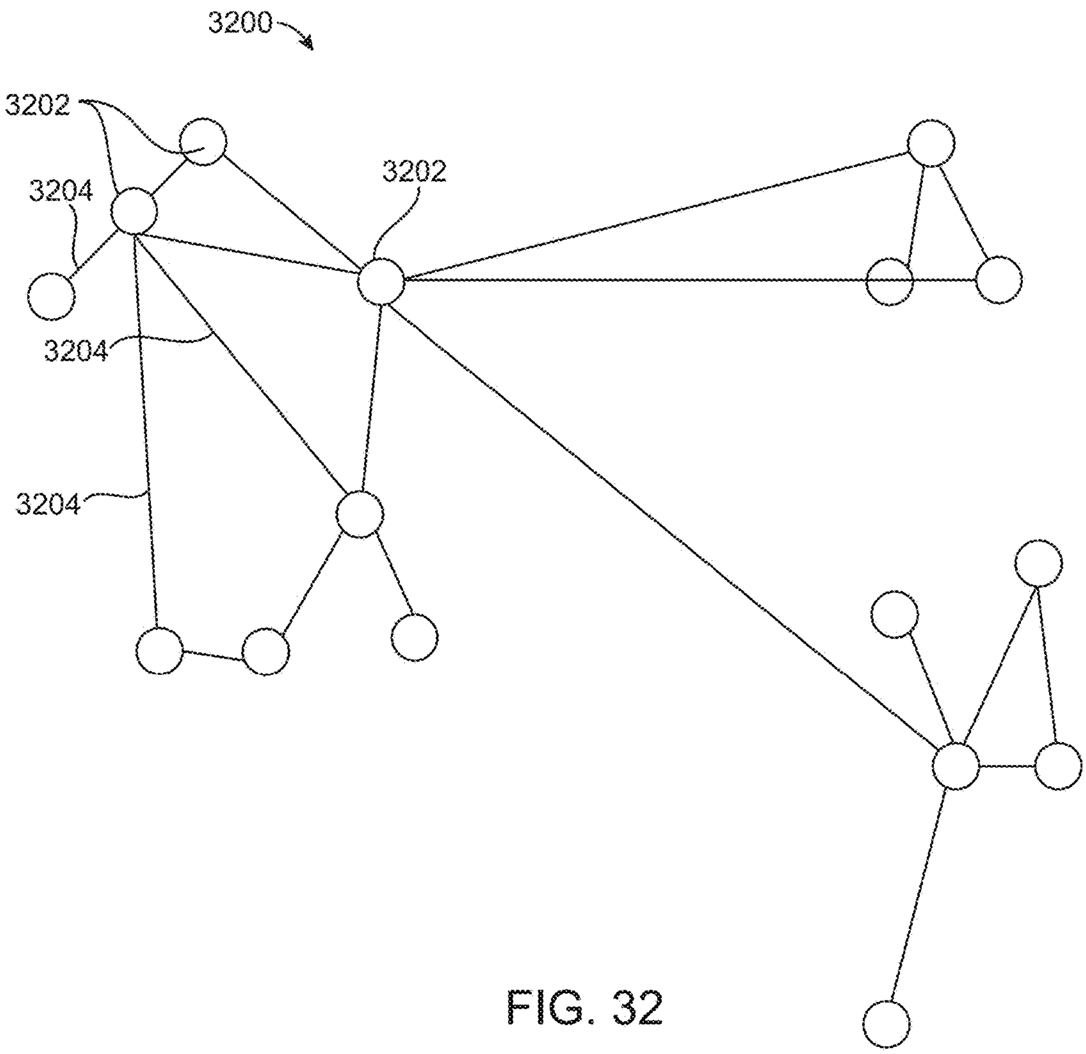
FIG. 32 illustrates an example topological map, according to one embodiment.

Referring now to FIG. 32, an example embodiment of a topological map 3200 is presented. As discussed above, the topological map 3200 may be a collection of nodes 3202 and connections 3204 between the nodes 3202 (e.g., represented by connecting lines). Each node 3202 represents a particular location (e.g., the conference room of an office building) having a distinct signature or fingerprint (e.g., GPS information, color histogram or other histogram, Wi-Fi data, RSS data etc.) and the lines may represent the connectivity between them. It should be appreciated that the connectivity may not have anything to do with geographical connectivity, but rather may simply be a shared device or a shared user. For example, a first user may have walked from a first node to a second node. This relationship may be represented through a connection between the nodes. As the number of AR users increases, the nodes and connections between the nodes will also proportionally increase, providing more precise information about various locations.

Once the AR system has identified a node of the topological map, the system may then retrieve a set of geometric information pertaining to the node to determine how/where to display virtual content in relation to the real objects of that space. Thus, layering the topological map on the geometric map is especially helpful for localization and efficiently retrieving only relevant information from the cloud.

In one or more embodiments, the AR system can represent two images captured by respective cameras of a part of the same scene in a graph theoretic context as first and second pose tagged images. It should be appreciated that the cameras in this context may refer to a single camera taking images of different scenes, or it may be two different cameras. There is some strength of connection between the pose tagged images, which could, for example, be the points that are in the field of views of both of the cameras. In one or more embodiments, the cloud based computer may construct such as a graph (e.g., a topological representation of a geometric world similar to that of FIG. 32). The total number of nodes and edges in the graph is much smaller than the total number of points in the images.

At a higher level of abstraction, other information monitored by the AR system can be hashed together. For example, the cloud based computer(s) may hash together one or more of global positioning system (GPS) location information, Wi-Fi location information (e.g., signal strengths), color histograms of a physical space, and/or information about physical objects around a user. The more points of data there are, the more likely that the computer will statistically have a unique identifier for that space. In this case, space is a statistically defined concept.

As an example, an office may be a space that is represented as, for example a large number of points and two dozen pose tagged images. The same space may be represented topologically as a graph having only a certain number of nodes (e.g., 5, 25, 100, 1000, etc.), which can be easily hashed against. Graph theory allows representation of connectedness, for example as a shortest path algorithmically between two spaces.

Thus, the system abstracts away from the specific geometry by turning the geometry into pose tagged images having implicit topology. The system takes the abstraction a level higher by adding other pieces of information, for example color histogram profiles, and the Wi-Fi signal strengths. This makes it easier for the system to identify an actual real world location of a user without having to understand or process all of the geometry associated with the location.

Figure 33:
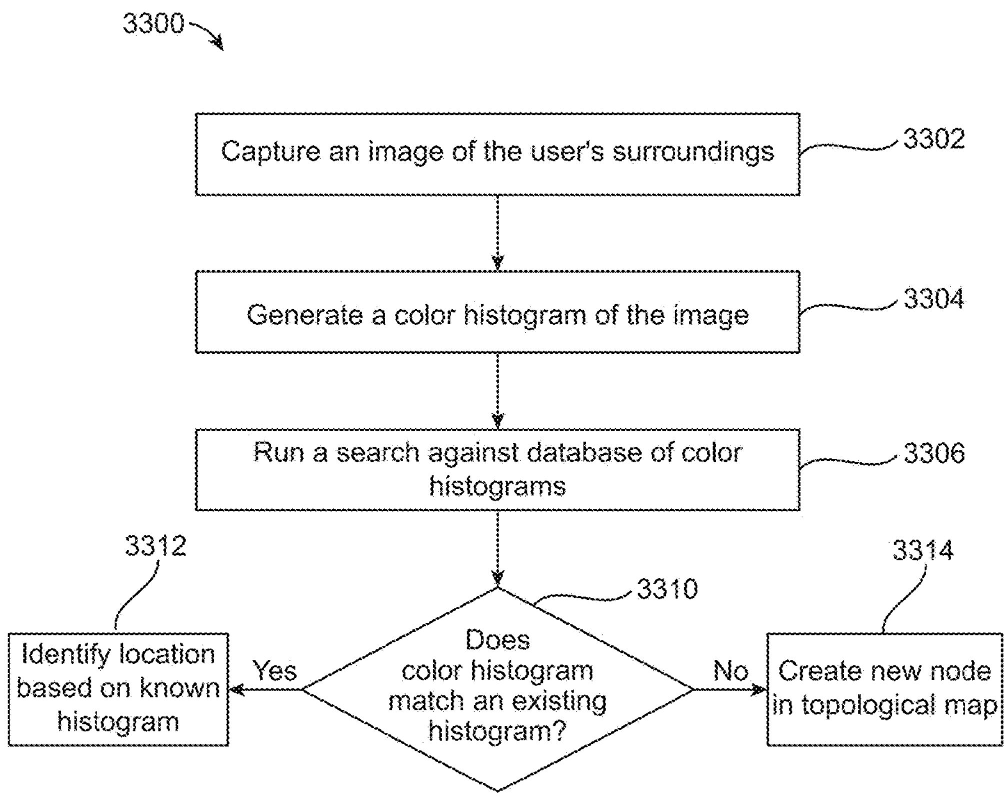
FIG. 33 illustrates a high level flow diagram for a process of localization using the topological map, according to one embodiment.

FIG. 33 illustrates an example method 3300 of constructing a topological map. First, at 3302, the user's individual AR system may capture an image from a first point of view of a particular location (e.g., the user walks into a room of a building, and an image is captured from that point of view). At 3304, a color histogram may be generated based on the captured image. As discussed before, the system may use any other type of identifying information, (e.g., Wi-Fi data, RSS information, GPS data, number of windows, etc.) but the color histogram is used in this example for illustrative purposes.

Next, at 3306, the system runs a search to identify the location of the user by comparing the color histogram to a database of color histograms stored in the cloud. At 3310, a decision is made to determine whether the color histogram matches an existing color histogram stored in the cloud. If the color histogram does not match any color histogram of the database of color histograms, it may then be stored as a node in the topological made 3314. If the color histogram matches an existing color histogram of the database, it is stored as a node in the cloud 3312. If the color histogram matches an existing color histogram in the database, the location is identified, and the appropriate geometric information is provided to the individual AR system.

Continuing with the same example, the user may walk into another room or another location, where the user's individual AR system takes another picture and generates another color histogram of the other location. If the color histogram is the same as the previous color histogram or any other color histogram, the AR system identifies the location of the user. If the color histogram is not the same as a stored histogram, another node is created on the topological map. Additionally, since the first node and second node were taken by the same user (or same camera/same individual user system), the two nodes are connected in the topological map.

In one or more embodiments, the AR system may employ mesh networking localization. The individual AR system has a native knowledge of position. This allows explicit construction of topological maps, with connections weighted by distance, as discussed above. This permits the user of optimal mesh network algorithms by the AR system. Thus, the AR system can optimize mobile communications routing based on its known absolute pose. The AR system can use ultra wide bandwidth (UWB) communications infrastructure for both communications and localization, in addition to the machine vision.

In addition to aiding in localization, the topological map may also be used to improve/fix errors and or missing information in geometric maps. In one or more embodiment, topological maps may be used to find loop-closure stresses in geometric maps or geometric configurations of a particular place. As discussed above, for any given location or space, images taken by one or more AR systems (multiple field of view images captured by one user's individual AR system or multiple users' AR systems) give rise a large number of map points of the particular space. For example, a single room may correspond to thousands of map points captured through multiple points of views of various cameras (or one camera moving to various positions).

The AR system utilizes map points to recognize objects (through object recognizers) as discussed above, and to add to on to the passable world model in order to store a more comprehensive picture of the geometry of various objects of the real world. In one or more embodiments, map points derived from various key frames may be used to triangulate the pose and orientation of the camera that captured the images. In other words, the collected map points may be used to estimate the pose (e.g., position and orientation) of the keyframe (e.g. camera) capturing the image.

It should be appreciated, however, that given the large number of map points and keyframes, there are bound to be some errors (e.g., stresses) in this calculation of keyframe position based on the map points. To account for these stresses, the AR system may perform a bundle adjust. A bundle adjust allows for the refinement, or optimization of the map points and keyframes to minimize the stresses in the geometric map.

Figure 34:
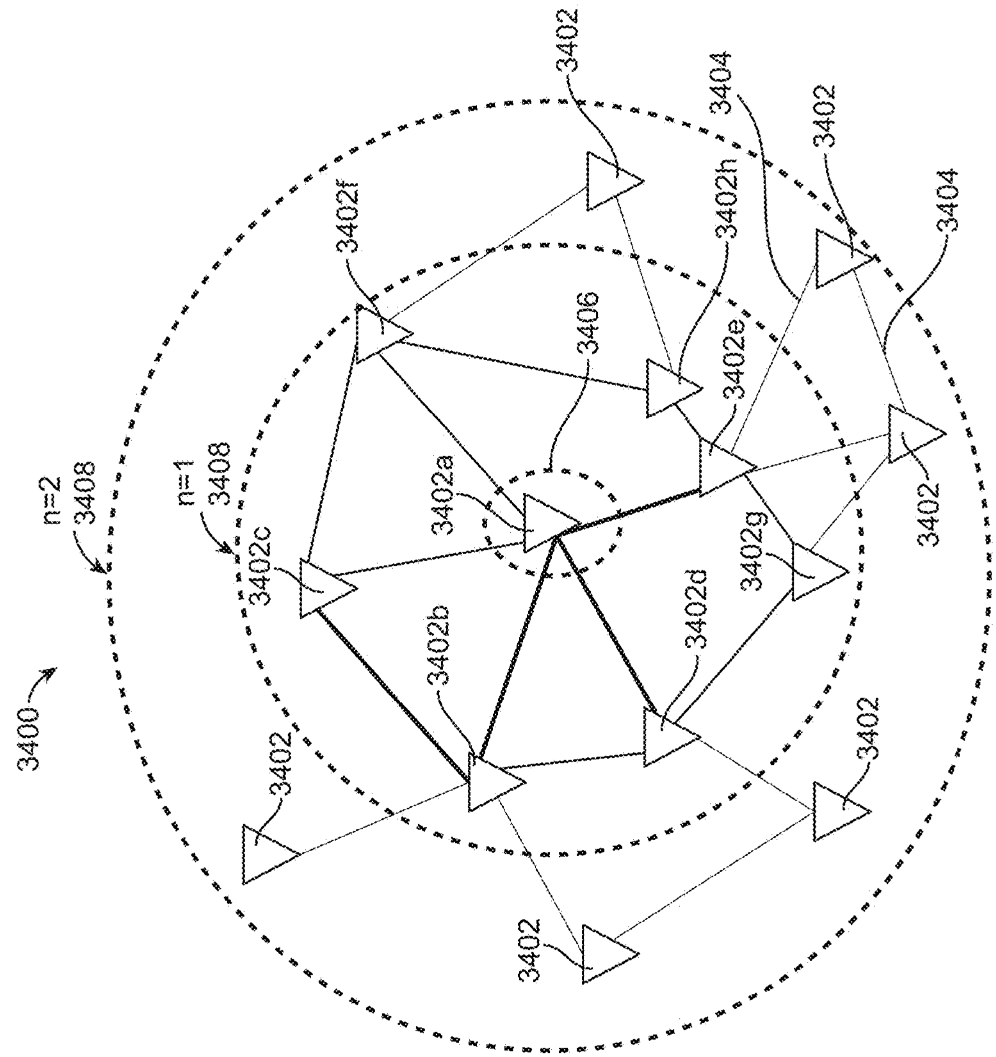
FIG. 34 illustrates a geometric map as a connection between various keyframes, according to one embodiment.

For example, as illustrated in FIG. 34, an example geometric map is presented. As shown in FIG. 34, the geometric map may be a collection of keyframes 3402 that are all connected to each other. The keyframes 3402 may represent a point of view from which various map points are derived for the geometric map. In the illustrated embodiment, each node of the geometric map represents a keyframe (e.g., camera), and the various keyframes are connected to each other through connecting lines 3404.

In the illustrated embodiment, the strength of the connection between the different keyframes is represented by the thickness of the connecting lines 3404. For example, as shown in FIG. 34, the connecting lines between node 3402*a* and 3402*b* is depicted as a thicker connecting line 3404 as compared to the connecting lines between node 3402*a* and node 3402*f*. The connecting lines between node 3402*a* and node 3402*d* is also depicted to be thickener than the connecting line between 3402*b* and node 3402*d*. In one or more embodiments, the thickness of the connecting lines represents the number of features or map points shared between them. For example, if a first keyframe and a second keyframe are close together, they may share a large number of map points (e.g., node 3402*a* and node 3402*b*), and may thus be represented with a thicker connecting line. Of course, it should be appreciated that other ways of representing geometric maps may be similarly used.

For example, the strength of the line may be based on a geographical proximity between the keyframes, in another embodiment. Thus, as shown in FIG. 34, each geometric map represents a large number of keyframes 3402 and their connection to each other. Now, assuming that a stress is identified in a particular point of the geometric map, a bundle adjust may be performed to alleviate the stress by radially pushing the stress out radially out from the identified point of stress 3406. The stress is pushed out radially in waves 3408 (e.g., n=1, n=2, etc.) propagating from the point of stress, as will be described in further detail below.

The following description illustrates an example method of performing a wave propagation bundle adjust. It should be appreciated that all the examples below refer solely to wave propagation bundle adjusts, and other types of bundle adjusts may be similarly used in other embodiments. First, a particular point of stress is identified. In the illustrated embodiment of FIG. 34, consider the center (node 3402*a*) to be the identified point of stress. For example, the system may determine that the stress at a particular point of the geometric map is especially high (e.g., residual errors, etc.). The stress may be identified based on one of two reasons. One, a maximum residual error may be defined for the geometric map. If a residual error at a particular point is greater than the predefined maximum residual error, a bundle adjust may be initiated. Second, a bundle adjust may be initiated in the case of loop closure stresses, as will be described further below (when a topological map indicates mis-alignments of map points).

When a stress is identified, the AR system distributes the error evenly, starting with the point of stress and propagating it radially through a network of nodes that surround the particular point of stress. For example, in the illustrated embodiment, the bundle adjust may distribute the error to n=1 (one degree of separation from the identified point of stress, node 3402*a*) around the identified point of stress. In the illustrated embodiment, nodes 3402*b*-3402*g* are all part of the n=1 wave around the point of stress, node 3402*a*.

In some cases, this may be sufficient. In other embodiments, the AR system may propagate the stress even further, and push out the stress to n=2 (two degrees of separation from the identified point of stress, node 3402*a*), or n=3 (three degrees of separation from the identified point of stress, node 3402*a*) such that the stress is radially pushed out further and further until the stress is distributed evenly. Thus, performing the bundle adjust is an important way of reducing stress in the geometric maps. Ideally, the stress is pushed out to n=2 or n=3 for better results.

In one or more embodiments, the waves may be propagated in even smaller increments. For example, after the wave has been pushed out to n=2 around the point of stress, a bundle adjust can be performed in the area between n=3 and n=2, and propagated radially. By controlling the wave increments, this iterative wave propagating bundle adjust process can be run on massive data to reduce stresses on the system. In an optional embodiment, because each wave is unique, the nodes that have been touched by the wave (e.g., bundle adjusted) may be colored so that the wave does not re-propagate on an adjusted section of the geometric map. In another embodiment, nodes may be colored so that simultaneous waves may propagate/originate from different points in the geometric map.

As mentioned previously, layering the topological map on the geometric map of keyframes and map points may be especially crucial in finding loop-closure stresses. A loop-closure stress refers to discrepancies between map points captured at different times that should be aligned but are mis-aligned. For example, if a user walks around the block and returns to the same place, map points derived from the position of the first keyframe and the map points derived from the position of the last keyframe as extrapolated from the collected map points should ideally be identical. However, given stresses inherent in the calculation of pose (position of keyframes) based on the different map points, there are often errors and the system does not recognize that the user has come back to the same position because estimated key points from the first key frame are not geometrically aligned with map points derived from the last keyframe. This may be an example of a loop-closure stress.

Figure 35:
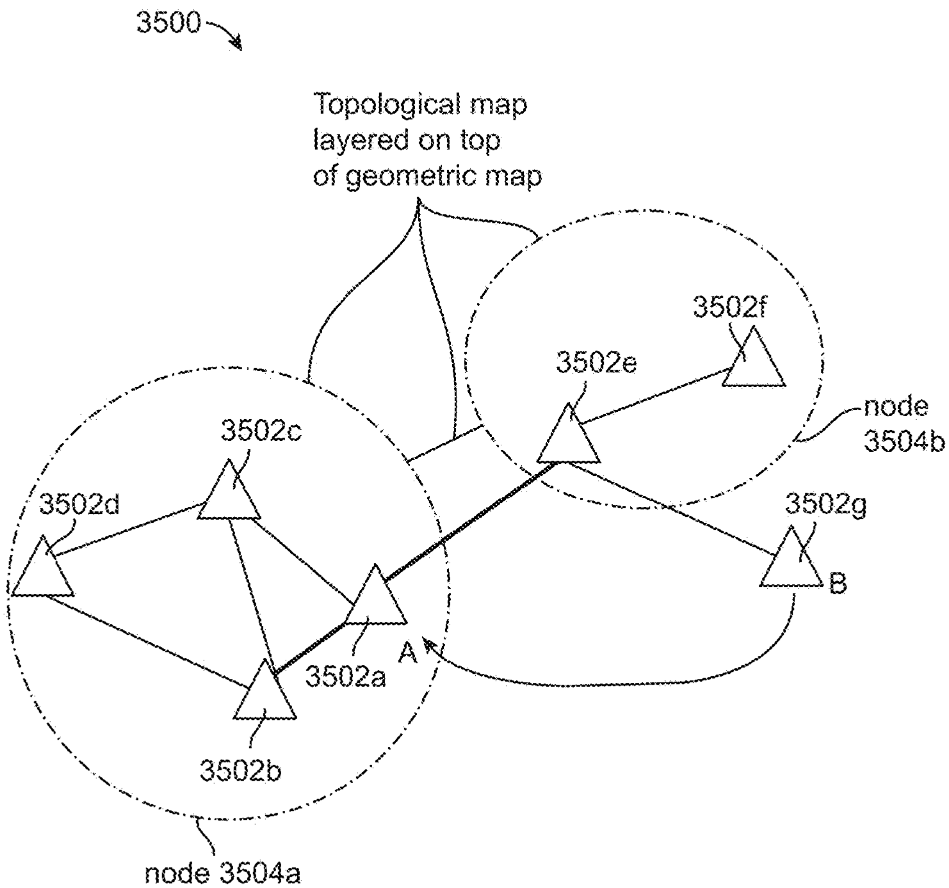
FIG. 35 illustrates an example embodiment of the topological map layered on top of the geometric map, according to one embodiment.

To this end, the topological map may be used to find the loop-closure stresses in a geometric map. Referring back to the previous example, using the topological map along with the geometric map allows the AR system to recognize the loop-closure stresses in the geometric map because the topological map may indicate that the user has come back to the starting point (based on the color histogram, for example). For example, referring to the layered map 3500 of FIG. 35, the nodes of the topological map (e.g., 3504*a* and 3504*b*) are layered on top of the nodes of the geometric map (e.g., 3502*a*-3502*f*). As shown in FIG. 16, the topological map, when placed on top of the geometric map may suggest that keyframe B (node 3502*g*) is the same as keyframe A (node 3502*a*). Based on this, a loop closure stress may be detected, the system detects that keyframes A and B should be closer together in the same node, and the system may then perform a bundle adjust. Thus, having identified the loop-closure stress, the AR system may then perform a bundle adjust on the identified point of stress, using a bundle adjust technique, such as the one discussed above.

It should be appreciated that performing the bundle adjust based on the layering of the topological map and the geometric map ensures that the system only retrieves the keyframes on which the bundle adjust needs to be performed instead of retrieving all the keyframes in the system. For example, if the AR system identifies, based on the topological map that there is a loop-closure stress, the system may simply retrieve the keyframes associated with that particular node or nodes of the topological map, and perform the bundle adjust on only those keyframes rather than all the keyframes of the geometric map. Again, this allows the system to be efficient and not retrieve unnecessary information that might unnecessarily tax the system.

Figure 36:
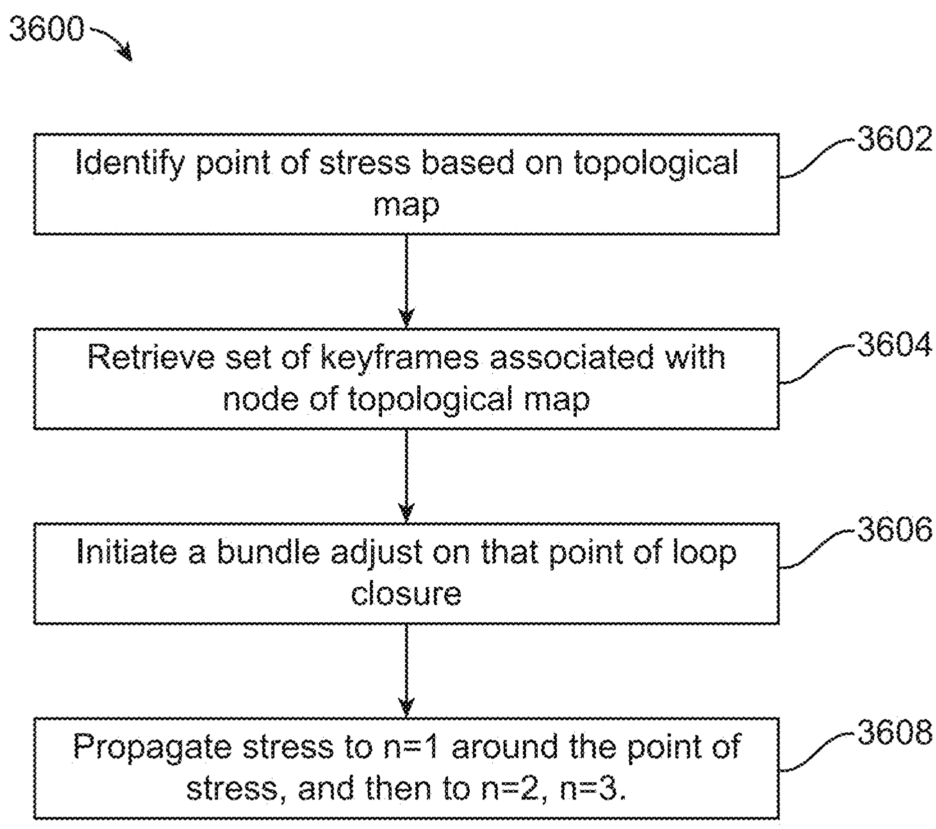
FIG. 36 illustrates a high level flow diagram for a process of performing a wave propagation bundle adjust, according to one embodiment.

Referring now to FIG. 36, an example method 3600 for correcting loop-closure stresses based on the topological map is described. At 3602, the system may identify a loop closure stress based on a topological map that is layered on top of a geometric map. Once the loop closure stress has been identified, at 3604, the system may retrieve the set of key frames associated with the node of the topological map at which the loop closure stress has occurred. After having retrieved the key frames of that node of the topological map, the system may, at 3606, initiate a bundle-adjust on that point in the geometric map. At 3608, the stress is propagated away from the identified point of stress and is radially distributed in waves, to n=1 (and then n=2, n=3, etc.) similar to the technique shown in FIG. 34.

In mapping out the virtual world, it is important to know all the features and points in the real world to accurately portray virtual objects in relation to the real world. To this end, as discussed above, map points captured from various head-worn AR systems are constantly adding to the passable world model by adding in new pictures that convey information about various points and features of the real world. Based on the points and features, as discussed above, one can also extrapolate the pose and position of the keyframe (e.g., camera, etc.). While this allows the AR system to collect a set of features (2D points) and map points (3D points), it may also be important to find new features and map points to render a more accurate version of the passable world.

One way of finding new map points and/or features may be to compare features of one image against another. Each feature may have a label or feature descriptor attached to it (e.g., color, identifier, etc.). Comparing the labels of features in one picture to another picture may be one way of uniquely identifying natural features in the environment. For example, if there are two keyframes, each of which captures about 500 features, comparing the features of one keyframe with the other may help determine new map points. However, while this might be a feasible solution when there are just two keyframes, it becomes a very large search problem that takes up a lot of processing power when there are multiple keyframes, each of which captures millions of points. In other words, if there are M keyframes, each having N unmatched features, searching for new features involves an operation of $MN^2$ ($O(MN^2)$). Unfortunately, this is a very large search operation.

Figure 37:
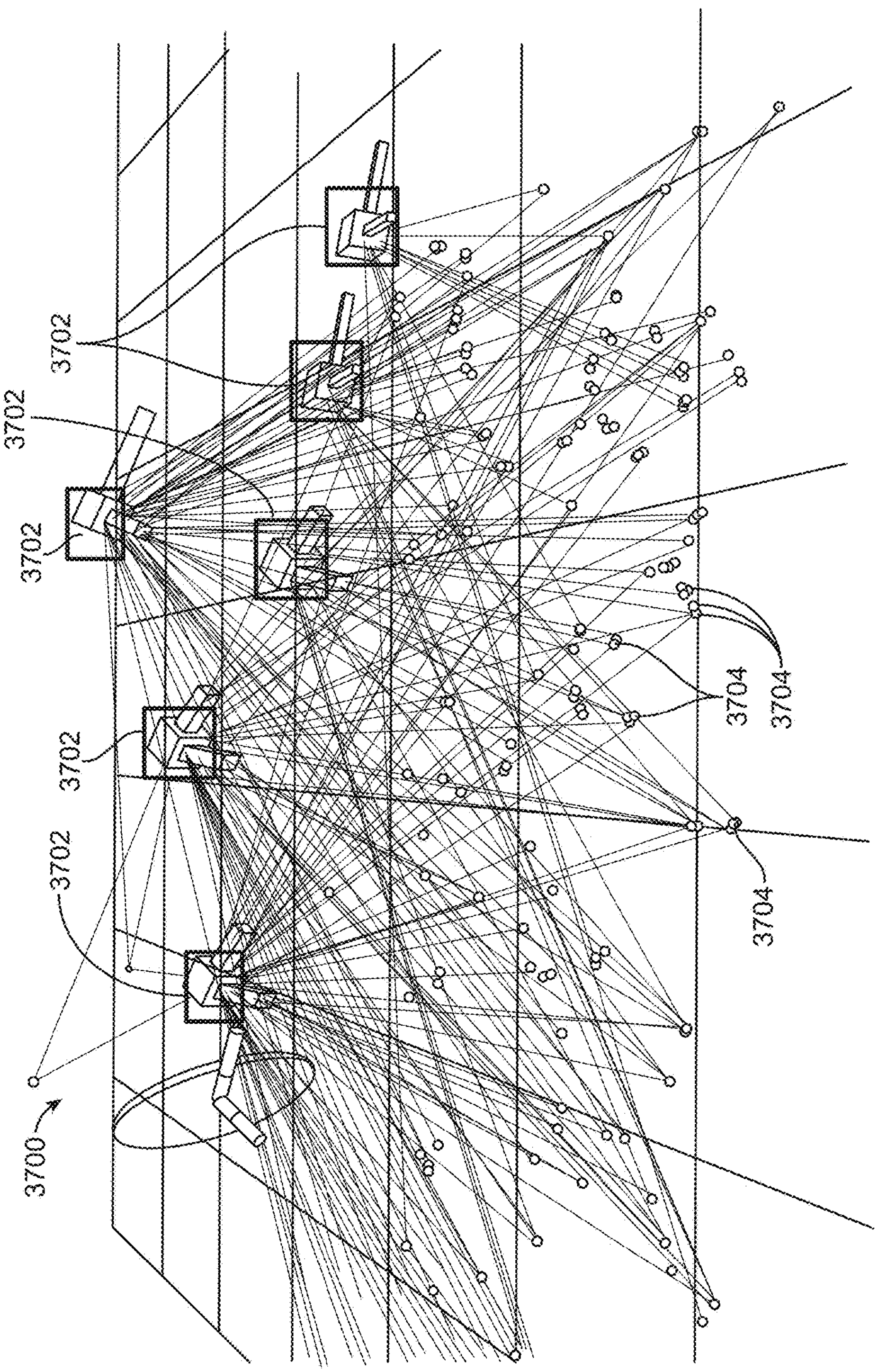
FIG. 37 illustrates map points and render lines from the map points to the keyframes as seen through a virtual keyframe, according to one embodiment.

One approach to find new points that avoids such a large search operation is by render rather than search. In other words, assuming the position of M keyframes are known and each of them has N points, the AR system may project lines (or cones) from N features to the M keyframes to triangulate a 3D position of the various 2D points. Referring now to FIG. 37, in this particular example, there are 6 keyframes 3702, and lines or rays are rendered (using a graphics card) from the 6 keyframes to the points 3704 derived from the respective keyframe. In one or more embodiments, new 3D map points may be determined based on the intersection of the rendered lines. In other words, when two rendered lines intersect, the pixel coordinates of that particular map point in a 3D space may be 2 instead of 1 or 0. Thus, the higher the intersection of the lines at a particular point, the higher the likelihood is that there is a map point corresponding to a particular feature in the 3D space. In one or more embodiments, this intersection approach, as shown in FIG. 37 may be used to find new map points in a 3D space.

It should be appreciated that for optimization purposes, rather than rendering lines from the keyframes, triangular cones may instead be rendered from the keyframe for more accurate results. The triangular cone is projected such that a rendered line to the N feature (e.g., 3704) represents a bisector of the triangular cone, and the sides of the cone are projected on either side of the Nth feature. In one or more embodiments, the half angles to the two side edges may be defined by the camera's pixel pitch, which runs through the lens mapping function on either side of the Nth feature.

The interior of the cone may be shaded such that the bisector is the brightest and the edges on either side of the Nth feature may be set of 0. The camera buffer may be a summing buffer, such that bright spots may represent candidate locations of new features, but taking into account both camera resolution and lens calibration. In other words, projecting cones, rather than lines may help compensate for the fact that certain keyframes are farther away than others that may have captured the features at a closer distance In this approach, a triangular cone rendered from a keyframe that is farther away will be larger (and have a large radius) than one that is rendered from a keyframe that is closer. A summing buffer may be applied in order to determine the 3D map points (e.g., the brightest spots of the map may represent new map points).

Essentially, the AR system may project rays or cones from a number of N unmatched features in a number M prior key frames into a texture of the M+1 keyframe, encoding the keyframe identifier and feature identifier. The AR system may build another texture from the features in the current keyframe, and mask the first texture with the second. All of the colors are a candidate pairing to search for constraints. This approach advantageously turns the $O(MN^2)$ search for constraints into an O(MN) render, followed by a small O((<M)N(<<N)) search.

In another approach, new map points may be determined by selecting a virtual keyframe from which to view the existing N features. In other words, the AR system may select a virtual key frame from which to view the map points. For instance, the AR system may use the above keyframe projection, but pick a new "keyframe" based on a PCA (Principal component analysis) of the normals of the M keyframes from which {M,N} labels are sought (e.g., the PCA-derived keyframe will give the optimal view from which to derive the labels).

Performing a PCA on the existing M keyframes provides a new keyframe that is most orthogonal to the existing M keyframes. Thus, positioning a virtual key frame at the most orthogonal direction may provide the best viewpoint from which to find new map points in the 3D space. Performing another PCA provides a next most orthogonal direction, and performing a yet another PCA provides yet another orthogonal direction. Thus, it can be appreciated that performing 3 PCAs may provide an x, y and z coordinates in the 3D space from which to construct map points based on the existing M key frames having the N features.

Figure 38:
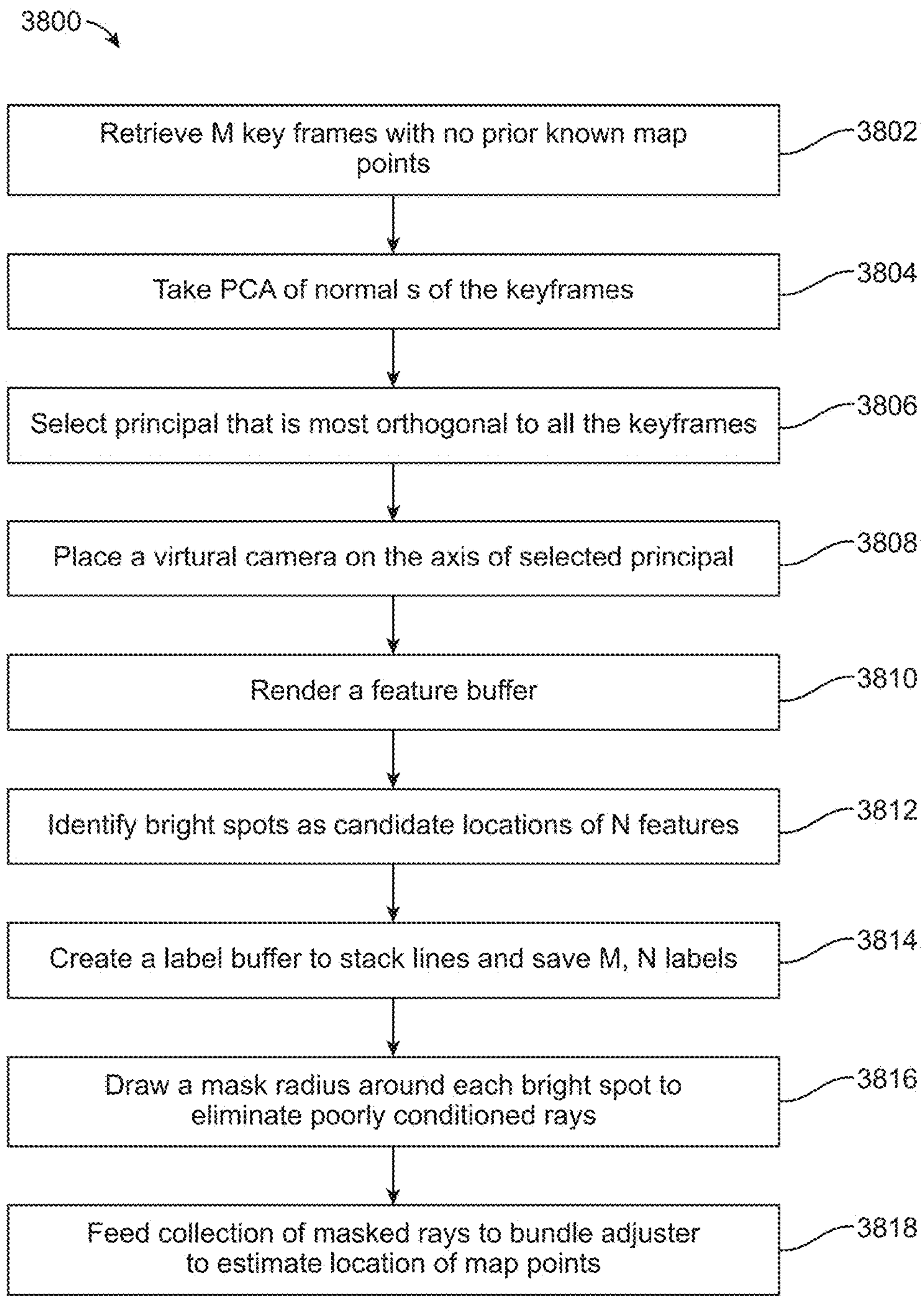
FIG. 38 illustrates a high level flow diagram for a process of finding map points based on render rather than search, according to one embodiment.

FIG. 38 describes an example method 3800 for determining map points from M known keyframes. First, at 3802, the AR system retrieves M keyframes associated with a particular space. As discussed above, M keyframes refers to known keyframes that have captured the particular space. Next, at 3804, a PCA of the normal of the keyframes is performed to find the most orthogonal direction of the M key frames. It should be appreciated that the PCA may produce three principals each of which is orthogonal to the M key frames. Next, at 3806, the AR system selects the principal that is smallest in the 3D space, and is also the most orthogonal to the view of all the M keyframes.

At 3808, after having identified the principal that is orthogonal to the keyframes, a virtual keyframe may be placed along the axis of the selected principal. In one or more embodiments, the virtual keyframe may be placed far away enough so that its field of view includes all the M keyframes.

Next, at 3810, the AR system may render a feature buffer, such that rays (or cones) are rendered from each of the M key frames to the Nth feature. The feature buffer may be a summing buffer, such that the bright spots (pixel coordinates at which lines N lines have intersected) represent candidate locations of N features. It should be appreciated that the same process described above may be repeated with all three PCA axes, such that map points are found on x, y and z axes.

Next, at 3812 the system may store all the bright spots in the image as virtual "features". Next, at 3814, a second "label" buffer may be created at the virtual keyframe to stack the lines (or cones) and to save their {M, N} labels. Next, at 3816, a "mask radius" may be drawn around each bright spot in the feature buffer. It should be appreciated that the mask radius represents the angular pixel error of the virtual camera. The AR system may fill the resulting circles around each bright spot, and mask the label buffer with the resulting binary image. In an optional embodiment, the circles may be filled by applying a gradient filter such that the center of the circles are bright, but the brightness fades to zero at the periphery of the circle.

In the now-masked label buffer, the principal rays may be collected using the {M, N}-tuple label of each triangle. It should be appreciated that if cones/triangles are used instead of rays, the AR system may only collect triangles where both sides of the triangle are captured inside the circle. Thus, the mask radius essentially acts as a filter that eliminates poorly conditioned rays or rays that have a large divergence (e.g., a ray that is at the edge of a field of view (FOV) or a ray that emanates from far away).

For optimization purposes, the label buffer may be rendered with the same shading as used previously in generated cones/triangles). In another optional optimization embodiment, the triangle density may be scaled from one to zero instead of checking the extents (sides) of the triangles. Thus, rays that are very divergent will effectively raise the noise floor inside a masked region. Running a local threshold-detect inside the mark will trivially pull out the centroid from only those rays that are fully inside the mark.

At 3818, the collection of masked/optimized rays m may be fed to a bundle adjuster to estimate and/or correct the location of the newly-determined map points. It should be appreciated that this system is functionally limited to the size of the render buffers that are employed. For example, if the keyframes are widely separated, the resulting rays/cones will have a lower resolution.

In an alternate embodiment, rather than using PCA analysis to find the orthogonal direction, the virtual key frame may be placed at the location of one of the M key frames. This may be a simpler and more effective solution because the M key frames may have already captured the space at the best resolution of the camera. If PCAs are used to find the orthogonal directions at which to place the virtual keyframes, the process above is repeated by placing the virtual camera along each PCA axis and finding map points in each of the axes.

In yet another example method of finding new map points, the AR system may hypothesize new map points. The AR system may retrieve the first three principal components from a PCA analysis on M keyframes. Next, a virtual keyframe may be placed at each principal. Next, a feature buffer may be rendered exactly as discussed above at each of the three virtual keyframes. Since the principal components are by definition orthogonal to each other, rays drawn from each camera outwards may hit each other at a point in 3D space.

It should be appreciated that there may be multiple intersections of rays in some instances. Thus, there may now be N features in each virtual keyframe. Next, a geometric algorithm may be used to find the points of intersection between the different rays. This geometric algorithm may be a constant time algorithm because there may be $N^3$ rays. Masking and optimization may be performed in the same manner described above to find the map points in 3D space.

In one or more embodiments, the AR system may stitch separate small world model segments into larger coherent segments. This may occur on two levels: small models and large models. Small models correspond to a local user level (e.g., on the computational component, for instance belt pack). Large models, on the other hand, correspond to a large scale or system-wide level (e.g., cloud system) for "entire world" modeling. This can be implemented as part of the passable world model concept.

For example, the individual AR system worn by a first user captures information about a first office, while the individual AR system worn by a second user captures information about a second office that is different from the first office. The captured information may be passed to cloud-based computers, which eventually builds a comprehensive, consistent, representation of real spaces sampled or collected by various users walking around with individual AR devices. The cloud based computers build the passable world model incrementally, via use over time. It is anticipated that different geographic locations will build up, mostly centered on population centers, but eventually filling in more rural areas.

The cloud based computers may, for example, perform a hash on GPS, Wi-Fi, room color histograms, and caches of all the natural features in a room, and places with pictures, and generate a topological graph that is the topology of the connectedness of things, as described above. The cloud-based computers may use topology to identify where to stitch the regions together. Alternatively, the cloud based computers could use a hash of features (e.g., the topological map), for example identifying a geometric configuration in one place that matches a geometric configuration in another place.

In one or more embodiments, the AR system may simultaneously or concurrently employ separate occlusion, depth, and color display or rendering.

For example, the individual AR system may have a color rendering module (e.g., LCD, DLP, LCOS, fiber scanner projector, etc.) that gives spatial color and a spatial backlight which can selectively illuminate parts of color mechanism. In one or more embodiments, the individual AR system may employ a time sequential approach. For example, the individual AR system may produce or load one color image, then step through different regions of the image and selectively illuminate the regions.

In conjunction with selective illumination, the individual AR system can operate a variable focal element that changes the actual perceived depth of the light. The variable focal element may shape the wave front, for example, synchronously with a backlight. The individual AR system may render color, for instance at 60 frames per second. For every one of those frames, the individual AR system can have six frames that are rendered during that period of time that are selectively illuminating one portion of the background. The individual AR system renders all the light in the background in the 60th of a second. This approach advantageously allows rendering of various pieces of an image at different depths.

Most often, a person's head faces forward. The AR system may infer hip orientation using a low pass filter that identifies a direction in which a user's head is pointing and/or by detecting motion relative to the real world or ambient environment. In one or more embodiments, the AR system may additionally or alternatively employ knowledge of an orientation of hands. There is a statistical correlation between these body parts and the hip location and/or hip orientation. Thus, the AR system can infer a hip coordinate frame without using instrumentation to detect hip orientation.

In one or more embodiments, the AR system can use the hip coordinate frame as a virtual coordinate frame to which virtual content is rendered. This may constitute the most general class. The AR system may render virtual objects around the hip coordinate frame like a home screen (e.g., a social networking screen rendered on one part of the user's view, a video screen rendered on another part of the user's view, etc.).

In a world-centric coordinate frame, virtual content (e.g., virtual objects, virtual tools, and other virtual constructs, for instance applications, features, characters, text and other symbols) is fixed with respect to objects of the real world, rather than being fixed to a coordinate frame oriented around the user.

In some implementations, the AR system blends multiple levels of depth data into a single color frame, for example exploiting the timing characteristics of the LCD display. For example, the AR system may pack six depth layers of data into one single red/green/blue (RGB) frame.

Depth in color space may be achieved by, for example, manipulating depth frames by encoding a Z-buffer in color space. The AR system may encode depth planes as layer-masks in individual color channels.

In one or more embodiments, this may be implemented using standard graphic cards to create a custom shader that renders a single frame that has an RGB frame and the z distance. Thus, the encoded z-buffer may be used to generate volumetric information and determine the depth of the image. A hardware component may be used to interpret the frame buffer and the encoded z-buffer. This means that the hardware and software portions are completely abstracted and that there is minimal coupling between the software and hardware portions.

The AR system may render virtual content locked to various reference frames, as discussed above. For example, where the AR system includes a head worn component, a view locked reference head-mounted (HMD) frame may be useful. That is, the reference frame stays locked to a reference frame of the head, turning and/or tilting with movement of the head. A body locked reference frame is locked to a reference frame of the body, essentially moving around (e.g., translating, rotating) with the movement of the user's body. A world locked reference frame is fixed to a reference frame of the environment and remains stationary within environment. For example, a world locked reference frame may be fixed to a room, wall or table.

In some implementations, the AR system may render virtual content with portions locked to respective ones of two or more reference frames. For example, the AR system may render virtual content using two or more nested reference frames. For instance, the AR system may employ a spherical paradigm. As an example, an inner-most sphere extending to a first radial distance may be locked to a head or view reference frame. Radially outward of the inner-most sphere, an intermediate sphere (e.g., slightly-less than arm's length) may be locked to a body reference frame. Radially outward of the intermediate sphere, an outer or an outer-most sphere (e.g., full arm extension) may be locked to a world reference frame.

As previously noted, the AR system may statistically or otherwise infer actual pose of a body or portion thereof (e.g., hips, hands). For instance, the AR system may select or use the user's hips as a coordinate frame. The AR system statistically infers where the hips are (e.g., position, orientation) and treats that pose as a persistent coordinate frame. As a user moves their head (e.g., rotate, tilt), the AR system renders virtual content (e.g., virtual objects, virtual tools, and other virtual constructs, for instance applications, features, characters, text, digits and other symbols) which are locked to the pose of the user's hips. This can advantageously dramatically increase the virtual field of view. If the user moves their head to look around, the user can see virtual content that is tied around the user's body. That is, the AR system can use a body centered coordinate frame for rendering, e.g., render virtual content with respect to the hip coordinate frame and the virtual content stays locked in the user's field of view no matter how the user's head moves.

Predictive Head Model

In one or more embodiments, the AR system may use information from one or more of actual feature tracker, gyros, accelerometers, compass and other sensors to predict head movement direction, speed and/or acceleration. It takes a certain amount of time to render a frame of virtual content for the rendering engine. The AR system may use various structures or components for rendering frames of virtual content. For example, the AR system may employ a fiber scan projector. Alternatively, the AR system may employ a low persistence display. The AR system may cause flashing of the frame, for example via a backlight. The AR system could use an LCD, for instance, quickly flash the LCD with a very bright backlight, to realize an extremely low persistence display that does not scan through the rasterization. In other words, the AR system gets the pixels in line, and then flashes the LCD with a very bright light for a very short duration.

In some implementations, the AR system may render frames to the world coordinate system, allowing the frame scanning projector (FSP) to scan in the world coordinates and sample the frames. Further details on predictive head modeling are disclosed in U.S. patent application Ser. No.

14/212,961, entitled "DISPLAY SYSTEMS AND METHOD," filed on Mar. 14, 2014 under, which is herein incorporated by reference in its entirety.

Ambient light is sometimes a problem for AR systems because it may affect a quality of projection of virtual content to the user. Typically, AR systems have little or no control over the entry of ambient light. Thus there is typically little or no control over how the ambient environment appears where an AR system is used in a real world environment. For instance, ambient light conditions over an entire scene may be overly bright or overly dim. Also for instance, light intensity may vary greatly throughout a scene. Further, there is little or no control over the physical objects that appear in a scene, some of which may be sources of light (e.g., luminaries, windows) or sources of reflection. This can cause rendered virtual content (e.g., virtual objects, virtual tools, and other virtual constructs, for instance applications, features, characters, text and other symbols) difficult to perceive by the AR user.

In one or more embodiments, the AR system may automatically identify relatively dark and/or relatively bright area(s) in an ambient environment. Based on the identified dark and/or bright areas, the AR system may render virtual content (e.g., virtual text, digits or other symbols) at relatively dark places in the AR user's field of vision in order to address occlusion issues. In this way, the AR system renders virtual content in a manner such that it is best visible to the AR user in view of the ambient environment.

In one or more embodiments, the AR system may additionally or alternatively optimize rendered virtual content based at least in part on one or more characteristics of the particular ambient environment. The AR system may render virtual content to accommodate for aspects of the ambient environment, in some embodiments. For instance, if a wall is relatively light, the AR system may render text that will appear superimposed on the door as dark text. Or, in another instance, virtual content may be dynamically altered (e.g., darkened, lightened, etc.) based on the detected light of the ambient environment.

Typically, it may be difficult for the AR system to render black. However, the AR system may be able to render white or other colors. If a scene includes a white physical wall, then the AR system will render text, digits, and/or other symbols that can be seen against the white background. For example, the AR system may render a color halo about the text, digits or other symbols, allowing the white wall to shine through. If a scene includes a black or dark colored wall, the AR system may render the text, digits, other symbols in a relatively light color. Thus, the AR system adjusts visual properties of what is being rendered based on characteristics of the ambient background.

Image Based Lighting Solutions

In order to create convincing realism in the virtual content (e.g., virtual objects, virtual tools, and other virtual constructs, for instance applications, features, characters, text, digits and other symbols) in augmented reality, it is advantageous to emulate the lighting system incident to the environment in which it is super-imposed. The classic Lambertian lighting model does not illuminate an object in the way that people are used to seeing in the real, natural world. The lighting in a real world environment is a complex system that is constantly and continuously changing throughout the space, rich with both dramatic contrasts and subtle nuances of intensity and color. The eye is used to seeing this in the real world. The Lambertian lighting model does not capture these nuances, and the human visual perception system notices the missing lighting effects, thereby destroying the illusion of realism.

In one or more embodiments, a technique called Image Based Lighting (IBL) may be effective in creating realism in computer graphics (CG). IBL does not attempt to compute a complex lighting system the way the radiosity solution does, but rather captures real world lighting photographically with light probes. A technique termed the "silver sphere light probe" technique is effective in capturing the complex colors reflected toward the viewer; however 360 degree cameras are able to capture higher fidelity of data of the entire environment, creating much more convincing light maps.

In one or more embodiments, IBL techniques may be used to render virtual content that appears indistinguishable from real objects. Modeling packages such as Maya®, utilize libraries of IBL light maps, from which the user can choose to illuminate a particular virtual scene. The user chooses a light map from the library that seems consistent with the content of the scene. Thus, it is possible to create realism from IBL, without the light map being identical to the environment in which the light map is used, if the light map is simply similar to the environment. This suggests that it is the subtle nuances in the lighting that the human visual perception system expects to see on the object. If those nuances are inconsistent with the environment, they may interfere with creating an illusion of reality.

One solution to employ IBL in an AR system is to supply a vast library of sample light maps created by photography, covering many different environments to encompass a wide variety of potential situations. Each of the light maps may be associated with various light parameters specific to the identified situation. The light maps could be stored in the cloud and referenced as needed to illuminate various items or instances of virtual content. In such an implementation, it would be advantageous to automate the selection of light map for a particular real world environment.

The user's individual AR system is already equipped with one or more cameras (e.g., outward facing cameras), and photographically samples the environment in which the user is located. The AR system may use the captured image data as map selection criteria. Samples from the cameras can be used to heuristically search a library of light maps, and find the closest approximation light map. The AR system may use a variety of parameters, for example frequency data, color palette, dynamic range, etc., The AR system may compare the parameters of the captured visual data against the library light maps and find the light map with the least error.

Figure 39:
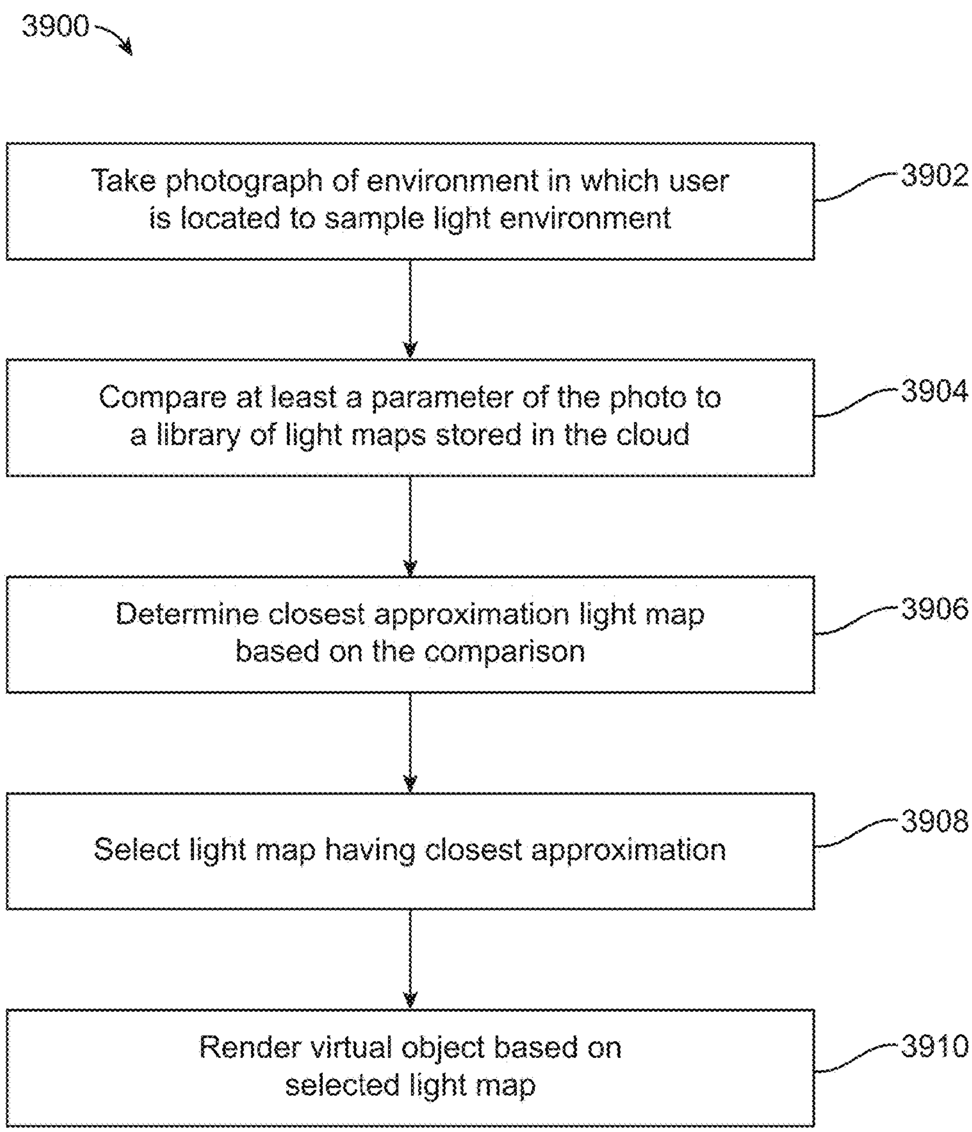
FIG. 39 illustrates a high level flow diagram for a process of rendering a virtual object based on a light map, according to one embodiment.

Referring now to FIG. 39, an example method 3900 of selecting an appropriate light map is provided. At 3902, the user's individual AR system captures an image of the ambient surrounding through the user's cameras. Next, the system selects at least one parameter of the captured image data to compare against the library of light maps. For example, the system may compare a color palette of the captured image against the library of light maps. At 3904, the system compares the parameter of the captured image against the parameters of the light maps, determines a closest approximation of the parameter (3906) and selects a light map having the closest approximation (3908). The system selects the closest approximation, and renders the virtual object based on the selected light map, at 3910.

Alternatively, or additionally, a selection technique utilizing artificial neural networks may be used. The AR system may use a neural network trained on the set or library of light maps. The neural network uses the selection criteria data as input, and produces a light map selection as output. After the neural network is trained on the library, the AR system presents the real world data from the user's camera to the neural network, and the neural network selects the light map with the least error from the library, either instantly or in real-time.

This approach may also allow for modification of a light map. Regardless of whether the selection is done heuristically or with a neural network, the selected light map will have error compared to the input samples in the criteria data. If the selected light map is, for example, close in frequency data and dynamic range, but the color palette contains excessive error, the AR system may modify the color palette to better align with the color palette of the real world sampled data, and may construct a modified light map from the new constituency data.

The AR system may also combine data from multiple light maps that were identified as near solutions to produce a newly constructed light map. In one or more embodiments, the AR system can then store the newly constructed map as a new entry in the library for future selection. If neural net selection is used, this would require re-training the neural network in the cloud on the augmented set or library. However, the re-training may be brief because the new additions may only require minor adjustments to one or more network weights utilized by the neural network.

Figure 40:
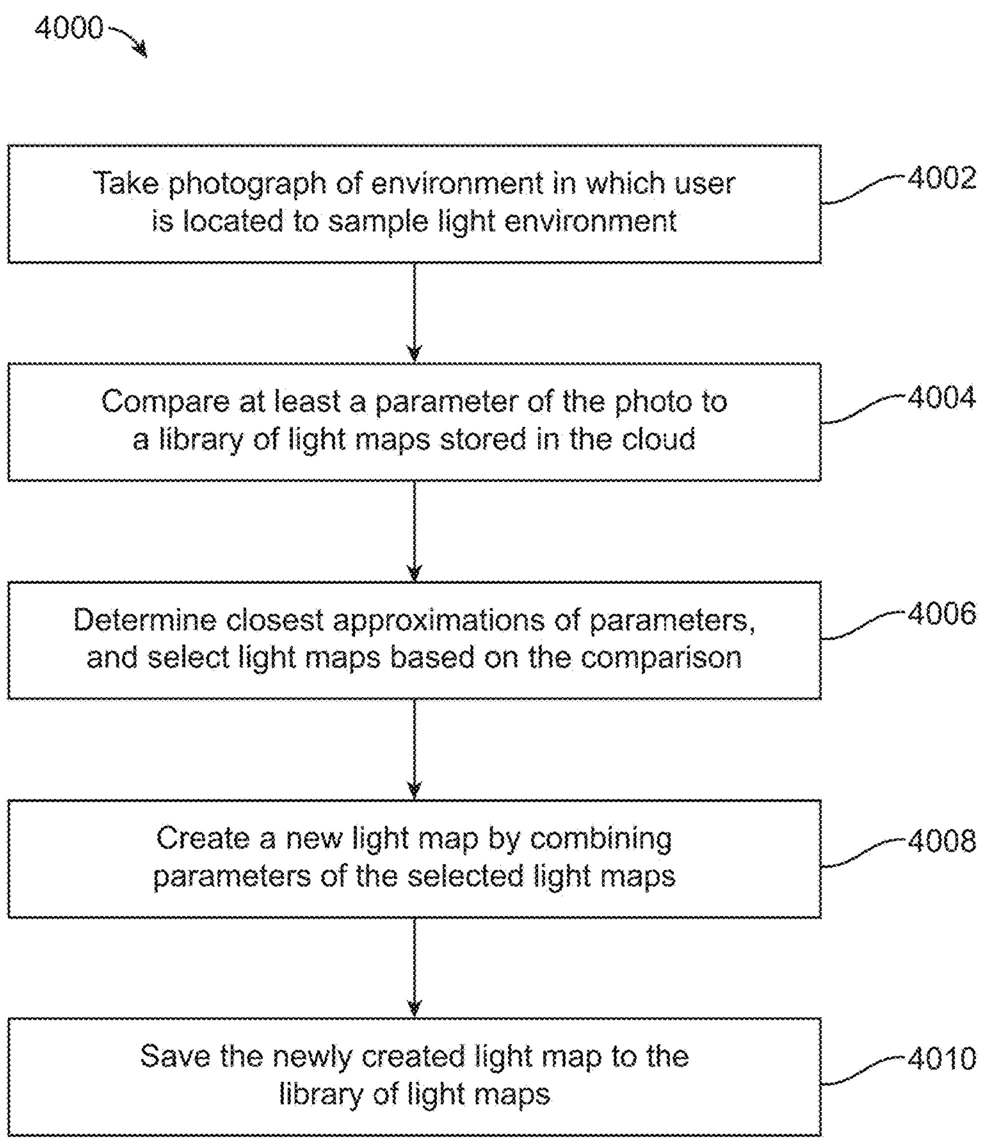
FIG. 40 illustrates a high level flow diagram for a process of creating a light map, according to one embodiment.

FIG. 40 illustrates an example method 4000 for creating a light map. First, at 4002, the user's individual AR system captures an image of the ambient surroundings through the user's cameras. Next, the system selects at least one parameter of the captured image data to compare against the library of light maps. For example, the system may compare a color palette of the captured image against the library of light maps. Next, at 4004 the system compares the parameter of the captured image against the parameters of the light maps, determines one or more closest approximation of the parameters (4006), and selects light maps corresponding to the closest approximations.

For example, the light map may be selected based on a light intensity detected from the captured image. Or, the light map may compare a brightness, or gradient of brightness, or pattern of brightness in the image, and use that information to select the closest approximation. At 4008, the system constructs a new light map by combining parameters of the selected light maps. Next, at 4010, the new light map is added to the library of light maps.

Another approach to supplying appropriate light maps for IBL applications is to use the user's AR device (e.g., head worn component) itself as a light probe to create the IBL light map from scratch. As previously noted, the device is equipped with one or more cameras. The camera(s) can be arranged and/or oriented to capture images of the entire 360 degree environment, which can be used to create a usable light map in situ. Either with 360 degree cameras or with an array of narrow angle cameras stitched together, the AR system may be used as a light probe, operating in real time to capture a light map of the actual environment, not just an approximation of the environment.

Although the captured light map is centric to the user's position, it may be sufficient to create a "convincing enough" object light map. In such a situation, the error is inversely proportional to the level of scrutiny it is subjected to. That is, a far-away object will exhibit a high amount of error using a user-centric light map, but the user's visual perception system will be in a poor position to detect that error due to the distance from the eye being relatively large. Whereas, the closer the user is to the object, the more keen the user's visual perception system is to detect error, but at the same time, the more accurate the light map will be, as the user's head approaches a position of the object. While this may be sufficient in many situations, a technique to address that error is discussed below.

Figure 41:
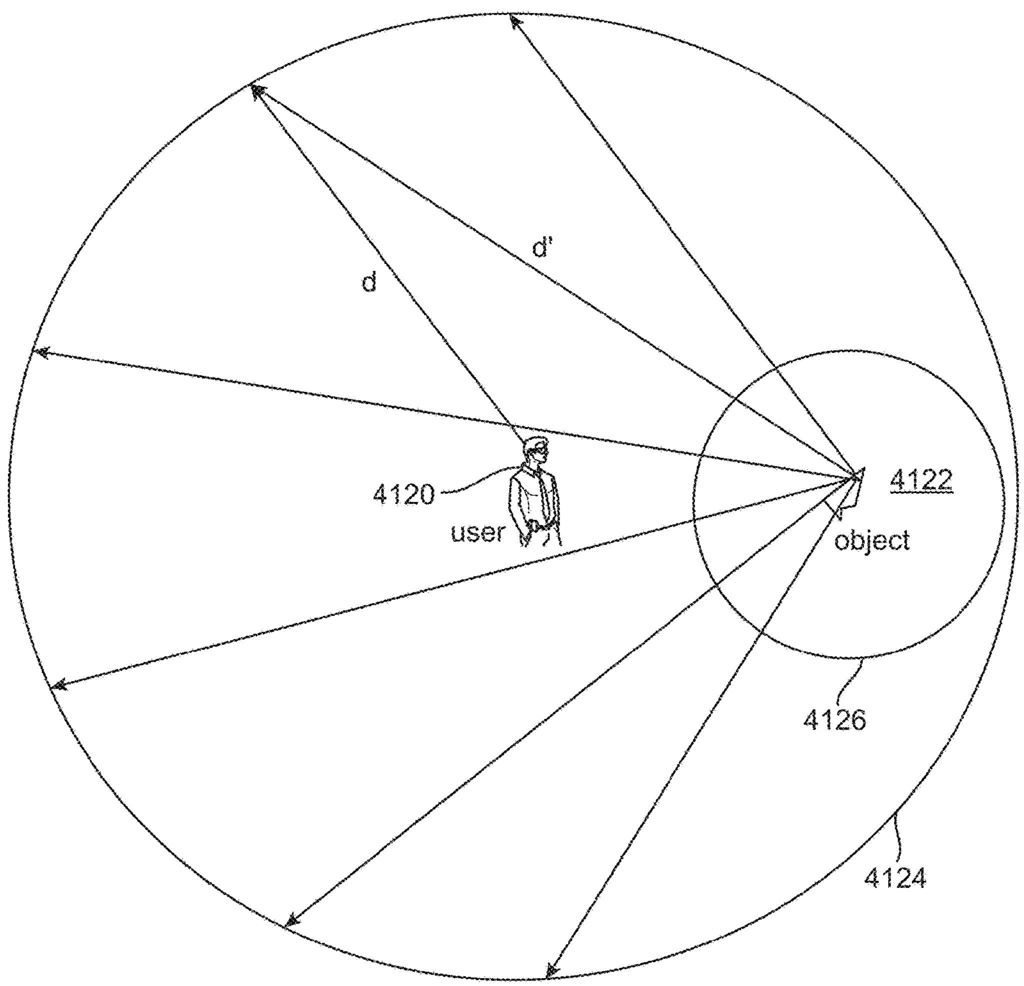
FIG. 41 depicts a user-centric light map, according to one embodiment

In one or more embodiments, the AR system (e.g., cloud based computers, individual computational components) may apply transformations to the user-centric light maps that project the user-centric light map as a suitable object centric light map, reducing or eliminating the error of the translational offset. As schematically illustrated in FIG. 41, one technique models the user-centric light map as a classic sphere 4124 centered on the user 4120, of an appropriate radius, perhaps similar to a size of the room. Another sphere 4126 is modeled around the object 4122 to be lit, of a radius that fits inside the user-centric sphere 4124. The data from the user-centric sphere 4124 is then projected onto the object-centric sphere 4126 from the point of view of the object 4122, creating a new light map. Ray casting will work for this projection. Alternatively, a numerical method may be employed. This transformation warps the user-centric light map to be more accurate from the point of view of the object.

Color intensities are then modified to adjust for distance attenuation according to the offset position of the object. Let att(x) be a light attenuation function, where x is the distance from the light to the viewer. The intensity of a given Texel of the user-centric light map is expressed as $lm=ls*att(d)$, where lm is the intensity in the map and ls is the intensity at the light's source. Thus $ls=lm/att(d)$. So the new intensity in the new object-centric transformation is $lm'=ls*att(d')$.

It should be appreciated that the sky sphere method of transformation may work well for situations where the sources of light captured are significantly far from the user and object positions.

More specifically, if the sources of light are at least as far away as the sphere boundary (which was modeled to represent the sources of light), the technique will likely work. However, as light data sources encroach upon the inner sphere space, error may quickly grow. The worst case scenario is when light data is sourced directly between the user and the object. This would result in the light data mapping to the rear of the object, rather than the front where it is needed.

If the light camera system on the user's device is equipped with stereoscopic or depth sensing utility, the AR system can store a depth value associated with each Texel of the light map. The only area this depth data is particularly useful is on the data that resides between the user and the object. Thus, a stereoscopic camera system may suffice so long as it captures depth in the user's field of view, which is the area in question. The areas of the light map residing behind the user, or for that matter behind the object, is less dependent on depth data because those areas project similarly to both user and object alike. Simply attenuating the values for different distances may be sufficient for that area of the light map.

Figure 42:
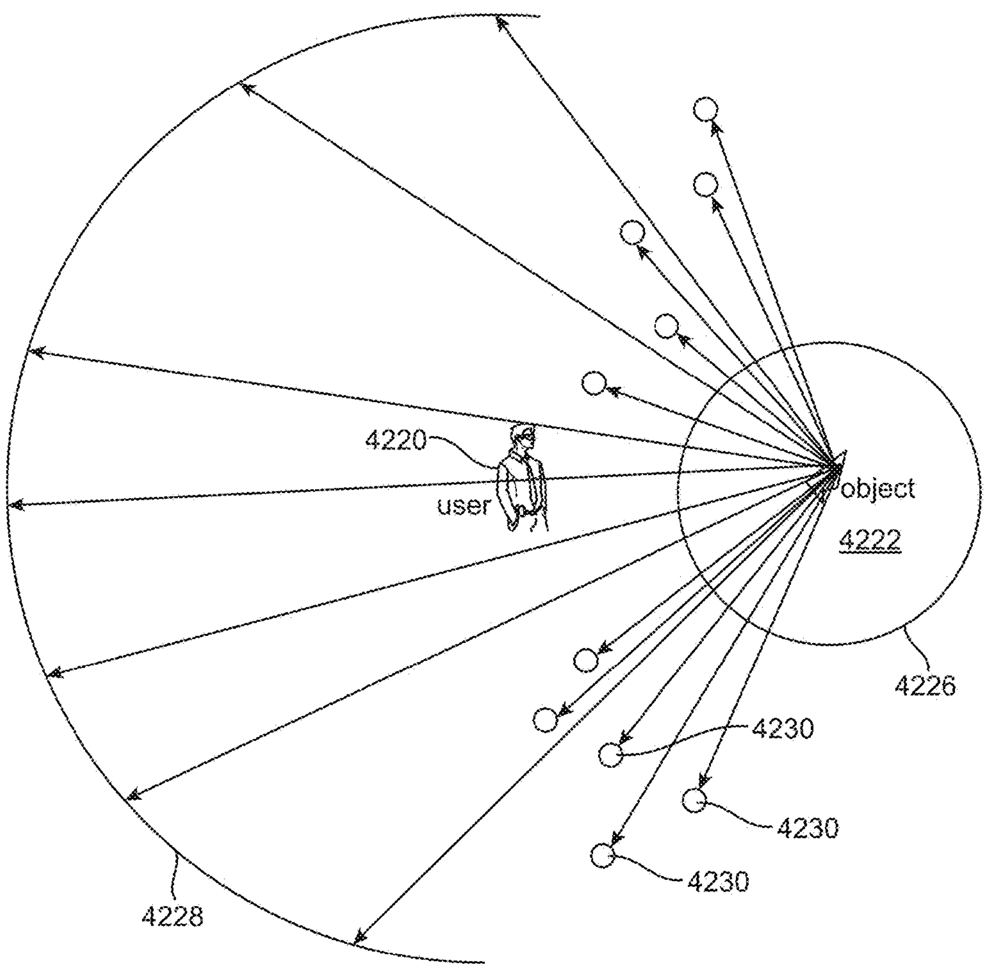
FIG. 42 depicts an object-centric light map, according to one embodiment.

Once depth data is captured for the area of the map where it is needed (e.g., in front of the user), the AR system can compute the exact Euclidean coordinates of the source of that light data on a Texel by Texel basis. As schematically illustrated in FIG. 42, an object-centric light map may be constructed by projecting those coordinates onto the object sphere, and attenuating the intensities accordingly. As shown in FIG. 42, the user is located at the center of the user semi-sphere 4228, and an object sphere 4226 is modeled around the object 4222, similar to that of FIG. 41. Once the depth data is captured for the area of the map, the AR system computes the exact coordinates of the source of the light data for each space point 4230 based on the depth data.

Although there is no guarantee that the color data projecting toward the object is the same as the color projecting toward the user from these inner space points, the color data will likely be close enough for the general case.

The above discussion focused on constructing an object-centric light map based on user-centric data from one sampled user position. However, in many or most cases, the user will be navigating throughout an environment, enabling the collection of many samples of the light environment from many different perspectives. Furthermore, having multiple users in the environment increases the sample sets that can be collected interactively in real time. As the user traverses or users traverse the physical space, the AR system captures new light maps at smart intervals and key positions. These light maps may be stored in the cloud as a grid. As new virtual content enters a scene, the AR system access the stored grid and finds a corresponding light map that represents a position closest to the location of the virtual content. The AR system computes the transformation of the light map from the grid position to the virtual object's own position.

Figure 43:
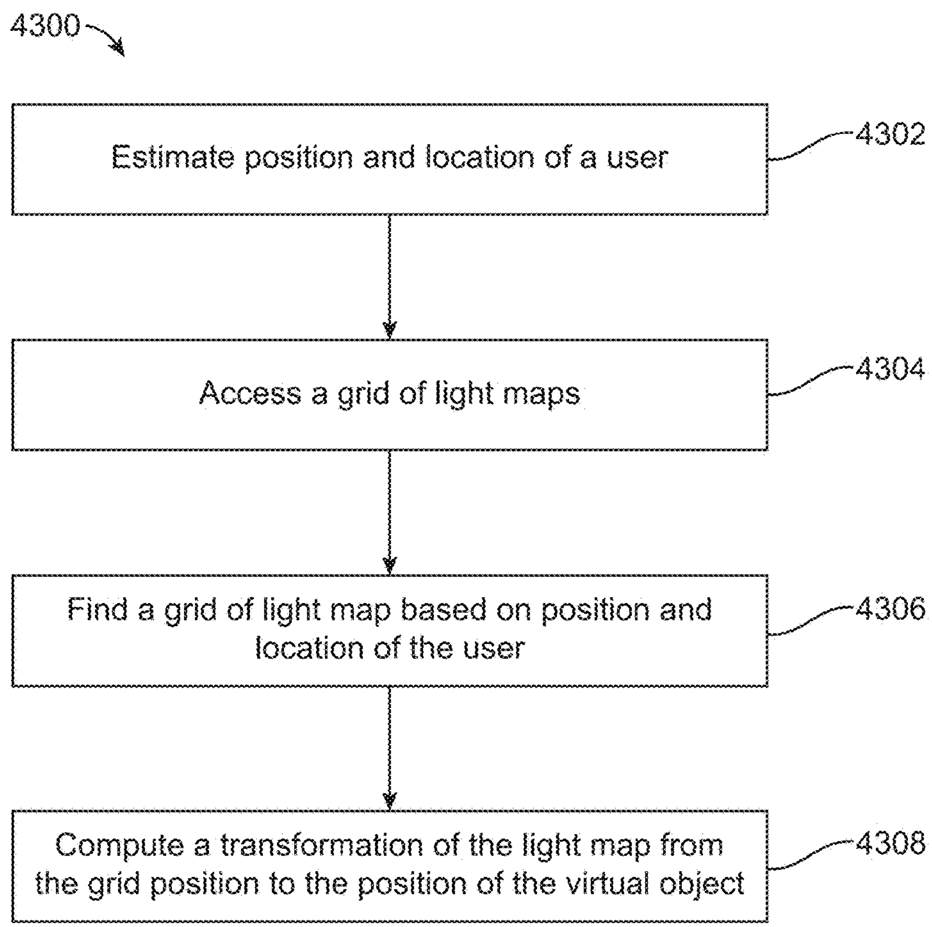
FIG. 43 illustrates a high level flow diagram for a process of transforming a light map, according to one embodiment.

FIG. 43 describes an example method 4300 for using a transformation light map in order to project virtual content. At 4302, the user's individual AR system estimates a location and position of a user relative to the world. Next, at 4304, the AR system accesses a grid of light maps stored in the cloud, and selects a light map in a grid that is closest to the location and position of the user (4306). At 4308, the AR system computes a transformation of the light map from the grid position to the virtual object's position such that the lighting of the virtual object matches the lighting of the ambient surroundings.

In one or more embodiments, case based reasoning is employed in that a solution of the 'nearest case' is adopted, modified, and employed. The transformed case may be stored back in the grid as a meta-case to be used for that location until better sampled data becomes available to replace the meta-case data. As the grid becomes populated with more and more cases, the opportunity will become available to upgrade the light maps for the existing virtual content to more appropriate cases. This way, the interactivity of the users allows the AR system to learn the lighting of the environment, and iteratively converge the virtual content to a realistic solution.

The stored grid may remain in the cloud for future use in the same environment. Certainly, drastic changes to the environment may challenge the effectiveness of the grid, and the grid may need to be rebuilt from start. However certain types of changes can still utilize previously collected data. For instance, global changes, such as dimming the lights, can still use the collected data, with a scaling down of the luminance across the dataset while keeping the higher frequency data.

A number of techniques are discussed below to apply effective image based lighting to virtual content in the AR system. In one or more embodiments, the AR system learns the lighting of a physical environment through interaction of the users and their device cameras. The data may be stored in the cloud and continuously improved with further interaction. The objects select light maps using case-based reasoning techniques, applying transformations to adjust the light maps, and discreetly update the light maps at opportune times or conditions, converging toward a realistic solution.

Through interaction and sampling, the AR system improves its understanding of the light environment of a physical space. In one or more embodiments, the AR system will update the light maps being used in rendering of various virtual content to more realistic light maps based on the acquired knowledge of the light environment.

A potential problem may occur if, for example a user witnesses an update (e.g., change in rendering of a virtual content). For example, if the user sees changes occurring on the surface of a virtual object, the surface will appear to animate, destroying the desired illusion of realism. To solve this potential problem, the AR system executes updates discreetly, during special circumstances that minimize the risk of the user noticing an update or change to a piece of or instance of virtual content.

For example, consider an initial application when a virtual object enters a scene. An update or change may be performed as a virtual object leaves the field of view of user, briefly or even just far into the periphery of the user's field of view. This minimizes the likelihood that the user will perceive the update or change of the virtual object.

The AR system may also update partial maps, corresponding to back-facing parts of the virtual object, which the user cannot see. If the user walks around the virtual object, the user will discover an increased realism on the far side without ever seeing the update or change. The AR system may update or change the fore-side of the virtual object, which is now out of the user's field of view while the user is viewing the rear or far side of the virtual object. The AR system may perform updates or changes on various selected portions (e.g., top, bottom, left, right, front, rear) of the map of the virtual object while those portions are not in the field of view of the user.

In one or more embodiments, the AR system may wait to perform updates or changes until an occurrence of one or more conditions that typically may lead a user to expect a change on the surface/lights of the virtual object. For example, the AR system may perform a change or update when a shadow passes over the virtual object. Since the positions of both virtual and real objects are known, standard shadowing techniques can be applied. The shadow would obscure the update or change from the viewer. Also for example, the AR system may update or change the map of the virtual object in response to light in the environment dimming, to reduce the perception of the update or change by the user.

In yet another example, the AR system may update or change a map of a virtual object in response to occurrence of an event that is known or to have a high probability of drawing the attention of a user. For instance, in response to a virtual monster crashing down through a ceiling, like in a video game, the AR system may update or change the map for other virtual objects since it is highly likely that the user is focusing on the virtual monster and not the other virtual objects.

Avatars

The AR system may render virtual representations of users or other entities, referred to as avatars, as described in some detail above. The AR system may render an avatar of a user in the user's own virtual spaces, and/or in the virtual spaces of other user's.

In some implementations, the AR system may allow an avatar to operate a virtual machine, for example a virtual robot, to operate in an environment. For example, the AR system may render an avatar to appear to "jump" into a robot, to allow the avatar to physically change an environment, and then allow the avatar to jump back out of the robot. This approach allows time multiplexing of a physical asset.

For instance, the AR system may render an avatar of a first user to appear in virtual space of a second user in which there is a virtual robot. The “visiting” avatar of the first user enters into a body of the robot in the second user’s virtual space. The first user can manipulate the second user’s virtual environment via the virtual robot. If another avatar was previously residing in robot, that other avatar is removed to allow the avatar of the first user to enter or inhabit the robot. The other avatar originally inhabiting the robot and being removed from the robot may become a remote avatar, visiting some other virtual space. The avatar originally inhabiting the robot may reenter the robot once the avatar of the first user is done using the robot.

The AR system may render an avatar presence in a virtual space with no instrumentation, and allow virtual interaction. The passable world model allows a first user to pass a second user a copy of the first user’s section of the world (e.g., a level that runs locally). If the second user’s individual AR system is performing local rendering, all the first user’s individual AR system needs to send is the skeletal animation.

It should be appreciated that the AR system may allow for a continuity or spectrum of avatar rendering.

At its simplest, the AR system can drive inferential avatar rendering in a manner similar to driving a character in multi-player online games. The resulting avatar may be rendered with the appearance of a game character (e.g., animation), walking around in a virtual world. In that implementation, the only data coming from the user associated with the avatar is velocity and direction of travel, and possibly simple movements for instance hand motions, etc.

Next in complexity, an avatar may resemble a physical appearance of the associated user, and may include updating of the avatar based on information collected from the associated user in real-time. For example, an image of a first user’s face may have been captured or pre-scanned for use in generating the avatar. The avatar may have a face that appears either as realistic representation (e.g., photographic) or as a recognizable representation (e.g., drawn, cartoonish or caricature). The body of the avatar may, for example, be drawn, cartoonish or caricature, and may even be out of portion with the head of the avatar.

The AR system may employ information collected from the first user to animate the avatar in real-time. For example, a head worn component of the individual AR system may include one or more inward facing cameras and/or microphones or other sensors (e.g., temperature, perspiration, heat rate, blood pressure, breathing rate) to collect real-time information or data from the first user. The information may include images and sound, including vocals with the inflections, etc.

Voice may be passed through to appear to be emanating from the avatar. In some implementations in which the avatar has a realistic face, the facial images may also be passed through. Where the avatar does not have a realistic face, the AR system may discern facial expressions from the images and/or inflections in voice from the sound. The AR system may update facial expressions of the avatar based on the discerned facial expressions and/or inflections in voice. For example, the AR system may determine an emotion state (e.g., happy, sad, angry, content, frustrated, satisfied) of the first user based on the facial expressions and/or inflections. The AR system may select a facial expression to render on the avatar based on the determined emotion state of the first user. For example, the AR system may select from a number of animation or graphical representations of emotion. Thus, the AR system may employ real time texture mapping to render emotional state of a user on an avatar that represents the user.

Next in complexity, the AR system may collect information about portions of a user’s body in addition to, or other than, the user’s face or voice. For example, the AR system may collect information representative of movement of one or more limbs of the user and/or of the user’s entire body. The AR system may collect such information via user worn sensors (e.g., accelerometers, gyros) and/or via a room sensor system which monitors at least a portion of a physical space in which the user is located.

The AR system uses the collected information to render the entire body of the avatar in a way that reflects that actual movement of the user which the avatar represents. The AR system may perform functions such along with real-time texture mapping, applying images (e.g., video) to the avatar.

In an even more complex implementation, the AR system may include one or more light field cameras which capture a light field of the user in physical space. The second user may view a live real three-dimensional image of the first user with sound, which is more realistic then the previously described implementations.

In a most complex implementation, the AR system may include one or more light field cameras which capture a light field of the user in physical space. The AR system may code the captured light field into a model, and send the model to an individual AR system of a second user for rendering into the second user’s virtual space.

As discussed above, an AR system may use head, hand, environment pose, voice inflection, and/or eye gaze to animate or modify a user’s virtual self or avatar in a space. The AR system may infer a location of a user’s avatar simply based on a position of the user’s head and/or hands with respect to the environment. The AR system may statistically process voice inflection (e.g., not content of utterances), and animate or modify an emotional expression of the corresponding avatar to reflect an emotion of the respective user which the avatar represents.

For example, if a user has selected an avatar that resembles a pumpkin, in response to detecting patterns in the user’s voice that indicate anger, the AR system may render teeth in a mouth cutout of the pumpkin avatar. As a further example, a user may have an avatar that resembles a particular character. In response to detection of vocal inflections that indicate inquisitiveness, the AR system may render an avatar that resembles the particular character, for instance with mouth moving and eyes are looking around is same manner as the user’s mouth and eyes, etc.

A rendering of a user’s respective virtual space or environment is asynchronous. An exchange of a relatively small amount of information allows a first user to experience being in another’s user’s space, or experience having another user in the first user’s space. If the first user has a copy of the second user’s space, the first user can appear in the second user’s space, with control over their own viewpoint of the second user’s space, as well as control over their own interactions within the second user’s space. Animating an avatar using a subset of information, without instrumentation, provides for scalability.

The AR system can provide for autonomous navigation of virtual objects through an environment. Where the virtual objects constitute avatars, various emotional states of the avatar may be taken into account autonomously navigating through a space the avatar is inhabiting.

Figure 44:
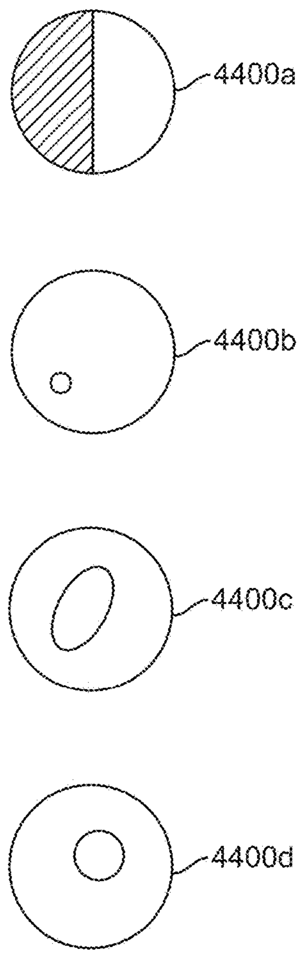
FIG. 44 illustrates a library of autonomous navigation definitions or objects, according to one embodiment.

As illustrated in FIG. 44, the AR system may include a collection or library of autonomous navigation definitions or objects 4400*a*-4400*d* (collectively 4400), which sense and are responsive in predefined ways to certain defined conditions which may occur or be sensed in the virtual space or environment. The autonomous navigation definitions or objects are each associated with a condition or stimulus which may occur or be sensed in a virtual space or environment.

An autonomous navigation definition or object 4400*a* may be responsive to, for example, a presence of structure (e.g., a wall). An autonomous navigation definition or object 4400*b* may be responsive to, for example, light or a source of light (e.g., luminaire, window). An autonomous navigation definition or object 4400*c* may be responsive to, for example, sound or a source of sound (e.g., bell, siren, whistle, voice). An autonomous navigation definition or object 4400*d* may be responsive to, for example, food or water or a source of food or water. Other autonomous navigation definitions or objects (not shown in FIG. 44) may be responsive to other conditions or stimuli, for instance a source of fear (e.g., monster, weapon, fire, cliff), source of food, source of water, treasure, money, gems, precious metals, etc.

The autonomous navigation definitions or objects 4400 are each associated with a defined response. Autonomous navigation definitions or objects respond, for example by causing or tending to cause movement. For example, some autonomous navigation definitions or objects 4400 cause or tend to cause movement away from a source of a condition or stimulus. Also for example, some autonomous navigation objects 2300 cause or tend to cause movement toward a source of a condition or stimulus.

At least some of the autonomous navigation definitions or objects 4400 have one or more adjustable parameters. The adjustable parameters do not change the fundamental conditions or stimulus to which the autonomous navigation definitions or objects 4400 react, but may set a sensitivity level and/or level or strength of response to the conditions or stimuli. The AR system may provide one or more user interface tools for adjusting properties. For example, a user interface tool (e.g., slider bar icons, knob icons) may allow for scaling the properties, inverting the properties (e.g., move towards, move away), etc.

The adjustable parameters may, for example, set a level of sensitivity of the autonomous navigation definition or object 4400 to the conditions or stimulus to which the autonomous navigation definition or object is responsive. For example, a sensitivity parameter may be set to a low level, at which the autonomous navigation definition or object 4400 is not very responsive to an occurrence of a condition or presence of a stimulus, for instance not responding until a source of a condition or stimulus is very close.

Also for example, a sensitivity parameter may be set to a high level, at which the autonomous navigation definition or object 4400 is very responsive to an occurrence of a condition or presence of a stimulus, for instance responding even when a source of a condition or stimulus is not very close. Levels in between the low and high levels may also be employed. In some implementations, the level of sensitivity may be considered as a range of sensitivity. Such may set an outer boundary at which the autonomous navigation definition or object 4400 is sensitive, or may set a gradient in sensitivity, which may be linear, exponential, or even a step function with one or more distinct steps in sensitivity.

The adjustable parameters may, for example, set a level of response of the autonomous navigation definition or object 4400 to the conditions or stimulus to which the autonomous navigation definition or object 4400 is responsive. For example, a parameter may adjust a strength at which the autonomous navigation definition or object 4400 responds to an occurrence of a condition or stimulus. For instance, a parameter may set a strength of a tendency or likelihood to move. For example, a tendency parameter may be set to a low level, at which the autonomous navigation definition or object 4400 is not very responsive an occurrence of a condition or presence of a stimulus.

Also for example, the tendency parameter may be set to a high level, at which the autonomous navigation definition or object 4400 is very responsive to an occurrence of a condition or presence of a stimulus, and will strongly cause movement either toward or away from the source of a condition or stimulus. A speed parameter may set a speed at which the autonomous navigation definition or object 4400 moves in response to detection of the condition or stimulus. The speed may be a fixed speed or a variable speed which changes with time (e.g., slowing down 5 seconds after response starts) or distance (e.g., slowing down after moving a fixed distance). A direction parameter may set a direction of movement (e.g., toward, away).

While autonomous navigation definitions or objects 4400 may be responsive to conditions and stimuli in a two-dimensional area, in some implementations the autonomous navigation definitions or objects 4400 are responsive to conditions and stimuli in a three-dimensional volume. Some autonomous navigation definitions or objects 4400 may be isotropic, that is detecting and responding to conditions occurring in all directions relative to the autonomous navigation object 4400. Some autonomous navigation definitions or objects 4400 may be anisotropic, that is detecting and responding to conditions occurring in only limited directions relative to the autonomous navigation definition or object. Isotropic or anisotropic operation may be an adjustable parameter for some autonomous navigation definitions or objects 4400.

The autonomous navigation definitions or objects 4400 may be predefined, and selectable by a user or others. In some implementations, a user may define new autonomous navigation definitions or objects 4400, and optionally incorporate the new autonomous navigation definitions or objects into a collection or library for reuse by the user or for use by others.

Figure 45:
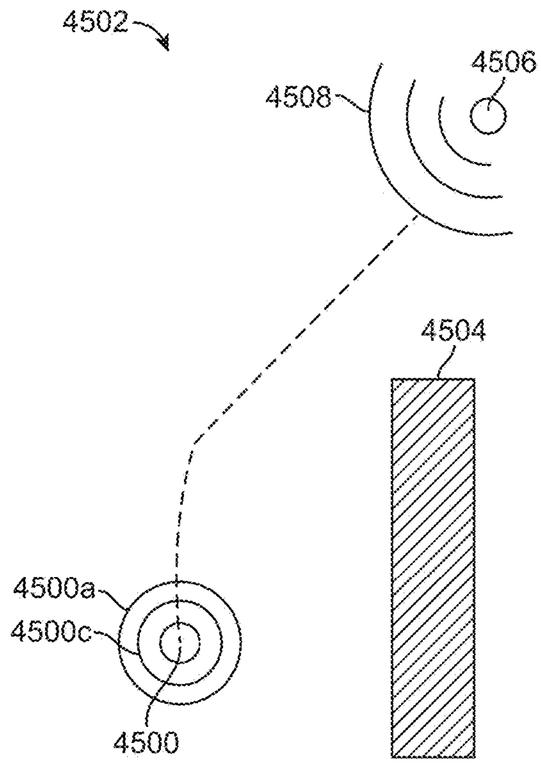
FIG. 45 illustrates an interaction of various autonomous navigation objects, according to one embodiment.

As illustrated in FIG. 45, one or more autonomous navigation definitions or objects 4400*a*, 4400*c* are logically associable to a virtual object 4500, for example to an avatar. When logically associated with a virtual object 4500, the autonomous navigation definitions or objects 4400*a*, 4400*c* may be plotted as a body centered coordinate frame about the virtual object 4500. That is the center of the autonomous navigation definition or object 4400*a*, 4400*c* is the center of the body of the virtual object 4500 itself. The autonomous navigation definitions or objects 4400 may be scaled, for example with a logarithmic function or some other function that for instance scales infinity to 1 and proximity to 0.

The autonomous navigation definitions or objects 4400 are each independent from one another. Any number of autonomous navigation definitions or objects 4400 can be associated or applied to a virtual object 4500. For example, thousands of autonomous navigation definitions or objects 4400 may be applied to a single virtual object 4500.

Figure 46:
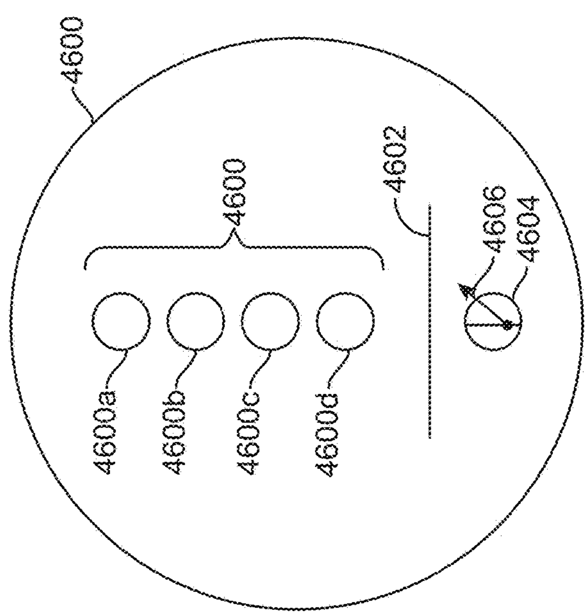
FIG. 46 illustrates a stack of autonomous navigation definitions or objects, according to one embodiment.

FIG. 46 shows a set or "stack" 4600 of autonomous navigation definitions or objects 4400 which are logically associated with a given virtual object 4500, and which can be arranged as rings about the virtual object 4500, for example as illustrated in FIG. 45. Once a set or stack 4600 of autonomous navigation objects 4400*a*-4400*d* has been defined, and composited, as indicated by summing line 4602 (FIG. 46), values of the autonomous navigation definitions or objects 44 are normalized to be between zero and one.

As noted, some properties of at least some of the autonomous navigation objects 4400 may be adjustable. Those properties may include a level of sensitivity as wells as a strength of response. While the types (e.g., condition or stimulus) of autonomous navigation definitions or objects 4400 available may be fixed, a user can composite 4602 the autonomous navigation definitions or objects 4400 to provide a composite or combined output 4604 (FIG. 41). The composite mechanism may, for example, look for a lowest value, in one or more embodiments. In other cases, the trigger may be a high value, depending on the application.

The composite mechanism could, for example, treat the autonomous navigation definition or object 4400*a* that is responsive to a presence of a structure (e.g., sonar or collision detection) as a filter (e.g., binary outcome, pass/do not pass, ON/OFF), and treat all of other autonomous navigation definition or object 4400*b*-4400*d* as scaling factors. For example, the composite 4604 of one or more autonomous navigation definitions or objects 4400 may perform a peak detection on a value or shape (e.g., what is the maximal distance away from center), and provide an indication of a direction and magnitude of velocity (indicated by vector 4602) that the virtual object 4500 should travel in response to the detected condition(s) or stimuli.

The strength of response or action of an autonomous navigation definition or object may be represented as a potential field. For example, a potential field may define a tendency to attract or repel an avatar. For instance, the AR system may establish a convention in which a positive potential field attracts an avatar, while a negative potential repels an avatar. Alternatively, the convention may be that a positive potential field repels an avatar, while a negative potential attracts an avatar.

As a further alternative, one type of potential field may be available under an established convention, which either repels or alternatively attracts the avatar. Further, the AR system may employ a convention where a potential field may be assigned a magnitude or gradient, the magnitude or gradient corresponding to a strength or attraction or repulsion. The gradient may be a linear or nonlinear function, and may even include singularities. The potential field may be established coincidentally with the virtual object or avatar. The potential field may tend to cause an avatar to avoid a source of the condition or stimulus (e.g., sound, light) for example to steer around the source of the condition or stimulus.

As illustrated in FIG. 45, in one example there may be a first virtual object 4500 which is moving in a virtual space or environment 4502. The virtual space or environment 4502 may include a wall 4504, which may be either a virtual or a physical object. The virtual space or environment 4502 may include a source 4506 of a sound 4508. In one or more embodiments, the AR system may use artificial intelligence to steer the first virtual object 4500 toward a target, for example the source 4506 of the sound 4508 in the virtual space or environment 4502 which includes the wall 4504, while avoiding collisions with the wall 4504.

For instance, an autonomous navigation object 4400*a* that is responsive to a presence of structures may be logically associated with the virtual object 4500. Also for instance, an autonomous navigation object 4400*c* that is responsive to sound 4508 may be logically associated with the virtual object 4500. The autonomous navigation objects 4400*a*, 4400*c* may be defined to constitute one or more rings located about a body of the virtual object 4500. For example, the autonomous navigation object 4400 may have a property that defines allowable movement.

For example, the autonomous navigation object 4400*a* may, in the presence of structure, limit movement that would result in a collision with the structure. For instance, in the presence of a flat wall 4504, the autonomous navigation object 4400*a* may limit the first virtual object 4500 to movement in a lateral direction (e.g., cannot move into the wall), while allowing the first virtual object 4500 to move in any other directions without limitation. Also for example, the autonomous navigation object 4400*c* may, in the presence of sound 4508, cause the associated first virtual object 4500 to move generally towards a source 4506 of the sound 4508.

The above example may be modified with the addition of a source of light to the virtual space or environment 4502. An autonomous navigation definition or object 4400*b* (FIG. 44) that is responsive to light may be associated with the first virtual object 4500. Detection of light by the light responsive autonomous navigation definition or object 4400*b* may cause the first virtual object 4500 to tend to move toward the source of light, or conversely tend to move away from the source of light. In this case, the first virtual object 4500 will be responsive to the composite of three conditions, structure, sound, and light.

As described above, a set of autonomous navigation definitions or objects may be represented arranged as rings about a virtual object (e.g., avatar) and composited together. These can be represented as a state in a state machine, and provide the virtual object to which the autonomous navigation definitions or objects are associated with travel or movement information (e.g., direction, orientation, speed, and/or distance of travel or movement). This provides a time-based method of instructing a virtual object on where to travel, completely behaviorally. In some implementations, an artificial intelligence algorithm may be applied to tune a state to perfection, based just on empirical input data.

The AR system may provide for persistent emotion vectors (PEVs) to define state transitions. PEVs are capable of representing various emotions, and may have particular values at a particular state in time. In one or more embodiments, PEVs may be globally used.

A transition from state to state may be controlled by a set or stack up of the PEVs. Notably, the state machine may not need to be a complete state machine, but rather may cover only a portion of all possible states. A user may set up the states for the particular state transitions that the user is interested in.

Figure 47A:
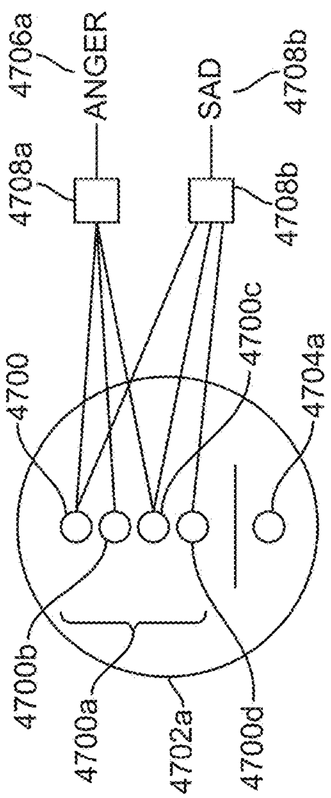
FIGS. 47A-47B illustrate using the autonomous navigation definitions to identify emotional states, according to one embodiment.

As illustrated in FIG. 47A, a set 4700*a* of autonomous navigation definitions or objects 4400*a*-4400*d* associated with a given virtual object (e.g., an avatar) 4702*a* are composited to sum to a single ring 4704*a*. The set 4700*a* may be assigned or logically associated with one or more emotional states, for example anger 4706*a*, sad 4706*b*, happy, frightened, satisfied, hungry, tired, cold, hot, pleased, disappointed, etc. (collectively, 4706, only two emotional states called out in FIG. 47A).

The AR system provides for user configurable summing blocks 4708*a*, 4708*b* (only two shown collectively 4708), into which the autonomous navigation definitions or objects 4400*a*-4400*b* feed. The summing block 4708 drives respective emotion vectors. A user may configure the summing blocks 4708 to cause particular actions to occur. These are inherently time-based, and may apply global weightings based on a current state of a virtual object 4702*a*, such as an avatar.

Figure 47B:
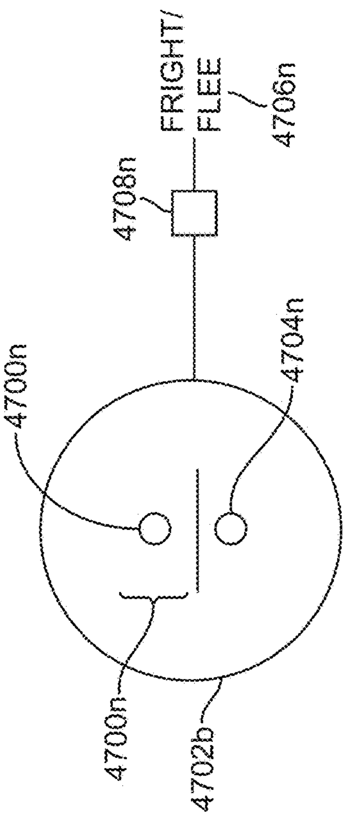

As illustrated in FIG. 47B, a user or some other may, for example, establish a frightened or flee emotion vector. For example, a frightened or flee autonomous navigation definition or object 4400*n* may be logically associated with a virtual object (e.g., avatar) 4702*b*. The frightened or flee autonomous navigation definition or object 4400*n* may be the only autonomous navigation definition or object 4400 in a set 4700*n*, and may composite 4704*n* to an identity function via summing block 4708*n*.

A frightened or flee emotion vector tends to cause the virtual object (e.g., avatar) 4702*b* to flee when presented with some defined condition or stimulus, such as fright 4706*n*. The frightened or flee emotion vector may typically have a relatively short time constant, and very low threshold. The state transition to a flee state is controlled by a state of the global. Consequently, state transitions to a flee state when the frightened or flee emotion vector goes low, either alone or in combination with other emotion vectors.

Figure 48:
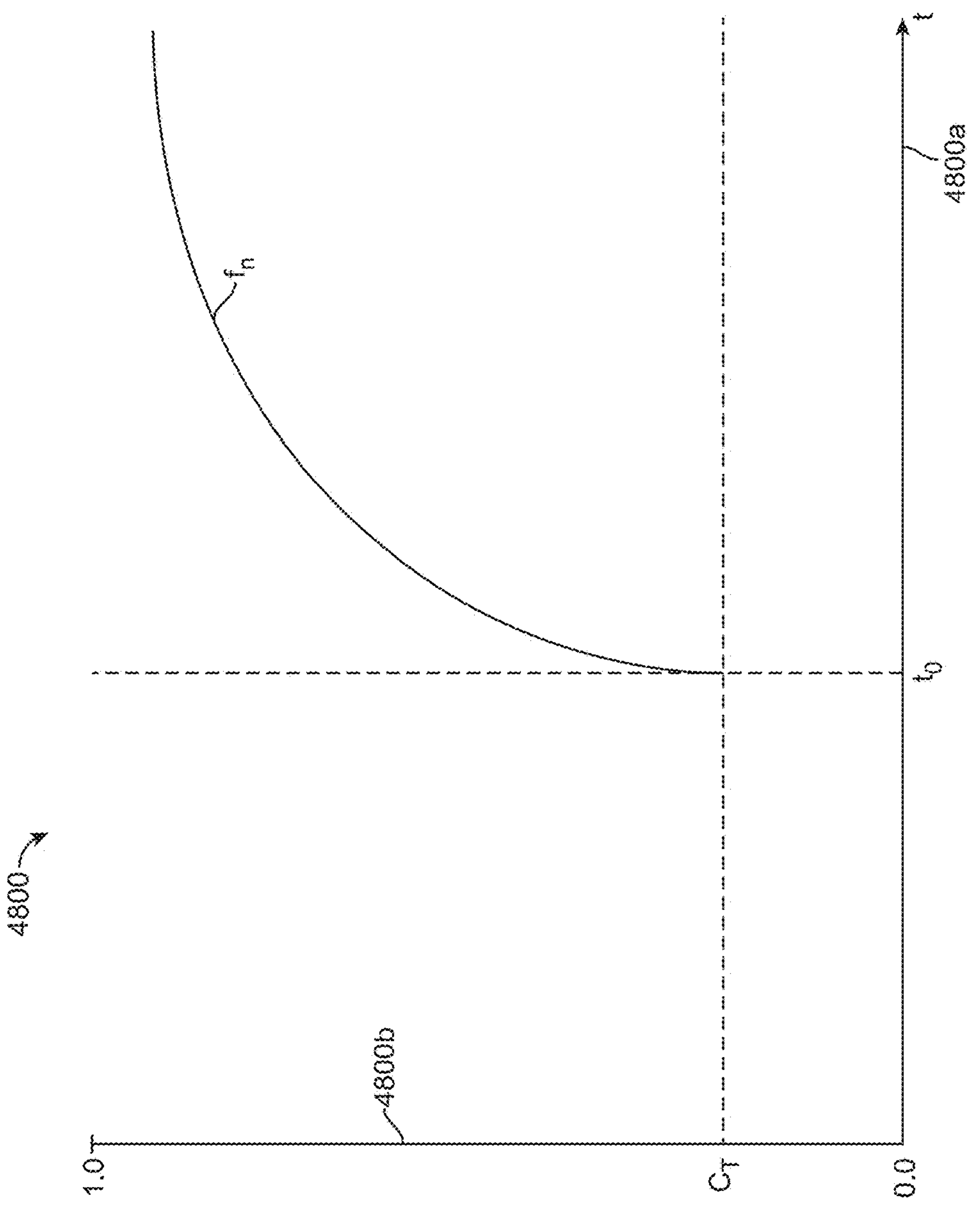
FIG. 48 illustrates a correlation threshold graph to be used to define an autonomous navigation definition or object, according to one embodiment.

The AR system may employ feedback, for instance using a correlation or a statistical mechanism. For example, a correlation threshold graph 4800 may be defined for any particular autonomous navigation definition or object as illustrated in FIG. 48. The correlation threshold graph 4800 may, for example, have been time plotted along a horizontal axis 4800*a* and a scale (e.g., zero to one) plotted along a vertical axis 4800*b*. To control a relation of an autonomous navigation definition or object on the vertical axis, a user can specify a threshold in time t0 and a threshold sensed condition or stimulus level CT. A function fn defines the respective response once the threshold has been meet.

Thus, the AR system allows two or more autonomous navigation definitions or objects 4400 to be summed together. The AR system may also allow a user to adjust a trigger threshold. For example, in response to a particular combination of autonomous navigation definitions or objects 4400 exceeding a certain time threshold, the value(s) of those autonomous navigation definitions or objects 4400 may be applied to a ramping mechanism to a particular emotion vector.

The approach described herein provides a very complex artificial intelligence (AI) property by performing deterministic acts with completely deterministic globally visible mechanisms for transitioning from one state to another. These actions are implicitly map-able to a behavior that a user cares about. Constant insight through monitoring of these global values of an overall state of the system is required, which allows the insertion of other states or changes to the current state. As a further example, an autonomous navigation definition or object may be responsive to a distance to a neighbor. The autonomous navigation definition or object may define a gradient around a neighbor, for example with a steep gradient on a front portion and a shallow gradient on a back portion. This creates an automatic behavior for the associated virtual object. For example, as the virtual object moves, it may for instance tend to move toward the shallow gradient rather than the steep gradient, if defined as such.

Alternatively, the virtual object may, for instance, tend to move toward the steep gradient rather than the shallow gradient, if defined as such. The gradients may be defined to cause the virtual object to tend to move around behind the neighbor. This might, for example, be used in a gaming environment where the neighbor is an enemy and the autonomous navigation object functions as an enemy sensor. This may even take into account the direction that the enemy is facing. For example, the value may be high if the avatar is in front. As the avatar moves, it senses a smaller gradient which attracts the avatar to come up behind enemy (e.g., flanking run behind and punch behavior).

Thus, the autonomous navigation definitions or objects 4400 are configured to sense states in the artificial environment, e.g., presence of water, presence of food, slope of ground, proximity of enemy, light, sound, texture. The autonomous navigation definitions or objects 4400 and PEVs allow users to compose definitions that cause virtual objects to tend toward a behavior the user desires. This may allow users to incrementally and atomically or modularly specify an infinite level of complexity by adding states, optimizing an individual state, and defining transitions to new states.

In one or more embodiments, the AR system may associate a navigation object with a virtual object. The navigation object may be responsive to one or more predetermined conditions (e.g., a movement, a command, a structure, an emotion, a distance, etc.). Based on the change in the navigation object, at least one parameter of the virtual object may be changed as well. For example, the virtual object may move faster, or move toward another object, or exhibit a facial expression, etc.

Processing

The AR system may, in at least some implementations, advantageously perform optical flow analysis in hardware by finding features via an image processing unit (IPU), then finding the features frame-by-frame with a general purpose set theoretic processor (GPSTP). These components allow the AR system to perform some of complex computations described throughout this application. Further details on these components will be provided below, but it should be appreciated that any other similar processing components may be similarly used, or used additionally.

A GPSTP is a search engine that efficiently finds defined objects. GPSTPs perform a set theoretic search. By way of explanation, a Venn diagram search of the combinatorics can be searched in order n, rather than factorial order. The GPSTPs efficiently performs comparisons using set theory to find defined objects. For example, a GPSTP is an efficient structure to find a person who meets very specific criteria, as illustrated in the example following criteria: male who had a 1987 Cadillac, purchased a Starbucks® coffee on July 31, and who climbed Mount Everest in 1983, and who has a blue shirt.

An IPU is a piece of imaging processing hardware that can take an image in pixels and convert it into features. A feature may be thought of as a pixel coordinate with meta information.

In executing optical flow algorithms and imaging, the AR system identifies an object in a frame and then determines where that object appears in at least one subsequent frame. The IPU efficiently generates features, and reduces the data from pixels to a set of features. For example, the IPU may take a frame with mega pixels of a million points size, and produce a much smaller set of features (e.g., 200 features). These set of features may be provided to GPSTP for processing. The GPSTP may store the features to be found. As discussed above, a feature is a 2D point in an image with associated meta information or data. Features can have names or labels. The GPSTP has the n−1 features that were found in the most previous ring.

If a match is found, the correspondence may be saved in 2D. This requires only a small amount of computing for a general purpose processor to calculate a bundle adjust to out what the relative absolute pose was from the last frame to the current frame. It provides a hardware closed loop that is very fast and very efficient.

In a mobile computation scenario, the two pieces of hardware (IPU and GPSTP) may efficiently perform what would normally require a large amount of conventional imaging processing.

In some implementations, the AR system may employ a meta process that provides timing and quality targets for every atomic module in localization, pose, and mapping processes. By providing each atomic module a timing and quality target, those modules can internally or autonomously self-regulate their algorithm to optimality. This advantageously avoids the need for hard-real time operation. The meta-controller may then pull in statistics from the atomic modules, statistically identifying the class of place in which the system is operating. Overall system tuning configurations for various places (e.g., planes, roads, hospitals, living rooms, etc.) may be saved.

The AR system may employ a tracking module. Any piece of computer processing can take different amounts of time. If every module is atomic and can receive and use timing and quality data, the modules can determine or at least estimate how long they take to run a process. The module may have some metric on the quality of the respective process. The modules may take the determined or estimated timing of various modules into account, automatically implementing tradeoffs where possible. For example, the module may decide to determine that taking more time to achieve higher quality is advisable. The Meta-Controller could seed a quality time target to every module in a very modular system. This may allow each module to self-tune itself to hit timing targets. This allows operation of a very complicated processing system that needs to run in real time, without a schedule. It forms a feedback loop.

This approach avoids the need for a hard real-time operating system. The Meta-Controller sends the time target messages to the modules. For example, if a user is playing a game, the Meta-Controller may decide to tell the modules to use low quality localization targets because the Meta-Controller would like to free up computing power for some other task (e.g., on character innovation). The Meta-Controller may be statistically defined and can provide targets that balance in different configurations.

This approach may also save on system tuning. For example, a global set of modifiable algorithmic parameters may allow for tuning. For instance, operations may be tuned based on location (e.g., on a plane, driving a car, in a hospital, in a living room). The approach allows for bundling of all these parameters. For example, feature tracking can have low quality targets, so only requires a relatively short time, and remainder of the time budget can be used for other processing.

Classical "features from accelerated segment test" (FAST) feature extractors (as discussed in some detail above) may be configured into a massively parallel byte-matching system General Purpose Set Theoretic Processor (GPSTP). As noted above the GPSTP is a processor that does comparisons only. The resulting feature extractor has outputs and capabilities similar to FAST, but is implemented completely through brute-force search and comparison rather than mathematics. The feature extractor would be located near the camera, to immediately process frames into Feature Data (x, y, z, basic descriptor information), in one or more embodiments. Massively parallel comparisons would be performed on serially streamed data via the GPSTPs.

The approach would essentially make an image sequential, and have GPSTP find every type of FAST feature possible. The types of features are enumerated and GPSTP finds the features because there is only a limited size, for example 8 bits per pixel. The GPSTP rolls through and find every combination via a brute force search. Any image can be serialized, and any feature of interest may be transformed. A transform may be performed on the image beforehand, which makes the bit patterns invariant to rotation or scaling, etc. GPSTP takes some group of pixels and applies one or more convolution operations.

Thus, by utilizing the various AR systems, various software and optics techniques outlined above, the system is able to create virtual reality and/or augmented reality experiences for the user.

Figure 49:
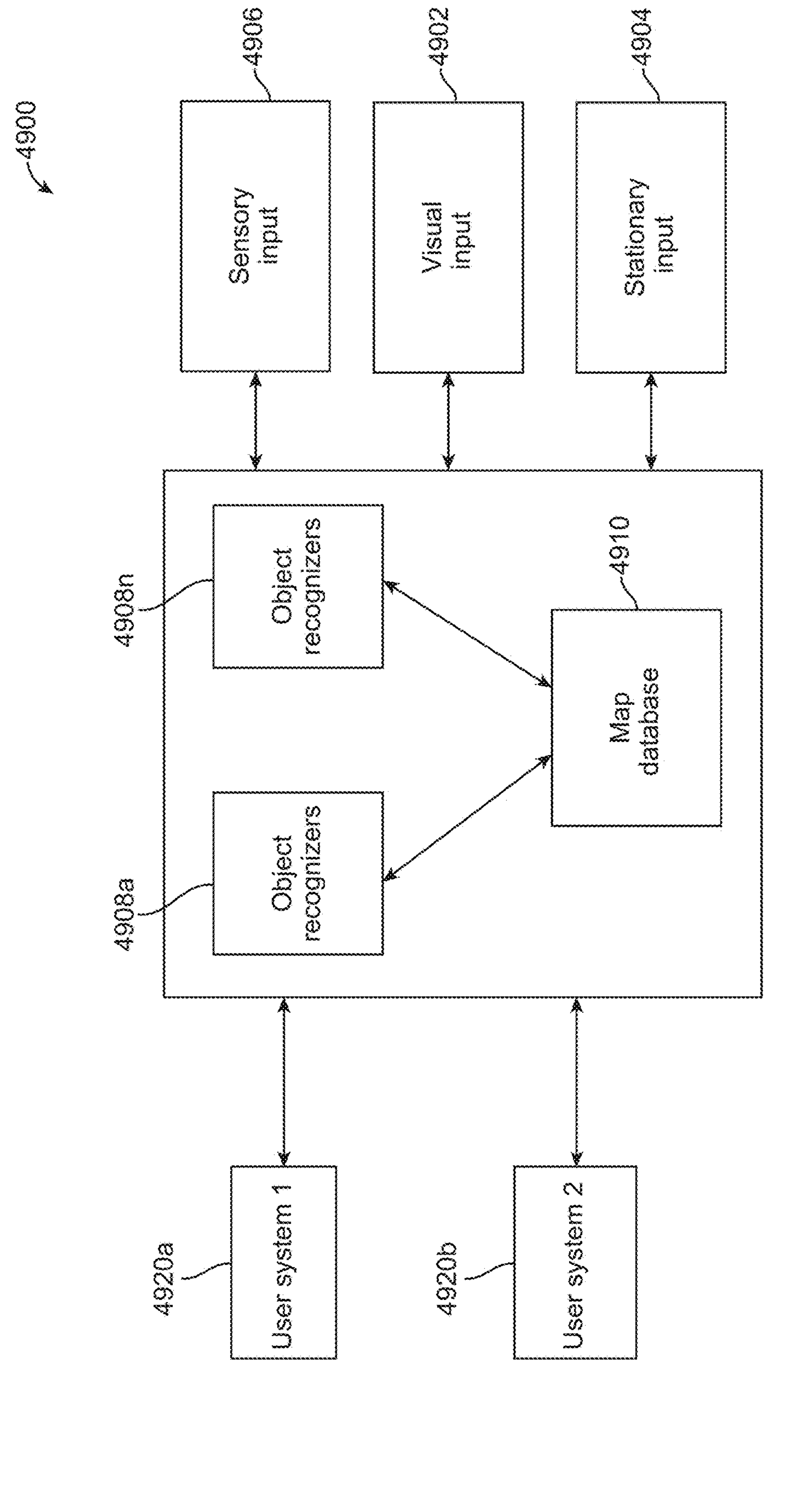
FIG. 49 illustrates a system view of the passable world model, according to one embodiment.

FIG. 49 illustrates another system architecture of an example AR system. As shown in FIG. 49, the AR system 4900 comprises a plurality of input channels from which the AR system 4900 receives input. The input may be sensory input 4906, visual input 4902 or stationary input 4904. Other types of input may also be similarly received (e.g., gesture information, auditory information, etc.). It should be appreciated that the embodiment of FIG. 49 is simplified for illustrative purposes only, and other types of input may be received and fed into the AR system 4900.

On a basic level, the AR system 4900 may receive input (e.g., visual input 4902 from the user's wearable system, input from room cameras, sensory input in the form of various sensors in the system, gestures, totems, eye tracking etc.) from one or more AR systems. The AR systems may constitute one or more user wearable systems, and/or stationary room systems (room cameras, etc.). The wearable AR systems not only provide images from the cameras, they may also be equipped with various sensors (e.g., accelerometers, temperature sensors, movement sensors, depth sensors, GPS, etc.) to determine the location, and various other attributes of the environment of the user. Of course, this information may further be supplemented with information from stationary cameras discussed previously. These cameras, along with the wearable AR systems, may provide images and/or various cues from a different point of view. It should be appreciated that image data may be reduced to a set of points, as explained above.

As discussed above, the received data may be a set of raster imagery and point information that is stored in a map database 4910. As discussed above, the map database 4910 collects information about the real world that may be advantageously used to project virtual objects in relation to known locations of one or real objects. As discussed above, the topological map, the geometric map etc. may be constructed based on information stored in the map database 4910.

In one or more embodiments, the AR system 4900 also comprises object recognizers 4908 (object recognizers explained in depth above). As discussed at length above, object recognizers 4908 "crawl" through the data (e.g., the collection of points) stored in one or more databases (e.g., the map database 4910) of the AR system 4900 and recognize (and tag) one or more objects. The mapping database may comprise various points collected over time and their corresponding objects. Based on this information, the object recognizers may recognize objects and supplement this with semantic information (as explained above).

For example, if the object recognizer recognizes a set of points to be a door, the system may attach some semantic information (e.g., the door has a hinge and has a 90 degree movement about the hinge). Over time the map database grows as the system (which may reside locally or may be accessible through a wireless network) accumulates more data from the world.

Once the objects are recognized, the information may be transmitted to one or more user wearable systems 4920. For example, the AR system 4900 may transmit data pertaining to a scene in a first location (e.g., San Francisco) to one or more users having wearable systems in New York City. Utilizing the data in the map database 4910 (e.g., data received from multiple cameras and other inputs, the object recognizers and other software components map the points collected through the various images, recognize objects etc.) the scene may be accurately "passed over" to a user in a different part of the world. As discussed above, the AR system 4900 may also utilize a topological map for localization purposes. More particularly, the following discussion will go in depth about various elements of the overall system that allows the interaction between one or more users of the AR system.

Figure 50:
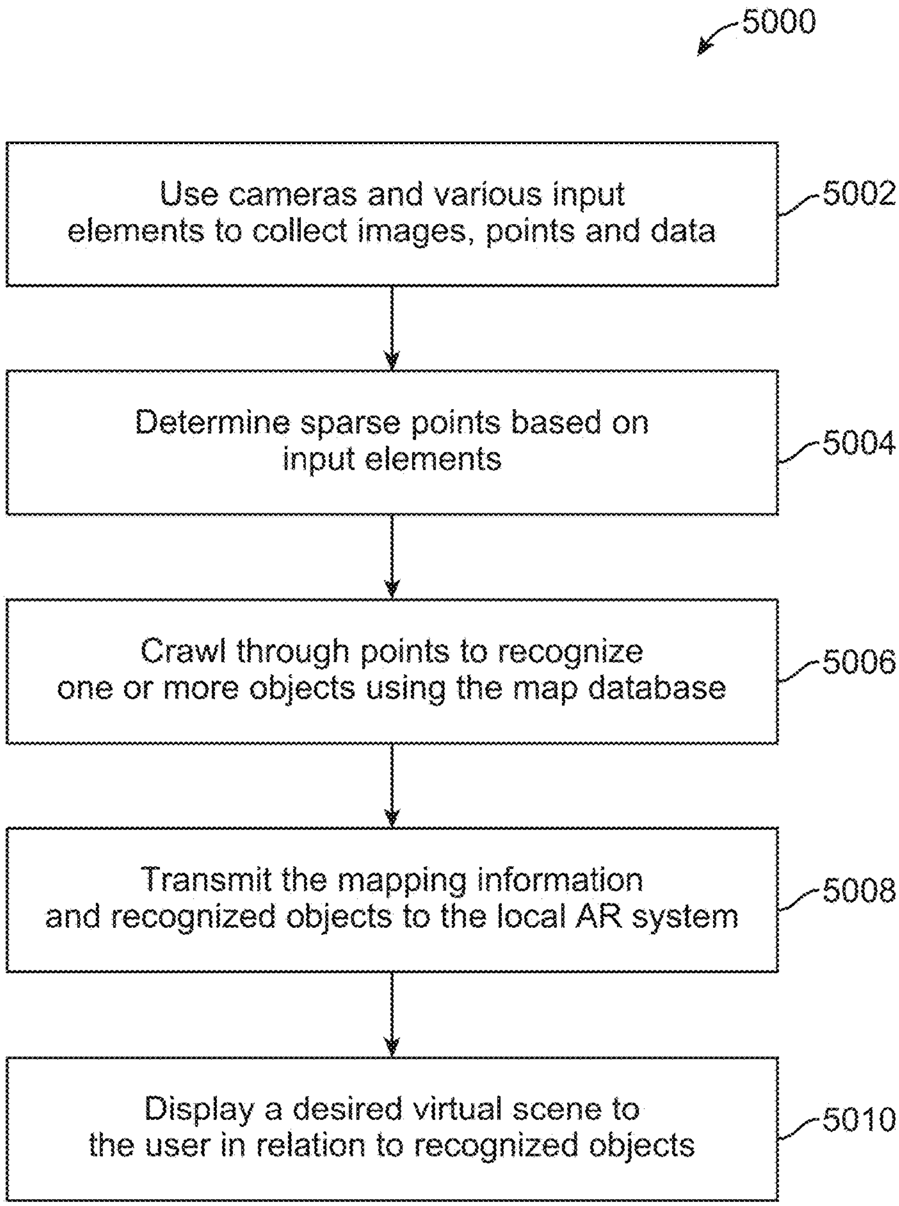
FIG. 50 illustrates an example method of displaying a virtual scene, according to one embodiment.

FIG. 50 is an example process flow diagram 5000 that illustrates how a virtual scene is displayed to a user in relation to one or more real objects. For example, the user may be New York City, but may desire to view a scene that is presently going on in San Francisco. Or, the user may desire to take a "virtual" walk with a friend who resides in San Francisco. To do this, the AR system 4900 may essentially "pass over" the world corresponding to the San Francisco user to the wearable AR system of the New York user. For example, the wearable AR system may create, at the wearable AR system of the New York user, a virtual set of surroundings that mimic the real world surroundings of the San Francisco user. Similarly, on the flip side, the wearable AR system of the San Francisco user may create a virtual avatar (or a virtual look-alike of the New York user that mimics the actions of the New York user. Thus, both users visualize one or more virtual elements that are being "passed over" from the other user's world and onto the user's individual AR system.

First, in 5002, the AR system may receive input (e.g., visual input, sensory input, auditory input, knowledge bases, etc.) from one or more users of a particular environment. As described previously, this may be achieved through various input devices, and knowledge already stored in the map database. The user's cameras, sensors, GPS system, eye tracking etc., conveys information to the system (step 5002). It should be appreciated that such information may be collected from a plurality of users to comprehensively populate the map database with real-time and up-to-date information.

In one or more embodiments, the AR system 4900 may determine a set of sparse points based on the set of received data (5004). As discussed above, the sparse points may be used in determining pose of the keyframes that took a particular image. This may be crucial in understanding the orientation and position of various objects in the user's surroundings. The object recognizers may crawl through these collected points and recognize one or more objects using the map database 4910 (5006).

Figure 51:
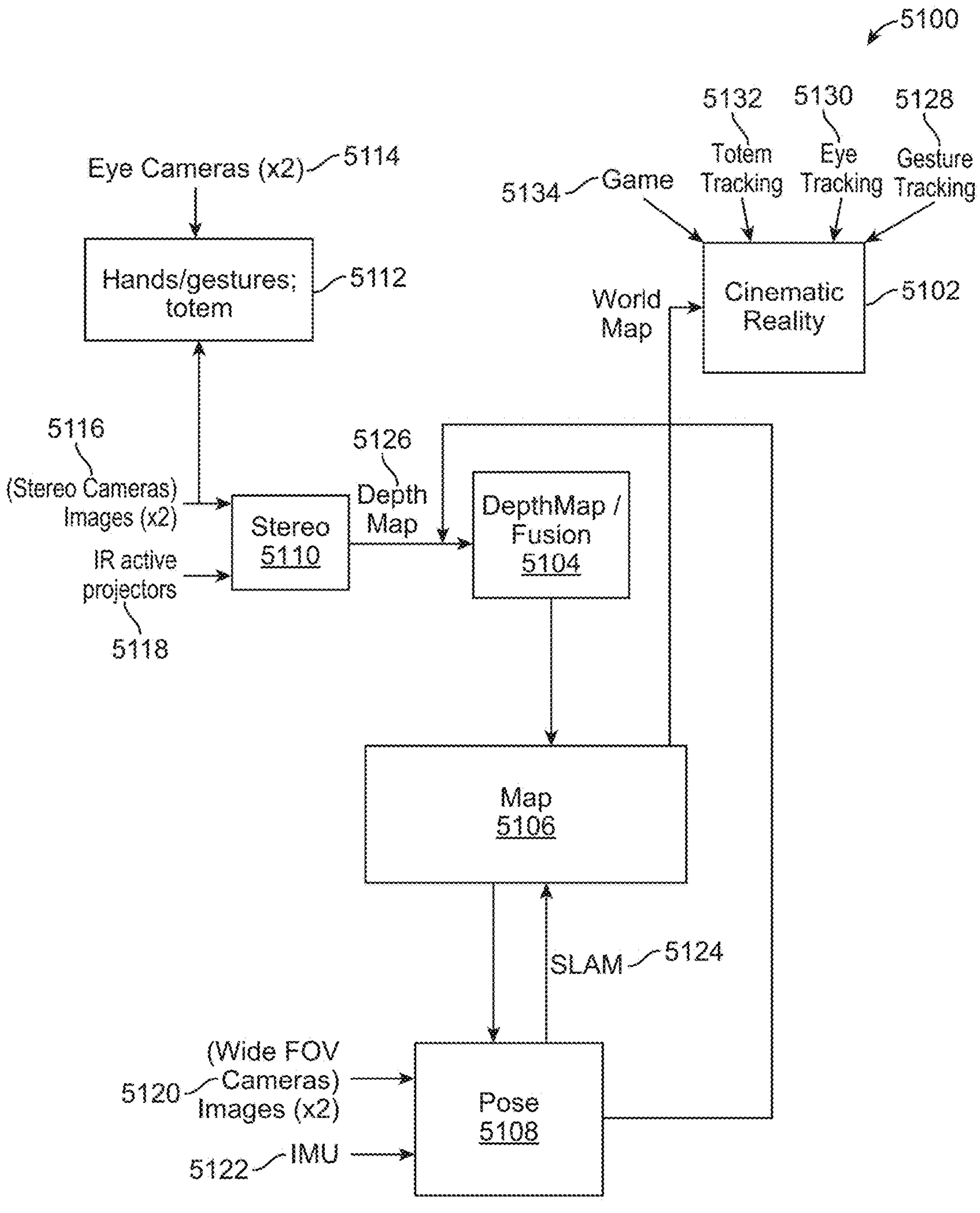
FIG. 51 illustrates a plan view of various modules of the AR system, according to one illustrated embodiment.

In one or more embodiments, the one or more objects may be recognized previously and stored in the map database. In other embodiments, if the information is new, object recognizers may run on the new data, and the data may be transmitted to one or more wearable AR systems (5008). Based on the recognized real objects and/or other information conveyed to the AR system, the desired virtual scene may be accordingly displayed to the user of the wearable AR system (5010). For example, the desired virtual scene (e.g., the walk with the user in San Francisco) may be displayed accordingly (e.g., comprising a set of real objects at the appropriate orientation, position, etc.) in relation to the various objects and other surroundings of the user in New York. It should be appreciated that the above flow chart represents the system at a very basic level. FIG. 51 below represents a more detailed system architecture.

Referring to FIG. 51, various elements are depicted for one embodiment of a suitable vision system. As shown in FIG. 51, the AR system 5100 comprises a map 5106 that received information from at least a pose module 5108, a depth map or fusion module 5104. As will be described in detail further below, the pose module 5108 receives information from a plurality of wearable AR systems. Specifically, data received from the systems' cameras 5120 and data received from sensors such as IMUs 5122 may be utilized to determine a pose at which various images were captured. This information allows the system to place one or more map points derived from the images at the appropriate position and orientation in the Map 5106. This pose information is transmitted to the Map 5106, which uses this information to store map points based on the position and orientation of the cameras with respect to the captured map points.

As shown in FIG. 51, the Map 5106 also interacts with the Depth Map module 5104. The depth map module 5104 receives information from a Stereo process 5110, as will be described in further detail below. The Stereo process 5110 constructs a depth map 5126 utilizing data received from stereo cameras 5116 on the plurality of wearable AR systems and IR cameras (or IR active projectors 5118). The Stereo process 5110 may also receive inputs based on hand gestures 5112. It should be appreciated that the hand gestures and/or totem gestures may be determined based at least in part on data received from eye cameras 5114 that track the user's hand gestures.

As shown in FIG. 51, data from the stereo process 5110 and the data from the pose process 5108 are used at the depth map fusion module 5104. In other words, the fusion process 5108 determines a depth of objects also utilizing pose information from the pose process 5108. This information is then transmitted and stored at the Map 5106. As shown in FIG. 51, data from the Map 5106 is transmitted as needed to provide an AR experience to a plurality of users of the wearable AR system. One or more users may interact with the AR system through gesture tracking 5128, eye tracking 5130, totem tracking 5132 or through a gaming console 5134.

The Map 5106 is a database containing map data for the world. In one embodiment, the Map 5106 may partly reside on user-wearable components, and/or may partly reside at cloud storage locations accessible by wired or wireless network. The Map 5106 is a significant and growing component which will become larger and larger as more and more users are on the system. In one or more embodiments, the Map 5106 may comprise a set of raster imagery, point+descriptors clouds and/or polygonal/geometric definitions corresponding to one or more objects of the real world.

The Map 5106 is constantly updated with information received from multiple augmented reality devices, and becomes more and more accurate over time. It should be appreciated that the system may further include a processor/controller that performs a set of actions pertaining to the various components described with respect to FIG. 51. Also, the processor/controller may determine through the various components (e.g., fusion process, pose process, stereo, etc.) a set of output parameters that can be used to project a set of images to the user through a suitable vision system. For example, the output parameter may pertain to a determined pose that varies one or more aspects of a projected image. Or, the output parameter may pertain to a detected user input that may cause modification of one or more aspects of a projected image. Other such output parameters of various parts of the system architecture will be described in further detail below.

In one or more embodiments, the Map 5106 may comprise a passable world model. The passable world model allows a user to effectively "pass" over a piece of the user's world (i.e., ambient surroundings, interactions, etc.) to another user. Each user's respective individual AR system (e.g., individual augmented reality devices) captures information as the user passes through or inhabits an environment, which the AR system (or virtual reality world system in some embodiments) processes to produce a passable world model. The individual AR system may communicate or pass the passable world model to a common or shared collection of data, referred to as the cloud.

The individual AR system may communicate or pass the passable world model to other users, either directly or via the cloud. The passable world model provides the ability to efficiently communicate or pass information that essentially encompasses at least a field of view of a user.

For example, as a user walks through an environment, the user's individual AR system captures information (e.g., images) and saves the information as posed tagged images, which form the core of the passable world model. The passable world model is a combination of raster imagery, point+descriptors clouds, and/or polygonal/geometric definitions (referred to herein as parametric geometry). Some or all of I this information is uploaded to and retrieved from the cloud, a section of which corresponds to this particular space that the user has walked into.

Asynchronous communications is established between the user's respective individual AR system and the cloud based computers (e.g., server computers). In other words, the user's individual AR system is constantly updating information about the user's surroundings to the cloud, and also receiving information from the cloud about the passable world. Thus, rather than each user having to capture images, recognize objects of the images etc., having an asynchronous system allows the system to be more efficient. Information that already exists about that part of the world is automatically communicated to the individual AR system while new information is updated to the cloud. It should be appreciated that the passable world model lives both on the cloud or other form of networking computing or peer to peer system, and also may live on the user's individual system.

A Pose process 5108 may run on the wearable computing architecture and utilize data from the Map 5106 to determine position and orientation of the wearable computing hardware or user. Pose data may be computed from data collected on the fly as the user is experiencing the system and operating in the world. The data may comprise images, data from sensors (such as inertial measurement, or "IMU" devices, which generally comprises accelerometer and gyro components), and surface information pertinent to objects in the real or virtual environment.

It should be appreciated that for any given space, images taken by the user's individual AR system (multiple field of view images captured by one user's individual AR system or multiple users' AR systems) gives rise to a large number of map points of the particular space. For example, a single room may have a thousand map points captured through multiple points of views of various cameras (or one camera moving to various positions).

Thus, if a camera (or cameras) associated with the users' individual AR system captures multiple images, a large number of points are collected and transmitted to the cloud. These points not only help the system recognize objects, and create a more complete virtual world that may be retrieved as part of the passable world model, they also allow refinement of calculation of the position of the camera based on the position of the points. In other words, the collected points may be used to estimate the pose (e.g., position and orientation) of the keyframe (e.g. camera) capturing the image.

A set of "sparse point representation" may be the output of a simultaneous localization and mapping (or "SLAM"; or "V-SLAM") 5124. This refers to a configuration wherein the input is an images/visual only) process. The system is not only determines where in the world the various components are, but also what the world comprises. Pose 5108 is a building block that achieves many goals, including populating the Map 5106 and using the data from the Map 5106.

In one embodiment, sparse point positions are not completely adequate, and further information may be needed to produce a multifocal virtual or augmented reality experience 5102 as described above. Dense Representations, (generally referred to as depth map information) may be utilized to fill this gap at least in part. Such information may be computed from a process referred to as "Stereo." In the Stereo Process 5110, depth information is determined using a technique such as triangulation or time-of-flight sensing. Further details on dense and sparse representations of data are provided further below.

In one or more embodiments, 3-D points may be captured from the environment, and the pose (i.e., vector and/or origin position information relative to the world) of the cameras that capture those images or points may be determined, such that these points or images may be "tagged", or associated, with this pose information. Then points captured by a second camera may be utilized to determine the pose of the second camera. In other words, one can orient and/or localize a second camera based upon comparisons with tagged images from a first camera.

This knowledge may be utilized to extract textures, make maps, and create a virtual copy of the real world (because then there are two cameras around that are registered). Thus, at the base level, in one embodiment, a wearable AR system can be utilized to capture both 3-D points and the 2-D images that produced the points, and these points and images may be sent out to a cloud storage and processing resource (i.e., the mapping database). They may also be cached locally with embedded pose information (i.e., cache the tagged images) such the cloud may have access to (i.e., in available cache) tagged 2-D images (i.e., tagged with a 3-D pose), along with 3-D points.

The cloud system may save some points as fiducials for pose only, to reduce overall pose tracking calculation. Generally it may be desirable to have some outline features to be able to track major items in a user's environment, such as walls, a table, etc., as the user moves around the room, and the user may want to be able to "share" the world and have some other user walk into that room and also see those points. Such useful and key points may be termed "fiducials" because they are fairly useful as anchoring points—they are related to features that may be recognized with machine vision, and that can be extracted from the world consistently and repeatedly on different pieces of user hardware. Thus, these fiducials preferably may be saved to the cloud for further use.

In one embodiment it is preferable to have a relatively even distribution of fiducials throughout the pertinent world, because they are the kinds of items that cameras can easily use to recognize a location. In one embodiment, the pertinent cloud computing configuration may groom the database of 3-D points and any associated metadata periodically to use the best data from various users for both fiducial refinement and world creation. In other words, the system may get the best dataset by using inputs from various users looking and functioning within the pertinent world.

In one embodiment, the database is intrinsically fractal—as users move closer to objects, the cloud passes higher resolution information to such users. As a user maps an object more closely, that data is sent to the cloud, and the cloud can add new 3-D points and image-based texture maps to the database if the new maps are superior to what was stored previously in the database. It should be appreciated that the database may be accessed by multiple users simultaneously.

In one or more embodiments, the system may recognize objects based on the collected information. For example, it may be important to understand an object's depth in order to recognize and understand such object. Recognizer software objects ("recognizers") may be deployed on cloud or local resources to specifically assist with recognition of various objects on either or both platforms as a user is navigating data in a world. For example, if a system has data for a world model comprising 3-D point clouds and pose-tagged images, and there is a desk with a bunch of points on it as well as an image of the desk, there may not be a determination that what is being observed is, indeed, a desk as humans would know it. In other words, some 3-D points in space and an image from someplace off in space that shows most of the desk may not be enough to instantly recognize that a desk is being observed.

To assist with this identification, a specific object recognizer may be created to enter the raw 3-D point cloud, segment out a set of points, and, for example, extract the plane of the top surface of the desk. Similarly, a recognizer may be created to segment out a wall from 3-D points, so that a user could change wallpaper or remove part of the wall in virtual or augmented reality and have a portal to another room that is not actually there in the real world. Such recognizers operate within the data of a world model and may be thought of as software "robots" that crawl a world model and imbue that world model with semantic information, or an ontology about what is believed to exist amongst the points in space. Such recognizers or software robots may be programmed such that their entire existence is about going around the pertinent world of data and finding things that it believes are walls, or chairs, or other items. They may tag a set of points with the functional equivalent of, "this set of points belongs to a wall", and may comprise a combination of point-based algorithm and pose-tagged image analysis for mutually informing the system regarding what is in the points.

Object recognizers may be created for many purposes of varied utility, depending upon the perspective. For example, in one embodiment, a purveyor of coffee such as Starbucks may invest in creating an accurate recognizer of Starbucks coffee cups within pertinent worlds of data. Such a recognizer may be configured to crawl worlds of data large and small searching for Starbucks coffee cups, so they may be segmented out and identified to a user when operating in the pertinent nearby space (i.e., perhaps to offer the user a coffee in the Starbucks outlet right around the corner when the user looks at his Starbucks cup for a certain period of time). With the cup segmented out, it may be recognized quickly when the user moves it on his desk.

Such recognizers may be configured to run or operate not only on cloud computing resources and data, but also on local resources and data, or both cloud and local, depending upon computational resources available. In one embodiment, there is a global copy of the world model on the cloud with millions of users contributing to that global model, but for smaller worlds or sub-worlds like an office of a particular individual in a particular town, most of the global world will not care what that office looks like, so the system may groom data and move to local cache information that is believed to be most locally pertinent to a given user.

In one embodiment, when a user walks up to a desk, related information (such as the segmentation of a particular cup on his table) may reside only upon his local computing resources and not on the cloud, because objects that are identified as ones that move often, such as cups on tables, need not burden the cloud model and transmission burden between the cloud and local resources. Thus the cloud computing resource may segment 3-D points and images, thus factoring permanent (e.g., generally not moving) objects from movable ones.

This may affect where the associated data is to remain, where it is to be processed, remove processing burden from the wearable/local system for certain data that is pertinent to more permanent objects, allow one-time processing of a location which then may be shared with limitless other users, allow multiple sources of data to simultaneously build a database of fixed and movable objects in a particular physical location, and segment objects from the background to create object-specific fiducials and texture maps.

The system may share basic elements (walls, windows, desk geometry, etc.) with any user who walks into the room in virtual or augmented reality, and in one embodiment that person's system will take images from his particular perspective and upload those to the cloud. Then the cloud becomes populated with old and new sets of data and can run optimization routines and establish fiducials that exist on individual objects.

Image information and active patterns (such as infrared patterns created using active projectors, as shown in FIG. 51) are used as an input to the Stereo process 5110. A significant amount of depth map information may be fused together, and some of this may be summarized with surface representation. For example, mathematically definable surfaces are efficient (i.e., relative to a large point cloud) and digestible inputs to things like game engines.

The above techniques represent some embodiments of the depth mapping process 5104, but it should be appreciated that other such techniques may be used for depth mapping and fusion. The output of the Stereo process (depth map) may be combined in the Fusion process 5104. Pose 5108 may be an input to this Fusion process 5104 as well, and the output of Fusion 5108 becomes an input to populating the Map process 5106, as shown in the embodiment of FIG. 51. Sub-surfaces may connect with each other, such as in topographical mapping, to form larger surfaces, and the Map 5106 may become a large hybrid of points and surfaces.

To resolve various aspects in the augmented reality process 5102, various inputs may be utilized. For example, in the depicted embodiment, various game parameters 5134 may be inputs to determine that the user or operator of the system is playing a monster battling game with one or more monsters at various locations, monsters dying or running away under various conditions (such as if the user shoots the monster), walls or other objects at various locations, and the like.

The Map 5105 may include information regarding where such objects are relative to each other, to be another valuable input to the AR experience 5102. The input from the Map 5106 to the AR process 5102 may be called the "World Map". Pose relative to the world becomes an input and may play a key role to almost any interactive system.

Controls or inputs from the user are another important input. In order to move around or play a game, for example, the user may need to instruct the system regarding what the user wishes to do. Beyond just moving oneself in space, there are various forms of user controls that may be utilized. In one embodiment, data 5112 pertaining to a totem or object (e.g., a gun) may be held by the user and tracked by the system. The system preferably will know that the user is holding the item and understand what kind of interaction the user is having with the item (i.e., if the totem or object is a gun, the system may understand location and orientation, as well as whether the user is clicking a trigger or other sensed button or element which may be equipped with a sensor, such as an IMU, which may assist in determining what is going on, even with such activity is not within the field of view of any of the cameras).

Data 5112 pertaining to hand gesture tracking or recognition may also provide valuable input information. The system may track and interpret hand gestures for button presses, for gesturing left or right, stop, etc. For example, in one configuration, the user may wish to flip through emails or a calendar in a non-gaming environment, or "fist bump" with another person or player. The system may leverage a minimum amount of hand gestures, which may or may not be dynamic. For example, the gestures may be simple static gestures (e.g., open hand for stop, thumbs up for ok, thumbs down for not ok, a hand flip right or left or up/down for directional commands, etc.). One embodiment may start with a fairly limited vocabulary for gesture tracking and interpretation, and eventually become more nuanced and complex.

Eye tracking 5114 is another important input (i.e., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, some embodiments correspond to three pairs of cameras: a relative wide field of view ("FOV") or "passive SLAM" pair of cameras 5120 arranged to the sides of the user's face, a different pair of cameras oriented in front of the user to handle the Stereo process 5104 and also to capture hand gestures and totem/object tracking in front of the user's face. A pair of Eye Cameras 5114 may be oriented into the eyes of the user to triangulate eye vectors and/or other information. As noted above, the system may also comprise one or more textured light projectors (such as infrared, or "IR", projectors 5118) to inject texture into a scene, as will be described in further detail below.

Calibration of all of these devices (for example, the various cameras, IMUs and other sensors, etc.) is important in coordinating the system and components thereof. The system may also utilize wireless triangulation technologies (such as mobile wireless network triangulation and/or global positioning satellite technology, both of which become more relevant as the system is utilized outdoors). Other devices or inputs such as a pedometer worn by a user, a wheel encoder associated with the location and/or orientation of the user, may need to be calibrated to become valuable to the system.

The display system may also be considered to be an input element from a calibration perspective. In other words, the various elements of the system preferably are related to each other, and are calibrated intrinsically as well (i.e., how the elements map the real world matrix into measurements; going from real world measurements to matrix may be termed "intrinsics"). For a camera module, the standard intrinsic parameters may include the focal length in pixels, the principal point (intersection of the optical axis with the sensor), and distortion parameters (particularly geometry).

One may also consider photogrammetric parameters, if normalization of measurements or radiance in space is of interest. With an IMU module 5122 that combines gyro and accelerometer devices, scaling factors may be important calibration inputs. Camera-to-camera calibration may also be crucial and may be performed by having the three sets of cameras (e.g., eye cameras, stereo cameras, and wide field of view cameras, etc.) rigidly coupled to each other. In one embodiment, the display may have two eye sub-displays, which may be calibrated at least partially in-factory, and partially in-situ due to anatomic variations of the user (location of the eyes relative to the skull, location of the eyes relative to each other, etc.). Thus in one embodiment, a process is conducted at runtime to calibrate the display system for the particular user.

Generally all of the calibration will produce parameters or configurations which may be used as inputs to the other functional blocks, as described above. For example, the calibration may produce inputs that relate to where the cameras are relative to a helmet or other head-worn module; the global reference of the helmet; the intrinsic parameters of the cameras, etc. such that the system can adjust the images in real-time in order to determine a location of every pixel in an image in terms of ray direction in space.

The same is also true for the stereo cameras 5116. In one or more embodiments, a disparity map of the stereo cameras may be mapped into a depth map, and into an actual cloud of points in 3-D. Thus, calibration is fundamental in this case as well. All of the cameras preferably will be known relative to a single reference frame. This is a fundamental notion in the context of calibration. Similar to the above, the same is also true with the IMU(s) 5122. Generally, the three axes of rotation may be determined relative to the AR system in order to facilitate at least some characterization/transformation related thereto. Other calibration techniques will be discussed further below.

Dense/Sparse Mapping Tracking

As previously noted, there are many ways that one can obtain map points for a given location, where some approaches may generate a large number of (dense) points, lower resolution depth points and other approaches may generate a much smaller number of (sparse) points. However, conventional vision technologies are premised upon the map data being all of one density of points.

This presents a problem when there is a need to have a single map that has varying density of points from varying levels of sparse to completely dense sets of data. For example, when in an indoor setting within a given space, there is often the need to store a very dense map of the point within the room, e.g., because the higher level and volume of detail for the points in the room may be important to fulfill the requirements of many gaming or business applications. On the other hand, in a long hallway or in an outdoor setting, there is far less need to store a dense amount of data, and hence it may be far more efficient to represent outdoor spaces using a sparser set of points.

With the wearable AR system, the system architecture is capable of accounting for the fact that the user may move from a setting corresponding to a dense mapping (e.g., indoors) to a location corresponding to a more sparse mapping (e.g., outdoors), and vice versa. The general idea is that regardless of the nature of the identified point, certain information is obtained for that point, where these points are stored together into a common Map, as described in detail previously. A normalization process is performed to make sure the stored information for the points is sufficient to allow the system to perform desired functionality for the wearable device. This common Map therefore permits integration of the different types and/or densities of data, and allows movement of the wearable device with seamless access and use of the Map data.

Figure 114:
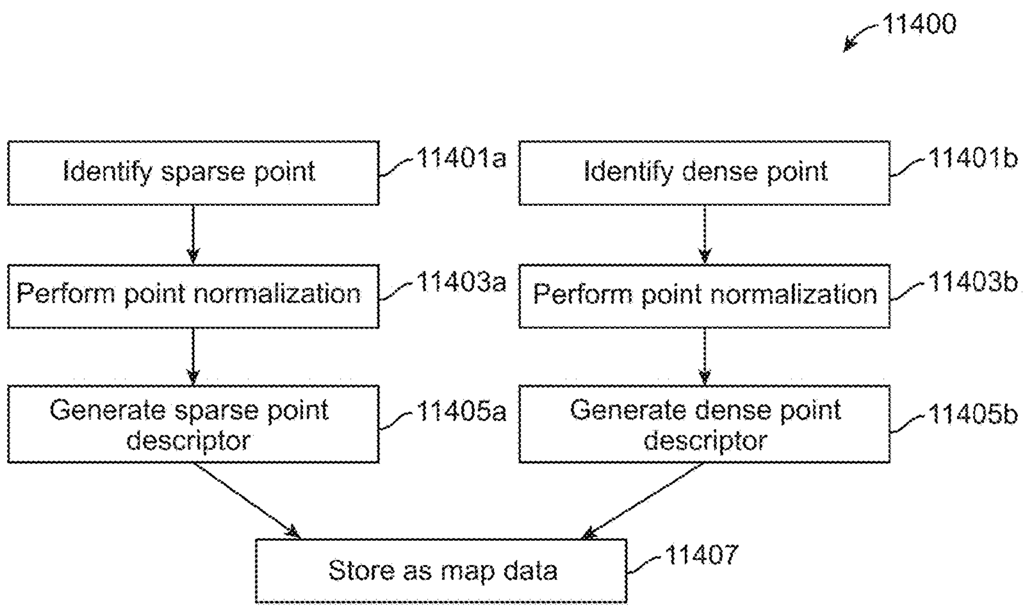
FIG. 114 is an example method of determining sparse and dense points, according to one embodiment.

Referring ahead to FIG. 114, a flowchart 11400 of one possible approach to populate the Map with both sparse map data and dense map data is illustrated. The path on the left portion addresses sparse points and the path of the right portion addresses dense points.

At 11401*a*, the process identifies sparse feature points, which may pertain to any distinctive/repeatable textures visible to the machine. Examples of such distinctive points include corners, circles, triangles, text, etc. Identification of these distinctive features allows one to identify properties for that point, and also to localize the identified point. Various type of information is obtained for the point, including the coordinates of the point as well as other information pertaining to the characteristics of the texture of the region surrounding or adjacent to the point.

Similarly, at 11401*b*, identification is made of a large number of points within a space. For example, a depth camera may be used to capture a set of 3D points within space that identifies the (x,y,z) coordinate of that point. Some depth cameras may also capture the RGB values along with the D (depth) value for the points. This provides a set of world coordinates for the captured points.

The problem at this point is there are two sets of potentially incompatible points, where one set is sparse (resulting from 11401*a*) and the other set is dense (resulting from 11401*b*). The present invention performs normalization on the captured data to address this potential problem. Normalization is performed to address any aspect of the data that may be needed to facilitate vision functionality needed for the wearable device. For example, at 11403*a*, scale normalization can be performed to normalize the density of the sparse data. Here, a point is identified, and offsets from that point are also identified to determine differences from the identified point to the offsets, where this process is performed to check and determine the appropriate scaling that should be associated with the point. Similarly, at 11403*b*, the dense data may also be normalized as appropriate to properly scale the identified dense points. Other types of normalization may also be performed as known to one skill in the art, e.g., coordinate normalization to common origin point. A machine learning framework can be used to implement the normalization process, so that the learned normalization from a local set of points is used to normalize a second point, and so on until all necessary points have been normalized.

The normalized point data for both the sparse and dense points are then represented in an appropriate data format. At 11405*a*, a descriptor is generated and populated for each sparse point. Similarly, at 11405*b*, descriptors are generated and populated for the dense points. The descriptors (e.g., using the A-KAZE, ORB or LATCH descriptor algorithm) characterizes each of the points, whether corresponding to sparse or dense data. For example, the descriptor may include information about the scale, orientation, patch data, and/or texture of the point. Thereafter, at 11407, the descriptors are then stored into a common map database (as described above) to unify the data, including both the sparse and dense data.

During operation of the wearable device, the data that is needed is used by the system. For example, when the user is in a space corresponding to dense data, a large number of points are likely available to perform any necessary functionality using that data. On the other hand, when the user has moved to a location corresponding to sparse data, there may be a limited number of points that are used to perform the necessary functionality. The user may be in an outdoor space where only four points are identified. The four points may be used, for example, for object identification and orientation of that object.

The points may also be used to determine the pose of the user. For example, assume the user has moved into a room that has already been mapped. The user's device will identify points in the room (e.g., using a mono or stereo camera(s) on the wearable device). An attempt is made to check for the same points/patterns that were previously mapped, e.g., by identifying known points, the user's location can be identified as well as the user's orientation. Given four or more identified points in a 3D model of the room, this allows one to determine the pose of the user. If there is a dense mapping, then algorithms appropriate for dense data can be used to make the determination. If the space corresponds to a sparse mapping, then algorithms appropriate for sparse data can be used to make the determination.

Projected Texture Sources

In some locations, there may be a scarcity of feature points from which to obtain texture data for that space. For example, certain rooms may have wide swaths of blank walls for which there are no distinct feature points to identify to obtain the mapping data.

Figure 115:
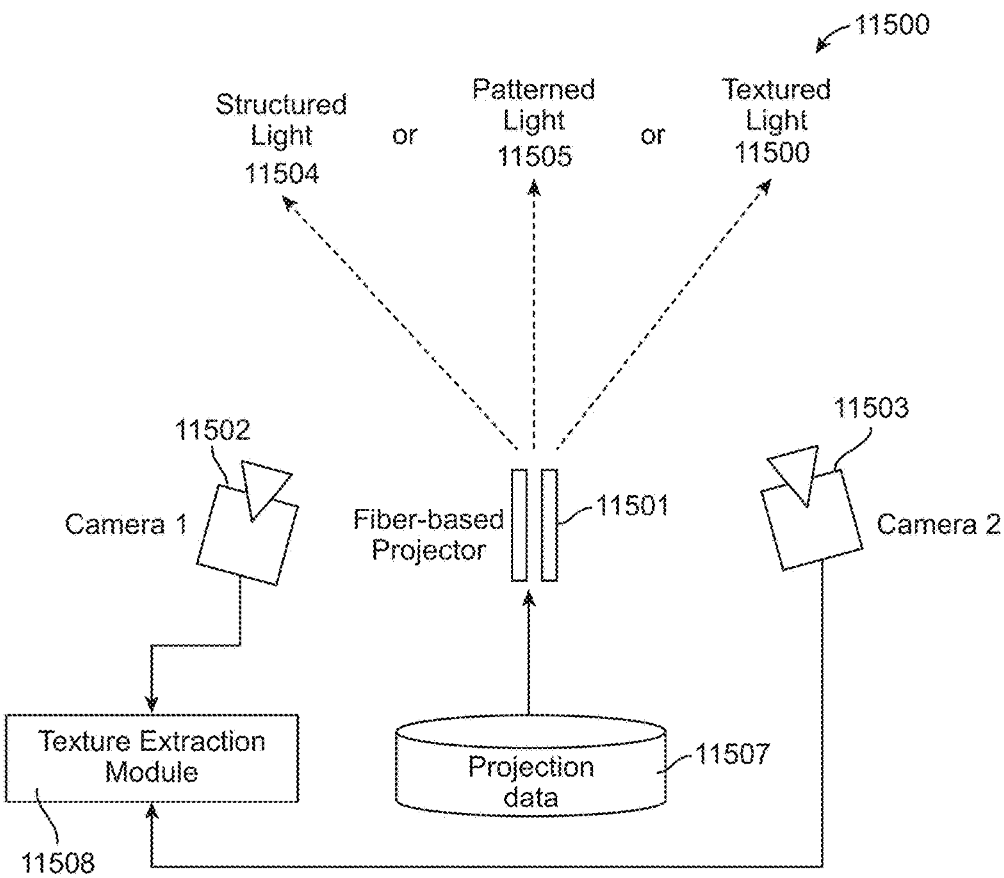
FIG. 115 is a block diagram of projecting textured light, according to one embodiment.

Some embodiments of the present invention provide a framework for actively generating a distinctive texture of each point, even in the absence of natural feature points or naturally occurring texture. FIG. 115 illustrates an example approach that can be taken to implement this aspect of embodiments of the invention. One or more fiber-based projectors 11501 are employed to project light that is visible to one or more cameras, such as camera 1 (11502) and/or camera 2 (11503).

In one embodiment, the fiber-based projector comprises a scanned fiber display scanner that projects a narrow beam of light back and forth at selected angles. The light may be projected through a lens or other optical element, which may be utilized to collect the angularly-scanned light and convert it to one or more bundles of rays.

The projection data 11507 to be projected by the fiber-based projector may comprise any suitable type of light. In some embodiments, the projection data comprises 11507 structured light 11504 having a series of dynamic known patterns, where successive light patterns are projected to identify individual pixels that can be individually addressed and textured. The projection data may also comprise patterned light 11505 having a known pattern of points to be identified and textured. In yet another embodiment, the projection data comprises textured light 11506, which does not necessarily need to comprise a known or recognizable pattern, but does include sufficient texture to distinctly identify points within the light data.

In operation, the one or more camera(s) are placed having a recognizable offset from the projector. The points are identified from the captured images from the one or more cameras, and triangulation is performed to determine the requisite location and depth information for the point. With the textured light approach, the textured light permits one to identify points even if there is already some texturing on the projected surface.

This is implemented, for example, by having multiple cameras identify the same point from the projection (either from the textured light or from a real-world object), and then triangulating the correct location and depth information for that identified point through a texture extraction module 11508. This may be advantageous over the structured light and patterned light approaches because the texture pattern does not have to be known. Rather, the texture pattern is just triangulated from two more cameras. This is more robust to ambient light conditions. Further, two or more projectors do not interfere with each other because the texture is used directly for triangulation, and not identification.

Using the fiber-based projector for this functionality provides numerous advantages. One advantage is that the fiber-based approach can be used to draw light data exactly where it is desired for texturing purposes. This allows the system to place a visible point exactly where it needs to be projected and/or seen by the camera(s). In effect, this permits a perfectly controllable trigger for a trigger-able texture source for generating the texture data. This allows the system to very quickly and easily project light and then find the desired point to be textured, and to then triangulate its position and depth.

Another advantage provided by this approach is that some fiber-based projectors are also capable of capturing images. Therefore, in this approach, the cameras can be integrated into the projector apparatus, providing savings in terms of cost, device real estate, and power utilization. For example, when two fiber projectors/cameras are used, this allows a first projector/camera to precisely project light data which is captured by the second projector/camera. Next, the reverse occurs, where the second projector/camera precisely projects the light data to be captured by the first projector/camera. Triangulation can then be performed for the captured data to generate texture information for the point.

As previously discussed, an AR system user may use a wearable structure having a display system positioned in front of the eyes of the user. The display is operatively coupled, such as by a wired lead or wireless connectivity, to a local processing and data module which may be mounted in a variety of configurations. The local processing and data module may comprise a power-efficient processor or controller, as well as digital memory, such as flash memory, both of which may be utilized to assist in the processing, caching, and storage of data a) captured from sensors which may be operatively coupled to the frame, such as image capture devices (such as cameras), microphones, inertial measurement units, accelerometers, compasses, GPS units, radio devices, and/or gyros; and/or b) acquired and/or processed using a remote processing module and/or remote data repository, possibly for passage to the display after such processing or retrieval. The local processing and data module may be operatively coupled, such as via a wired or wireless communication links, to the remote processing module and remote data repository such that these remote modules are operatively coupled to each other and available as resources to the local processing and data module.

Figure 116:
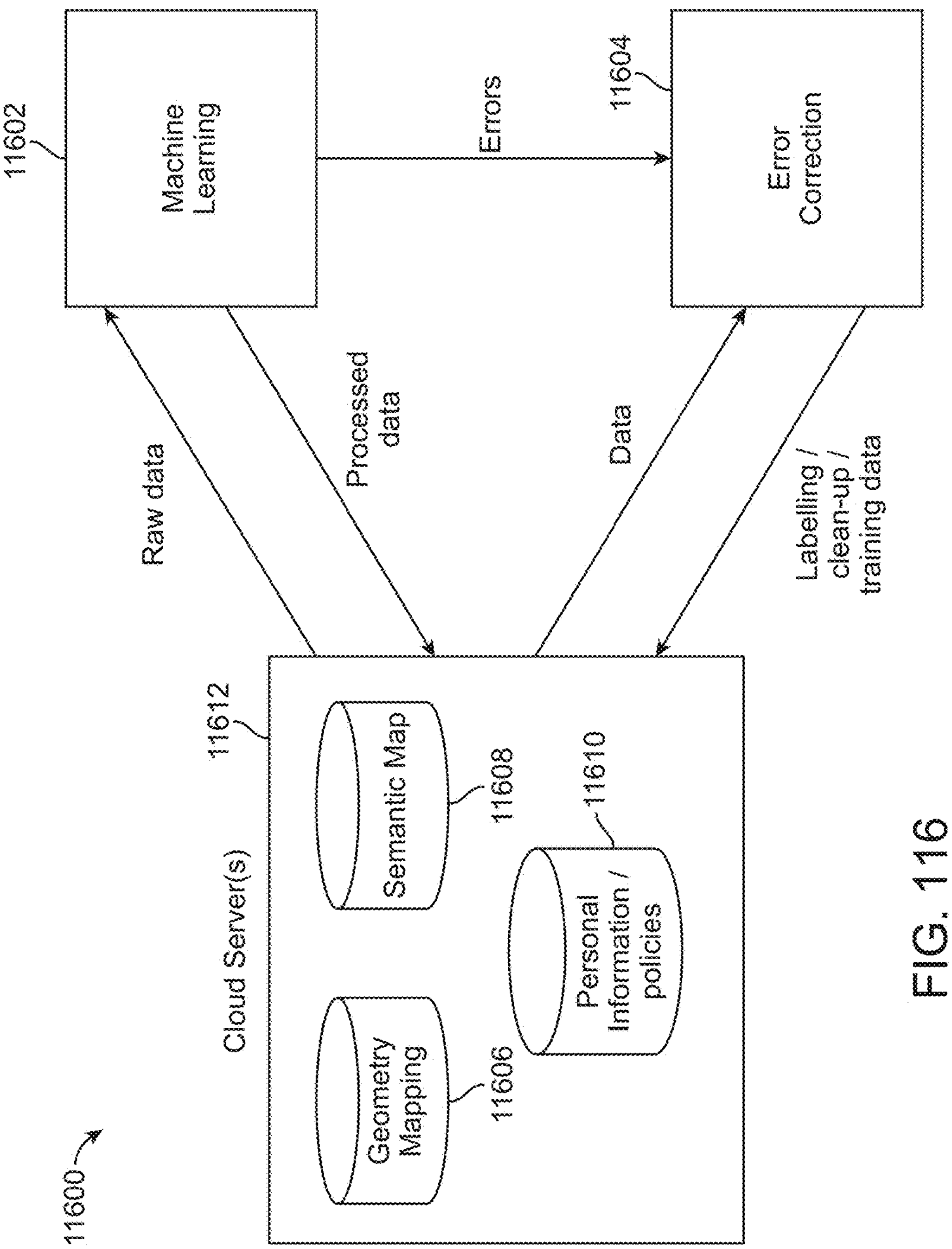
FIG. 116 is an example block diagram of data processing, according to one embodiment.

In some cloud-based embodiments, the remote processing module may comprise one or more relatively powerful processors or controllers for analyzing and/or processing data and/or image information. FIG. 116 depicts an example architecture that can be used in certain cloud-based computing embodiments. The cloud-based server(s) 11612 can be implemented as one or more remote data repositories embodied as a relatively large-scale digital data storage facility, which may be available through the internet or other networking configuration in a cloud resource configuration.

Various types of content may be stored in the cloud-based repository. For example, data collected on the fly as the user is experiencing the system and operating in the world may be stored in the cloud-based repository. The data may comprise images, data from sensors (such as inertial measurement, or IMU devices, which generally comprises accelerometer and gyro components), and surface information pertinent to objects in the real or virtual environment. The system may generate various types of data and metadata from the collected sensor data. For example, geometry mapping data 11606 and semantic mapping data 11608 can be generated and stored within the cloud-based repository.

Map data may be cloud-based, which may be a database containing map data for the world. In one embodiment, this data is entirely stored in the cloud. In another embodiment, this map data partly resides on user-wearable components, and may partly reside at cloud storage locations accessible by wired or wireless network. The cloud server(s) 11612 may further store personal information of users and/or policies of the enterprise in another database 11610.

Cloud-based processing may be performed to process and/or analyze the data. For example, the semantic map 11608 comprises information that provides sematic content usable by the system, e.g., for objects and locations in the world being tracked by the Map. One or more remote servers can be used to perform the processing 11602 (e.g., machine learning processing) to analyze sensor data and to identify/generate the relevant semantic map data. As another example, a Pose process may be run to determine position and orientation of the wearable computing hardware or user. This Pose processing can also be performed on a remote server.

In one embodiment, the system processing is partially performed on cloud-based servers and partially performed on processors in the wearable computing architecture. In an alternate embodiment, the entirety of the processing is performed on the remote servers. Any suitable partitioning of the workload between the wearable device and the remote server (e.g., cloud-based server) may be implemented, with consideration of the specific work that is required, the relative available resources between the wearable and the server, and the network bandwidth availability/requirements.

Cloud-based facilities may also be used to perform quality assurance processing and error corrections 11604 for the stored data. Such tasks may include, for example, error correction, labelling tasks, clean-up activities, and generation of training data. Automation can be used at the remote server to perform these activities. Alternatively, remote "people resources" can also be employed, similar to the Mechanical Turk program provided by certain computing providers.

Personal Data

Personal data can also be configurably stored at various locations within the overall architecture. In some embodiments, as the user utilizes the wearable device, historical data about the user is being acquired and maintained, e.g., to reflect location, activity, and copies of sensor data for that user over a period of time. The personal data may be locally stored at the wearable device itself, but given the large volume of data likely to be generated during normal usage, a cloud-based repository may be the best location to store that historical data.

One or more privacy policies may control access to that data, especially in a cloud-based setting for storage of the personal data. The privacy policies are configurable by the user to set the conditions under which the user's personal data can be accessed by third parties. The user may permit access under specific circumstances, e.g., for users that seek to allow a third party to provide services to the user based on the personal data. For example, a marketer may seek to determine the location of that user in order to provide coupons for business in the general vicinity of that user. The user may use a privacy policy to allow his location data to be shared with third parties, because the user feels it is of benefit to receive the marketing information/coupon from the third party marketer. On the other hand, the user may seek the highest level of privacy that corresponds to configurations that do not allow any access by third parties to any of the personal data. Any suitable privacy policy configuration may be useable in conjunction with embodiments of the invention.

Interacting with the AR System

The following embodiments illustrate various approaches in which one or more AR systems interact with the real environment and/or with other AR users. In one example embodiment, the AR system may include an "augmented" mode, in which an interface of the AR device may be substantially transparent, thereby allowing the user to view the local, physical environment.

Figure 52:
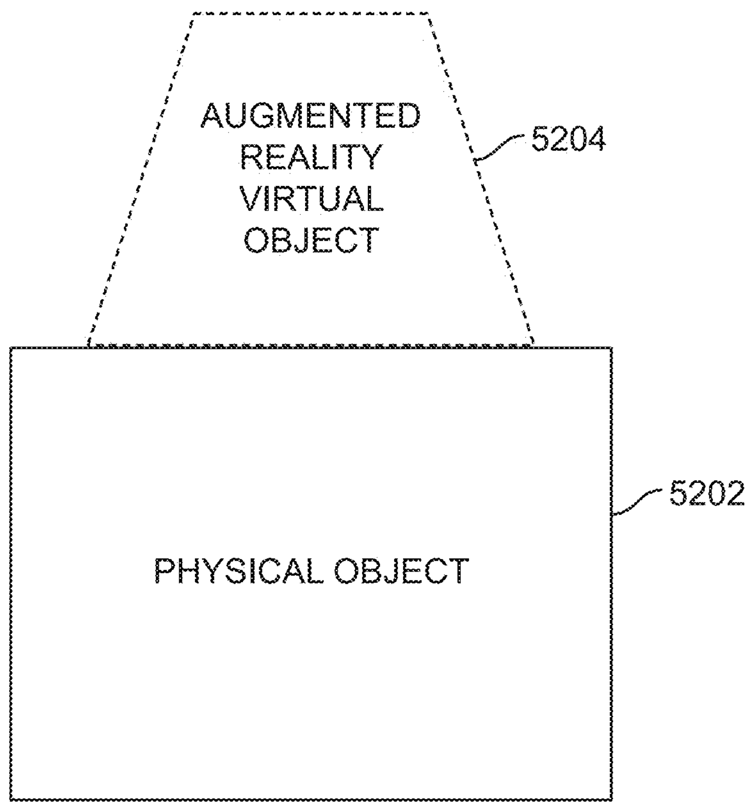
FIG. 52 illustrates an example of objects viewed by a user when the AR device is operated in an augmented reality mode, according to one illustrated embodiment.

FIG. 52 illustrates an example embodiment of objects viewed by a user when the AR system is operating in an augmented mode. As shown in FIG. 52, the AR system presents a physical object 5202 and a virtual object 5204. In the embodiment illustrated in FIG. 5, the physical object 5202 is a real, physical object existing in the local environment of the user, whereas the virtual object 5204 is a virtual object created by the AR system. In some embodiments, the virtual object 5204 may be displayed at a fixed position or location within the physical environment (e.g., a virtual monkey standing next to a particular street sign located in the physical environment), or may be displayed to the user as an object located at a position relative to the user (e.g., a virtual clock or thermometer visible in the upper, left corner of the display).

In some embodiments, virtual objects may be made to be cued off of, or trigged by, an object physically present within or outside a user's field of view. Virtual object 5204 is cued off, or triggered by, the physical object 5202. For example, the physical object 5202 may actually be a stool, and the virtual object 5204 may be displayed to the user (and, in some embodiments, to other users interfacing with the AR system) as a virtual animal standing on the stool. In such an embodiment, the AR system (e.g., using use software and/or firmware stored, for example, in the processor to recognize various features and/or shape patterns) may identify the physical object 5202 as a stool. These recognized shape patterns such as, for example, the stool top, may be used to trigger the placement of the virtual object 5204. Other examples include walls, tables, furniture, cars, buildings, people, floors, plants, animals, or any object which can be seen can or be used to trigger an augmented reality experience in some relationship to the object or objects.

In some embodiments, the particular virtual object 5204 that is triggered may be selected by the user or automatically selected by other components of the head-mounted AR system. Additionally, in embodiments in which the virtual object 5204 is automatically triggered, the particular virtual object 5204 may be selected based upon the particular physical object 5202 (or feature thereof) off which the virtual object 5204 is cued or triggered. For example, if the physical object is identified as a diving board extending over a pool, the triggered virtual object may be a creature wearing a snorkel, bathing suit, floatation device, or other related items.

In another example embodiment, the AR system may include a "virtual" mode, in which the AR system provides a virtual reality interface. In the virtual mode, the physical environment is omitted from the display, and virtual object data is presented on the display 303. The omission of the physical environment may be accomplished by physically blocking the visual display (e.g., via a cover) or through a feature of the AR system in which the display transitions to an opaque setting. In the virtual mode, live and/or stored visual and audio sensory may be presented to the user through the interface of the AR system, and the user experiences and interacts with a digital world (digital objects, other users, etc.) through the virtual mode of the interface. Thus, the interface provided to the user in the virtual mode is comprised of virtual object data comprising a virtual, digital world.

Figure 53:
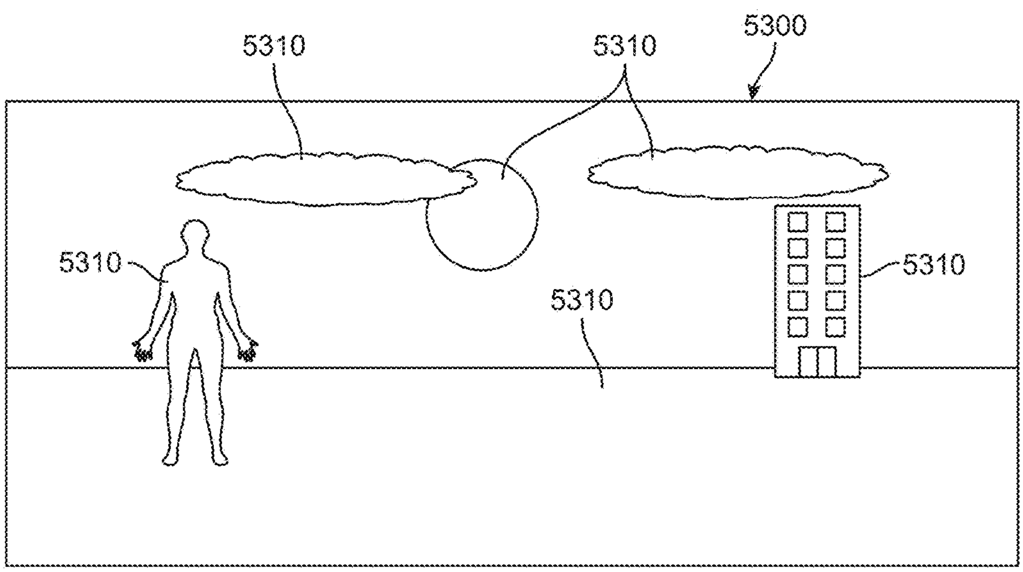
FIG. 53 illustrates an example of objects viewed by a user when the AR device is operated in a virtual mode, according to one illustrated embodiment.

FIG. 53 illustrates an example embodiment of a user interface when operating in a virtual mode. As shown in FIG. 53, the user interface presents a virtual world 5300 comprised of digital objects 5310, wherein the digital objects 5310 may include atmosphere, weather, terrain, buildings, and people. Although it is not illustrated in FIG. 53, digital objects may also include, for example, plants, vehicles, animals, creatures, machines, artificial intelligence, location information, and any other object or information defining the virtual world 5300.

In another example embodiment, the AR system may include a "blended" mode, wherein various features of the AR system (as well as features of the virtual and augmented modes) may be combined to create one or more custom interface modes. In one example custom interface mode, the physical environment is omitted, and virtual object data is presented in a manner similar to the virtual mode. However, in this example custom interface mode, virtual objects may be fully virtual (e.g., they do not exist in the local, physical environment) or the objects may be real, local, physical objects rendered as a virtual object in the interface in place of the physical object. Thus, in this particular custom mode (referred to herein as a blended virtual interface mode), live and/or stored visual and audio sensory may be presented to the user through the interface of the AR system, and the user experiences and interacts with a digital world comprising fully virtual objects and rendered physical objects.

Figure 54:
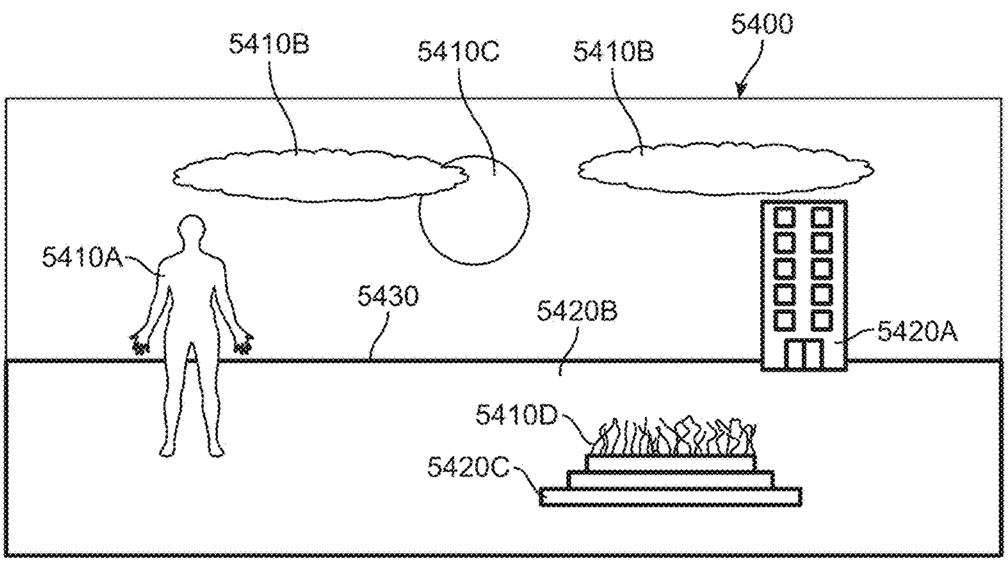
FIG. 54 illustrates an example of objects viewed by a user when the AR device is operated in a blended virtual interface mode, according to one illustrated embodiment.

FIG. 54 illustrates an example embodiment of a user interface operating in accordance with the blended virtual interface mode. As shown in FIG. 54, the user interface presents a virtual world 5400 comprised of fully virtual objects 5410, and rendered physical objects 5420 (renderings of objects otherwise physically present in the scene). In accordance with the example illustrated in FIG. 54, the rendered physical objects 5420 include a building 5420A, the ground 5420B, and a platform 5420C. These physical objects are shown with a bolded outline 5430 to indicate to the user that the objects are rendered. Additionally, the fully virtual objects 5410 include an additional user 5410A, clouds 5410B, the sun 5410C, and flames 5410D on top of the platform 620C.

It should be appreciated that fully virtual objects 5410 may include, for example, atmosphere, weather, terrain, buildings, people, plants, vehicles, animals, creatures, machines, artificial intelligence, location information, and any other object or information defining the virtual world 5400, and not rendered from objects existing in the local, physical environment. Conversely, the rendered physical objects 5420 are real, local, physical objects rendered as a virtual object. The bolded outline 5430 represents one example for indicating rendered physical objects to a user. As such, the rendered physical objects may be indicated as such using methods other than those disclosed herein.

Thus, as the user interfaces with the AR system in the blended virtual interface mode, various physical objects may be displayed to the user as rendered physical objects. This may be especially useful for allowing the user to interface with the AR system, while still being able to safely navigate the local, physical environment. In some embodiments, the user may be able to selectively remove or add the rendered physical objects.

In another example custom interface mode, the interface may be substantially transparent, thereby allowing the user to view the local, physical environment, while various local, physical objects are displayed to the user as rendered physical objects. This example custom interface mode is similar to the augmented mode, except that one or more of the virtual objects may be rendered physical objects as discussed above with respect to the previous example.

The foregoing example custom interface modes represent a few example embodiments of various custom interface modes capable of being provided by the blended mode of the AR system. Accordingly, various other custom interface modes may be created from the various combination of features and functionality provided by the components of the AR system and the various modes discussed above without departing from the scope of the present disclosure.

The embodiments discussed herein merely describe a few examples for providing an interface operating in an off, augmented, virtual, or blended mode, and are not intended to limit the scope or content of the respective interface modes or the functionality of the components of the AR system. For example, in some embodiments, the virtual objects may include data displayed to the user (time, temperature, elevation, etc.), objects created and/or selected by the system, objects created and/or selected by a user, or even objects representing other users interfacing the system. Additionally, the virtual objects may include an extension of physical objects (e.g., a virtual sculpture growing from a physical platform) and may be visually connected to, or disconnected from, a physical object.

The virtual objects may also be dynamic and change with time, change in accordance with various relationships (e.g., location, distance, etc.) between the user or other users, physical objects, and other virtual objects, and/or change in accordance with other variables specified in the software and/or firmware of the AR system, gateway component, or servers. For example, in certain embodiments, a virtual object may respond to a user device or component thereof (e.g., a virtual ball moves when a haptic device is placed next to it), physical or verbal user interaction (e.g., a virtual creature runs away when the user approaches it, or speaks when the user speaks to it), a chair is thrown at a virtual creature and the creature dodges the chair, other virtual objects (e.g., a first virtual creature reacts when it sees a second virtual creature), physical variables such as location, distance, temperature, time, etc. or other physical objects in the user's environment (e.g., a virtual creature shown standing in a physical street becomes flattened when a physical car passes).

The various modes discussed herein may be applied to user devices other than the AR system. For example, an augmented reality interface may be provided via a mobile phone or tablet device. In such an embodiment, the phone or tablet may use a camera to capture the physical environment around the user, and virtual objects may be overlaid on the phone/tablet display screen. Additionally, the virtual mode may be provided by displaying the digital world on the display screen of the phone/tablet. Accordingly, these modes may be blended to create various custom interface modes as described above using the components of the phone/tablet discussed herein, as well as other components connected to, or used in combination with, the user device. For example, the blended virtual interface mode may be provided by a computer monitor, television screen, or other device lacking a camera operating in combination with a motion or image capture system. In this example embodiment, the virtual world may be viewed from the monitor/screen and the object detection and rendering may be performed by the motion or image capture system.

Figure 55:
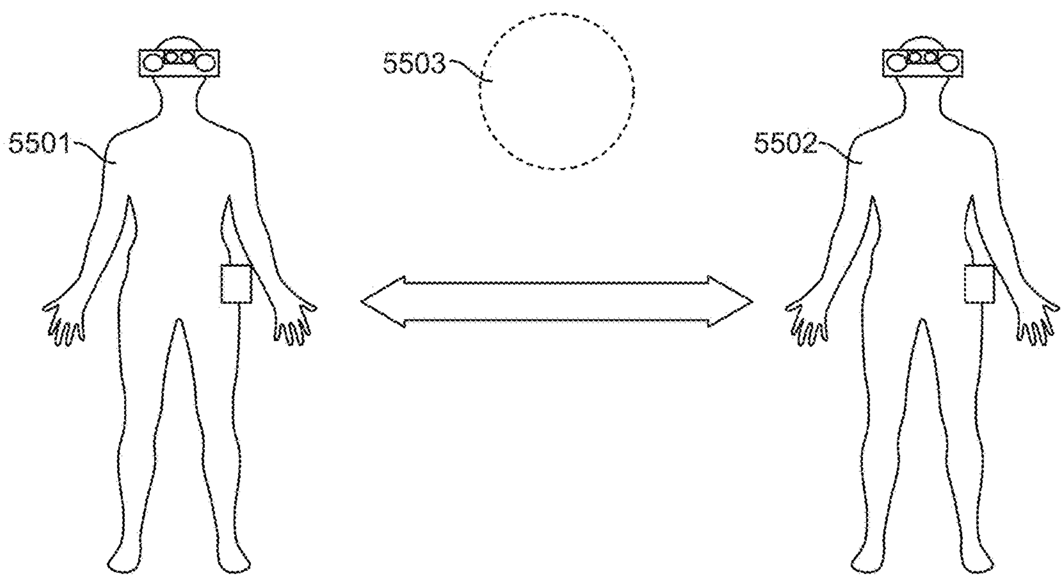
FIG. 55 illustrates an embodiment wherein two users located in different geographical locations each interact with the other user and a common virtual world through their respective user devices, according to one embodiment.

FIG. 55 illustrates an example embodiment of the present disclosure, wherein two users located in different geographical locations each interact with the other user and a common virtual world through their respective user devices. In this embodiment, the two users 5501 and 5502 are throwing a virtual ball 5503 (a type of virtual object) back and forth, wherein each user is capable of observing the impact of the other user on the virtual world (e.g., each user observes the virtual ball changing directions, being caught by the other user, etc.). Since the movement and location of the virtual objects (e.g., the virtual ball 5503) are tracked by the servers in the computing network associated with the AR system, the system may, in some embodiments, communicate the exact location and timing of the arrival of the ball 5503 with respect to each user to each of the users 5501 and 5502.

For example, if the first user 5501 is located in London, the user 5501 may throw the ball 5503 to the second user 5502 located in Los Angeles at a velocity calculated by the AR system. Accordingly, the AR system may communicate to the second user 5502 (e.g., via email, text message, instant message, etc.) the exact time and location of the ball's arrival. As such, the second user 5502 may use the AR device to see the ball 5503 arrive at the specified time and located. One or more users may also use geo-location mapping software (or similar) to track one or more virtual objects as they travel virtually across the globe. An example of this may be a user wearing a 3D head-mounted display looking up in the sky and seeing a virtual plane flying overhead, superimposed on the real world. The virtual plane may be flown by the user, by intelligent software agents (software running on the user device or gateway), other users who may be local and/or remote, and/or any of these combinations.

Figure 56:
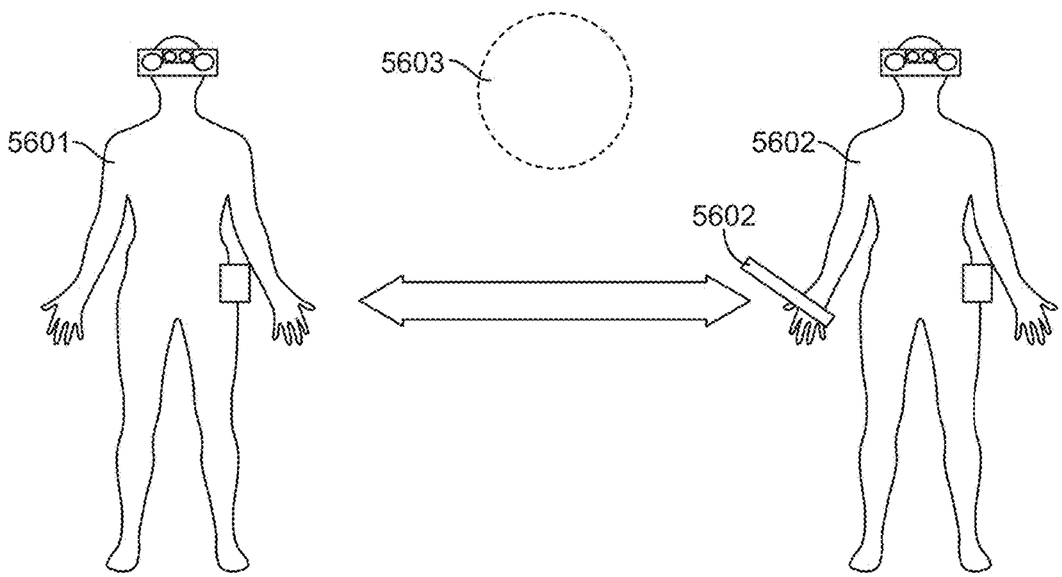
FIG. 56 illustrates an embodiment wherein the embodiment of FIG. 55 is expanded to include the use of a haptic device, according to one embodiment.

As previously discussed, the user device may include a haptic interface device, wherein the haptic interface device provides a feedback (e.g., resistance, vibration, lights, sound, etc.) to the user when the haptic device is determined by the AR system to be located at a physical, spatial location relative to a virtual object. For example, the embodiment described above with respect to FIG. 55 may be expanded to include the use of a haptic device 5602, as shown in FIG. 56.

In this example embodiment, the haptic device 5602 may be displayed in the virtual world as a baseball bat. When the ball 5503 arrives, the user 5502 may swing the haptic device 5602 at the virtual ball 5503. If the AR system determines that the virtual bat provided by the haptic device 5602 made "contact" with the ball 5503, then the haptic device 5602 may vibrate or provide other feedback to the user 5502, and the virtual ball 5503 may ricochet off the virtual bat in a direction calculated by the AR system in accordance with the detected speed, direction, and timing of the ball-to-bat contact.

The disclosed AR system may, in some embodiments, facilitate mixed mode interfacing, wherein multiple users may interface a common virtual world (and virtual objects contained therein) using different interface modes (e.g., augmented, virtual, blended, etc.). For example, a first user interfacing a particular virtual world in a virtual interface mode may interact with a second user interfacing the same virtual world in an augmented reality mode.

Figure 57A:
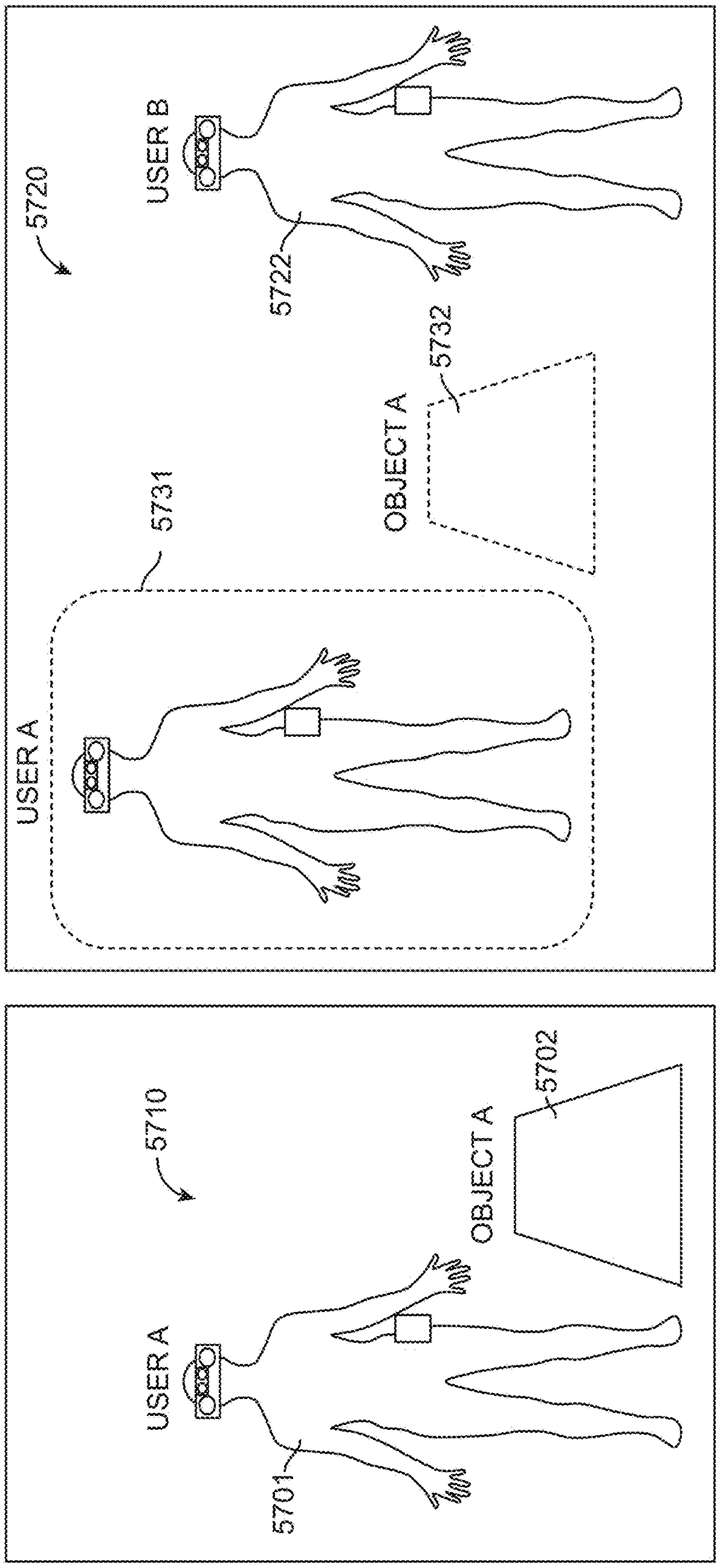
FIG. 57A-57B illustrates an example of mixed mode interfacing, according to one or more embodiments.

FIG. 57A illustrates an example wherein a first user 5701 (interfacing a digital world of the AR system in a blended virtual interface mode) and first object 5702 appear as virtual objects to a second user 5722 interfacing the same digital world of the AR system in a full virtual reality mode. As described above, when interfacing the digital world via the blended virtual interface mode, local, physical objects (e.g., first user 5701 and first object 5702) may be scanned and rendered as virtual objects in the virtual world. The first user 5701 may be scanned, for example, by a motion capture system or similar device, and be rendered in the virtual world as a first rendered physical object 5731.

Similarly, the first object 5702 may be scanned, for example, by the environment-sensing system 5706 of the AR system, and rendered in the virtual world as a second rendered physical object 5732. The first user 5701 and first object 5702 are shown in a first portion 5710 of FIG. 57A as physical objects in the physical world. In a second portion 5720 of FIG. 57A, the first user 5701 and first object 5702 are shown as they appear to the second user 5722 interfacing the same virtual world of the AR system in a full virtual reality mode: as the first rendered physical object 5731 and second rendered physical object 5732.

Figure 57B:
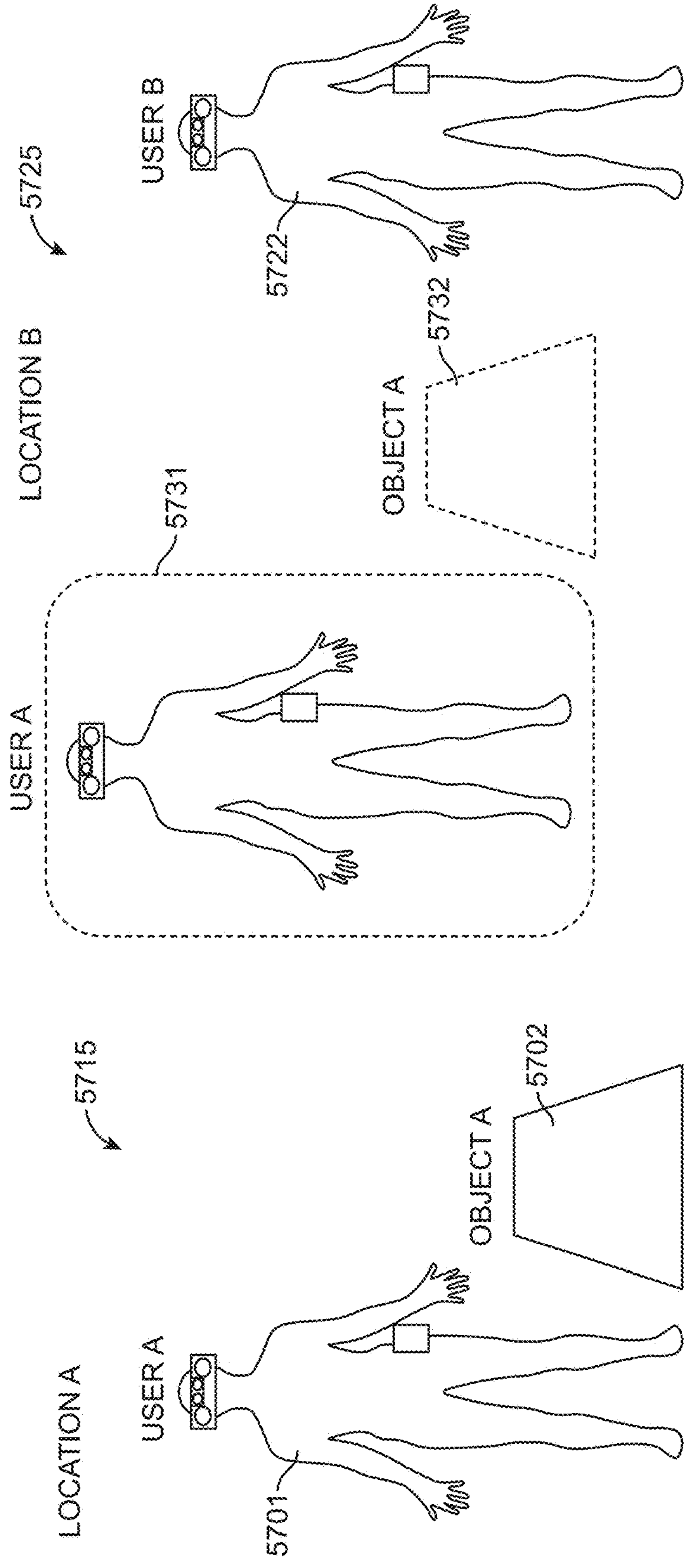

FIG. 57B illustrates another example embodiment of mixed mode interfacing, in which the first user 5701 is interfacing the digital world in a blended virtual interface mode, as discussed above, and the second user 5722 is interfacing the same digital world (and the second user's physical, local environment 5725) in an augmented reality mode. In the embodiment in FIG. 57B, the first user 5701 and first object 5702 are located at a first physical location 5715, and the second user 5722 is located at a different, second physical location 5725 separated by some distance from the first location 5715. In this embodiment, the virtual objects 5731 and 5732 may be transposed in real-time (or near real-time) to a location within the virtual world corresponding to the second location 5725. Thus, the second user 5722 may observe and interact, in the second user's physical, local environment 5725, with the rendered physical objects 5731 and 5732 representing the first user 5701 and first object 5702, respectively.

Figure 58:
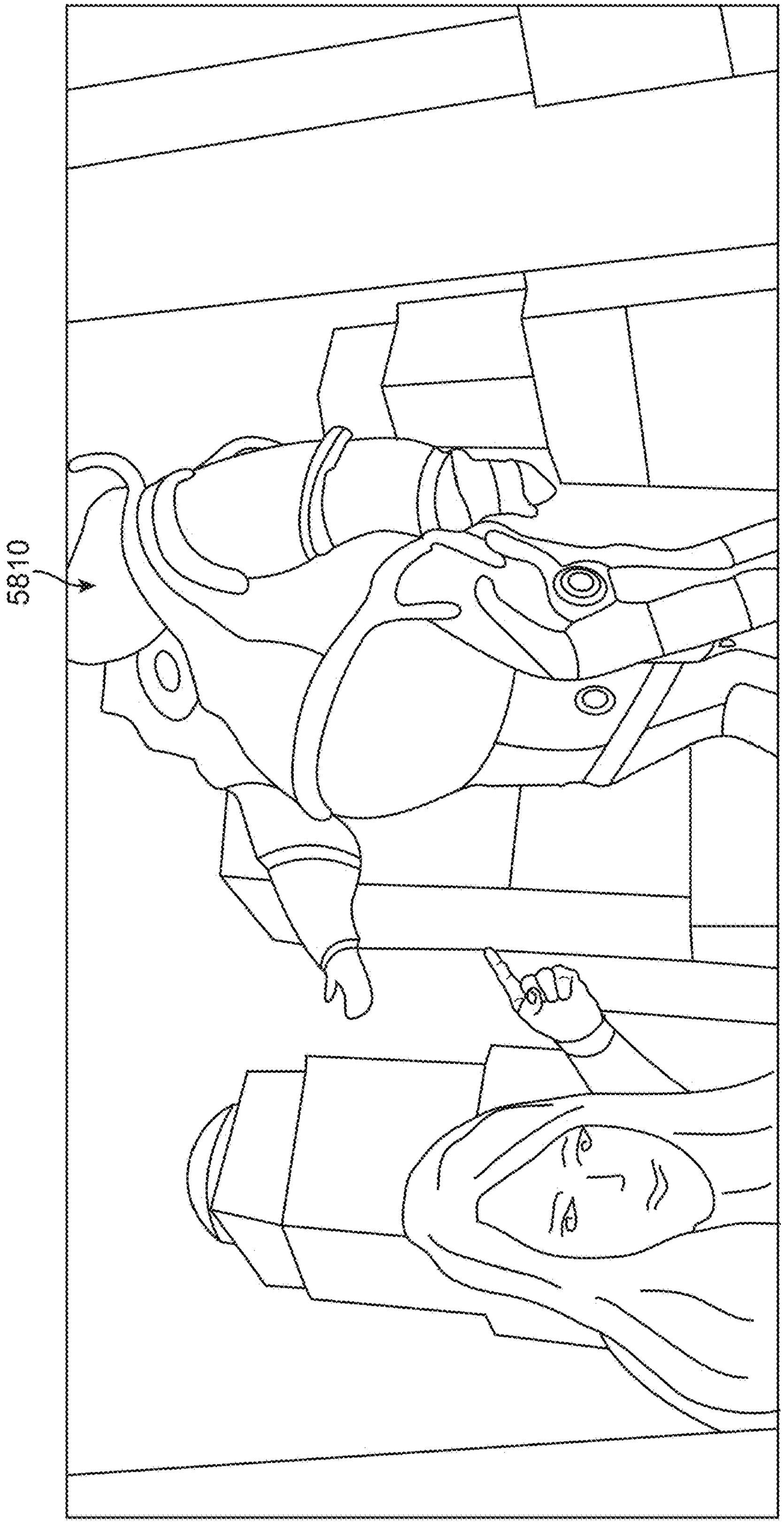
FIG. 58 illustrates an example illustration of a user's view when interfacing the AR system, according to one embodiment.

FIG. 58 illustrates an example illustration of a user's view when interfacing the AR system in an augmented reality mode. As shown in FIG. 58, the user sees the local, physical environment (e.g., a city having multiple buildings) as well as a virtual character 5810 (e.g., virtual object). The position of the virtual character 5810 may be triggered by a 2D visual target (for example, a billboard, postcard or magazine) and/or one or more 3D reference frames such as buildings, cars, people, animals, airplanes, portions of a building, and/or any 3D physical object, virtual object, and/or combinations thereof. In the example illustrated in FIG. 58, the known position of the buildings in the city may provide the registration fiducials and/or information and key features for rendering the virtual character 5810.

Additionally, the user's geospatial location (e.g., provided by GPS, attitude/position sensors, etc.) or mobile location relative to the buildings, may comprise data used by the computing network of the AR system to trigger the transmission of data used to display the virtual character(s) 5810. In some embodiments, the data used to display the virtual character 5810 may comprise the rendered character 5810 and/or instructions for rendering the virtual character 5810 or portions thereof.

In some embodiments, if the geospatial location of the user is unavailable or unknown, the AR system may still display the virtual object 5810 using an estimation algorithm that estimates where particular virtual objects and/or physical objects may be located, using the user's last known position as a function of time and/or other parameters. This may also be used to determine the position of any virtual objects in case the AR system's sensors become occluded and/or experience other malfunctions.

In some embodiments, virtual characters or virtual objects may comprise a virtual statue, wherein the rendering of the virtual statue is triggered by a physical object. For example, referring now to FIG. 59, a virtual statue 5910 may be triggered by a real, physical platform 5920. The triggering of the statue 5910 may be in response to a visual object or feature (e.g., fiducials, design features, geometry, patterns, physical location, altitude, etc.) detected by the user device or other components of the AR system. When the user views the platform 5920 without the user device, the user sees the platform 5920 with no statue 5910.

Figure 59:
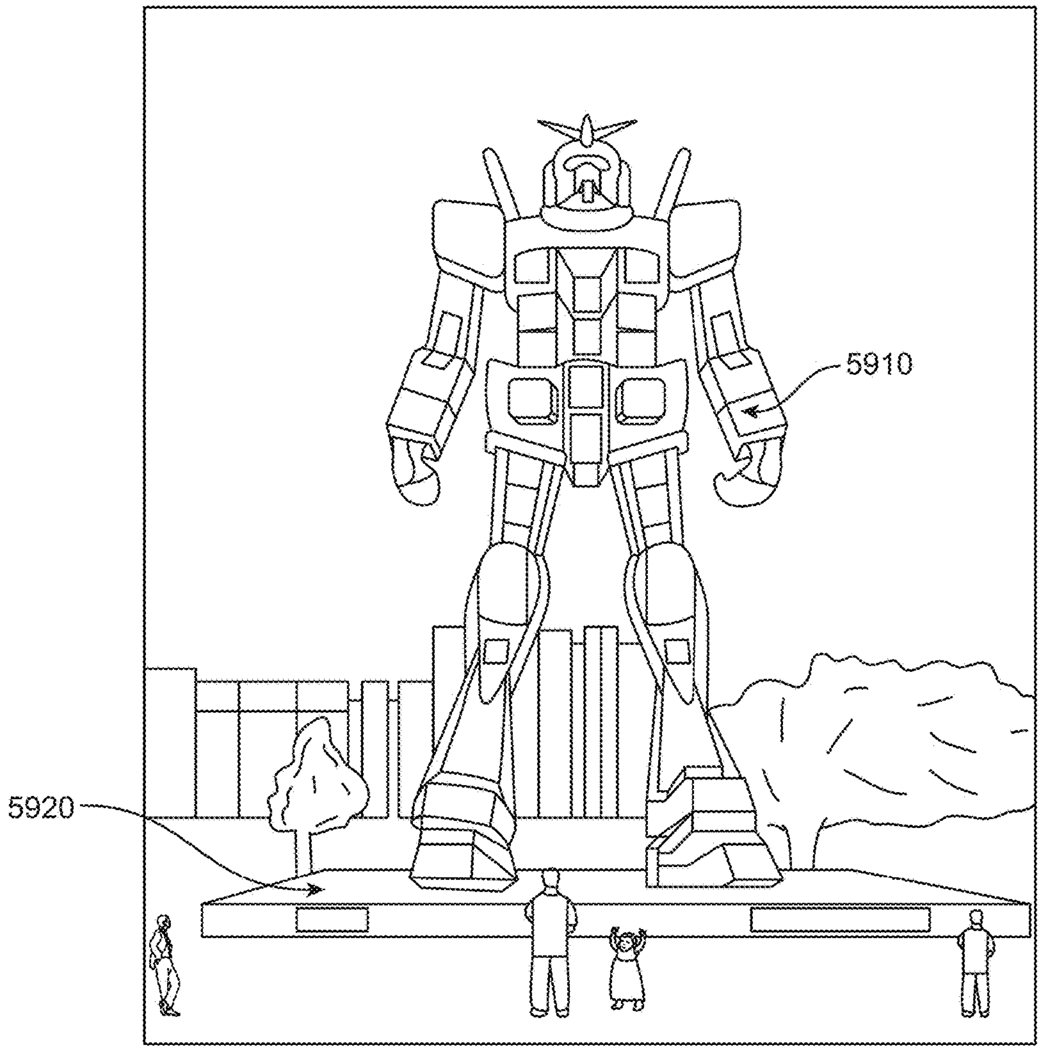
FIG. 59 illustrates an example illustration of a user's view showing a virtual object triggered by a physical object when the user is interfacing the system in an augmented reality mode, according to one embodiment.

However, when the user views the platform 5920 through the wearable AR device, the user sees the statue 5910 on the platform 5920 as shown in FIG. 59. The statue 5910 is a virtual object and, therefore, may be stationary, animated, change over time or with respect to the user's viewing position, or even change depending upon which particular user is viewing the statue 5910.

For example, if the user is a small child, the statue may be a dog. If the viewer is an adult male, the statue may be a large robot as shown in FIG. 59. These are examples of user dependent and/or state dependent experiences. This will help one or more users to perceive one or more virtual objects alone and/or in combination with physical objects and experience customized and personalized versions of the virtual objects. The statue 5910 (or portions thereof) may be rendered by various components of the system including, for example, software/firmware installed on the user device.

Using data that indicates the location and attitude of the user device, in combination with the registration features of the virtual object (e.g., statue 5910), the virtual object (e.g., statue 5910) is able to form a relationship with the physical object (e.g., platform 5920). For example, the relationship between one or more virtual objects with one or more physical objects may be a function of distance, positioning, time, geo-location, proximity to one or more other virtual objects, and/or any other functional relationship that includes virtual and/or physical data of any kind. In some embodiments, image recognition software in the user device may further enhance the virtual object-to-physical object relationship.

The interactive interface provided by the disclosed system and method may be implemented to facilitate various activities such as, for example, interacting with one or more virtual environments and objects, interacting with other users, as well as experiencing various forms of media content, including advertisements, music concerts, and movies. Accordingly, the disclosed system facilitates user interaction such that the user not only views or listens to the media content, but rather, actively participates in and experiences the media content. In some embodiments, the user participation may include altering existing content or creating new content to be rendered in one or more virtual worlds. In some embodiments, the media content, and/or users creating the content, may be themed around a mythopoeia of one or more virtual worlds.

In one example, musicians (or other users) may create musical content to be rendered to users interacting with a particular virtual world. The musical content may include, for example, various singles, EPs, albums, videos, short films, and concert performances. In one example, a large number of users may interface the AR system to simultaneously experience a virtual concert performed by the musicians.

In some embodiments, the media produced may contain a unique identifier code associated with a particular entity (e.g., a band, artist, user, etc.). The code may be in the form of a set of alphanumeric characters, UPC codes, QR codes, 2D image triggers, 3D physical object feature triggers, or other digital mark, as well as a sound, image, and/or both. In some embodiments, the code may also be embedded with digital media which may be interfaced using the AR system. A user may obtain the code (e.g., via payment of a fee) and redeem the code to access the media content produced by the entity associated with the identifier code. The media content may be added or removed from the user's interface.

In one embodiment, to avoid the computation and bandwidth limitations of passing real-time or near real-time video data from one computing system to another with low latency, such as from a cloud computing system to a local processor coupled to a user, parametric information regarding various shapes and geometries may be transferred and utilized to define surfaces, while textures maybe transferred and added to these surfaces to bring about static or dynamic detail, such as bitmap-based video detail of a person's face mapped upon a parametrically reproduced face geometry.

As another example, if a system recognizes a person's face, and recognizes that the person's avatar is located in an augmented world, the system may be pass the pertinent world information and the person's avatar information in one relatively large setup transfer, after which remaining transfers to a local computing system for local rendering may be limited to parameter and texture updates. This may include motion parameters of the person's skeletal structure and moving bitmaps of the person's face. These may require less bandwidth relative to the initial setup transfer or passing of real-time video.

Cloud-based and local computing assets thus may be used in an integrated fashion, with the cloud handling computation that does not require relatively low latency, and the local processing assets handling tasks wherein low latency is at a premium. In such a case, the form of data transferred to the local systems preferably is passed at relatively low bandwidth due to the form or amount of such data (e.g., parametric info, textures, etc. rather than real-time video of surroundings).

Figure 63:
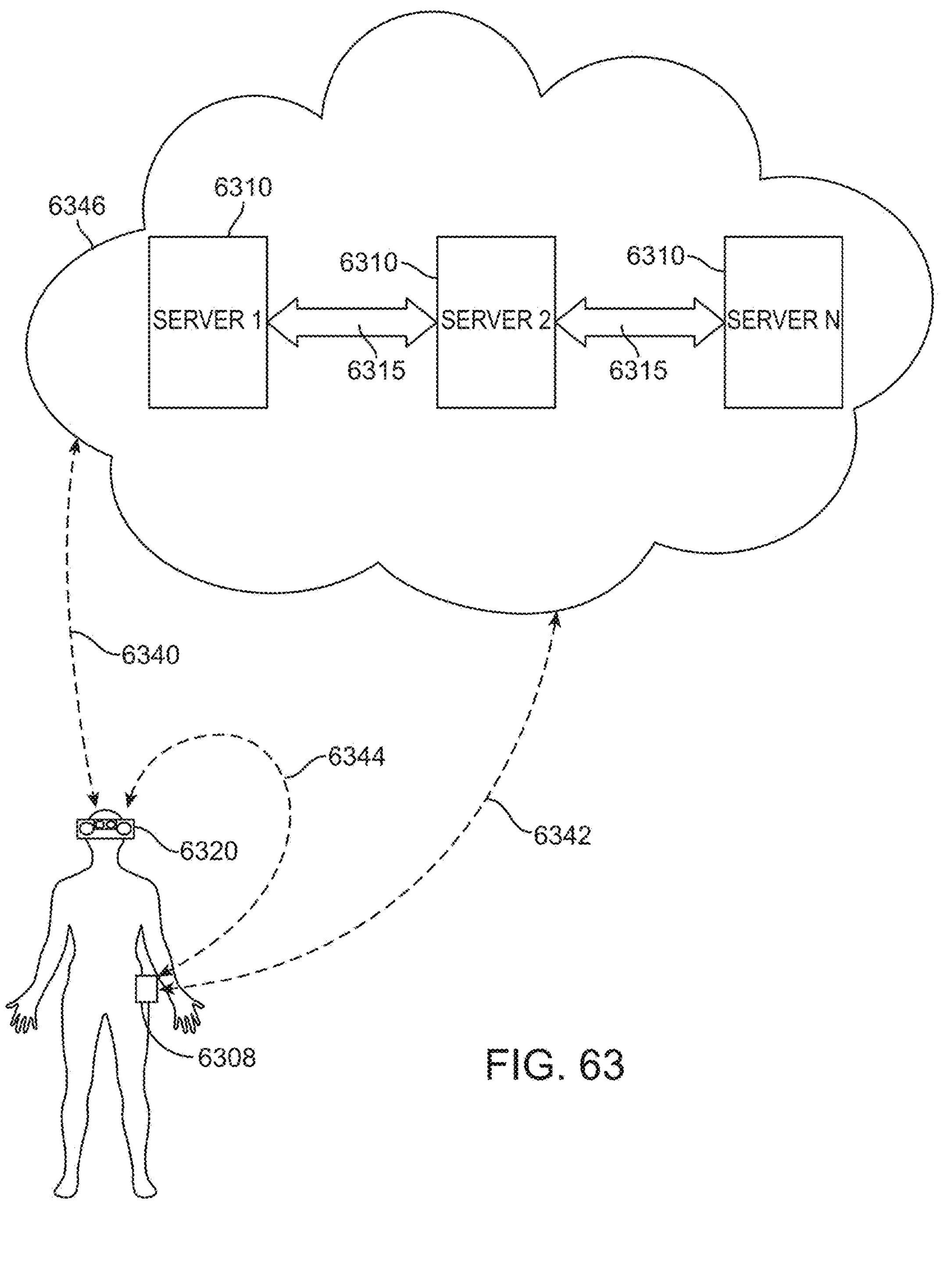
FIG. 63 illustrates one embodiment of local and cloud-based computing coordination.

Referring ahead to FIG. 63, a schematic illustrates coordination between cloud computing assets 6346 and local processing assets (6308, 6320). In one embodiment, the cloud 6346 assets are operatively coupled, such as via wired or wireless networking (wireless being preferred for mobility, wired being preferred for certain high-bandwidth or high-data-volume transfers that may be desired), directly to (6340, 6342) one or both of the local computing assets (6320, 6308), such as processor and memory configurations which may be housed in a structure to be coupled to a user's head or belt 6308.

These computing assets local to the user may be operatively coupled to each other as well, via wired and/or wireless connectivity configurations 6344. In one embodiment, to maintain a low-inertia and small-size head mounted subsystem 6320, primary transfer between the user and the cloud 6346 may be via the link between the belt-based subsystem 6308 and the cloud, with the head mounted subsystem 6320 primarily data-tethered to the belt-based subsystem 6308 using wireless connectivity, such as ultra-wideband ("UWB") connectivity, as is currently employed, for example, in personal computing peripheral connectivity applications.

As discussed at some length above, with efficient local and remote processing coordination, and an appropriate display device for a user, aspects of one world pertinent to a user's current actual or virtual location may be transferred or "passed" to the user and updated in an efficient fashion. Indeed, in one embodiment, with one person utilizing a virtual reality system ("VRS") in an augmented reality mode and another person utilizing a VRS in a completely virtual mode to explore the same world local to the first person, the two users may experience one another in that world in various fashions. For example, referring to FIG. 60, a scenario similar to that described in reference to FIG. 59 is depicted, with the addition of a visualization of an avatar 6002 of a second user who is flying through the depicted augmented reality world from a completely virtual reality scenario.

Figure 60:
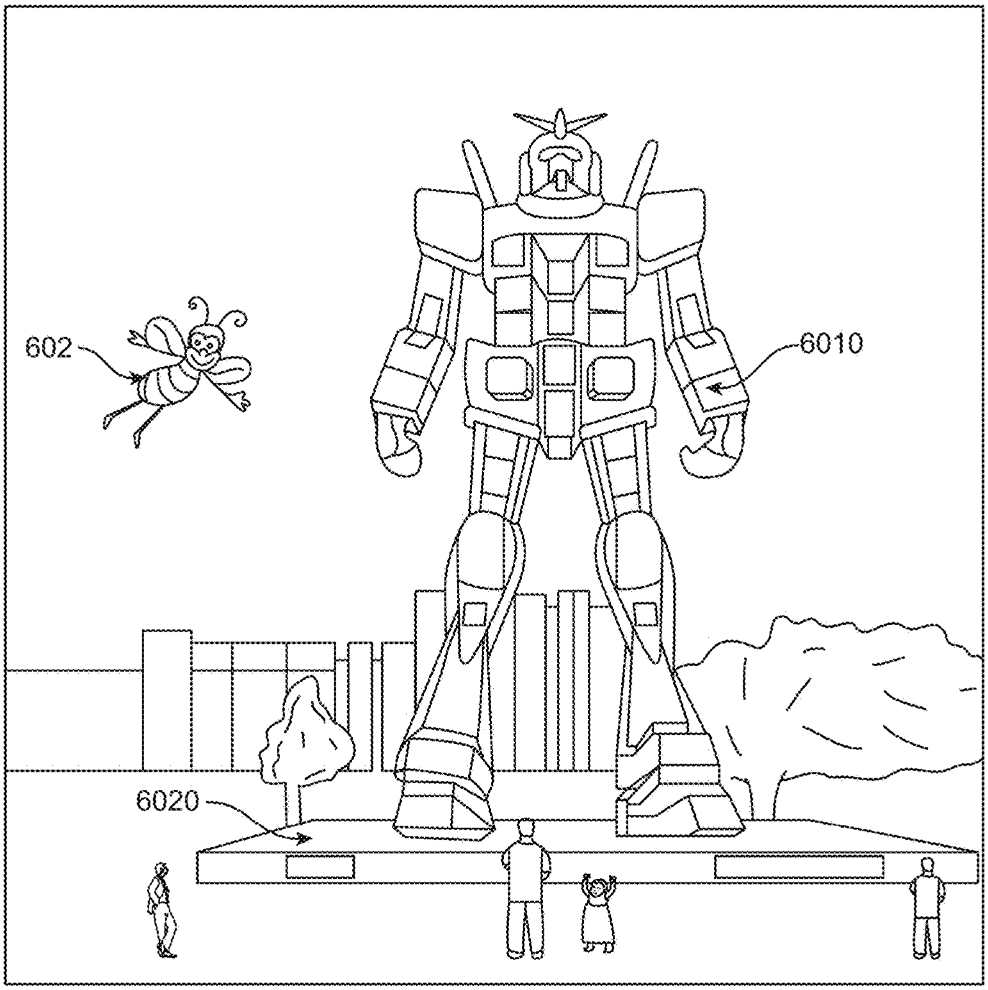
FIG. 60 illustrates one embodiment of an augmented and virtual reality integration configuration wherein one user in an augmented reality experience visualizes the presence of another user in a virtual realty experience.

In other words, the scene depicted in FIG. 60 may be experienced and displayed in augmented reality for the first person—with two augmented reality elements (the statue 6010 and the flying bumble bee avatar 2 of the second person) displayed in addition to actual physical elements around the local world in the scene, such as the ground, the buildings in the background, the statue platform 6020. Dynamic updating may be utilized to allow the first person to visualize progress of the second person's avatar 2 as the avatar 2 flies through the world local to the first person.

Again, with a configuration as described above, in which there is one world model that can reside on cloud computing resources and be distributed from there, such world can be "passable" to one or more users in a relatively low bandwidth form. This may be preferable rather than passing real-time video data. The augmented experience of the person standing near the statue (e.g., as shown in FIG. 60) may be informed by the cloud-based world model, a subset of which may be passed down to them and their local display device to complete the view.

A person sitting at a remote AR device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, where the trees are, where the statue is, etc. Using this information and data from the cloud, the joining friend can download aspects of the scenario from the cloud, and then start walking along as an augmented reality local relative to the person who is actually in the park.

Figure 61:
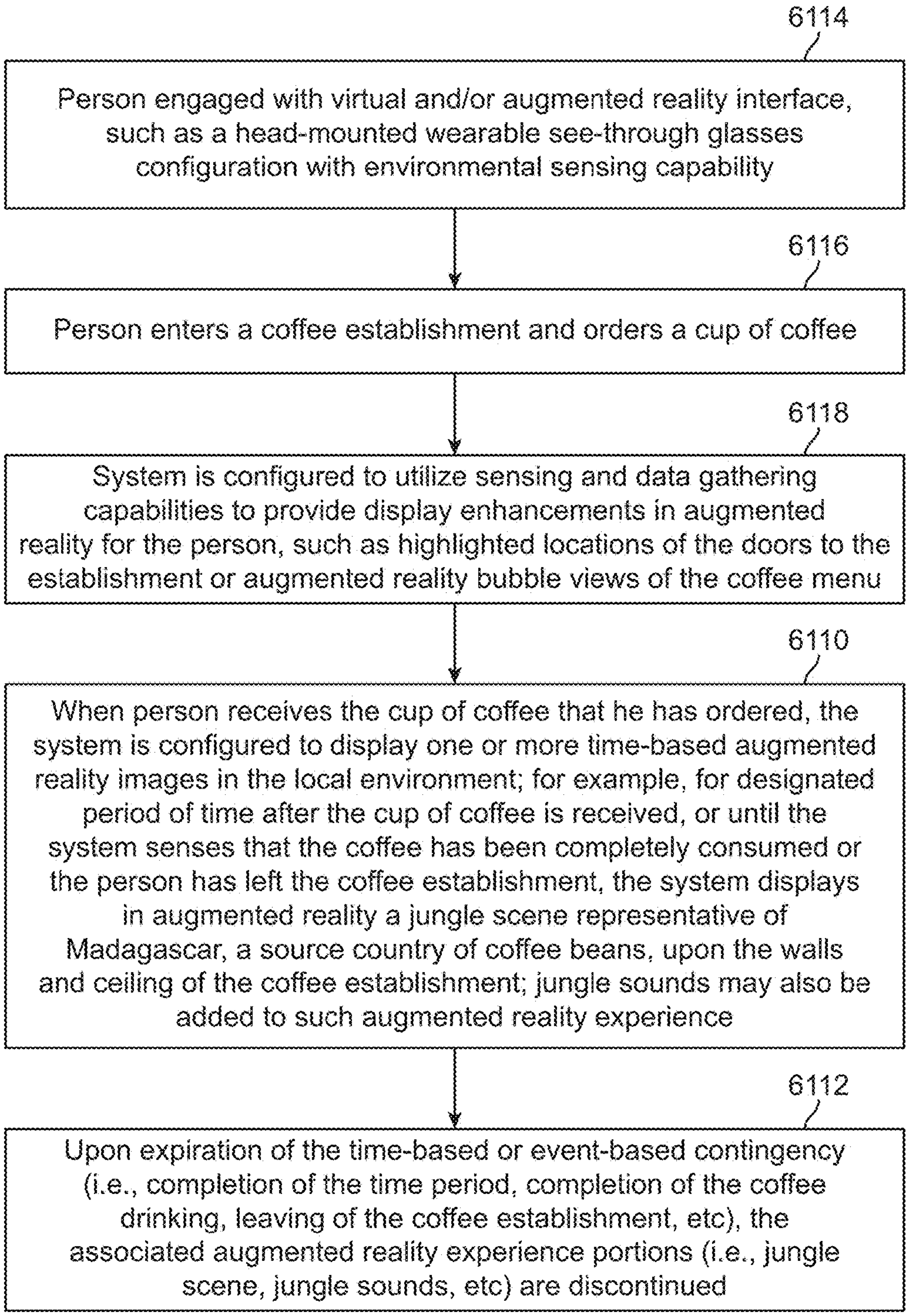
FIG. 61 illustrates one embodiment of a time and/or contingency event based augmented reality experience configuration.

Referring to FIG. 61, a time and/or other contingency parameter based embodiment is depicted, wherein a person is engaged with a virtual and/or augmented reality interface is utilizing the AR system (6104) and enters a coffee establishment to order a cup of coffee (6106). The VRS may utilize sensing and data gathering capabilities, locally and/or remotely, to provide display enhancements in augmented and/or virtual reality for the person, such as highlighted locations of doors in the coffee establishment or bubble windows of the pertinent coffee menu (6108).

When the user receives the cup of coffee that he has ordered, or upon detection by the system of some other pertinent parameter, the system may display (6110) one or more time-based augmented or virtual reality images, video, and/or sound in the local environment with the display device, such as a Madagascar jungle scene from the walls and ceilings, with or without jungle sounds and other effects, either static or dynamic.

Such presentation to the user may be discontinued based upon a timing parameter (e.g., 5 minutes after the full coffee cup has been recognized and handed to the user; 10 minutes after the system has recognized the user walking through the front door of the establishment, etc.) or other parameter, such as a recognition by the system that the user has finished the coffee by noting the upside down orientation of the coffee cup as the user ingests the last sip of coffee from the cup—or recognition by the system that the user has left the front door of the establishment (6312).

Figure 62:
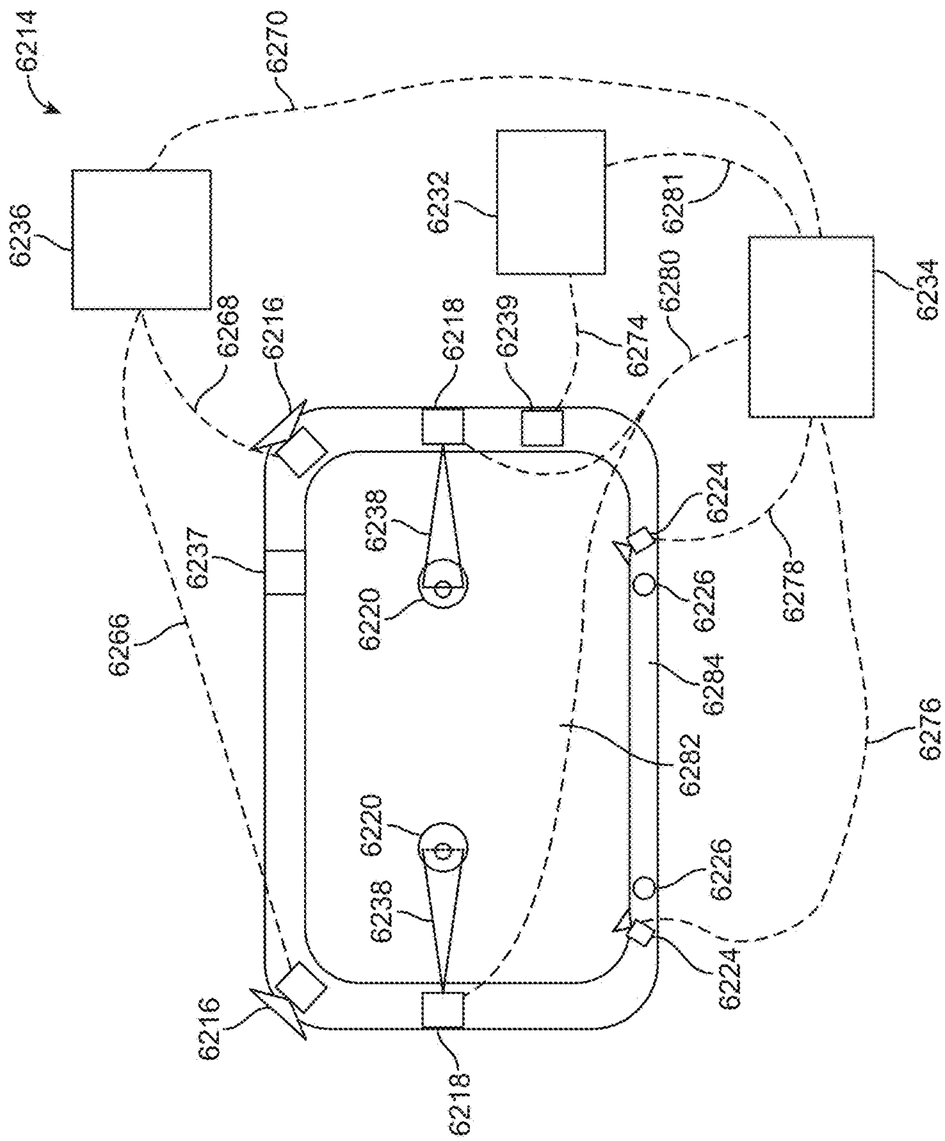
FIG. 62 illustrates one embodiment of a user display configuration suitable for virtual and/or augmented reality experiences.

Referring to FIG. 62, one embodiment of a suitable user display device 6214 is shown, comprising a display lens 6282 which may be mounted to a user's head or eyes by a housing or frame 6284. The display lens 6282 may comprise one or more transparent mirrors positioned by the housing 6284 in front of the user's eyes 6220 and to deliver projected light 6238 into the eyes 6220 and facilitate beam shaping, while also allowing for transmission of at least some light from the local environment in an augmented reality configuration.

In a virtual reality configuration, it may be desirable for the display system 6214 to be capable of blocking substantially all light from the local environment, such as by a darkened visor, blocking curtain, all black LCD panel mode or the like. In the depicted embodiment, two wide-field-of-view machine vision cameras 6216 are coupled to the housing 6284 to image the environment around the user. In one embodiment these cameras 6216 are dual-capture visible light/infrared light cameras. The depicted embodiment also comprises a pair of scanned-laser shaped-wavefront (e.g., for depth) light projector modules with display mirrors and optics to project light 6238 into the eyes 6220 as shown.

The depicted embodiment also comprises two miniature infrared cameras 6224 paired with infrared light sources 6226 (e.g., light emitting diodes "LED"s), which track the eyes 6220 of the user to support rendering and user input. The system 6214 further features a sensor assembly 6239, which may comprise X, Y, and Z axis accelerometer capability as well as a magnetic compass and X, Y, and Z axis gyro capability, preferably providing data at a relatively high frequency, such as 200 Hz.

The depicted system 6214 also comprises a head pose processor 6236 such as an ASIC (application specific integrated circuit), FPGA (field programmable gate array), and/or ARM processor (advanced reduced-instruction-set machine), which may calculate real or near-real time user head pose from wide field of view image information output from the capture devices 6216. Also shown is another processor 6232 to execute digital and/or analog processing to derive pose from the gyro, compass, and/or accelerometer data from the sensor assembly 6239.

The depicted embodiment also features a GPS 6237 (e.g., global positioning satellite) subsystem to assist with pose and positioning. Finally, the depicted embodiment comprises a rendering engine 6234 which may feature hardware running a software program to provide rendering information local to the user to facilitate operation of the scanners and imaging into the eyes of the user, for the user's view of the world.

The rendering engine 6234 is operatively coupled (6281, 6270, 6276, 6278, 6280) (e.g., via wired or wireless connectivity) to the sensor pose processor 6232, the image pose processor 6236, the eye tracking cameras 6224, and the projecting subsystem 6218 such that light of rendered augmented and/or virtual reality objects is projected using a scanned laser arrangement 6218 in a manner similar to a retinal scanning display. Other embodiments may utilize other optical arrangements similar to the various optical embodiments discussed above.

The wavefront of the projected light beam 6238 may be bent or focused to coincide with a desired focal distance of the augmented and/or virtual reality object. The mini infrared cameras 6224 may be utilized to track the eyes to support rendering and user input (e.g., where the user is looking, depth of focus, etc.). As discussed below, eye vergence may be utilized to estimate depth of focus.

The GPS 6237, gyros, compass, and accelerometers 6239 may be utilized to provide course and/or fast pose estimates. The camera 6216 images and pose information, in conjunction with data from an associated cloud computing resource, may be utilized to map the local world and share user views with a virtual or augmented reality community.

While much of the hardware in the display system 6214 featured in FIG. 62 is depicted directly coupled to the housing 6284 which is adjacent the display 6282 and eyes 6220 of the user, the hardware components depicted may be mounted to or housed within other components, such as a belt-mounted component.

In one embodiment, all of the components of the system 6214 featured in FIG. 62 are directly coupled to the display housing 6284 except for the image pose processor 6236, sensor pose processor 6232, and rendering engine 6234. It should be appreciated that communication between the image pose processor 6236, sensor pose processor 6232 and the rendering engine 6243 may be through wireless communication, such as ultra wideband, or wired communication.

The depicted housing 6284 is of a shape that naturally fits the user and is able to be head-mounted on the user's head. The housing 6284 may also feature speakers, such as those which may be inserted into the ears of a user and utilized to provide sound to the user which may be pertinent to an augmented or virtual reality experience such as the jungle sounds referred to in reference to FIG. 61, and microphones, which may be utilized to capture sounds local to the user.

In one or more embodiments, the mini-cameras 6224 may be utilized to measure where the centers of a user's eyes 6220 are geometrically verged to, which, in general, coincides with a position of focus, or "depth of focus", of the eyes 6220. As discussed above, a 3-dimensional surface of all points that the eyes verge to is called the "horopter". The focal distance may take on a finite number of depths, or may be infinitely varying. Light projected from the vergence distance appears to be focused to the subject eye 6220, while light in front of or behind the vergence distance is blurred.

Further, it has been discovered that spatially coherent light with a beam diameter of less than about 0.7 millimeters is correctly resolved by the human eye regardless of where the eye focuses. Given this understanding, to create an illusion of proper focal depth, the eye vergence may be tracked with the mini cameras 6224, and the rendering engine 6234 and projection subsystem 6218 may be utilized to render all objects on or close to the horopter in focus, and all other objects at varying degrees of defocus (e.g., using intentionally-created blurring).

Preferably the system 6214 renders to the user at a frame rate of about 60 frames per second or greater. As described above, preferably the mini cameras 6224 may be utilized for eye tracking, and software may pick up not only vergence geometry but also focus location cues to serve as user inputs. Preferably such a system has brightness and contrast suitable for day or night use. In one embodiment such a system preferably has latency of less than about 20 milliseconds for visual object alignment, less than about 0.1 degree of angular alignment, and about 1 arc minute of resolution, which is approximately the limit of the human eye.

The display system 6214 may be integrated with a localization system, which may involve the GPS element, optical tracking, compass, accelerometer, and/or other data sources, to assist with position and pose determination. It should be appreciated that localization information may be utilized to facilitate accurate rendering in the user's view of the pertinent world (e.g., such information would facilitate the glasses to know where they are with respect to the real world).

Other suitable display devices may include but are not limited to desktop and mobile computers, smartphones, smartphones which may be enhanced additionally with software and hardware features to facilitate or simulate 3-D perspective viewing (for example, in one embodiment a frame may be removably coupled to a smartphone, the frame featuring a 200 Hz gyro and accelerometer sensor subset, two small machine vision cameras with wide field of view lenses, and an ARM processor—to simulate some of the functionality of the configuration featured in FIG. 14), tablet computers, tablet computers which may be enhanced as described above for smartphones, tablet computers enhanced with additional processing and sensing hardware, head-mounted systems that use smartphones and/or tablets to display augmented and virtual viewpoints (visual accommodation via magnifying optics, mirrors, contact lenses, or light structuring elements), non-see-through displays of light emitting elements (LCDs, OLEDs, vertical-cavity-surface-emitting lasers, steered laser beams, etc.), see-through displays that simultaneously allow humans to see the natural world and artificially generated images (for example, light-guide optical elements, transparent and polarized OLEDs shining into close-focus contact lenses, steered laser beams, etc.), contact lenses with light-emitting elements (they may be combined with specialized complimentary eyeglasses components), implantable devices with light-emitting elements, and implantable devices that stimulate the optical receptors of the human brain.

With a system such as that depicted in FIG. 63, 3-D points may be captured from the environment, and the pose (e.g., vector and/or origin position information relative to the world) of the cameras that capture those images or points may be determined, such that these points or images may be "tagged", or associated, with this pose information. Then points captured by a second camera (e.g., another AR system) may be utilized to determine the pose of the second camera.

In other words, one can orient and/or localize a second camera based upon comparisons with tagged images from a first camera. This knowledge may be utilized to extract textures, make maps, and create a virtual copy of the real world (because then there are two cameras around that are registered). Thus, at the base level, in one embodiment the AR system can capture both 3-D points and the 2-D images that produced the points, and these points and images may be sent out to a cloud storage and processing resource. They may also be cached locally with embedded pose information (e.g., cache the tagged images), such that the cloud may be able to access (e.g., in available cache) tagged 2-D images (e.g., tagged with a 3-D pose), along with 3-D points.

If a user is observing something dynamic, the AR system of the user may also send additional information up to the cloud pertinent to the motion (for example, if looking at another person's face, the user can take a texture map of the face and push the texture map up at an optimized frequency even though the surrounding world is otherwise basically static).

The cloud system may save some points as fiducials for pose only, to reduce overall pose tracking calculation. Generally it may be desirable to use some outline features in order to track major items in a user's environment, such as walls, a table, etc., as the user moves around the room. The user may desire to "share" the world and have some other user walk into that room and also see those points. Such useful and key points may be termed "fiducials" because they are fairly useful as anchoring points. They are related to features that may be recognized with machine vision, and that can be extracted from the world consistently and repeatedly on different pieces of user hardware. Thus these fiducials preferably may be saved to the cloud for further use.

In one embodiment it is preferable to have a relatively even distribution of fiducials throughout the pertinent world, because they are the kinds of items that cameras can easily use to recognize a location.

In one embodiment, the pertinent cloud computing configuration to groom the database of 3-D points and any associated metadata periodically to use the best data from various users for both fiducial refinement and world creation. In other words, the system may get the best dataset by using inputs from various users looking and functioning within the pertinent world. In one embodiment the database is intrinsically fractal—as users move closer to objects, the cloud passes higher resolution information to such users. As a user maps an object more closely, that data is sent to the cloud, and the cloud can add new 3-D points and image-based texture maps to the database if the new points are better than the previously stored points. It should be appreciated that this process may run for multiple users simultaneously.

As described above, an AR or VR experience may rely, in large part, on recognizing certain types of objects. For example, it may be important to understand that a particular object has a given depth in order to recognize and understand such object. As described in some length above, recognizer software objects ("recognizers") may be deployed on cloud or local resources to specifically assist with recognition of various objects on either or both platforms as a user is navigating data in a world.

For example, if a system has data for a world model comprising 3-D point clouds and pose-tagged images, and there is a desk with a bunch of points on it as well as an image of the desk, the geometry of the desk may be taught to the system in order for the system to recognize it. In other words, some 3-D points in space and an image shows most of the desk may not be enough to instantly recognize that a desk is being observed.

To assist with this identification, a specific object recognizer may be created that run on the raw 3-D point cloud, segment out a set of points, and, for example, extract the plane of the top surface of the desk. Similarly, a recognizer may be created to segment out a wall from 3-D points, such that a user may simply change a "virtual" wallpaper or remove a part of the wall in virtual or augmented reality and/or have a portal to another virtual room that is not part of the real world.

Such recognizers operate within the data of a world model and may be thought of as software "robots" that crawl a world model and imbue that world model with semantic information, or an ontology about what is believed to exist amongst the points in space. Such recognizers or software robots may be configured such that their entire existence is about going around the pertinent world of data and finding things that it believes are walls, or chairs, or other items. They may be configured to tag a set of points with the functional equivalent of, "this set of points belongs to a wall", and may comprise a combination of point-based algorithm and pose-tagged image analysis for mutually informing the system regarding what is in the points.

Object recognizers may be created for many purposes of varied utility, depending upon the perspective. For example, in one embodiment, a purveyor of coffee such as Starbucks® may invest in creating an accurate recognizer of Starbucks coffee cups within pertinent worlds of data. Such a recognizer may crawl worlds of data large and small searching for Starbucks coffee cups, so they may be segmented out and identified to a user when operating in the pertinent nearby space (e.g., perhaps to offer the user a coffee in the Starbucks outlet right around the corner when the user looks at his Starbucks cup for a certain period of time).

With the cup segmented out, it may be recognized quickly when the user moves it on his desk. Such recognizers may run or operate not only on cloud computing resources and data, but also on local resources and data, or both cloud and local, depending upon computational resources available. In one embodiment, there is a global copy of the world model on the cloud with millions of users contributing to that global model. However, for smaller worlds (e.g., an office of a particular individual in a particular town), local information will not be of relevant to most users of the world. Thus, the system may groom data and move to local cache information that is believed to be most locally pertinent to a given user.

In one embodiment, for example, when a user walks up to a desk, related information (such as the segmentation of a particular cup on his table) may reside only upon his local computing resources and not on the cloud, because objects that are identified as ones that move often, such as cups on tables, need not burden the cloud model and transmission burden between the cloud and local resources.

Thus the cloud computing resource may segment 3-D points and images, thus factoring permanent (e.g., generally not moving) objects from movable ones, and this may affect where the associated data is to remain, where it is to be processed, remove processing burden from the wearable/local system for certain data that is pertinent to more permanent objects. This also allows one-time processing of a location which then may be shared with limitless other users, allow multiple sources of data to simultaneously build a database of fixed and movable objects in a particular physical location, and segment objects from the background to create object-specific fiducials and texture maps.

In one embodiment, the system may query a user for input about the identity of certain objects (for example, the system may present the user with a question such as, "is that a Starbucks coffee cup?"), such that the user may train the system and allow the system to associate semantic information with objects in the real world. An ontology reference may provide guidance regarding objects segmented from the world (e.g., what the objects do, how the objects behave, etc.). In one embodiment the system may feature a virtual or actual keypad, such as a wirelessly connected keypad, connectivity to a keypad of a smartphone, or the like, to facilitate certain user input to the system.

The system may share basic elements (walls, windows, desk geometry, etc.) with any user who walks into the room in virtual or augmented reality, and in one embodiment that person's system may take images from his particular perspective and upload those to the cloud. Then the cloud becomes populated with old and new sets of data and can run optimization routines and establish fiducials that exist on individual objects.

It should be appreciated that GPS and other localization information may be utilized as inputs to such processing. Further, other computing systems and data, such as one's online calendar or Facebook® account information, may be utilized as inputs (for example, in one embodiment, a cloud and/or local system may analyze the content of a user's calendar for airline tickets, dates, and destinations, such that over time, information may be moved from the cloud to the user's local systems to be ready for the user's arrival time in a given destination).

In one embodiment, cloud resources may pass digital models of real and virtual worlds between users, as described above in reference to "passable worlds", with the models being rendered by the individual users based upon parameters and textures. This reduces bandwidth relative to the passage of real-time video, allows rendering of virtual viewpoints of a scene, and allows millions or more users to participate in one virtual gathering without sending each of them data that they need to see (such as video), because the user's views are rendered by their local computing resources.

The AR system may register the user location and field of view (together known as the "pose") through one or more of the following: real-time metric computer vision using the cameras, simultaneous localization and mapping techniques, maps, and data from sensors such as gyros, accelerometers, compass, barometer, GPS, radio signal strength triangulation, signal time of flight analysis, LIDAR ranging, RADAR ranging, odometry, and sonar ranging.

The AR system may simultaneously map and orient. For example, in unknown environments, the AR system may collect information about the environment, ascertaining fiducial points suitable for user pose calculations, other points for world modeling, images for providing texture maps of the world. Fiducial points may be used to optically calculate pose.

As the world is mapped with greater detail, more objects may be segmented out and given their own texture maps, but the world still preferably is representable at low spatial resolution in simple polygons with low resolution texture maps. Other sensors, such as those discussed above, may be utilized to support this modeling effort. The world may be intrinsically fractal in that moving or otherwise seeking a better view (through viewpoints, "supervision" modes, zooming, etc.) request high-resolution information from the cloud resources. Moving closer to objects captures higher resolution data, and this may be sent to the cloud, which may calculate and/or insert the new data at interstitial sites in the world model.

Figure 64:
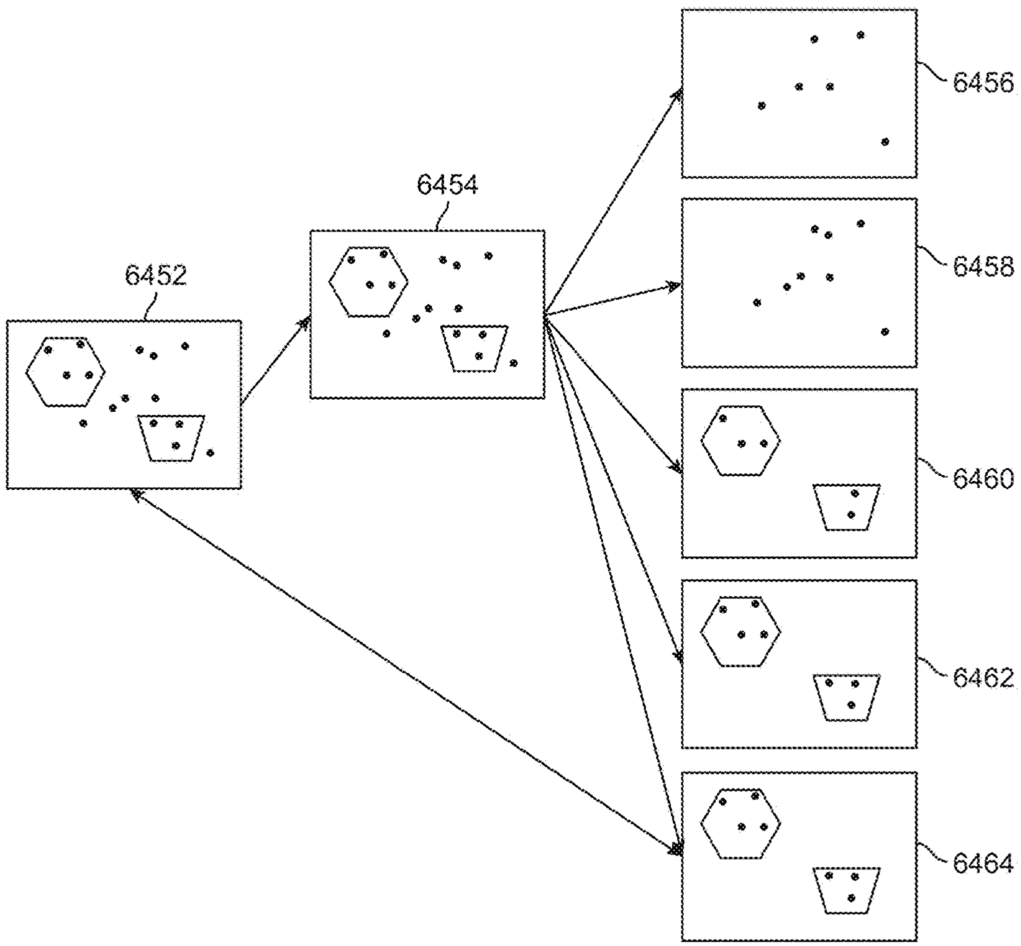
FIG. 64 illustrates various aspects of registration configurations, according to one illustrated embodiment.

Referring to FIG. 64, a wearable system may capture image information and extract fiducials and recognized points 6452. The wearable local system may calculate pose using one of the pose calculation techniques mentioned below. The cloud 6454 may use images and fiducials to segment 3-D objects from more static 3-D background. Images may provide textures maps for objects and the world (textures may be real-time videos). The cloud resources may store and make available static fiducials and textures for world registration.

The cloud resources may groom the point cloud for optimal point density for registration. The cloud resources 6460 may store and make available object fiducials and textures for object registration and manipulation. The cloud may groom point clouds for optimal density for registration. The cloud resource 6462 may use all valid points and textures to generate fractal solid models of objects. The cloud may groom point cloud information for optimal fiducial density. The cloud resource 6464 may query users for training on identity of segmented objects and the world. As described above, an ontology database may use the answers to imbue objects and the world with actionable properties.

The following specific modes of registration and mapping feature the terms "O-pose", which represents pose determined from the optical or camera system; "s-pose", which represents pose determined from the sensors (e.g., such as a combination of GPS, gyro, compass, accelerometer, etc. data, as discussed above); and an AR server (which represents the cloud computing and data management resource).

The "Orient" mode makes a basic map of a new environment, the purpose of which is to establish the user's pose if the new environment is not mapped, or if the user is not connected to the AR servers. In the Orient mode, the wearable system extracts points from an image, tracks the points from frame to frame, and triangulates fiducials using the S-pose (since there are no fiducials extracted from images). The wearable system may also filter out bad fiducials based on persistence of the user.

It should be appreciated that the Orient mode is the most basic mode of registration and mapping and will always work even for a low-precision pose. However after the AR system has been used in relative motion for at least a little time, a minimum fiducial set will have been established such that the wearable system is set for using the O-pose to recognize objects and to map the environment. As soon as the O-pose is reliable (with the minimum fiducial set) the wearable set may exit out of the Orient mode. The "Map and O-pose" mode may be used to map an environment. The purpose of the map and O-pose mode is to establish high-precisions poses, to map the environment and to provide the map and images to the AR servers. In this mode, the O-pose is calculated from mature world fiducials downloaded from the AR server and/or determined locally.

It should be appreciated, however, that the S-pose may be used as a check of the calculated o-pose, and may also be used to speed up computation of the O-pose. Similar to above, the wearable system extracts points from images, and tracks the points from frame to frame, triangulates fiducials using the O-pose, and filters out bad fiducials based on persistence. The remaining fiducials and pose-tagged images are then provided to the AR server cloud.

It should be appreciated that the these functions (extraction of points, filtering out bad fiducials and providing the fiducials and pose-tagged images) need not be performed in real-time and may be performed at a later time to preserve bandwidth.

The O-pose is used to determine the user's pose (user location and field of view). The purpose of the O-pose is to establish a high-precision pose in an already mapped environment using minimum processing power. Calculating the o-pose involves several steps.

To estimate a pose at n, the wearable system may use historical data gathered from S-poses and O-poses (n−1, n−2, n−3, etc.). The pose at n is then used to project fiducials into the image captured at n to create an image mask from the projection. The wearable system extracts points from the masked regions and calculates the O-pose from the extracted points and mature world fiducials.

It should be appreciated that processing burden is greatly reduced by only searching/extracting points from the masked subsets of a particular image. Going one step further, the calculated o-pose at n, and the s-pose at n may be used to estimate a pose at n+1. The pose-tagged images and/or video may be transmitted to the AR server cloud.

The "Super-res" mode may be used to create super resolution imagery and fiducials. Composite pose-tagged images may be used to create super-resolution images, which may in turn be used to enhance fiducial position estimation. It should be appreciated that iterate O-pose estimates from super-resolution fiducials and imagery. The above steps may be performed real-time on the wearable device or may be transmitted to the AR server cloud and performed at a later time.

In one embodiment, the AR system may have certain base functionality, as well as functionality facilitated by "apps" or applications that may be distributed through the AR system to provide certain specialized functionalities. For example, the following apps may be installed to the subject AR system to provide specialized functionality.

In one embodiment, if the display device tracks 2-D points through successive frames, then fits a vector-valued function to the time evolution of those points, it is possible to sample the vector valued function at any point in time (e.g. between frames) or at some point in the near future (by projecting the vector-valued function forward in time. This allows creation of high-resolution post-processing, and prediction of future pose before the next image is actual captured (e.g., doubling the registration speed is possible without doubling the camera frame rate).

For body-centric rendering (as opposed to head-fixed or world-fixed renderings) an accurate view of body is desired. Rather than measuring the body, in one embodiment is possible to derive its location through the average position of a user's head. If the user's face points forward most of the time, a multi-day average of head position will reveal that direction.

In conjunction with the gravity vector, this provides a reasonably stable coordinate frame for body-fixed rendering. Using current measures of head position with respect to this long-duration coordinate frame allows consistent rendering of objects on/around a user's body—with no extra instrumentation. For implementation of this embodiment, single register averages of head direction-vector may be started, and a running sum of data divided by delta-t will give current average head position. Keeping five or so registers, started on day n−5, day n−4, day n−3, day n−2, day n−1 allows use of rolling averages of only the past "n" days.

In one embodiment, a scene may be scaled down and presented to a user in a smaller-than-actual space. For example, in a situation wherein there is a scene that may be rendered in a huge space (e.g., such as a soccer stadium), there may be no equivalent huge space present, or such a large space may be inconvenient to a user. In one embodiment the system may reduce the scale of the scene, so that the user may watch it in miniature. For example, one could have a bird's eye-view video game, or a world championship soccer game, play out in an unscaled field—or scaled down and presented on a living room floor. The system may simply shift the rendering perspective, scale, and associated accommodation distance.

The system may also draw a user's attention to specific items within a presented scene by manipulating focus of virtual or augmented reality objects, by highlighting them, changing the contrast, brightness, scale, etc.

Preferably the system may accomplish the following modes. In open-space-rendering mode, the system may grab key points from a structured environment, and fill in the space between with renderings. This mode may be used to create potential venues, like stages, output space, large indoor spaces, etc.

In object-wrapping mode, the system may recognize a 3D object in the real world, and then augment it. "Recognition" in this context may mean identifying the 3D object with high enough precision to anchor imagery to the 3D object. It should be appreciated that recognition, in this context, may either mean classifying the type of an object (e.g., a face of a person), and/or classifying a particular instance of an object (e.g., Joe, a person). Using these principles in mind, the recognizer software can be used to recognize various things, like walls, ceilings, floors, faces, roads, the sky, skyscrapers, ranch houses, tables, chairs, cars, road signs, billboards, doors, windows, bookshelves, etc. Some recognizer software programs may be Type I, and have generic functionality (e.g., "put my video on that wall", "that is a dog", etc.), while other recognizer software programs may be Type II, and have specific functionality (my TV is on_my_living room wall 3.2 feet from the ceiling", "that is Fido", etc.)

In body-centric rendering, any rendered virtual objects are fixed to the user's body. For example, some objects may float around the user's body (e.g., a user's belt). Accomplishing this requires knowing the position of the body, and not just the head. However, the position of the body may be estimated by the position of the head. For example, heads usually point forward parallel to the ground. Also, the position of the body may become more accurate with time by using data acquired by a long-term average of users' head positions.

Type II recognized objects may be linked to an online database of various 3D models. When starting the recognition process, it is ideal to start with objects that have commonly available 3D models, like cars or public utilities.

The system may also be used for virtual presence, e.g., enabling a user to paint a remote person's avatar into a particular open space. This may be considered a subset of "open space rendering," discussed above. The user may create a rough geometry of a local environment and iteratively send both geometry and texture maps to others. The user may grant permission for others to enter their environment, however. Subtle voice cues, hand tracking, and head motion may be sent to the remote avatar. Based on the above information, the avatar may be animated. It should be appreciated that creating virtual presence minimizes bandwidth and may be used sparingly.

The system may also be configured for making an object "a portal" to another room. In other words, instead of showing an avatar in a local room, a recognized object (e.g. a wall) may be used as a portal to another's user's environments. Thus, multiple users may be sitting in their own rooms, looking "through" walls into the environments of other users.

The system may also be configured for creating a dense digital model of an area when a group of cameras (people) view a scene from different perspectives. This model may be render-able from any vantage point as long as the area is viewed through at least one camera. For example, a wedding scene may be rendered through vantage points of multiple users. It should be appreciated that recognizers may differentiate and map stationary objects differently from moving objects (e.g. walls have stable texture maps, while people have higher frequency moving texture maps).

With rich digital model updated in real time, scenes may be rendered from any perspective. Going back to the wedding example, an attendee in the back may fly in the air to the front row for a better view. Or an off-site attendee can find a "seat" either with an avatar, or invisible, if permitted by an organizer. Attendees can show moving avatars, or may have the avatars hidden from view. It should be appreciated that this aspect likely requires extremely high bandwidth. High-frequency data may be streamed through the crowd on a high-speed local wireless connection, while low frequency data may come from the AR server in the cloud. In the above example, because all attendees of the wedding may have high precision position information, therefore making an optimal routing path for local networking trivial.

For communication to the system, or between users, simple silent messaging is often desirable. For example, a finger chording keyboard may be used. In an optional embodiment, tactile glove solutions may offer enhanced performance.

To give a full virtual reality experience to users, the vision system is darkened and the user is shown a view that is not overlaid with the real world. Even in this mode, a registration system may still be necessary to track a user's head position. There may be several modes that may be used to experience full virtual reality. For example, in the "couch" mode, the users may be able to fly. In the "walking" mode, objects of the real world may be re-rendered as virtual objects so that the user does not collide with the real world.

As a general rule, rendering body parts may be important for the user's suspension of disbelief in navigating through the virtual world. In one or more embodiments, this may require having a method for tracking and rendering body parts in the user's field of view. For example, an opaque visor may be a form of virtual reality with many image-enhancement possibilities. In another example, a wide field of vision may give the user a rear view. In yet another example, the system may include various forms of "super vision," like telescope vision, see-through vision, infrared vision, God's vision, etc.

In one embodiment a system for virtual and/or augmented user experience is created such that remote avatars associated with users may be animated based at least in part upon data on a wearable device with input from sources such as voice inflection analysis and facial recognition analysis, as conducted by pertinent software modules. For example, referring back to FIG. 60, the bee avatar 6002 may be animated to have a friendly smile based upon facial recognition of a smile upon the user's face, or based upon a friendly tone of voice or speaking, as determined by software that analyzes voice inputs to microphones which may capture voice samples locally from the user. Further, the avatar character may be animated in a manner in which the avatar is likely to express a certain emotion. For example, in an embodiment wherein the avatar is a dog, a happy smile or tone detected by system local to the human user may be expressed in the avatar as a wagging tail of the dog avatar.

Figure 65:
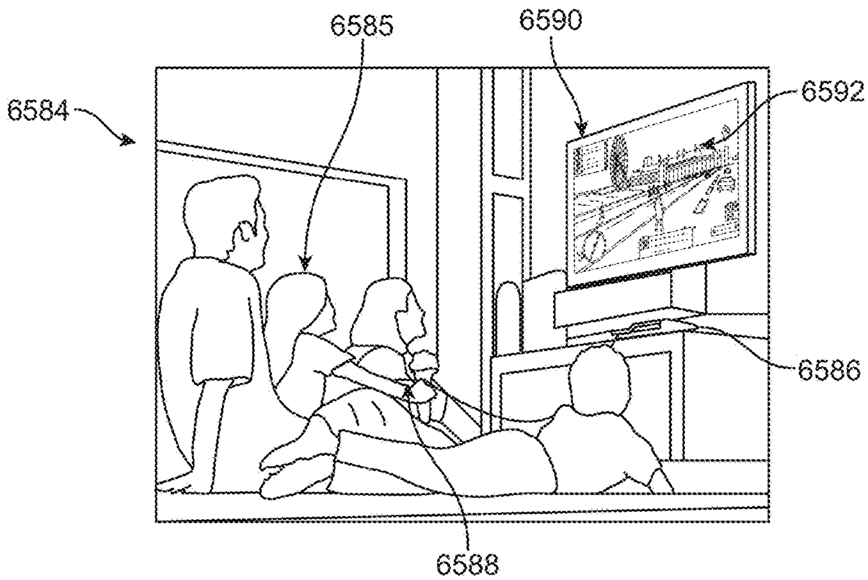
FIG. 65 illustrates an example scenario of interacting with the AR system, according to one embodiment.

Referring to FIGS. 65-70, various aspects of complex gaming embodiments are illustrated in the context of a spy type game which may be thematically oriented with some of the spy themes presented in relation to the character promoted under "Secret agent 007". Referring to FIG. 65, an illustration of a family 6584 is depicted, with one member of the family 6585 piloting a character in the game by operating an input device 6588, such as a gaming joystick or controller, which is operatively coupled to a gaming computer or console 6586, such as those based upon personal computers or dedicated gaming systems.

Figure 66:
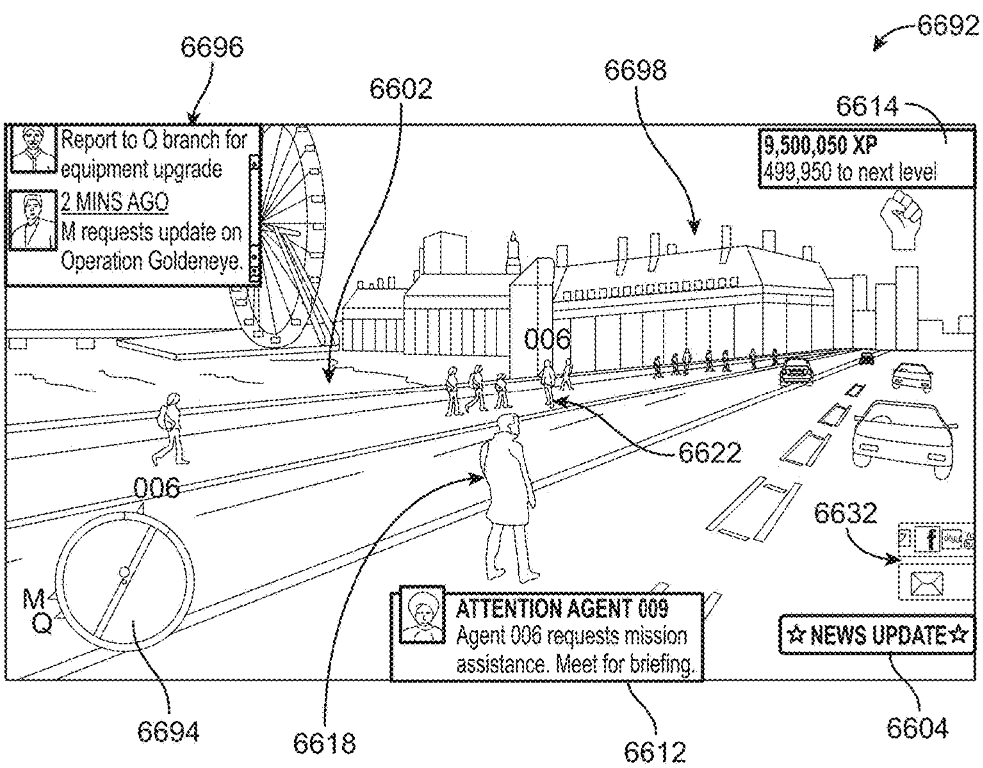
FIG. 66 illustrates another perspective of the example scenario of FIG. 65, according to another embodiment.

The gaming console 6586 is operatively coupled to a display 6592 that shows a user interface view 6592 to the pilot/operator 6585 and others who may be nearby. FIG. 66 illustrates one example of such a user interface view 6592, in which the subject game is being conducted on or near a bridge within the city of London, England. The user interface view 6592 for this particular player 6585 is purely virtual reality (e.g., all elements of the displayed user interface are not actually present with the players 6585), they are virtual elements displayed using the monitor or display (element 6590 in FIG. 65).

Referring again to FIG. 66, the depicted virtual reality view 6592 features a view of the city of London featuring a bridge 6602 and various buildings 6698 and other architectural features, with a depiction of the gaming character (6618—also referred to as "agent 009" in this illustrative example) operated by the subject player 6585 from a perspective view as shown in the user interface view 6592 of FIG. 66.

Also displayed to the player 6585 are a communications display 6696, a compass indicator 6694, a character status indicator 6614, a news tool user interface 6604, a social networking tool user interface 6632, and a messaging user interface 6612. Further shown is the representative of another character in the game (6622—also referred to as "agent 006" in this illustrative example). As shown in the user interface view 6592, the system may presents information deemed relevant to the scene presented, such as a message through the messaging interface 6612 that agent 006 is approaching, along with visually-presented highlighting around the agent 006 character.

The operator 6585 may change the perspective of the view he or she is utilizing at any time. For example, rather than the helicopter-like perspective view shown in FIG. 66, the player may decide to select a view from the perspective of the eyes of such character, or one of many other possible views which may be calculated and presented.

Figure 67:
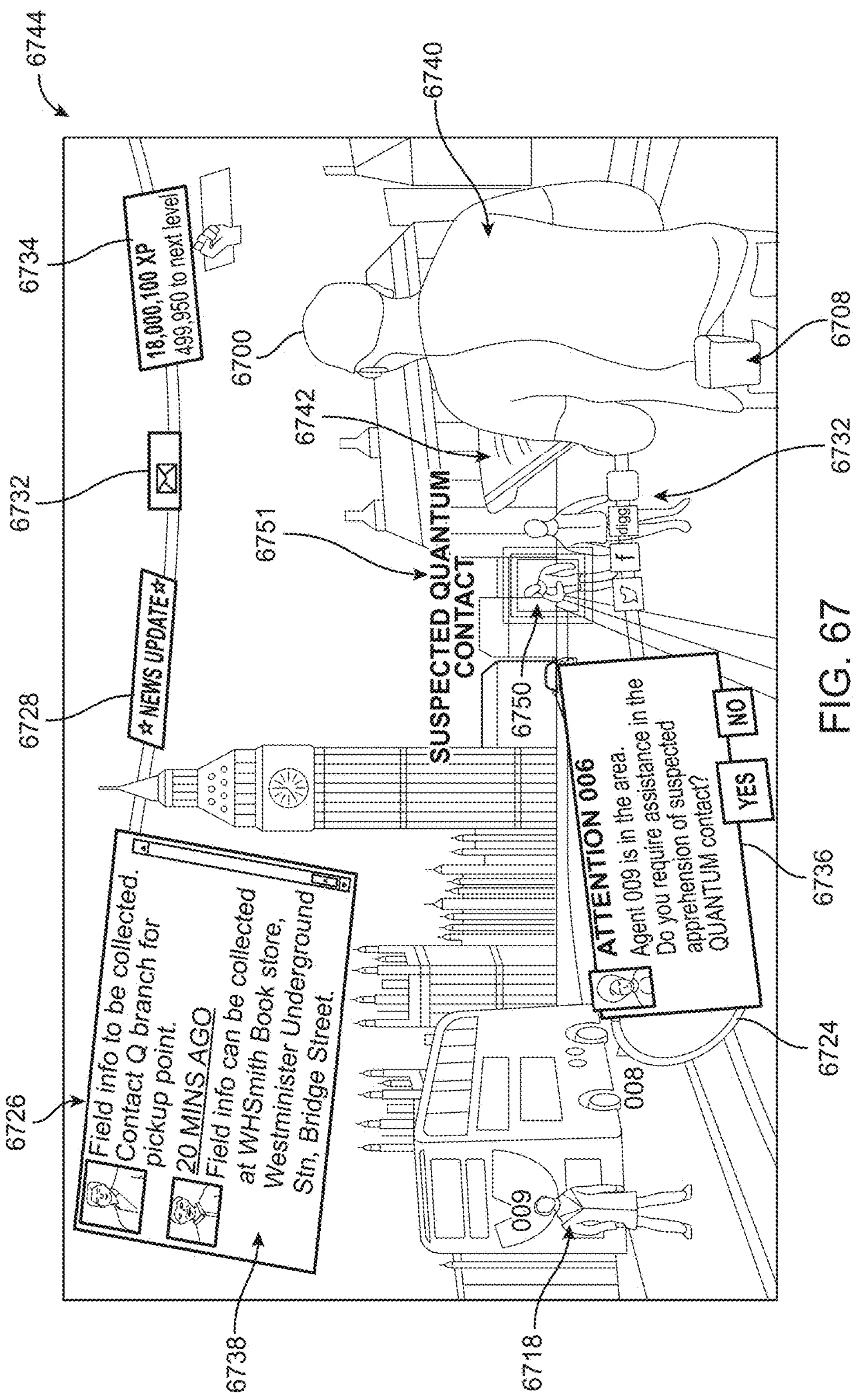
FIG. 67 illustrates yet another perspective view of the example scenario of FIG. 65, according to another embodiment.

Referring to FIG. 67, another illustrative view 6744 shows an actual human player operating as character "agent 006" 6740 wearing a head mounted AR display system 6700 and associated local processing system 6708 while he participates in the same game that is being played by the operator at home in her living room (player 6585 in FIG. 65, for example), and while he actually walks through the real city of London for his blended or augmented reality experience.

In the depicted embodiment, while the player 6740 walks along the bridge wearing his augmented reality head mounted display 6700, his local processing system 6708 is feeding his display with various virtual reality elements as depicted, which are overlaid upon his view of actual reality (e.g., such as the actual skyline and structures of London 6738).

Figure 68:
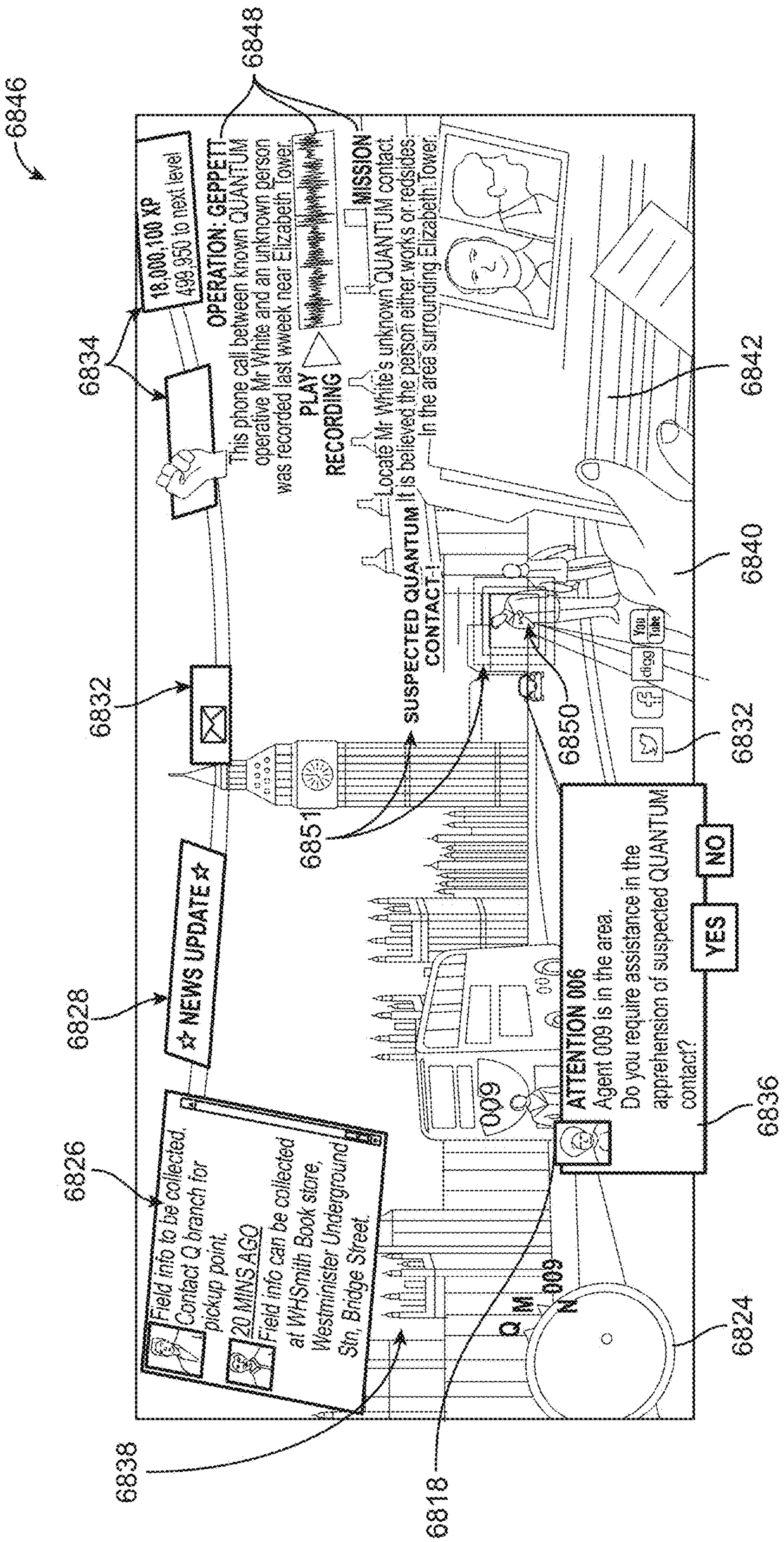
FIG. 68 illustrates a top view of the example scenario according to one embodiment.

The human may be carrying one or more actual documents 6842 in his hands, which, in one embodiment, were previously electronically communicated to him for printout and use in the gaming scenario. FIG. 68 shows an illustration of the view 6846 from the player's 6740 eye perspective, looking out over his actual documents 6742 to see the actual London skyline 6738, while also being presented with a variety of virtual elements for an augmented reality view through his head mounted display.

The virtual elements may include, for example, a communications display 6826, a news display 6828, one or more electronic communications or social networking tool displays 6832, one or more player status indicators 6834, a messaging interface 6836, a compass orientation indicator 6824, and one or more displays of content 6848, such as textual, audio, or video content. This may be retrieved and presented in accordance with other displayed or captured information, such as the text or photographs featured in the actual documents 6842 carried by the player 6840.

Nearby, another character "agent 009", who only exists in virtual reality, is presented into the augmented reality view 6846 of the player 6840 operating as character "agent 006", and may be labeled as such in the user interface for easy identification, as shown in FIG. 68.

Figure 69:
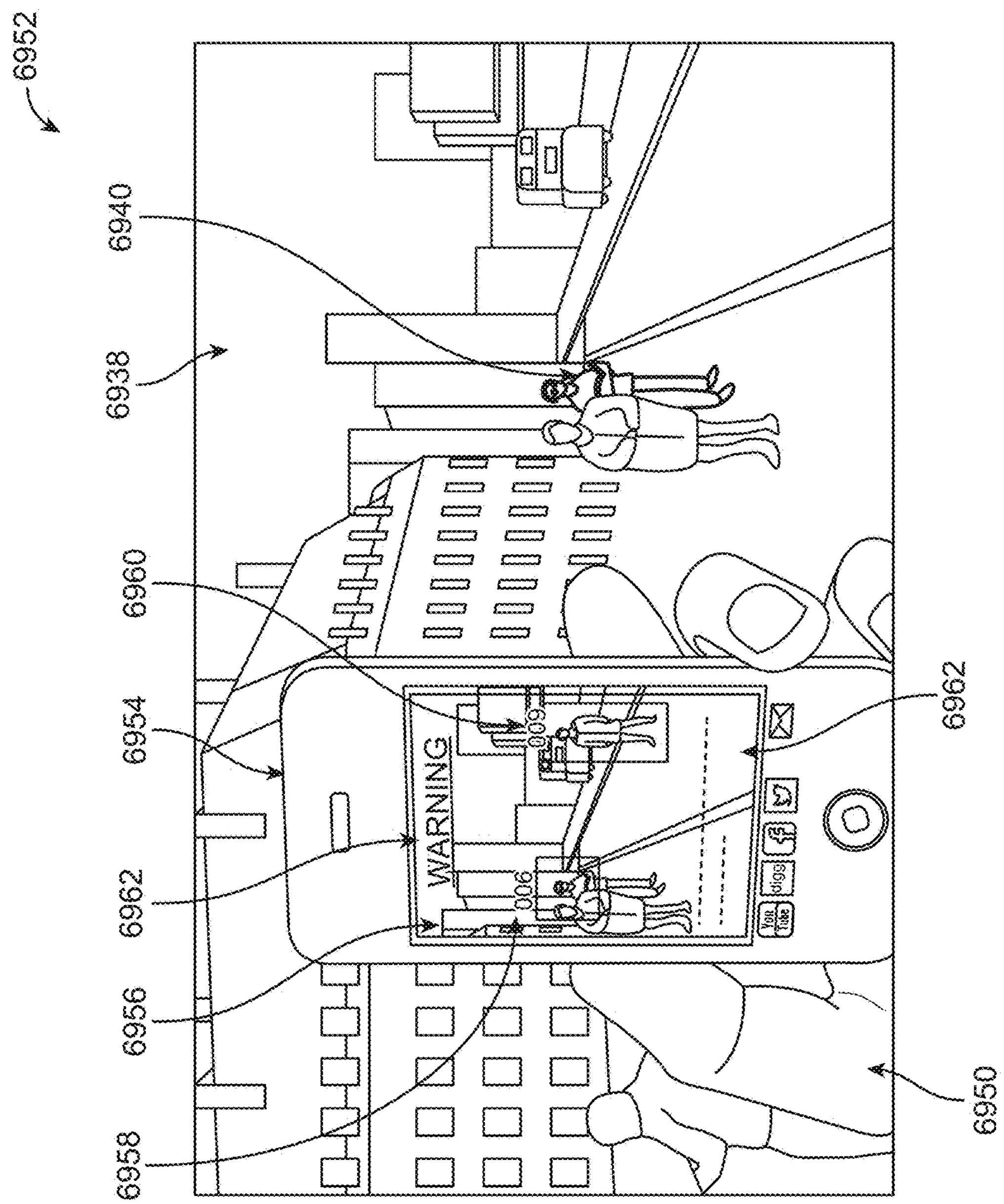
FIG. 69 illustrates a game view of the example scenario of FIGS. 65-68, according to one embodiment.

Referring to FIG. 69, a player's eye view 6952 of another player 6950 who also happens to be actually present in London 6938 and walking across the same bridge toward the "agent 006" player 6940, but without a head-worn AR system is presented. This player 6950 may be carrying a mobile communication device 6954 such as a tablet or smartphone, which in this embodiment, may be wirelessly connected with the larger system and utilized as a "window" into the augmented reality world of the subject game and configured to present in the limited user interface 6956 of the device, augmented reality information regarding one or two other nearby players (e.g., actual or virtual), along with other augmented reality display information 6962 such as warnings or character information. As shown in FIG. 69, a virtual representation of the agent 006 player 6958 and that of agent 009 6960 are shown on the user interface 6956.

Figure 70:
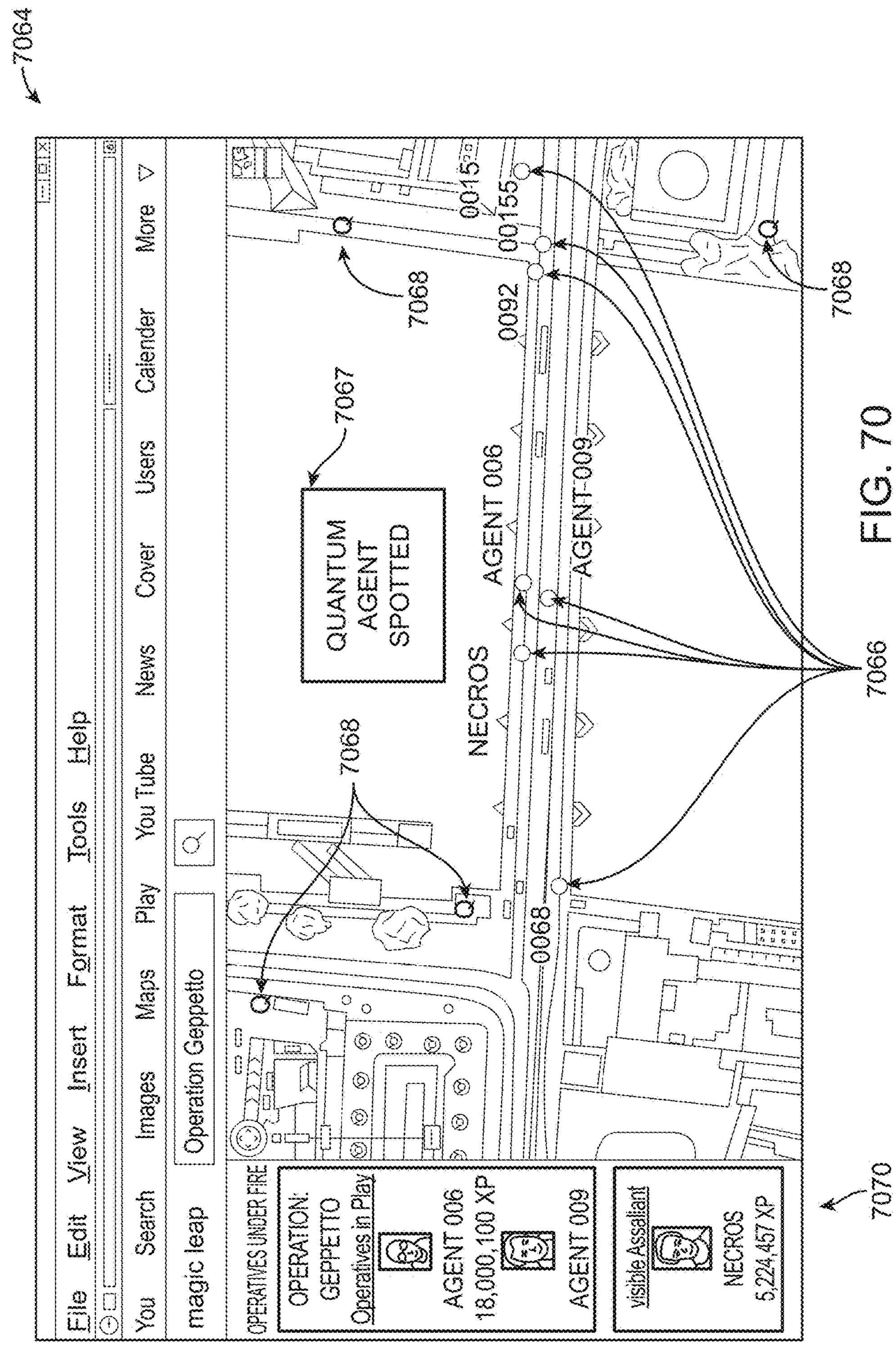
FIG. 70 illustrates a top view of the example scenario of FIGS. 65-68, according to one embodiment.

Referring to FIG. 70, a "bird's eye" or manned or unmanned aerial vehicle (or "UAV") view is presented 7064. In one embodiment, the view 7064 may be based upon a virtual UAV operated by another player, or one of the aforementioned players. The depicted view 7064 may be presented in full virtual mode to a player, for example, who may be sitting on a couch at home with a large computer display 6590 or a head mounted AR system. Alternatively, such view may be presented as an augmented reality view to a player who happens to be in an airplane or other flying vehicle (e.g., "augmented" or blended because to a person in such a position, at least portions of the view would be actual reality). The illustrated view 7064 contains an interface area for an information dashboard 7070 featuring pertinent information, such as information regarding an identified counterparty spotted in the view. The depicted view 7064 also features virtual highlighting information such as sites of interest of information 7068, locations and/or statuses of other players or characters 7066, and/or other information presentations 7067.

Figure 71:
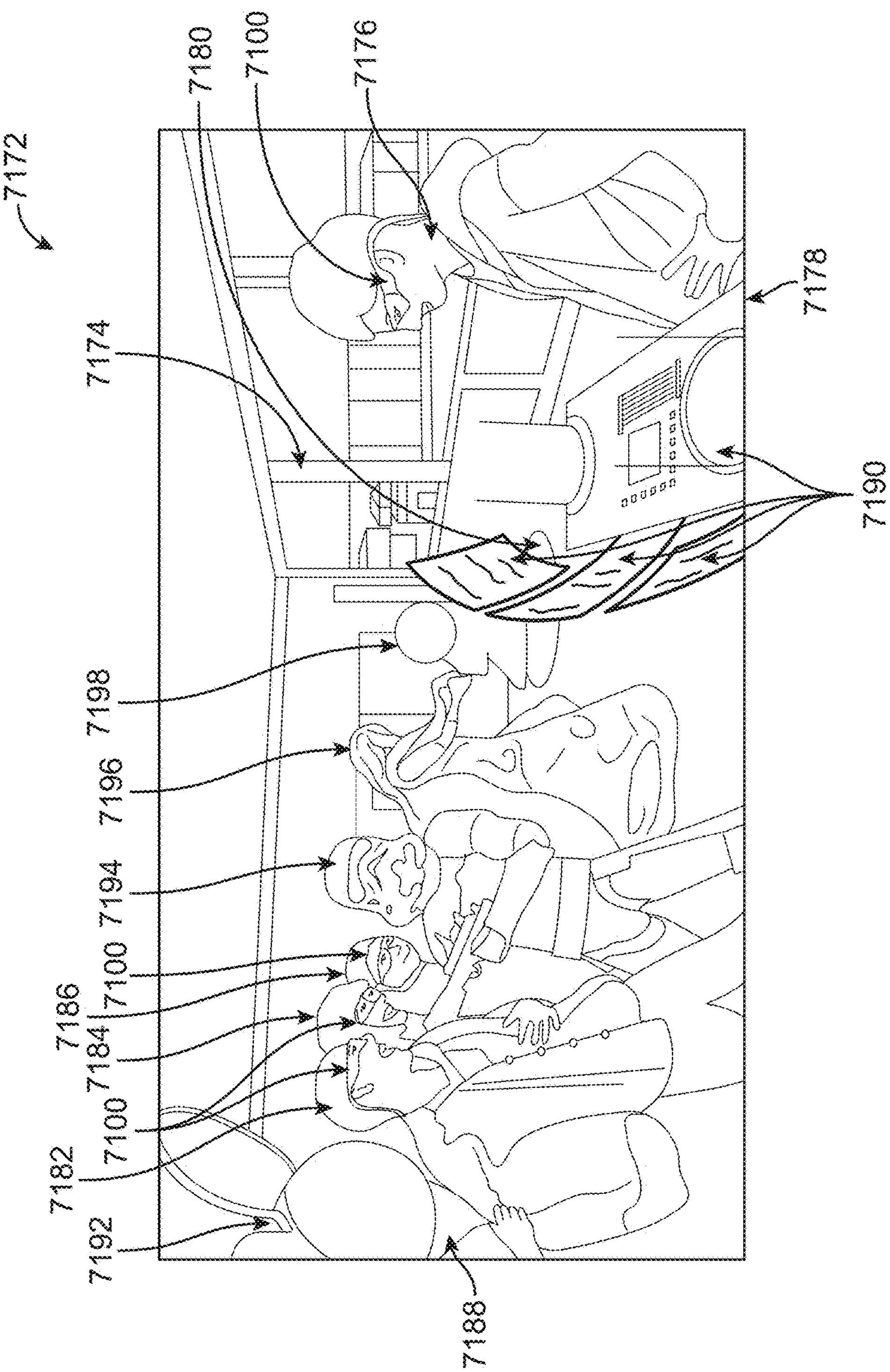
FIG. 71 illustrates an augmented reality scenario including multiple users, according to one embodiment.

Referring to FIG. 71, for illustrative purposes, another augmented reality scenario is presented with a view 7172 featuring certain actual reality elements, such as: the architecture of the room 7174, a coffee table 7180, a DJ table 7178, and five actual people (7176, 7188, 7182, 7184, 7186), each of whom is wearing head mounted AR system so that they may experience respective augmented reality views of the world (e.g., a virtual reality cartoon character 7198, a virtual reality Spanish dancer character 7196, a cartoon character 7194, and a globe-rabbit-eared head covering 7192 for one of the actual people 7188). Without the augmented reality interface hardware, the room would look to the five actual people like a room with furniture, a DJ table.

With the AR system, however, the system is configured such that the engaged players or participants may experience another user who is currently in the room in the form of the cartoon character or a Spanish dancer, or as the cartoon character, or the user wearing normal clothing, but has his/her head visualized with globe-rabbit-eared head covering 7192. The system may also be configured to show certain virtual features associated with the actual DJ table 7178, such as virtual music documentation pages 7190 which may be only visible to the DJ 7176 or DJ table lighting features which may be visible to anyone around using their augmented reality interface hardware.

Figure 72B:
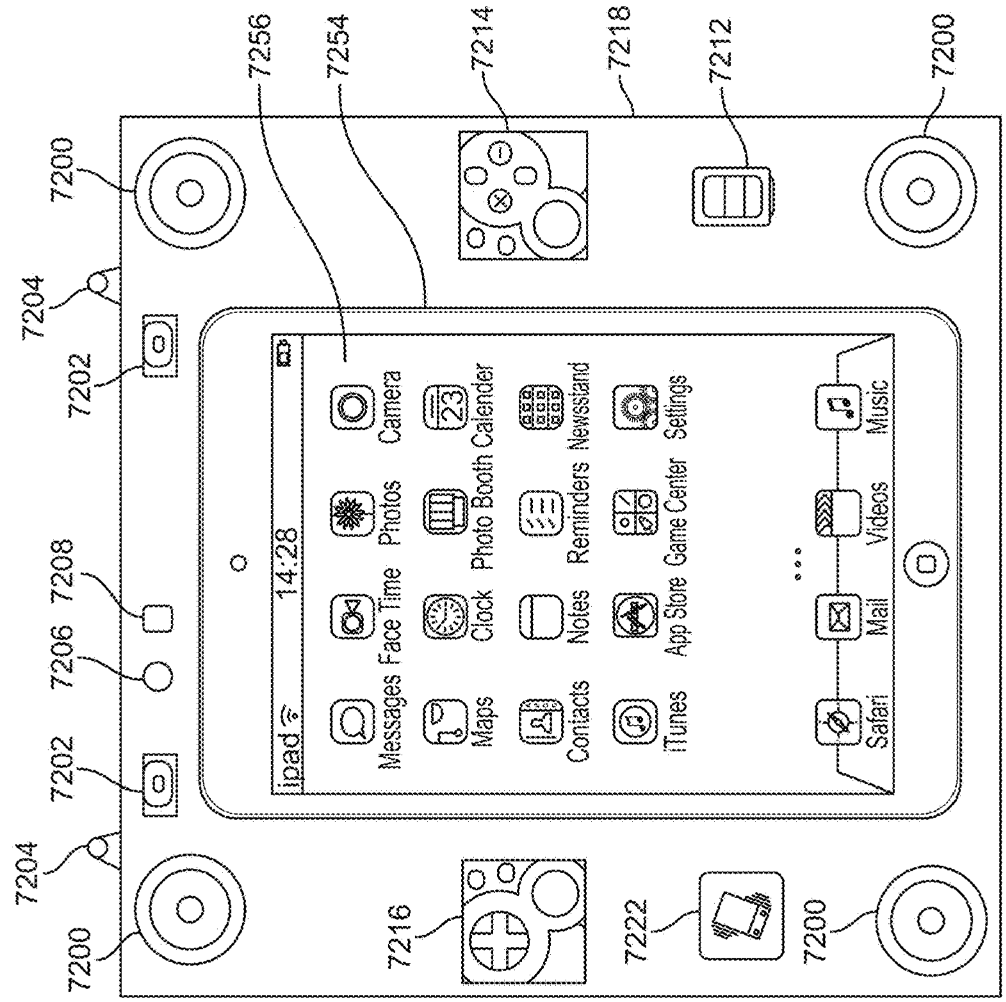
FIGS. 72A-72B illustrate using a smartphone or tablet as an AR device, according to one embodiment.
Figure 72A:
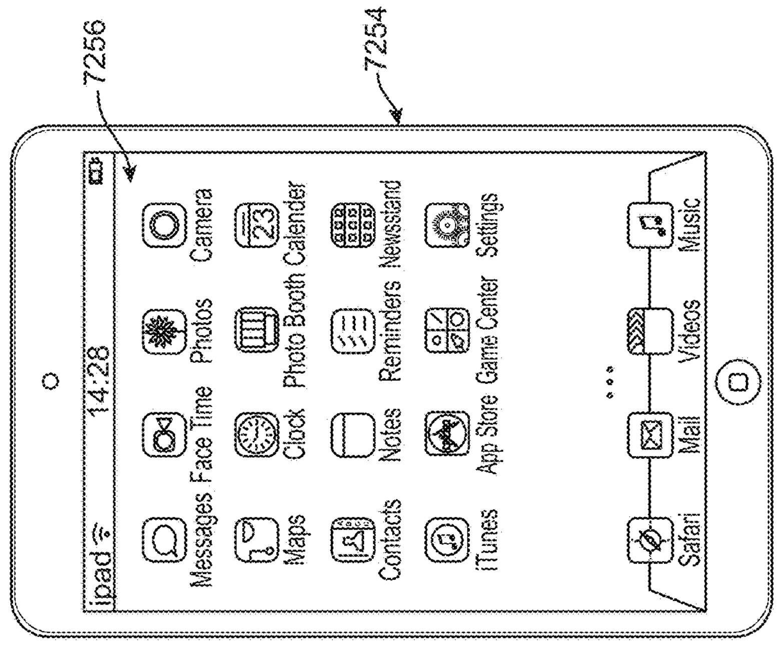

Referring to FIGS. 72A and 72B, an adaptation of a mobile communications device such as a tablet computer or smartphone may be utilized to experience augmented reality as a modified "window" into the augmented reality world of the subject game or experience being created using the subject system. Referring to FIG. 72A, a typical smartphone or tablet computing system mobile device 7254 features a relatively simple visual user interface 7256 and typically has one or more cameras.

Referring to FIG. 72B, the mobile computing device has been removably and operatively coupled into an enhancement console 7218 to increase the augmented reality participation capabilities of the mobile computing device. For example, the depicted embodiment features two player-oriented cameras 7202 which may be utilized for eye tracking; four speakers 7200 which may be utilized for simple high-quality audio and/or directional sound shaping; two forward-oriented cameras 7204 for machine vision, registration, and/or localization; an added battery or power supply capability 7212; one or more input interfaces (214, 216) which may be positioned for easy utilization by a player grasping the coupled system; a haptic feedback device 7222 to provide feedback to the user who is grasping the coupled system (in one embodiment, the haptic feedback device may provide two axes of feedback, in + or − directions for each axis, to provide directional feedback; such configuration may be utilized, for example, to assist the operator in keeping the system aimed at a particular target of interest, etc.); one or more GPS or localizing sensors 7206; and/or one or more accelerometers, inertial measurement units (IMU), and/or gyros (208).

Figure 73:
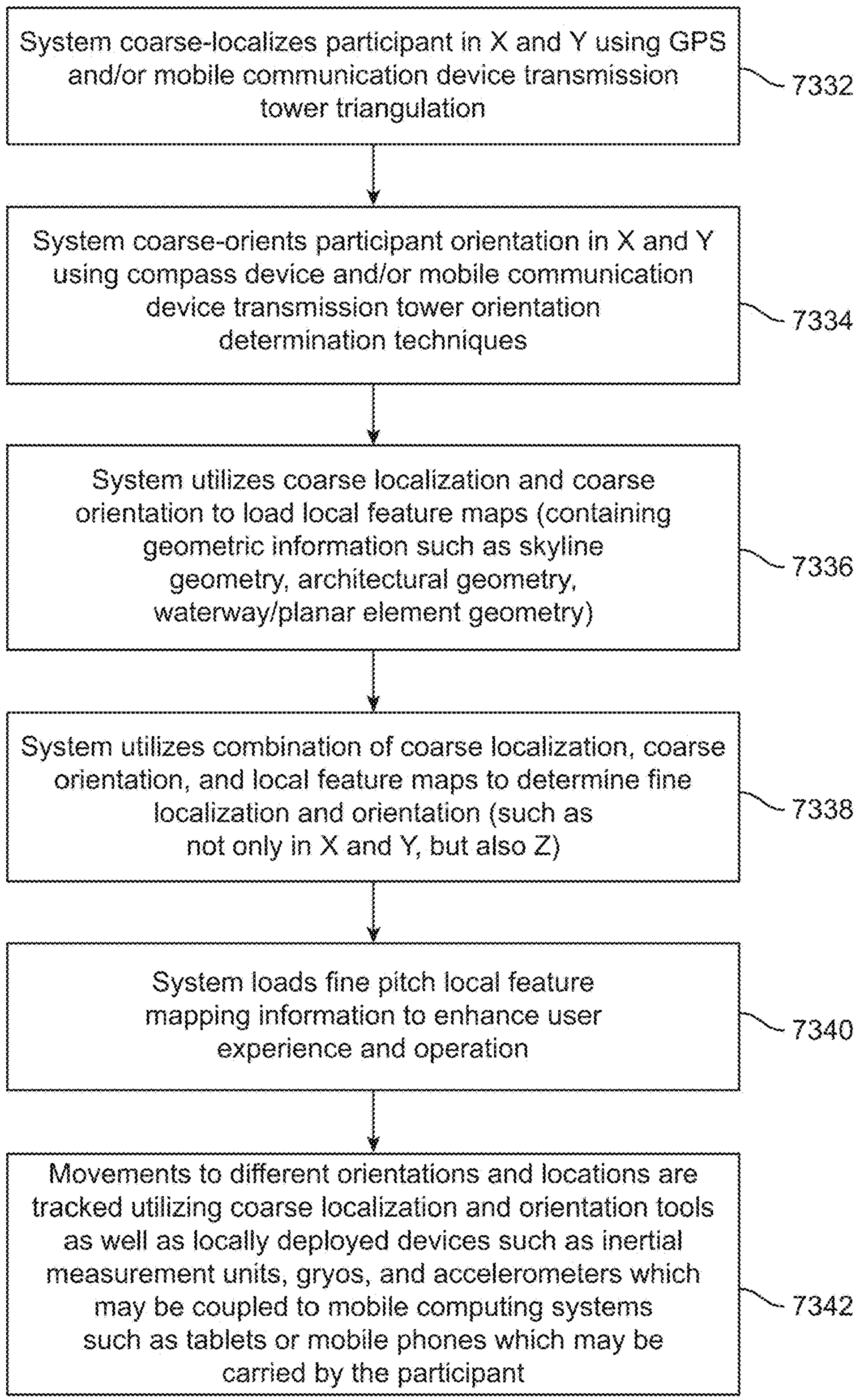
FIG. 73 illustrates an example method of using localization to communicate between users of the AR system, according to one embodiment.

Referring to FIG. 73, in one embodiment, a system such as that depicted in FIG. 72B may be utilized to coarse-localize a participant in X and Y (akin to latitude and longitude earth coordinates) Cartesian directions using a GPS sensor and/or wireless triangulation (7332). Coarse orientation may be achieved using a compass and/or wireless orientation techniques (7334). With coarse localization and orientation determined, the distributed system may load (e.g., via wireless communication) local feature mapping information to the local device.

Such information may comprise, for example, geometric information, such as skyline geometry, architectural geometry, waterway/planar element geometry, landscape geometry, and the like (7336). The local and distributed systems may utilize the combination of coarse localization, coarse orientation, and local feature map information to determine fine localization and orientation characteristics (such as X, Y, and Z {akin to altitude} coordinates and 3-D orientation) (7338), which may be utilized to cause the distributed system to load fine pitch local feature mapping information to the local system to enhance the user experience and operation. Movements to different orientations and locations may be tracked utilizing coarse localization and orientation tools as well as locally deployed devices such as inertial measurement units, gyroscopes, and accelerometers which may be coupled to mobile computing systems such as tablets or mobile phones which may be carried by the participant (7342).

Actual objects, such as the DJ table 7178 featured in FIG. 71, may be extended with virtual reality surfaces, shapes, and or functionality. For example, in one embodiment, a real button on such device may open a virtual panel which interacts with the actual device and/or other devices, people, or objects.

Rooms such as the party room 7174 depicted in FIG. 71 may be extrapolated to be any room or space. The system may have anywhere from some known data (such as existing two or three dimensional data regarding the room other associated structures or things)—or may have nearly zero data, and machine vision configurations utilizing cameras such as those mounted upon the controller console of FIG. 72B can be utilized to capture additional data; further, the system may be created such that groups of people may crowd-source usable two or three dimensional map information.

In a configuration wherein existing map information is available, such as three-dimensional map data of the city of London, a user wearing a head mounted AR system may be roughly located using GPS, compass, and/or other means (such as additional fixed tracking cameras, devices coupled to other players, etc.). Fine registration may be accomplished from the user's sensors, and determining a known geometry of the physical location as fiducials for such registration.

For example, in a London-specific building when viewed at distance X, when the system has located the user within Y feet from GPS information and direction C from the compass and map M, the system may be configured to implement registration algorithms (somewhat akin to techniques utilized in robotic or computer-assisted surgery) to "lock in" the three-dimensional location of the user within some error E.

Fixed cameras may also be utilized along with head mounted or sensory ware systems. For example, in party room such as that depicted in FIG. 71, fixed cameras mounted to certain aspects of the room 7174 may be configured to provide live, ongoing views of the room and moving people, giving remote participants a "live" digital remote presence view of the whole room, such that their social interactions with both virtual and physical people in the room is much richer.

In such an embodiment, a few rooms may be mapped to each other: the physical room and virtual room geometries may be mapped to each other; additional extensions or visuals may be created which map it equally to, less than, or larger than the physical room, with objects moving about through both the physical and virtual "meta" rooms, and then visually customized, or "skinned", versions of the room may be made available to each user or participant. For example, while the users may be in the exact same physical or virtual room, the system may allow for custom views by users. For example, one user can be at the party, but have the environment mapped with a "Death Star" motif or skin, while another user may have the room skinned as it is shown in FIG. 71 with the party environment.

Display

In one or more embodiments, a predictor/corrector mechanism can be applied to smooth out and/or predictively correct for delays and/or timing inconsistencies in the display process. To illustrate, consider that there are numerous stages in the process to display an image in the eyepiece of a wearable device. For example, assume that the wearable device corresponds to at least the following processing stages:

Sensor->Compute->Application->Display Processing

The sensor stage pertains to the measurements taken from one or more sensors that are used to create or display data through the wearable device. Such sensors may include, for example, cameras, IMUs, etc. The issue is that some of the sensors may have measurement rates that are significantly different from one another, where some are considered relatively "fast", others may be considered relatively "slow". Camera sensors may operate relatively slowly, e.g., in the range from 30-60 measurements/second. In contrast, IMUs may operate relatively fast, e.g., in the range from 500-2000 measurements/second. These different measurement rates may introduce delays and inconsistencies when attempting to use the measurement data to generate display information.

In addition, timing delays may be introduced during some of the above-identified processing stages. For example, a timing delay may be introduced in the compute stage during which the sensor data is received and the computations upon that sensor data are run. For example, the actions to normalize, compute, adjust, and/or scale the sensor data will likely create a delay $\Delta t_{compute}$ during this processing stage. Similarly, the application stage is also likely to introduce a certain amount of delay. The application stage is the stage at which a particular application is executing to operate upon the input data for the functionality desired by the user. For example, if the user is playing a game, then the game application is running in the application stage. The required processing by the application will introduce a delay $\Delta t_{application}$ during this processing stage. The display processing stage is also likely to introduce its own delay $\Delta t_{display}$ into the process. This delay is introduced, for example, to perform the processing needed to render the pixels to be displayed in the wearable eyepieces. As is evident, many types of delays are introduced during the various stages of the processing.

Embodiments of the invention use a predictive filter to account for and/or correct the effects of these delays and/or inconsistencies to the displayed image. This is accomplished by predictively determining the effects of these issues (e.g., by adding/computing for the effects of the clock and $\Delta t_{compute}$ and $\Delta t_{application}$ and $\Delta t_{display}$). The prediction filter also takes into account the relative speed of the sensor measurements at the sensor stage. One possible approach that can be taken to make this prediction is to utilize a Kalman predictor in the display processing stage. Based at least in part on this prediction, compensatory changes can be made to the display data to account for and/or correct negative effects of the delays and/or measurement speed.

As an illustrative example, consider when a certain set of visual data needs to be displayed in the wearable device. However, the user is also in motion at that particular point in time, and the delays discussed above may cause a noticeable lag in the rendered pixels to the user for that scene. In this situation, the present embodiment uses the predictive filter to identify the existence and effect of the delay, to analyze the movement of the user to determine "where he is going", and to then perform a "shift" of the displayed data to account for the processing delays. The filter can also be used to "smooth" the visual artifacts and negative effect from the sensor measurements, e.g., using a Kalman smoother.

UI System

The following discussion will focus on various types of user interface components that may be used to communicate with the AR system.

The AR system may use one or more of a large variety of user interface (UI) components. The user interface components may include components that perform: eye tracking, hand tracking, totem tracking, natural feature pose determination, head pose determination, as well as predictive head pose determination. The user interface system may employ an asynchronous world model. The user interface components may employ view-centered (e.g., head-centered) rendering, body-centered rendering, and/or world-centered rendering, as discussed herein. Further, the user interface components may employ various types of environmental data, for example GPS location data, Wi-Fi signal strength date, cellphone differential signal strength, known features, image histogram profiles, hashes of room features, etc., proximity to walls/ceiling/floors/3D-blobs/etc., location in the world (e.g., home, office, car, street), approximate social data (e.g., "friends"), and/or voice recognition.

As described above, an asynchronous portion model refers to building a local copy in the individual AR system(s) and synchronizing any changes against the cloud. For example, if a chair is moved in a space, a chair object recognizer may recognize that the chair has moved. However, there may be a delay in getting that information to the cloud, and then getting it downloaded to the local system such that a remote presence avatar may sit in the chair.

It should be appreciated that environmental data can contribute to how the user interface can be used. Since the AR system is situationally aware, it implicitly has a semantic understanding of where the user or physical objects are located. For example, GPS location data, Wi-Fi signal strength or network identity, differential signal strength, known features, histogram profiles, etc., can be used to make statistical inferences for a topological map. The concept of the user interface in the augmented reality implementation can be extended. For example, if a user is close to a wall and knocks on a wall, the knocking can be interpreted by the user interface as a user experience (UX) interaction modality. As another example, if a user selects a particular Wi-Fi signal on a device, the selection could be interpreted by the user interface as an interaction modality. The world around the user becomes part of the user interface (UI) for the user.

User Inputs

Figure 100:
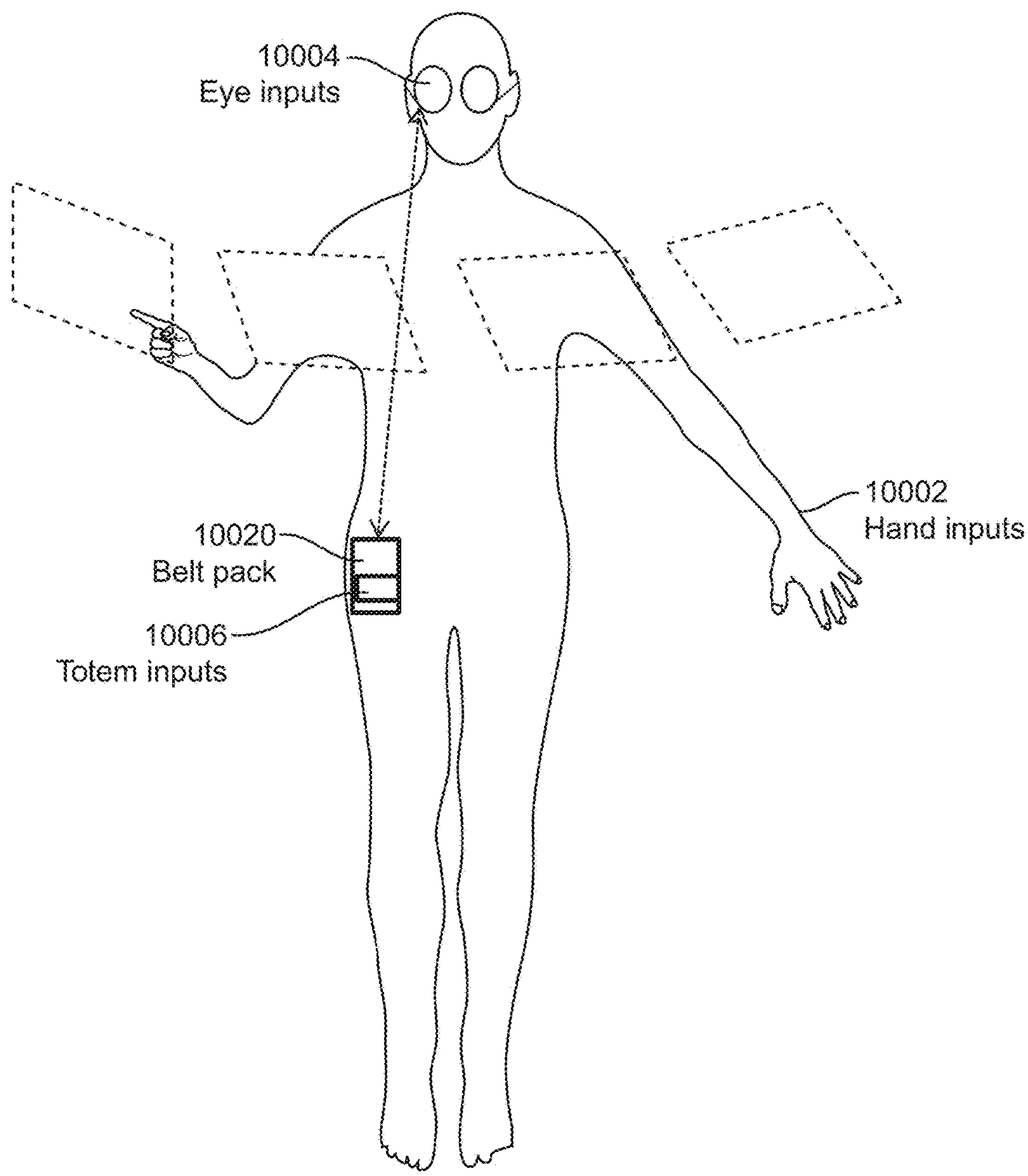
FIG. 100 illustrates a variety of user inputs to communicate with the augmented reality system, according to one embodiment.

Referring ahead to FIG. 100, the user interface may be responsive to one or more of a variety of inputs. The user interface of the AR system may, for example, be responsive to hand inputs 10002, for instance: gestures, touch, multi-touch, and/or multiple hand input. The user interface of the AR system may, for example, be responsive to eye inputs 10004, for instance: eye vector and/or eye condition (e.g., Open/Close). The user interface of the AR system may, for example, be responsive to totem inputs 10006. Totems may take any of a large variety of forms, for example a belt pack. Totem input may be static, for example tracking a closed book/tablet, etc. Totem input may be dynamic, for example dynamically changing like flipping pages in a book etc. Totem input may be related to communications with the totem, for instance a ray gun totem. Totem input may be related to intrinsic communications, for instance communications via USB, data-communications, etc. Totem input may be generated via an analog joystick, click wheel, etc.

The user interface of the AR system may, for example, be responsive to head pose, for instance head position and/or orientation. The user interface of the AR system may, for example, be responsive to voice, for instance spoken commands and parameters. The user interface of the AR system may, for example, be responsive to environmental sounds. The AR system may, for instance, include one or more ambient microphone to pick up sounds, for example chest taps, etc.

The user interface of the AR system may, for example, be responsive to environmental situations. For instance, the user interface may be responsive to movement occurring against or proximate a wall, or a movement above a defined threshold (e.g., movement at a relatively high speed).

It may be useful to have a consistent user interface metaphor to suggest to developers and build into AR system's operating system (OS), and which may allow for reskinning for various applications and/or games. One approach may employ user actuatable levers or buttons icons, although that approach lacks tactile feedback. Levers may have a respective fulcrum point, although such an approach may be difficult for users. Another approach is based on a "force field" metaphor that intentionally keeps things away (e.g. sparks on boundaries, etc.).

In one or more embodiments, a virtual image may be presented to the user in the form of a virtual user interface. The virtual user interface may be a floating virtual screen, as shown in FIG. 100. Since the system knows where (e.g., the depth, distance, perceived location, etc.) of the virtual user interface, the system may easily calculate the coordinates of the virtual interface, and allow the user to interact with the virtual screen, and receive inputs from the virtual user interface based on the coordinates at which the interaction happens, and a known coordinates of the user's hands, eyes, etc.

Thus, in other words, the system maps coordinates of various "keys", or features of the virtual user interface, and also maps coordinates/knows a location of the user's hands, eyes (or any other type of input) and correlates them, to receive user input.

For example, if a virtual user interface is presented to the user in a head-centric reference frame, the system always knows a distance/location of various "keys" or features of the virtual user interface in relation to a world-centric reference frame. The system then performs some mathematical translations/transforms to find a relationship between both reference frames. Next, the user may "select" a button of the user interface by squeezing the virtual icon. Since the system knows the location of the touch (e.g., based on haptic sensors, image-based sensors, depth sensors etc.), the system determines what button was selected based on the location of the hand squeeze and the known location of the button the user interface.

Thus, constantly knowing the location of virtual objects in relation to real objects, and in relation to various reference frames (e.g., world-centric, head-centric, hand-centric, hip-centric etc.) allows the system to understand various user inputs. Based on the input, the system may use a mapping table to correlate the input to a particular action or command, and execute the action.

In other words, the user's interaction with the virtual user interface is always being tracked (e.g., eye interaction, gesture interaction, hand interaction, head interaction, etc.). These interactions (or characteristics of these interactions), including, but not limited to location of the interaction, force of interaction, direction of the interaction, frequency of interaction, number of interactions, nature of interactions, etc. are used to allow the user to provide user input to the user interface in response to the displayed virtual user interface.

Eye Tracking

In one or more embodiments, the AR system can track eye pose (e.g., orientation, direction) and/or eye movement of one or more users in a physical space or environment (e.g., a physical room). The AR system may employ information (e.g., captured images or image data) collected by one or more sensors or transducers (e.g., cameras) positioned and oriented to detect pose and or movement of a user's eyes. For example, head worn components of individual AR systems may include one or more inward facing cameras and/or light sources to track a user's eyes.

As noted above, the AR system can track eye pose (e.g., orientation, direction) and eye movement of a user, and construct a "heat map". A heat map may be a map of the world that tracks and records a time, frequency and number of eye pose instances directed at one or more virtual or real objects. For example, a heat map may provide information regarding what virtual and/or real objects produced the most number/time/frequency of eye gazes or stares. This may further allow the system to understand a user's interest in a particular virtual or real object.

Advantageously, in one or more embodiments, the heat map may be used in advertising or marketing purposes and to determine an effectiveness of an advertising campaign, in some embodiments. The AR system may generate or determine a heat map representing the areas in the space to which the user(s) are paying attention. In one or more embodiments, the AR system can render virtual content (e.g., virtual objects, virtual tools, and other virtual constructs, for instance applications, features, characters, text, digits, and other symbols), for example, with position and/or optical characteristics (e.g., color, luminosity, brightness) optimized based on eye tracking and/or the heat map Gaze Tracking It should be appreciated that the concepts outlined with respect to gaze tracking may be applied to any of the user scenarios and embodiments described further below. In one or more embodiments, the various user interfaces described below may also be activated/originated back to a detected gaze. The principles described herein may be applied to any other part of the disclosure, and should not be read as limiting.

The AR system may track eye gaze in some embodiments. There are three main components to gaze tracking: an eye tracking module (pupil detection and center of cornea detection), a head tracking module, and a correlation module that correlates the eye tracking module with the head tracking module. The correlation module correlates the information between the world coordinates (e.g., position of objects in the real world) and the eye coordinates (e.g., movement of the eye in relation to the eye tracking cameras, etc.).

Figure 117:
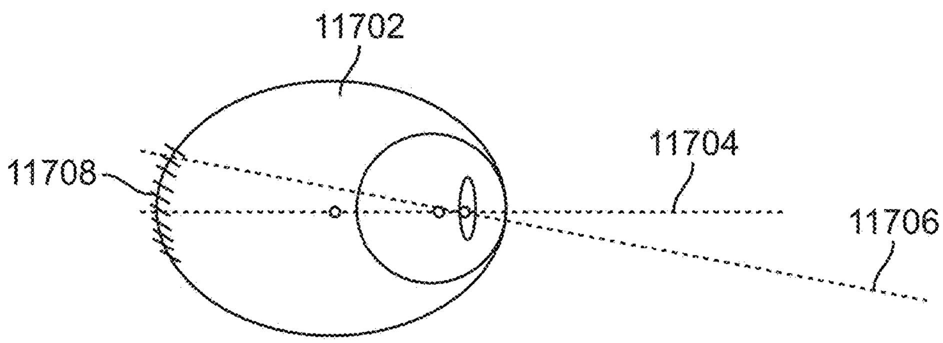
FIG. 117 is a schematic of an eye for gaze tracking, according to one embodiment.

The eye tracking module is configured to determine the center of the cornea and the center of the pupil. Referring ahead to FIG. 117, a schematic of the eye 11702 is illustrated. As shown in FIG. 117, a line 11704 is shown to pass through the center of the cornea, the center of the pupil and the center of the eyeball. This line 11704 may be referred to as the optical axis.

FIG. 117 also shows another gaze line 11706 that passes through the cornea. This line may be referred to as the visual axis. As shown in FIG. 17, the visual axis is a tilted line in relation to the optical axis. It should be appreciated that the area of the fovea 11708 through which the visual axis 11706 crosses is considered to be a very dense area of photoreceptors, and therefore crucial for the eye in order to view the outside world. The visual axis 11706 is typically at a 1-5° deviation (not necessarily vertical deviation) from the optical axis.

In conventional gaze tracking technologies, one of the main assumptions is that the head is not moving. This makes it easier to determine the visual axis in relation to the optical axis for gaze tracking purposes. However, in the context of the AR system, it is anticipated that the user will be constantly moving his/her head; therefore conventional gaze tracking mechanisms may not be feasible To this end, the AR system is configured to normalize the position of the cornea in relation to the system. It should be appreciated that the position of the cornea is very important in gaze tracking because both the optical axis and the visual axis pass through the cornea as shown in the previous FIG. 117.

Figure 118:
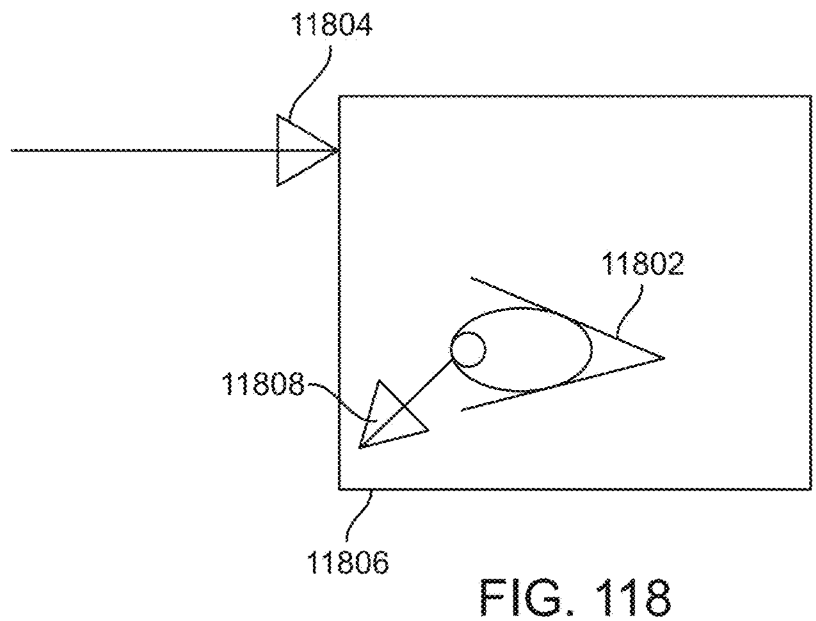
FIG. 118 shows another perspective of the eye and one or more cameras for gaze tracking, according to one embodiment.

Referring now to FIG. 118, the AR system comprises a world camera system (e.g., cameras placed on the user's head to capture a set of surroundings; the cameras move with the movement of the user's head) 11804 that is attached to the wearable AR system 11806. Also, as shown in FIG. 118, the AR system 11806 may further comprise one or more eye tracking cameras 11808 that track movements of the eye 11802. Since both cameras (e.g., eye tracking cameras 11808 and the world cameras 11804), are moving, the system may account for both head movement and eye movement. Both the head movement (e.g., calculated based on the FOV cameras 11804), and the eye movement (e.g., calculated based on the eye tracking cameras 11808) may be tracked in order to normalize the position of the cornea.

It should be appreciated that the eye tracking cameras 11808 measure the distance from the cameras to the center of the cornea. Thus, to compensate for the any changes in how the wearable AR system 11806 moves with respect to the eye, the distance to the center of the cornea is normalized. For example, with eye glass movement, there may be a slight rotation and/or translation of the cameras away from the cornea. However, the system compensates for this movement by normalizing the distance to the center of the cornea.

It should be appreciated that since both the eye tracking cameras and the head camera (world cameras) are rigid bodies (e.g., the frame of the AR system), any normalization or correction of the eye tracking cameras needs to also be similarly performed on the world cameras. For example, the same rotation and translation vector may be similarly applied to the world camera system. Thus, this step identifies the relationship between the eye tracking and head tracking systems (e.g., a rotational vector, a translational vector, etc.).

Once the rotation and/or translation vectors have been identified, a calibration step is performed at various depths away from the user. For example, there may be known points that are at a fixed distance away from the user. The world cameras 11804 may measure the distance between a point that is fixed in space from the user. As discussed above, a position of the center of the cornea is also known based on calculations associated with the eye tracking cameras 11808.

Additionally, as discussed above, the relationship between the eye tracking camera 11808 and the world camera is also known (e.g., any translational or rotational vectors). Thus, it can be appreciated that once the position of the target (e.g., fixed known points in space) and the position of the cornea have been identified, the gaze line (from the cornea to the target) may be easily identified. This information may be used in mapping and/or rendering in order to accurately portray virtual objects in space in relation to one or more real objects of the physical world.

More particularly, to determine the relationship between the world camera 11804 and the eye tracking camera 11806, at least two fixed images may be presented both to the eye camera and the world camera and the difference in the images may be used to calibrate both cameras. For instance, if the center of the cornea is known in relation to the eye tracking system 11808, the center of the cornea may be determined in relation to the world coordinate system 11804 by utilizing the known relationship between the eye cameras and the world cameras.

In one or more embodiments, during a calibration process (e.g., during a set-up process when the user first receives the AR device, etc.), a first fixed image is captured by the eye camera 11806 and then the world camera 11804. For illustrative purposes, the first image capture performed by the eye camera may be considered "E", and the first image capture performed by the world camera may be considered "W". Then, a second fixed image is captured by the eye camera 11806 and then captured by the world camera 11804. The second fixed image may be at a slightly different position than the first fixed image.

The second image capture of the eye camera may be referred to as E' and the second image capture of the world camera may be referred to as W'. Since Z=WXE and Z=W'XE', X can be easily calculated using the above two equations. Thus, this information may be used to map points reliably to naturally calibrate the position of the cameras in relation to the world. By establishing this mapping information, the gaze line 11706 may be easily determined, which may, in turn, be used to strategically provide virtual content to the user.

Gaze Tracking Hardware

Figure 119:
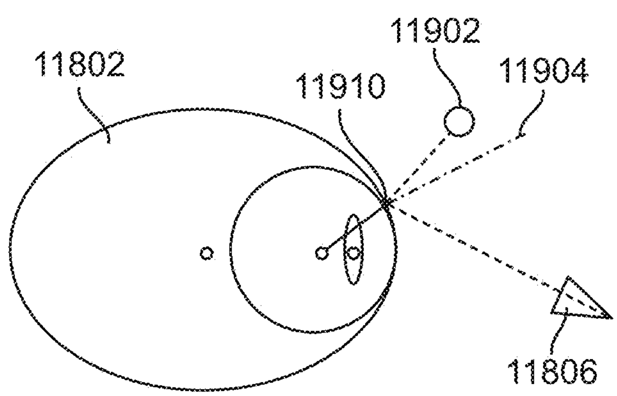

Referring now to FIG. 119, to detect the center of the cornea using the eye tracking module, the AR system utilizes either one camera with two glints (e.g., LED lights) or two cameras with one glint each. In the illustrated embodiment, only one glint 11902 is shown in relation to the eye 11802 and the eye tracking camera 11806. It should be appreciated that the surface of the cornea is very reflective and thus, if there is a camera that tracks the eye (e.g., the eye tracking cameras), there may be a glint that is formed on the image plane of the camera.

Since the 3D position of the LED light 11902 is known, and the line from the image plane of the camera to the glint 11910 is known, a 3D plane comprising the glint and the image plane is created. The center of the cornea is located on this created 3D plane 11904 (which is represented as a line in FIG. 119). Similarly, if another glint (from another LED light) is used, the two 3D planes intersect each other such that the other 3D plane also has the center of the cornea. Thus, it can be appreciated that the intersection of both 3D planes produces a line which holds the center of the cornea. Now the exact point of the cornea within that line may be determined.

It should be appreciated that there is a unique position on that line (from the glint to the projector) that satisfies reflection law. As is well known in physics, the law of reflection states that when a ray of light reflects off a surface, the angle of incidence is equal to the angle of reflection. This law may be used to find the center of the cornea.

Figure 120:
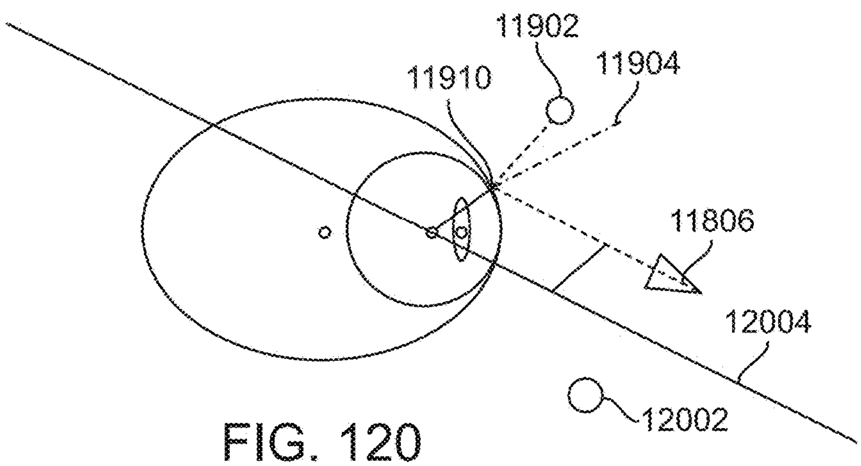

Referring to FIG. 120, now the distance from center of the cornea to the original point (e.g., the glint 11910) may be determined (r', not shown). Similarly, the same analysis may be performed on the other line 12004 (from the other glint 12002 to the other projector) to find r" (the distance from the intersection line to the other line) (not shown). The center of the cornea may be estimated based on the value of r' and r" that are closest in value to each other. It should be appreciated that the above example embodiment describes two planes, but, the position of the cornea may be found more easily if more planes are used. This may be achieved by using a plurality of LED lights (e.g., more glints).

It is important that the eye tracking system produce at least two glints on the eye. To increase accuracy, more glints may be produced on the eye. However, with the additional glints produced on the surface of the eye, it becomes difficult to determine which glint was produced by which LED. To this end, to understand the correspondences between the glint and the LED, rather than simultaneously reflecting the glints on each frame, one LED may be turned on for one frame, and the other may be turned on after the first one has been turned off. This approach may make the AR system more reliable.

Similarly, it is difficult to determine the exact center of the pupil because of discrepancies caused by refraction. To detect the center of the pupil, an image of an eye may be captured. One may move around the center of the image in a "starburst" pattern radially outward from a central point in order to find the pupil. Once that is found, the same process may be performed starting from points within the pupil to find edges of the pupil. This information may be used to infer the pupil center. It should be appreciated that if this process is repeated several times, some center may be outliers. However, these outliers may be filtered out. Even with this approach, however, the center of the pupil may still not be in the correct position because of refraction principle discussed above.

Figure 121:
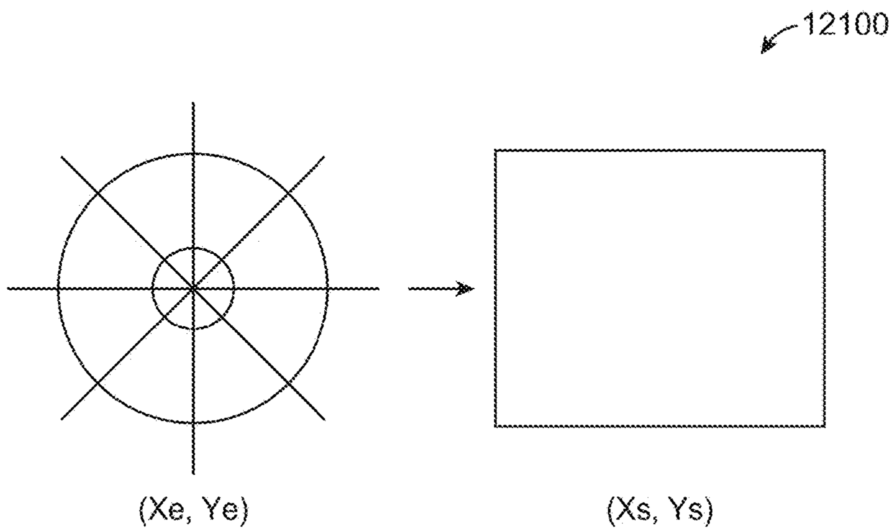

Referring now to FIG. 121, calibration may be performed to determine the deviation between the visual axis and the optical axis. When calibrating the system, the real center of pupil may not matter, but for mapping in the world (consider, for example, the world to be in 2D for, example), it is important to determine the distance between the world and the eye. Given the pupil center and the image plane, it is important to find a mapping to find the correlated coordinates in the 2D world, as shown in FIG. 121. To this end, one can use parabola mapping to find the corresponding coordinates in the image plane. A sample equation like the following may be used:

$$X_s=a1xe2+a2ye2+a3xeye+a4xe+a5ye+a6$$

$$X_s=fx(Xe,Ye)$$

$$Y_s=fy(Xe,Ye)$$

As shown in 12100 of FIG. 121, equations similar to the above may be used to determine (Xs, Ys) from the determined (Xe, Ye). Here, the total parameters are twelve. Each point provides two equations; therefore at least six points (e.g., a1-a6) may be needed to solve this equation.

Now that the center of the cornea is known, and a position of a target point is known, a line may be drawn from the center of the cornea to the target point. The world camera 11804 has a fixed plane that takes the image, which may take the image at a fixed point in space. Then another target point is displayed to the person, and then the intersection plane that is virtually attached to the world camera is determined.

The mapping techniques described above may be used to determine the corresponding point within that intersection plane, as described in detail above. Knowing the center of the cornea, the mapping techniques described above can identify the points on the image plane virtually attached to the world cameras. Given that all these points are now known, a gaze line may be built from the center of the cornea to the point on the image plane. It should be appreciated that the gaze line is built for each eye separately.

Figure 122:
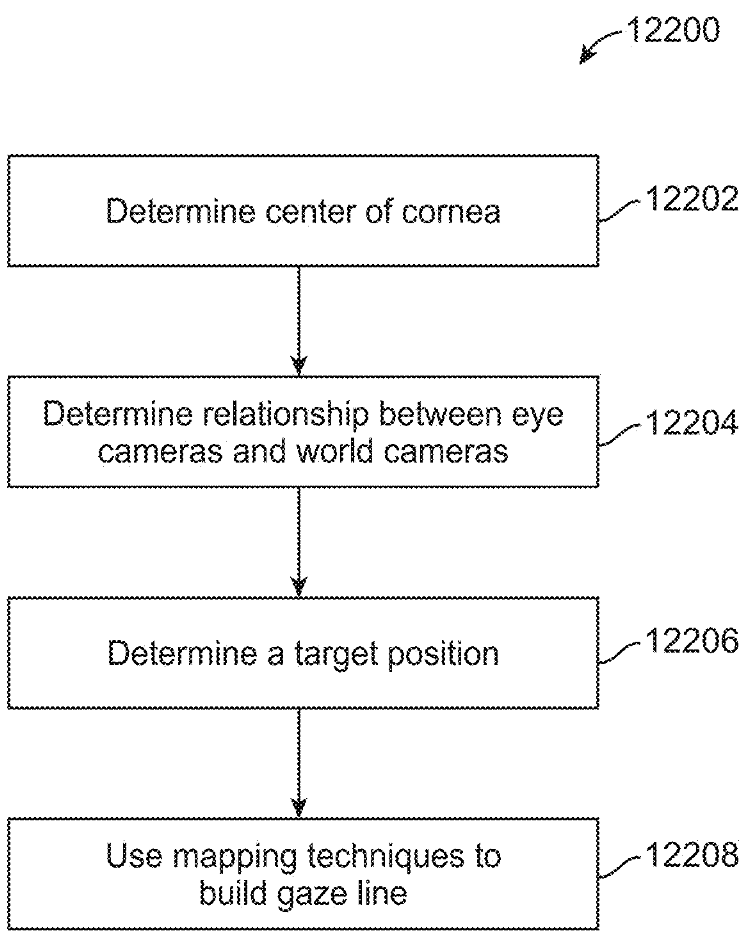

Referring now to FIG. 122, an example method 12200 of determining the gaze line is illustrated. First, at 12202, a center of the cornea may be determined (e.g., through the LED triangulation approach described above, etc.). Then, at 112204, a relationship between the eye cameras and world cameras may be determined. At 12206, a target position may be determined. Finally at 12208, mapping techniques may be utilized to build a gaze line based on all the determined information.

Pseudo-Random Pattern

In one or more embodiments, the AR system may employ pseudo-random noise in tracking eye pose or eye movement. For example, the head worn component of an individual AR system may include one or more light sources (e.g., LEDs) positioned and oriented to illuminate a user's eyes when the head worn component is worn by the user. The camera(s) detects light from the light sources which is returned from the eye(s). For example, the AR system may use Purkinje images, e.g., reflections of objects from the structure of the eye.

The AR system may vary a parameter of the light emitted by the light source to impose a recognizable pattern on emitted, and hence detected, light which is reflected from eye. For example, the AR system may pseudo-randomly vary an operating parameter of the light source to pseudo-randomly vary a parameter of the emitted light. For instance, the AR system may vary a length of emission (ON/OFF) of the light source(s). This facilitates automated detection of the emitted and reflected light from light emitted and reflected from ambient light sources.

Figure 101:
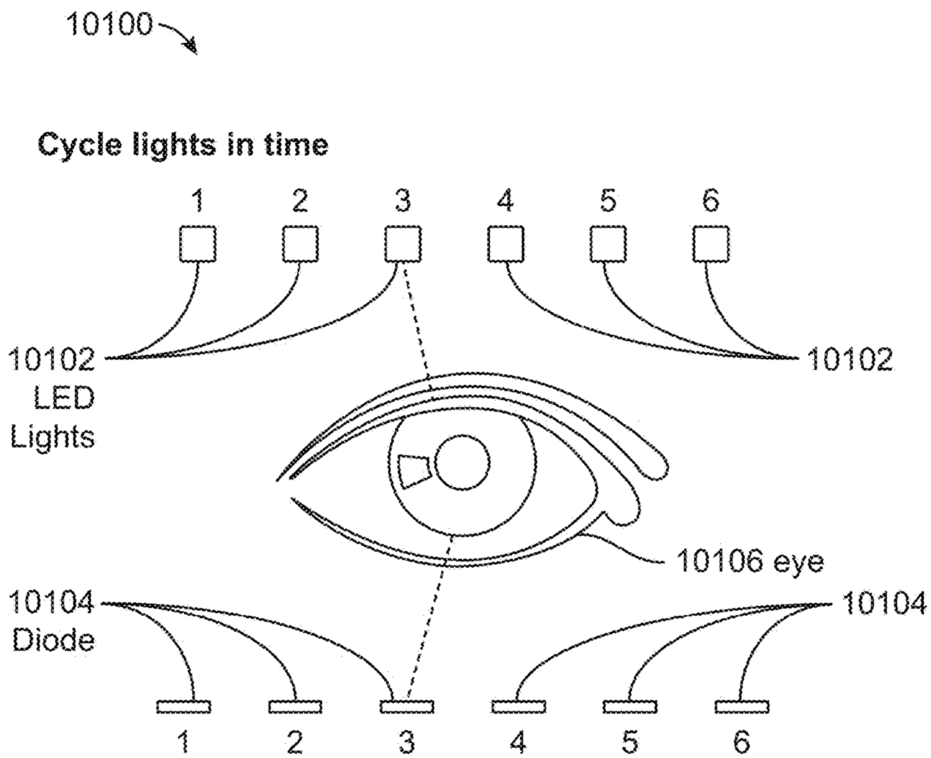
FIG. 101 illustrates LED lights and diodes tracking a movement of the user's eyes, according to one embodiment.
Figure 102:
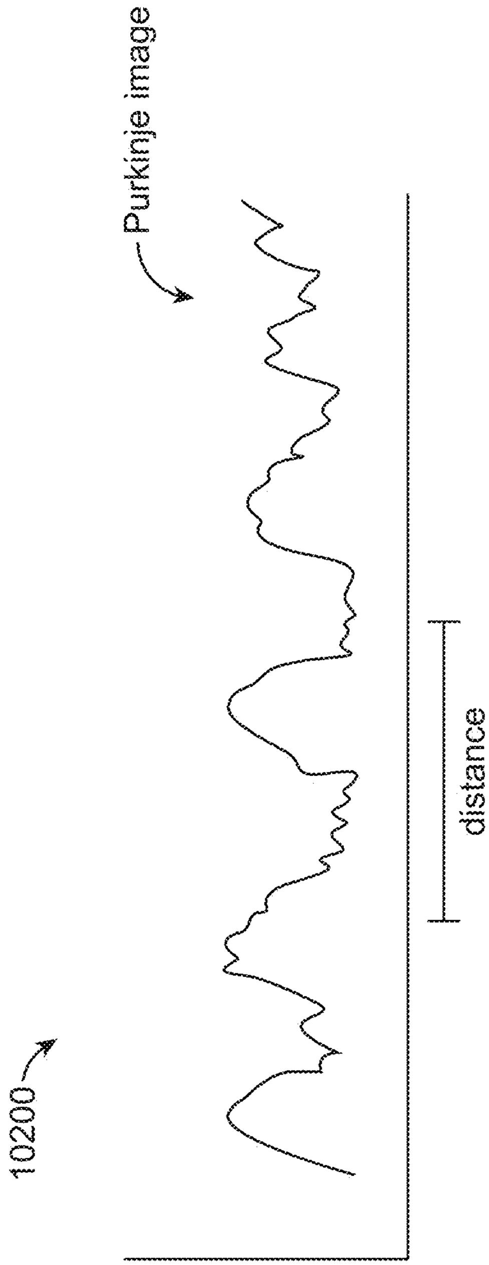
FIG. 102 illustrates a Purkinje image, according to one embodiment.

As illustrated in FIG. 101 and FIG. 102, in one implementation, light sources (e.g., LEDs) 10102 are positioned on a frame on one side (e.g., top) of the eye and sensors (e.g., photodiodes) are positioned on the bottom part of the frame. The eye may be seen as a reflector. Notably, only one eye needs to be instrumented and tracked since pairs of eyes tend to move in tandem. The light sources 10102 (e.g., LEDs) are normally turned ON and OFF one at a time (e.g., time slice) to produce a patterned code (e.g., amplitude variation or modulation). The AR system performs autocorrelation of signals produced by the sensor(s) (e.g., photodiode(s)) to determine a time of flight signal. In one or more embodiments, the AR system employs a known geometry of the light sources (e.g., LEDs), the sensor(s) (e.g., photodiodes), and distance to the eye.

The sum of vectors with the known geometry of the eye allow for eye tracking. When estimating the position of the eye, since the eye has a sclera and an eyeball, the geometry can be represented as two circles layered on top of each other. Using this system 10100, the eye pointing vector can be determined or calculated with no cameras. Also the eye center of rotation may be estimated since the cross section of the eye is circular and the sclera swings through a particular angle. This actually results in a vector distance because of autocorrelation of the received signal against known transmitted signal, not just ray traces. The output may be seen as a Purkinje image 10200, as shown in FIG. 102, which may in turn be used to track movement of the eyes.

In some implementations, the light sources may emit light in the infrared (IR) range of the electromagnetic spectrum, and the photosensors may be selectively responsive to electromagnetic energy in the IR range.

In one or more embodiments, light rays are emitted toward the user's eyes as shown in the illustrated embodiment. The AR system is configured to detect one or more characteristics associated with an interaction of the light with the user's eyes (e.g., Purkinje image, an extent of backscattered light detected by the photodiodes, a direction of the backscattered light, etc.). This may be captured by the photodiodes, as shown in the illustrated embodiments. One or more parameters of the interaction may be measured at the photodiodes. These parameters may in turn be used to extrapolate characteristics of eye movements or eye pose.

Hand Tracking

In one or more embodiments, the AR system may perform hand tracking via one or more user input detection devices and/or techniques.

For example, the AR system may employ one or more image sensors (e.g., cameras) that are head worn and which face forward from the user's body reference frame. Additionally, or alternatively, the AR system may use one or more sensors (e.g., cameras) which are not head worn or not worn on any portion of the user's body. For instance, the AR system may use one or more sensors (e.g., cameras, inertial sensors, gyros, accelerometers, temperature sensor or thermocouples, perspiration sensors) mounted in the physical environment (e.g., room-based sensor systems discussed above).

As another example, the AR system may rely on stereo-pairs of cameras or photo sensors. Alternatively, the AR system may include one or more sources of structured light to illuminate the hands. The structured light may, or may not, be visible to the user. For example, the light sources may selectively emit in the infrared or near-infrared range of the electromagnetic spectrum.

As yet a further example, the AR system may perform hand tracking via an instrumented glove, for instance similar to the haptic glove discussed herein. The AR system may optically track the haptic glove. Additionally or alternatively, the AR system may use telemetry from one or more glove sensors, for example one or more internal sensors or accelerometers (e.g., MEMS accelerometers) located in the glove.

Finger Gestures

In some implementations, fingers gestures may be used as input for the AR system. Finger gestures can take a variety of forms and may, for example, be based on inter-finger interaction, pointing, tapping, rubbing, etc.

Other gestures may, for example, include 2D or 3D representations of characters (e.g., letters, digits, punctuation). To enter such a gesture, a user may simply swipe finger(s) in a predefined character pattern.

In one implementation of a user interface, the AR system may render three circles, each circle with specifically chosen characters (e.g., letters, digits, punctuation) arranged circumferentially around the periphery. The user can swipe through the circles and letters to designate a character selection or input. In another implementation, the AR system renders a keyboard (e.g., QWERTY keyboard) low in the user's field of view, proximate a position of the user's dominate hand in a bent-arm position. The user can than perform a swipe-like motion through desired keys, and then indicate that the swipe gesture selection is complete by performing another gesture (e.g., thumb-to-ring finger gesture) or other proprioceptive interaction.

Other gestures may include thumb/wheel selection type gestures, which may, for example be used with a "popup" circular radial menu which may be rendered in a field of view of a user, according to one illustrated embodiment.

Figure 103:
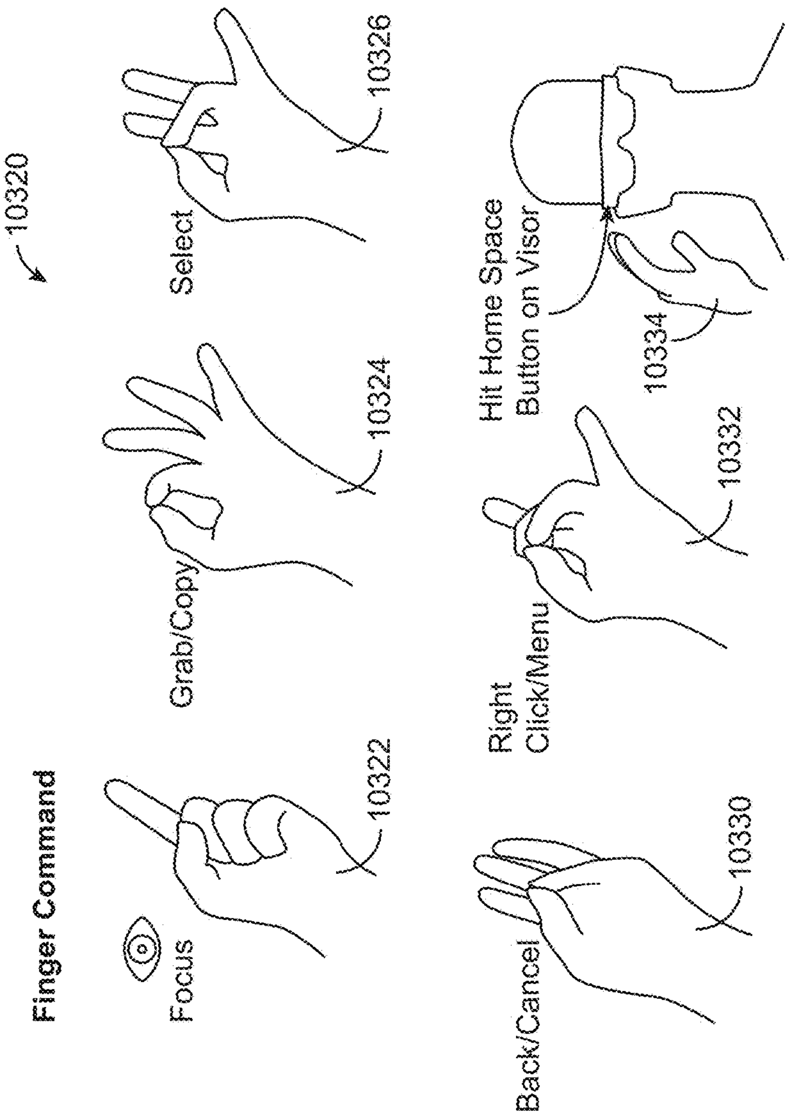
FIG. 103 illustrates a variety of hand gestures that may be used to communicate with the augmented reality system, according to one embodiment.

Referring now to FIG. 103, some additional gestures 10320 are also illustrated. It should be appreciated that the finger gestures shown in FIG. 103 are for example purposes only, and other gestures may be similarly used. In the top row left-most position, a pointed index finger may indicate a command to focus, for example to focus on a particular portion of a scene or virtual content at which the index finger is pointed. For example, gesture 10322 shows a gesture for a "focus" command consisting of a pointed index finger. The AR system may recognize the gesture (e.g., through the captured image/video of the finger, through sensors if a haptic glove is used, etc.) and perform the desired action.

In the top row middle position, a first pinch gesture with the tip of the index finger touching a tip of the thumb to form a closed circle may indicate a grab and/or copy command. As shown in FIG. 103, the user may press the index and thumb finger together to "pinch" or grab one part of the user interface to another (e.g., gesture 10324). For example, the user may use this gesture to copy or move an icon (e.g., an application) from one part of the virtual user interface to another.

In the top row right-most position, a second pinch gesture with the tip of the ring finger touching a tip of the thumb to form a closed circle may indicate a select command. Similarly, a "select" gesture may comprise pressing of the user's thumb with the ring finger, in one or more embodiments, as shown in FIG. 10326. For example, the user may use this gesture to select a particular document, or perform some type of AR command.

In the bottom row left-most position, a third pinch gesture with the tip of the pinkie finger touching a tip of the thumb to form a closed circle may indicate a back and/or cancel command. Gesture 10330 shows an example "back/cancel" gesture that involves pressing together of the pinky finger and the thumb.

In the bottom row middle position, a gesture in which the ring and middle fingers are curled with the tip of the ring finger touching a tip of the thumb may indicate a click and/or menu command. Gesture 10332 (e.g., pressing together of the thumb with the middle finger and the ring finger) may be used for a "right click" command or to signify to the system to go back to the "Main Menu."

In one or more embodiments, the user may simply hit a "Home Space" button on the AR system visor to go back to a Home page (e.g., 10334). In the bottom row right-most position, touching the tip of the index finger to a location on the head worn component or frame may indicate a return to home command. This may cause the AR system to return to a home or default configuration, for example displaying a home or default menu.

As shown in FIG. 103, the AR system recognizes various commands, and in response to these commands, performs certain functions that are mapped to the commands. The mapping of gestures to commands may be universally defined, across many users, facilitating development of various applications which employ at least some commonality in user interfaces. Alternatively or additionally, users or developers may define a mapping between at least some of the gestures and corresponding commands to be executed by the AR system in response to detection of the commands.

Totems

The AR system may detect or capture a user's interaction via tracking (e.g., visual tracking) of a totem. The totem is a predefined physical object that is recognized by the system, and may be used to communicate with the AR system.

Any suitable existing physical structure can be used as a totem. For example, in gaming applications, a game object (e.g., tennis racket, gun controller, etc.) can be recognized as a totem. One or more feature points can be recognized on the physical structure, providing a context to identify the physical structure as a totem. Visual tracking can be performed of the totem, employing one or more cameras to detect a position, orientation, and/or movement (e.g., position, direction, distance, speed, acceleration) of the totem with respect to some reference frame (e.g., reference frame of a piece of media, the real world, physical room, user's body, user's head).

Actively marked totems comprise some sort of active lighting or other form of visual identification. Examples of such active marking include (a) flashing lights (e.g., LEDs); (b) lighted pattern groups; (c) reflective markers highlighted by lighting; (d) fiber-based lighting; (e) static light patterns; and/or (f) dynamic light patterns. Light patterns can be used to uniquely identify specific totems among multiple totems.

Passively marked totems comprise non-active lighting or identification means. Examples of such passively marked totems include textured patterns and reflective markers.

The totem can also incorporate one or more cameras/sensors, so that no external equipment is needed to track the totem. Instead, the totem will track itself and will provide its own location, orientation, and/or identification to other devices. The on-board camera are used to visually check for feature points, to perform visual tracking to detect a position, orientation, and/or movement (e.g., position, direction, distance, speed, acceleration) of the totem itself and with respect to a reference frame. In addition, sensors mounted on the totem (such as a GPS sensor or accelerometers) can be used to detect the position and location of the totem.

A totem controller object is a device that can be mounted to any physical structure, and which incorporates functionality to facilitate tracking/identification of the totem. This allows any physical structure to become a totem merely by placing or affixing the totem controller object to that physical structure. The totem controller object may be a powered object that includes a battery to power electronics on the object. The totem controller object may include communications, e.g., wireless communications infrastructure such as an antenna and wireless networking modem, to exchange messages with other devices. The totem controller object may also include any active marking (such as LEDs or fiber-based lighting), passive marking (such as reflectors or patterns), or cameras/sensors (such as cameras, GPS locator, or accelerometers).

Totems may be used in order to provide a virtual user interface, in one or more embodiments. The AR system may, for example, render a virtual user interface to appear on the totem. The totem may take a large variety of forms. For example, the totem may be an inanimate object. For instance, the totem may take the form of a piece or sheet of metal (e.g., aluminum). A processor component of an individual AR system, for instance a belt pack, may serve as a totem.

The AR system may, for example, replicate a user interface of an actual physical device (e.g., keyboard and/or trackpad of a computer, a mobile phone) on a "dumb" totem. As an example, the AR system may render the user interface of a particular operation system of a phone onto a surface of an aluminum sheet. The AR system may detect interaction with the rendered virtual user interface, for instance via a front facing camera, and implement functions based on the detected interactions.

For example, the AR system may implement one or more virtual actions, for instance render an updated display of the operating system of the phone, render video, render display of a Webpage. Additionally or alternatively, the AR system may implement one or more actual or non-virtual actions, for instance send email, send text, and/or place a phone call. This may allow a user to select a desired user interface to interact with from a set of actual physical devices, for example various models of smartphones and/or tablets, or other smartphones, tablets, or even other types of appliances which have user interfaces such as televisions, DVD/Blu-ray players, thermostats, etc.

Thus a totem may be any object on which virtual content can be rendered, including for example a body part (e.g., hand) to which virtual content can be locked in a user experience (UX) context. In some implementations, the AR system can render virtual content so as to appear to be coming out from behind a totem, for instance appearing to emerge from behind a user's hand, and slowly wrapping at least partially around the user's hand. The AR system detects user interaction with the virtual content, for instance user finger manipulation with the virtual content which is wrapped partially around the user's hand.

Alternatively, the AR system may render virtual content so as to appear to emerge from a palm of the user's hand, and the system may detect a user's fingertip interaction and/or manipulation of that virtual content. Thus, the virtual content may be locked to a reference frame of a user's hand. The AR system may be responsive to various user interactions or gestures, including looking at some item of virtual content, moving hands, touching hands to themselves or to the environment, other gestures, opening and/or closing eyes, etc.

As described herein, the AR system may employ body-centered rendering, user-centered rendering, hand-centered rendering, hip-centered rendering, world-centered rendering, propreaceptic tactile interactions, pointing, eye vectors, totems, object recognizers, body sensor rendering, head pose detection, voice input, environment or ambient sound input, and the environment situation input to interact with the user of the AR system.

Figure 104:
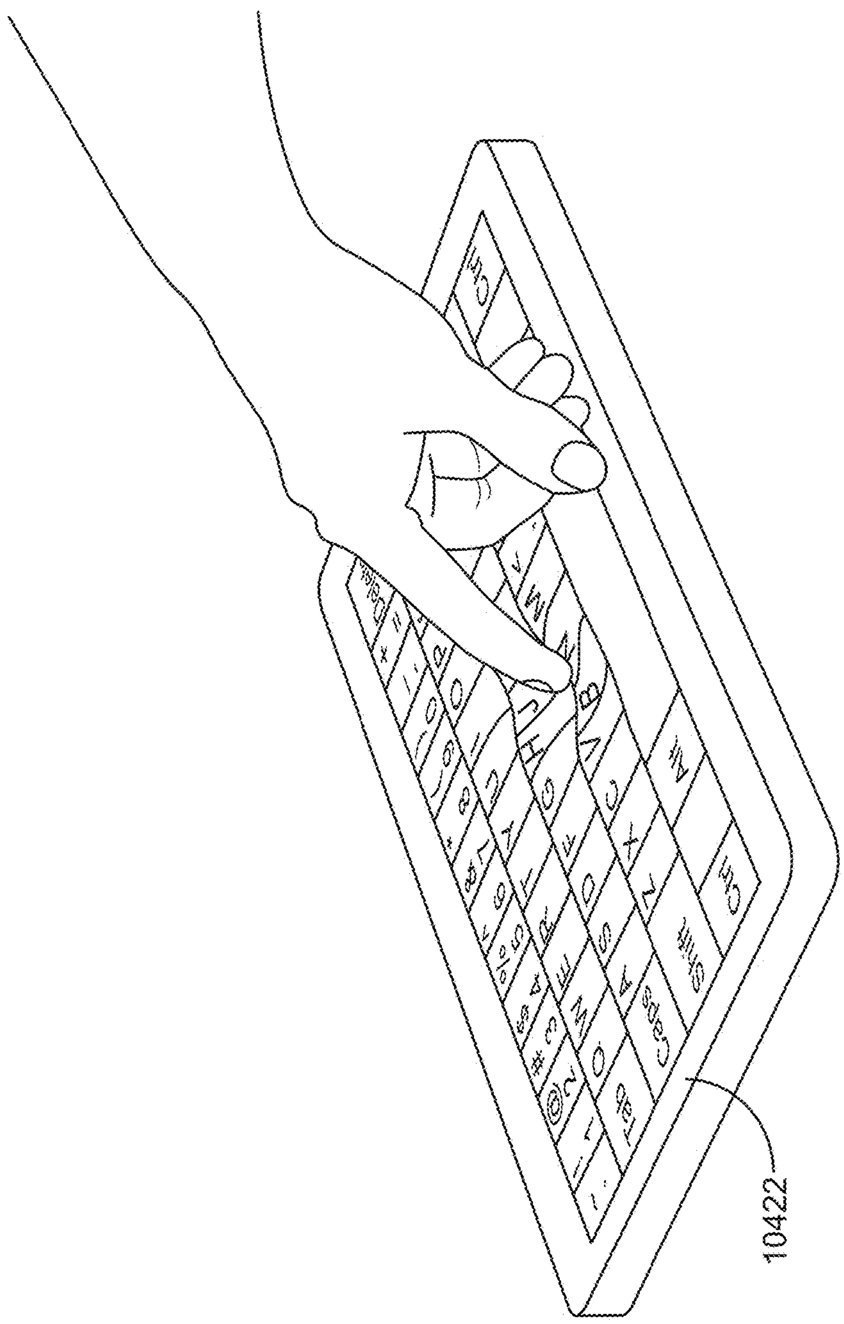
FIG. 104 illustrates an example totem, according to one embodiment.

FIG. 104 shows a totem according to one illustrated embodiment, which may be used as part of a virtual keyboard 10422 implementation. The totem may have a generally rectangular profile and a soft durometer surface. The soft surface provides some tactile perception to a user as the user interacts with the totem via touch.

As described above, the AR system may render the virtual keyboard image in a user's field of view, such that the virtual keys, switches or other user input components appear to reside on the surface of the totem. The AR system may, for example, render a 4D light field which is projected directly to a user's retina. The 4D light field allows the user to visually perceive the virtual keyboard with what appears to be real depth.

The AR system may also detect or capture the user's interaction with the surface of the totem. For example, the AR system may employ one or more front facing cameras to detect a position and/or movement of a user's fingers. In particularly, the AR system may identify from the captured images, any interactions of the user's fingers with various portions of the surface of the totem. The AR system maps the locations of those interactions with the positions of virtual keys, and hence with various inputs (e.g., characters, numbers, punctuation, controls, functions). In response to the inputs, the AR system may cause the inputs to be provided to a computer or some other device.

Additionally or alternatively, the AR system may render the virtual user interface differently in response to selected user interactions. For instance, some user interactions may correspond to selection of a particular submenu, application or function. The AR system may respond to such selection by rendering a new set of virtual interface elements, based at least in part on the selection. For instance, the AR system may render a submenu or a menu or other virtual interface element associated with the selected application or functions. Thus, rendering by AR system may be context sensitive.

Figure 105A:
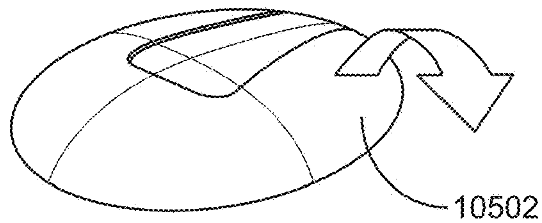
FIG. 105A-105C illustrate other example totems, according to one or more embodiments.

FIG. 105A shows a top surface of a totem according to one illustrated embodiment, which may be used as part of a virtual mouse implementation 10502. The top surface of the totem may have generally ovoid profile, with hard surface portion, and one or more soft surface portions to replicate keys of a physical mouse. The soft surface portions do not actually need to implement switches, and the totem may have no physical keys, physical switches or physical electronics. The soft surface portion(s) provides some tactile perception to a user as the user interacts with the totem via touch.

The AR system may render the virtual mouse image 10502 in a user's field of view, such that the virtual input structures (e.g., keys, buttons, scroll wheels, joystick, thumbstick, etc.) appear to reside on the top surface of the totem. As discussed above, the AR system may, for example, render a 4D light field which is projected directly to a user's retina to provide the visual perception of the virtual mouse with what appears to be real depth.

The AR system may also detect or capture movement of the totem by the user, as well as, user interaction with the surface of the totem. For example, the AR system may employ one or more front-facing cameras to detect a position and/or movement of the mouse and/or interaction of a user's fingers with the virtual input structures (e.g., keys). The AR system maps the position and/or movement of the mouse. The AR system maps user interactions with the positions of virtual input structures (e.g., keys), and hence with various inputs (e.g., controls, functions). In response to the position, movements and/or virtual input structure activations, the AR system may cause corresponding inputs to be provided to a computer or some other device.

Additionally or alternatively, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system may render a submenu or a menu or other virtual interface element associated with the selected application or functions, as discussed above.

Figure 105B:
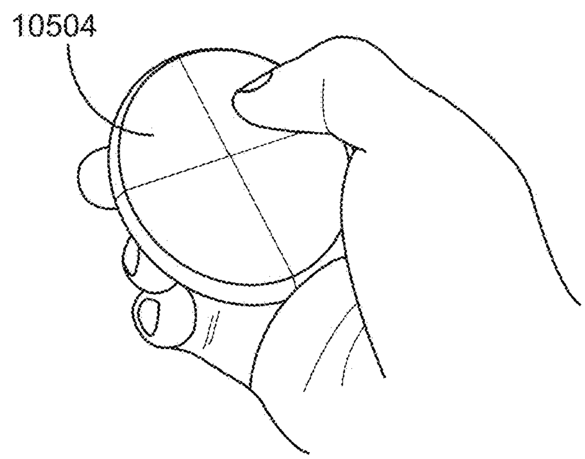

FIG. 105B shows a bottom surface 10504 of the totem of FIG. 105A, according to one illustrated embodiment, which may be used as part of a virtual trackpad implementation. The bottom surface of the totem may be flat with a generally oval or circular profile. The bottom surface may be a hard surface. The totem may have no physical input structures (e.g., keys, buttons, scroll wheels), no physical switches and no physical electronics.

The AR system may optionally render a virtual trackpad image in a user's field of view, such that the virtual demarcations appear to reside on the bottom surface of the totem. The AR system detects or captures a user's interaction with the bottom surface of the totem. For example, the AR system may employ one or more front-facing cameras to detect a position and/or movement of a user's fingers on the bottom surface of the totem. For instance, the AR system may detect one or more static positions of one or more fingers, or a change in position of one or more fingers (e.g., swiping gesture with one or more fingers, pinching gesture using two or more fingers).

The AR system may also employ the front-facing camera(s) to detect interactions (e.g., tap, double tap, short tap, long tap) of a user's fingers with the bottom surface of the totem. The AR system maps the position and/or movement (e.g., distance, direction, speed, acceleration) of the user's fingers along the bottom surface of the totem. The AR system maps user interactions (e.g., number of interactions, types of interactions, duration of interactions) with the bottom surface of the totem, and hence with various inputs (e.g., controls, functions). In response to the position, movements and/or interactions, the AR system may cause corresponding inputs to be provided to a computer or some other device.

Figure 105C:
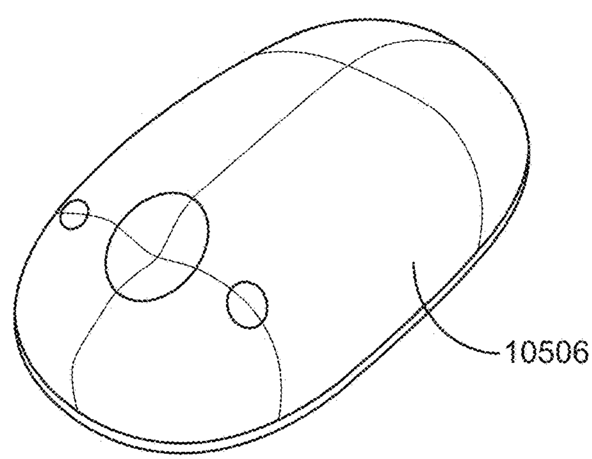

FIG. 105C shows a top surface of a totem 10506 according to another illustrated embodiment, which may be used as part of a virtual mouse implementation. The totem of FIG. 105C is similar in many respects to that of the totem of FIG. 105A. Hence, similar or even identical structures are identified with the same reference numbers.

The top surface of the totem of FIG. 105C includes one or more indents or depressions at one or more respective locations on the top surface where the AR system will render keys or cause other structures (e.g., scroll wheel) to appear.

Figure 106A:
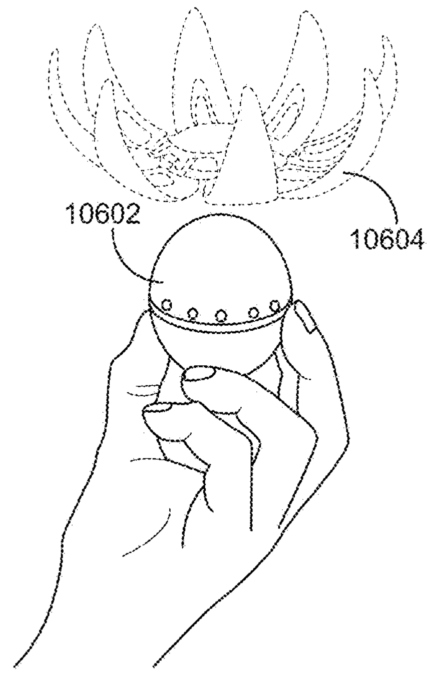
FIG. 106A-106C illustrate other totems that may be used to communicate with the augmented reality system.

FIG. 106A shows an orb totem 10602 with a flower petal-shaped (e.g., Lotus flower) virtual user interface 10604 according to another illustrated embodiment.

The totem 10602 may have a spherical shape with either a hard outer surface or a soft outer surface. The outer surface of the totem 10602 may have texture to facilitate a sure grip by the user. The totem 10602 may have no physical keys, physical switches or physical electronics.

The AR system may render the flower petal-shaped virtual user interface image 10604 in a user's field of view, so as to appear to be emanating from the totem 10602. Each of the petals of the virtual user interface 10604 may correspond to a function, category of functions, and/or category of content or media types, tools and/or applications.

The AR system may optionally render one or more demarcations on the outer surface of the totem. Alternatively or additionally, the totem 10602 may optionally bear one or more physical demarcations (e.g., printed, inscribed) on the outer surface. The demarcation(s) may assist the user in visually orienting the totem 10602 with the flower petal-shaped virtual user interface 10604.

In one or more embodiments, the AR system detects or captures a user's interaction with the totem 10602. For example, the AR system may employ one or more front facing cameras to detect a position, orientation, and/or movement (e.g., rotational direction, magnitude of rotation, angular speed, angular acceleration) of the totem with respect to some reference frame (e.g., reference frame of the flower petal-shaped virtual user interface, real world, physical room, user's body, user's head). For instance, the AR system may detect one or more static orientations or a change in orientation of the totem 10602 or a demarcation on the totem 10602.

The AR system may also employ the front facing camera(s) to detect interactions (e.g., tap, double tap, short tap, long tap, fingertip grip, enveloping grasp, etc.) of a user's fingers with outer surface of the totem. The AR system maps the orientation and/or change in orientation (e.g., distance, direction, speed, acceleration) of the totem to user selections or inputs. The AR system optionally maps user interactions (e.g., number of interactions, types of interactions, duration of interactions) with the outer surface of the totem 10602, and hence with various inputs (e.g., controls, functions). In response to the orientations, changes in position (e.g., movements) and/or interactions, the AR system may cause corresponding inputs to be provided to a computer or some other device.

Additionally or alternatively, and as discussed above, the AR system may render the virtual user interface 10604 differently in response to various user interactions. For instance, some user interactions may correspond to selection of a particular submenu, application or function. The AR system may respond to such selection by rendering a new set of virtual interface elements, based at least in part on the selection. For instance, the AR system may render a sub-menu or a menu or other virtual interface element associated with the selected application or functions.

Figure 106B:
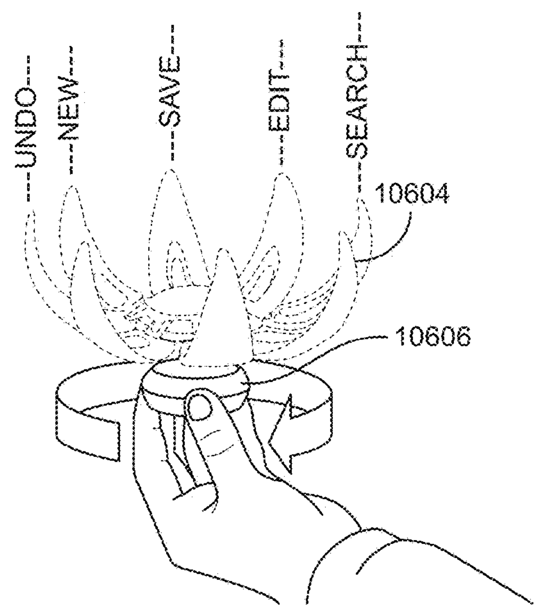

Referring now to FIG. 106B, the totem 10606 is disc shaped. Similar to the user interface 10604 of FIG. 106A, a flower-petal shaped virtual user interface 10604 is rendered when the totem 10606 is selected, in some embodiments.

The totem of FIG. 106B is disc-shaped, having a top surface and bottom surface which may be flat or domed, as illustrated in FIG. 106B. That is, a radius of curvature may be infinite or much larger than a radius of curvature of a peripheral edge of the totem.

The AR system renders the flower petal-shaped virtual user interface 10604 image in a user's field of view, so as to appear to be emanating from the totem 10606. As noted above, each of the petals may correspond to a function, category of functions, and/or category of content or media types, tools and/or applications. FIG. 106B represents a number of examples, including a search function, settings functions, collection of favorites, profiles, collection of games, collection of tools and/or applications, social media or application category, media or content category or collection (e.g., entertainment, electronic magazines, electronic books, other publications, movies, television programs, etc.).

Figure 106C:
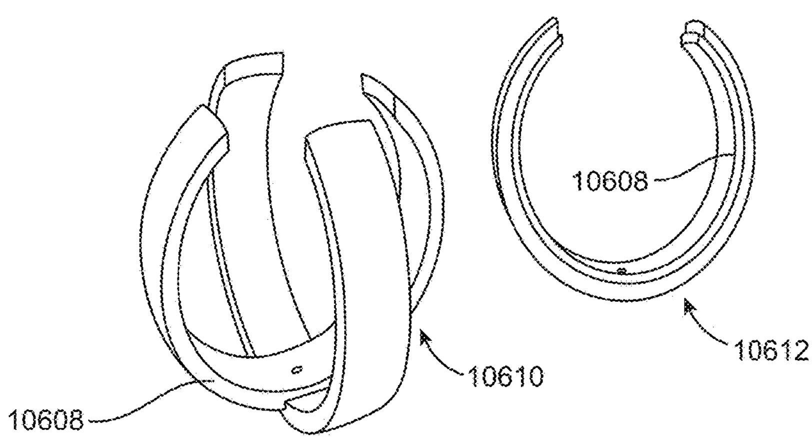

FIG. 106C shows an orb totem 10608 in a first configuration 10610 and a second configuration 10612, according to another illustrated embodiment. In particular, the totem 10608 has a number of arms or elements which are selectively moveable or positionable with respect to each other. For example, a first arm or pair of arms may be rotated with respect to a second arm or pair of arms. The first arm or pair of arms may be rotated from a first configuration 10610 to a second configuration 10612. Where the arms are generally arcuate, as illustrated, in the first configuration, 10610, the arms form an orb or generally spherical structure. In the second configuration, 10612, the second arm or pairs of arms align with the first arm or pairs of arms to form an partial tube with a C-shaped profile, as shown in the illustrated embodiment.

The arms may have an inner diameter size large enough to receive a wrist or other limb of a user, in one or more embodiments. The inner diameter may be sized small enough to prevent the totem 10608 from sliding off the limb during use. For example, the inner diameter may be sized to comfortably receive a wrist of a user, while not sliding past a hand of the user. This allows the totem 10608 to take the form of a bracelet, for example when not in use, for convenient carrying. A user may then an orb shape for use, in a fashion similar to the orb totems described above. The totem may have no physical keys, physical switches or physical electronics.

Notably, the virtual user interface (such as virtual user interface 10604 shown in FIGS. 106A and 106B) is omitted from FIG. 106C. The AR system may render a virtual user interface in any of a large variety of forms, for example the flower petal-shaped virtual user interface 10604 previously illustrated and discussed.

Figure 107A:
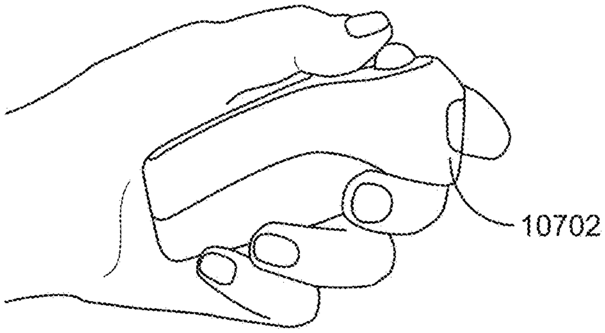
FIGS. 107A-107D illustrates other example totems, according to one or more embodiments.

FIG. 107A shows a handheld controller shaped totem 10702, according to another illustrated embodiment. The totem 10702 has a gripping section sized and may comfortably fit in a user's hand. The totem 10702 may include a number of user input elements, for example a key or button and a scroll wheel. The user input elements may be physical elements, although not connected to any sensor or switches in the totem 10702, which itself may have no physical switches or physical electronics. Alternatively, the user input elements may be virtual elements rendered by the AR system. It should be appreciated that the totem 10702 may have depressions, cavities, protrusions, textures or other structures to tactile replicate a feel of the user input element.

The AR system detects or captures a user's interaction with the user input elements of the totem 10702. For example, the AR system may employ one or more front-facing cameras to detect a position and/or movement of a user's fingers with respect to the user input elements of the totem 10702. For instance, the AR system may detect one or more static positions of one or more fingers, or a change in position of one or more fingers (e.g., swiping or rocking gesture with one or more fingers, rotating or scrolling gesture, or both).

The AR system may also employ the front facing camera(s) to detect interactions (e.g., tap, double tap, short tap, long tap) of a user's fingers with the user input elements of the totem 10702. The AR system maps the position and/or movement (e.g., distance, direction, speed, acceleration) of the user's fingers with the user input elements of the totem 10702. The AR system maps user interactions (e.g., number of interactions, types of interactions, duration of interactions) of the user's fingers with the user input elements of the totem 10702, and hence with various inputs (e.g., controls, functions). In response to the position, movements and/or interactions, the AR system may cause corresponding inputs to be provided to a computer or some other device.

Figure 107B:
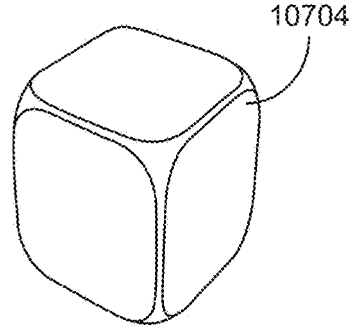

FIG. 107B shows a block shaped totem 10704, according to another illustrated embodiment. The totem 10704 may have the shape of a cube with six faces, or some other three-dimensional geometric structure. The totem 10704 may have a hard outer surface or a soft outer surface. The outer surface of the totem 10704 may have texture to facilitate a sure grip by the user. The totem 10704 may have no physical keys, physical switches or physical electronics.

The AR system may render a virtual user interface image in a user's field of view, so as to appear to be on the face(s) of the outer surface of the totem 10704, in one or more embodiments. Each of the faces, and corresponding user input, may correspond to a function, category of functions, and/or category of content or media types, tools and/or applications.

The AR system detects or captures a user's interaction with the totem 10704. For example, the AR system may employ one or more front-facing cameras to detect a position, orientation, and/or movement (e.g., rotational direction, magnitude of rotation, angular speed, angular acceleration) of the totem 10704 with respect to some reference frame (e.g., reference frame of the real world, physical room, user's body, user's head, etc.). For instance, the AR system may detect one or more static orientations or a change in orientation of the totem 10704.

The AR system may also employ the front-facing camera(s) to detect interactions (e.g., tap, double tap, short tap, long tap, fingertip grip, enveloping grasp, etc.) of a user's fingers with outer surface of the totem 10704. The AR system maps the orientation and/or change in orientation (e.g., distance, direction, speed, acceleration) of the totem 10704 to user selections or inputs. The AR system optionally maps user interactions (e.g., number of interactions, types of interactions, duration of interactions) with the outer surface of the totem 10704, and hence with various inputs (e.g., controls, functions). In response to the orientations, changes in position (e.g., movements) and/or interactions, the AR system may cause corresponding inputs to be provided to a computer or some other device.

In response to the orientations, changes in position (e.g., movements) and/or interactions, the AR system may change one or more aspects of the rendering the virtual user interface, causing corresponding inputs to be provided to a computer or some other device. For example, as a user rotates the totem 10704, different faces may come into the user's field of view, while other faces rotate out of the user's field of view. The AR system may respond by rendering virtual interface elements to appear on the now visible faces, which were previously hidden from the view of the user. Likewise, the AR system may respond by stopping the rendering of virtual interface elements which would otherwise appear on the faces now hidden from the view of the user.

Additionally or alternatively, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions.

Figure 107C:
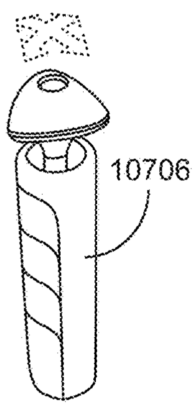

FIG. 107C shows a handheld controller shaped totem 10706, according to another illustrated embodiment. The totem 10706 has a gripping section sized and may comfortably fit in a user's hand, for example a cylindrically tubular portion. The totem 10706 may include a number of user input elements, for example a number of pressure sensitive switches and a joystick or thumbstick.

The user input elements may be physical elements, although not connected to any sensor or switches in the totem 10706, which itself may have no physical switches or physical electronics. Alternatively, the user input elements may be virtual elements rendered by the AR system. Where the user input elements are virtual elements, the totem 10706 may have depressions, cavities, protrusions, textures or other structures to tactile replicate a feel of the user input element.

The AR system detects or captures a user's interaction with the user input elements of the totem 10706. For example, the AR system may employ one or more front facing cameras to detect a position and/or movement of a user's fingers with respect to the user input elements of the totem 10706. For instance, the AR system may detect one or more static positions of one or more fingers, or a change in position of one or more fingers (e.g., swiping or rocking gesture with one or more fingers, rotating or scrolling gesture, or both). The AR system may also employ the front facing camera(s) to detect interactions (e.g., tap, double tap, short tap, long tap) of a user's fingers with the user input elements of the totem 10706.

As discussed above, the AR system maps the position and/or movement (e.g., distance, direction, speed, acceleration) of the user's fingers with the user input elements of the totem 10706. The AR system maps user interactions (e.g., number of interactions, types of interactions, duration of interactions) of the user's fingers with the user input elements of the totem 10706, and hence with various inputs (e.g., controls, functions). In response to the position, movements and/or interactions, the AR system may cause corresponding inputs to be provided to a computer or some other device.

Figure 107D:
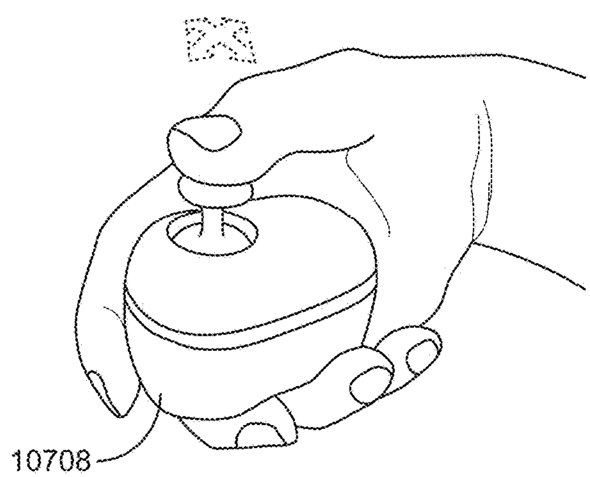

FIG. 107D shows another handheld controller shaped totem, 10708 according to another illustrated embodiment. The totem 10708 has a gripping section sized and may comfortably fit in a user's hand. The totem 10708 may include a number of user input elements, for example a key or button and a joystick or thumbstick. The user input elements may be physical elements, although not connected to any sensor or switches in the totem 10708, which itself may have no physical switches or physical electronics. Alternatively, the user input elements may be virtual elements rendered by the AR system. In one or more embodiments, the totem 10708 may have depressions, cavities, protrusions, textures or other structures to tactile replicate a feel of the user input element.

The AR system detects or captures a user's interaction with the user input elements of the totem 10708. For example, the AR system may employ one or more front-facing cameras to detect a position and/or movement of a user's fingers with respect to the user input elements of the totem 10708. For instance, the AR system may detect one or more static positions of one or more fingers, or a change in position of one or more fingers (e.g., swiping or rocking gesture with one or more fingers, rotating or scrolling gesture, or both).

Similar to the above, the AR system may also employ the front-facing camera(s) to detect interactions (e.g., tap, double tap, short tap, long tap) of a user's fingers with the user input elements of the totem. The AR system maps the position and/or movement (e.g., distance, direction, speed, acceleration) of the user's fingers with the user input elements of the totem 10708. The AR system maps user interactions (e.g., number of interactions, types of interactions, duration of interactions) of the user's fingers with the user input elements of the totem 10708, and hence with various inputs (e.g., controls, functions). In response to the position, movements and/or interactions, the AR system may cause corresponding inputs to be provided to a computer or some other device.

Figure 108A:
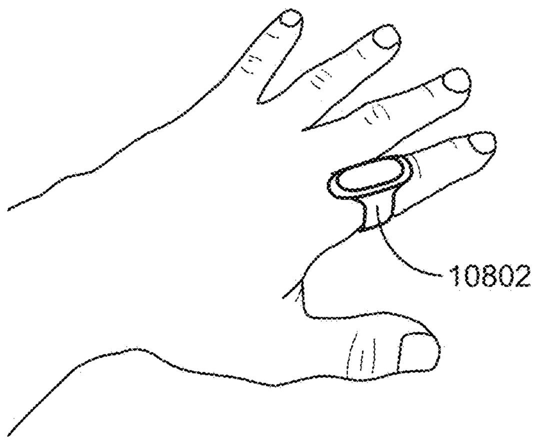

FIG. 108A shows a ring totem 10802, according one illustrated embodiment. In particular, the ring totem 10802 has a tubular portion and an interaction portion physically coupled to the tubular portion. The tubular and interaction portions may be integral, and may be formed as or from a single unitary structure. The tubular portion has an inner diameter sized large enough to receive a finger of a user. The inner diameter may be sized small enough to prevent the totem 10802 from sliding off the finger during normal use. This allows the ring totem 10802 to be comfortably worn even when not in active use, ensuring availability when needed. The ring totem 10802 may have no physical keys, physical switches or physical electronics.

Notably, the virtual user interface (e.g., 10604 shown in FIGS. 106A and 106B) is omitted. The AR system may render a virtual user interface in any of a large variety of forms. For example, the AR system may render a virtual user interface in the user's field of view as to appear as if the virtual user interface element(s) reside on the interaction surface. Alternatively, the AR system may render a virtual user interface as the flower petal-shaped virtual user interface 10604 previously illustrated and discussed, emanating from the interaction surface.

Similar to the above, the AR system detects or captures a user's interaction with the totem 10802. For example, the AR system may employ one or more front facing cameras to detect a position, orientation, and/or movement (e.g., position, direction, distance, speed, acceleration) of the user's finger(s) with respect to interaction surface in some reference frame (e.g., reference frame of the interaction surface, real world, physical room, user's body, user's head). For instance, the AR system may detect one or more locations of touches or a change in position of a finger on the interaction surface.

Again, as discussed above, the AR system may also employ the front-facing camera(s) to detect interactions (e.g., tap, double tap, short tap, long tap, fingertip grip, enveloping grasp) of a user's fingers with the interaction surface of the totem 10802. The AR system maps the position, orientation, and/or movement of the finger with respect to the interaction surface to a set of user selections or inputs. The AR system optionally maps other user interactions (e.g., number of interactions, types of interactions, duration of interactions) with the interaction surface of the totem 10802, and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions.

Figure 108B:
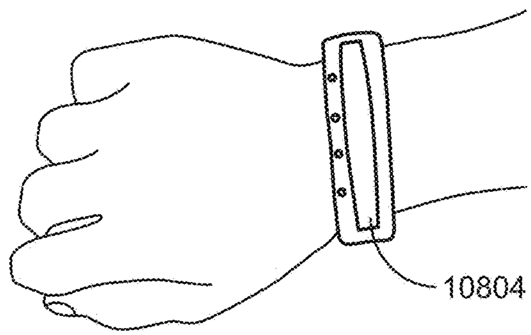

FIG. 108B shows a bracelet totem 10804, according one illustrated embodiment. In particular, the bracelet totem 10804 has a tubular portion and a touch surface physically coupled to the tubular portion. The tubular portion and touch surface may be integral, and may be formed as or from a single unitary structure. The tubular portion has an inner diameter sized large enough to receive a wrist or other limb of a user. The inner diameter may be sized small enough to prevent the totem 10804 from sliding off the limb during use. For example, the inner diameter may be sized to comfortably receive a wrist of a user, while not sliding past a hand of the user. This allows the bracelet totem 10804 to be worn whether in active use or not, ensuring availability when desired. The bracelet totem 10804 may have no physical keys, physical switches or physical electronics.

The AR system may render a virtual user interface in any of a large variety of forms. For example, the AR system may render a virtual user interface in the user's field of view as to appear as if the virtual user interface element(s) reside on the touch surface. Alternatively, the AR system may render a virtual user interface similar to the flower petal-shaped virtual user interface 10604 previously illustrated and discussed, emanating from the touch surface.

The AR system detects or captures a user's interaction with the totem 10804. For example, the AR system may employ one or more front-facing cameras to detect a position, orientation, and/or movement (e.g., position, direction, distance, speed, acceleration) of the user's finger(s) with respect to the touch surface of the totem in some reference frame (e.g., reference frame of the touch surface, real world, physical room, user's body, user's head). For instance, the AR system may detect one or more locations of touches or a change in position of a finger on the touch surface.

As discussed above, the AR system may also employ the front-facing camera(s) to detect interactions (e.g., tap, double tap, short tap, long tap, fingertip grip, enveloping grasp) of a user's fingers with the touch surface of the totem 10804. The AR system maps the position, orientation, and/or movement of the finger with respect to the touch surface to a set of user selections or inputs. The AR system optionally maps other user interactions (e.g., number of interactions, types of interactions, duration of interactions) with the touch surface of the totem 10804, and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system may render a submenu or a menu or other virtual interface element associated with the selected application or functions.

Figure 108C:
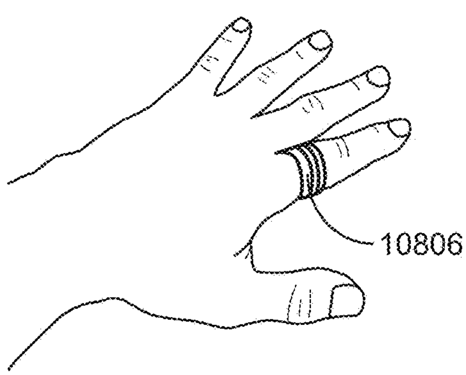

FIG. 108C shows a ring totem 10806, according another illustrated embodiment. In particular, the ring totem 10806 has a tubular portion and an interaction portion physically rotatably coupled to the tubular portion to rotate with respect thereto. The tubular portion has an inner diameter sized large enough to receive a finger of a user there through. The inner diameter may be sized small enough to prevent the totem from sliding off the finger during normal use. This allows the ring totem to be comfortably worn even when not in active use, ensuring availability when needed.

The interaction portion may itself be a closed tubular member, having a respective inner diameter received about an outer diameter of the tubular portion. For example, the interaction portion may be journaled or slideable mounted to the tubular portion. The interaction portion is accessible from an exterior surface of the ring totem. The interaction portion may, for example, be rotatable in a first rotational direction about a longitudinal axis of the tubular portion. The interaction portion may additionally be rotatable in a second rotational, opposite the first rotational direction about the longitudinal axis of the tubular portion. The ring totem 10806 may have no physical switches or physical electronics.

The AR system may render a virtual user interface in any of a large variety of forms. For example, the AR system may render a virtual user interface in the user's field of view as to appear as if the virtual user interface element(s) reside on the interaction portion. Alternatively, the AR system may render a virtual user interface similar to the flower petal-shaped virtual user interface previously illustrated and discussed, emanating from the interaction portion.

Similar to the above, the AR system detects or captures a user's interaction with the totem. For example, the AR system may employ one or more front-facing cameras to detect a position, orientation, and/or movement (e.g., position, direction, distance, speed, acceleration) of the interaction portion with respect to the tubular portion (e.g., finger receiving portion) in some reference frame (e.g., reference frame of the tubular portion, real world, physical room, user's body, user's head).

For instance, the AR system may detect one or more locations or orientations or changes in position or orientation of the interaction portion with respect to the tubular portion. The AR system may also employ the front facing camera(s) to detect interactions (e.g., tap, double tap, short tap, long tap, fingertip grip, enveloping grasp) of a user's fingers with the interaction portion of the totem. The AR system maps the position, orientation, and/or movement of the interaction portion with respect the tubular portion to a set of user selections or inputs. The AR system optionally maps other user interactions (e.g., number of interactions, types of interactions, duration of interactions) with the interaction portion of the totem, and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render the virtual user interface differently in response to select user interactions. For instance, some user interactions may correspond to selection of a particular submenu, application or function. The AR system may respond to such selection by rendering a new set of virtual interface elements, based at least in part on the selection.

Figure 109A:
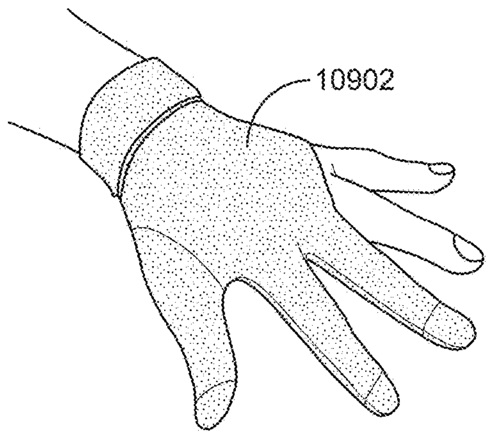
FIGS. 109A-109C illustrate more example totems, according to one or more embodiments.

FIG. 109A shows a glove-shaped haptic totem 10902, according one illustrated embodiment. In particular, the glove-shaped haptic totem 10902 is shaped like a glove or partial glove, having an opening for receiving a wrist and one or more tubular glove fingers (three shown) sized to receive a user's fingers. The glove-shaped haptic totem 10902 may be made of one or more of a variety of materials. The materials may be elastomeric or may otherwise conform to the shape or contours of a user's hand, providing a snug but comfortable fit.

The AR system may render a virtual user interface in any of a large variety of forms. For example, the AR system may render a virtual user interface in the user's field of view as to appear as if the virtual user interface element(s) is inter-actable via the glove-shaped haptic totem 10902. For example, the AR system may render a virtual user interface as one of the previously illustrated and/or described totems or virtual user interfaces.

Similar to the above, the AR system detects or captures a user's interaction via visual tracking of the user's hand and fingers on which the glove-shaped haptic totem 10902 is worn. For example, the AR system may employ one or more front-facing cameras to detect a position, orientation, and/or movement (e.g., position, direction, distance, speed, acceleration) of the user's hand and/or finger(s) with respect to some reference frame (e.g., reference frame of the touch surface, real world, physical room, user's body, user's head).

Similar to the above embodiments, for instance, the AR system may detect one or more locations of touches or a change in position of a hand and/or fingers. The AR system may also employ the front facing camera(s) to detect interactions (e.g., tap, double tap, short tap, long tap, fingertip grip, enveloping grasp) of a user's hands and/or fingers. Notably, the AR system may track the glove-shaped haptic totem 10902 instead of the user's hands and fingers. The AR system maps the position, orientation, and/or movement of the hand and/or fingers to a set of user selections or inputs.

The AR system optionally maps other user interactions (e.g., number of interactions, types of interactions, duration of interactions), and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions.

The glove-shaped haptic totem 10902 includes a plurality of actuators, which are responsive to signals to provide haptic sensations such as pressure and texture. The actuators may take any of a large variety of forms, for example piezoelectric elements, and/or micro electrical mechanical structures (MEMS).

The AR system provides haptic feedback to the user via the glove-shaped haptic totem 10902. In particular, the AR system provides signals to the glove-shaped haptic totem 10902 to replicate a sensory sensation of interacting with a physical object which a virtual object may represent. Such may include providing a sense of pressure and/or texture associated with a physical object. Thus, the AR system may cause a user to feel a presence of a virtual object, for example including various structural features of the physical object such as edges, corners, roundness, etc. The AR system may also cause a user to feel textures such as smooth, rough, dimpled, etc.

Figure 109B:
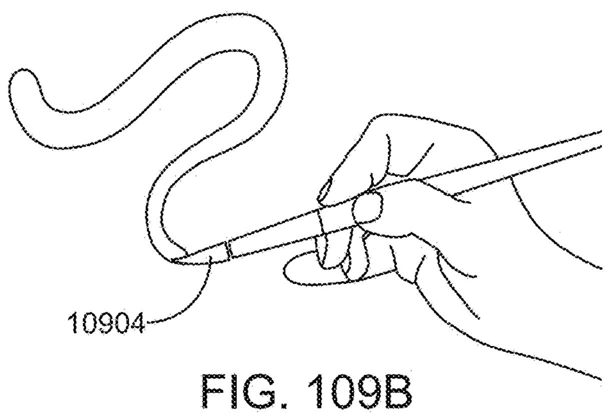

FIG. 109B shows a stylus or brush shaped totem 10904, according one illustrated embodiment. The stylus or brush shaped totem 10904 includes an elongated handle, similar to that of any number of conventional stylus or brush 10904. In contrast to conventional stylus or brush, the stylus or brush has a virtual tip or bristles. In particular, the AR system may render a desired style of virtual tip or virtual bristle to appear at an end of the physical stylus or brush 10904. The tip or bristle may take any conventional style including narrow or wide points, flat bristle brushed, tapered, slanted or cut bristle brushed, natural fiber bristle brushes (e.g., horse hair), artificial fiber bristle brushes, etc. This advantageously allows the virtual tip or bristles to be replaceable.

Similar to the above, the AR system detects or captures a user's interaction via visual tracking of the user's hand and/or fingers on the stylus or brush 10904 and/or via visual tracking of the end of the stylus or brush 10904. For example, the AR system may employ one or more front facing cameras to detect a position, orientation, and/or movement (e.g., position, direction, distance, speed, acceleration) of the user's hand and/or finger(s) and/or end of the stylus or brush with respect to some reference frame (e.g., reference frame of a piece of media, the real world, physical room, user's body, user's head). For instance, the AR system may detect one or more locations of touches or a change in position of a hand and/or fingers. Also for instance, the AR system may detect one or more locations of the end of the stylus or brush and/or an orientation of the end of the stylus or brush 10904 with respect to, for example, a piece of media or totem representing a piece of media. The AR system may additionally or alternatively detect one or more change in locations of the end of the stylus or brush 10904 and/or change in orientation of the end of the stylus or brush 10904 with respect to, for example, the piece of media or totem representing the piece of media.

As discussed above, the AR system may also employ the front-facing camera(s) to detect interactions (e.g., tap, double tap, short tap, long tap, fingertip grip, enveloping grasp) of a user's hands and/or fingers or of the stylus or brush 10904. The AR system maps the position, orientation, and/or movement of the hand and/or fingers and/or end of the stylus or brush 10904 to a set of user selections or inputs. The AR system optionally maps other user interactions (e.g., number of interactions, types of interactions, duration of interactions), and hence with various inputs (e.g., controls, functions). In response to the position, orientation, movement, and/or other interactions, the AR system may cause corresponding inputs to be provided to a computer or some other device.

Additionally or alternatively, the AR system may render a virtual image of markings made by the user using the stylus or brush 10904, taking into account the visual effects that would be achieved by the selected tip or bristles.

The stylus or brush 10904 may have one or more haptic elements (e.g., piezoelectric elements, MEMS elements), which the AR system controls to provide a sensation (e.g., smooth, rough, low friction, high friction) that replicates a feel of a selected point or bristles, as the selected point or bristles pass over media. The sensation may also reflect or replicate how the end or bristles would interact with different types of physical aspects of the media, which may be selected by the user. Thus, paper and canvas may produce two different types of haptic responses.

Figure 109C:
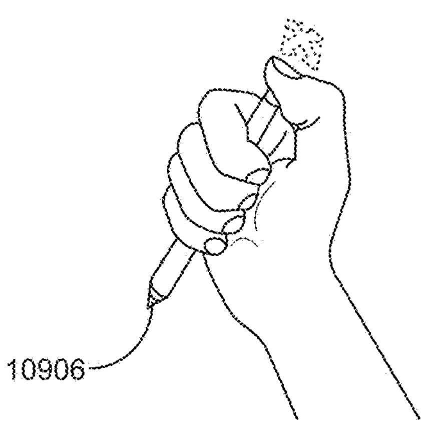

FIG. 109C shows a pen shaped totem 10906, according one illustrated embodiment. The pen shaped totem 10906 includes an elongated shaft, similar to that of any number of conventional pen, pencil, stylus or brush. The pen shaped totem 10906 has a user actuatable joystick or thumbstick located at one end of the shaft. The joystick or thumbstick is movable with respect to the elongated shaft in response to user actuation. The joystick or thumbstick may, for example, be pivotally movable in four directions (e.g., forward, back, left, right). Alternatively, the joystick or thumbstick may, for example, be movable in all directions four directions, or may be pivotally movable in any angular direction in a circle, for example to navigate. Notably, the joystick or thumbstick is not coupled to any switch or electronics.

Instead of coupling the joystick or thumbstick to a switch or electronics, the AR system detects or captures a position, orientation, or movement of the joystick or thumbstick. For example, the AR system may employ one or more front-facing cameras to detect a position, orientation, and/or movement (e.g., position, direction, distance, speed, acceleration) of the joystick or thumbstick with respect to a given reference frame (e.g., reference frame of the elongated shaft, etc.).

Additionally, as discussed above, the AR system may employ one or more front-facing cameras to detect a position, orientation, and/or movement (e.g., position, direction, distance, speed, acceleration) of the user's hand and/or finger(s) and/or end of the pen shaped totem 10906 with respect to some reference frame (e.g., reference frame of the elongated shaft, of a piece of media, the real world, physical room, user's body, user's head).

For instance, the AR system may detect one or more locations of touches or a change in position of a hand and/or fingers. Also for instance, the AR system may detect one or more locations of the end of the pen shaped totem 10906 and/or an orientation of the end of the pen shaped totem 10906 with respect to, for example, a piece of media or totem representing a piece of media. The AR system may additionally or alternatively detect one or more change in locations of the end of the pen shaped totem 10906 and/or change in orientation of the end of the pen shaped totem 10906 with respect to, for example, the piece of media or totem representing the piece of media.

Similar to the above, the AR system may also employ the front facing camera(s) to detect interactions (e.g., tap, double tap, short tap, long tap, fingertip grip, enveloping grasp, etc.) of a user's hands and/or fingers with the joystick or thumbstick or the elongated shaft of the pen shaped totem 10906. The AR system maps the position, orientation, and/or movement of the hand and/or fingers and/or end of the joystick or thumbstick to a set of user selections or inputs. The AR system optionally maps other user interactions (e.g., number of interactions, types of interactions, duration of interactions), and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render a virtual image of markings made by the user using the pen shaped totem 10906, taking into account the visual effects that would be achieved by the selected tip or bristles.

The pen shaped totem 10906 may have one or more haptic elements (e.g., piezoelectric elements, MEMS elements), which the AR system control to provide a sensation (e.g., smooth, rough, low friction, high friction) that replicate a feel of passing over media.

Figure 110A:
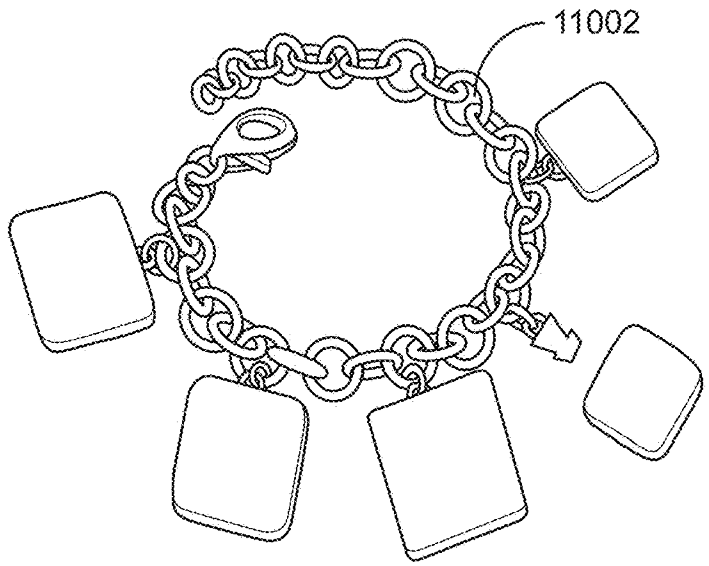
FIGS. 110A-110B illustrate a charms totem and a keychain totem, according to one or more embodiments.

FIG. 110A shows a charm chain totem 11002, according one illustrated embodiment. The charm chain totem 11002 includes a chain and a number of charms. The chain may include a plurality of interconnected links which provides flexibility to the chain. The chain may also include a closure or clasp which allows opposite ends of the chain to be securely coupled together. The chain and/or clasp may take a large variety of forms, for example single strand, multi-strand, links or braided.

The chain and/or clasp may be formed of any variety of metals, or other non-metallic materials. A length of the chain should accommodate a portion of a user's limb when the two ends are clasped together. The length of the chain should also be sized to ensure that the chain is retained, even loosely, on the portion of the limb when the two ends are clasped together. The chain may be worn as a bracket on a wrist of an arm or on an ankle of a leg.

The chain may be worn as a necklace about a neck. The charms may take any of a large variety of forms. The charms may have a variety of shapes, although will typically take the form of plates or discs. While illustrated with generally rectangular profiles, the charms may have any variety of profiles, and different charms on a single chain may have respective profiles which differ from one another. The charms may be formed of any of a large variety of metals, or non-metallic materials.

Each charm may bear an indicia which is logically associable in at least one computer- or processor-readable non-transitory storage medium with a function, category of functions, category of content or media types, and/or tools or applications which is accessible via the AR system.

Figure 110B:
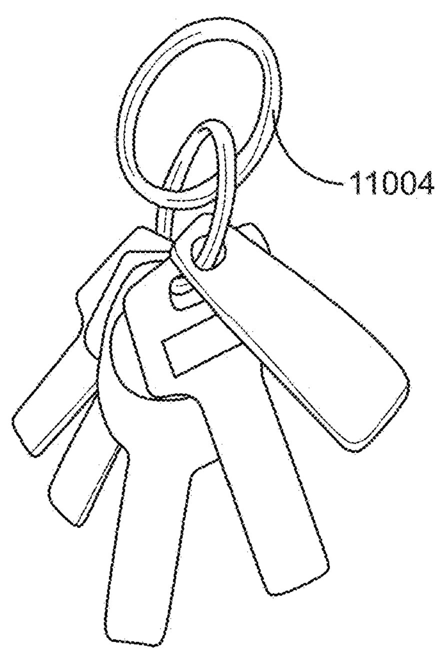

FIG. 110B shows a keychain totem 11004, according one illustrated embodiment. The keychain totem 11004 includes a chain and a number of keys. The chain may include a plurality of interconnected links which provides flexibility to the chain. The chain may also include a closure or clasp which allows opposite ends of the chain to be securely coupled together. The chain and/or clasp may take a large variety of forms, for example single strand, multi-strand, links or braided. The chain and/or clasp may be formed of any variety of metals, or other non-metallic materials.

The keys may take any of a large variety of forms. The keys may have a variety of shapes, although will typically take the form of conventional keys, either with or without ridges and valleys (e.g., teeth). In some implementations, the keys may open corresponding mechanical locks, while in other implementations the keys only function as totems and do not open mechanical locks. The keys may have any variety of profiles, and different keys on a single chain may have respective profiles which differ from one another. The keys may be formed of any of a large variety of metals, or non-metallic materials. Various keys may be of different colors from one another.

Each key may bear an indicia, which is logically associable in at least one computer- or processor-readable non-transitory storage medium with a function, category of functions, category of content or media types, and/or tools or applications which is accessible via the AR system.

As discussed above, the AR system detects or captures a user's interaction with the keys. For example, the AR system may employ one or more front-facing cameras to detect touching or manipulation of the keys by the user's fingers or hands. For instance, the AR system may detect a selection of a particular key by the user touching the respective key with a finger or grasping the respective key with two or more fingers.

Further, the AR may detect a position, orientation, and/or movement (e.g., rotational direction, magnitude of rotation, angular speed, angular acceleration) of a key with respect to some reference frame (e.g., reference frame of the portion of the body, real world, physical room, user's body, user's head). The AR system may also employ the front-facing camera(s) to detect other interactions (e.g., tap, double tap, short tap, long tap, fingertip grip, enveloping grasp, etc.) of a user's fingers with a key.

As discussed above, the AR system maps selection of the key to user selections or inputs, for instance selection of a social media application. The AR system optionally maps other user interactions (e.g., number of interactions, types of interactions, duration of interactions) with the key, and hence with various inputs (e.g., controls, functions) with the corresponding application. In response to the touching, manipulation or other interactions with the keys, the AR system may cause corresponding applications to be activated and/or provide corresponding inputs to the applications.

Additionally or alternatively, similar to the above embodiments, the AR system may render the virtual user interface differently in response to select user interactions. For instance, some user interactions may correspond to selection of a particular submenu, application or function. The AR system may respond to such selection by rendering a set of virtual interface elements, based at least in part on the selection. For instance, the AR system render a submenu or a menu or other virtual interface element associated with the selected application or functions.

Figure 111:
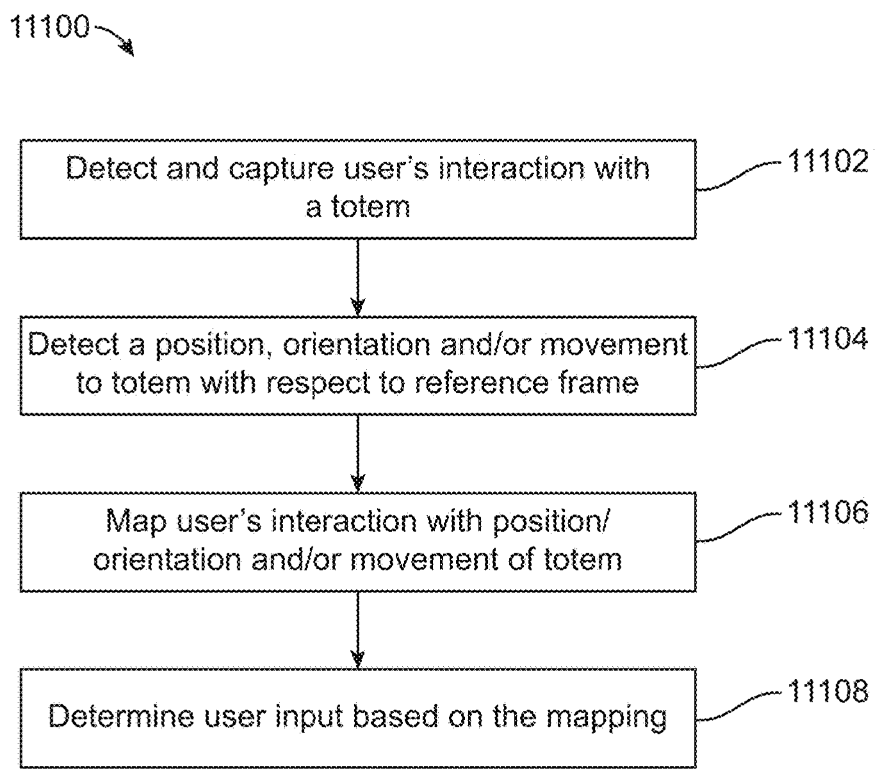
FIG. 111 illustrates a high level flow diagram for a process of determining user input through a totem, according to one embodiment.
Figure 112:
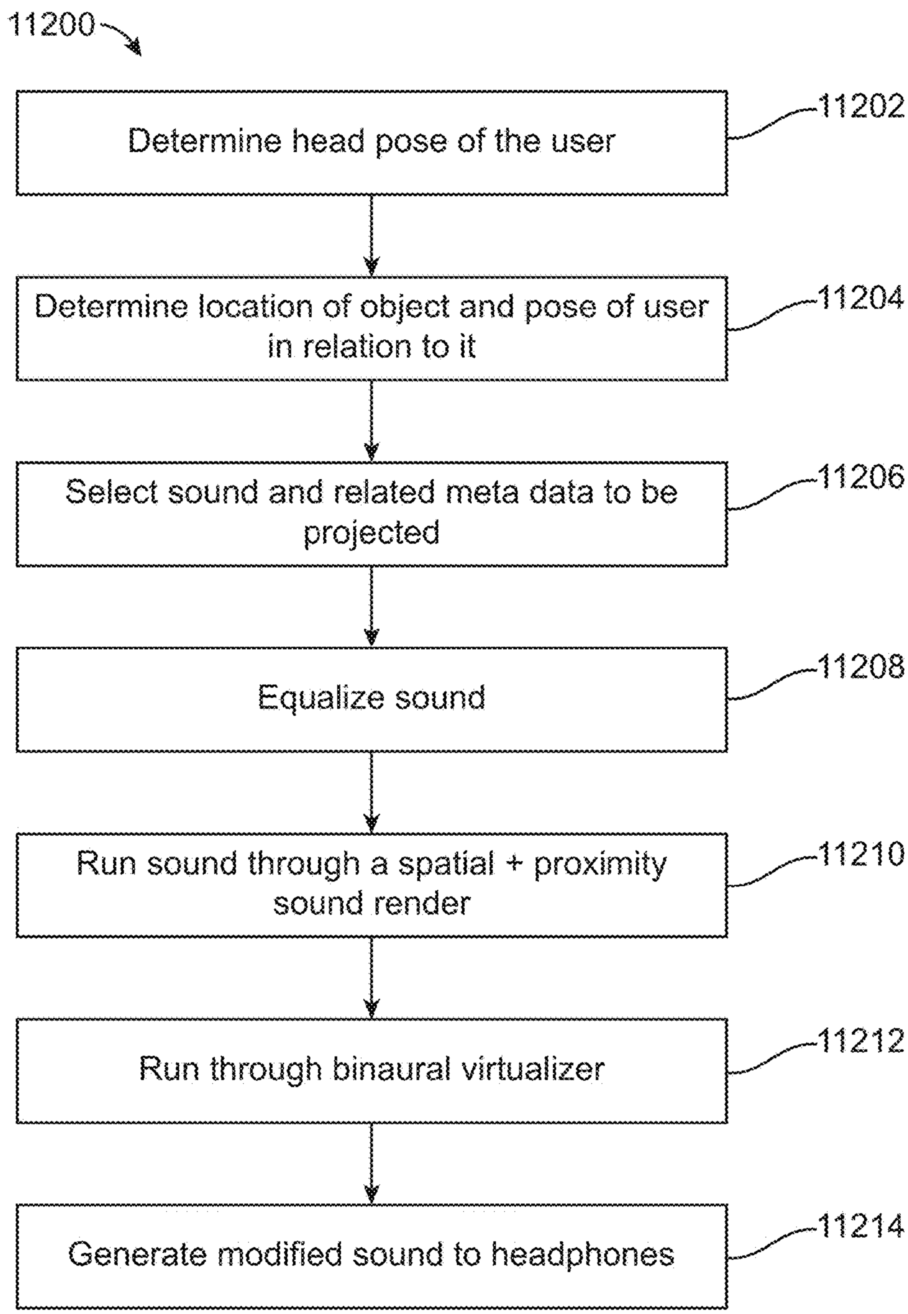
FIG. 112 illustrates a high level flow diagram for a process of producing a sound wavefront, according to one embodiment.

Referring now to FIG. 111, an example method 11100 of using totems is described. At 11102, a user's interaction with a totem is detected and/or captured. For example, the interaction may be captured based on inputs from the haptic glove, or through the front-facing cameras (e.g., world cameras, FOV cameras, etc.0. At 11104, the AR system may detect a position, orientation and/or movement of the totem with respect to a given reference frame. The reference frame may be a predetermined reference frame that allows the AR system to calculate one or more characteristics of the totem's movement, in order to understand a user command. At 11106, the user's interaction (e.g., position/orientation/movement against reference frame) is consulted with a map stored in the system. In one or more embodiments, the map may be a 1:1 map that correlates certain movements/positions or orientations with a particular user input. Other mapping tables and/or techniques may be similarly used in other embodiments. At 11108, the AR system may determine the user input based on the mapping.

In one or more embodiments, the AR system may identify an object as a totem. The object may be a real object or a virtual object. Typically, the totem may be a pre-designated object, for example, a set of keys, or a virtual set of keys, that may be displayed as a totem. In one or more embodiments, the user may have selected a totem. Or, if the totem is a real object, the system may have captured one or more images/ and or other data about the totem, to recognize it in the future. Further, the AR system may request the user to "set up" the totem such that the system understands commands that are made in relation to the totem. For example, a center part of the totem may be pressed to indicate a particular command. In one or more embodiments, this may require the system to be pre-programmed to understand that command.

In one or more embodiments, a reference frame of the totem may be correlated against a reference frame of the world to understand certain commands. For example, the system may recognize the user's hand movement (in one embodiment) in relation to the totem. In one or more embodiments, the AR system tracks an interaction of the user with the totem (e.g., hand movements, totem movements, eye movements, etc.). When an interaction matches a predetermined interaction (e.g., a pattern of movements, a speed of movement, a direction of movement, a force of touch, a proximity to another object, etc.), the system may determine a user input, and understand a command, in response to the determined user input.

It should be appreciated that the concepts outlined here may be applied to various aspects of the AR system. For example, recognizing totems, recognizing patterns of movement in relation to totems and retrieving commands associated with the recognized totem gesture may be used in almost all the various embodiments and user scenarios discussed below. These same concepts help the system recognize the totem gesture and perform a command (e.g., open an application, display a user interface, purchase an item, switch applications, etc.). Thus, the principles outlined here pertaining to recognizing totems and totem commands, and retrieving the command associated with the totem may be used in almost all the embodiments described below. It should be appreciated that these concepts will not be repeated during the discussion of specific embodiments for the purposes of brevity.

Light Wavefront+Sound Wavefront

In one or more embodiments, the AR system may produce a sound wavefront that is the analog of the light wavefront, producing a realistic sound field. In some implementations, the AR system may adjust microphone gain in the sound range dynamically to mix real physical players with virtual players in the virtual space. In other words, the AR system produces a realistic sound wavefront such that an emanating sound from a particular object (e.g., a virtual object, etc.) matches the light field.

For example, if the virtual object is depicted such that it appears from far away, the sound emanating from the object should not be constant, but rather mimic the sound that would come from the object if it were approaching from far away. Since the light field of the AR system produces a realistic visual experience of the virtual object, the sound wavefront of the AR system is also modified to realistically depict sound. For example, if the virtual object is approaching from behind, the sound coming from the virtual object will be different than if it were simply approaching from the front side. Or if the virtual object is approaching from the right side, the sound may be modified such that the user instinctively turns to the right to look at the virtual object. Thus, it can be appreciated that modifying the sound wavefront to realistically depict sounds may improve the overall experience of the AR system.

The sound wavefront may also depend on the user's physical location. For example, natural sounds are perceived differently if the user is in a cathedral (e.g., there may be an echo, etc.), as compared to when the user is in an open space. The AR system may capture local and ambient sound (e.g., game-engine driven) reproduction.

Figure 113:
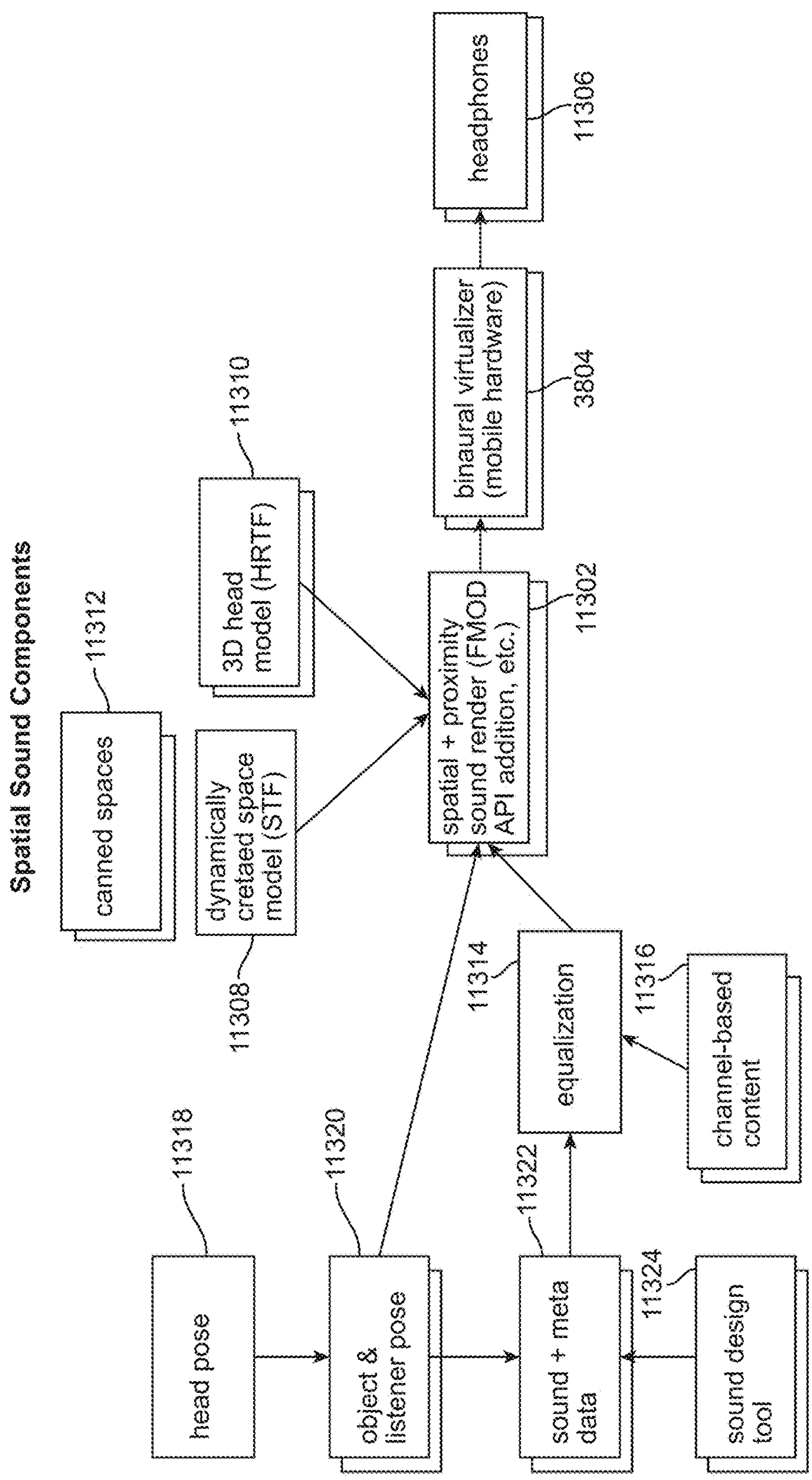
FIG. 113 is a block diagram of components used to produce a sound wavefront, according to one embodiment.

Referring now to FIG. 113, a block diagram showing various components of the sound design system is provided. As shown in FIG. 113, head pose information 11318 may be used to determine object and listener pose 11320. This information, once determined may be fed into a spatial and proximity sound render module 11302.

The object and listener pose 11320 may be fed into sound data module 11322, which may comprise various sound data files which may be stored in a database, in one or more embodiments. The sound data module 11322 may interact with a sound design tool 11324 (e.g., FMOD Studio, etc.) to provide sound design filters etc. to manipulate the sound data files.

The sound and metadata 11322 may be fed into an equalization module 11314, which may also be fed with channel-based content 11316. The equalized sound may also be fed into the spatial and proximity render module 11302.

In one or more embodiments, a 3D head model transfer function 11310 and a dynamically created space model (e.g., space transfer function) are also inputted to the spatial and proximity sound render module 11302. In one or more embodiments, the spatial and proximity sound render module 11302 may also receive inputs about sounds from canned spaces 11312. The transfer functions may manipulate the sound data by applying transforms based on the user's head pose and the virtual object information received from head pose 11318 and object and listener pose 11320 modules respectively.

In one or more embodiments, the spatial and proximity sound render module 11302 interacts with the binaural virtualizer 11304, and the sound is finally outputted to the user's headphones 11306.

In one or more embodiments, the AR system may determine a head pose of a user to determine how to manipulate an audio object. The audio object may be tied to a virtual object (e.g., the audio appears to come from the virtual object, or may be located at a different place, but is associated with the virtual object). The audio object may be associated with the virtual object based on perceived location, such that the audio object (sound data) emanates from a perceived location of the virtual object.

The AR system knows the perceived location of the virtual object (e.g., the map, the passable world model, etc.), so the AR system may place the audio object at the same location. Based on the perceived location and/or determined location of the audio object in relation to the user's head pose, the sound data may go through a sound design algorithm to be dynamically altered such that the sound appears to be coming from a place of origin of the virtual object, in one or more embodiments.

In one or more embodiments, the AR system may intentionally use various visual and/or audio triggers to initiate user head-motion. The AR system may select a trigger (e.g., virtual visual cue or virtual sound cue) and render the virtual visual image or sound cue to appear to emanate from the user's periphery (e.g., displace from front or direction that the user is facing). For example, if rendering a light field into an eye, non-image forming optics on the side or periphery may render visual cues or triggers to appear in the user's peripheral vision and causes a user to turn the user's head in desired direction. Additionally or alternatively, the AR system may render a spatialized sound field, with wave front synthesis on sounds, with an audio or aural cue or trigger that appears out of the field of view of the user, again causing the user to turn in a desired direction.

Coordinate Frames

As discussed in detail in various embodiment above, and referring to FIG. 133, it should be appreciated that virtual content may be tied to one or more coordinate systems, such that the virtual content remains stationary or moves with respect to that coordinate system. For example, as shown in 13302, the virtual content may be room-centric. In other words, the virtual content is tethered to one or more coordinates of the real world such that the virtual content stays at a constant location within a space, while the user may move around or move away from it.

In another embodiment, as shown in 13304, the virtual content may be body-centric. Thus, the virtual content may be moved with respect to a central axis of the user. For example, if the user moves, the virtual content moves based on the user's movement.

In yet another embodiment, as shown in 13306, the virtual content may be head-centric. In other words, the virtual content is tied to a coordinate system centered around the user's head. The virtual content may move as the user's moves the user's head around. This may be the case with a variety of user interfaces. The virtual content may move when the user turns his/her head, thereby providing a user's interface that is always within the view of the user.

In yet another embodiment, as shown in 13308, the virtual content may be populated based on a hand-centric reference point such that the virtual content moves based on the user's hand movements (e.g., Gauntlet user experience described below).

Referring now to FIG. 134, and as illustrated through the various embodiments described above, there may be many ways of interacting with the virtual content presented to the user. Some examples are shown in FIG. 134, including intangible interactions such as gestures (e.g., hand, head, body, totem, etc.) 13402, voice interactions 13404, eye vectors 13406 and biofeedback 13408.

As described in detail previously, gesture feedback 13402 may allow the user to interact with the AR system through movements of the user's hands, fingers or arms in general. Voice user input 13404 may allow the user to simply "talk" to the AR system, and speak voice commands as needed to the AR system. Eye user input 13406 may involve the use of the eye tracking system, such that the user may simply move the user's eyes to affect changes in the user interface. For example, the user input may be eye blinks or eye movement, which may correspond to predefined actions. For example, the user may blink three times consecutively while his/her focus is on a virtual icon. This may be a predefined selection command recognized by the system. In response, the system may simply select the virtual icon (e.g., open an application, etc.). Thus, the user may communicate with the AR system with minimal effort.

Biofeedback 13408 may also be used to interact with the AR system. For example, the AR system may monitor the user's heartrate, and respond accordingly. For example, consider that the user is participating in an exercise challenge. In response to the user's elevated heart rate, the AR system may display virtual content to the user (e.g., prompting the user to slow down, drink water, etc.).

In one or more embodiments, the interaction with the AR system may be tangible. For example, a known volume 13410 may be defined which is predefined to be a particular command. For example, the user may simply draw a shape in the air, which the AR system understands as a particular command.

The interaction may be through a glove 13412 (e.g., haptic glove, etc.). Thus, the glove 13412 may pick up gestures, physical touch, etc., which may, in turn, be used for one or more commands. Similarly a recognized ring 13414 may be used to provide input to the AR system. In yet another embodiment, a malleable surface 13416 may be used to provide input to the system. For example, a malleable object 13416 may be used as a totem, but rather than just interacting in relation to a fixed sized object, the input may be to stretch the malleable object 13416 into different shapes and sizes, each of which may be predefined as a particular command.

Or, in other embodiments, a simple controller device 13418 (e.g., keyboard, mouse, console, etc.) may be used to interact with the system. In other embodiments, physical properties of objects 13420 may be used to interact with the system.

Gestures

In some implementations, the AR system may detect and be responsive to one or more finger/hand gestures. These gestures can take a variety of forms and may, for example, be based on inter-finger interaction, pointing, tapping, rubbing, etc. Other gestures may, for example, include 2D or 3D representations of characters (e.g., letters, digits, punctuation). To enter such, a user swipes their finger in the defined character pattern. Other gestures may include thumb/wheel selection type gestures, which may, for example be used with a "popup" circular radial menu which may be rendered in a field of view of a user, according to one illustrated embodiment.

It should be appreciated that the concepts outlined here may be applied to various aspects of the AR system. For example, recognizing gestures and retrieving commands associated with the recognized gesture may be used in almost all the various embodiments and user scenarios discussed below. For example, gestures may be used in the various user interface embodiments discussed below. These same concepts help the system recognize the gesture and perform a command (e.g., open an application, display a user interface, purchase an item, switch applications, etc.). Thus, the principles outlined here pertaining to recognizing gestures, and retrieving the command associated with the gesture may be used in almost all the embodiments described below. It should be appreciated that these concepts will not be repeated during the discussion of specific embodiments for the purposes of brevity.

Embodiments of the AR system can therefore recognize various commands using gestures, and in response perform certain functions mapped to the commands. The mapping of gestures to commands may be universally defined, across many users, facilitating development of various applications which employ at least some commonality in user interface. Alternatively or additionally, users or developers may define a mapping between at least some of the gestures and corresponding commands to be executed by the AR system in response to detection of the commands.

For example, a pointed index finger may indicate a command to focus, for example to focus on a particular portion of a scene or virtual content at which the index finger is pointed. A pinch gesture can be made with the tip of the index finger touching a tip of the thumb to form a closed circle, e.g., to indicate a grab and/or copy command. Another example pinch gesture can be made with the tip of the ring finger touching a tip of the thumb to form a closed circle, e.g., to indicate a select command. Yet another example pinch gesture can be made with the tip of the pinkie finger touching a tip of the thumb to form a closed circle, e.g., to indicate a back and/or cancel command. A gesture in which the ring and middle fingers are curled with the tip of the ring finger touching a tip of the thumb may indicate, for example, a click and/or menu command. Touching the tip of the index finger to a location on the head worn component or frame may indicate a return to home command.

Figure 135A:
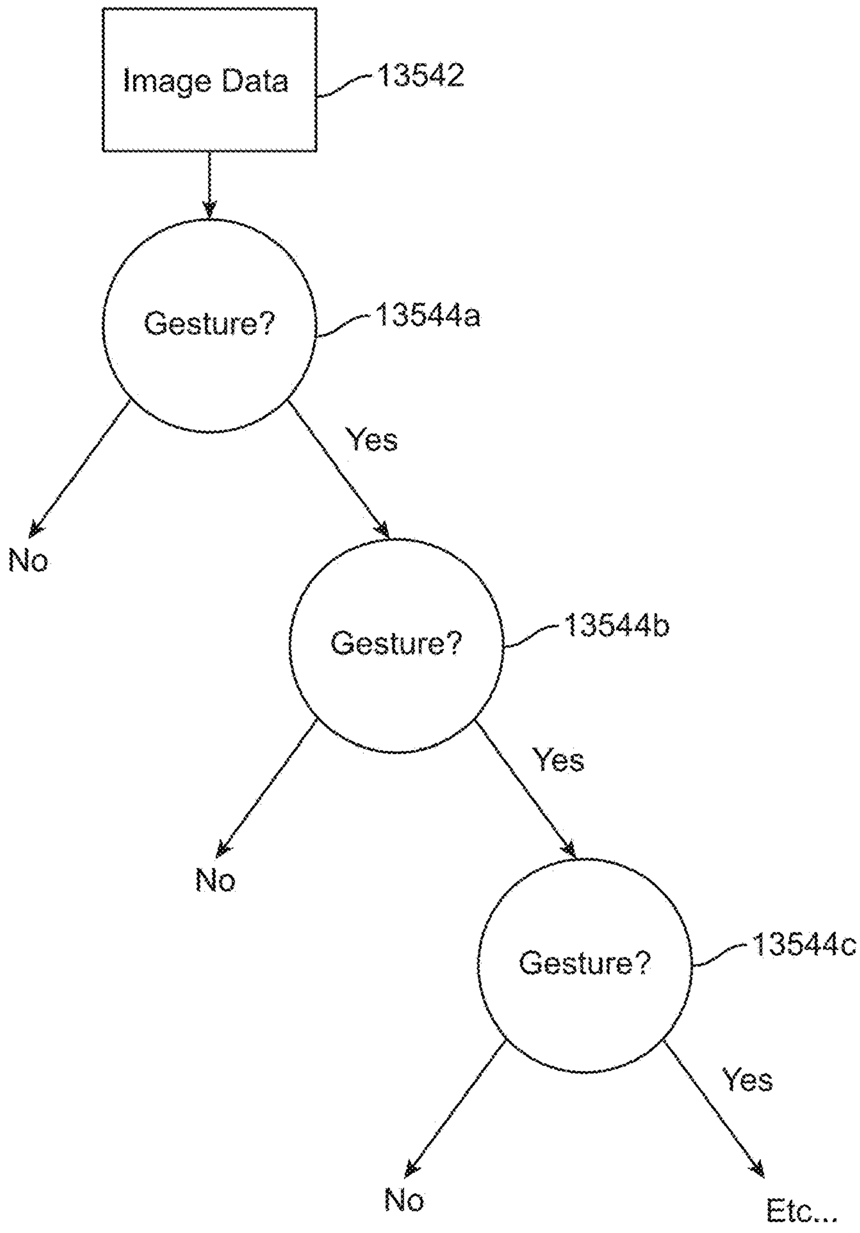

Embodiments of the invention provide an advanced system and method for performing gesture tracking and identification. In one embodiment, a rejection cascade approach is performed, where multiple stages of gesture analysis are performed upon image data to identify gestures. Referring ahead to FIG. 135A, incoming images 13542 (e.g., an RGB image at a depth D) is processed using a series of permissive analysis nodes. Each analysis node 13544 (e.g., 13544*a*, 13544*b*, etc.) performs a distinct step of determining whether the image is identifiable as a gesture.

Each stage in this process performs a targeted computation so that the sequence of different determinations in its totality can be used to efficiently perform the gesture processing. This means, for example, that the amount of processing power at each stage of the process, along with the sequence/order of the nodes, can be used to optimize the ability to remove non-gestures while doing so with minimal computational expenses. For example, computationally less-expensive algorithms may be applied to the earlier stages to remove large numbers of "easier" candidates, thereby leaving smaller numbers of "harder" data to be analyzed in later stages using more computationally expensive algorithms.

Figure 135B:
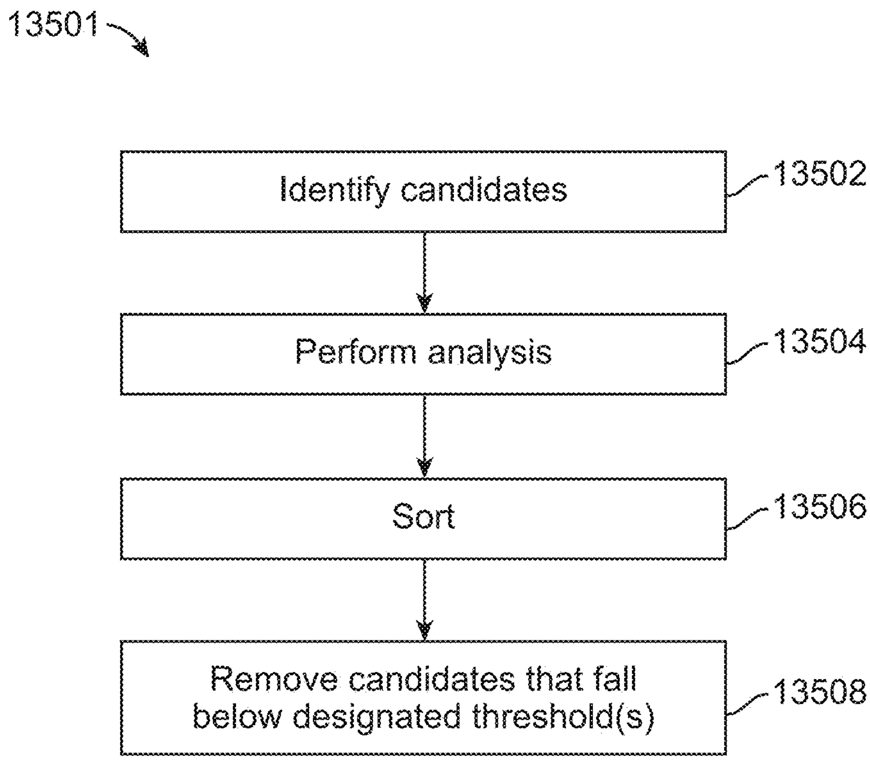

The general approach to perform this type of processing in one embodiment is shown in the flowchart 13501 of FIG. 135B. The first step 13502 is to generate candidates for the gesture processing. These include, for example, images captured from sensor measurements of the wearable device, e.g., from camera(s) mounted on the wearable device. Next, at 13504, analysis is performed on the candidates to generate analysis data. For example, one type of analysis may be to check on whether the contour of the shapes (e.g., fingers) in the image is sharp enough. At 13506, sorting is then performed on the analyzed candidates. Finally, at 13508, any candidate that corresponds to a scoring/analysis value that is lower than a minimum threshold is removed from consideration.

Figure 135C:
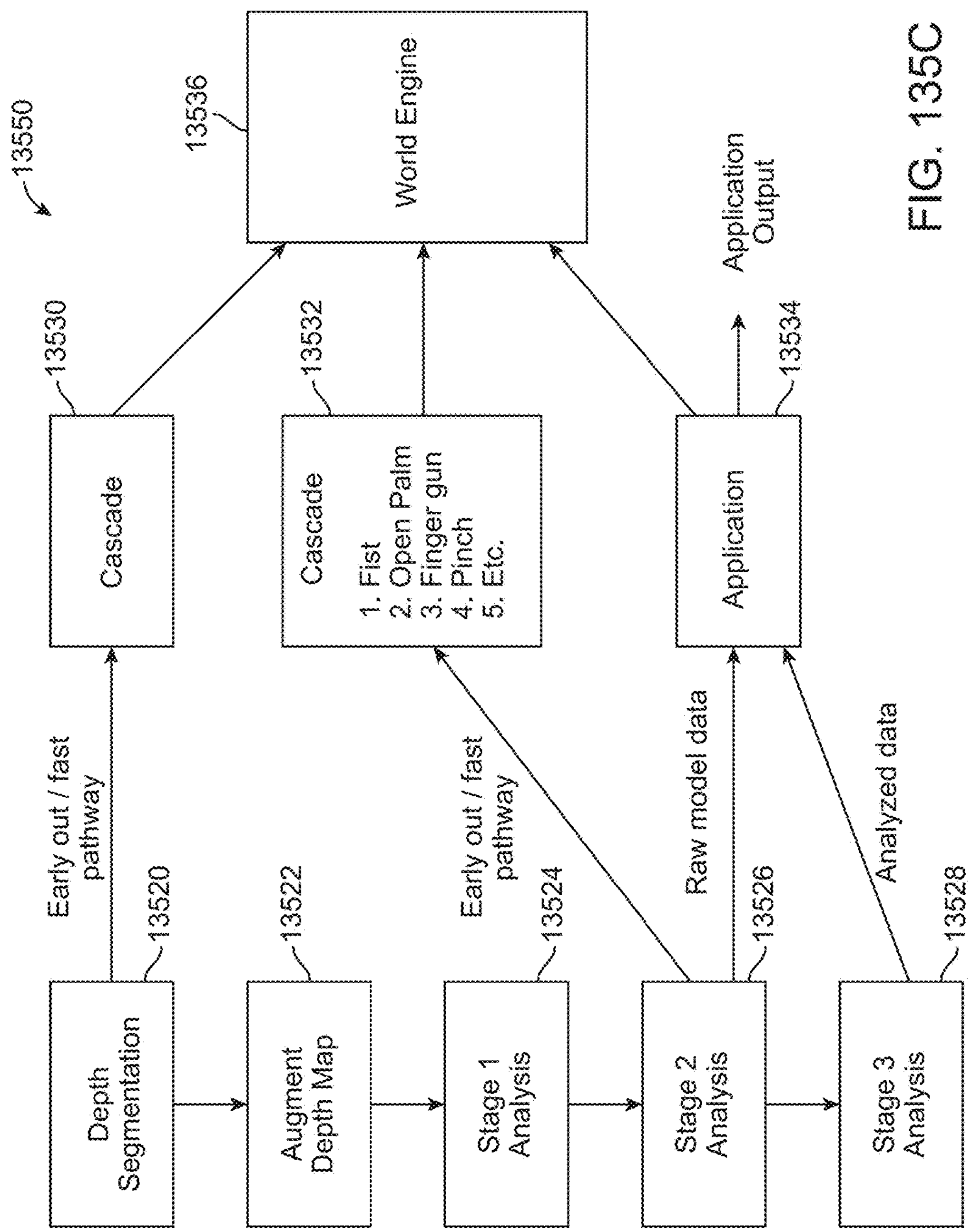

FIG. 135C depicts a more detailed approach for gesture analysis according to one embodiment of the invention. The first action is to perform depth segmentation 13520 upon the input data. For example, typically the camera providing the data inputs (e.g., the camera producing RGB+depth data) will be mounted on the user's head, where the user's world camera (e.g., front-facing camera, FOV camera, etc.) will cover the range in which the human could reasonably perform gestures.

Figure 135D:
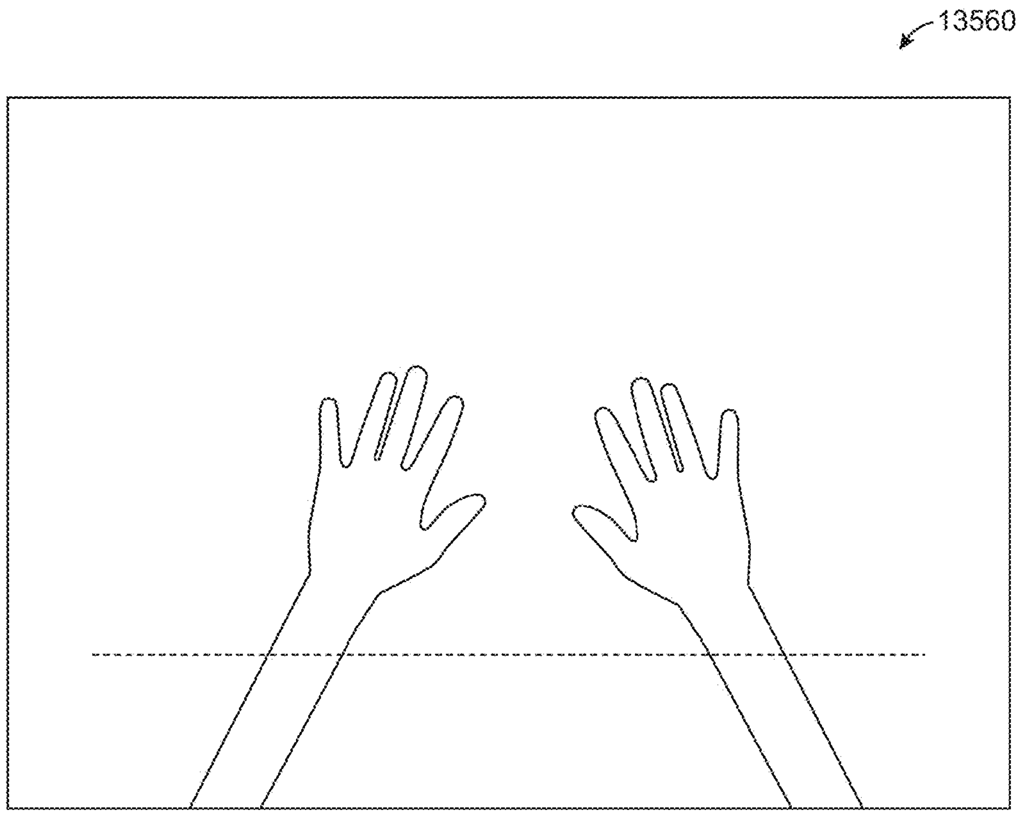
Figure 135E:
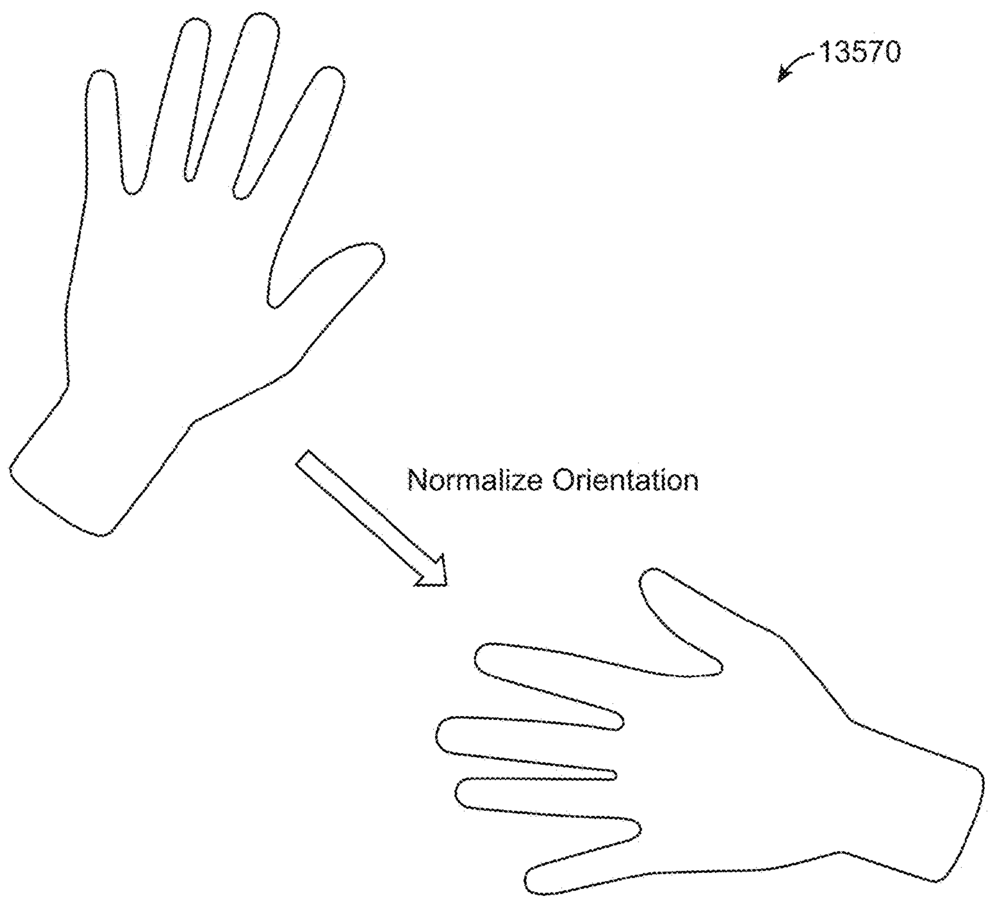

As shown in FIG. 135D, a line search 13560 can be performed through the data (e.g., from the bottom of the field of view). If there are identifiable depth points along that line, then a potential gesture has been identified. If not, then further processing need not be done.

In some embodiment, this type of line of depth point processing can be quite sparse—perhaps where 50 points are acquired relatively quickly. Of course, different kinds of line series can be employed, e.g., in addition to or instead of flat lines across the bottom, smaller diagonal lines are employed in the area where there might be a hand/arm.

Any suitable depth sampling pattern may be employed, selecting preferably ones that are most effective at detecting gestures. In some embodiments, a confidence-enhanced depth map is obtained, where detected potentially valid gesture depth points are used to flood fill out from that point to segment out a potential hand or arm, and then further filtered to check whether the identified object is really a hand or an arm. Another confidence enhancement can be performed, for example, by getting a clear depth map of the hand and then checking for the amount of light is reflected off the hand in the images to the sensor, where the greater amount of light corresponds to a higher confidence level.

From the depth data, one can cascade to perform immediate/fast processing 13530, e.g., where the image data is amenable to very fast recognition of a gesture. This works best for very simple gestures and/or hand/finger positions.

In many cases, deeper processing has to be performed to augment the depth map 13522. For example, one type of depth augmentation is to perform depth transforms upon the data. One type of augmentation is to check for geodesic distances from specified point sets, such as boundaries, centroids, etc. For example, from a surface location, a determination is made of the distance to various points on the map. This attempts to find, for example, the farthest point to the tip of the fingers (by finding the end of the fingers). The point sets may be from the boundaries (e.g., outline of hand) or centroid (e.g., statistical central mass location).

Surface normalization may also be calculated. In addition, curvatures may also be estimated, which identifies how fast a contour turns (e.g., by performing a filtering process to go over the points and removing concave points from fingers.) In some embodiments, orientation normalization may be performed on the data. To illustrate, consider that a given image of the hand may be captured with the hand in different positions. However, the analysis may be expecting of the image data of the hand in a canonical position. In this situation, as shown 13570 in FIG. 135E, the mapped data may be re-oriented to change to a normalized/canonical hand position.

Figure 135F:
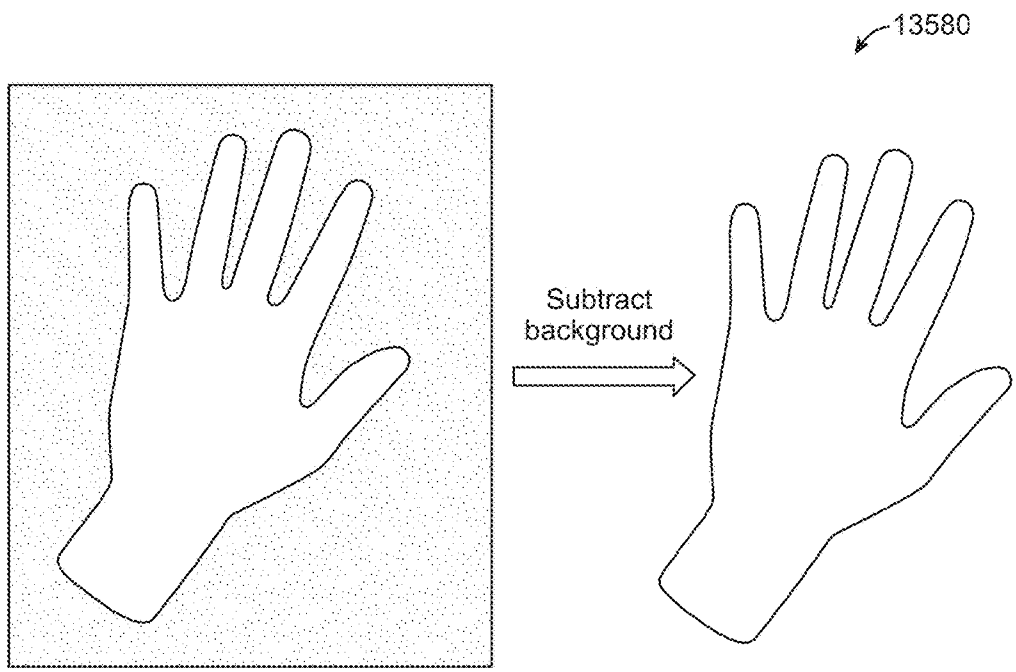
Figure 135G:
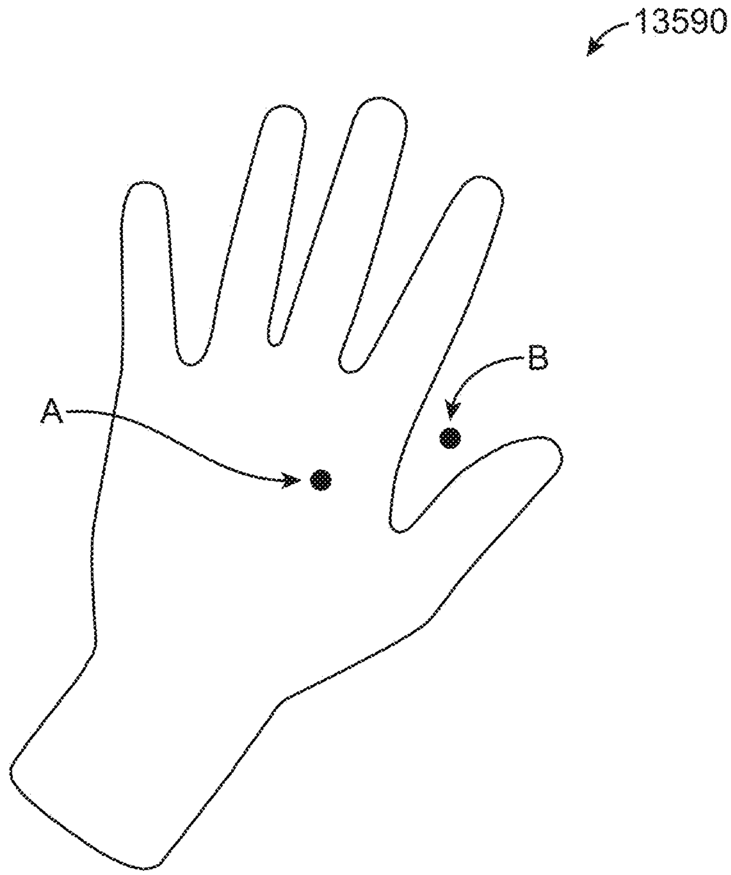

One advantageous approach in some embodiments is to perform background subtraction on the data. In many cases, a known background exists in a scene, e.g., the pattern of a background wall. In this situation, the map of the object to be analyzed can be enhanced by removing the background image data. An example of this process 13580 is shown in FIG. 135F, where the left portion of the FIG. 135F shows an image of a hand over some background image data. The right-hand portion of FIG. 135F shows the results of removing the background from the image, leaving the augmented hand data with increased clarity and focus.

Depth comparisons may also be performed upon points in the image to identify the specific points that pertain to the hand (as opposed to the background non-hand data). For example, as shown in 13590 of FIG. 135G, it can be seen that a first point A is located at a first depth and a second point B is located at a significantly different second depth. In this situation, the difference in the depths of these two points makes it very evident that the two points likely belong to different objects. Therefore, if one knows that the depth of the hand is at the same depth value as point A, then one can conclude that point A is part of the hand. On the other hand, since the depth value for point B is not the same as the depth of the hand, one can readily conclude that point B is not part of the hand.

At this point a series of analysis stages is performed upon the depth map. Any number of analysis stages can be applied to the data. The present embodiment shows three stages (e.g., 13524, 13526 and 13528, etc.), but one of ordinary skill in the art would readily understand that any other number of stages (either smaller or larger) may be used as appropriate for the application to which the invention is applied.

In the current embodiment, stage 1 analysis 13524 is performed using a classifier mechanism upon the data. For example, a deep neural net or classification/decision forest can be used to apply a series of yes/no decisions in the analysis to identify the different parts of the hand for the different points in the mapping. This identifies, for example, whether a particular point belongs to the palm portion, back of hand, non-thumb finger, thumb, fingertip, and/or finger joint. Any suitable classifier can be used for this analysis stage. For example, a deep learning module or a neural network mechanism can be used instead of or in addition to the classification forest. In addition, a regression forest (e.g., using a Hough transformation, etc.) can be used in addition to the classification forest.

Figure 135H:
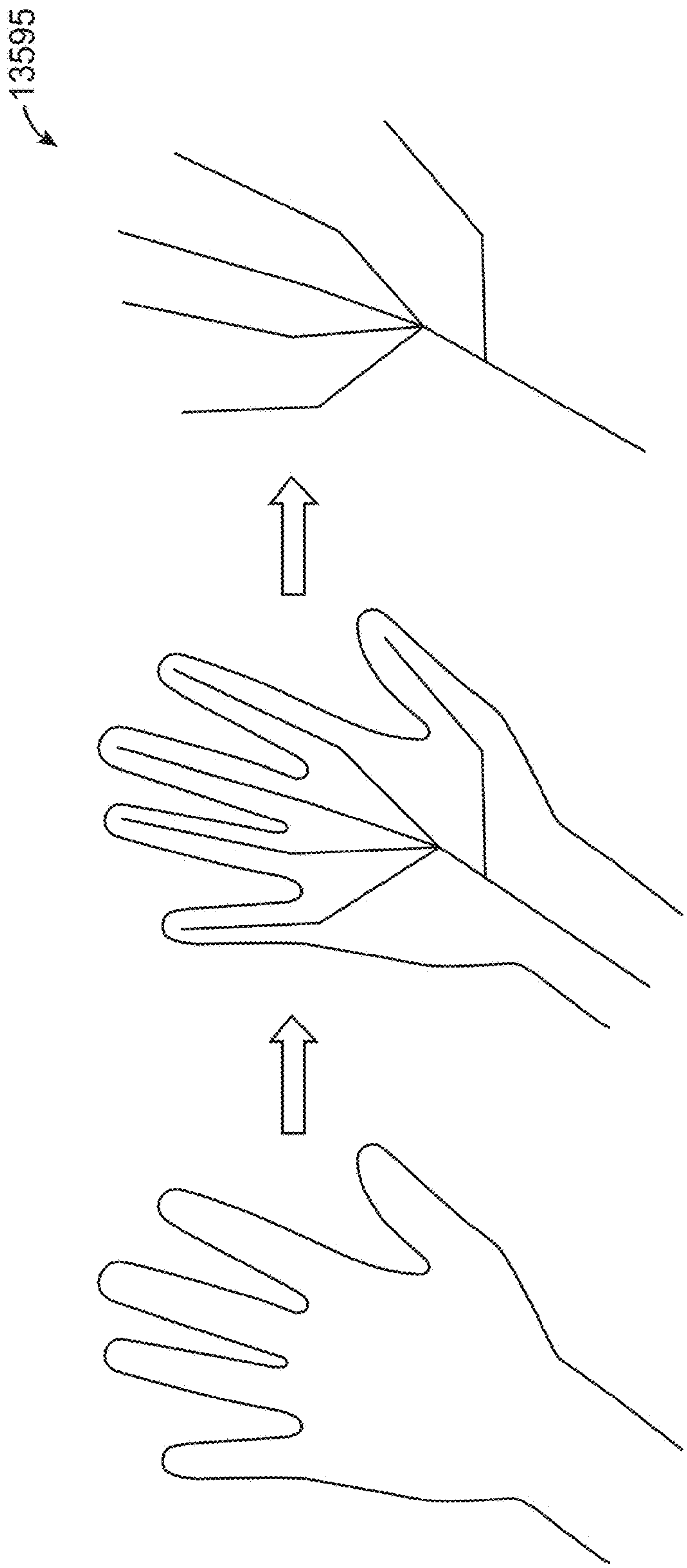
Figure 135I:
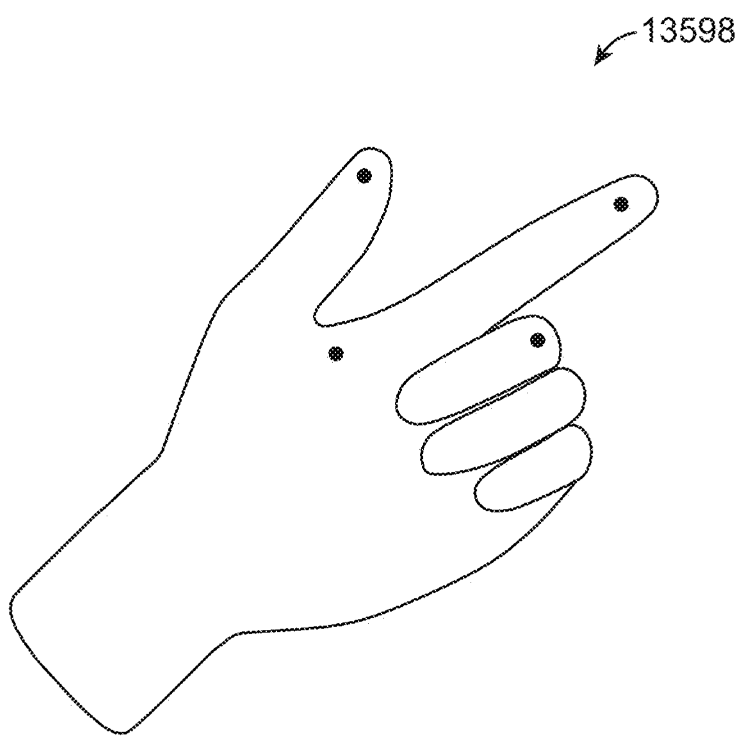
Figure 135J:
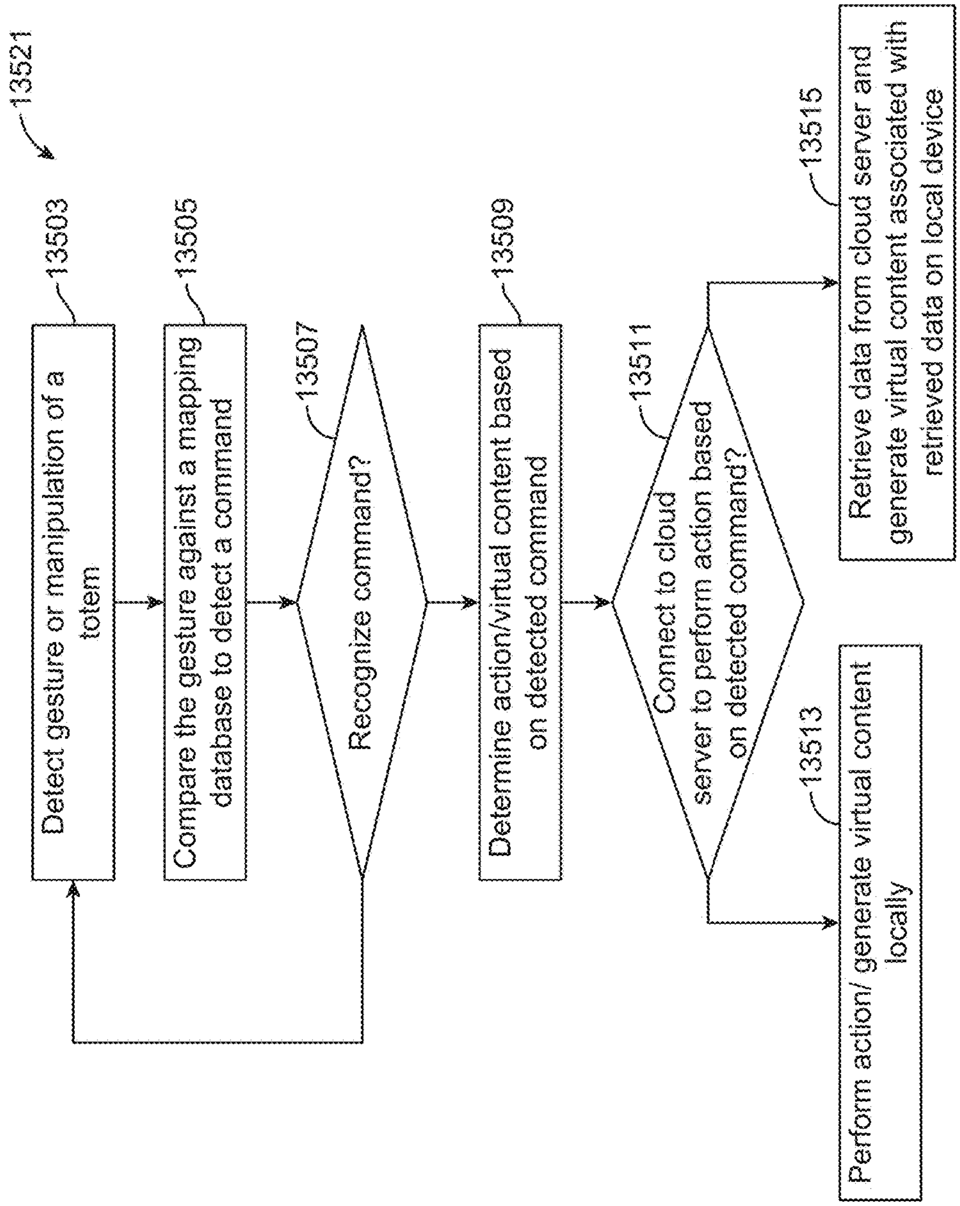

The next stage of analysis (stage 2) 13526 can be used to further analyze the mapping data. For example, analysis can be performed to identify joint locations, in particular, or to perform skeletonization on the data. FIG. 135H provides an illustration 13595 of skeletonization, where an original map of the hand data is used to identify the locations of bones/joints within the hand, resulting in a type of "stick" figure model of the hand/hand skeleton. This type of model provides with clarity, a very distinct view of the location of the fingers and the specific orientation and/or configuration of the hand components. Labelling may also be applied at this stage to the different parts of the hand.

At this point, it is possible that the data is now directly consumable by a downstream application 13534 without requiring any further analysis. This may occur, for example, if the downstream application itself includes logic to perform additional analysis/computations upon the model data. In addition, the system can also optionally cascade to perform immediate/fast processing 13532, e.g., where the data is amenable to very fast recognition of a gesture, such as the (1) first gesture; (2) open palm gesture; (3) finger gun gesture; (4) pinch; etc. For example, as shown in 13598 of FIG. 135I, various points on the hand mapping (e.g., point on extended thumb and point on extended first finger) can be used to immediately identify a pointing gesture. The outputs will then proceed to a world engine 13536, e.g., to take action upon a recognized gesture.

In addition, deeper processing can be performed in the stage 3 analysis. This may involve, for example, using a deep neural network or a decision forest/tree to classify the gesture. This additional processing can be used to identify the gesture, determine a hand pose, identify context dependencies, and/or any other information as needed.

Prior/control information can be applied in any of the described steps to optimize processing. This permits some biasing for the analysis actions taken in that stage of processing. For example, for game processing, previous action taken in the game can be used to bias the analysis based upon earlier hand positions/poses. In addition, a confusion matrix can be used to more accurately perform the analysis.

Using the principles of gesture recognition discussed above, the AR system may use visual input gathered from the user's FOV cameras and recognize various gestures that may be associated with a predetermined command or action. Referring now to flowchart 13521 of FIG. 135J, in step 13503, the AR system may detect a gesture as discussed in detail above. As described above, the movement of the fingers or a movement of the totem may be compared to a mapping database to detect a predetermined command, in step 13505. In step 13507, a determination is made whether the AR system recognizes the command based on the mapping step 13505.

If the command is detected, the AR system determines the desired action and/or desired virtual content based on the gesture, in step 13507. If the gesture or movement of the totem does not correspond to any known command, the AR system simply goes back to detecting other gestures or movements to step 13503.

In step 13509, the AR system determines the type of action necessary in order to satisfy the command. For example, the user may want to activate an application, or may want to turn a page, may want to generate a user interface, may want to connect to a friend located at another physical location, etc. Based on the desired action/virtual content, the AR system determines whether to retrieve information from the cloud servers, or whether the action can be performed using local resources on the user device, in step 13511.

For example, if the user simply wants to turn a page of a virtual book, the relevant data may already have been downloaded or may reside entirely on the local device, in which case, the AR system simply retrieves data associated with the next page and displays the next page to the user. Similarly, if the user wishes to create a user interface such that the user can draw a picture in the middle of space, the AR system may simply generate a virtual drawing surface in the desired location without requiring data from the cloud. Data associated with many applications and capabilities may be stored on the local device such that the user device does not need to unnecessarily connect to the cloud or access the passable world model. Thus, if the desired action can be performed locally, local data may be used to display virtual content corresponding to the detected gesture (step 13513).

Alternatively, in step 13515, if the system needs to retrieve data from the cloud or the passable world model, the system may send a request to the cloud network, retrieve the appropriate data and send it back to the local device such that the action may be taken or the virtual content may be appropriately displayed to the user. For example, if the user wants to connect to a friend at another physical location, the AR system may need to access the passable world model to retrieve the necessary data associated with the physical form of the friend in order to render it accordingly at the local user device.

Thus, based on the user's interaction with the AR system, the AR system may create many types of user interfaces as desired by the user. The following represent some example embodiments of user interfaces that may be created in a similar fashion to the example process described above. It should be appreciated that the above process is simplified for illustrative purposes, and other embodiments may include additional steps based on the desired user interface. The following discussion details a set of additional applications of the AR system.

UI Hardware

The AR system may employ pseudo-haptic gloves that provide sensations of pressures and/or vibrations that are tied to the physical object. The tactile effect may, for example, be akin to running a hand through a bubble.

If a vibration is introduced onto a finger, a user will interpret that vibration as a texture. The pseudo-haptic glove may provide tactile sensations that replicate the feel of hard physical objects, soft physical objects, and physical objects that are fuzzy. The pseudo-haptic glove selectively produces the sensation of both pressure and vibration.

For example, if there is a massless object (e.g., bubble) floating in space, the user may be able to feel the tactile sensation of touching the massless object. The user can change the tactile sensation of touching the virtual object, for example a texture oriented sensation rather than a firmness-oriented sensation. For example, if a user passes a hand through a bubble, the user may feel some tactile sensation although the user will not feel the sensation of grabbing a physical object. A similar approach of providing tactile sensations may be implemented in other wearable portions or components of the AR system. The glove and/or other components may use a variety of different actuators, for example piezoelectric actuators.

Thus, a user may feel as if able to touch massless virtual objects directly. For instance, if virtual object is located at a table, a consistent UX element corresponding to the haptic glove may provide the user with a proprioceptive tactile interaction. For example, the user may grab or may grasp a particular handle close to a door. Using a handle as a coordinate frame for a virtual object may be very intuitive for the user. This allows a user to pick up physical things and actually feel the physical sensation though a tactile proxy hand.

Head worn components of individual AR systems may also include sensors to detect when earphones or ear buds are positioned proximate, on or in the ears of a user. The AR system may use any of a large variety of sensors, for example capacitive sensors, pressure sensors, electrical resistance sensors, etc. In response to detection of the earphones or ear buds being in place, the AR system may route sound via the earphones or ear buds. In response to a failure to detect the earphones or ear buds being in place, the AR system may route sound through conventional standalone speakers.

Additionally, the AR system may employ a composite camera. The composite camera may comprise a plurality of chip-level cameras mounted on or carried by a flexible substrate, for instance a flexible printed circuit board substrate. The flexible substrate may be modified and/or reconfigured with a potting compound, to essentially form a single wide angle lens.

For example, small cameras may be built with a layer approach, using wafer level technology. For instance, a plurality of video graphics array (VGA) pads may be formed on a flexible substrate for communicatively coupling these cameras. The flexible substrate with cameras may be stretched over an anvil, and fixed for instance via an adhesive. This provides an inexpensive set of VGA cameras that have an optically wide field of view of approximately 60 degree or 70 degrees.

Advantageously, a flat process may be employed, and the flexible substrate may be stretched over an anvil. The resultant structure provides the equivalent of a wide field of view camera from a pixel count image quality perspective, but with overlapping or non-overlapping fields of view. A plurality of two or three element wafer level of cameras can replace a specific wide field of view lens that has five or six elements, while still achieving the same field of view as the wide field of view camera.

User Interfaces

As will be described in various embodiments below, the AR system may create many types of user interfaces. In some of the embodiments described below, the AR system creates a user interface based on a location of the user, and what type of reference frame the user interface may operate in. For example, some user interfaces (e.g., FIGS. 85A-85C below) are body-centric user interfaces, in which case, the AR system may determine a location of the user's center (e.g., hip, waist, etc.), and project a virtual interface based on that reference frame. Other user interfaces are created based on a head-centric reference frame, a hand-centric reference frame etc. Further, the AR system may utilize the principles of gesture tracking and/or totem tracking discussed above to also create and/or interact with some user interfaces.

Although each of the user interfaces described below have some differences, they principally function using some common principles. In order to display a user interface of the user's choosing, the AR system must determine a location of the user in the world (e.g., the world coordinate frame). For example, the user's location may be determined through any of the localization techniques discussed above (e.g., GPS, Bluetooth, topological map, map points related to the user's AR system, etc.). Once the user's location in the world coordinate frame has been determined, a relationship between the user's hands/finger etc. in relation to the user's AR system may be determined. For example, if the user has selected a predefined ring-based user interface (e.g., FIGS. 85A-85C, etc.), a relationship between the user's AR system and the body-centric reference frame of the virtual user interface may be determined.

Figure 85A:
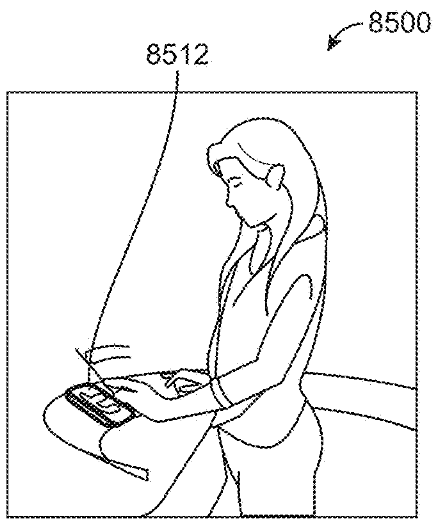
FIGS. 85A-85C illustrates various user interface embodiments.
Figure 85B:
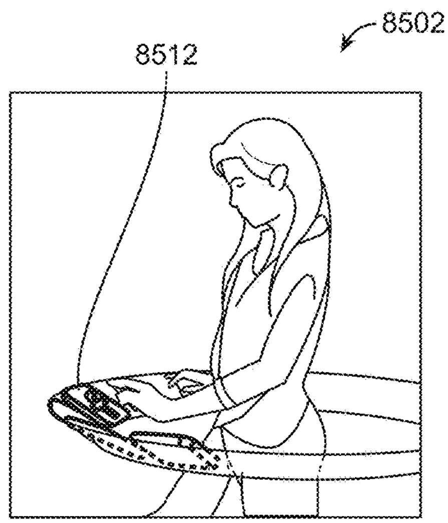
Figure 85C:
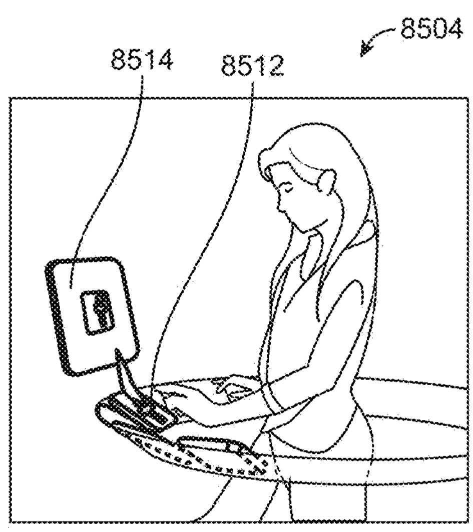

For example, the body-centric user interfaces of FIGS. 85A-85C may be determined based on the coordinates of the user's hip. A position of the user's hip may be determined based on data collected by the AR system. In other words, the various sensors of the AR system (e.g., cameras, sensors, etc.) may help determine the coordinates (e.g., in the world coordinate system) of the user's hip. This determined location may be set as the origin coordinates (0,0,0) of the user interface.

Having determined the origin coordinates, the virtual user interface may be rendered based on the determined location of the user's hip, such that as the user's moves, the virtual user interfaces moves along with the user's body (e.g., the ring user interface of FIGS. 85A-85C remains around the user's body). In one or more embodiments, the various pre-configured user interfaces may be stored in a user interface database such that an appropriate user interface is retrieved from the database.

The stored user interface program may comprise a set of characteristics and/or parameters about the user interface, including coordinates at which various parts of the virtual user interface must be displayed in relation to the origin coordinates. For example, in a very simple user interface having only 2 pixels, the coordinates of the pixels to be displayed in relation to the origin hip-coordinates may be defined. When a particular user interface is selected, the user interface data may be retrieved from the database, and various translation vectors may be applied to pixel coordinates in order to determine the world coordinates. In other words, each of the stored user interface programs may be predefined in relation to a particular reference frame, and this information may be used to determine the location at which to render the particular user interface. It should be appreciated that a majority of the user interfaces described below work based on this basic principle. Although the above example illustrated the concept using only 2 pixels, it should be appreciated that the appropriate coordinates for all pixels of the virtual user interface may be similarly defined such that the relevant translations and/or rotations may be applied.

In another example, say the user interface must be displayed at a location of a user's gestures. As shown in many embodiments below, several user interfaces may simply be created "on the fly," such that the user interface originates at a particular point in space defined by the user. Similar localization concepts as the above may be used in this case as well.

For example, a user may place his arm out in space and make a particular gesture with his/her fingers, indicating to the AR system that a user interface should be populated at that location. In this case, similar to the above, a location of the AR system in the world is known (e.g., GPS, Bluetooth, topological map, etc.). The various sensors and/or cameras of the AR system may determine a location of the user's gesture in relation to the AR system (e.g., after having recognized the gesture to mean the command to generate a user interface).

As discussed above, once the location of the gesture in relation to the AR system cameras or sensors has been determined, several triangulation techniques may be used (e.g., translation vectors, etc.) to determine the world coordinates of that location. Once the world coordinates of the location have been determined, a desired user interface may be generated such that it originates at that particular location.

Another theme in some of the user interfaces described below is that reference frames for some virtual content may be modified such that a virtual content that is currently being tied to a first reference frame is tied to another reference frame. As will be clear in some embodiments described below, a user may open an application through a hand-centric user interface. The application may open up a profile page of a friend that the user may desire to store for easy viewing in the future. In one or more embodiments, the user may take the virtual object or virtual box corresponding to the profile page (which is currently being displayed in relation to a hand-centric reference frame), and modify it such that it is no longer tied to the hand-centric reference frame, but is rather tied to a world-centric reference frame.

For example, the AR system may recognize a gesture of the user (e.g., a throwing gesture, a gesture that takes the application and places it far away from the first reference frame, etc.) indicating to the system, that the AR user desires to modify a reference frame of a particular virtual object. Once the gesture has been recognized, the AR system may determine the world coordinates of the virtual content (e.g., based on the location of the virtual content in relation to the known location of the AR system in the world), and modify one or more parameters (e.g., the origin coordinates field, etc.) of the virtual content, such that it is no longer tied to the hand-centric reference frame, but rather is tied to the world-coordinate reference frame.

In yet another embodiment, the AR system must recognize that a particular virtual icon is selected, and move the virtual icon such that it appears to be moving with the user's hand (e.g., as if the user is holding a particular virtual application, etc.). To this end, the AR system may first recognize a gesture (e.g., a grasping motion with the user's fingers, etc.), and then determine the coordinates of the user's fingers/hand. Similarly, the world coordinates of the virtual icon is also known, as discussed above (e.g., through a known location of the virtual content in relation to a particular reference frame, and a known relationship between the reference frame and the world-centric reference frame). Since both coordinates are known, the virtual content may be moved to mirror the movement of the user's fingers.

As will be described in various embodiments below, any space around the user may be converted into a user interface such that the user can interact with the system. Thus, the AR system does not require a physical user interface such as a mouse/keyboard, etc. (although totems may be used as reference points, as described above), but rather a virtual user interface may be created anywhere and in any form to help the user interact with the AR system. In one embodiment, there may be predetermined models or templates of various virtual user interfaces. As discussed above, during set-up the user may designate a preferred type (or types) of virtual UI (e.g., body centric UI, head-centric UI, hand-centric UI, etc.).

Alternatively or additionally, various applications may be associated with their own types of virtual UI. Alternatively or additionally, the user may customize the UI to create one that he/she may be most comfortable with. For example, the user may simply "draw" a virtual UI in space using a motion of his hands, and various applications or functionalities may automatically populate the drawn virtual UI.

Referring ahead to FIG. 140, an example flowchart of displaying a user interface is illustrated. In step 14002, the AR system may identify a particular UI. The type of UI may be predetermined by the user. The system may identify the UI needs populated based at least in part on the user input (e.g., gesture, visual data, audio data, sensory data, direct command, etc.). In step 14004, the AR system may generate data for the virtual UI. For example, data associated with the confines, general structure, shape of the UI etc. may be generated. In addition, the AR system may determine map coordinates of the user's physical location so that the AR system can display the UI in relation to the user's physical location. For example, if the UI is body-centric, the AR system may determine the coordinates of the user's physical stance such that a ring UI can be displayed around the user. Or, if the UI is hand centric, the map coordinates of the user's hands may need to be determined. It should be appreciated that these map points may be derived through data received through the FOV cameras, sensory input, or any other type of collected data.

In step 14006, the AR system may send the data to the user device from the cloud. In other embodiments, the data may be sent from a local database to the display components. In step 14008, the UI is displayed to the user based on the sent data.

Once the virtual UI has been created, the AR system may simply wait for a command from the user to generate more virtual content on the virtual UI in step 14010. For example, the UI maybe a body-centric ring around the user's body. The AR system may then wait for the command, and if it is recognized (step 14012), virtual content associated with the command may be displayed to the user.

Referring now to FIG. 141, a more specific flowchart 14100 describing the display of user interfaces will be described. At 14102, the AR system may receive input pertaining to a desired virtual UI. For example, the AR system may detect this through a detected gesture, voice command, etc. At 14104, the AR system may identify the UI from a library of UIs based on the user input, and retrieve the necessary data in order to display the UI.

At 14106, the AR system may determine a coordinate frame or reference frame system that is associated with the identified UI. For example, as discussed above, some UIs may be head-centric, others may be hand-centric, body centric, etc. At 14108, once the coordinate frame type has been determined, the AR system determines the location at which the virtual user interface must be displayed with respect to a location of the user. For example, if the identified UI is a body-centric UI, the AR system may determine a location (e.g., map points, localization techniques, etc.) of a center axis/point of the user's body (e.g., the user's location within the world coordinate frame).

Once this point/axis is located, it may be set as the origin of the coordinate frame (e.g., (0,0,0), in an x, y, z coordinate frame) (14110). In other words, the location at which the virtual UI is to be displayed will be determined with reference to the determined coordinate frame (e.g., center of the user's body). Once the center of the user's body has been determined, a calculation may be made to determine the location at which the virtual UI must be populated (14112). At 14114, the desired UI may be populated at the determined map points.

In other embodiments described above, a customized virtual user interface may simply be created on the fly based on a location of the user's fingers. For example, as described above, the user may simply "draw" a virtual boundary, and a user interface may be populated within that virtual boundary. Referring now to FIG. 142, an example flowchart 14200 is illustrated.

In step 14202, the AR system detects a movement of the user's fingers or hands. This movement may be a predetermined gesture signifying that the user wishes to create a user interface (the AR system may compare the gesture to a map of predetermined gestures, for example). Based on this detection, the AR system may recognize the gesture as a valid gesture in step 14204. In step 14206, the AR system may retrieve through the cloud server, a location associated with the user's position of fingers/hands within the world coordinate frame in order to display the virtual UI at the right location, and in real-time with the movement of the user's fingers or hands.

In step 14208, the AR system creates a UI that mirrors the user's gestures. This may be performed by identifying a location associated with the user's fingers and displaying the user interface at that location. In step 14210, the UI may be displayed in real-time at the right position using the determined location.

The AR system may then detect another movement of the fingers or another predetermined gesture indicating to the system that the creation of user interface is done (step 14212). For example the user may stop making the motion of his fingers, signifying to the AR system to stop "drawing" the UI. In step 14214, the AR system displays the UI at the location in the boundary drawn by the user's finger's movement. Thus, a custom user-interface may be created.

Using the principles of gesture tracking/UI creation, etc. a few example user applications will now be described. The applications described below may have hardware and/or software components that may be separately installed onto the system, in some embodiments. In other embodiments, the system may be used in various industries, etc. and may be modified to achieve some of the embodiments below.

Although the particular embodiments described below often use gestures to communicate with the AR system, it should be appreciated that any other user input discussed above may be similarly used. For example, in addition to gestures, user interfaces and/or other virtual content (e.g., applications, pages, web sites, etc.), may be rendered in response to voice commands, direct inputs, totems, gaze tracking input, eye tracking input or any other type of user input discussed in detail above.

The following section provides various embodiments of user interfaces that may be displayed through the AR system to allow interaction with the user. Referring now to FIG. 85A, FIG. 85A shows a user interacting via gestures with a user interface construct 8500 rendered by an AR system (not shown in FIGS. 85A-85C), according to one illustrated embodiment.

In particular, FIG. 85A shows a scenario 8500 of a user interacting with a generally annular layout or configuration virtual user interface 8512 having various user selectable virtual icons. The generally annular layout or configuration is substantially similar to that's illustrated in FIG. 79E.

The user selectable virtual icons may represent applications (e.g., social media application, Web browser, email, etc.), functions, menus, virtual rooms or virtual spaces, etc. The user may, for example, perform a swipe gesture. The AR system detects the swipe gesture, and interprets the swipe gesture as an instruction to render the generally annular layout or configuration user interface. The AR system then renders the generally annular layout or configuration virtual user interface 8512 into the user's field of view so as to appear to at least partially surround the user, spaced from the user at a distance that is within arm's reach of the user, as shown in the illustrated embodiment. As described above, the user interface coordinates may be tied to the determined location of the user's center such that it is tied to the user's body.

FIG. 85B shows another scenario 8502 of the user interacting via gestures with a user interface virtual construct 8512 rendered by an AR system (not shown in FIG. 85B), according to another illustrated embodiment.

The generally annular layout or configuration virtual user interface 8512 may present the various user selectable virtual icons in a scrollable form. The user may gesture, for example with a sweeping motion of a hand, to cause scrolling through various user selectable virtual icons. For instance, the user may make a sweeping motion to the user's left or to the user' right, in order to cause scrolling in the left (e.g., counterclockwise) or right (e.g., clockwise) directions, respectively.

The user may, for example, perform a point or touch gesture, proximally identifying one of the user selectable virtual icons. The AR system detects the point or touch gesture, and interprets the point or touch gesture as an instruction to open or execute a corresponding application, function, menu or virtual room or virtual space. The AR system then renders appropriate virtual content based on the user selection.

FIG. 85C shows yet another scenario 8504 of the user interacting via gestures with a user interface virtual construct 8512 rendered by an AR system (not shown in FIG. 39C), according to yet another illustrated embodiment.

FIG. 85C shows the user interacting with the generally annular layout or configuration virtual user interface 8512 of various user selectable virtual icons of FIGS. 85A and 85B. In particular, the user selects one of the user selectable virtual icons. In response, the AR system opens or executes a corresponding application, function, menu or virtual room or virtual space. For example, the AR system may render a virtual user interface for a corresponding application 8514 as illustrated in FIG. 85C. Alternatively, the AR system may render a corresponding virtual room or virtual space based on the user selection.

Figure 86A:
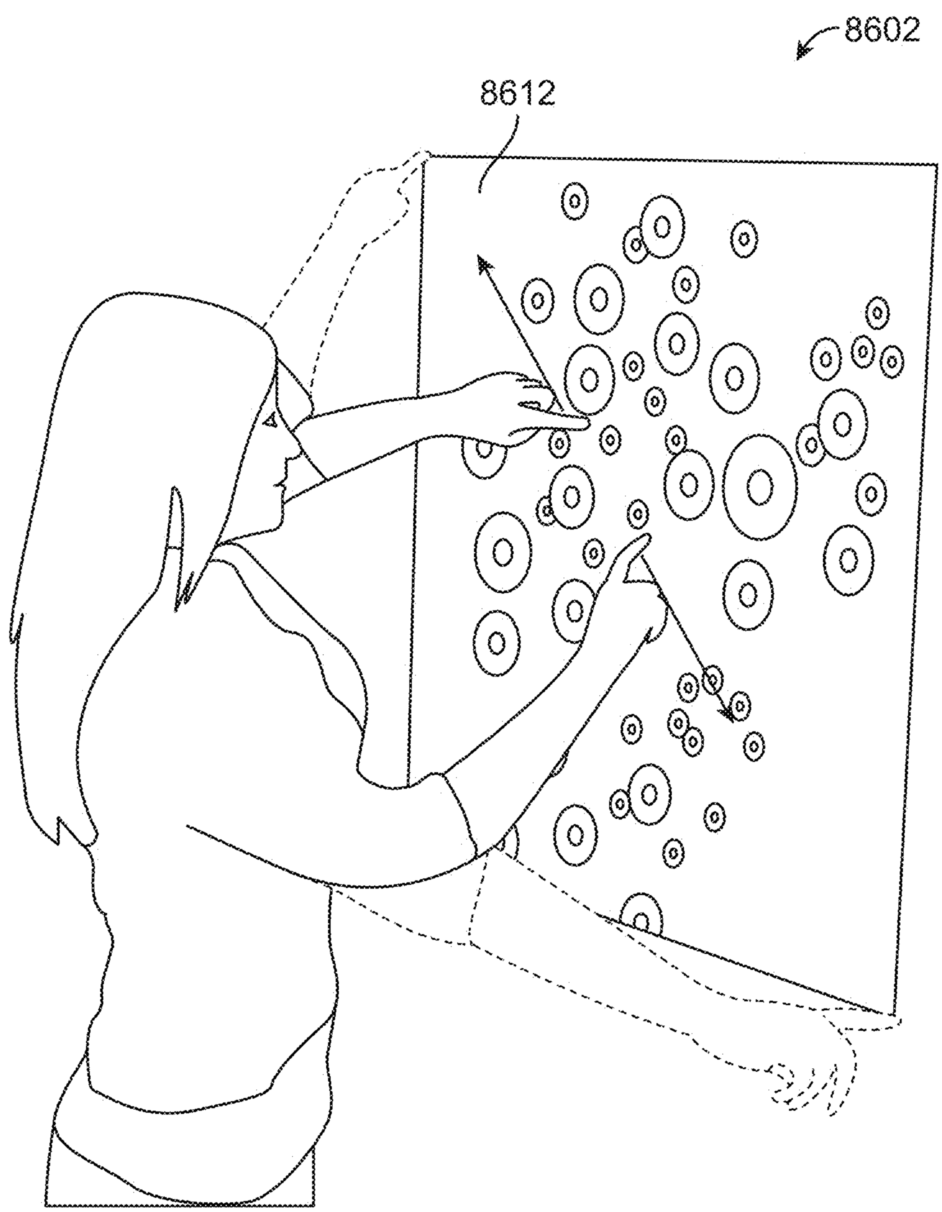
FIGS. 86A-86C illustrates other embodiments to create a user interface, according to one or more embodiments.

Referring now to FIG. 86A, FIG. 86A shows a scenario 8602 of a user interacting via gestures with a user interface virtual construct 8612 rendered by an AR system (not shown in FIG. 86A), according to one illustrated embodiment.

In particular, FIG. 86A shows a user performing a gesture to create a new virtual work portal or construct in hovering in space in a physical environment or hanging or glued to a physical surface such as a wall of a physical environment. The user may, for example, perform a two arm gesture, for instance dragging outward from a center point outward to a location that represents upper left and lower right corners of the virtual work portal or construct, as shown in FIG. 86A. The virtual work portal or construct 8612 may, for example, be represented as a rectangle, the user gesture establishing not only the position, but also the dimensions of the virtual work portal or construct.

The virtual work portal or construct 8612 may provide access to other virtual content, for example to applications, functions, menus, tools, games, and virtual rooms or virtual spaces. The user may employ various other gestures for navigating once the virtual work portal or construct has been created or opened.

Figure 86B:
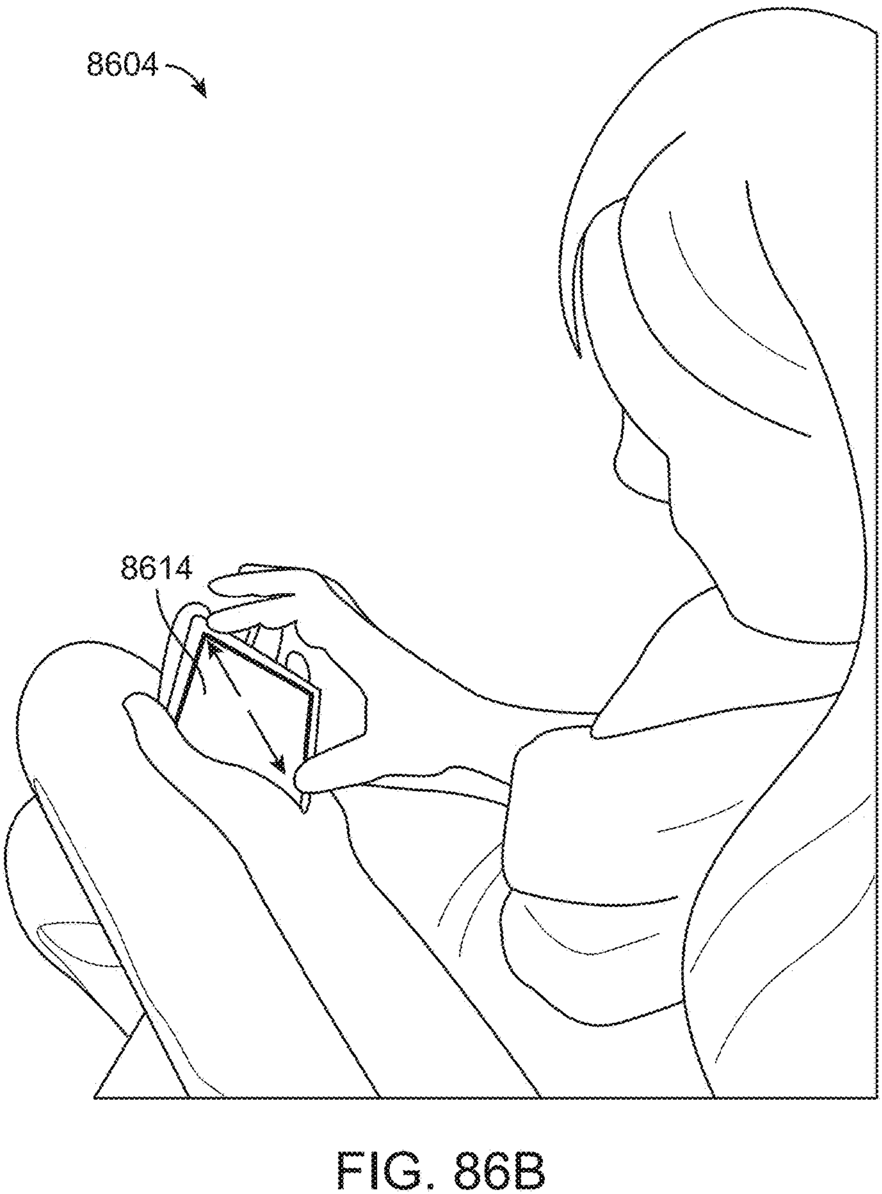

FIG. 86B shows another scenario 8604 of the user interacting via gestures with a user interface virtual construct 8614 rendered by an AR system (not shown in FIG. 86B), according to one illustrated embodiment.

In particular, FIG. 86B shows a user performing a gesture to create a new virtual work portal or construct on a physical surface 8614 of a physical object that serves as a totem. The user may, for example, perform a two finger gesture, for instance an expanding pinch gesture, dragging outward from a center point to locations where an upper left and a lower right corner of the virtual work portal or construct should be located. The virtual work portal or construct may, for example, be represented as a rectangle, the user gesture establishing not only the position, but also the dimensions of the virtual work portal or construct.

Figure 86C:
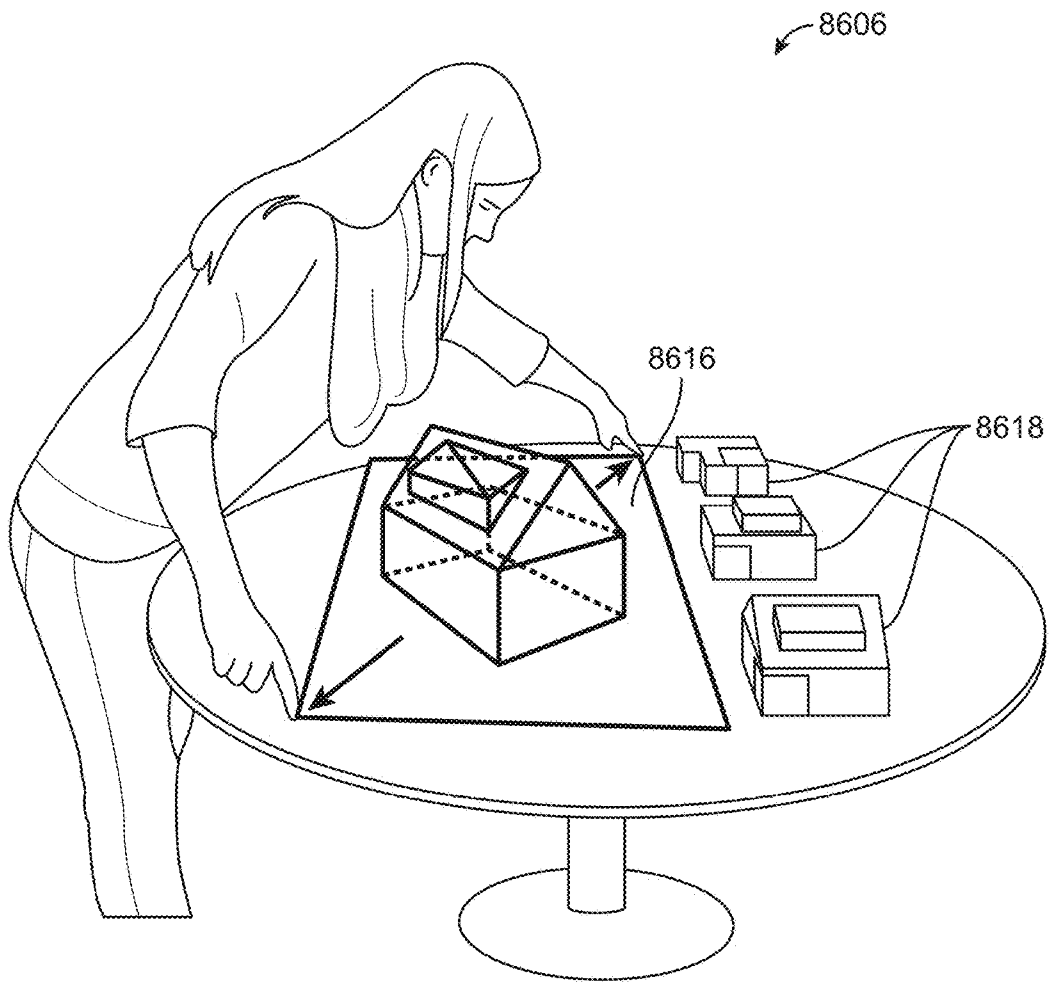

FIG. 86C shows another scenario 8606 of the user interacting via gestures with a user interface virtual construct 8616 rendered by an AR system (not shown in FIG. 86C), according to one illustrated embodiment.

In particular, FIG. 86C shows a user performing a gesture to create a new virtual work portal or construct 8616 on a physical surface such as a top surface of a physical table or desk. The user may, for example, perform a two arm gesture, for instance dragging outward from a center point to locations where an upper left and a lower right corner of the virtual work portal or construct should be located. The virtual work portal or construct may, for example, be represented as a rectangle, the user gesture establishing not only the position, but also the dimensions of the virtual work portal or construct.

As illustrated in FIG. 86C, specific applications, functions, tools, menus, models, or virtual rooms or virtual spaces can be assigned or associated to specific physical objects or surfaces. Thus, in response to a gesture performed on or proximate a defined physical structure or physical surface, the AR system automatically opens respective applications 8618 (or e.g., functions, tools, menus, model, or virtual room or virtual spaces) associated with the physical structure or physical surface, eliminating the need to navigate the user interface. As previously noted, a virtual work portal or construct may provide access to other virtual content, for example to applications, functions, menus, tools, games, three-dimensional models, and virtual rooms or virtual spaces. The user may employ various other gestures for navigating once the virtual work portal or construct has been created or opened.

Figure 87A:
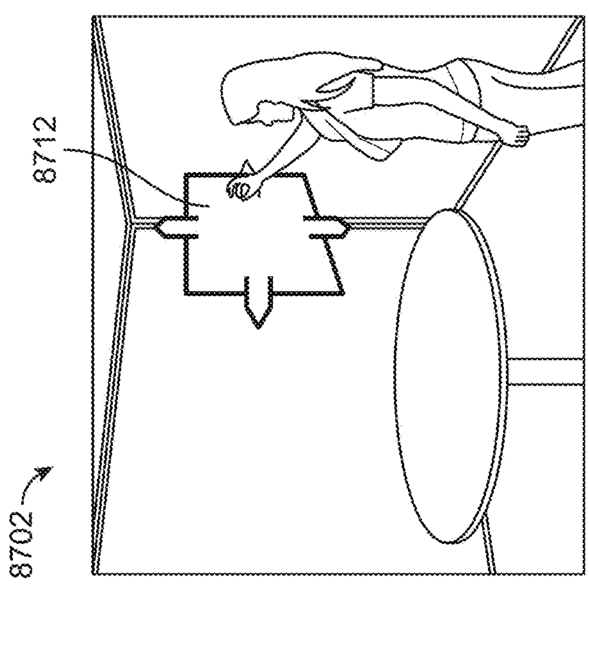
FIGS. 87A-87C illustrates other embodiments to create and move a user interface, according to one or more embodiments.
Figure 87B:
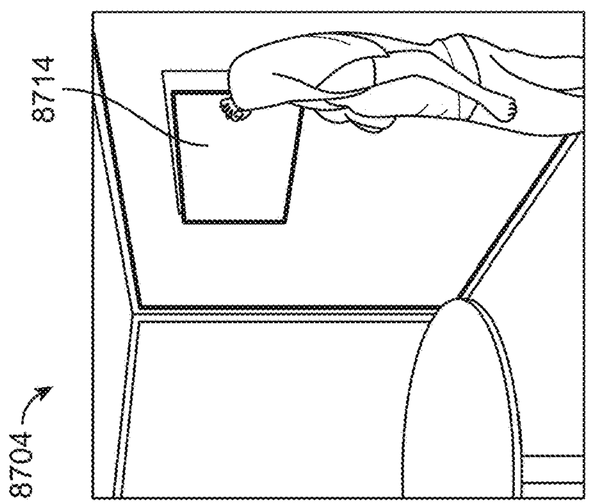
Figure 87C:
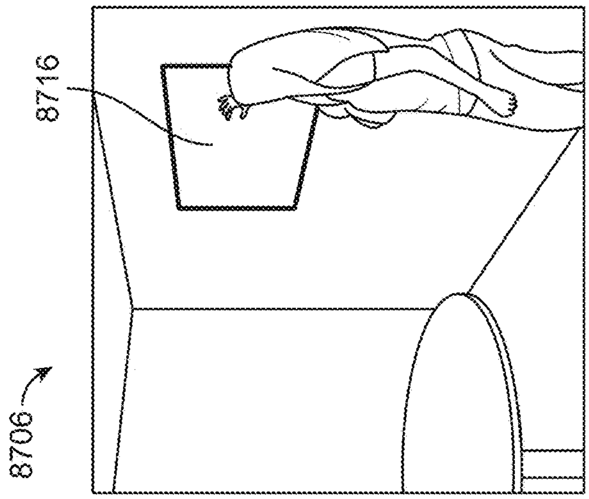

FIGS. 87A-87C show scenarios 8702, 8704 and 8706 respectively of a user interacting via gestures with various user interface virtual constructs rendered by the AR system (not shown in FIGS. 87A-87C), according to one illustrated embodiment.

The user interface may employ either or both of at least two distinct types of user interactions, denominated as direct input or proxy input. Direct input corresponds to conventional drag and drop type user interactions, in which the user selects an iconification of an instance of virtual content, for example with a pointing device (e.g., mouse, trackball, finger) and drags the selected icon to a target (e.g., folder, other iconification of for instance an application).

Proxy input corresponds to a user selecting an iconification of an instance of virtual content by looking or focusing on the specific iconification with the user's eyes, then executing some other action (s) (e.g., gesture), for example via a totem. A further distinct type of user input is denominated as a throwing input. Throwing input corresponds to a user making a first gesture (e.g., grasping or pinching) to select an iconification of an instance of virtual content, followed by a second gesture (e.g., arm sweep or throwing motion towards target) to indicate a command to move the virtual content at least generally in a direction indicated by the second gesture.

The throwing input will typically include a third gesture (e.g., release) to indicate a target (e.g., folder). The third gesture may be performed when the user's hand is aligned with the target or at least proximate to the target. The third gesture may be performed when the user's hand is moving in the general direction of the target but may not yet be aligned or proximate with the target, assuming that there is no other virtual content proximate the target which would render the intended target ambiguous to the AR system.

Thus, the AR system detects and responds to gestures (e.g., throwing gestures, pointing gestures) which allow freeform location-specification denoting which virtual content should be rendered or moved. For example, where a user desires a virtual display, monitor or screen, the user may specify a location in the physical environment in the user's field of view in which to cause the virtual display, monitor or screen to appear. This contrasts from gesture input to a physical device, where the gesture may cause the physical device to operate (e.g., ON/OFF, change channel or source of media content), but does not change a location of the physical device.

Additionally, where a user desires to logically associate a first instance of virtual content (e.g., icon representing file) with a second instance (e.g., icon representing storage folder or application), the gesture defines a destination for the first instance of virtual content.

In particular, FIG. 87A shows the user performing a first gesture to select a virtual content. The user may for example, perform a pinch gesture, pinching and appear to hold the virtual work portal or construct 8712 between a thumb and index finger. In response to the AR system detecting a selection (e.g., grasping, pinching or holding) of a virtual work portal or construct, the AR system may re-render the virtual work portal or construct with visual emphasis, for example as show in FIG. 87A. The visual emphasis cues the user as to which piece of virtual content the AR system has detected as being selected, allowing the user to correct the selection if necessary. Other types of visual cues or emphasis may be employed, for example highlighting, marqueeing, flashing, color changes, etc.

In particular, FIG. 87B shows the user performing a second gesture to move the virtual work portal or construct to a physical object 8714, for example a surface of a wall, on which the user wishes to map the virtual work portal or construct. The user may, for example, perform a sweeping type gesture while maintaining the pinch gesture. In some implementations, the AR system may determine which physical object the user intends, for example based on either proximity and/or a direction of motion.

For instance, where a user makes a sweeping motion toward a single physical object, the user may perform the release gesture with the user's hand short of the actual location of the physical object. Since there are no other physical objects in proximate or in line with the sweeping gesture when the release gesture is performed, the AR system can unambiguously determine the identity of the physical object that the user intended. This may, in some ways, be thought of as analogous to a throwing motion.

In response to the AR system detecting an apparent target physical object, the AR system may render a visual cue positioned in the user's field of view so as to appear co-extensive with or at least proximate the detected intended target. For example, the AR system may render a border that encompasses the detected intended target as shown in FIG. 87B. The AR system may also continue rendering the virtual work portal or construct with visual emphasis, for example, as shown in FIG. 87B. The visual emphasis cues the user as to which physical object or surface the AR system has detected as being selected, allowing the user to correct the selection if necessary. Other types of visual cues or emphasis may be employed, for example highlighting, marqueeing, flashing, color changes, etc.

In particular, FIG. 87C shows the user performing a third gesture to indicate a command to map the virtual work portal or construct to the identified physical object, for example a surface of a wall, to cause the AR system to map the virtual work portal or construct to the physical object. The user may, for example, perform a release gesture, releasing the pinch to simulate releasing the virtual work portal or construct 8716.

Figure 88A:
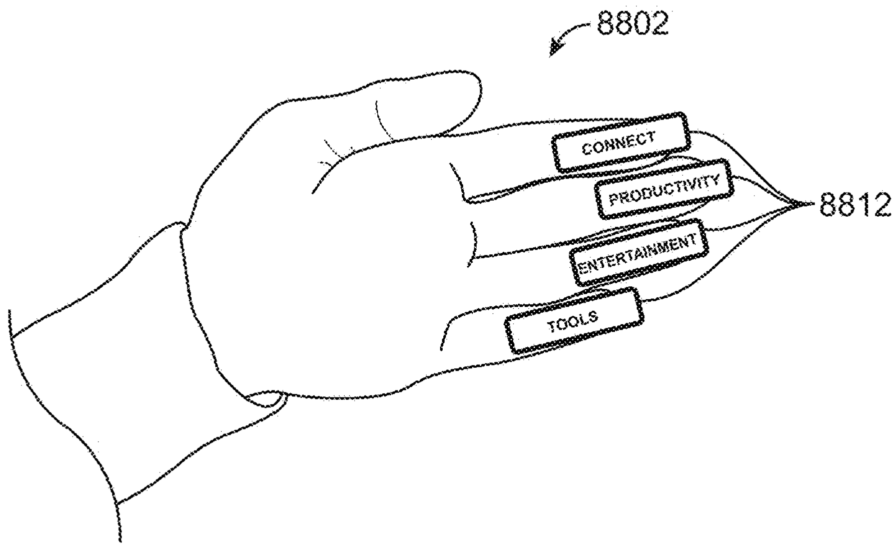
FIGS. 88A-88C illustrates user interfaces created on the user's hand, according to one or more embodiments.
Figure 88B:
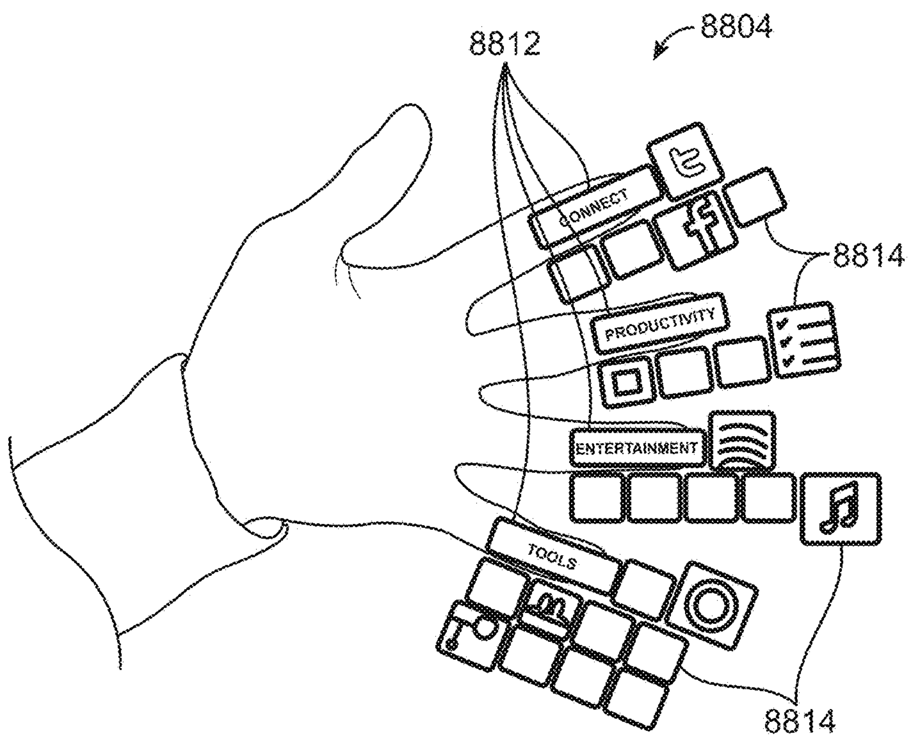
Figure 88C:
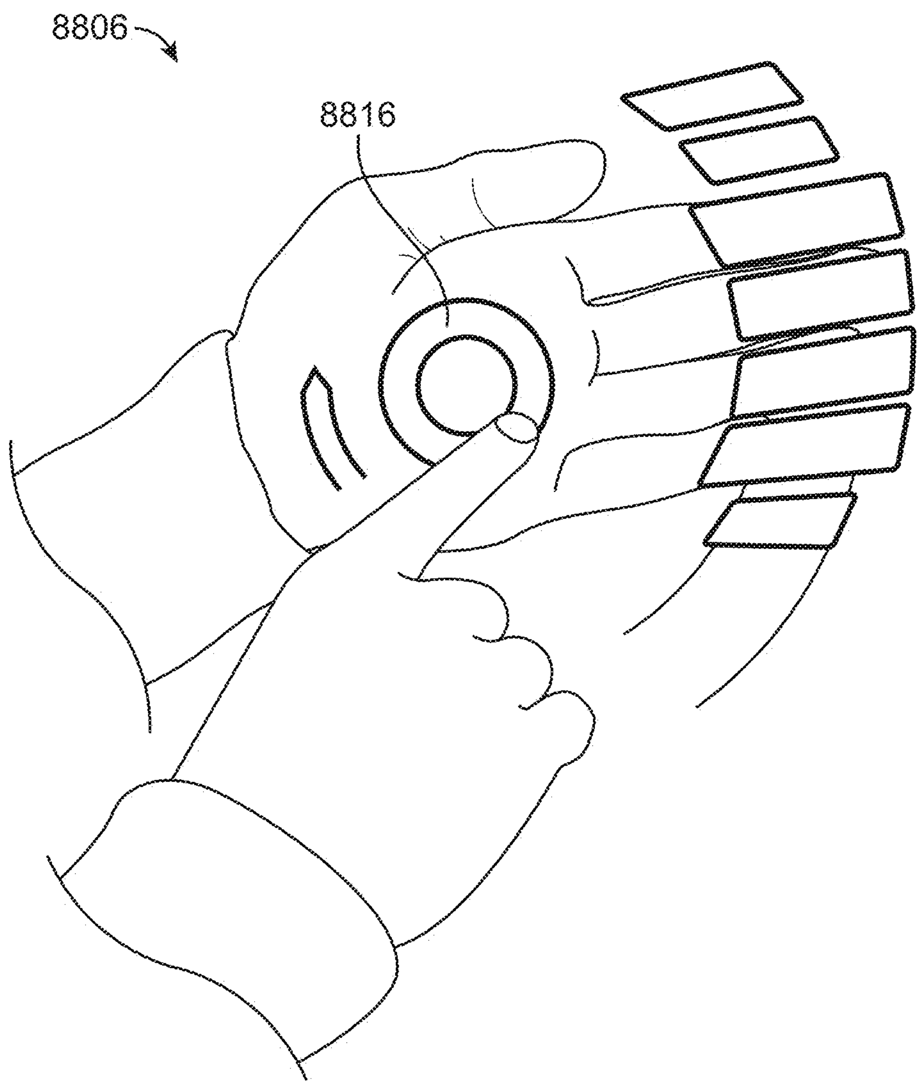

FIGS. 88A-88C show a number of user interface virtual constructs (8802, 8804 and 8806 respectively) rendered by an AR system (not shown in FIGS. 88A-8C) in which a user's hand serves as a totem, according to one illustrated embodiment.

As illustrated in FIG. 88A, in response to detecting a first defined gesture (e.g., user opening or displaying open palm of hand, user holding up hand), the AR system renders a primary navigation menu in a field of view of the user so as to appear to be on or attached to a portion of the user's hand. For instance, a high level navigation menu item, icon or field may be rendered to appear on each finger other than the thumb. The thumb may be left free to serve as a pointer, which allows the user to select a desired one of the high level navigation menu item or icons via one of second defined gestures, for example by touch the thumb to the corresponding fingertip.

The menu items, icons or fields 8812 may, for example, represent user selectable virtual content, for instance applications, functions, menus, tools, models, games, and virtual rooms or virtual spaces.

As illustrated in FIG. 88B, in response to detecting a defined gesture (e.g., user spreads fingers apart), the AR system expands the menus, rendering a lower level navigation menu 8814 in a field of view of the user so as to appear to be on or attached to a portion of the user's hand. For instance, a number of lower level navigation menu items or icons 8814 may be rendered to appear on each of the fingers other than the thumb. Again, for example, the thumb may be left free to serve as a pointer, which allows the user to select a desired one of the lower level navigation menu item or icons by touch the thumb to a corresponding portion of the corresponding finger.

As illustrated in FIG. 88C, in response to detecting another defined gesture 8816 (e.g., user making circling motion in palm of hand with finger from other hand), the AR system scrolls through the menu, rendering fields of the navigation menu in a field of view of the user so as to appear to be on or attached to a portion of the user's hand. For instance, a number of fields may appear to scroll successively from one finger to the next. New fields may scroll into the field of view, entering from one direction (e.g., from proximate the thumb) and other fields may scroll from the field of view, exiting from the other direction (e.g., proximate the pinkie finger). The direction of scrolling may correspond to a rotational direction of the finger in the palm. For example the fields may scroll in one direction in response to a clockwise rotation gesture and scroll in a second, opposite direction, in response to a counterclockwise rotation gesture.

Other UI Embodiments

As described above, users may communicate with the AR system user interface through a series of gestures, totems, UI hardware, and other unique modes of interacting with the system. The following embodiments represent a few examples of the UI experience. It should be appreciated that the following list is not exhaustive and other embodiments of interacting with the system may be similarly used.

The following methods of interacting with the system may be used with or without a totem. The following embodiments represent different ways by which a user may turn the system on, start or end a desired application, browse the web, create an avatar, share content with peers, etc. It should be appreciated that the following series of example embodiments are not exhaustive, but simply represent example user interfaces/user experiences through which users may interact with the AR system.

Avatar

As discussed above, the user interface may be responsive to a variety of inputs. The user interface of the AR system may, for example, be responsive to hand inputs, for instance: gestures, touch, multi-touch, and/or multiple hand input. The user interface of the AR system may, for example, be responsive to eye inputs, for instance: eye vector, eye condition (e.g., Open/Close), etc.

Figure 123A:
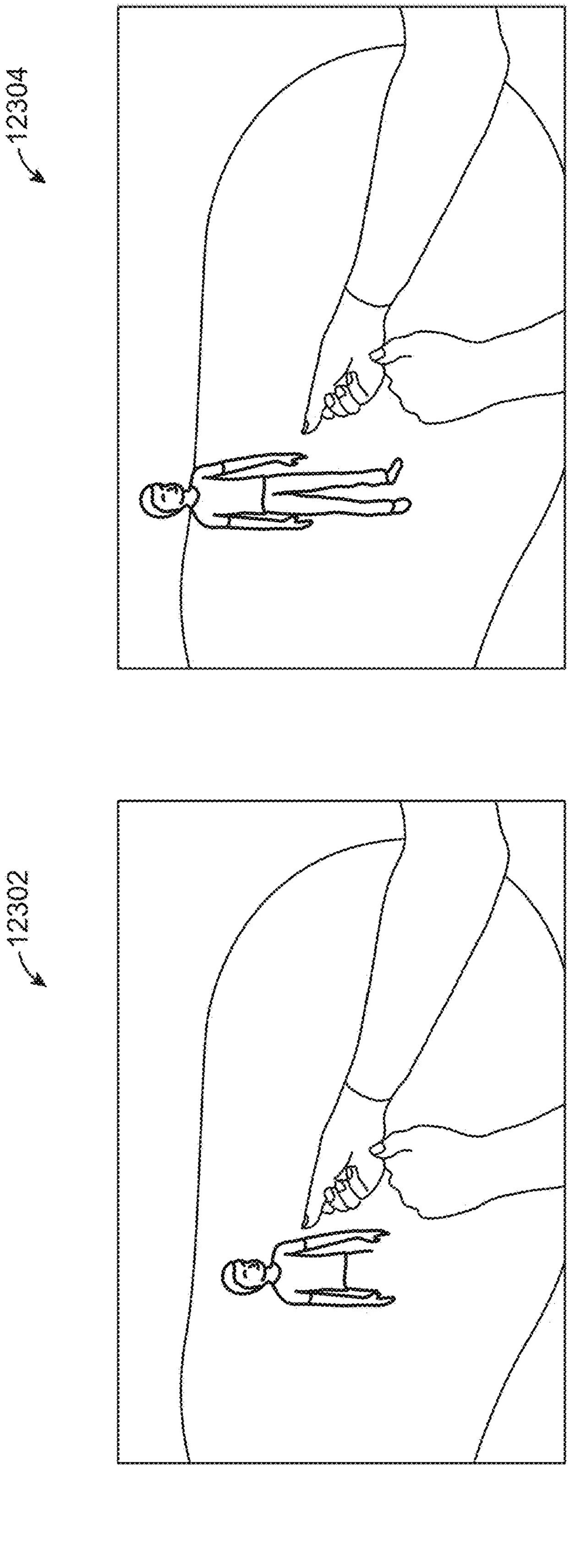

Referring ahead to FIG. 123A, in response to the one or more user inputs described above (e.g., a cupped palm with a pointed finger gesture, as shown in the illustrated embodiment, etc.), the system may generate an avatar that may lead the user through a variety of options. In one or more embodiments, the avatar may be a representation of the user. In essence, the user may be rendered as a "puppet master" and the user avatar of the AR system present a set of icons, any of which may be selected by the user.

As shown in scene 12302, the user, through a predetermined gesture (e.g. a hand pulling gesture, a finger gesture, etc.) that is recognized by the AR system, may "pull" out the avatar from a desired location. As shown in scene 12304, the avatar has been populated.

The avatar may be pre-selected by the user, in some embodiments, or, in other embodiments, the system may present the user with different avatars each time. The gesture that will generate the perception of the avatar may also be predetermined. In other embodiments, different hand gestures may be associated with different avatars. For example, the hand pulling gesture may generate the avatar shown in FIG. 123A, but a finger crossing gesture may generate a mermaid avatar, for example (not shown). In other embodiments, different applications may have their own unique avatar. For example, if the user wishes to open a social media application, the social media application may be associated with its own particular avatar, which may be used to interact with the application.

There may be many ways of detecting the hand gesture that generates/creates/populates the avatar. The gestures may be detected or recognized by the world cameras, sensors, hand gesture haptics, or any other input devices discussed above. Few example approaches have been discussed above.

Figure 123B:
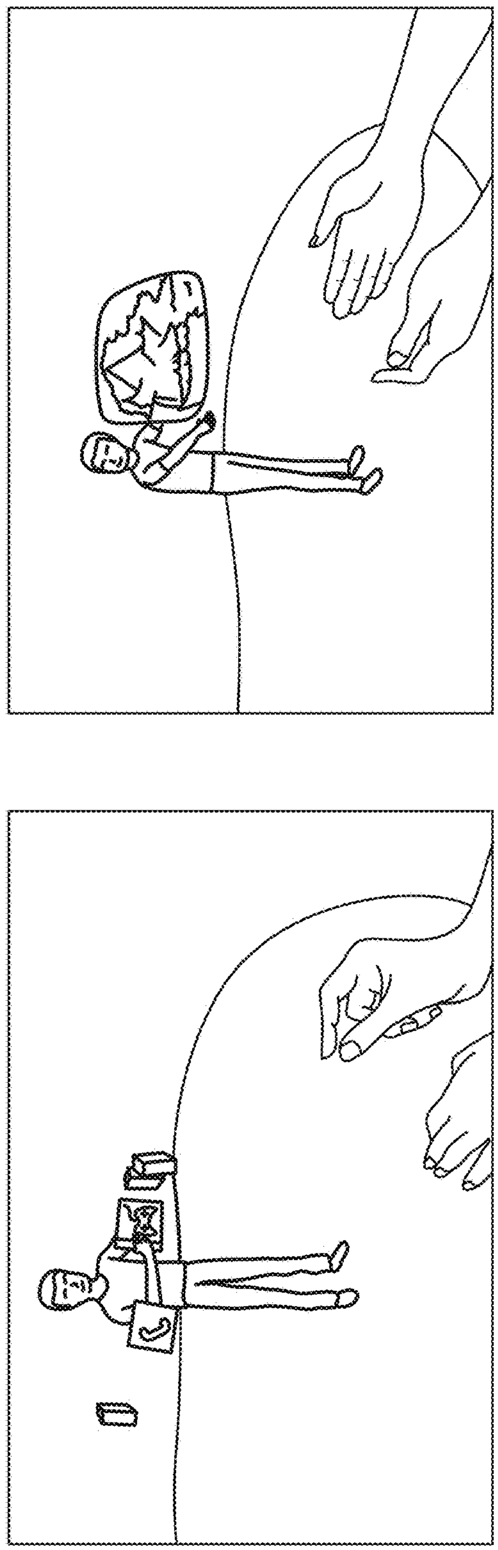

Referring now to FIG. 123B, once the avatar has been populated, additional options may be rendered adjacent to the avatar to help the user choose one or more options. As shown in FIG. 123B, the avatar may be a dynamic avatar that moves and plays along with the user as the user selects an option. As shown in the example embodiment, the avatar in FIG. 123B may hold up various options (scene 12306) that the user may select through another hand gesture. As shown in scene 12308, the user may select a particular application from the presented icons (e.g., phone, games, contacts, etc.) that are rendered adjacent to the avatar. The user may for example select the "games" icon as shown in scene 12308. Once the icon has been selected, the avatar may open up the game (using the avatar hand gesture, as shown in 12308). The game may then be rendered in 3D to the user. In one embodiment, the avatar may disappear after the user has selected the game, or in other embodiments, the avatar may remain, and the user may be free to choose other options/icons for other functionality as well.

Figure 123C:
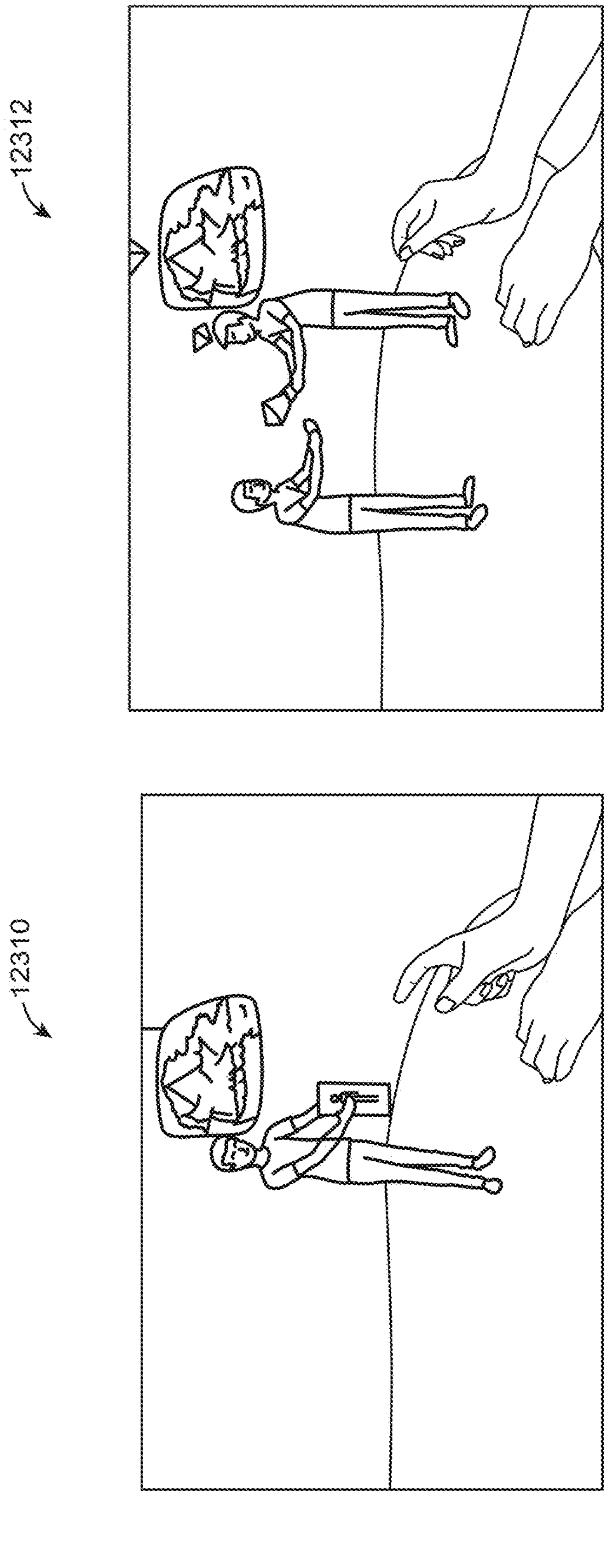

Referring now to FIG. 123*c*, the user may select another option through the avatar. In the example embodiment, the user may select a "friend," (scene 12310) that the user may want to communicate with. The friend may then be rendered as an avatar, as shown in scene 12312.

In one or more embodiments, the avatar may simply represent another avatar of the system, or a character in a game. Or, the other avatar may be an avatar of another user, and the two users may be able to interact with each other through their avatars. For example, the first user may want to share a file with another user. This action may be animated in a playful manner by populating both the systems through avatars.

As shown in FIG. 123C, having generated the other avatar, the avatars may interact and pass on virtual objects to each other, as shown in scene 12312. For example, the first avatar may pass a virtual object related to the virtual game to the other avatar. FIG. 123D shows detailed input controls 12314 that may be used to interact with the avatar. As shown in FIG. 123D, various gestures may be used for user input behaviors. As shown in FIG. 123D, some types of actions may be based on a location of virtual content, while others may be agnostic to virtual content.

Extrusion

Figure 124A:
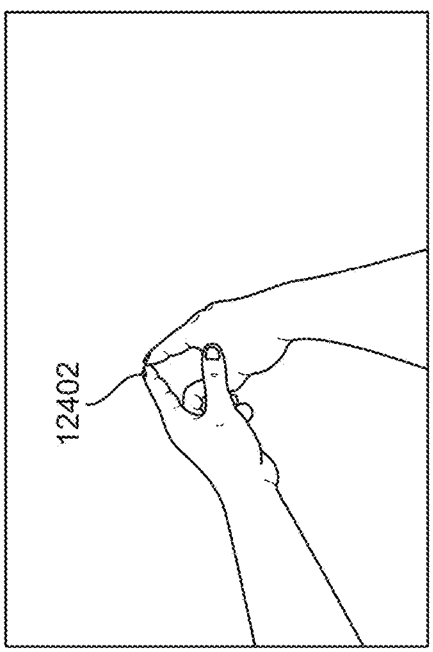
Figure 124B:
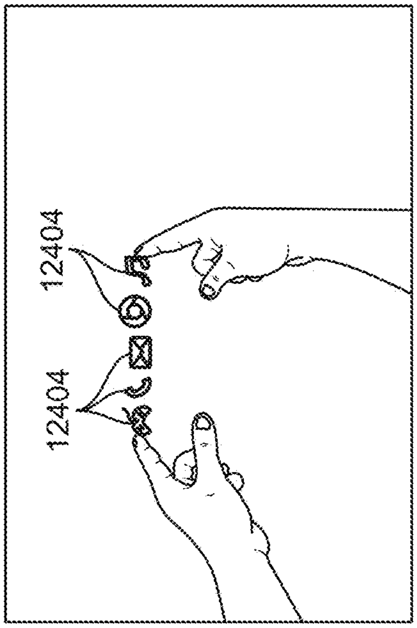

In another embodiment, the UI may follow an extrusion theme. For example, as shown in FIG. 124A, the user may make a triangle gesture 12402 (e.g., index fingers together, in the illustrated embodiment) to open up the user interface. In response to the triangle gesture, the AR system may extrude a set of floating virtual icons 12404, as shown in FIG. 124B. In one or more embodiments, the virtual icons may be floating blocks, or may simply be the logo associated with a particular application or functionality. In the embodiments shown in FIG. 124B, in response to the gesture, a mail application, a music application, a phone application, etc. have been populated.

In one or more embodiments, extrusion may refer to populating virtual objects (in this case, icons, selectable objects, etc.) on a fixed cross-sectional profile. The cross-sectional profile may be rotated, turned, and the various blocks may be rearranged etc.

Figure 124C:
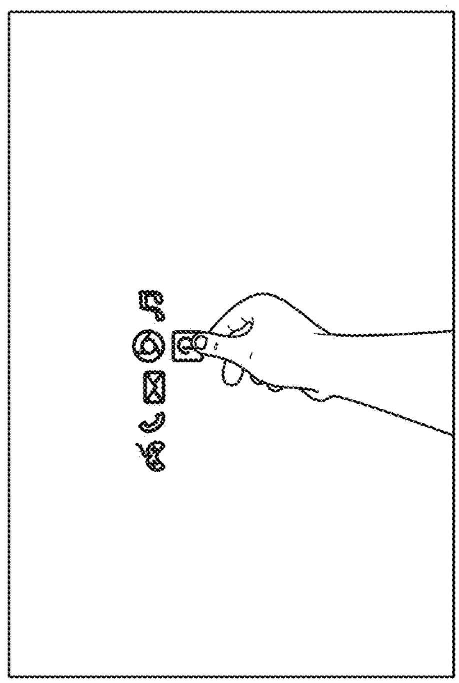
Figure 124D:
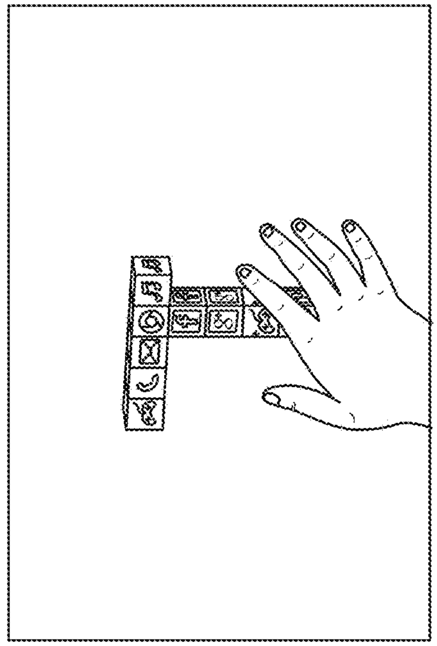
Figure 124E:
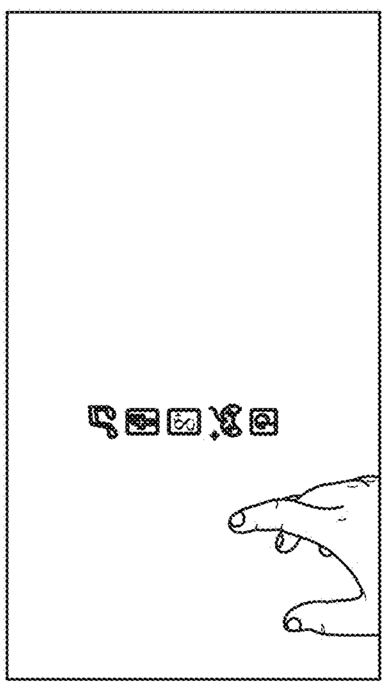
Figure 124F:
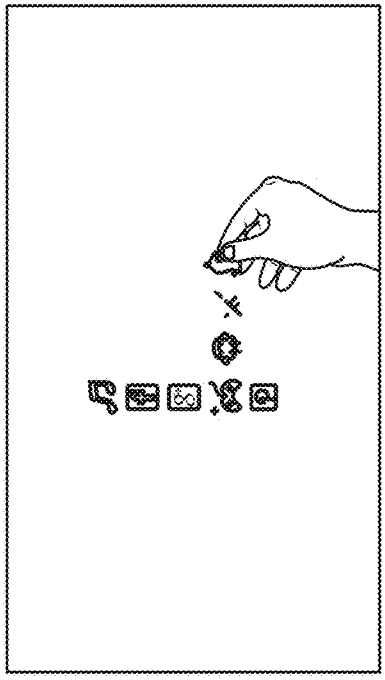

As shown in FIG. 124B, the blocks may be opened up horizontally, and then rearranged based on the preferences of the user. If the user selects a particular icon, more icons that are subsets of the selected icon may be rendered beneath the selected icon, as shown in FIG. 124C. As described previously, the blocks may be rotated around the cross-sectional plane to open up more options of a particular icon, as shown in FIG. 124D. For example, if the user wishes to open up a particular application, and chooses to select a friend's profile within that application, the user may extrude the icons for various profiles as shown in the cross-sectional view of FIGS. 124E and 124F.

Figure 124G:
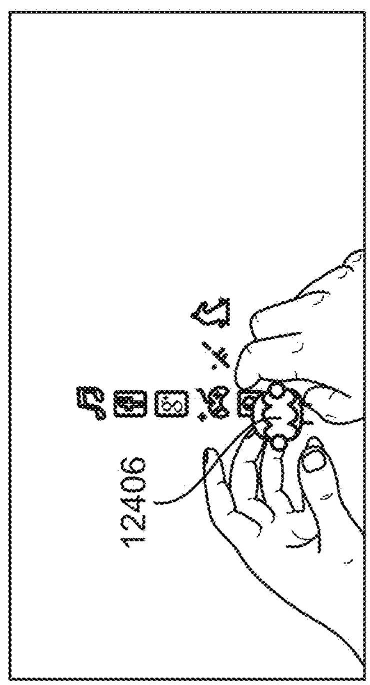

As shown in FIG. 124G, the user may then select a particular icon with a holding gesture of the hand such that the virtual icon is "pulled" from the cross-sectional plane and is nested in the user's hand. As shown in FIG. 124G, the user may manipulate the selected virtual icon with the user's hands (12406). Essentially, the virtual icon or block comes out of the cross-sectional plane, and the user may grasp the icon or block in his hands.

Figure 124H:
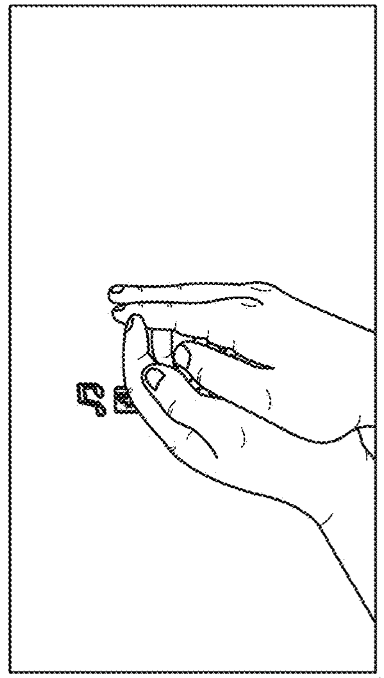
Figure 124I:
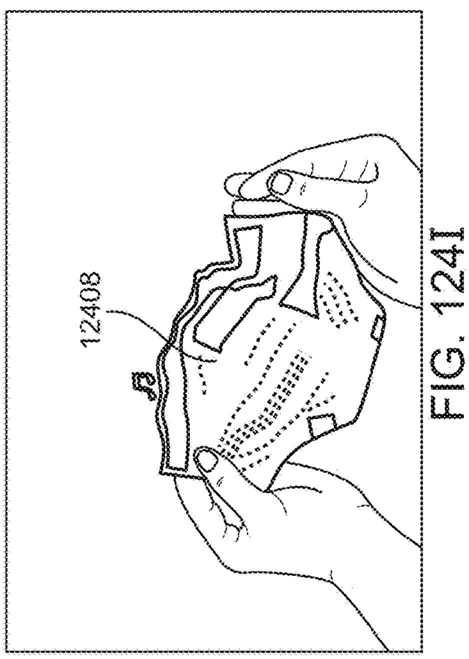
Figure 124J:
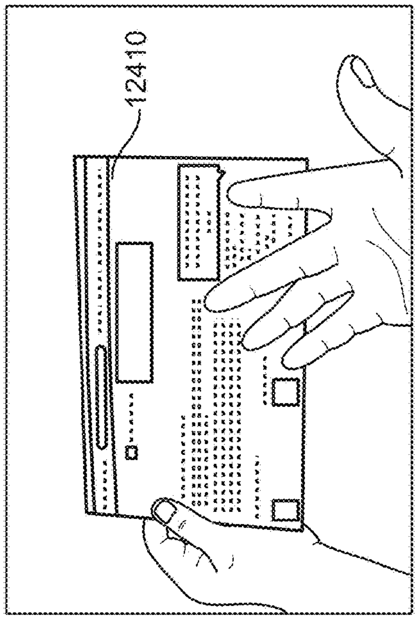
Figure 124K:
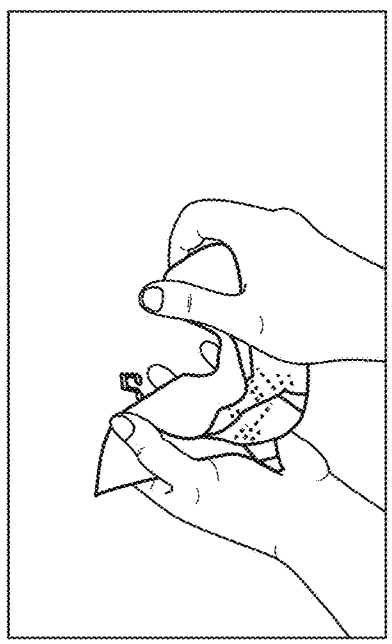
Figure 124L:
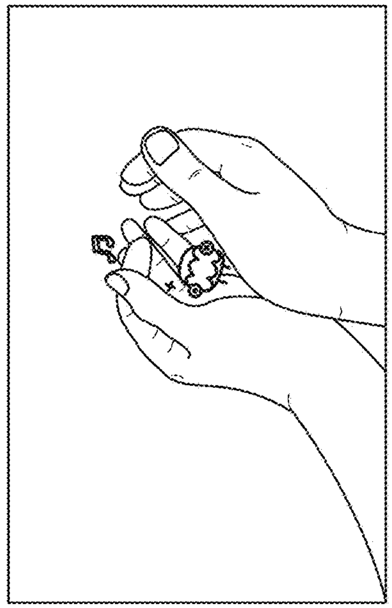

For example, the user may want to view a particular friend's profile in more details. As shown in FIG. 124H, the user may, with a particular hand gesture (e.g., a close and opening gesture, as shown in the FIG. 124H) open up the profile page 12408 as if simply opening up a crumpled piece of paper (FIGS. 124I and 124J). Once the user is done looking through the friend's profile page 12410, the user may similarly crumple the virtual page back as shown in FIG. 124K, and return it to the series of blocks that the user had previously extruded (FIG. 124L). FIG. 124M shows detailed input controls 12620 that may be used to interact with the avatar. As shown in FIG. 124M, various gestures may be used for user input behaviors. As shown in FIG. 124M, some types of actions may be based on a location of virtual content, while others may be agnostic to virtual content.

Gauntlet

Figure 125A:
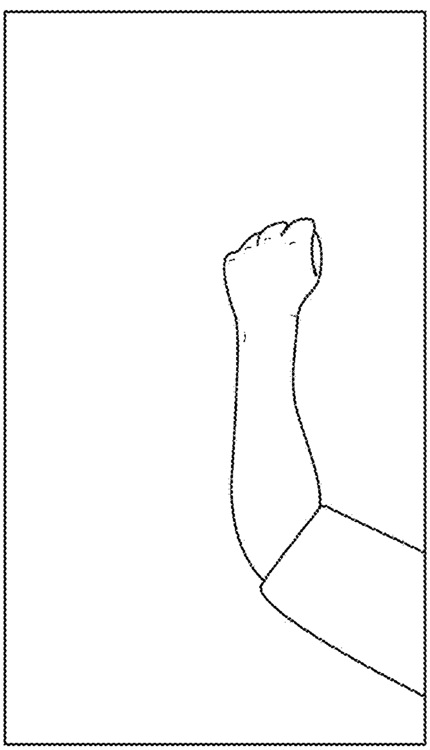
Figure 125B:
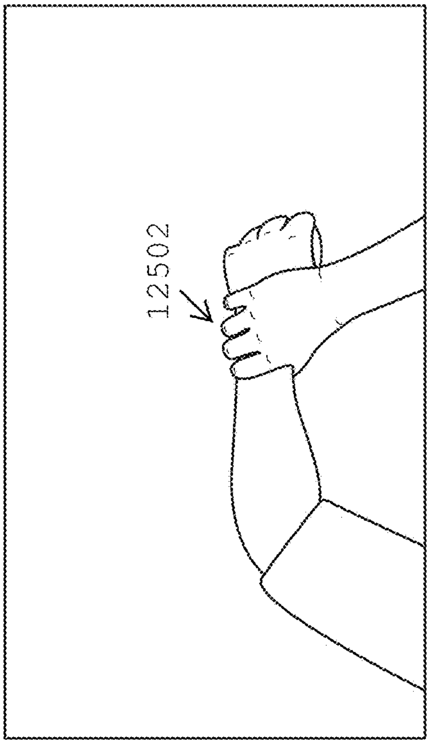
Figure 125C:
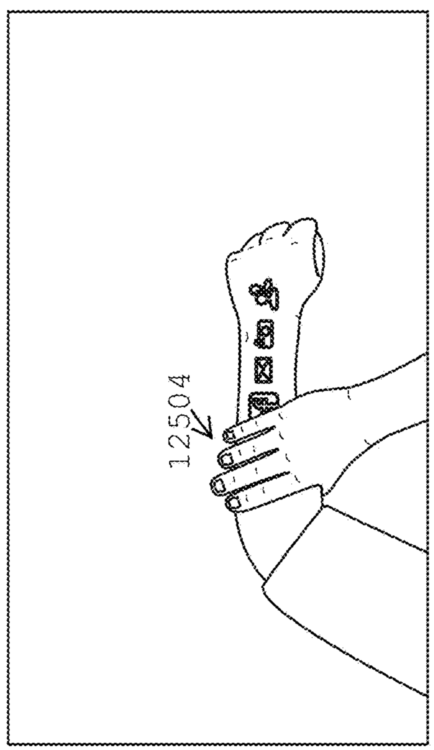

In yet another approach, the UI may follow a gauntlet theme, where the user's hand (in this case) or any other body part may be used as an axis of rotation, and the icons may be rendered as if appearing on the user's arm. As shown in FIGS. 125A and 125B, the user may, through a predetermined gesture 12502 (e.g., clasping the arm with his other hand, in this example) that is recognized by the system cause the generation of various icons on the user's arm. As shown in FIG. 125C, the system may automatically generate icons 12504 based on the user's dragging gesture 12506 across his arm. The dragging gesture 12506 may cause the population of the virtual icons 12506. As was the case in the previously examples, the virtual icons may be applications, friend's profiles or any other type of functionality that may be further selected by the user.

Figure 125D:
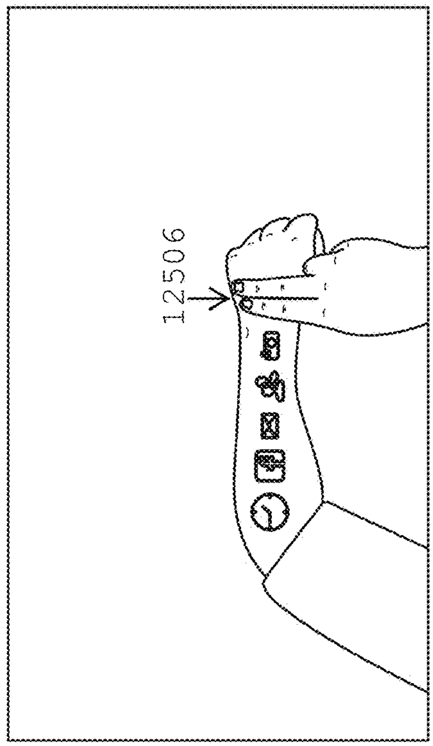
Figure 125E:
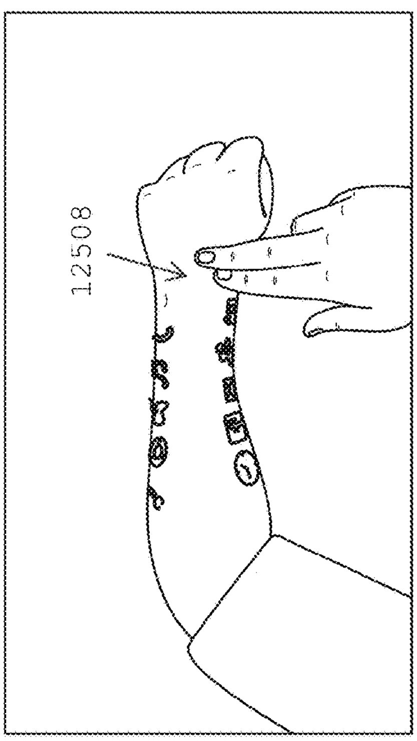

As shown in the FIG. 125D, once the gestures have been populated, the user may with another gesture 12508 that is recognized by the system (e.g., two fingers to rotate a set of icons around the arm. This may cause more virtual icons to be populated on the side of the user's arm, as shown in FIG. 125E. Essentially, the length of the user's arm may be used as an axis by which to rotate the virtual axis around the user's arm.

Figure 125F:
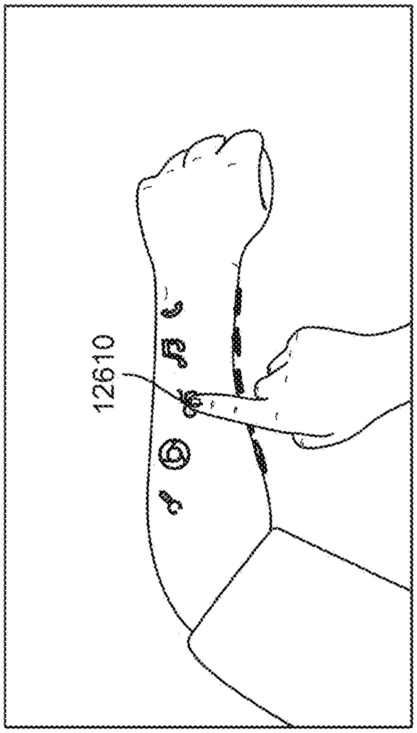
Figure 125G:
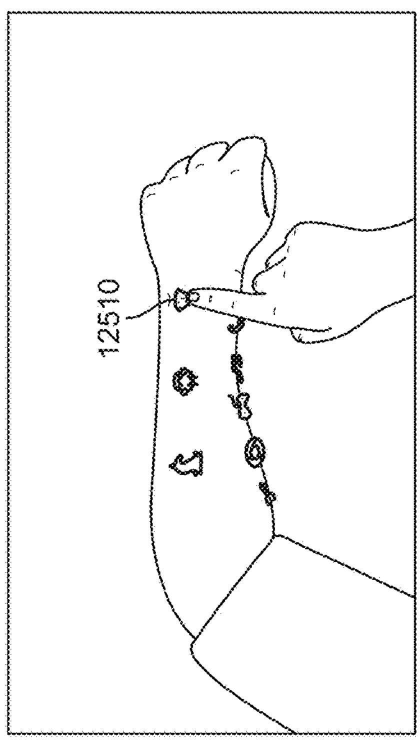
Figure 125H:
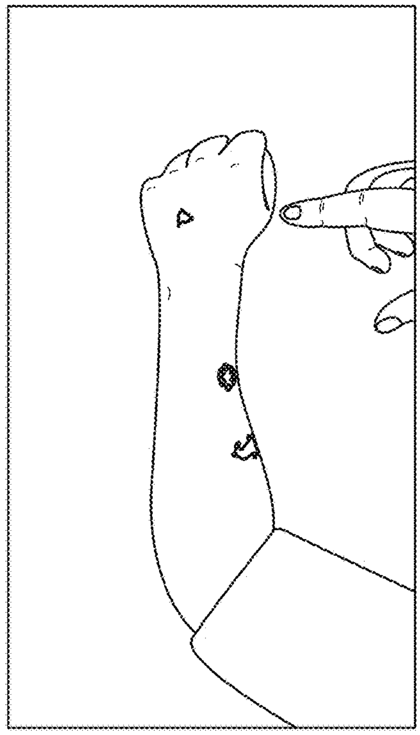

In one example, the user may select a particular icon 12510 (FIG. 125F); the system may have some indicator to denote that it has now been selected (e.g., denoted by a different color, etc.). As shown in FIG. 125G, the user may drag the selected icon 12510 to his wrist. This action may be recognized by the system, indicating to the user that this application may be opened. Here, the user has selected a virtual object icon (e.g., a diamond shaped icon, as shown in the FIGS. 125G). Based on the icon selection, the other virtual icons may fade away and a virtual fading pattern may be projected on the user's wrist, as shown in FIGS. 125H and 125I respectively.

Figure 125J:
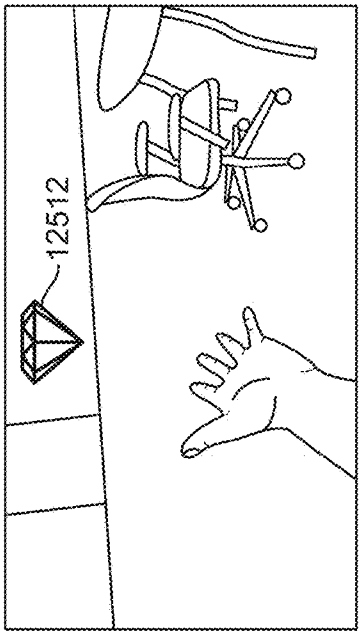

Upon dragging the icon to the user's wrist, the user may in a clasping motion, lift up the icon, such that the diamond icon 12510 is rendered in a larger scale into the room (FIG. 125J). Thus, the user has opened up a virtual object and has released the virtual object into the physical space he/she is currently occupying. For example, the user may leave the virtual object in a physical space such that another user may find it when entering the same physical space.

Figure 125I:
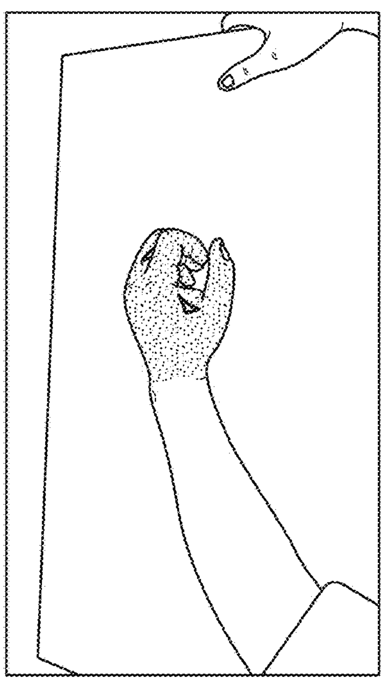
Figure 125L:
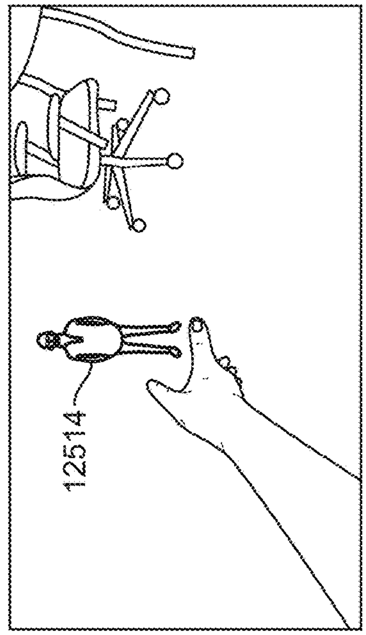
Figure 125K:
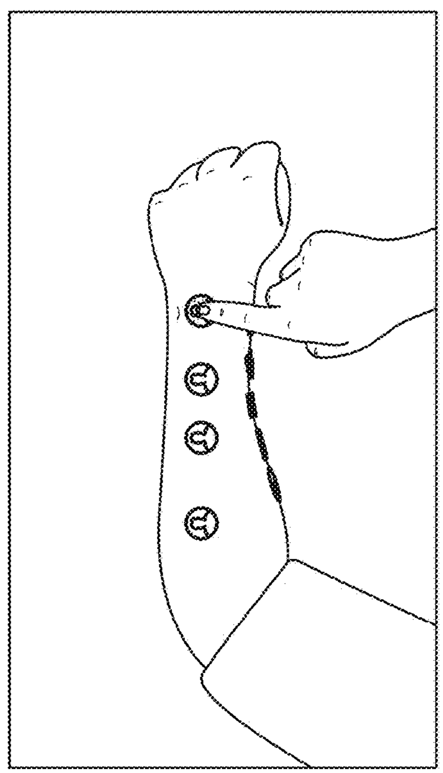

Or, in another example, as shown in FIGS. 125K and 125I, the user may have selected an icon that represents a contact or a friend. For example, the user may want to initiate a live conversation with the friend, or may want to engage in an activity with that friend. Similar to the above example, the user may drag the icon representing the friend to the wrist, make a clasping motion and "release" the friend, such that a virtual rendering 12514 of the friend may appear in front of the user, as shown in FIG. 125L. It should be appreciated that the user may interact with the virtual friend in real-time, which is made possible through the passable world techniques discussed above. FIG. 125M shows detailed input controls 12516 that may be used to interact with the user interface. As shown in FIG. 125M, various gestures may be used for user input behaviors. As shown in FIG. 125M, some types of actions may be based on a location of virtual content, while others may be agnostic to virtual content.

Grow

In another approach, the UI may follow a grow approach, such as a growing tree, for example, such that the icons of the AR system may be "grown" like a tree from the ground or a desk, for example. Referring to FIGS. 126A-126L, the user, through various gestures, may select one or more icons (e.g., an application, a category of applications, etc.), and grow it into a tree to populate other icons that may be part of the selected application.

Figure 126A:
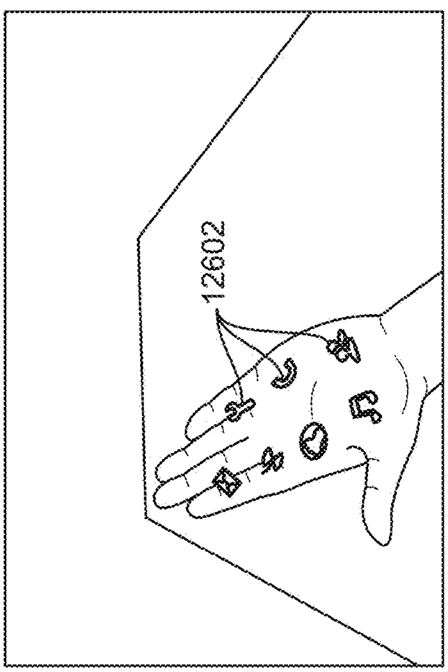
Figure 126B:
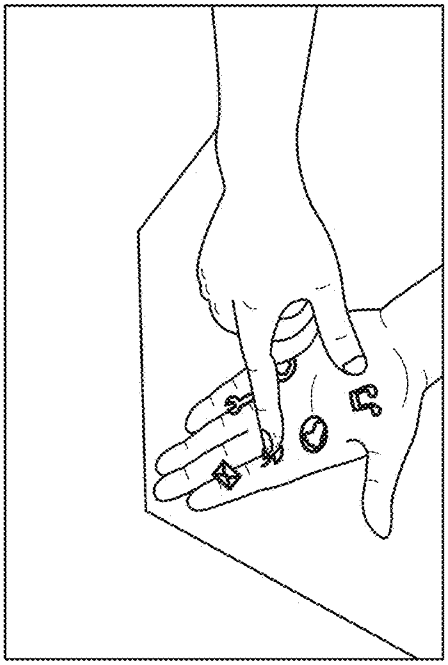
Figure 126C:
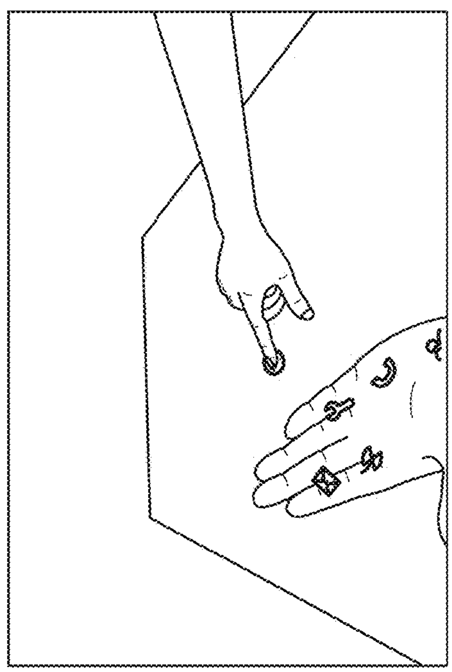
Figure 126D:
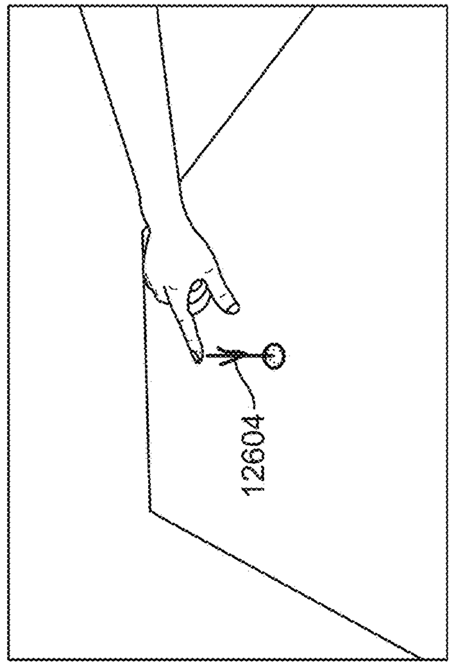
Figure 126E:
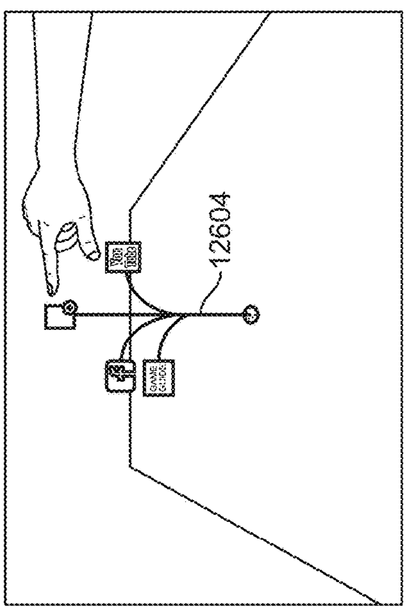

More particularly, referring to FIG. 126A, a set of icons denoting various applications or functionalities 12602 may be populated on the user's hand. As shown in FIGS. 126B and 126B, the user may select a particular icon to "grow," and place the virtual icon (e.g., through a clasping motion of the user's fingers) on a flat surface (e.g., desk, etc.). Here, for example, the user has selected the social media category for example. To "grow" the category (e.g., in order to find other applications within the category), as shown in FIG. 126C, the user may "plant" (e.g., with a pressing motion), press the virtual icon into a flat surface. This gesture may cause a rendering of a virtual tree or plant 12604 as shown in FIG. 126D. As shown in FIG. 126D, the plant may start small, and grow to a larger tree, such as the one shown in FIG. 126E. As shown in FIGS. 126D and 126E, the plant may comprise various branches, each having icon(s) that are representative of more applications or options within a particular application. Here, in the current example, the branches may be various applications within the category of social media (e.g., YouTube®, Facebook®, etc.).

Figure 126F:
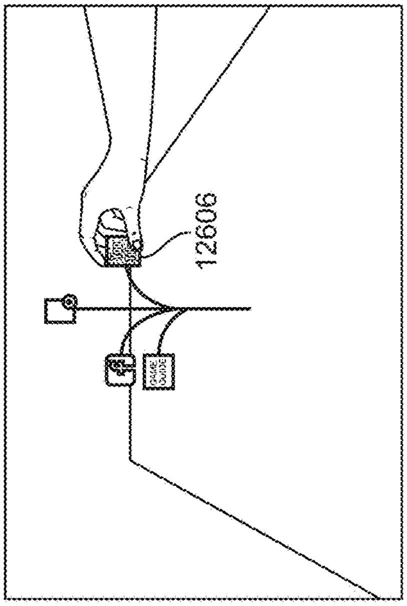
Figure 126G:
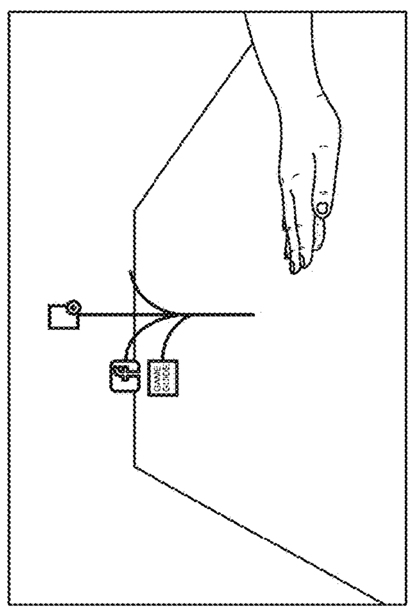
Figure 126H:
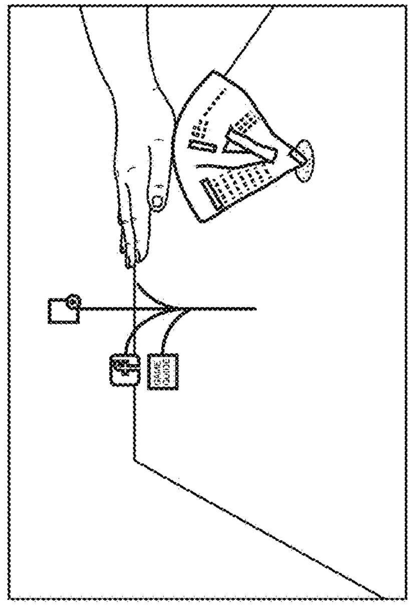
Figure 126I:
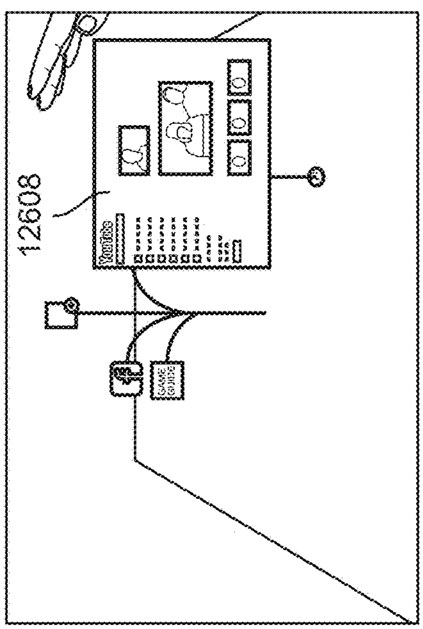

As shown in FIG. 126E, the user may select one of the icons on the branches of the plant or tree, and similar to the prior example, pick up the virtual icon through a clasping gesture 12606 and "plant" it again at another location for it to grow. For example, as shown in FIGS. 126F and 126G, the user has clasped the application, and has then placed it on the flat surface to make the page "grow" from the ground as shown in FIG. 126H. The virtual page may then appear as if sprouting from the ground, as shown in FIG. 126I. The virtual page grows to become a virtual standalone tree structure 12608, and may be viewed by the user in detail, as shown in FIG. 126I.

Figure 126J:
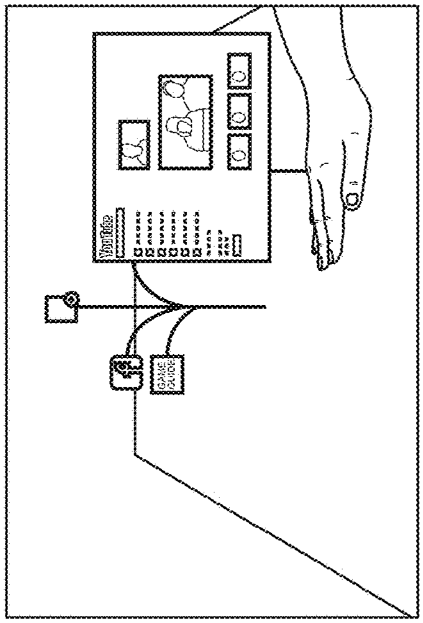
Figure 126K:
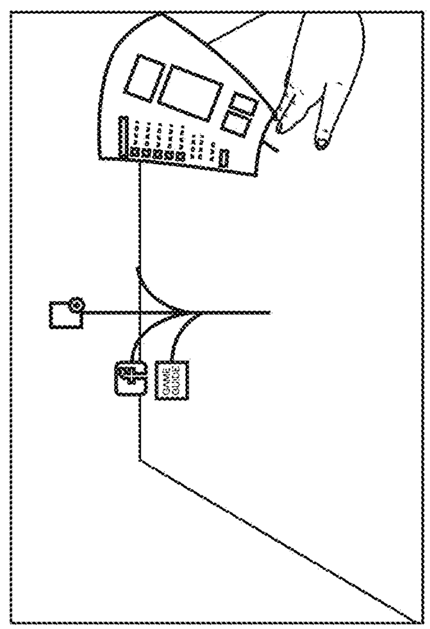
Figure 126L:
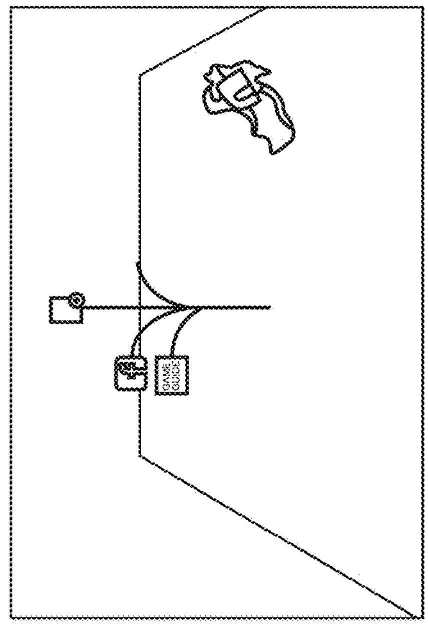

Once the user is done with the page 12608, the user may close or "cut" the tree to close the application. As shown in FIG. 126J-126L, the user, in a cutting motion may cut through the page or the trunk of the tree to close the application. The closed application may then appear as a branch of the original virtual icon tree, similar to FIG. 126E.

It should be appreciated that the various gestures are predetermined by the system. The gestures may either be pre-programmed based on the application, or may be customized to suit the preferred gestures of the user. For example, the system may be programmed to recognize the swift hand motion at the trunk of the tree as a "cutting" swipe that indicates to the system that the application should be closed.

The AR system may, for example, render a user interface for a Web browser as page with tree in forward direction, and tail in backwards direction. For instance, the user interface may be rendered with a branching tree coming out a top of the Webpage that shows the links from that Webpage. The user interface may further be rendered with the branching tree extending off into a horizon. The AR system may render the user interface with roots of the branching tree graphically tied to the links on the Webpage. Consequently, rather than having to navigate (e.g., click) through one Webpage at a time (e.g., three or four selections), the user may select a leaf node, or any other node, and jump directly to a desired Webpage represented by the leaf node.

In some implementations, the AR system may provide a scroll tool. The branching tree may dynamically change during scrolling as shown in the above figures.

Branches and leaf nodes may have a graphical iconification. The icons may, for example, show or represent a screenshot or thumbnail view of a Website or Webpage that will be navigated to in response to selection of that respective node.

The user interface changes browsing from a sequential to a parallel experience. In response to a user selecting a Webpage, the AR system renders another branching tree based on the selection. The branching tree may be rendered to visually tail away as it approaches a horizon (e.g., background, foreground, sides). For example, the AR system may render the branching tree to appear paler as the horizons are approached. The AR system may render the tale punctuated with nodes representing the Websites or Webpages that were used to navigate at a currently selected Website or Webpage.

Finger Brush

Figure 127A:
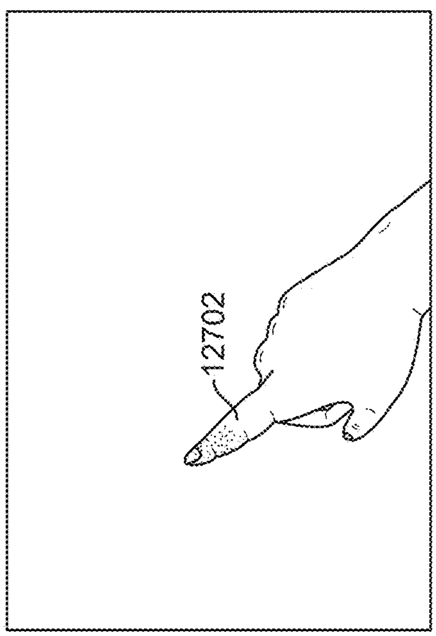

In another embodiment, the system may populate virtual icons/applications/functionality etc. based on a predetermined finger brushing gesture. For example, as shown in FIG. 127A, the system may recognize a particular gesture 12702 (e.g., pointing index finger for a predetermined period of time) of the user's fingers that indicates that the user wants to use the finger or fingers as a "finger brush". As shown in the FIG. 127B, the user may then "paint" a figure by dragging the finger(s) through space. This may cause the AR system to draw a virtual shape based on the movement of the user's fingers.

Figure 127B:
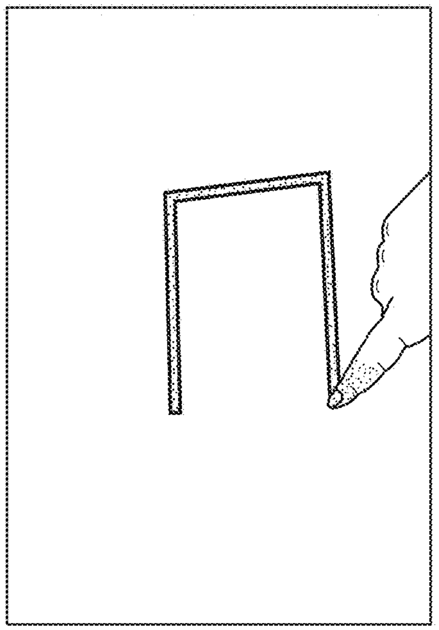
Figure 127C:
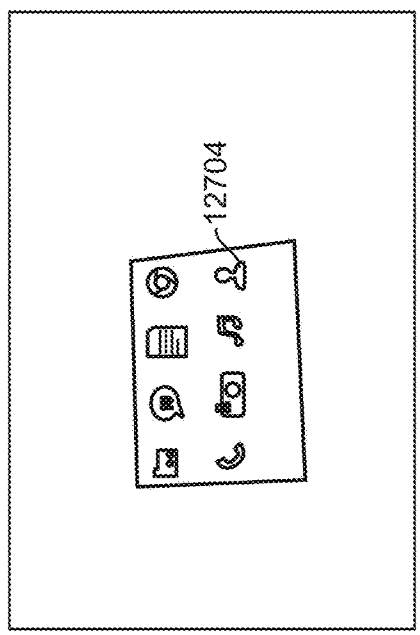
Figure 127D:
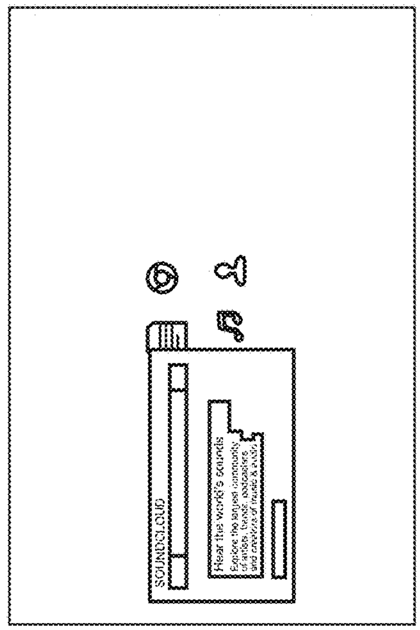

As shown in FIG. 127B, the user is in the process of drawing a rectangle. In one or more embodiments, the virtual icons or application may be populated within the confines of the shape drawn by the user. As shown in FIG. 127C, the various virtual icons 12704 now appear within the drawn shape. Now, the user may open up any particular icon and have it populate beside it, as shown in FIG. 127D. FIG. 127E shows detailed input controls 12706 that may be used to interact with the drawn shape. As shown in FIG. 127E, various gestures may be used for user input behaviors. As shown in FIG. 127E, some types of actions may be based on a location of virtual content, while others may be agnostic to virtual content.

Paint Bucket

Figure 128A:
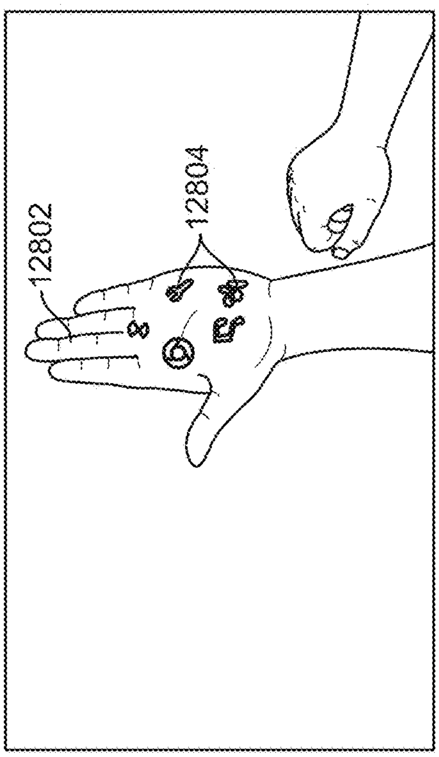
Figure 128B:
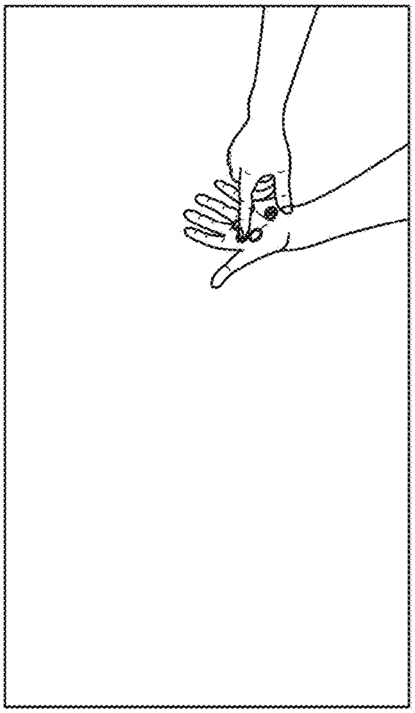
Figure 128C:
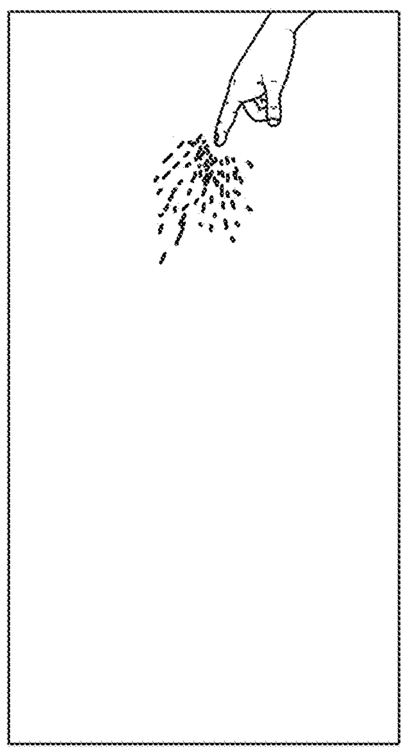
Figure 128D:
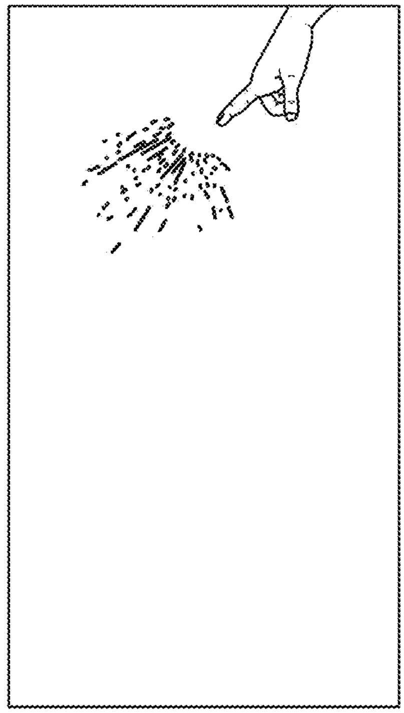
Figure 128E:
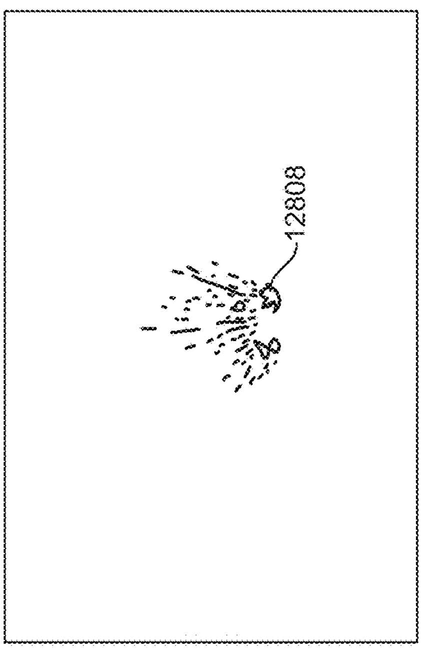
Figure 128F:
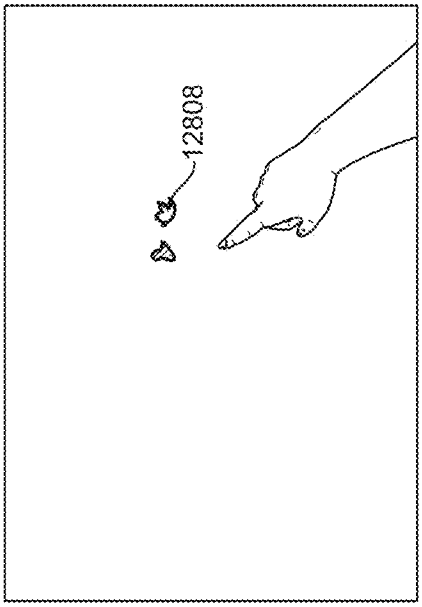
Figure 128G:
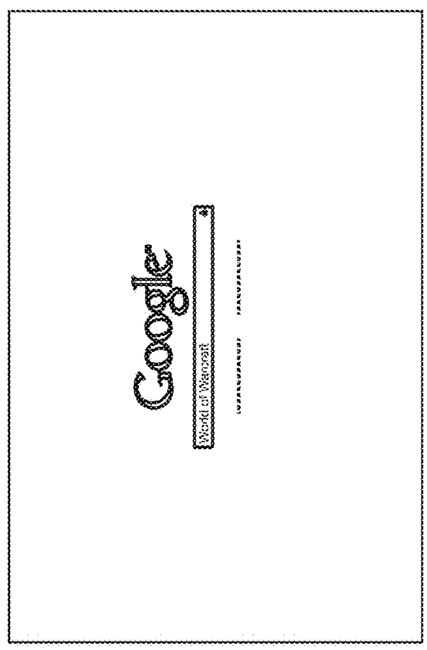
Figure 128H:
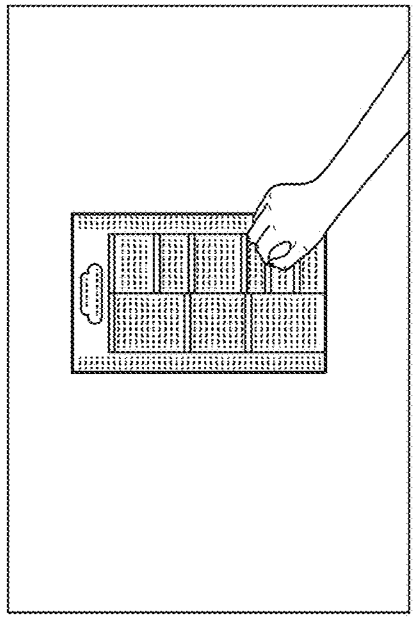
Figure 128I:
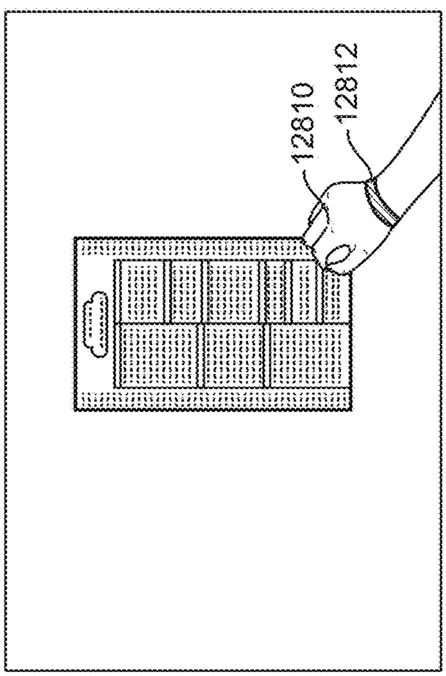
Figure 128J:
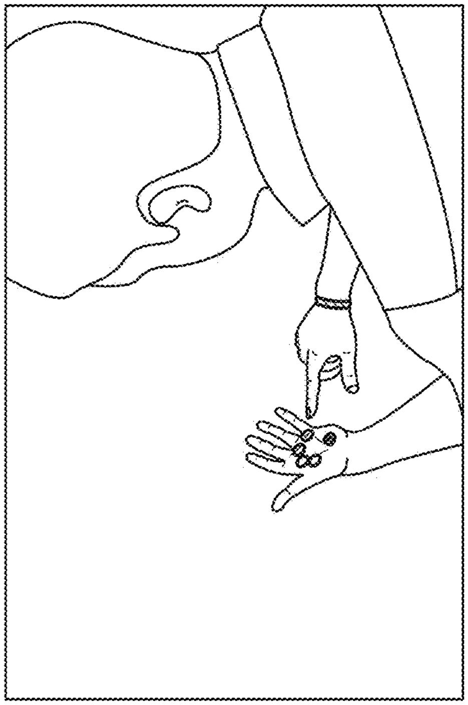
Figure 128K:
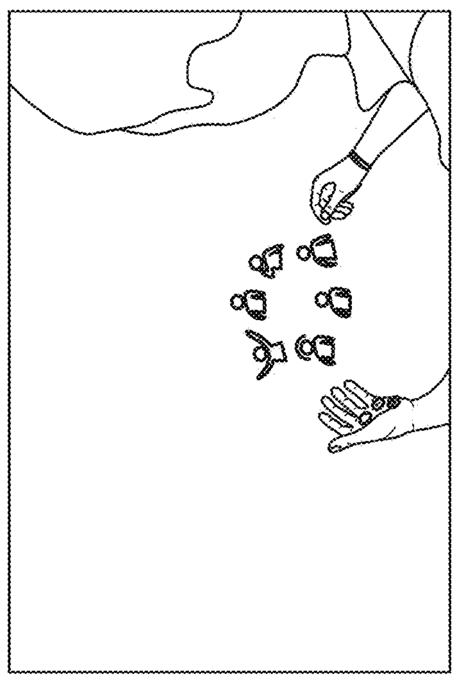
Figure 128L:
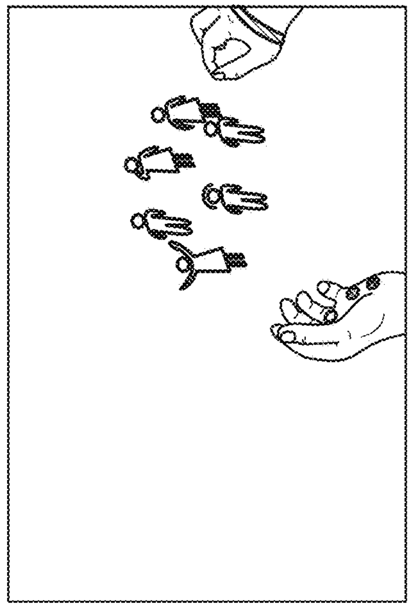
Figure 128M:
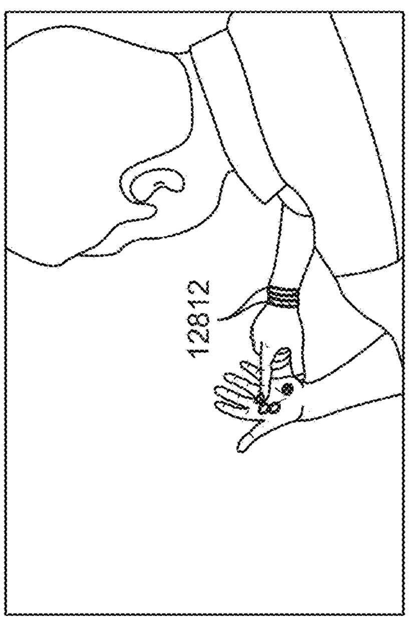
Figure 128N:
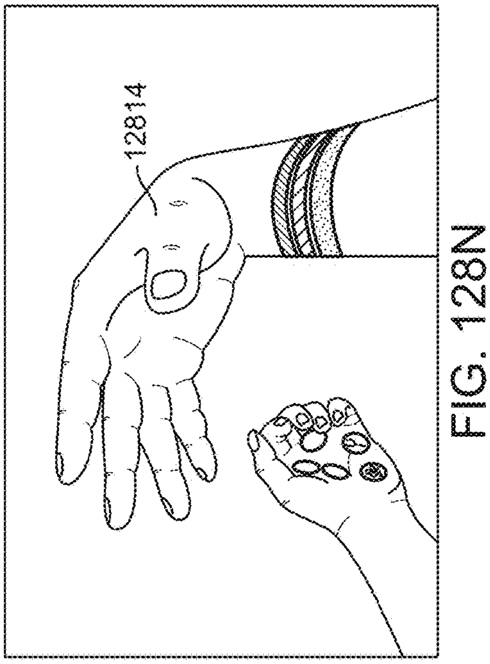
Figure 128O:
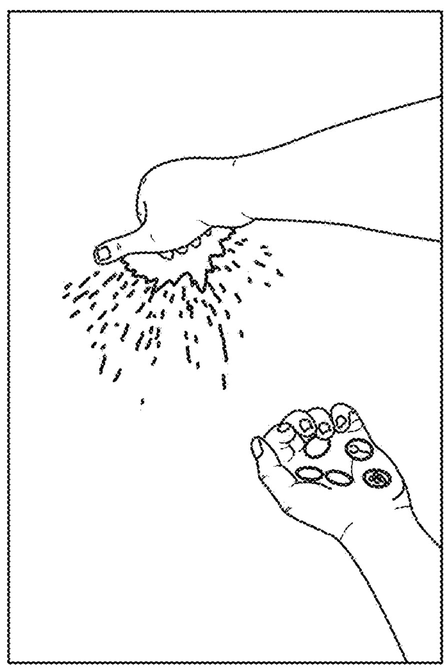
Figure 128P:
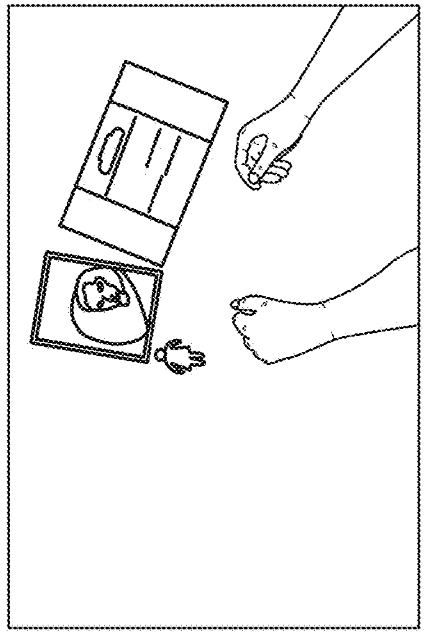

Referring now to FIG. 128A-128P, another embodiment of user interface interaction is illustrated. As shown in FIG. 128A, as was the case in the previous example, based on a user gesture 12802 (e.g., open palm, etc.), a set of virtual icons 12804 may be rendered such that they appear to be populated on the user's hand. The user may select a particular icon as shown in FIG. 128B, and flick it (FIG. 128C) toward a wall, or any other space in a paint bucket fashion. The flicking motion may translate to virtual drops of paint that may appear to be flung towards the wall, such that the selected icon, or applications within that icon (a category of applications, for example) may then be "painted" on to the wall or any other space.

The user may then select a particular virtual icon using a hand or finger gesture. As shown in FIGS. 128E and 128F, a particular icon 12808 may be selected. Upon recognition of the selection gesture, the AR system may display the application (e.g., a search page, as shown in FIG. 128G). The user may then interact with the search page, to navigate to one or more desired websites, as shown in FIG. 128H.

Using a closing-in gesture 12810 (e.g., a clasp of the index finger and the thumb, etc.), the user may store or "keep" certain a desired application or webpage (e.g., the web page of FIG. 128I) based on his/her preferences. Referring to FIGS. 128H and 128I, the user for example, may be interested in a particular webpage, or a particular portion of the webpage, and may through a gesture (a closing-in motion, for example) store the desired portion. As shown in FIG. 128I, based on the closing-in gesture 12810, the desired virtual content simply collapses or morphs the desired page into a virtual band 12812. This may be stored on the user's wrist, for example, as shown in FIG. 128I. It should be appreciated that in other embodiment, the user may keep or store a desired webpage in other ways. For example, the desired webpage may be stored in a virtual box, or a real box, or be part of a totem.

Referring to FIG. 128J-128L, other webpages/user profiles, or any other desired information may be similarly stored as other virtual bands around the user's wrist. In the embodiment shown in FIG. 128J, various virtual icons may be stored on the user's palm. The user may then select a desired icon, and interact with the icon(s), as shown in FIGS. 128K and 128L. The various stored items may be denoted by various colors, but other similar distinguishing indicators may be similarly used.

Referring now to FIG. 128N-128P, to open up the stored object (e.g., denoted by the virtual bands 12812 on the user's wrist), the user may simply use another gesture 12814 (e.g., a flinging action/motion of the palm) to fling open the virtual band. In this example embodiment, the flinging or flicking motion generates another paint bucket illusion, as shown in FIG. 128O, such that two different colors (a different color for each of the virtual bands) are flung across a given space, to generate the desired stored webpage, user profile etc. Thus, as shown in FIG. 128P, the user may then review the stored application and/or webpage, and interact with the stored content in a desired manner.

Pivot

Figure 129A:
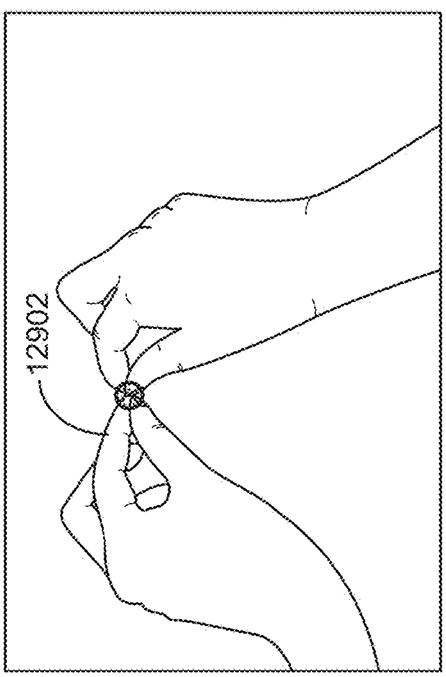
Figure 129B:
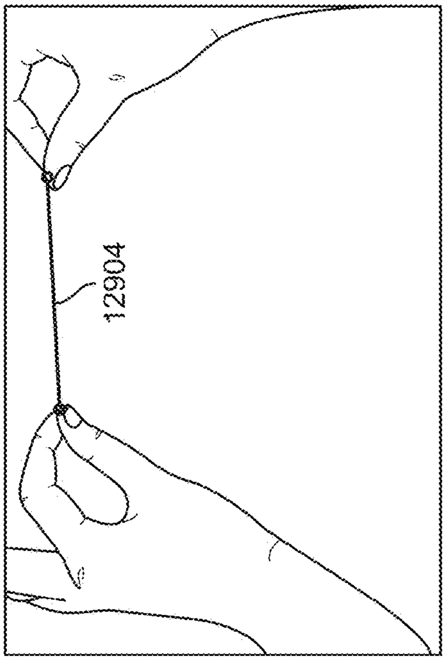

Referring now to FIG. 129A-131L, another embodiment of user interface interaction is illustrated. As shown in FIG. 129A, the user may, through a recognized hand gesture 12902 (e.g., index and thumb of one hand proximate to index and thumb of other hand) cause a virtual string 12904 to the rendered to the user. The virtual string, as shown in FIG. 129B may be elongated to any length desired by the user. For example, if the user wishes to view a lot of applications, the string may be pulled out to become a longer virtual string. Or, if the string is pulled out only to a smaller amount, fewer applications may be populated. The length of the virtual string 13104 may be populated so as to as mimic the motion of the user's hands.

Figure 129C:
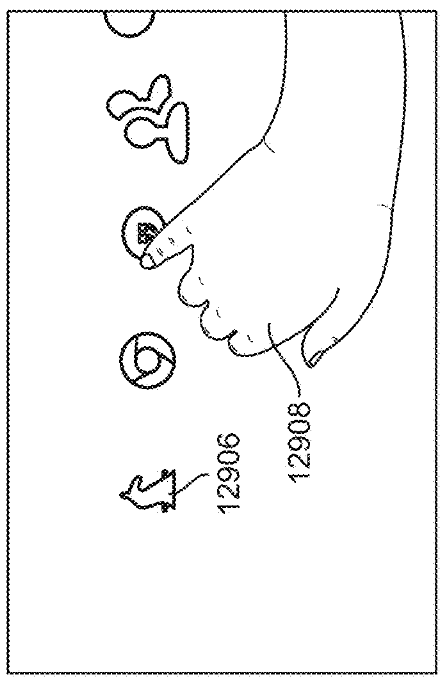

As shown in FIG. 129C, the various virtual icons 12906 may be populated on the string, similar to a clothesline, and the user may simply with a hand gesture 12908, move the icons around such that the icons are moved with respect to the user's hand. For example, the user may scroll through the virtual icons by swipe his hand to the right, causing the virtual icons to also move accordingly to the right, as shown in FIG. 129C.

Figure 129D:
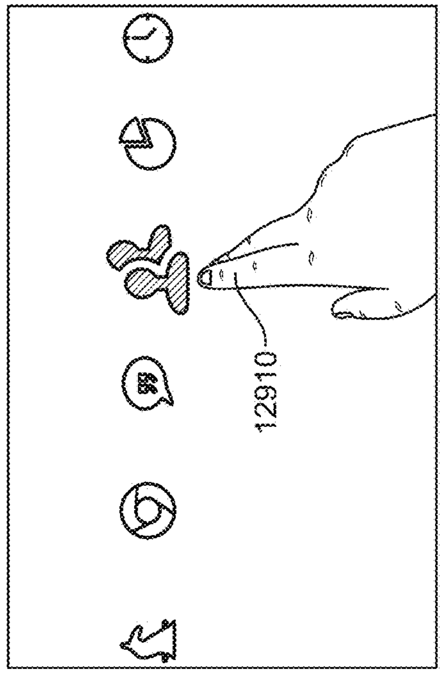
Figure 129E:
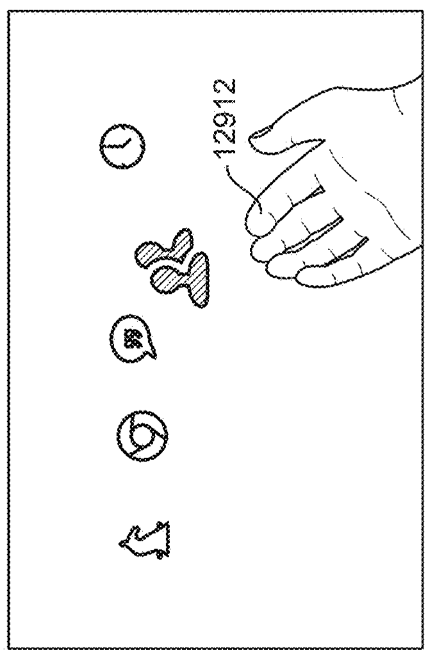
Figure 129F:
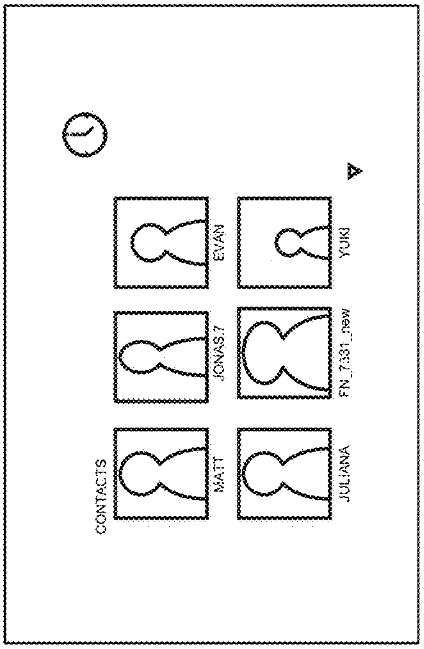
Figure 129G:
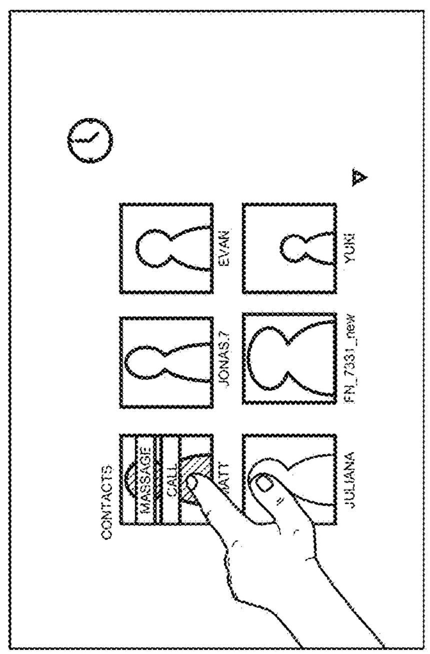
Figure 129H:
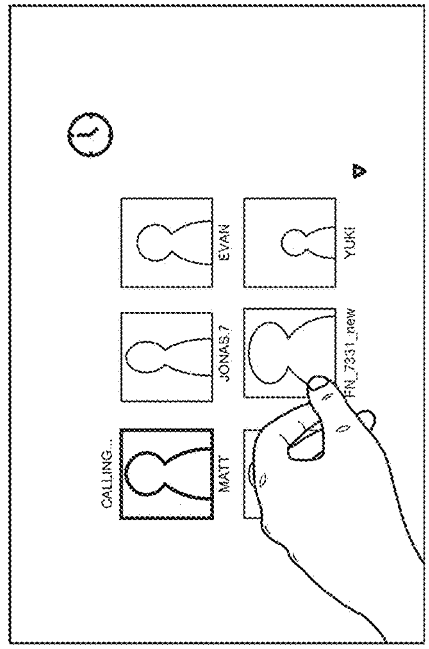
Figure 129I:
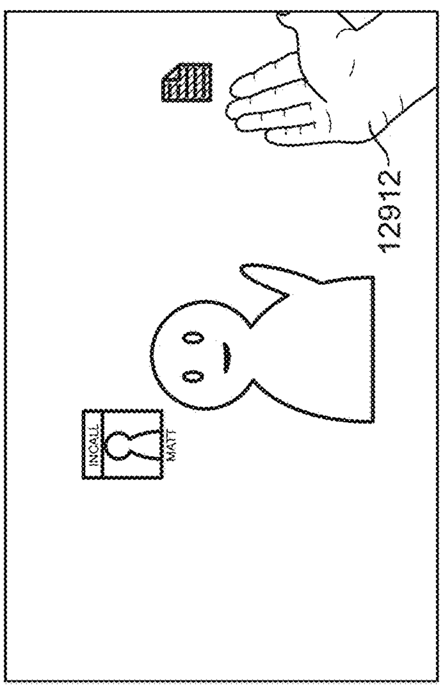

The user may then select a particular icon through another gesture 12910 (e.g., pointing two fingers at a particular virtual icon), as shown in FIG. 129D. Referring now to FIG. 129E, the "contacts" application may be selected, as denoted by the colored indicator on the virtual icon. In one or more embodiments, the selection of a particular virtual icon may cause the virtual icon or page to move in the z direction by a hand gesture 12912 that makes the virtual icon come toward the user or go farther away from the user. As shown in FIGS. 129F-129H, once the contacts application has been opened, the user may browse through the contacts and select a contact to call. As shown in FIG. 129G, the user may have selected "Matt" from the contacts, and may initiate a call (FIG. 129H).

Figure 129J:
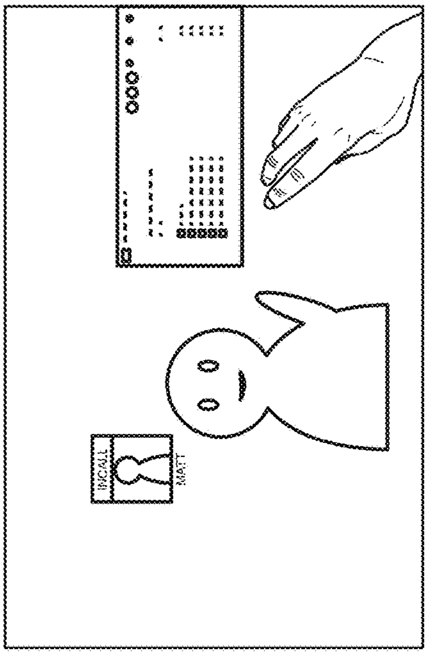
Figure 129K:
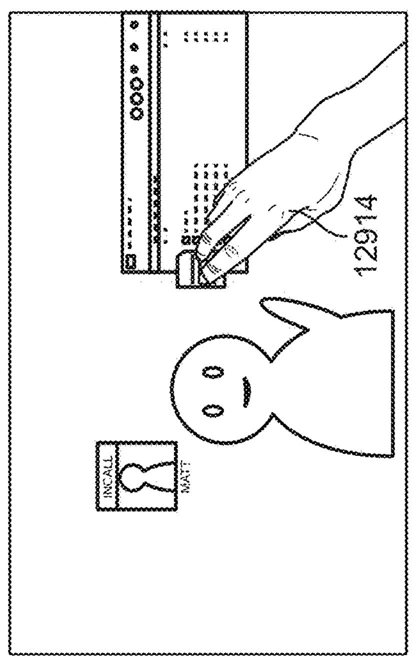
Figure 129L:
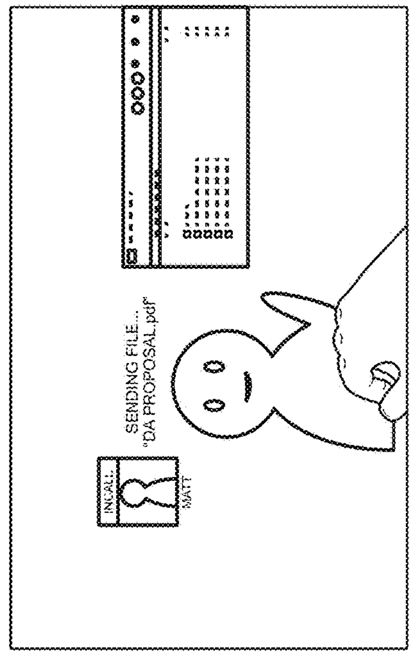

As shown in FIG. 129L, when the user is talking to the contact, the user may simultaneously be able to open up other applications. For example, the user may, through another hand gesture 12912 open up a particular document, and "send" it to the contact, by physically moving, with another hand gesture 12914, the document over to the contact icon, as shown in FIG. 129J-129L. Thus, the user can seamlessly send files to other users by simple hand gestures. In the AR system, the user is able to touch and hold documents, webpages, etc. as 3D virtual objects that can be flung into space, moved around, and physically manipulated as if they were real objects. FIG. 129M shows detailed input controls 12916 that may be used to interact with the user interface. As shown in FIG. 129M, various gestures may be used for user input behaviors. As shown in FIG. 129M, some types of actions may be based on a location of virtual content, while others may be agnostic to virtual content.

Pull Strings

Figure 130A:
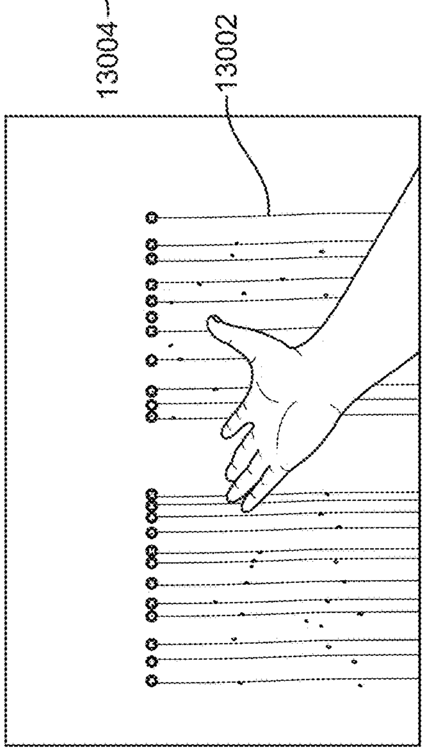
Figure 130B:
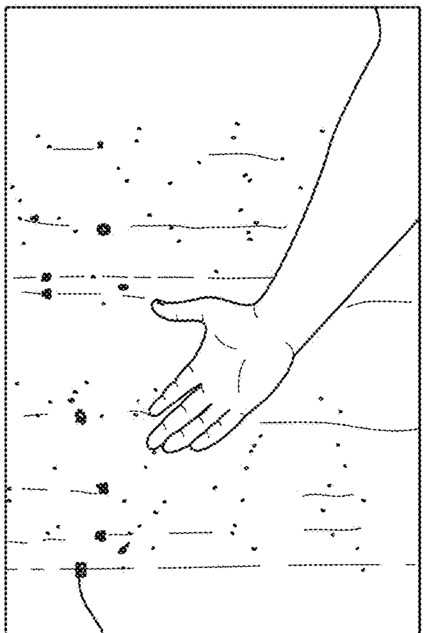
Figure 130C:
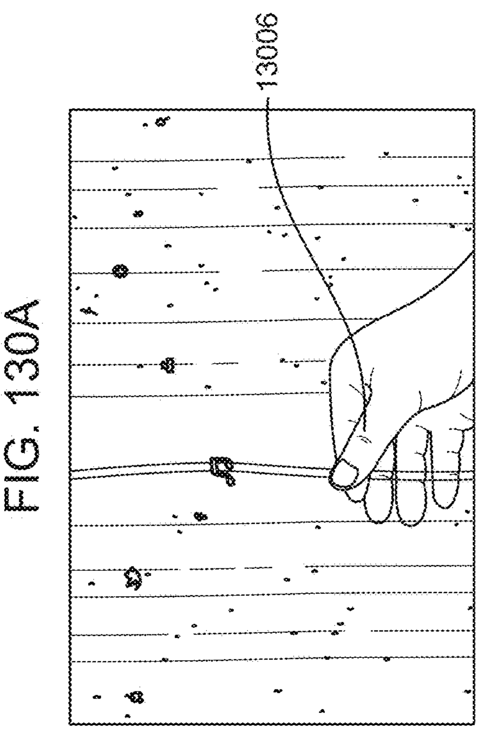
Figure 130D:
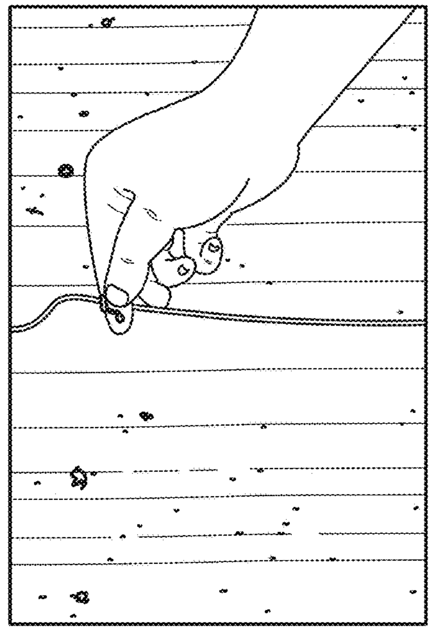

In another embodiment, the various virtual icons may be rendered as suspended virtual strings 13002. Each string may represent a different virtual icon of an application or a category of application, as shown in FIG. 130A-130C. To select a particular virtual icon 13004, the user may tug (e.g., through a tugging gesture 13206) on a virtual string, as shown in FIGS. 130C and 130D. The tugging motion 13006 may "pull" the string down" such that the user may view the sub-categories or different icons of a particular application.

Figure 130E:
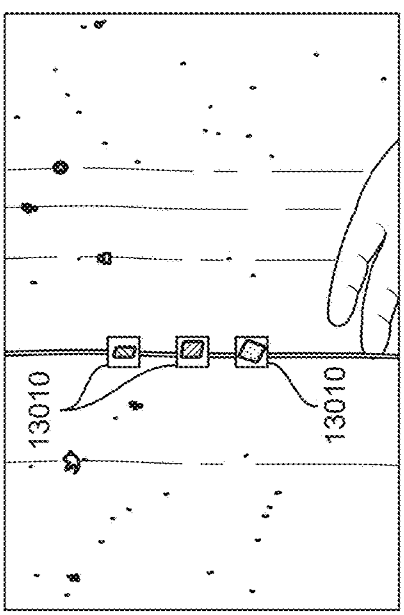
Figure 130F:
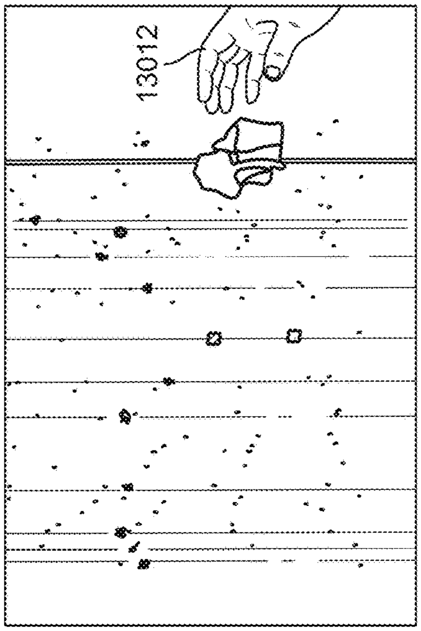
Figure 130G:
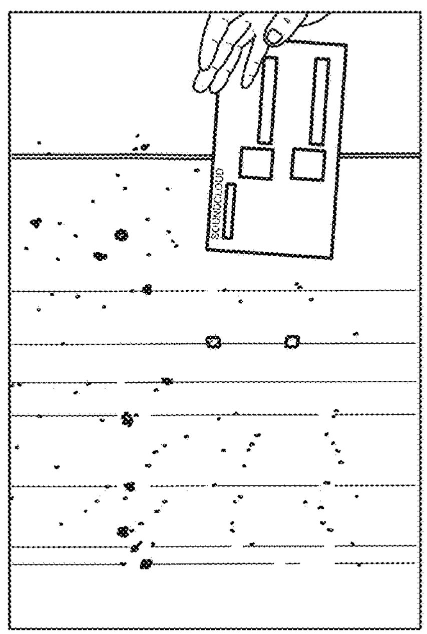

Here, as shown in FIGS. 130D and 130E, the user may have selected a music application, and the various icons 13010 shown in FIG. 130E may represent various tracks. The user may then select a particular track, as shown in FIGS. 130F and 130F to open up the page and view details about the track, or a webpage associated with the track, for example. In the illustrated embodiment, a clasping motion 13012 may be used to select a particular track of interest.

Figure 130H:
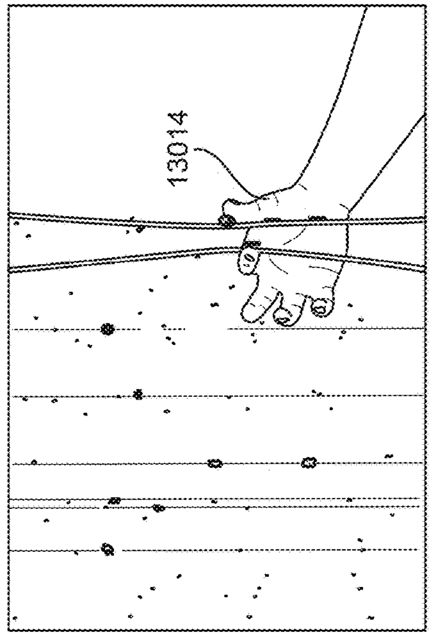

The user may further be able to pass on the track or the webpage to other users/friends, simply by pressing the virtual icon (e.g., through a pressing gesture 13014) associated with the track or music file with another icon representative of the user's friends, as shown in FIG. 130H. Thus, by detecting a pressing motion, the AR system may recognize the input intended by the user and initiate the transfer process of the file to the AR system of the user's friend. FIG. 130I shows detailed input controls 13020 that may be used to interact with the user interface. As shown in FIG. 130I, various gestures may be used for user input behaviors. As shown in FIG. 130I, some types of actions may be based on a location of virtual content, while others may be agnostic to virtual content.

Spider Web

Figure 131A:
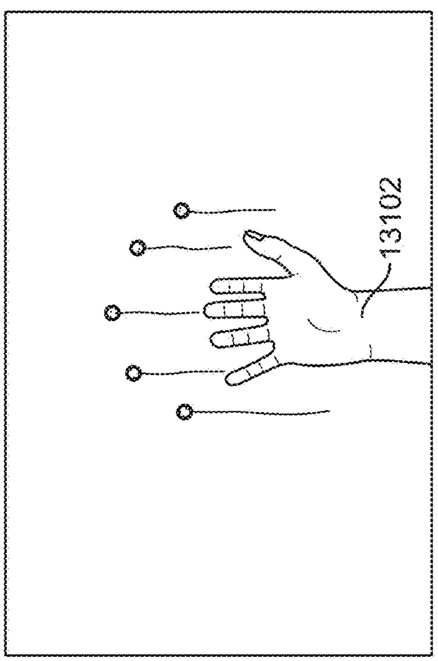
Figure 131B:
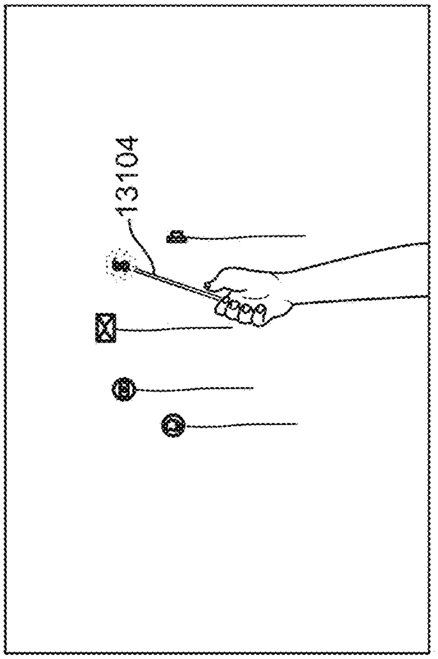
Figure 131C:
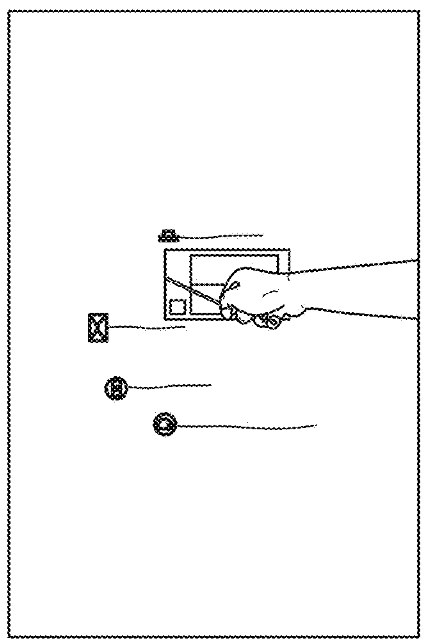
Figure 131D:
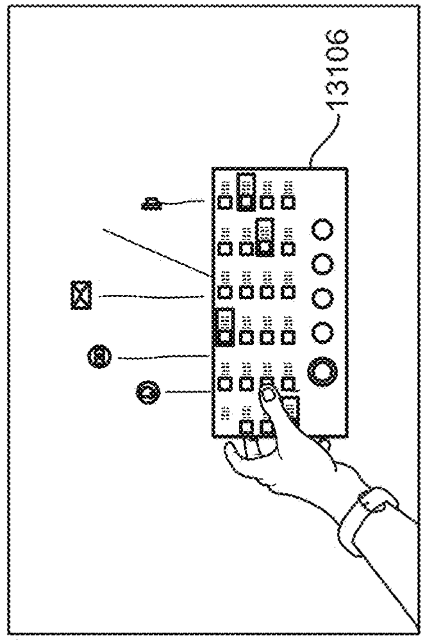

In another embodiment, the user interaction with the system may be through virtual "spiderwebs" created in the physical space around the user. For example, as shown in FIG. 131A, the user, may make a first and open it up 13102 such that virtual spider web strings are flung across space (FIG. 131B). To select a particular virtual icon/application/category of application, the user may pull along the spider web string 13104 to pull the virtual icon closer to him/her (FIG. 131C-131D). In the illustrated embodiment of FIG. 131D, the web page 13106 has been populated for closer view.

Figure 131E:
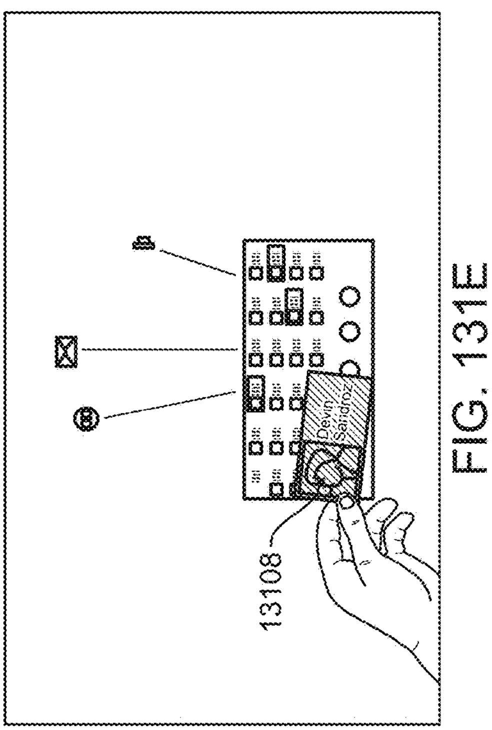
Figure 131F:
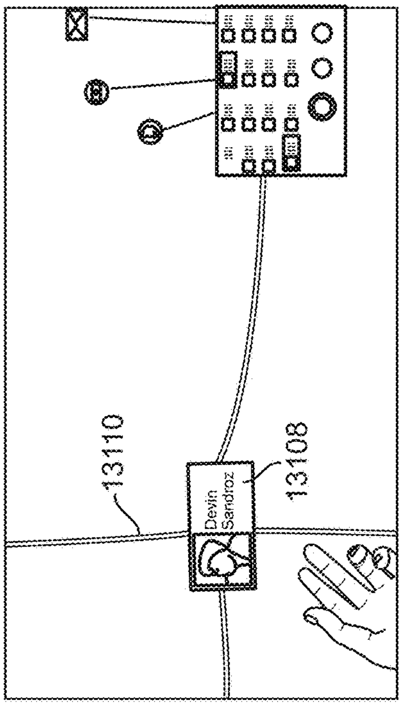
Figure 131G:
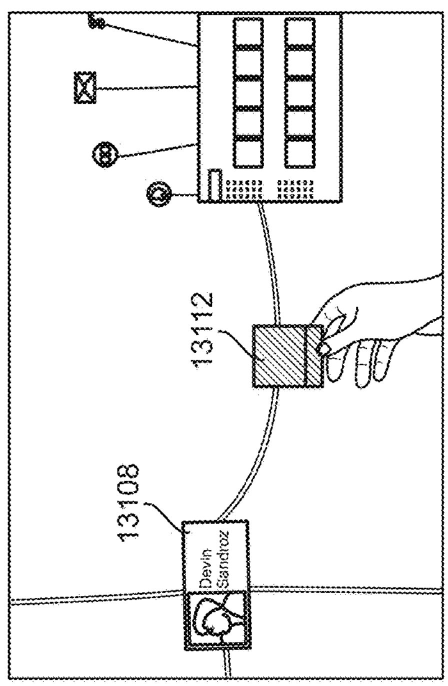
Figure 131H:
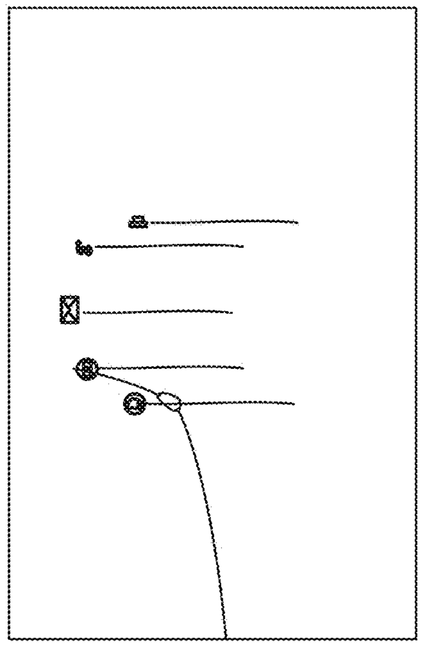

Referring to FIG. 131E, the user may then select, from the webpage 13106, a particular contact 13108, for example, and store the contact on a string of the spider web 13110 (FIGS. 131E and 131F). Similar to the other embodiments above, the user may pass a document 13112, to the selected user 13108, as shown in FIGS. 131G and 131 H, through the virtual string 13110. As shown in FIG. 131H, the transfer process is underway, and the file is being transferred to the contact. FIG. 131I shows detailed input controls 13120 that may be used to interact with the user interface. As shown in FIG. 131I, various gestures may be used for user input behaviors. As shown in FIG. 131I, some types of actions may be based on a location of virtual content, while others may be agnostic to virtual content.

As shown in the above embodiment, the user interface of the AR system allows the user to interact with the system in innovative and playful ways that enhance the user experience with the AR system. It should be appreciated that other gaming techniques may be similarly used or programmed into the system.

Referring now to FIG. 132, example embodiments demonstrating a relationship between virtual content and one or more physical objects are illustrated. As shown in 13202, a virtual object may be floating. An object may be floating when it has no relationship to other physical surfaces or objects. This appearance may be a room centric treatment of the content, allowing the user to view the virtual object from all angles.

Similarly, as shown in 13204, content may be applied to a physical surface like a wall, cup or a person's arm, as was the case in several embodiments discussed above. The virtual content may take on some of the physical qualities of that surface. For example, if the virtual object is on a piece of real paper, and the real paper is lifted, the virtual object may also be lifted up. Or, in another embodiment if the paper falls on the ground, the virtual object may also fall, mimicking a gravitational pull. This may also provide the user with a physical sense of touch when interacting with the content.

In other embodiments, virtual content may be anchored, as was the case with some embodiments described above. This appearance type combines elements of floating and applied objects. The virtual content may be anchored to a specific surface as shown in 13206, following the behaviors and actions of that surface (e.g., Spider web user interface experience, Pivot user interface experience, etc.).

Alternatively, as shown in 13208, the virtual content may simply be "assigned" to a physical object such that it is no longer visible. For example, a document (denoted by a virtual document icon) may simply be assigned to a physical object, but the virtual icon may disappear as soon as the transfer process is complete. This may be a way by which the user can quickly navigate through content without necessarily visualizing every step. User scenarios Prior to discussing other specific applications and/or user scenarios, an example process of receiving and updating information from the passable world model will be briefly discussed. The passable world model, discussed above, allows multiple users to access the virtual world stored on a cloud server and essentially pass on a piece of the user's world to one or more peers.

For example, similar to other examples discussed above, a first user of an AR system in London may wish to partake in a conference with a second user of the AR system currently located in New York. The passable world model may allow the first user to pass on a piece of the passable world that constitutes the current physical surroundings of the first user to the second user, and similarly pass on a piece of the passable world that constitutes an avatar of the second user such that the second user appears to be in the same room as the first user in London.

In other words, the passable world allows the first user to transmit information about the room to the second user, and simultaneously allows the second user to create an avatar to place himself/herself in the physical environment of the first user. Thus, both users are continuously updating, transmitting and receiving information from the cloud, giving both users the experience of being in the same room at the same time.

Referring to FIG. 143, an example process 14300 of how data is communicated back and forth between two users located at two separate physical locations is disclosed. It should be appreciated that each input AR system (e.g., having sensors, cameras, eye tracking, audio, etc.) may have a process similar to the one below. For illustrative purposes, the input of the following system may be input from the cameras, but any other input device of the AR system may be similarly used.

In step 14302, the AR system may check for input from the cameras. For example, following the above example, the user in London may be in a conference room, and may be drawing some figures on the white board. This may or may not constitute input for the AR system. Since the passable world is constantly being updated and built upon data received from multiple users, the virtual world existing on the cloud becomes increasingly precise, such that only new information needs to be updated to the cloud.

For example, if the user simply moved around the room, there may already have been enough 3D points, pose data information, etc. such that the AR device of the user in New York is able to project the conference room in London without actively receiving new data from the user in London. However, if the user in London is adding new information, such as drawing a figure on the board in the conference room, this may constitute input that needs to be transmitted to the passable world model, and passed over to the user in New York. Thus, in step 14304, the user device checks to see if the received input is valid input. If the received input is not valid, there is wait loop in place such that the system simply checks for more input 14302

If the input is valid, the received input is fed to the cloud server in step 14306. For example, only the updates to the board may be sent to the server, rather than sending data associated with all the points collected through the FOV camera.

On the cloud server, in step 14308, the input is received from the user device, and updated into the passable world model in step 14310. As discussed with respect to the system architectures described above, the passable world model on the cloud server may comprise processing circuitry multiple databases (including a mapping database 14334 with both geometric and topological maps), object recognizers 14332 and other suitable software components.

In step 14320, based on the received input 14308, the passable world model is updated. The updates may then be sent to various user devices that may need the updated information, in step 14312. Here, the updated information may be sent to the user in New York such that the passable world that is passed over to the user in New York can also view the first user's drawing as a picture is drawn on the board in the conference room in London.

It should be appreciated that the second user's device may already be projecting a version of the conference room in London, based on existing information in the passable world model, such that the second user in New York perceives being in the conference room in London. In step 14326, the second user device receives the update from the cloud server. In step 14328, the second user device may determine if the update needs to be displayed. For example, certain changes to the passable world may not be relevant to the second user and may not be updated.

In step 14330, the updated passable world model is displayed on the second user's hardware device. It should be appreciated that this process of sending and receiving information from the cloud server is performed rapidly such that the second user can see the first user drawing the figure on the board of the conference room almost as soon as the first user performs the action.

Similarly, input from the second user is also received in steps 14320-14324, and sent to the cloud server and updated to the passable world model. This information may then be sent to the first user's device in steps 14314-14318. For example, assuming the second user's avatar appears to be sitting in the physical space of the conference room in London, any changes to the second user's avatar (which may or may not mirror the second user's actions/appearance) may also be transmitted to the first user, such that the first user is able to interact with the second user.

In one example, the second user may create a virtual avatar resembling the user, or the avatar may take the form of a bee that hovers around the conference room in London. In either case, inputs from the second user (for example, the second user may shake his head in response to the drawings of the first user), are also transmitted to the first user such that the first user can gauge the second user's reaction. In this case, the received input may be based on facial recognition and changes to the second user's face may be sent to the passable world model, and then passed over to the first user's device such that the change to the avatar being projected in the conference room in London is seen by the first user.

Similarly, there may be many other types of input that are effectively passed back and forth between multiple users of the AR system. Although the particular examples may change, all interactions between a user of the AR system and the passable world is similar to the process described above, with reference to FIG. 143. While the above process flow diagram describes interaction between multiple users accessing and passing a piece of the passable world to each other, FIG. 144 is an example process flow diagram 14400 illustrating interaction between a single user and the AR system. The user may access and interact with various applications that require data retrieved from the cloud server.

In step 14402, the AR system checks for input from the user. For example, the input may be visual, audio, sensory input, etc. indicating that the user requires some type of data. For example, the user may wish to look up information about an advertisement he may have just seen on a virtual television. In step 14404, the system determines if the user input is valid. If the user input is valid, in step 14406, the input is fed into the server. On the server side, when the user input is received in step 14408, appropriate data is retrieved from a knowledge base 14440 in step 4410. As described above, there may be multiple knowledge databases connected to the cloud server from which to retrieve data. In step 14412, the data is retrieved and transmitted to the user device requesting data.

Back on the user device, the data is received from the cloud server in step 14414. In step 14416, the system determines when the data needs to be displayed in the form of virtual content, and if it does, the data is displayed on the user hardware 14418.

As discussed briefly above, many user scenarios may involve the AR system identifying real-world activities and automatically performing actions and/or displaying virtual content based on the detected real-world activity. For example, the AR system recognizes the user activity and then creates a user interface that floats around the user's frame of reference providing useful information/virtual content associated with the activity. Similarly, many other uses can be envisioned, some of which will be described in user scenarios below.

Having described the optics and the various system components of the AR system, some further applications of the AR system will now be discussed. The applications described below may have hardware and/or software components that may be separately installed onto the system, in some embodiments. In other embodiments, the system may be used in various industries, etc. and may need to be modified to achieve some of the embodiments below. It should be appreciated that the following embodiments are simplified for illustrative purposes and should not be read as limiting; and many more complex embodiments may be envisioned.

Privacy

Since the AR system may continually capture data from a user's surroundings, there may be concerns of privacy. For example, the user wearing the AR device may walk into a confidential meeting space, or may be exposed to sensitive content (e.g., nudity, sexual content, etc.). Thus, it may be advantageous to provide one or more mechanisms to help ensure privacy while using the AR system.

In one implementation, one or more components of the AR system may include a visual indicator that indicates when information is being collected by the AR system. For example, a head worn or mounted component may include one or more visual indicators (e.g., LEDs) that visually indicate when either visual and/or audio information is being collected. For instance, a first LED may be illuminated or may emit a first color when visual information is being collected by cameras carried by the head worn component. A second LED may be illuminated or may emit a second color when visual information is being collected by microphones or audio transducers carried by the head worn component.

Additionally or alternatively, the AR system may be responsive to defined gestures from any person in a field of view of a camera or other optical sensor of the AR system. In particular, the AR system may selectively stop capturing images in response to detecting the defined gesture. Thus, a person in the field of view of the AR user can selectively cause the AR system to stop capturing images simply be executing a gesture (e.g., hand gesture, arm gesture, facial gesture, etc.). In one or more embodiments, the AR system may be responsive to gestures of the person wearing the AR device. In other embodiments, the AR system may be responsive to gestures of others in a physical space or environment shared with the person wearing the AR system.

In yet another embodiment, for privacy purposes, the user may register with an application associated with the AR system. This may allow the user more control as to whether to be captured/stored by images/videos and renderings of other users of the system. A user registered with the AR system (or application associated with the AR system) may have more privacy control than one who does not have an account with the system.

For example, if a registered user does not wish to be captured by other AR systems of other users, the system may, on recognizing the person, stop capturing images of that particular user, or alternatively, blur out visual images associated with the person. On the other hand, a person who has not registered with the AR system automatically has less control over privacy than one who has. Thus, there may be a higher incentive to register with the AR system (or associated application).

In another embodiment, the AR system may automatically implement safety controls based on a detected activity and/or recognized surroundings of the user. Because the AR system is constantly aware of the user's surroundings and activities (e.g., through the FOV cameras, eye cameras, sensors, etc.) the AR system may automatically go into a suspended mode when the AR system detects particular activities or surroundings. For example, if the AR system determines that the user is about to occupy a particular room in the house (e.g., bathroom, child's room, a pre-designated confidential area, etc.), the AR system may automatically go into a suspended mode, and terminate capture of information, or selectively capture only basic information from the user's AR system. Or, if the AR system determines that the user is engaged in a particular activity (e.g., driving, etc.), the AR system may automatically go into the suspended or "off" mode so as to not distract the users by any incoming messages or virtual content. Similarly, many other safety and/or privacy controls may be implemented in other applications as well.

Specific Applications and Examples of Virtual Rooms/Spaces and User Interfaces

The following section will go through various examples and applications of virtual rooms and/or spaces, and utilizing the various embodiments of the AR systems discussed above in real-life practical applications.

As previously discussed, an AR system may include one, or typically more, instances of individual AR systems. These individual AR systems typically include at least a head worn or head mounted component, which provides at least a visual augmented reality user experience, and typically an aural augmented reality experience. As discussed in detail above, the AR systems also typically include a processor component. The processor component may be separate and distinct from the head worn or mounted component, for example a belt pack which is communicatively coupled (e.g., tethered, wireless) to the head worn or mounted component (e.g., FIGS. 4A-4D).

As also previously discussed, the AR system may optionally include one or more space or room based sensor systems (e.g., FIG. 26). The space or room based sensor system may include one or more image capturing devices (e.g., cameras). Cameras may be located to monitor a space, for instance a room. For example, cameras may be positioned in a number of corners in the room. The cameras may, for example, be very similar or even identical in structure to the forward facing cameras of the head worn or mounted component. Thus, these cameras preferably capture 3D information, for instance as light field. The cameras of the space or room based sensor system device are typically fixed in space, in contrast to cameras of the head worn or mounted component. In one or more embodiments, there may be a space or room based sensor system for each of a plurality of spaces or rooms.

As also previously discussed, the AR system may employ a plurality of object recognizers, which recognizes objects (e.g., taxonomically recognition, and/or specific recognition). The AR system can recognize a space based on object recognition of the structure and/or contents of the space. Also, as previously discussed, the AR system may employ additional information, e.g., time, geographical coordinates (GPS location information), compass direction, wireless networks, etc.) to identify a space.

In one or more embodiments, the AR system may populate or render a virtual space (e.g., meta room) in a field of view of a user. For example, the individual AR systems may render or project virtual images to the retina of a user that impose on a user's view of a real world or physical space. Similarly, any other optical approach detailed above may be used.

The AR system may be used for a wide variety of everyday applications. The AR system may be used while the user is at work, and may even help enhance the user's work product. Also for example, the AR system may be used in training users (e.g., educational training, athletic training, job-related training, etc.). As a further example, the AR system may be used for entertainment (e.g., gaming). As yet a further example, the AR system may be used in assisting with exercise, for instance by providing instruction and/or motivation. For example, the AR system may render something for the user to chase (e.g., world class runner), or a virtual character chasing the user (e.g., a T-Rex).

In one or more embodiments, the AR system may comprise additional application-specific components. For example, the AR system may be communicatively coupled to one or more optional sensor(s) (e.g., pedometer, motion sensor(s), heart rate sensor(s), breathing rate sensor(s), perspiration sensor(s), etc.). In one or more embodiments, the AR system may present motivational content as a game (e.g., a secret agent themed game). The AR system may also employ various types of totems (or objects that may be used to provide user input, as will be described in further detail below). In other words, the AR system may be used to provide a wide variety of augmented reality experiences, and may be used to enhance everyday experiences and/or assist in everyday tasks. The following disclosure will go through a series of such applications and/or embodiments. It should be appreciated that the embodiments described below are for illustrative purposes only, and should not be read as limiting.

Rooms or Virtual Spaces

The following discussion addresses the concept of virtual rooms or virtual spaces. This discussion also addresses how a user navigates between virtual rooms or virtual spaces. In one or more embodiments, a user may access specific tools and/or applications when in a room virtual room or virtual space.

The AR system provides for dynamic room mapping. For example, the AR system may map virtual spaces to physical locations, physical rooms or other physical spaces. Mapping may be performed manually, semi-automatically, or automatically. The AR system provides a process for mapping and modifying a pre-existing room to a physical environment. The AR system provides a process for mapping multiple rooms in a physical space simultaneously. The AR system allows sharing, for example implementing co-located experiences. Also for example, the AR system allows sharing specific apps; sharing entire rooms, and/or making items public or private.

A number of example scenarios are discussed below. For example, a user may be working in a physical office space, and a message from co-worker may arrive, prompting a virtual alert to the user. In another example, a user located in his/her living room may select a virtual room or space, or may change his/her environment from a virtual entertainment or media room to a virtual workout room or virtual office space.

In another example, a user operating in one virtual room or space, may open or otherwise access a specific application associated with a different room or space. For instance, a user may open or access a camera application from an entertainment or media room. As will be evident from the discussion herein, the AR system may implement a large number of other scenarios.

A virtual room or virtual space is a convenient grouping or organization of virtual objects, virtual tools, applications, features and other virtual constructs (e.g., collectively virtual content), which are render-able in the field of vision of a user.

Virtual rooms or virtual spaces may be defined in one or more different ways. For example, virtual rooms or virtual spaces may be defined by: i) activity, goal or purpose; ii) location (e.g., work, home, etc.), iii) time of day, etc. Users may define or create virtual rooms or virtual spaces to support understanding, ease of use, and/or search efficiency. In one or more embodiments, virtual rooms and/or spaces may be custom-defined by the user.

In one or more embodiments, the AR system may provide a catalog or library of virtual rooms or virtual spaces that are predefined. For example, virtual rooms or spaces may be pre-populated with virtual content (e.g., virtual objects, virtual tools, and other virtual constructs, for instance applications, features, characters, text, digits, and other symbols) based on a theme. Themes may be activity-based, location-based, time-based, intelligence-based, etc.

The AR system provides a user interface that allows users to create or modify virtual rooms or virtual spaces, based on a set of preferences set by the user. The user may either design the room from scratch, or may modify or enhance a pre-defined virtual room or space. The virtual room may be modified by adding, removing or rearranging virtual content within the virtual room or space via a user interface of the wearable AR system.

Figure 74A:
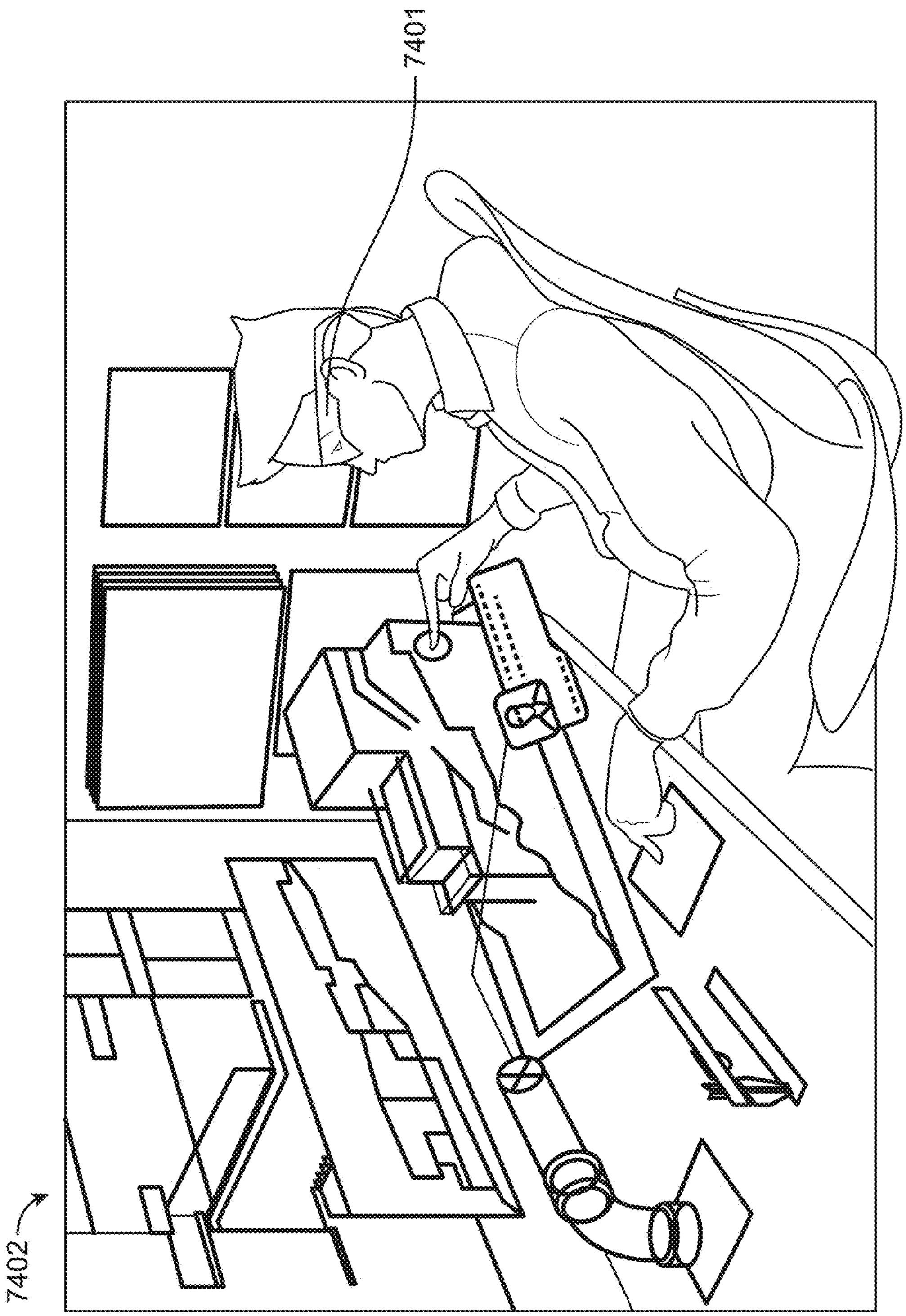
FIGS. 74A-74B illustrates an example office scenario of interacting with the AR system, according to one embodiment.

FIG. 74A shows a user sitting in a physical office space 7402, and using a wearable AR system 7401 to experience a virtual room or virtual space in the form of a virtual office, at a first time, according to one illustrated embodiment.

The physical office may include one or more physical objects, for instance walls, floor (not shown), ceiling (not shown), a desk and chair. As illustrated the AR system renders a virtual room 7402, in which the user may perform occupation-related tasks. Hence, the virtual office is populated with various virtual tools or applications useful in performing the user's job.

The virtual tools or applications may for example include various virtual objects or other virtual content, for instance two-dimensional drawings or schematics, two-dimensional images or photographs, and/or a three-dimensional architectural model, as shown in FIG. 74A. The virtual tools or applications may include tools such as a ruler, caliper, compass, protractor, templates or stencils, etc. The virtual tools or applications may for example include interfaces for various software applications (e.g., email, a Web browser, word processor software, presentation software, spreadsheet software, voicemail software, etc.).

As shown in FIG. 74A, some virtual objects may be stacked or overlaid with respect to one another. The user may select a desired virtual object with a corresponding gesture. For instance, the user may page through documents or images with a finger flicking gesture to iteratively move through the stack of virtual objects. Some of the virtual objects may take the form of menus, selection of which may cause rendering of a submenu. As shown in FIG. 74A, the user is shown a set of virtual content that the user may view through the AR device 7401. In the illustrated embodiment, the user may utilize hand gestures to build and/or enhance the virtual architectural model. Thus, rather than having to build a model from physical structures, the architectural model may simply be viewed and constructed in 3D, thereby providing a more realistic, and easily modifiable way of visualizing a structure.

Figure 74B:
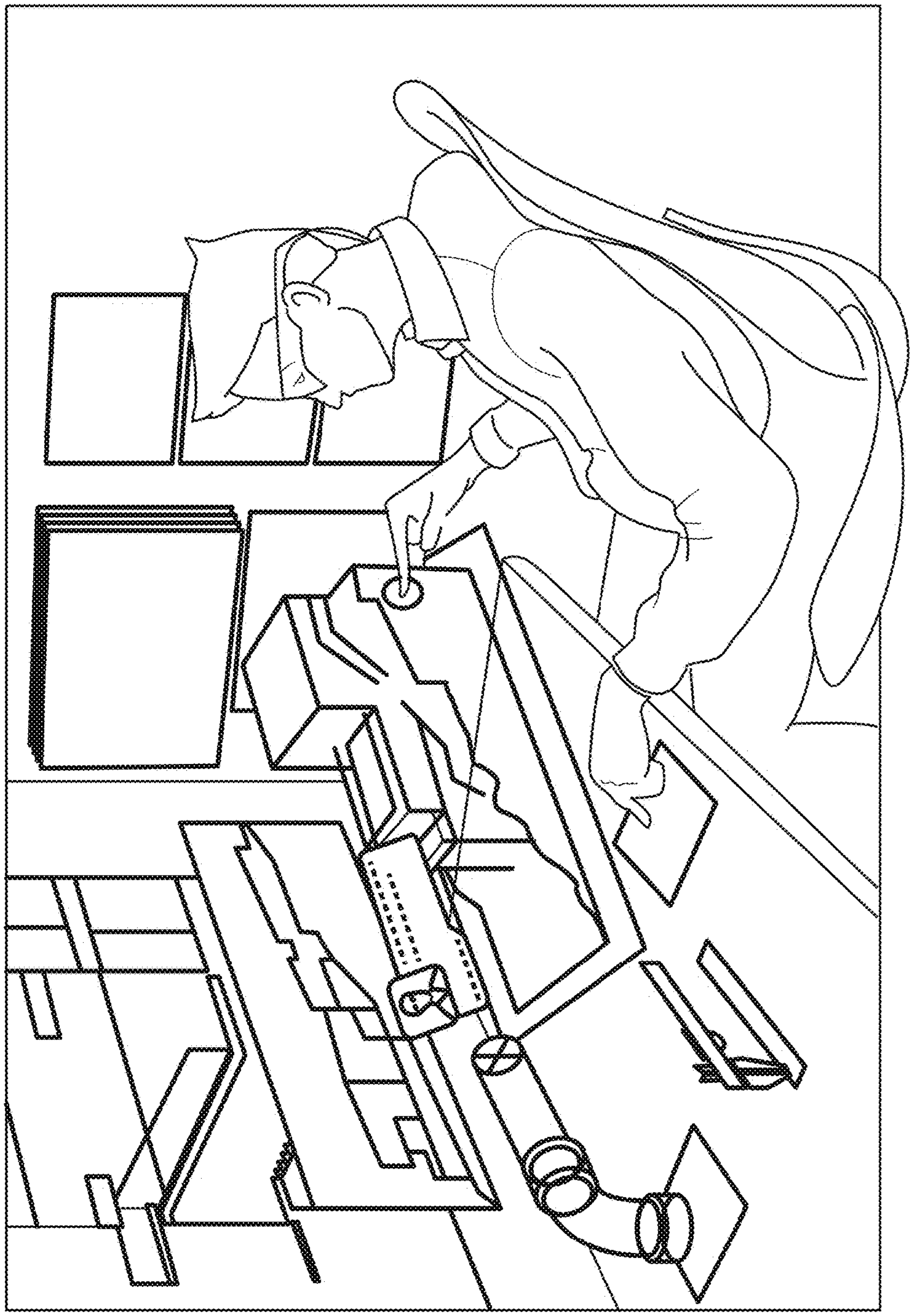

Referring now to FIG. 74B, the physical office of FIG. 74B is identical to that of FIG. 74A, and the virtual office of FIG. 74B is similar to the virtual office of FIG. 74A. Identical or similar elements are identified using the same reference numbers as in FIG. 74A. Only significant differences are discussed below.

As shown in FIG. 74B, the AR system may render a virtual alert or notification to the user in the virtual office. For example, the AR system may render a visual representation of a virtual alert or notification in the user's field of view. The AR system may additionally or alternatively render an aural representation of a virtual alert or notification.

Figure 75:
FIG. 75 illustrates an example scenario of interacting with the AR system in a house, according to one embodiment.

FIG. 75 illustrates another example virtual room according to one or more embodiments. As shown in the virtual room 7500 of FIG. 75, the user is wearing a wearable AR system 7501, and is experiencing one or more virtual elements in a physical living room. However, the living room is populated with one or more virtual elements, such as the virtual architectural model, similar to that of FIGS. 74A and 74B. For example, the user may be at home, but may want to work on the architectural model. Therefore, the user may have the AR system render a latest saved version of the architectural model on a physical table of the living room, such that the virtual architectural model sits on top of the table, as shown in FIG. 75.

The physical living room may include one or more physical objects, for instance walls, floor, ceiling, a coffee table and sofa. As FIGS. 74A-B and 75 illustrate, a virtual office may be portable, being renderable in various different physical environments. It thus may be particularly advantageous if the virtual office renders identically in a subsequent use to its appearance or layout as the virtual office appeared in a most previous use or rendering. Thus, in each subsequent use or rendering, the same virtual objects will appear and the various virtual objects may retain their same spatial positions relative to one another as in a most recently previous rendering of the virtual office.

In some implementations, this consistency or persistence of appearance or layout from one use to next subsequent use may be independent of the physical environments in which the virtual space is render. Thus, moving from a first physical environment (e.g., physical office space) to a second physical environment (e.g., physical living room) will not affect an appearance or layout of the virtual office.

Figure 76:
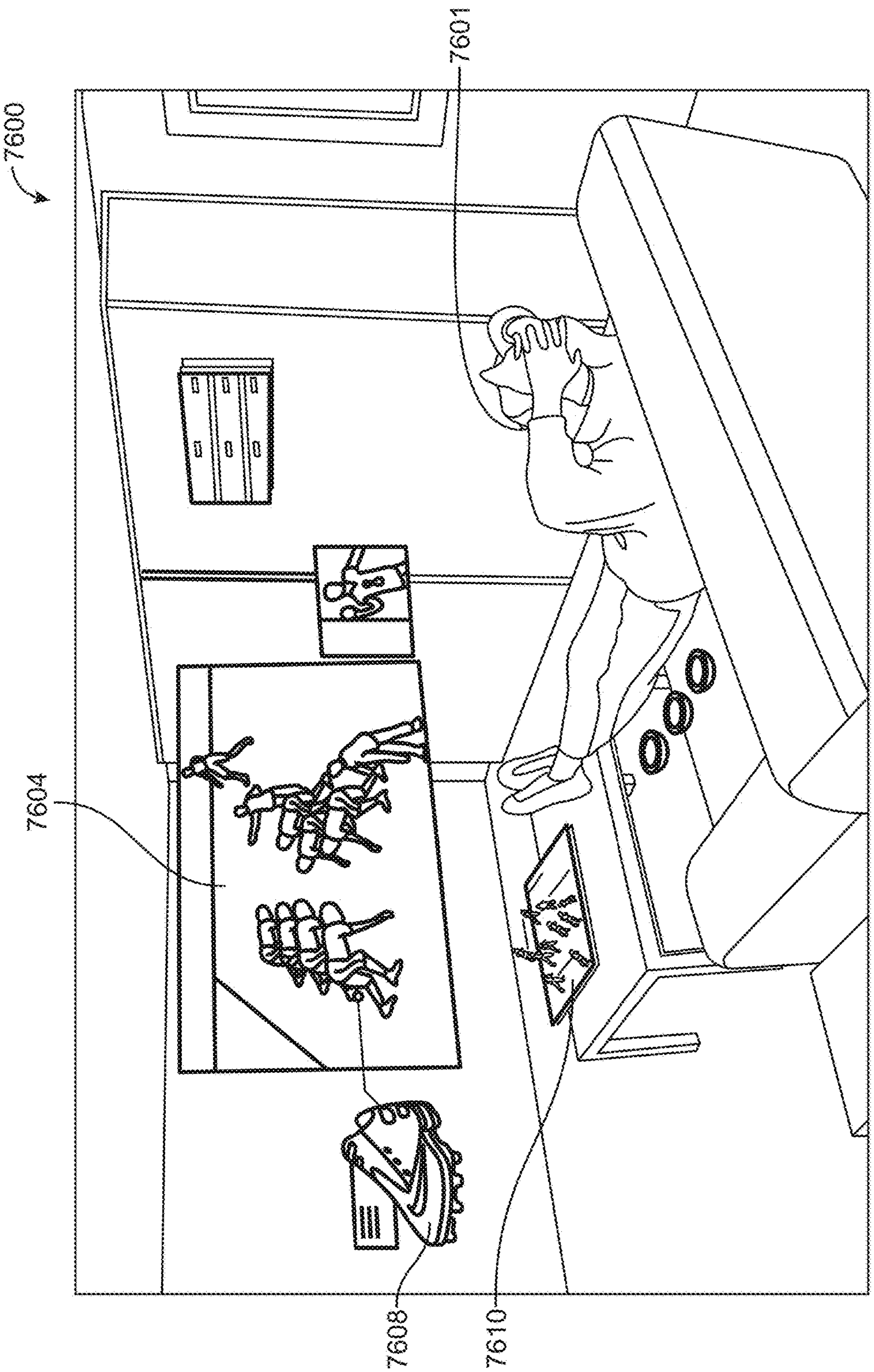
FIG. 76 illustrates another example scenario of interacting with the AR system in a house, according to one embodiment.

FIG. 76 shows another scenario 7600 comprising a user using a wearable AR system 7601. In the illustrated embodiment, the user is again in his/her own real living room, but is experiencing a few virtual elements (e.g., virtual TV screen 7604, virtual advertisement for shoes 7608, virtual mini-football game 7610, etc.). As shown in FIG. 76, the virtual objects are placed in relation to the real physical objects of the room (e.g., the desk, the wall, etc.).

The physical living room may include one or more physical objects, for instance walls, floor, ceiling, a coffee table and sofa. For simplicity, the physical living room is illustrated as being identical to that of FIG. 75. Hence, identical or similar elements are identified using the same reference numbers as in FIG. 75, and discussion of the virtual office will not be repeated in the interest of brevity.

As illustrated the AR system renders a virtual room or virtual space in the form of a virtual entertainment or media room, in which the user relaxes and/or enjoys entertainment or consumes media (e.g., TV programs, movies, games, music, reading, etc.). Hence, the virtual entertainment or media room is populated with various virtual tools or applications.

The AR system 7601 may render the virtual entertainment or media room with a virtual television or primary screen 7604. The virtual television or primary screen can be rendered to any desired size. The virtual television or primary screen could even extend beyond the confines of the physical room. The AR system may render the virtual television or primary screen to replicate any known or yet to be invented physical television.

Thus, the AR system may render the virtual television or primary screen to replicate a period or classic television from the 1950s, 1960, or 1970s, or may replicate any current television. For example, the virtual television or primary screen may be rendered with an outward appears of a specific make and model and year of a physical television. Also for example, the virtual television or primary screen may be rendered with the same picture characteristics of a specific make and model and year of a physical television. Likewise, the AR system may render sound to have the same aural characteristics as sound from a specific make and model and year of a physical television.

The AR system also renders media content to appear as if the media content was being displayed by the virtual television or primary screen. The media content may take any of a large variety for forms, including television programs, movies, video conference or calls, etc.

The AR system may render the virtual entertainment or media room with one or more additional virtual televisions or secondary screens. Additional virtual televisions or secondary screens may allow the user to enjoy second screen experiences.

For instance, a first secondary screen 7610 may allow the user to monitor a status of a fantasy team or player in a fantasy league (e.g., fantasy football league), including various statistics for players and teams.

Additionally or alternatively, the second screen 7610 may allow the user to monitor other activities, for example activities tangentially related to the media content on the primary screen.

For instance, the second screen 7610 may display a listing of scores in games from around a conference or league while the user watches one of the games on the primary screen. Also for instance, the second screen 7610 may display highlights from games from around a conference or league, while the user watches one of the games on the primary screen. One or more of the secondary screens may be stacked as illustrated FIG. 76, allowing a user to select a secondary screen to bring to a top, for example via a gesture. For instance, the user may use a gesture to toggle through the stack of secondary screens in order, or may use a gesture to select a particular secondary screen to bring to a foreground relative to the other secondary screens.

The AR system may render the virtual entertainment or media room with one or more three-dimensional replay or playback tablets. The three-dimensional replay or playback tablets may replicate in miniature, a pitch or playing field of a game the user is watching on the primary display, for instance providing a "God's eye view." The 3D dimensional replay or playback tablets may, for instance, allow the user to enjoy on-demand playback or replay of media content that appears on the primary screen.

This may include user selection of portions of the media content to be play backed or replayed. This may include user selection of special effects, for example slow motion replay, stopping or freezing replay, or speeding up or fast motion replay to be faster than actual time. For example, the user may use one or more gestures to add annotations marking a receiver's route during a replay of a play in a football game, or to mark a blocking assignment for a linemen or back.

The 3D replay or playback tablet may even allow a user to add a variation (e.g., different call) that modifies how a previous play being reviewed plays out. For example, the user may specify a variation in a route run by a receiver, or a blocking assignment assigned to a lineman or back. The AR system 7601 may use the fundamental parameters of the actual play, modifying one or more parameters, and then executing a game engine on the parameters to play out a previous play executed in an actual physical game but with the user modification(s).

For example, the user may track an alternative route for a wide receiver. The AR system may make no changes to the actions of the players, except the selected wide receiver, the quarterback, and any defensive players who would cover the wide receiver. An entire virtual fantasy play may be played out, which may even produce a different outcome than the actual play. This may occur, for example, during an advertising break or time out during the game.

This allows the user to test their abilities as an armchair coach or player. A similar approach could be applied to other sports. For example, the user may make a different play call in a replay of a basketball game, or may call for a different pitch in a replay of a baseball game, to name just a few examples. Use of a game engine allows the AR system to introduce an element of statistical chance, but within the confines of what would be expected in real games.

The AR system may render additional virtual content, for example 3D virtual advertisements. The subject matter or content of the 3D virtual advertisements 7608 may, for example, be based at least in part on the content of what is being played or watched on the virtual television or primary screen.

The AR system may render virtual controls. For example, the AR system may render virtual controls mapped in the user's field of vision so as to appear to be within arm's reach of the user.

The AR system allows users to navigate from virtual space to virtual space. For example, a user may navigate between a virtual office space (FIGS. 74A and 74B) and a virtual entertainment or media space (FIGS. 75 and 76). As discussed herein, the AR system may be responsive to certain user input to allow navigation directly from one virtual space to another virtual space, or to toggle or browse through a set of available virtual spaces. The set of virtual spaces may be specific to a user, specific to an entity to which a user belongs, and/or may be system wide or generic to all users.

To allow user selection of and/or navigation between virtual rooms or virtual spaces, the AR system may be responsive to one or more of, for instance, gestures, voice commands, eye tracking, and/or selection of physical buttons, keys or switches for example carried by a head worn component, belt pack or other physical structure of the individual AR system. The user input may be indicative of a direct selection of a virtual space or room, or may cause a rendering of a menu or submenus to allow user selection of a virtual space or room.

Figure 77:
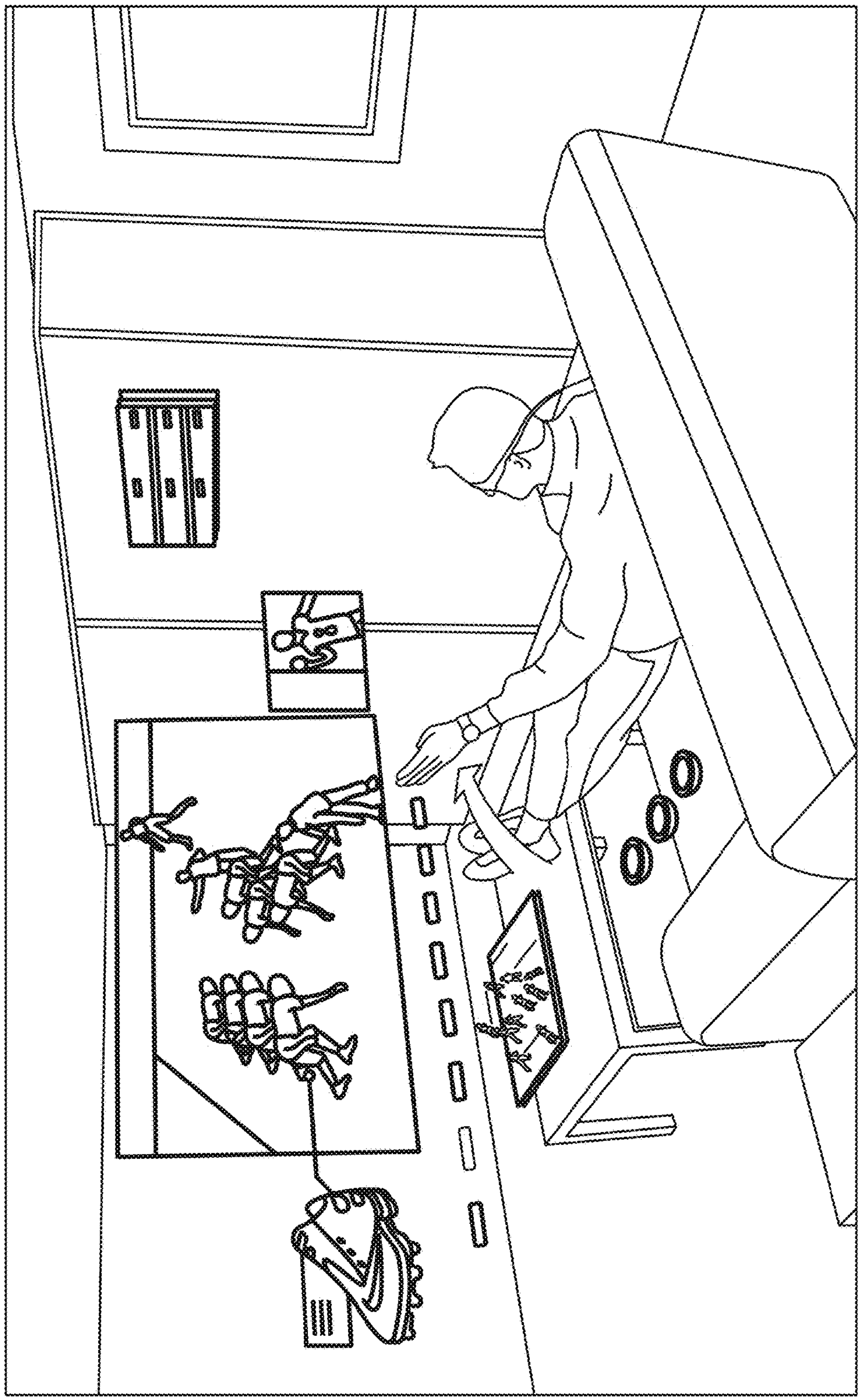
FIG. 77 illustrates another example scenario of interacting with the AR system in a house, according to one embodiment.

FIG. 77 shows another scenario 7700 in which the user is sitting in a physical living room space similar to the scenario of FIG. 76, and experiencing virtual elements in his living room. In the current embodiment, the user uses hand gestures to go through various virtual user interfaces, as denoted by the user's hand moving from left to right in a swiping motion.

As illustrated in FIG. 77, the AR system may render a user interface tool which provides a user with a representation of choices of virtual rooms or virtual spaces, and possibly a position of a currently selected virtual room or virtual space in a set of virtual room or virtual space available to the user. As illustrated, the representation takes the form of a line of marks or symbols, with each marking representing a respective one of the virtual rooms or virtual spaces available to the user. A currently selected one of the virtual rooms or virtual spaces is visually emphasized, to assist the user in navigating forward or backward through the set.

Figure 78A:
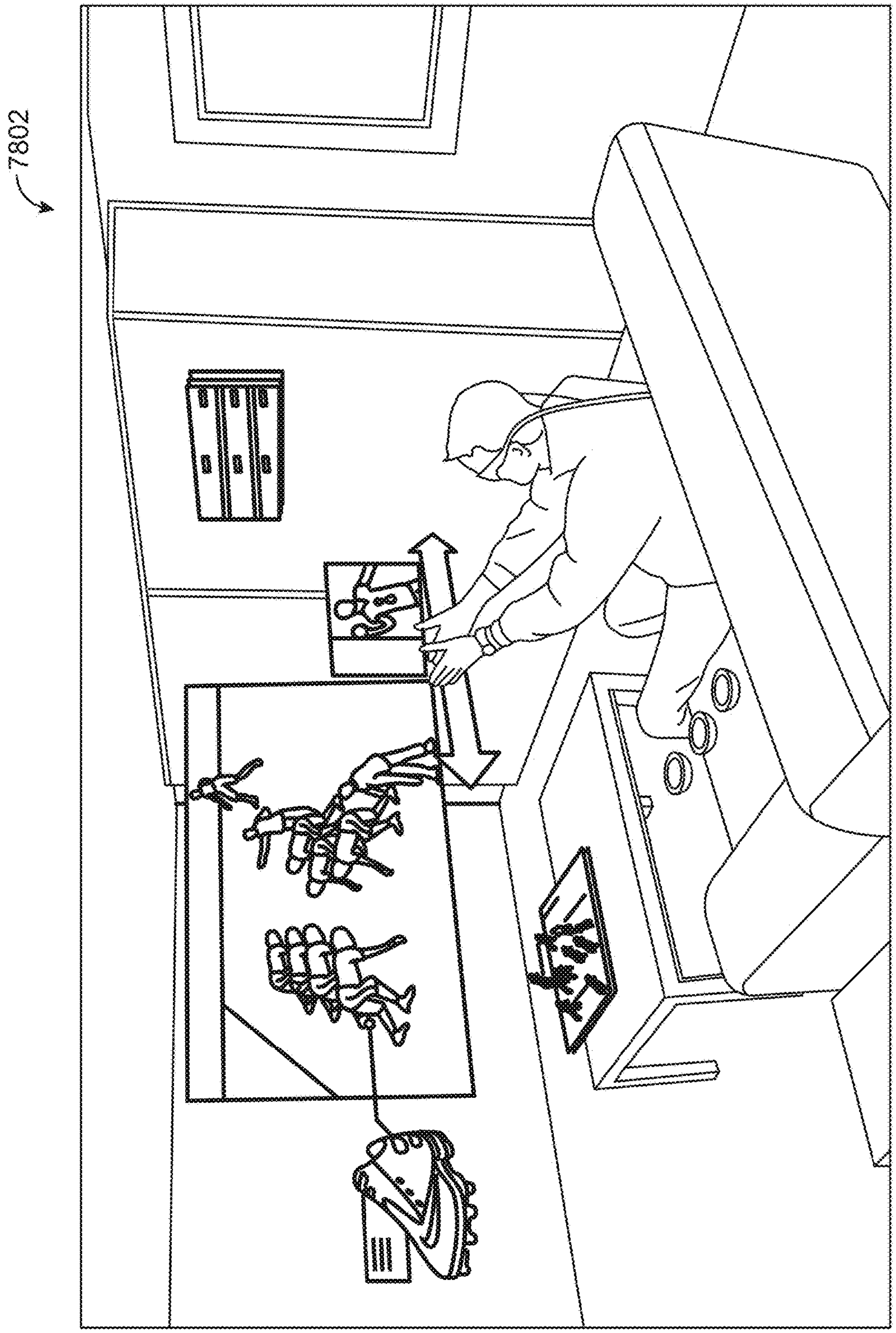
FIGS. 78A-78B illustrate yet another example scenario of interacting with the AR system in a house, according to one embodiment.
Figure 78B:
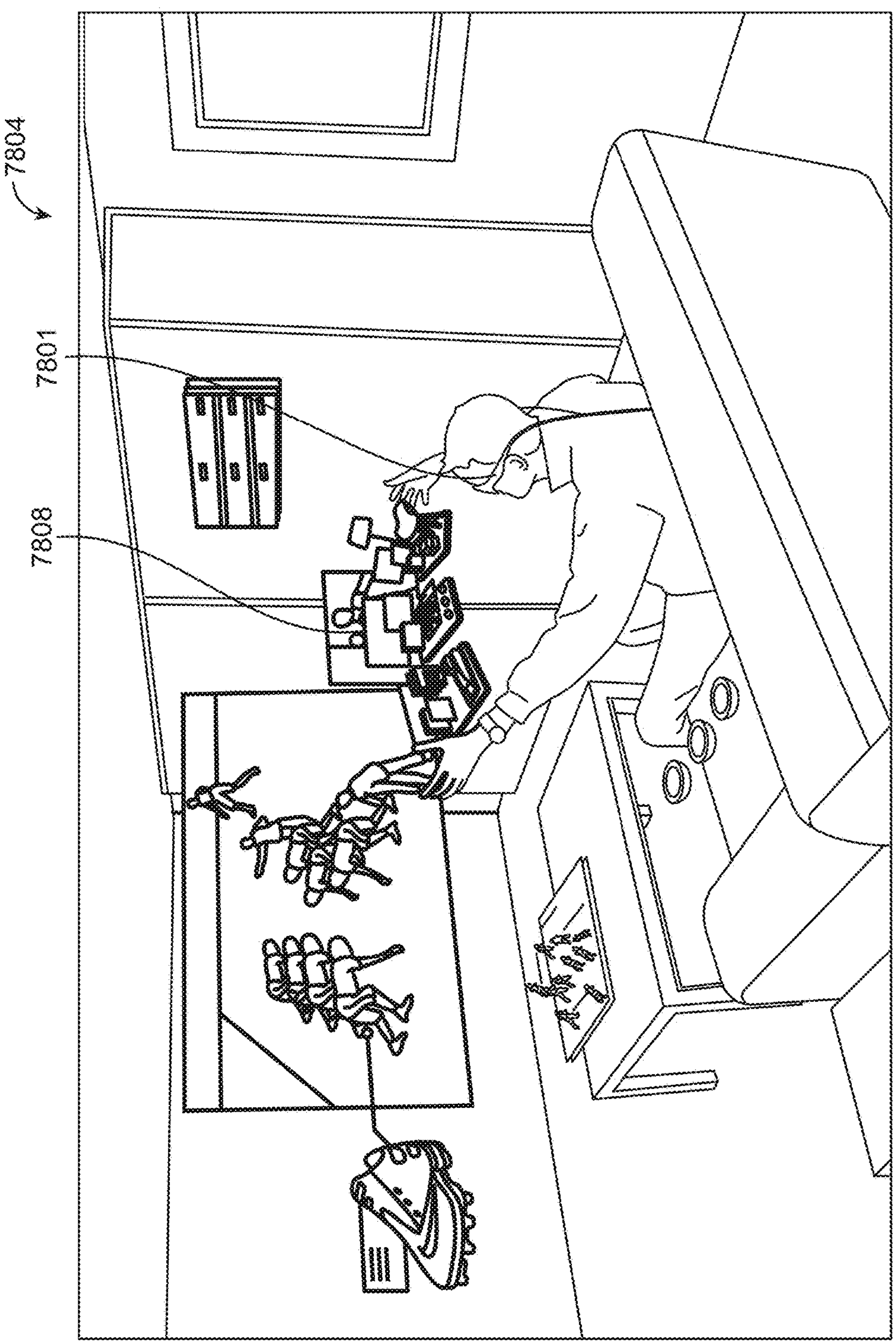

FIGS. 78A and 78B show similar scenarios 7802 and 7804 respectively. As shown in FIGS. 78A and 78B, the scene is set in the living room of the user wearing an AR system 7801, having a set of virtual elements (e.g., virtual screen, advertisement, etc.). Similar to the embodiment illustrated in FIG. 77, the user users hand gestures to interact with the AR system. As shown in FIG. 78A, the user moves both hands in a recognized gesture to open up additional functions, or applications. As shown in FIG. 78B, in response to the user's gestures, additional virtual interface elements (or "apps") may be rendered in the user's view.

As illustrated in FIG. 78A, the user executes a first gesture (illustrated by double headed arrow), to open an icon based cluster user interface virtual construct (FIG. 78B). The gesture may include movement of the user's arms and/or hands or other parts of the user's body, for instance head pose or eyes. Alternatively, the user may use spoken commands to access the icon based cluster user interface virtual construct (FIG. 78B). If a more comprehensive menu is desired, the user may use a different gesture. Although the above examples user hand gestures for illustrative purposes, any other type of user input may be similarly used (e.g., eye gestures, voice commands, totems, etc.).

As illustrated in FIG. 78B, the icon based cluster user interface virtual construct 7808 provides a set of small virtual representations of a variety of different virtual rooms or spaces from which a user may select. This virtual user interface 7808 may provide quick access to virtual rooms or virtual spaces via representations of the virtual rooms or virtual spaces. The small virtual representations are themselves essentially non-functional, in that they do not include functional virtual content. Thus, the small virtual representations are non-functional beyond being able to cause a rendering of a functional representation of a corresponding virtual room or space in response to selection of one of the small virtual representations.

The set of small virtual representations may correspond to a set or library of virtual rooms or spaces available to the particular user. Where the set includes a relatively large number of choices, the icon based cluster user interface virtual construct may, for example, allow a user to scroll through the choice. For example, in response to a second gesture, an AR system may re-render the icon based cluster user interface virtual construct with the icons shifted in a first direction (e.g., toward user's right), with one icon falling out of a field of view (e.g., right-most icon) and a new icon entering the field of view. The new icon corresponds to a respective virtual room or virtual space that was not displayed, rendered or shown in a temporally most immediately preceding rendering of the icon based cluster user interface virtual construct. A third gesture may, for example, cause the AR system to scroll the icons in the opposite direction (e.g., toward user's left).

In response to a user selection of a virtual room or virtual space, the AR system may render virtual content associated with the virtual room or virtual space to appear in the user's field of view. The virtual content may be mapped or "glued" to the physical space. For example, the AR system may render some or all of the virtual content positioned in the user's field of view to appear as if the respective items or instances of virtual content are on various physical surfaces in the physical space, for instance walls, tables, etc. Also for example, the AR system may render some or all of the virtual content positioned in the user's field of view to appear as if the respective items or instances of virtual content are floating in the physical space, for instance within reach of the user.

Figure 79A:
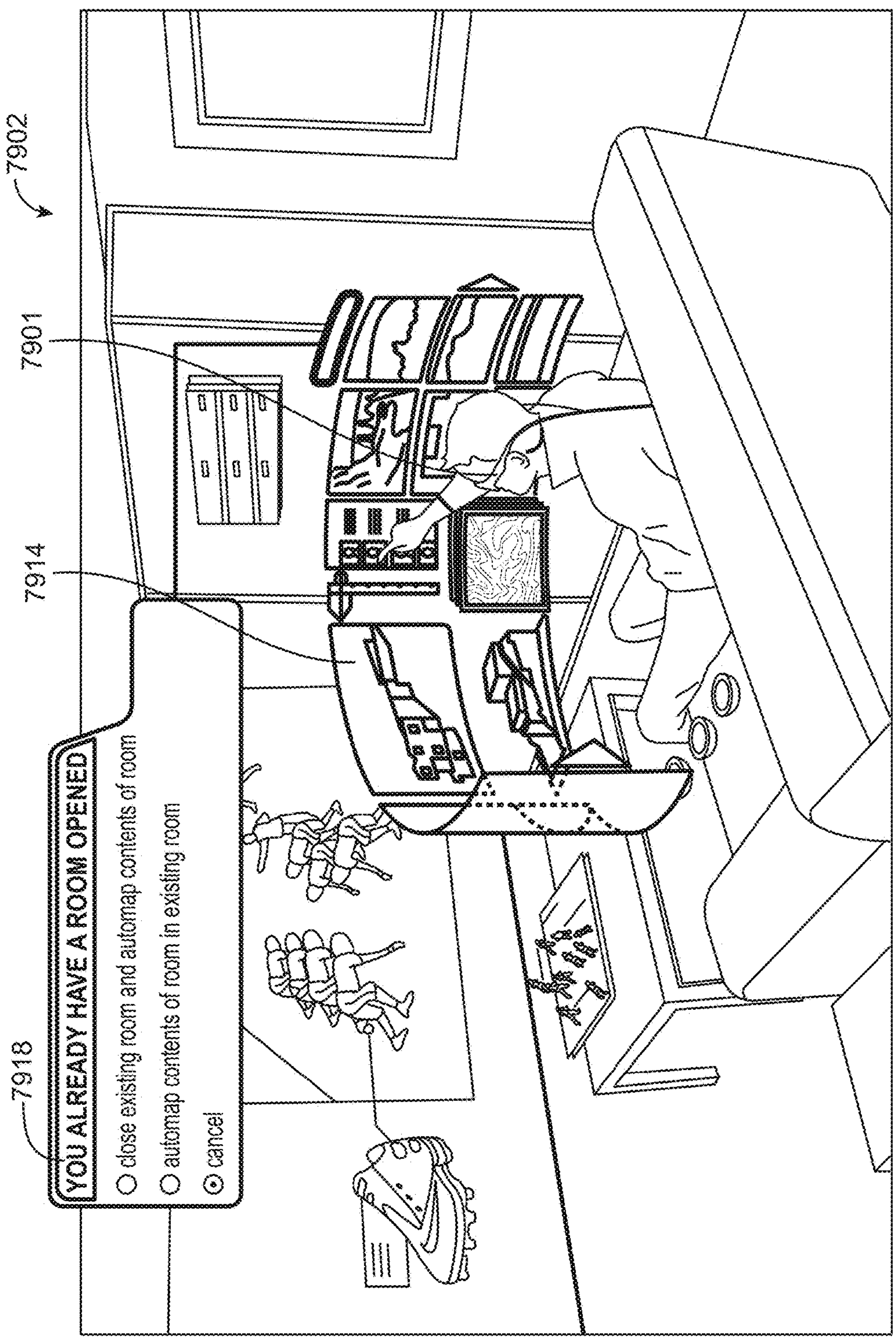
FIGS. 79A-79E illustrate another example scenario of interacting with the AR system in a house, according to one embodiment.

FIG. 79A shows a user sitting in a physical living room space 7902, and using an AR system 7901 to experience a virtual room or virtual space in the form of a virtual entertainment or media room (similar to the above embodiments), and the user executing gestures to interact with a user interface virtual construct 7904, according to one illustrated embodiment.

As illustrated in FIG. 79A, the AR system 7901 may render a functional group or pod user interface virtual construct 7904, so at to appear in a user's field of view, preferably appearing to reside within a reach of the user. The pod user interface virtual construct 7904 includes a plurality of virtual room or virtual space based applications, which conveniently provides access from one virtual room or virtual space to functional tools and applications which are logically associated with another virtual room or virtual space. The pod user interface virtual construct 7904 may form a mini work station for the user.

The AR system detects user interactions with the pod user interface virtual construct or the virtual content of the virtual room or space. For example, the AR system may detect swipe gestures, for navigating through context specific rooms. The AR system may render a notification or dialog box 7908, for example, indicating that the user is in a different room. The notification or dialog box 7908 may query the use with respect to what action that the user would like the AR system to take (e.g., close existing room and automatically map contents of room, automatically map contents of room to existing room, or cancel).

Figure 79B:
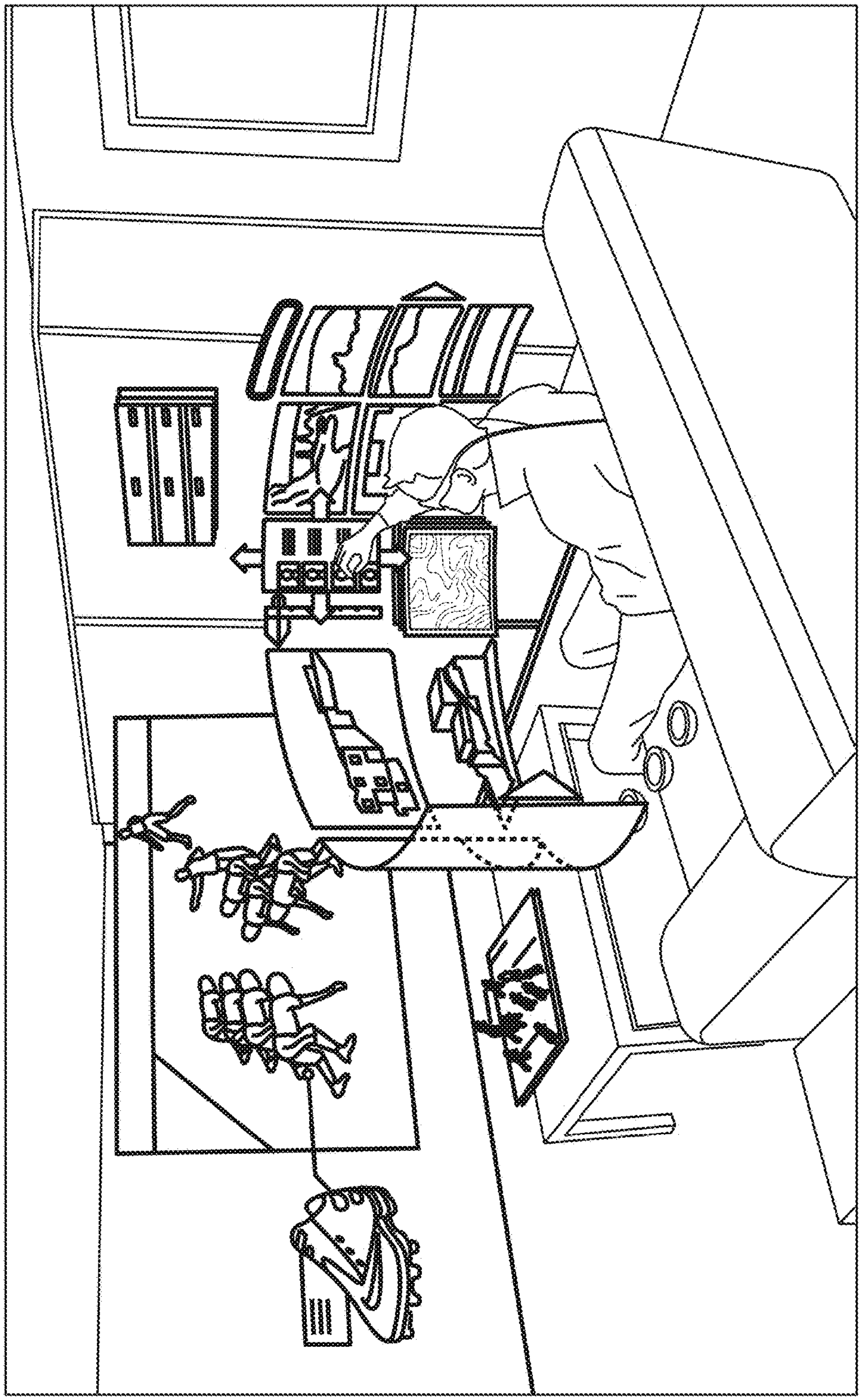

FIG. 79B shows a user sitting in a physical living room space, and using an AR system to experience a virtual room or virtual space in the form of a virtual entertainment or media room, the user executing gestures to interact with a user interface virtual construct, according to one illustrated embodiment.

Similar to FIG. 79A, the AR system 7901 may render a functional group or pod user interface virtual construct 7904, so at to appear in a user's field of view, preferably appearing to reside within a reach of the user. As illustrated in FIG. 79B, the AR system 7901 detects user interactions with the pod user interface virtual construct 7904 or the virtual content of the virtual room or space. For example, the AR system may detect a swipe or pinch gesture, for navigating to and opening context specific virtual rooms or virtual spaces. The AR system may render a visual effect to indicate which of the representations is selected.

Figure 79C:
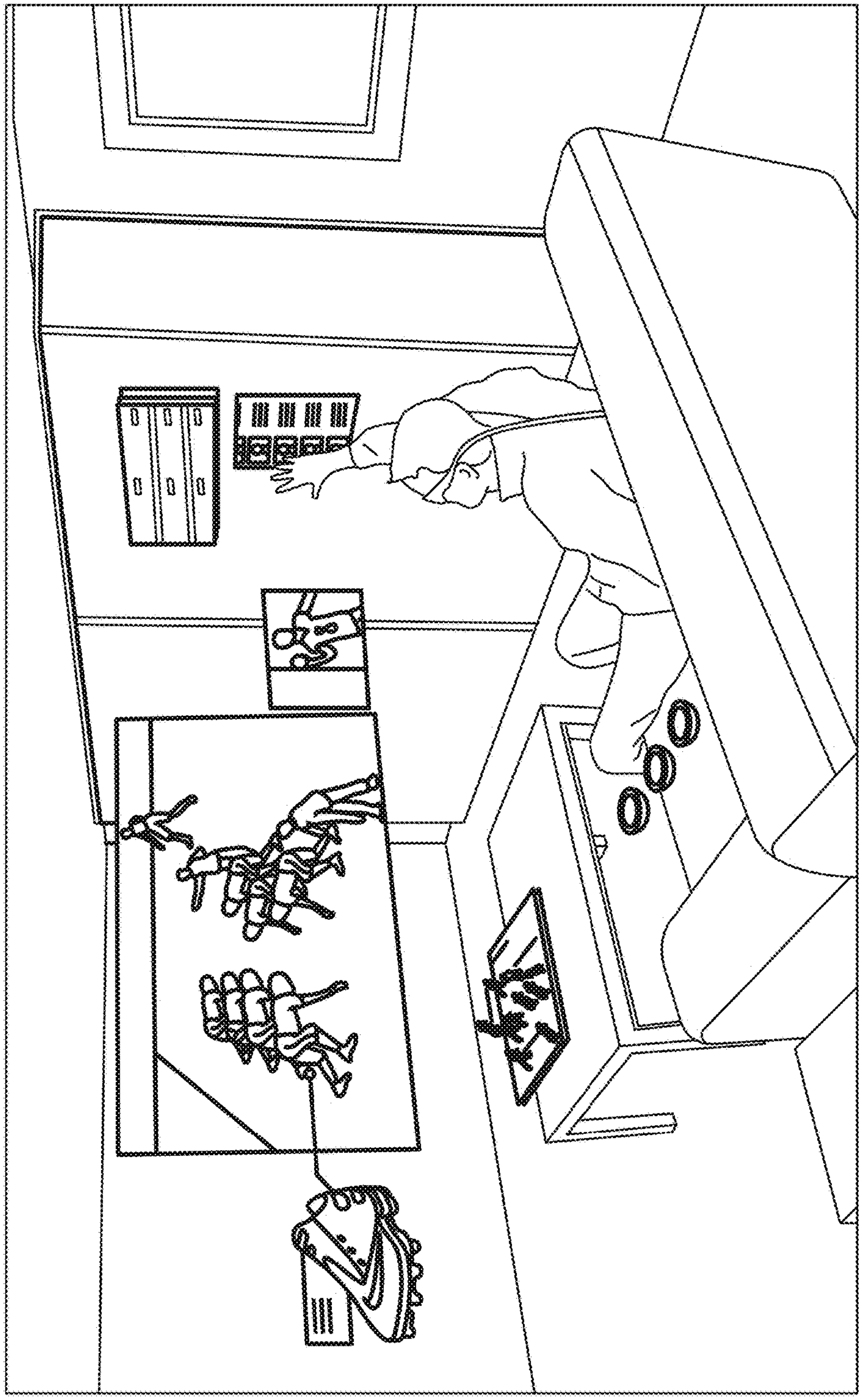

FIG. 79C shows a user sitting in a physical living room space, and using an AR system 7901 to experience a virtual room or virtual space in the form of a virtual entertainment or media room, the user executing gestures to interact with a user interface virtual construct, according to one illustrated embodiment.

As illustrated in FIG. 79C, the AR system may render a selected application in the field of view of the user, in response to a selection of a representation illustrated in FIG. 79B. For example, the user may select a social networking application, a Web browsing application, or an electronic mail (email) application from, for example, a virtual work space, while viewing a virtual entertainment or media room or space.

Figure 79D:
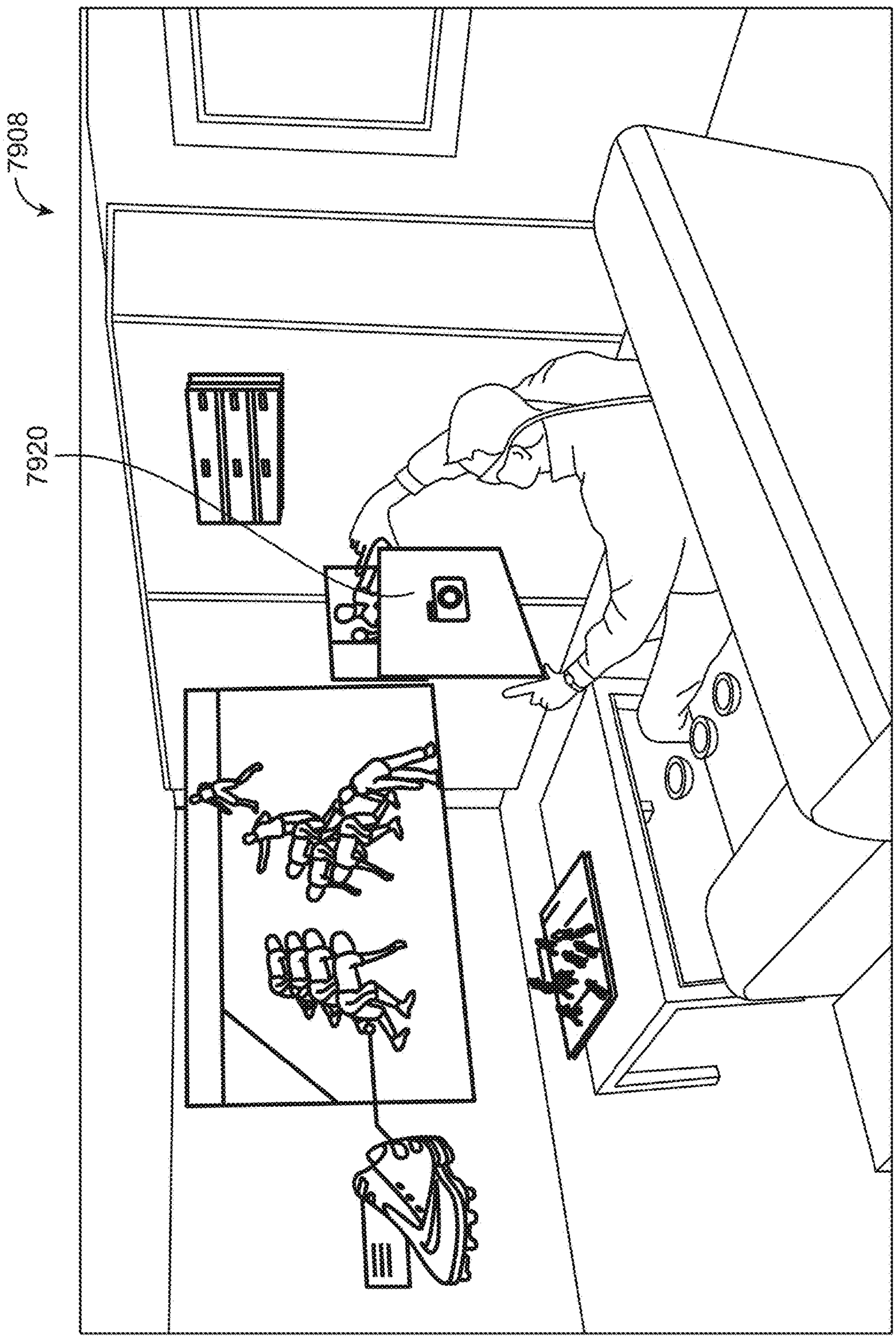

FIG. 79D shows another scene 7908 in which the user is sitting in a physical living room space, and using an AR system 7901 to experience a virtual room or virtual space in the form of a virtual entertainment or media room, the user executing gestures to interact with a user interface virtual construct, according to one illustrated embodiment.

As illustrated in FIG. 79D, the user may perform a defined gesture, which serves as a hot key for a commonly used application (e.g., camera application). The AR system detects the user's gesture, interprets the gesture, and opens or executes the corresponding application. For example, the AR system may render the selected application 7920 or a user interface of the selected application in the field of view of the user, in response to the defined gesture. In particular, the AR system may render a fully functional version of the selected application or application user interface to the retina of the eyes of the user, for example so as to appear with arm's reach of the user.

The camera application 7920 may include a user interface that allows the user to cause the AR system to capture images or image data. For example, the camera application 7920 may allow the user to cause outward facing cameras on a body or head worn component of an individual AR system to capture images or image data (e.g., 4D light field) of a scene that is in a field of view of the outward facing camera(s) and/or the user.

Defined gestures are preferably intuitive. For example, an intuitive two handed pinch type gesture for opening a camera application or camera user interface is illustrated in FIG. 79D. The AR system may recognize other types of gestures. The AR system may store a catalog or library of gestures, which maps gestures to respective applications and/or functions. Gestures may be defined for all commonly used applications. The catalog or library of gestures may be specific to a particular user. Alternatively or additionally, the catalog or library of gestures may be specific to a specific virtual room or virtual space. Alternatively, the catalog or library of gestures may be specific to a specific physical room or physical space. Alternatively or additionally, the catalog or library of gestures may be generic across a large number of users and/or a number of virtual rooms or virtual spaces.

As noted above, gestures are preferably intuitive, particular with relation to the particular function, application or virtual content to which the respective gesture is logically associated or mapped. Additionally, gestures should be ergonomic. That is the gestures should be comfortable to be performed by users of a wide variety of body sizes and abilities. Gestures also preferably involve a fluid motion, for instance an arm sweep. Defined gestures are preferably scalable. The set of defined gestures may further include gestures which may be discretely performed, particular where discreetness would be desirable or appropriate. On the other hand, some defined gestures should not be discrete, but rather should be demonstrative, for example gestures indicating that a user intends to capture images and/or audio of others present in an environment. Gestures should also be culturally acceptable, for example over a large range of cultures. For instance, certain gestures which are considered offensive in one or more cultures should be avoided.

A number of proposed gestures are set out in Table A, below.

TABLE A

| |
|---|
| Swipe to the side (Slow) |
| Spread hands apart |
| Bring hands together |
| Small wrist movements (as opposed to large arm movements) |
| Touch body in a specific place (arm, hand, etc.) |
| Wave |

TABLE A-continued

| |
|---|
| Pull hand back |
| Swipe to the side (slow) |
| Push forward |
| Flip hand over |
| Close hand |
| Swipe to the side (Fast) |
| Pinch- thumb to forefinger |
| Pause (hand, finger, etc.) |
| Stab (Point) |

Figure 79E:

Referring now FIG. 79E, another scenario 7910 is illustrated showing a user sitting in a physical living room space, and using an AR system 7901 to experience a virtual room or virtual space in the form of a virtual entertainment or media room, the user executing gestures to interact with a user interface virtual construct, according to one illustrated embodiment.

As illustrated in FIG. 79E, the AR system 7901 renders a comprehensive virtual dashboard menu user interface, for example rendering images to the retina of the user's eyes. The virtual dashboard menu user interface may have a generally annular layout or configuration, at least partially surrounding the user, with various user selectable virtual icons spaced to be within arm's reach of the user.

The AR system detects the user's gesture or interaction with the user selectable virtual icons of the virtual dashboard menu user interface, interprets the gesture, and opens or executes a corresponding application. For example, the AR system may render the selected application or a user interface of the selected application in the field of view of the user, in response to the defined gesture. For example, the AR system may render a fully functional version of the selected application or application user interface to the retina of the eyes of the user. As illustrated in FIG. 79E, the AR system may render media content where the application is a source of media content. The AR system may render the application, application user interface or media content to overlie other virtual content. For example, the AR system may render the application, application user interface or media content to overlay a display of primary content on a virtual primary screen being displayed in the virtual room or space (e.g., virtual entertainment or media room or space).

Figure 80A:
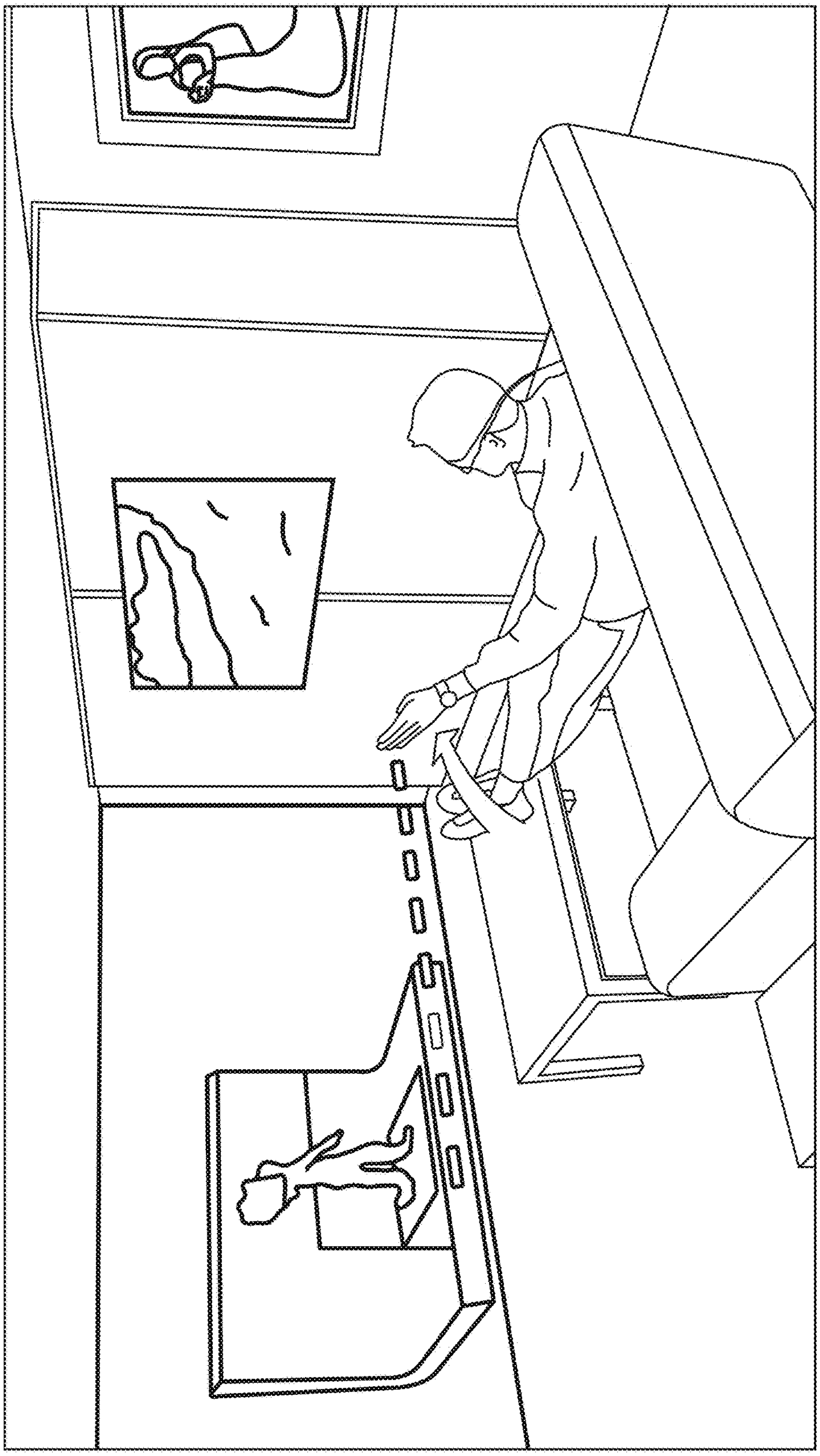
FIGS. 80A-80O illustrate another example scenario of interacting with the AR system in a virtual room, according to one embodiment.

FIG. 80A shows yet another scenario 8002 illustrated a user sitting in a physical living room space, and using an AR system 8001 to experience a first virtual décor (e.g., aesthetic skin or aesthetic treatment), the user executing gestures to interact with a user interface virtual construct, according to one illustrated embodiment.

The AR system 8001 may allow a user to change or modify (e.g., re-skin) a virtual décor of a physical room or physical space. For example, as illustrated in FIG. 80A, a user may utilize a gesture to bring up a first virtual décor, for example a virtual fireplace with a virtual fire and first and second virtual pictures. The first virtual décor (e.g., first skin) is mapped to the physical structures of the physical room or space (e.g., physical living room).

As also illustrated in FIG. 80A, the AR system may render a user interface tool which provides a user with a representation of choices of virtual décor, and possibly a position of a currently selected virtual décor in a set of virtual décor available to the user. As illustrated, the representation takes the form of a line of marks or symbols, with each marking representing a respective one of the virtual décor available to the user. A currently selected one of the virtual décor is visually emphasized, to assist the user in navigating forward or backward through the set. The set of virtual décor may be specific to the user, specific to a physical room or physical space, or may be shared by two or more users.

Figure 80B:
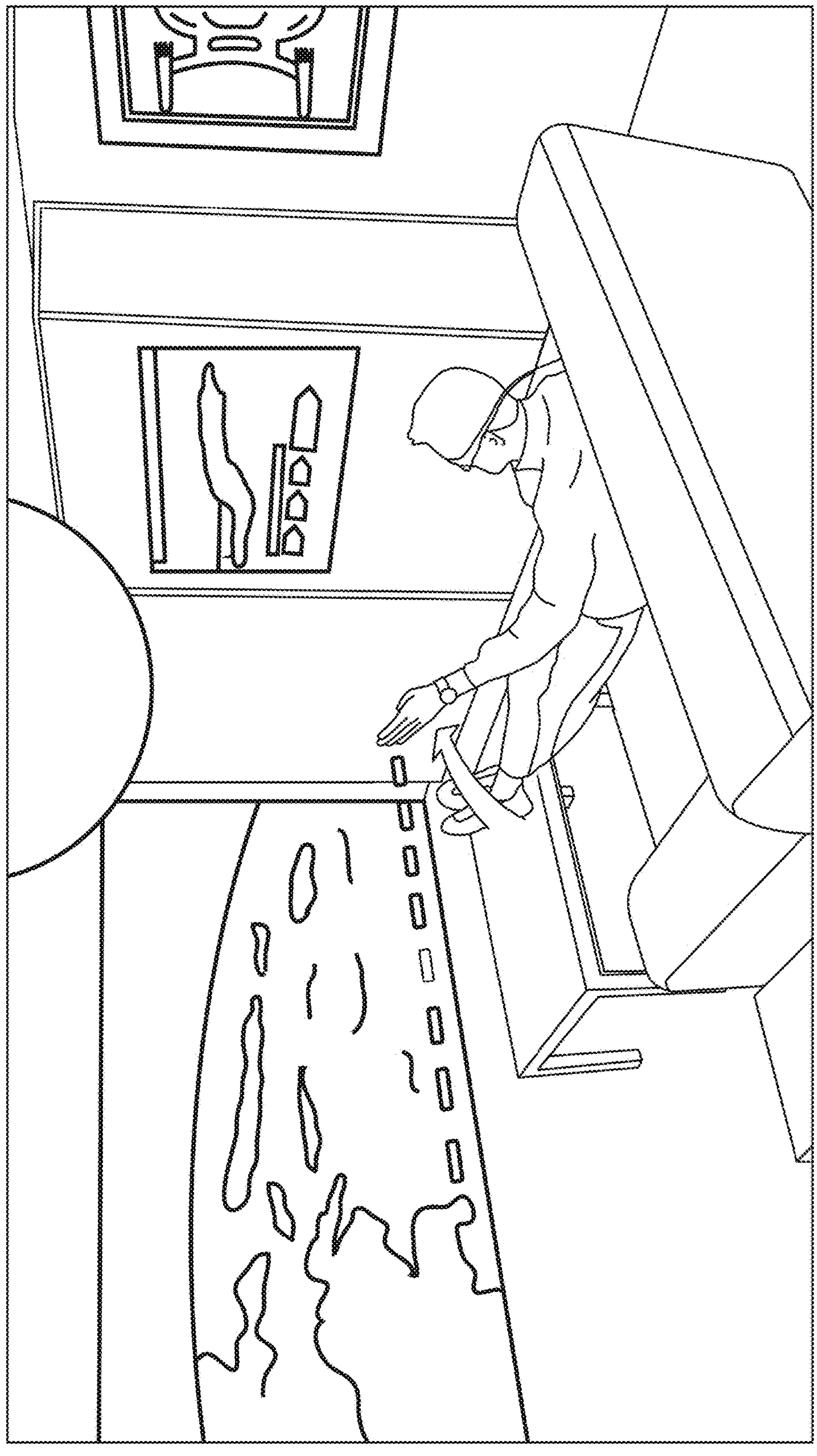

FIG. 80B shows another scenario 8004 in which the user executes gestures to interact with a user interface virtual construct, according to one illustrated embodiment. As illustrated in FIG. 80B, a user may utilize a gesture to bring up a second virtual décor, different from the first virtual décor. The second virtual décor may, for example, replicate a command deck of a spacecraft (e.g., Starship) with a view of a planet, technical drawings or illustrations of the spacecraft, and a virtual lighting fixture or luminaire. The gesture to bring up the second virtual décor may be identical to the gesture to bring up the first virtual décor, the user essentially toggling, stepping or scrolling through a set of defined virtual décors for the physical room or physical space (e.g., physical living room). Alternatively, each virtual décor may be associated with a respective gesture.

Figure 80C:
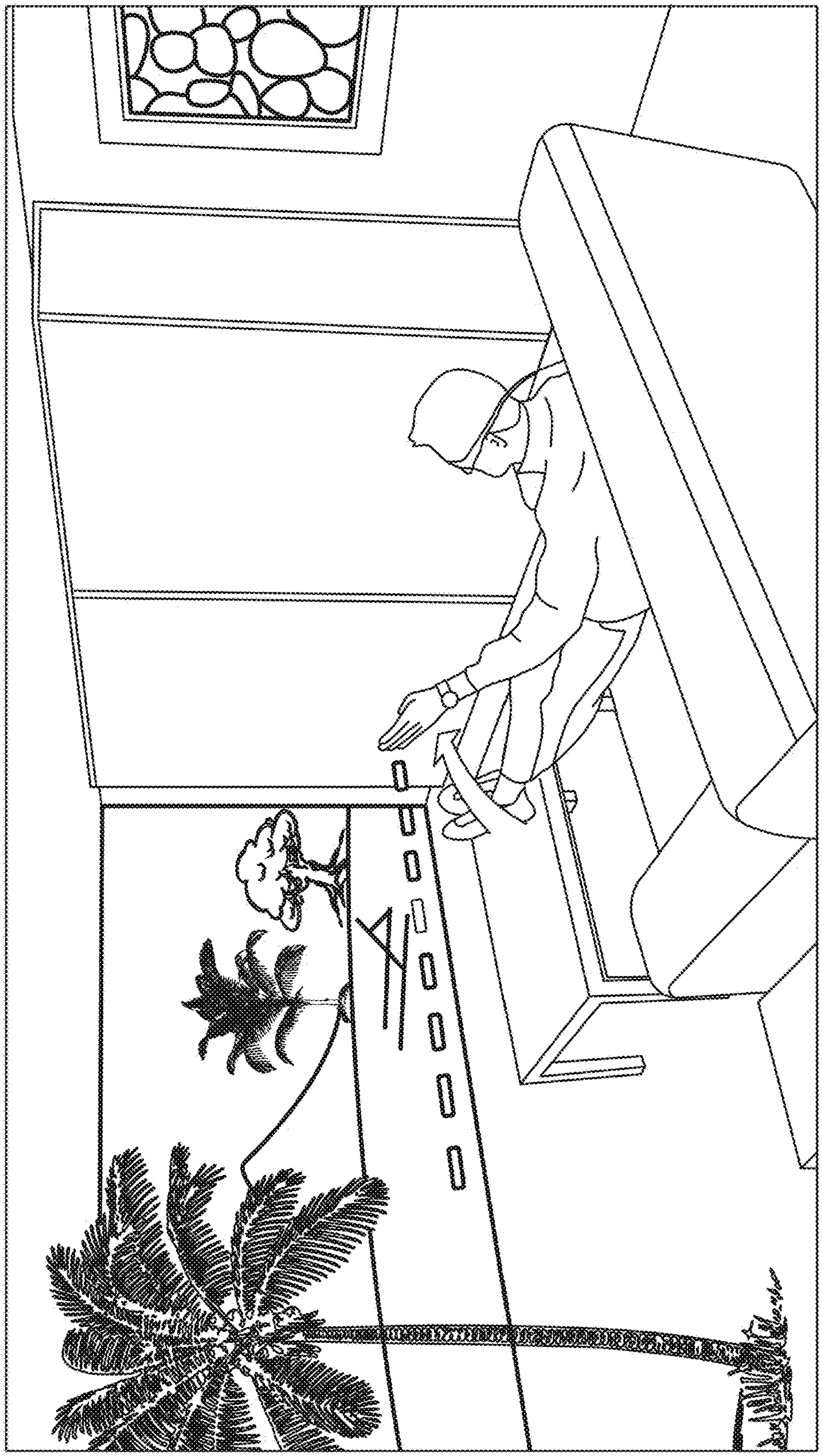

FIG. 80C illustrates another scenario 8006 showing the user sitting in a physical living room space, and using an AR system 8001 to experience a third virtual décor (e.g., aesthetic skin or aesthetic treatment), the user executing gestures to interact with a user interface virtual construct, according to one illustrated embodiment.

As illustrated in FIG. 80C, a user may gesture to bring up a third virtual décor, different from the first and the second virtual décors. The third virtual décor may, for example, replicate a view of a beach scene and a different virtual picture. The gesture to bring up the third virtual décor may be identical to the gesture to bring up the first and the second virtual décors, the user essentially toggling, stepping or scrolling through a set of defined virtual décors for the physical room or physical space (e.g., physical living room). Alternatively, each virtual décor may be associated with a respective gesture.

Figure 81:
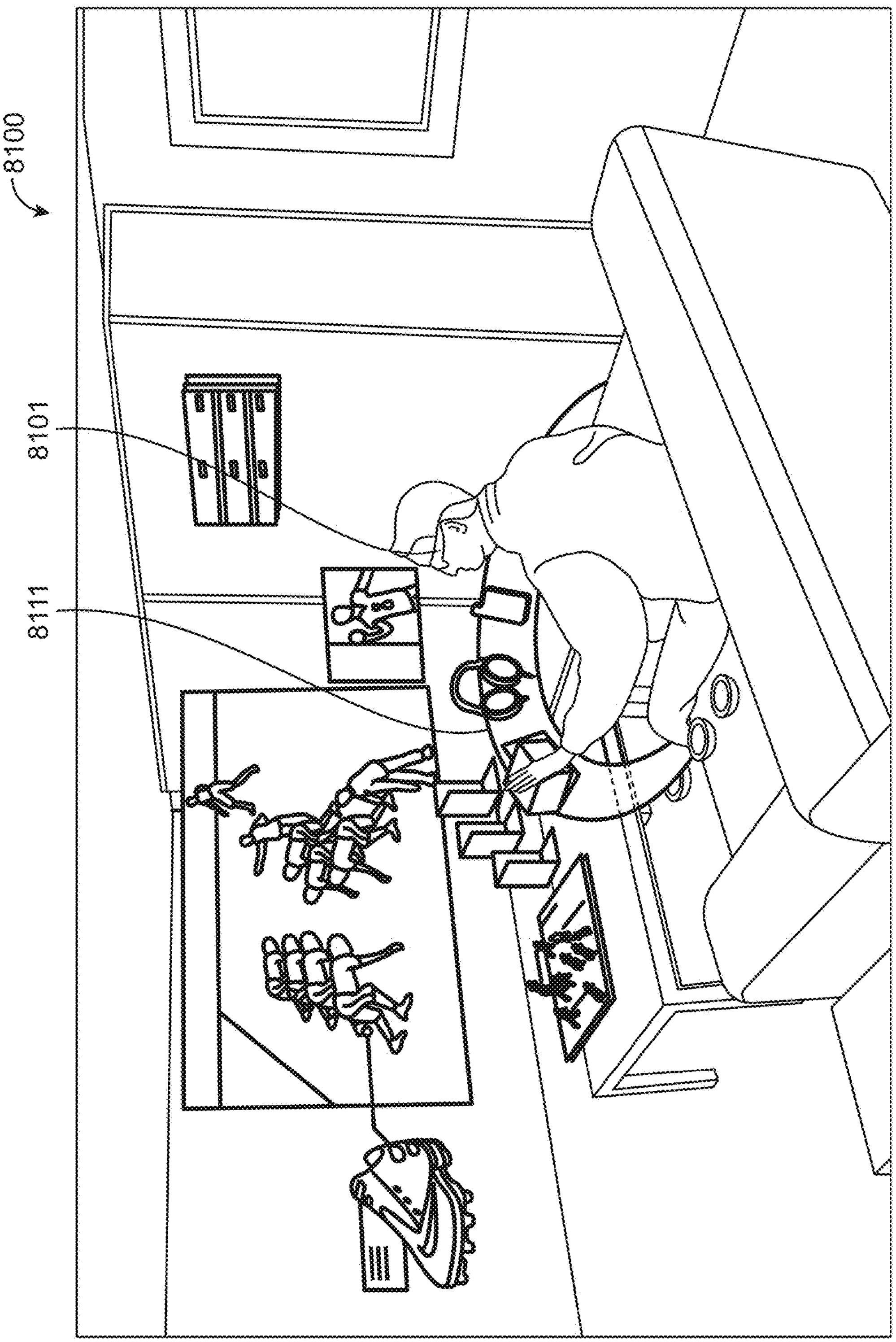
FIG. 81 illustrates another example user interaction scenario, according to one embodiment.

FIG. 81 shows yet another scenario 8100 in which a user of an AR system 8102 experiences another virtual room space in the form of a virtual entertainment or media room, the user executing gestures to interact with a user interface virtual construct, according to one illustrated embodiment.

As illustrated in FIG. 81, the AR system 8101 may render a hierarchical menu user interface virtual construct 8111 including a plurality of virtual tablets or touch pads, so at to appear in a user's field of view, preferably appearing to reside within a reach of the user. These allow a user to navigate a primary menu to access user defined virtual rooms or virtual spaces, which are a feature of the primary navigation menu. The various functions or purposes of the virtual rooms or virtual spaces may be represented through icons, as shown in FIG. 81.

Figure 82:
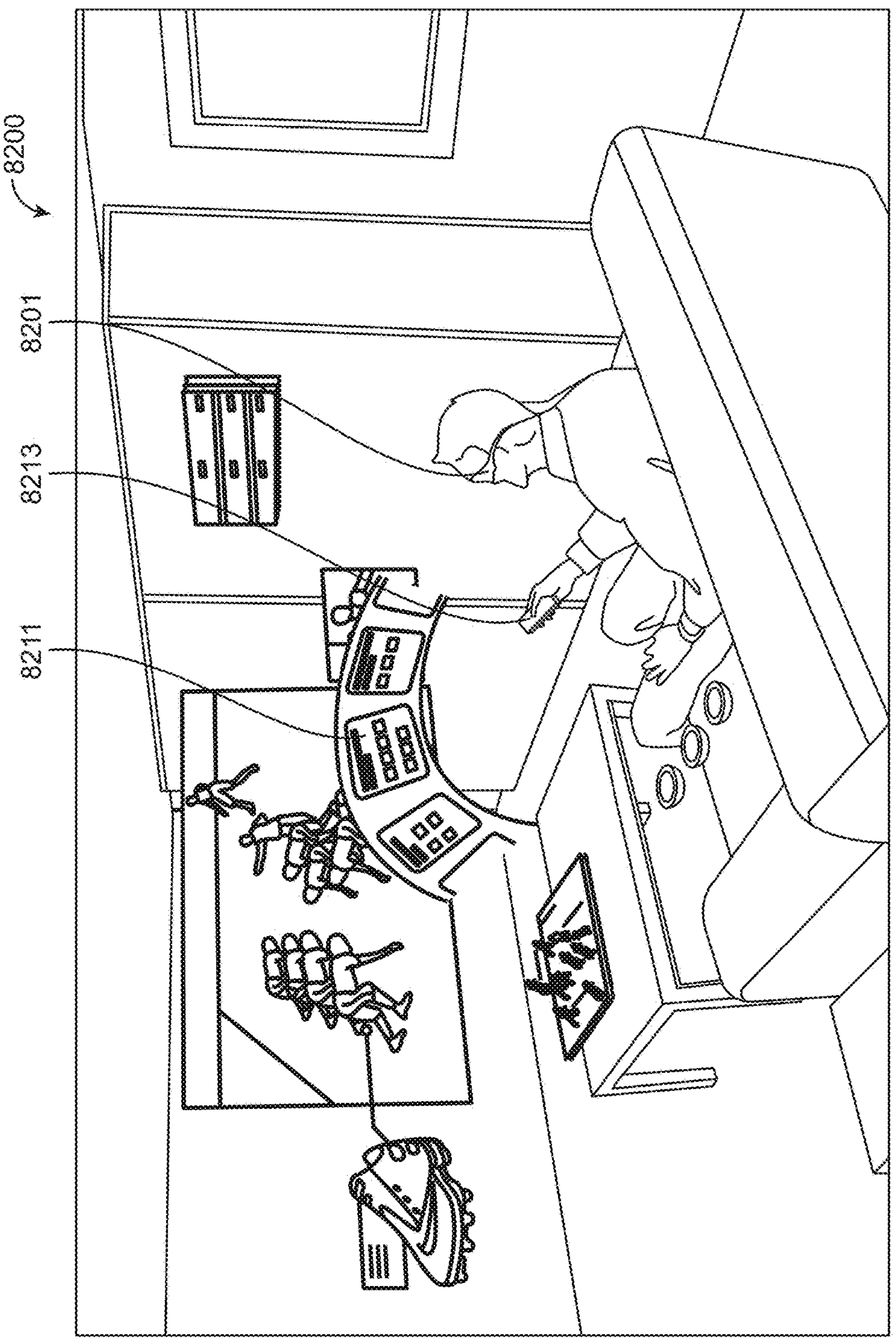
FIG. 82 illustrates another example user interaction scenario, according to one embodiment.

FIG. 82 shows another scenario 8200 in which a user of an AR system 8201 interacts with a virtual room or virtual space in the form of a virtual entertainment or media room, the user executing gestures to interact with a user interface virtual construct to provide input by proxy, according to one illustrated embodiment.

As illustrated in FIG. 82, the AR system may render a user interface virtual construct 8211 including a plurality of user selectable virtual elements, so at to appear in a user's field of view. The user manipulates a totem 8213 to interact with the virtual elements of the user interface virtual construct 8211. The user may, for example, point a front of the totem 8213 at a desired element. The user may also interact with the totem 8213, for example by tapping or touching on a surface of the totem, indicating a selection of the element at which the totem is pointing or aligned.

The AR system 8201 detects the orientation of the totem and the user interactions with the totem, interpreting such as a selection of the element at which the totem is pointing or aligned. The AR system the executes a corresponding action, for example opening an application, opening a submenu, or rendering a virtual room or virtual space corresponding to the selected element.

The totem 8213 may replicate a remote control, for example remote controls commonly associated with televisions and media players. In some implementations, the totem 8213 may be an actual remote control for an electronic device (e.g., television, media player, media streaming box), however the AR system may not actually received any wireless communications signals from the remote control. The remote control may even not have batteries, yet still function as a totem since the AR system relies on images that capture position, orientation and interactions with the totem (e.g., remote control).

Figure 83A:
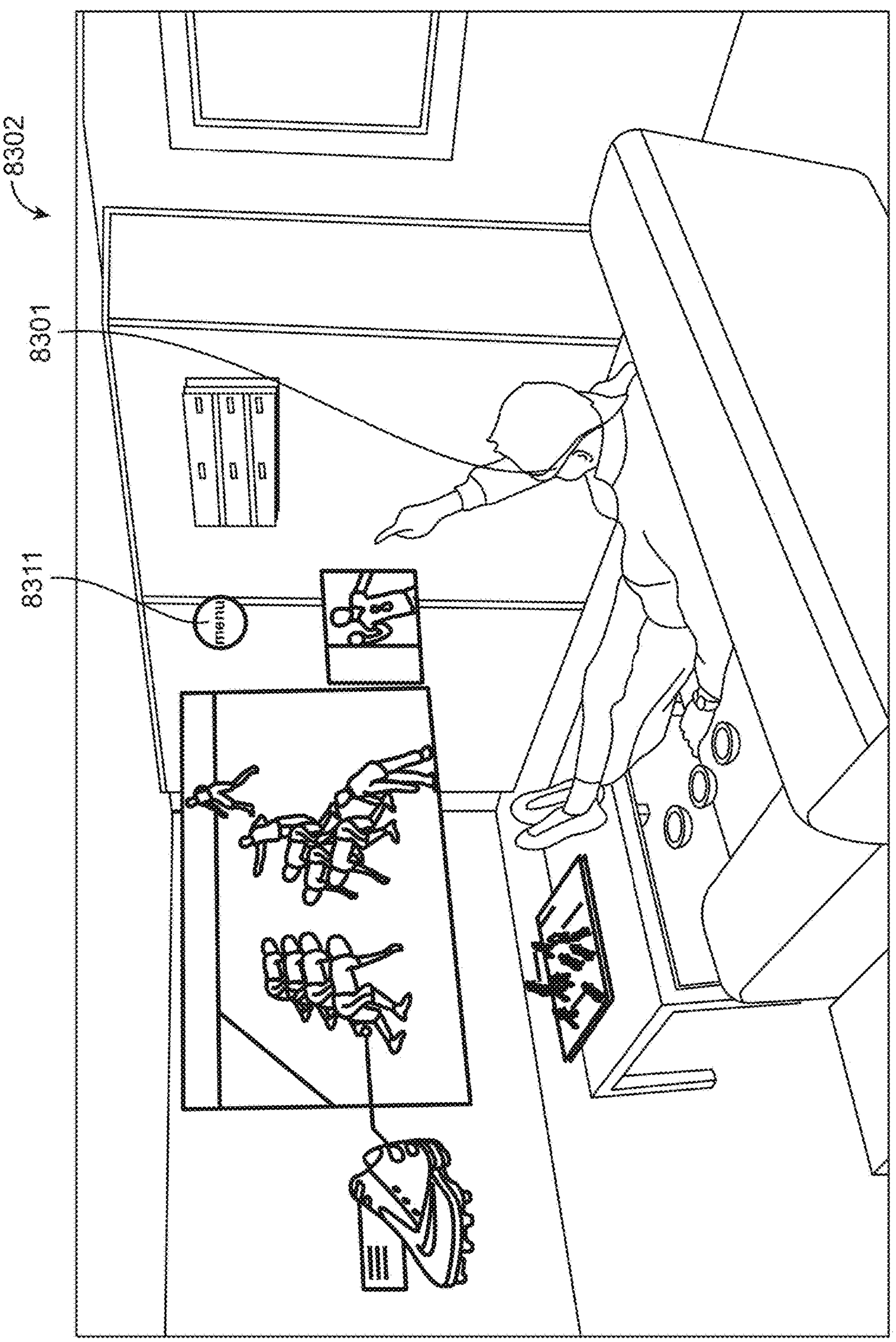
FIGS. 83A-83B illustrates yet another example user interaction scenario, according to one or more embodiments.
Figure 83B:
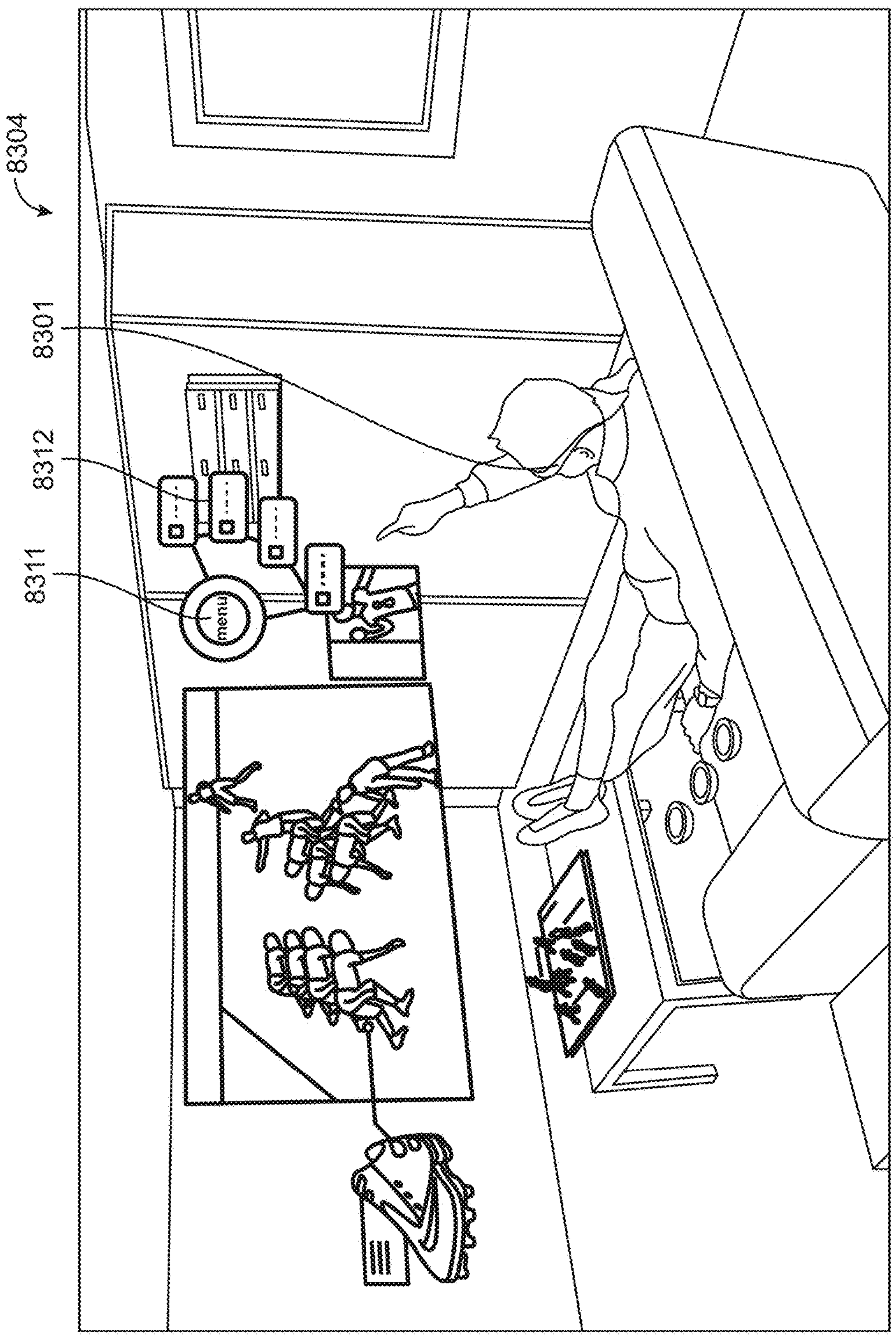

FIGS. 83A and 83B show scenarios 8302 and 8304 illustrating a user sitting in a physical living room space, and using an AR system 8301 to experience a virtual room or virtual space in the form of a virtual entertainment or media room, the user executing gestures to interact with a user interface virtual construct to provide input, according to one illustrated embodiment.

As illustrated in FIG. 83A, the AR system 8301 may render a user interface virtual construct including an expandable menu icon that is always available. The AR system 8301 may consistently render the expandable menu icon in a given location in the user's field of view, or preferably in a peripheral portion of the user's field of view, for example an upper right corner. Alternatively, AR system 8301 may consistently render the expandable menu icon 8311 in a given location in the physical room or physical space.

As illustrated in FIG. 83B, the user may gesture at or toward the expandable menu icon 8311 to expand the expandable menu construct 8312. In response, the AR system may render the expanded expandable menu construct 8312 to appear in a field of view of the user. The expandable menu construct 8312 may expand to reveal one or more virtual rooms or virtual spaces available to the user. The AR system 8301 may consistently render the expandable menu in a given location in the user's field of view, or preferably in a peripheral portion of the user's field of view, for example an upper right corner. Alternatively, the AR system 8301 may consistently render the expandable menu 8311 in a given location in the physical room or physical space.

Figure 84A:
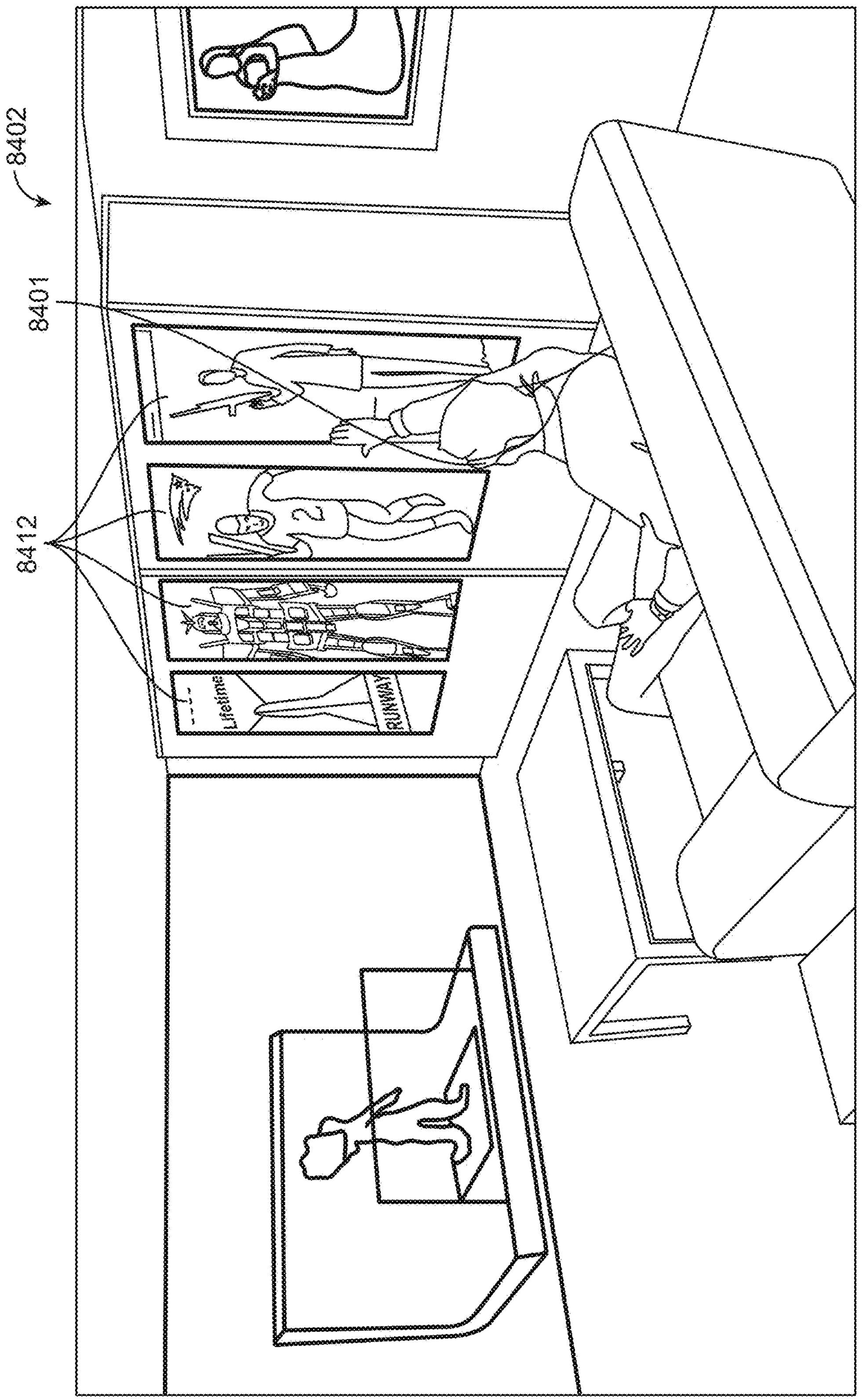
FIGS. 84A-84C illustrates the user interacting with the AR system in a virtual space, according to one or more embodiments.

FIG. 84A shows another scenario 8402 illustrating a user of an AR system 8401 experiencing a virtual décor, and the user executing pointing gestures to interact with a user interface virtual construct, according to one illustrated embodiment.

As illustrated in FIG. 84A, the AR system 8401 may render a user interface tool which includes a number of pre-mapped menus. For instance, the AR system 8401 may render a number of poster-like virtual images 8412 corresponding to respective pieces of entertainment or media content (e.g., movies, sports events), from which the user can select via one or more pointing gestures. The AR system 8401 may render the poster-like virtual images 8412 to, for example, appear to the user as if hanging or glued to a physical wall of the living room, as shown in FIG. 84A.

The AR system 8401 detects the user's gestures, for example pointing gestures which may include pointing a hand or arm toward one of the poster-like virtual images. The AR system recognizes the pointing gesture or projection based proxy input, as a user selection intended to trigger delivery of the entertainment or media content which the poster-like virtual image represents. The AR system 8401 may render an image of a cursor, with the cursor appearing to be projected toward a position in which the user gestures, in one or more embodiments.

Figure 84B:
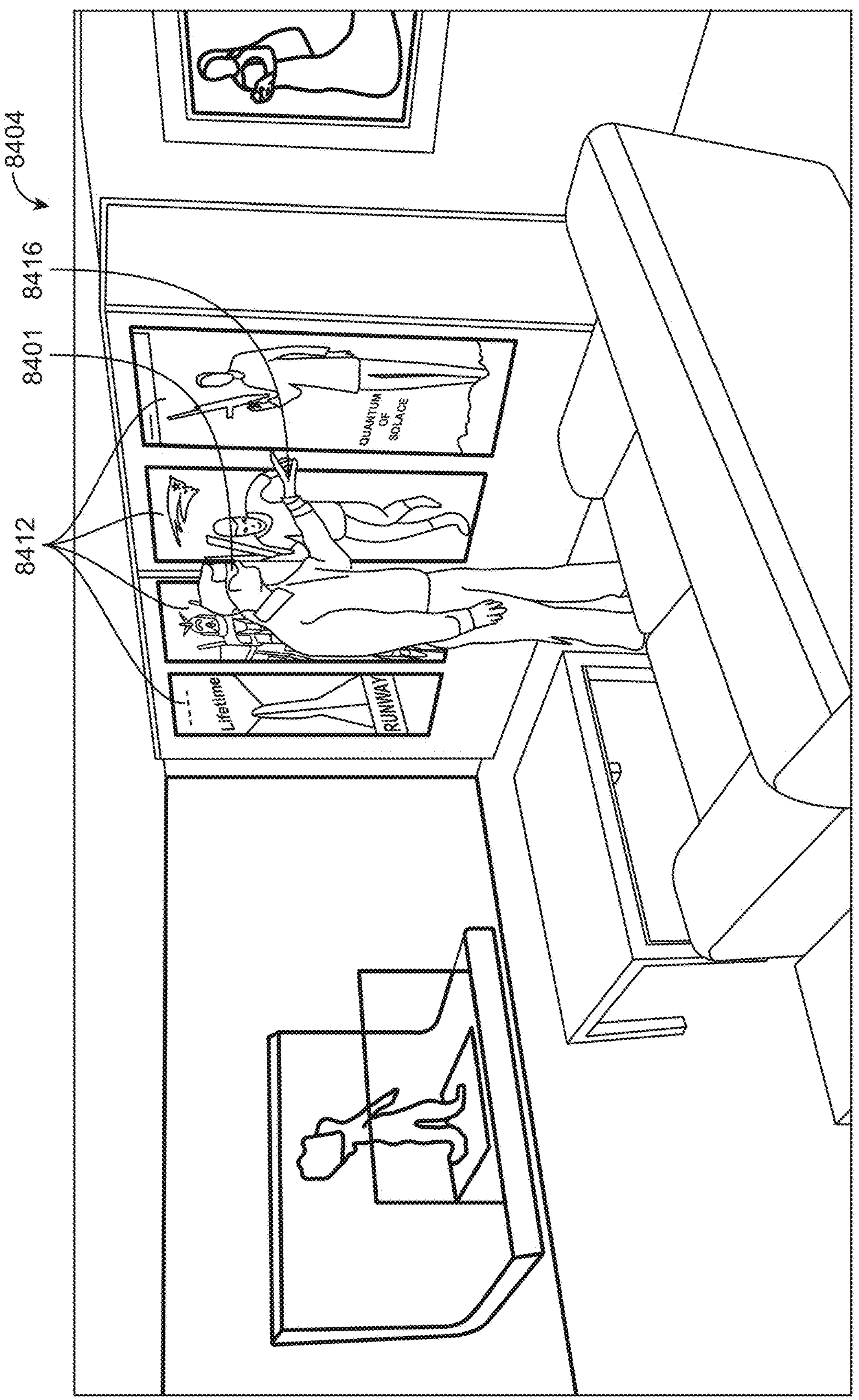

FIG. 84B shows another scenario 8402 illustrating a user of the AR system 8401 interacting with the poster virtual images 8412, similar to that of FIG. 84A. In the illustrated embodiment, the user interacts with the poster virtual images 8412 through gestures 8416.

Figure 84C:
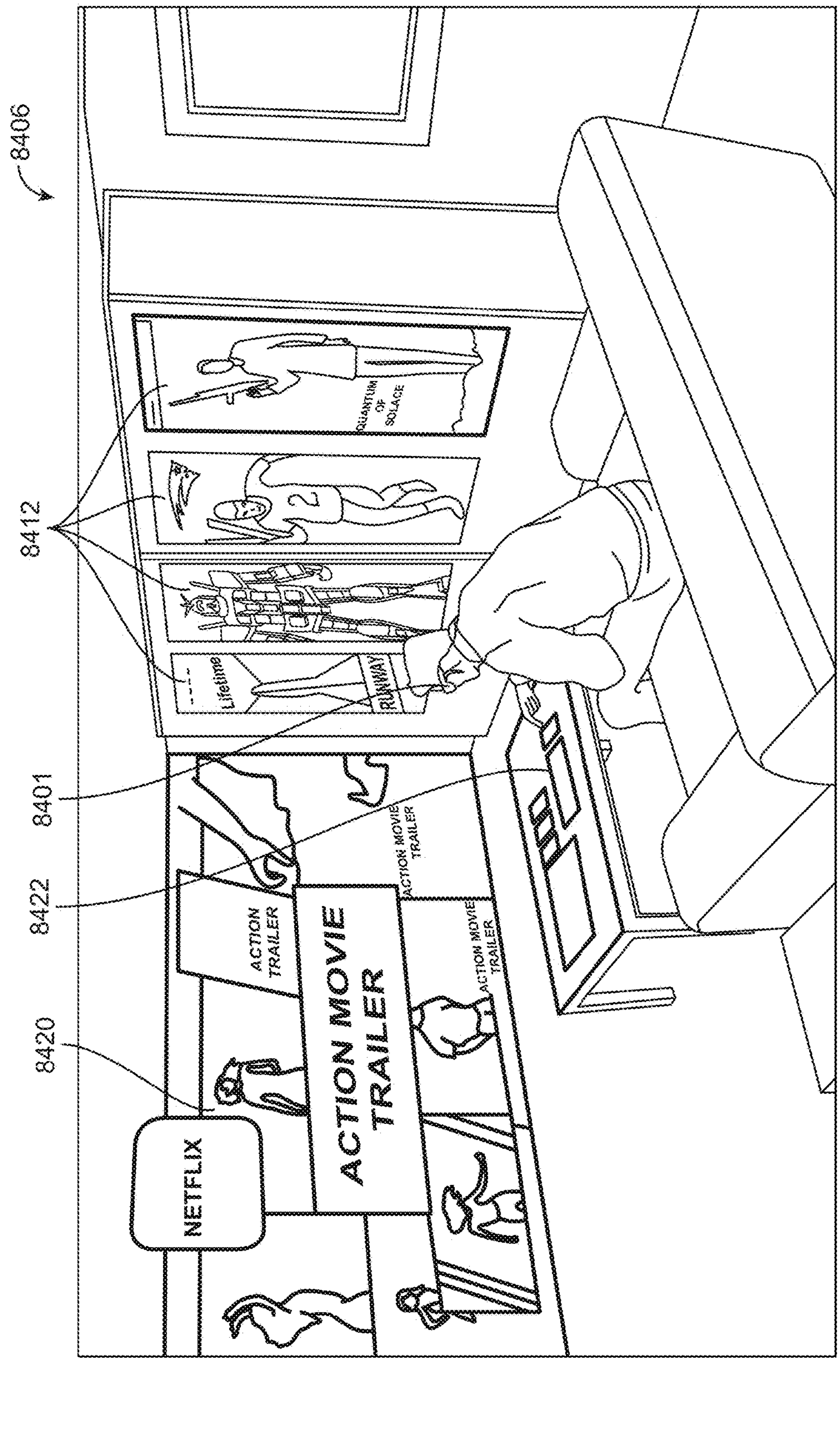

FIG. 84C shows another scenario 8406 showing a user of an AR system 8401 experiencing a selected (e.g., based on gestures 8416 of FIG. 84B) piece of entertainment or media content, the user executing touch gestures to interact with a user interface virtual construct, according to one illustrated embodiment.

As illustrated in FIG. 84C, in response a user selection, the AR system 8401 renders a display 8420 of the selected entertainment or media content, and/or associated virtual menus (e.g., high level virtual navigation menu, for instance a navigation menu that allows selection of primary feature, episode, of extras materials). As illustrated in FIG. 84C, the display of the selected entertainment or media content may replace at least a portion of the first virtual décor.

As illustrated in FIG. 84C, in response the user selection, the AR system may also render a virtual tablet type user interface tool, which provides a more detailed virtual navigation menu 8422 than the high level virtual navigation menu. The more detailed virtual navigation menu 8422 may include some or all of the menu options of the high level virtual navigation menu, as well as additional options (e.g., retrieve additional content, play interactive game associated with media title or franchise, scene selection, character exploration, actor exploration, commentary). For instance, the AR system may render the detailed virtual navigation menu to, for example, appear to the user as if sitting on a top surface of a table, within arm's reach of the user.

User Experience Retail Examples

FIGS. 89A-89J illustrate an AR system implemented retail experience, according to one illustrated embodiment. As illustrated, a mother and daughter each wearing respective individual AR systems (8901 and 8903 respectively) receive an augmented reality experience 8902 while shopping in a retail environment, for example a supermarket. As explained herein, the AR system may provide entertainment in addition to facilitating the shopping experience.

For example, the AR system may render virtual content, for instance virtual characters which may appear to jump from a box or carton, and/or offer virtual coupons for selected items. The AR system may render games, for example games based on locations throughout the store and/or based on items on shopping list, list of favorites, or a list of promotional items. The augmented reality environment encourages children to play, while moving through each location at which a parent or accompanying adult needs to pick up an item.

In another embodiment, the AR system may provide information about food choices, and may help users with their health/weight/lifestyle goals. The AR system may render the calorie count of various foods while the user is consuming it, thus educating the user on his/her food choices. If the user is consuming unhealthy food, the AR system may warn the user about the food so that the user is able to make an informed choice.

The AR system may subtly render virtual coupons, for example using radio frequency identification (RFID) transponders and communications. The AR system may render visual affects tied or proximately associated with items, for instance causing a glowing affect around box glows to indicate that there is metadata associated with the item. The metadata may also include or link to a coupon for a discount or rebate on the item.

The AR system may detect user gestures, and for example unlocking metadata in response to defined gestures. The AR system may recognize different gestures for different items. For example, as explained herein, a virtual animated creature may be rendered so as to appear to pop out of a box holding a coupon for the potential purchaser or customer. For example, the AR system may render virtual content that makes a user perceive a box opening. The AR system allows advertising creation and/or delivery at the point of customer or consumer decision.

The AR system may render virtual content which replicates a celebrity appearance. For example, the AR system may render a virtual appearance of a celebrity chef at a supermarket. The AR system may render virtual content which assists in cross-selling of products. For example, one or more virtual affects may cause a bottle of wine to recommend a cheese that goes well with the wine. The AR system may render visual and/or aural affects which appear to be proximate the cheese, in order to attract a shopper's attention. The AR system may render one or more virtual affects in the field of the user that cause the user to perceive the cheese recommending certain crackers. The AR system may render virtual friends who may provide opinions or comments regarding the various produces (e.g., wine, cheese, crackers). The AR system may render virtual affects within the user's field of view which are related to a diet the user is following. For example, the affects may include an image of a skinny version of the user, which is rendered in response to the user looking at a high calorie product. This may include an aural oral reminder regarding the diet.

Figure 89A:
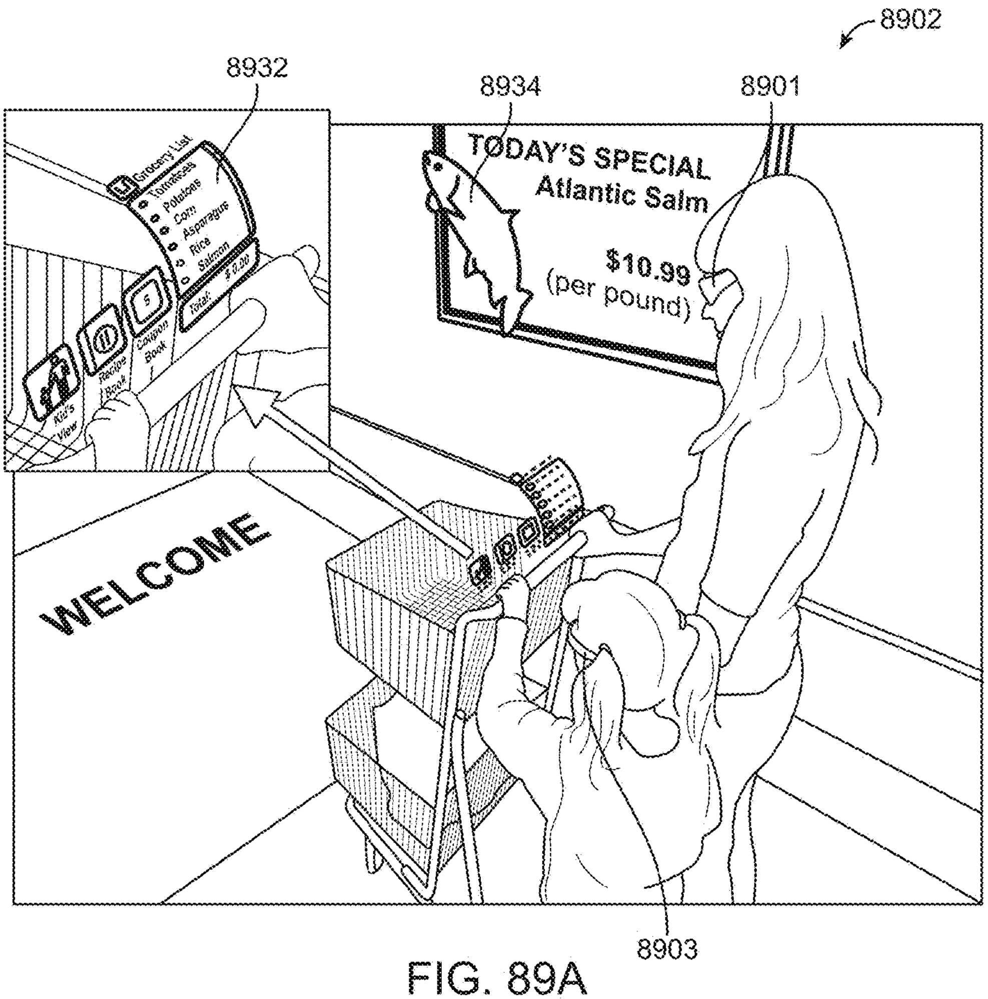
FIGS. 89A-89J illustrate an example user shopping experience with the AR system, according to one or more embodiments.

In particular, FIG. 89A illustrates a scenario 8902 in which a mother and daughter enjoy an augmented reality experience at a grocery store. The AR systems (8901 and 8903) may recognize the presence of a shopping cart or a hand on the shopping cart, and may determine a location of the user and/or shopping cart. Based on this detected location, in one or more embodiments, the AR system may render a virtual user interface 8932 tethered to the handle of the shopping card as shown in FIG. 89A. In one or more embodiments, the virtual user interface 8932 may be visible to both AR systems 8901 and 8903, or simply to the AR system 8901 of the mother. In the illustrated embodiment, a virtual coupon 8934 is also displayed (e.g., floating virtual content, tethered to a wall, etc.). In one or more embodiments, the grocery store may develop applications such that virtual coupons are strategically displayed to the user at various physical locations of the grocery store, such that they are viewable by users of the AR system.

Applications may, for example, include a virtual grocery list. The grocery list may be organized by user defined criteria (e.g., dinner recipes). The virtual grocery list may be generated before the user leaves home, or may be generated at some later time, or even generated on the fly, for example in cooperation with one of the other applications. The applications may, for example, include a virtual coupon book, which includes virtual coupons redeemable for discounts or rebates on various products. The applications may, for example, include a virtual recipe book, which includes various recipes, table of contents, indexes, and ingredient lists. Selection of a virtual recipe may cause the AR system to update the grocery list.

In some implementations, the AR system may update the grocery list based on a knowledge of the various ingredients the user already has at home, whether in a refrigerator, freezer or cupboard. The AR system may collect this information throughout the day as the user works in the kitchen of their home. The applications may, for example, include a virtual recipe builder. The recipe builder may build recipes around defined ingredients. For example, the user may enter a type of fish (e.g., salmon), and the recipe builder may generate a recipe that uses the ingredient. Selection of a virtual recipe generated by the recipe builder may cause the AR system to update the grocery list. In some implementations, the AR system may update the grocery list based on a knowledge existing ingredients. The applications may, for example, include a virtual calculator, which may maintain a running total of cost of all items in the shopping cart.

Figure 89B:
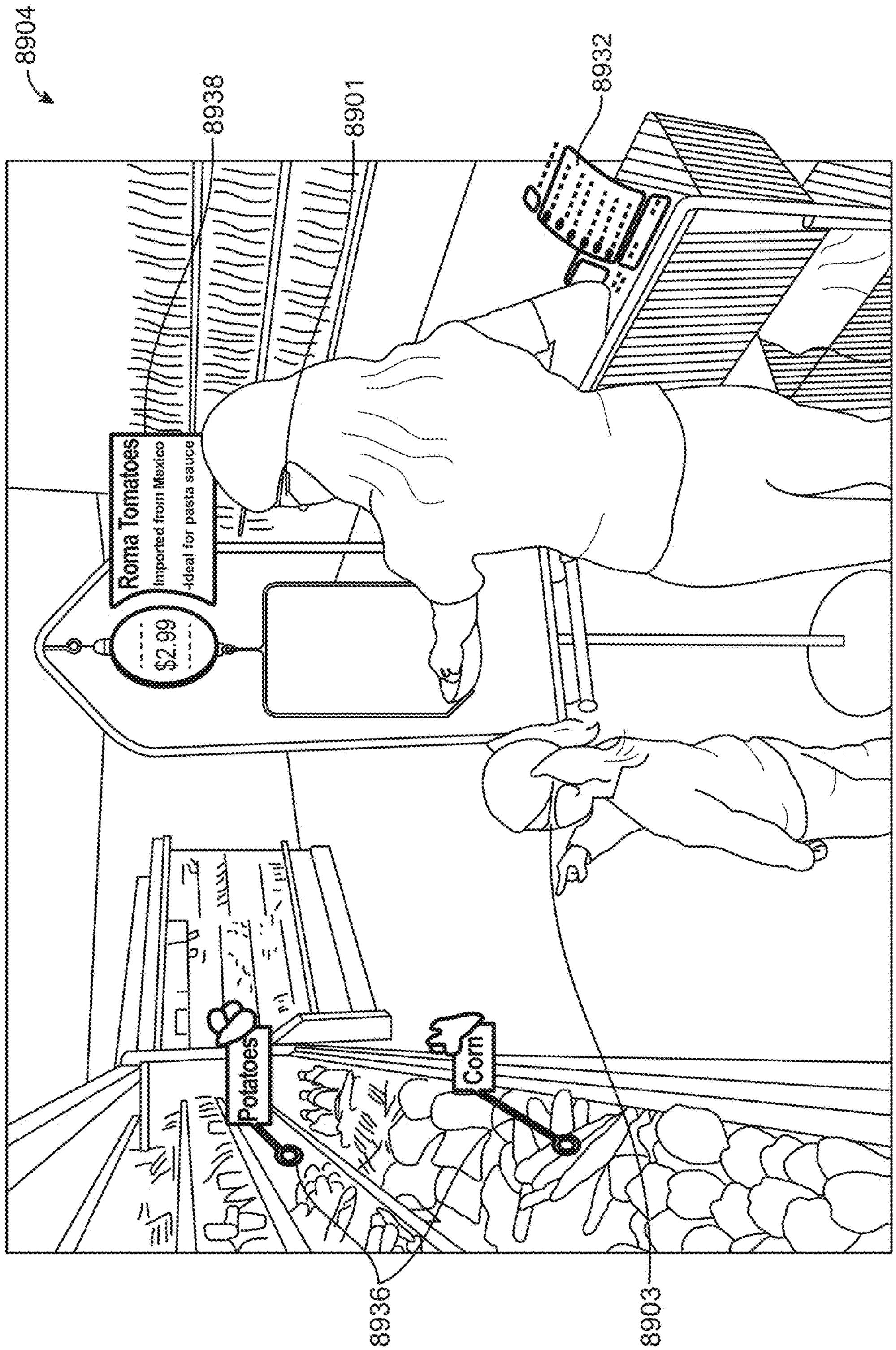

FIG. 89B shows another scenario 8904 in which the mother and the daughter with AR systems (8901 and 8903 respectively) are enjoying an augmented reality experience in the produce section of the grocery store. The mother weighs a physical food item on a scale. A virtual content box 8938 may be displayed next to the scale to provide more information about the product, as shown in FIG. 89B.

In one or more embodiments, the AR system automatically determines the total cost of the item (e.g., price per pound multiplied by weight) enters the amount into the running total cost. In one or more embodiments, the AR system automatically updates the 'smart' virtual grocery list based on location to draw attention to items on the grocery list that are nearby. For example, the AR system may update the rendering of the virtual grocery list to visually emphasize certain items (e.g., focused on fruits and vegetables in the produce section). As shown in FIG. 89B, virtual name tags 8936 may appear next to the physical vegetables (e.g., potatoes, corn, etc.), thereby serving as a reminder to the users.

Figure 89C:

Further, the AR system may render visual effects in the field of view of the user such that the visual affects appear to be around or proximate nearby physical items that appear on the virtual grocery list. FIG. 89C shows another scenario 8906 in which the child selects a virtual icon 8940 to launch a scavenger hunt application. The scavenger hunt application may make the child's shopping experience more engaging and educational. The scavenger hunt application may present a challenge (e.g., locating food items from different countries around the world). Points may be added to the child's score as she identifies food items and places them in her virtual shopping cart.

Figure 89D:
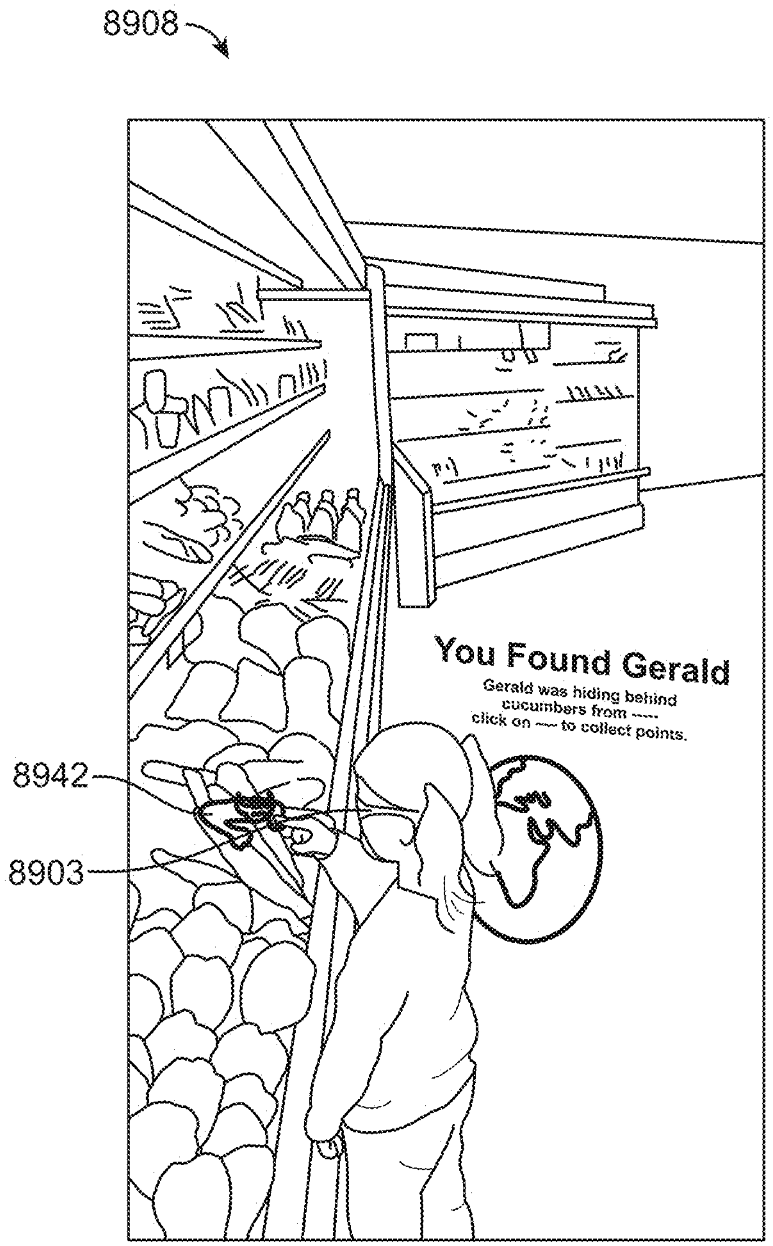

FIG. 89D shows another scenario 8908 in which the child is gesturing toward a bonus virtual icon 8942, in the form of a friendly monster or an avatar. The AR system may render unexpected or bonus virtual content to the field of view of the child's AR system 8903 to provide a more entertaining and engaging user experience for the child.

Figure 89E:
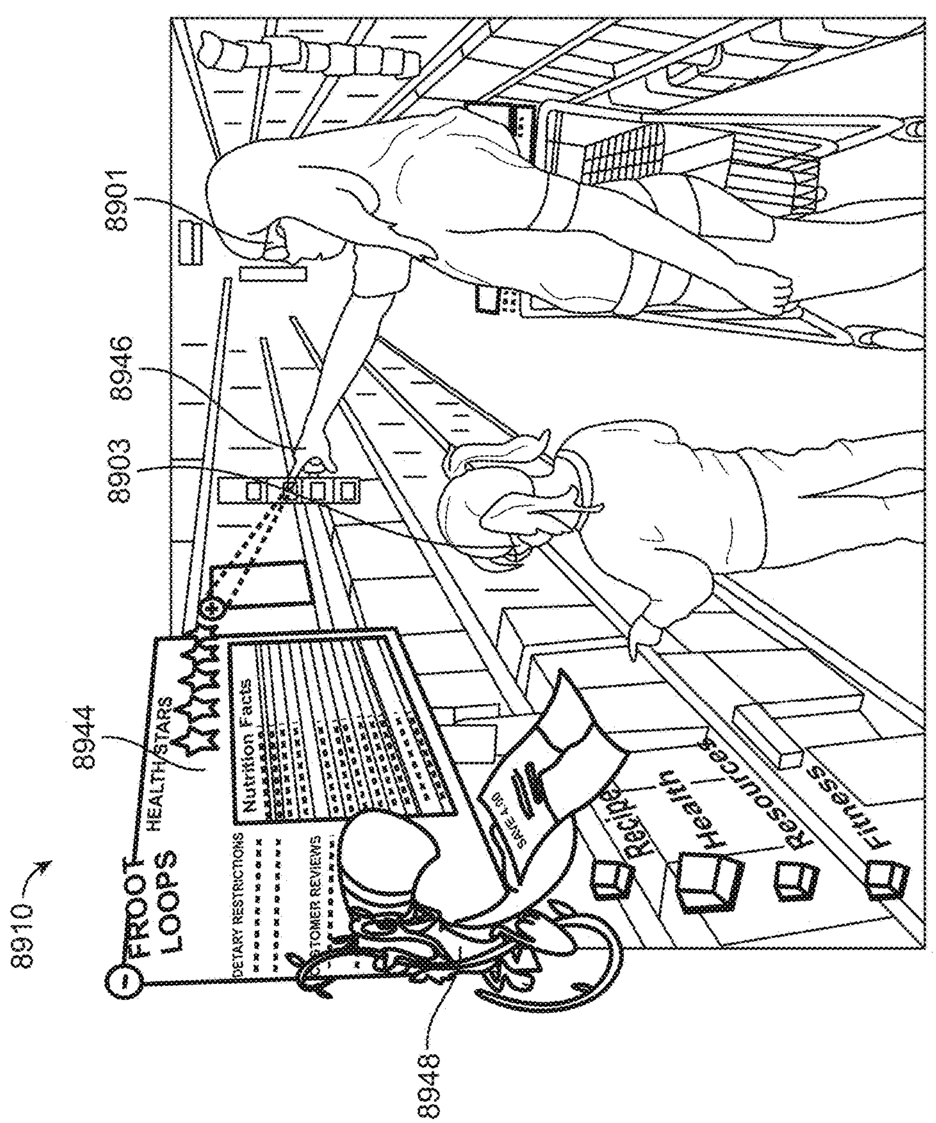

FIG. 89E shows another scenario 8910 in which the mother and daughter are in the cereal aisle of the grocery store. The mother selects a particular cereal to explore additional information, for example via a virtual presentation of metadata about the cereal, as denoted by the virtual content 8944. The metadata 8944 may, for example, include: dietary restrictions, nutritional information (e.g., health stars), product reviews and/or product comparisons, or customer comments. Rendering the metadata virtually allows the metadata to be presented in a way that is easily readable, particular for adults how may have trouble reading small type or fonts. In the illustrated embodiment, the mother is interacting with the metadata 8944 through a gesture 8946.

As also illustrated in FIG. 89E, an animated character 8948 may be rendered to any customers with virtual coupons that may be available for a particular item. The AR system may render coupons for a given product to all passing customers, or only to customers who stop. Alternatively or additionally, the AR system may render coupons for a given product to customers who have the given product on their virtual grocery list, or only to those who have a competing product on their virtual grocery list. Alternatively or additionally, the AR system may render coupons for a given product based on knowledge of a customer's past or current buying habits and/or contents of the shopping cart.

Figure 89F:
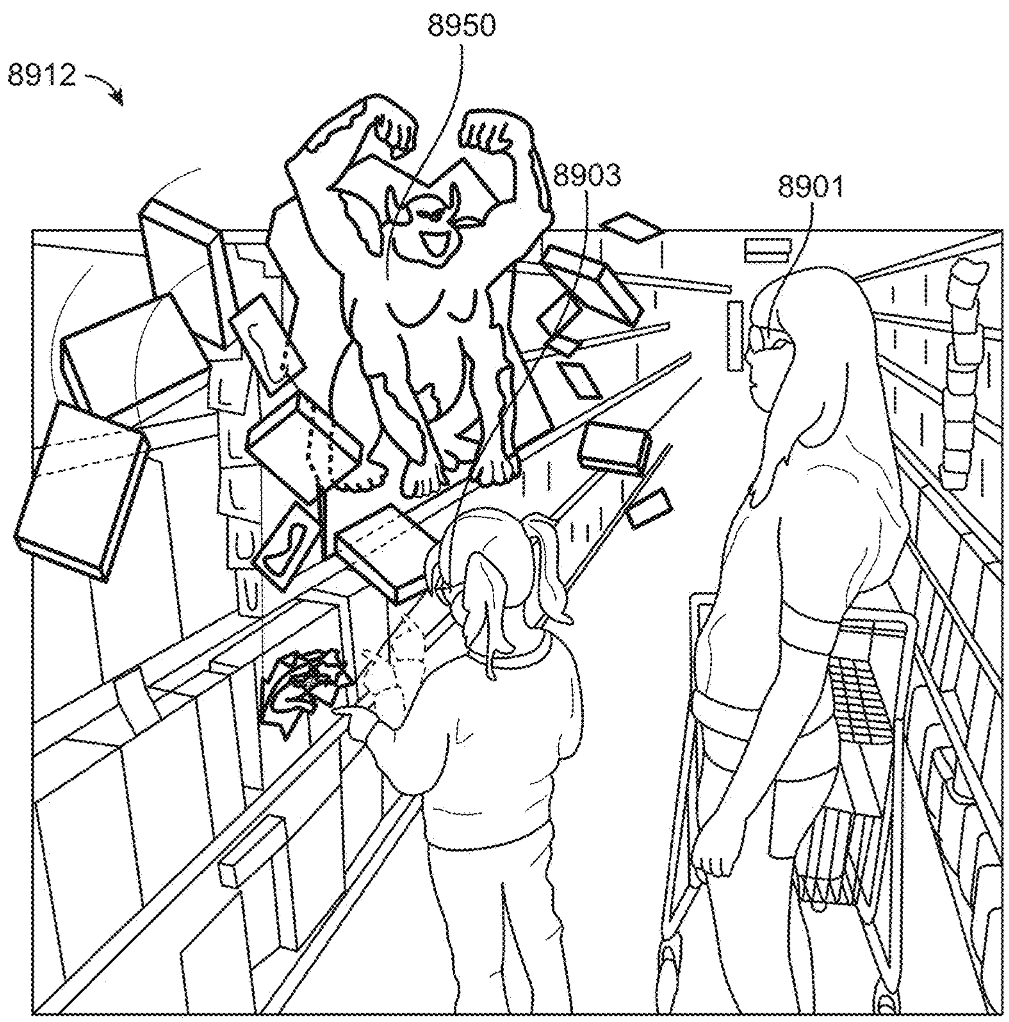

As illustrated in another scenario 8912 of FIG. 89F, the AR system may render an animated character 8950 (e.g., friendly monster) in the field of view of at least the child. The AR system may render the animated character so as to appear to be climbing out of a box (e.g., cereal box). The sudden appearance of the animated character may prompt the child to start a game (e.g., Monster Battle). The child can animate or bring the character to life with a gesture. For example, a flick of the wrist may cause the AR system to render the animated character bursting through the cereal boxes.

Figure 89G:

FIG. 89G shows another scenario 8914 illustrated the mother at an end of an aisle, watching a virtual celebrity chef 8952 (e.g., Mario Batali) performing a live demo via the AR system 8901. The virtual celebrity chef 8952 may demonstrate a simple recipe to customers. All ingredients used in the demonstrated recipe may be available at the grocery store, thereby encouraging users to make the purchase.

In some instances, the AR system may present the presentation live. This may permit questions to be asked of the celebrity chef 8952 by customers at various retail locations. In other instances, the AR system may present a previously recorded presentation.

In some implementations, the AR system may capture images of the customers, for example via inward facing cameras carried by each customer's individual head worn AR system. The AR system may provide a composited virtual image to the celebrity of a crowd composed of the various customers. This may be viewed by the celebrity chef at an AR system, or device associated with the celebrity chef.

Figure 89H:
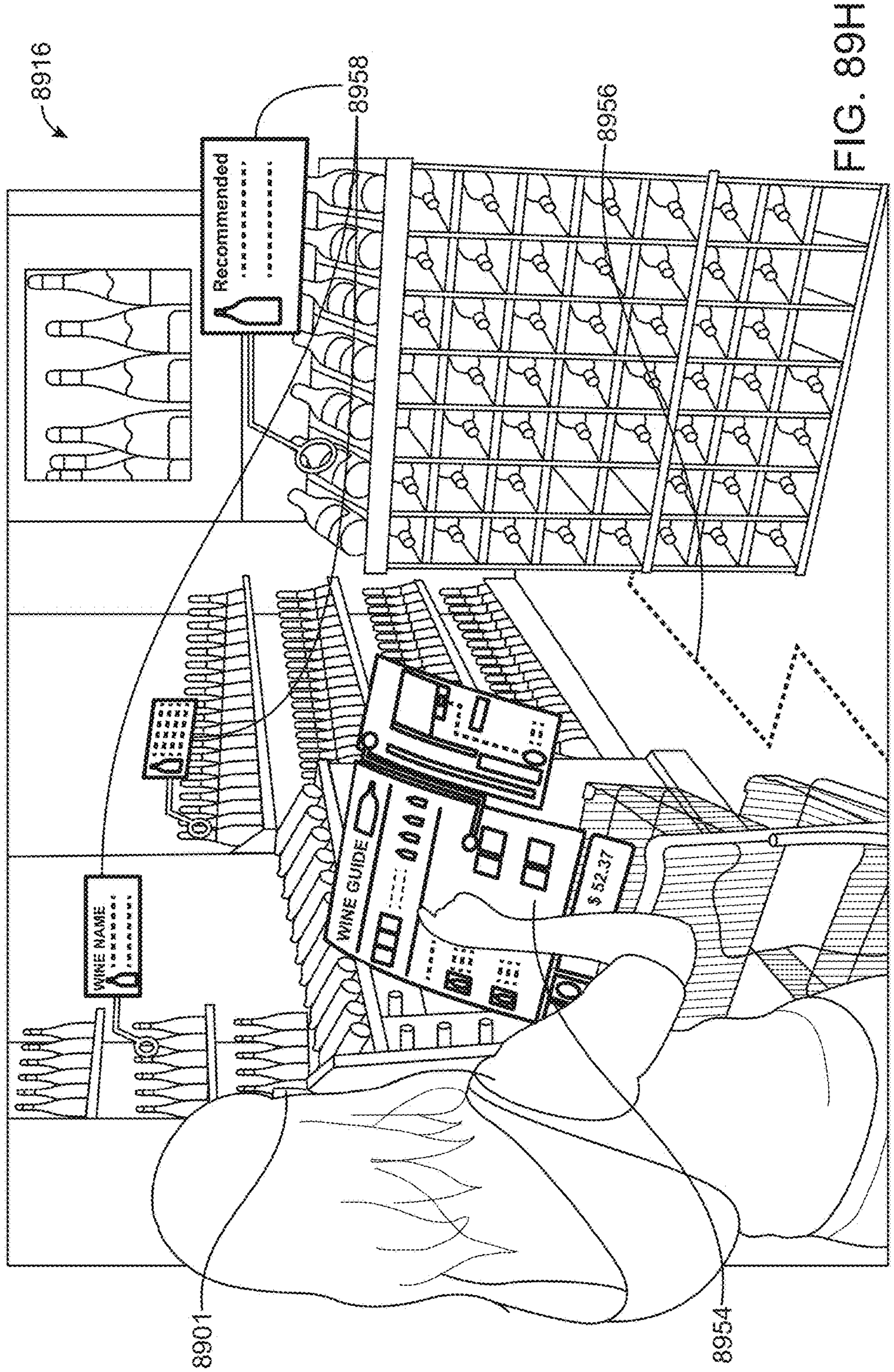

FIG. 89H illustrates another scenario 8916 in which the mother wearing the AR system 8901 is in a wine section of the grocery store. The mother may search for a specific wine using a virtual user interface 8954 of an application. The application may be a wine specific application, an electronic book, or a more general Web browser. In response to selection of a wine, the AR system may render a virtual map 8956 in the field of view of the user, with directions for navigating to the desired wine, denoted by virtual name tags 8958.

While the mother is walking through the aisles, the AR system may render data attached to the virtual name tags 8958 which appear to be attached or at least proximate respective bottles of wines. The data may, for example, include recommendations from friends, wines that appear on a customer's personal wine list, and/or recommendations from experts. The data may additionally or alternatively include food parings for the particular wine.

Figure 89I:
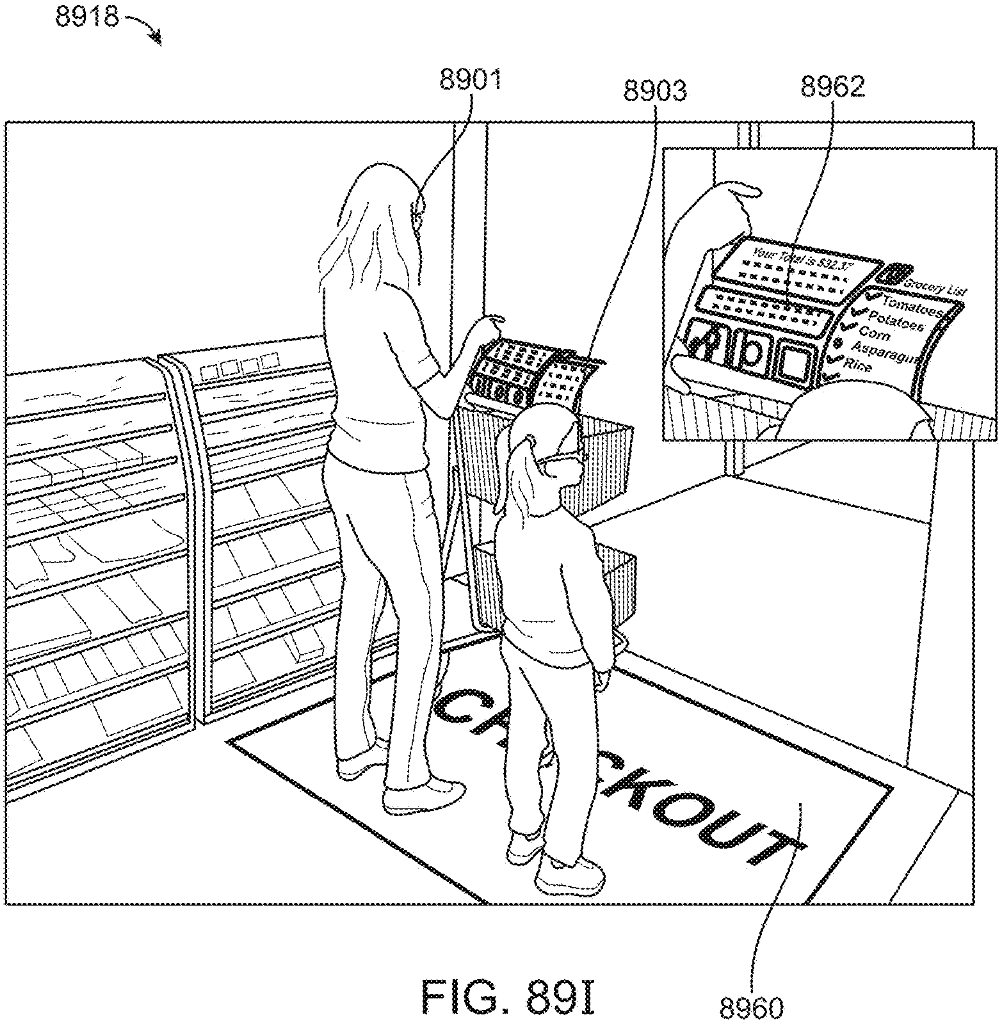

FIG. 89I illustrates scenario 8918 in which the mother and child conclude their shopping experience. The mother and child may, for example, by walking onto, across or through a threshold 8960. The threshold 8960 may be implemented in any of a large variety of fashions, for example as a suitably marked map. The AR system detects passage over or through the threshold 8960, and in response totals up the cost of all the groceries in the shopping cart. The AR system may also provide a notification or reminder to the user, identifying any items on the virtual grocery list where are not in the shopping cart and thus may have been forgotten. The customer may complete the check-out through a virtual display 8962. In one or more embodiments, the transaction may be conducted seamlessly without a credit card or any interaction with a cashier (e.g., money is automatically deducted from the user's bank, etc.).

Figure 89J:
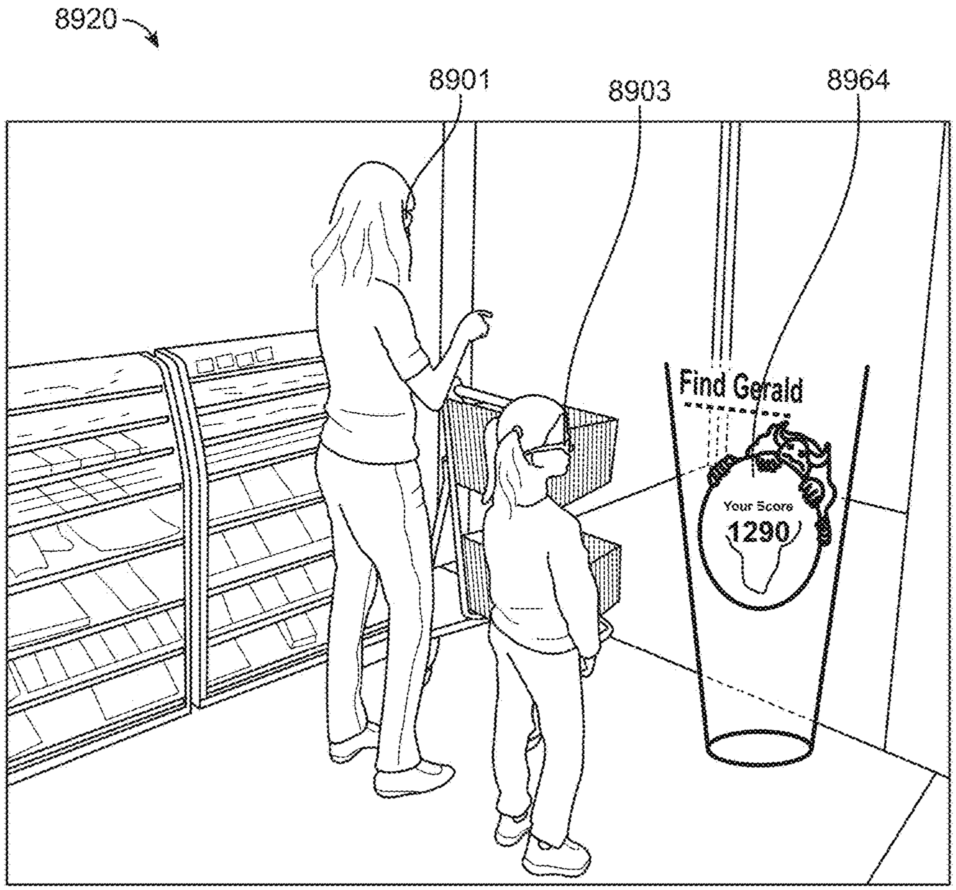

As illustrated in the scenario 8920 of FIG. 89J, at the end of the shopping experience, the child receives a summary of her scavenger hunt gaming experience through a virtual score box 8964. The AR system may render the summary as virtual content, at least in the field of view of the child using AR system 8903.

Figure 90:
FIG. 90 illustrates an example library experience with the AR system, according to one or more embodiments.

FIG. 90 shows a scenario 9000 in which a customer employing an AR system 9001 is in a retail environment, for example a bookstore, according to one illustrated embodiment.

As shown in FIG. 90, the customer may pick up a book totem 9012. The AR system 9001 detects the opening of the book totem 9012, and in response renders an immersive virtual bookstore experience in the user's field of view. The virtual bookstore experience may, for example, include reviews of books, suggestions, and author comments, presentations or readings. The AR system may render additional content 9014, for example virtual coupons. The virtual environment combines the convenience of an online bookstore with the experience of a physical environment.

Figure 91A:
FIGS. 91A-91F illustrate an example healthcare experience with the AR system, according to one or more embodiments.

FIGS. 91A-91F illustrate scenarios of using AR systems in health care related applications. In particular, FIG. 91A shows a scenario 9102 in which a surgeon and surgical team (each wearing AR systems 9101) are conducting a pre-operative planning session for an upcoming mitral valve replacement procedure. Each of the health care providers is wearing a respective individual AR system 9101.

As noted above, the AR system renders a visual representation 9114 of the consulting or visiting surgeon. As discussed herein, the visual representation 9114 may take many forms, from a very simple representation (e.g., an avatar) to a very realistic representation (e.g., the surgeon's physical form, as shown in FIG. 91A).

The AR system renders a patient's pre-mapped anatomy (e.g., heart) in virtual form 9112 for the team to analyze during the planning. The AR system may render the anatomy using a light field, which allows viewing from any angle or orientation. For example, the surgeon could walk around the heart to see a back side thereof.

The AR system may also render patient information. For instance, the AR system may render some patient information 9116 (e.g., identification information) so as to appear on a surface of a physical table. Also for instance, the AR system may render other patient information (e.g., medical images, vital signs, charts) so as to appear on a surface of one or more physical walls.

Figure 91B:
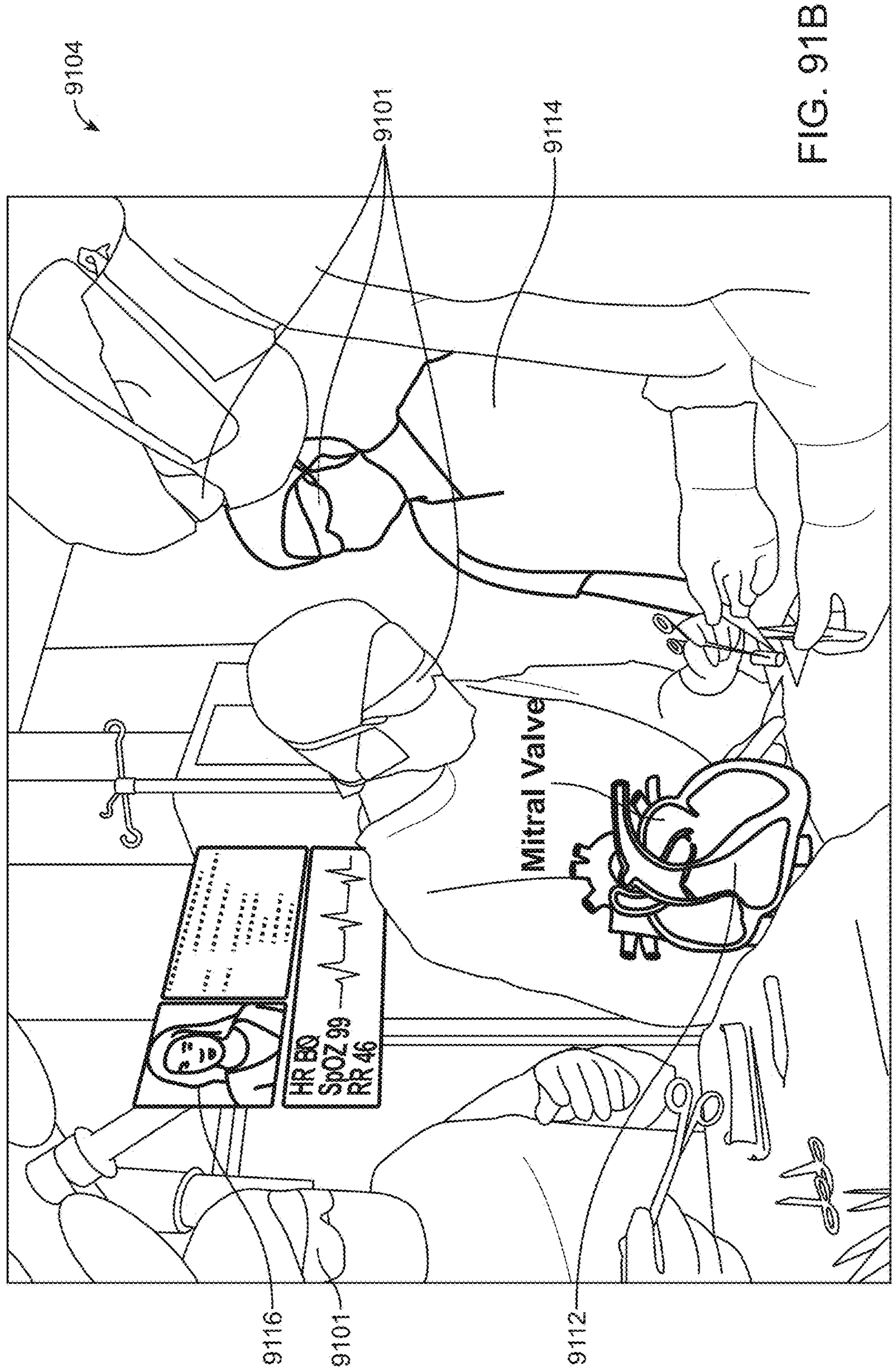

As illustrated in FIG. 91B, the surgeon is able to reference the pre-mapped 3D anatomy 9112 (e.g., heart) during the procedure. Being able to reference the anatomy in real-time may, for example, improve placement accuracy of a valve repair. Outward pointed cameras capture image information from the procedure, allowing a medical student to observe virtually via the AR system from her remote classroom. The AR system makes a patient's information readily available, for example to confirm the pathology, and/or avoid any critical errors.

Figure 91C:
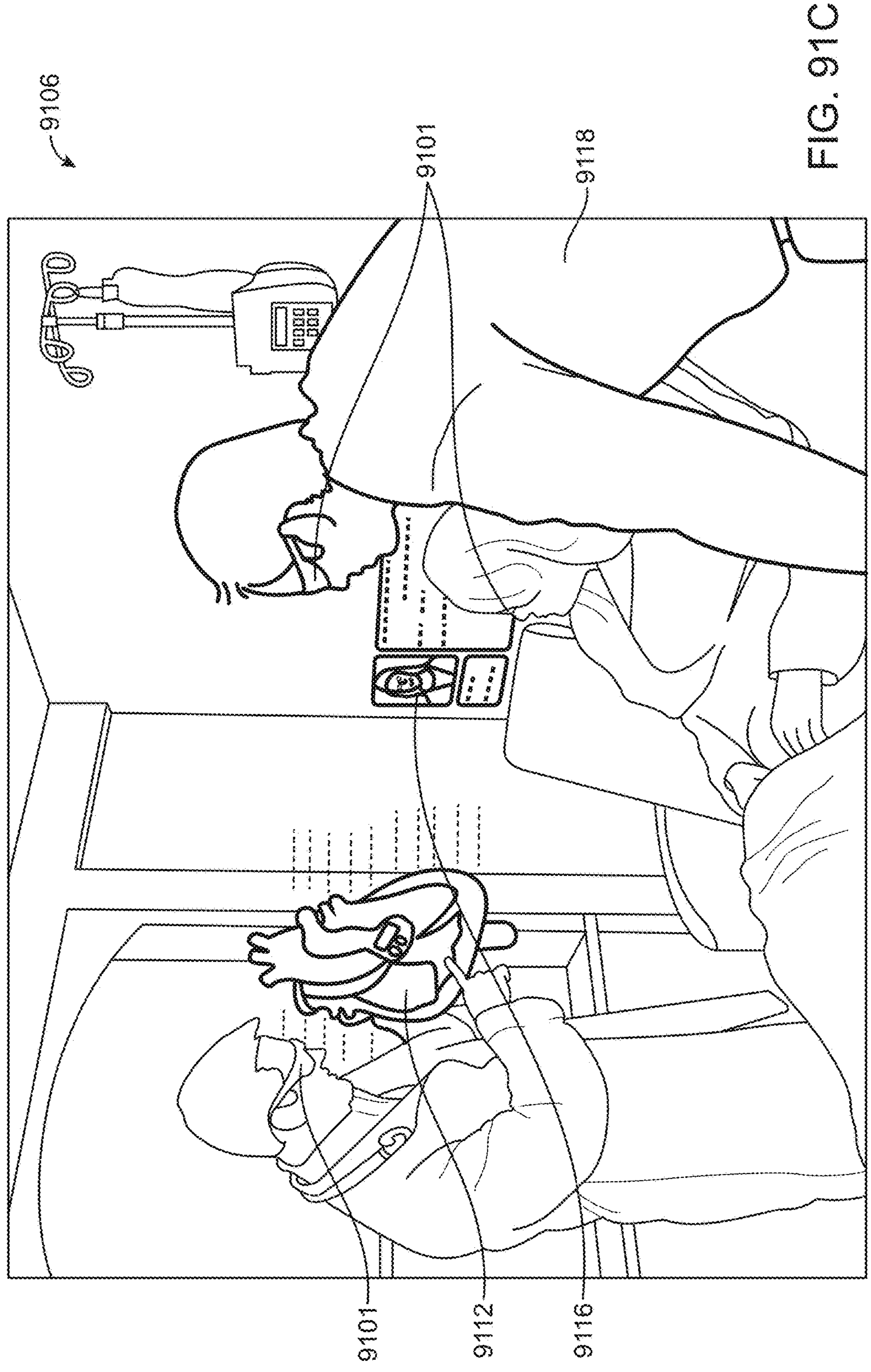

FIG. 91C shows a post-operative meeting or debriefing between the surgeon and patient. During the post-operative meeting, the surgeon is able to describe how the surgery went using a cross section of virtual anatomy 9112 or virtual 3D anatomical model of the patient's actual anatomy. The AR system allows the patient's spouse to join the meeting virtually through a virtual representation 9118 while at work. Again, the AR system may render a light field which allows the surgeon, patient and spouse to inspect the virtual 3D anatomical model of the patient's actual anatomy from an desired angle or orientation.

Figure 91D:
Figure 91E:
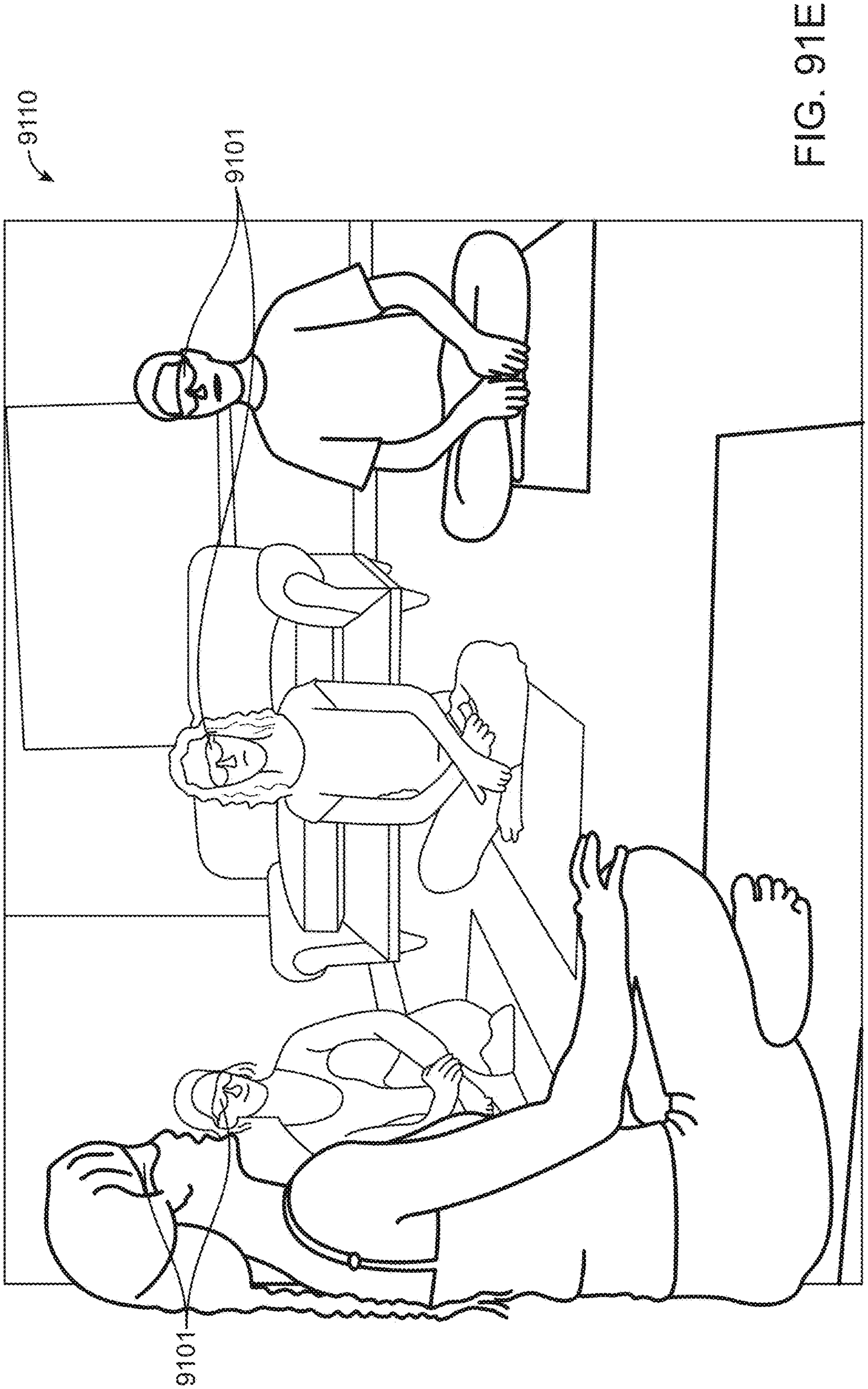

FIG. 91D shows a scenario 9108 in which the patient is recovering in a hospital room. The AR system 9101 allows the patient to perceive any type of relaxing environment through a virtual setting 9120 selected by the patient, for example a tranquil beach setting.

As illustrated in scenario 9110 of FIG. 92E, the patient may practice yoga or participate in some other rehabilitation during the hospital stay and/or after discharge. The AR system 9101 allows the patient to perceive a friend virtually rendered environment in a virtual yoga class.

Figure 91F:
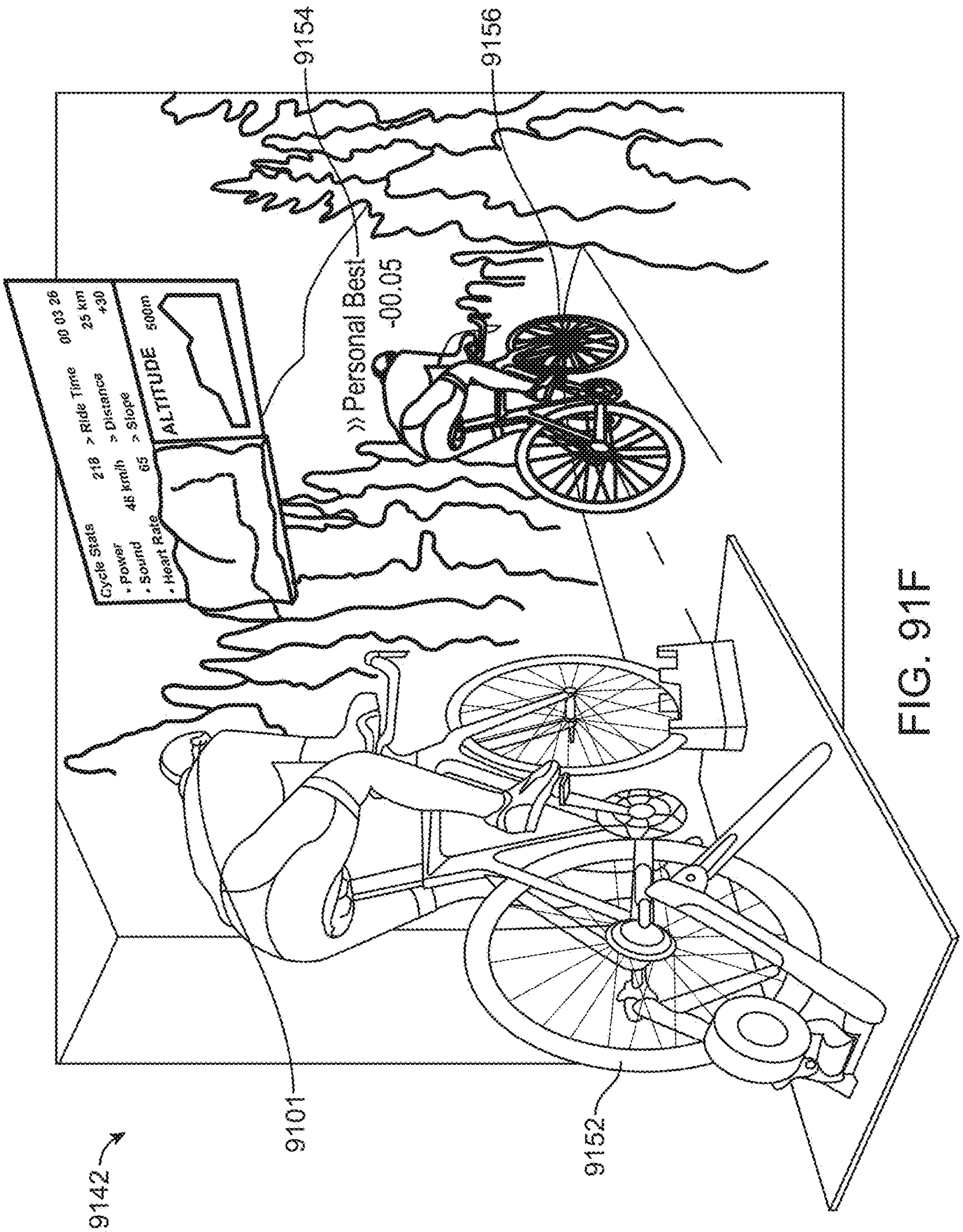

As illustrated in the scenario 9142 of FIG. 91F, the patient may participate in rehabilitation, for example by riding on a stationary bicycle 9152 during the hospital stay and/or after discharge. The AR system (not shown) renders, in the user's field of view, virtual information 9154 about the simulated cycling route (e.g., map, altitude, distance), patient's performance statistics (e.g., power, speed, heart rate, ride time). The AR system renders a virtual biking experience, for example including an outdoor scene, replicating a ride course such as a favorite physical route. Additionally or alternatively, the AR system renders a virtual avatar 9156 as a motivational tool. The virtual avatar may, for example, replicate a previous ride, allowing the patient to compete with their own personal best time.

Figure 92:
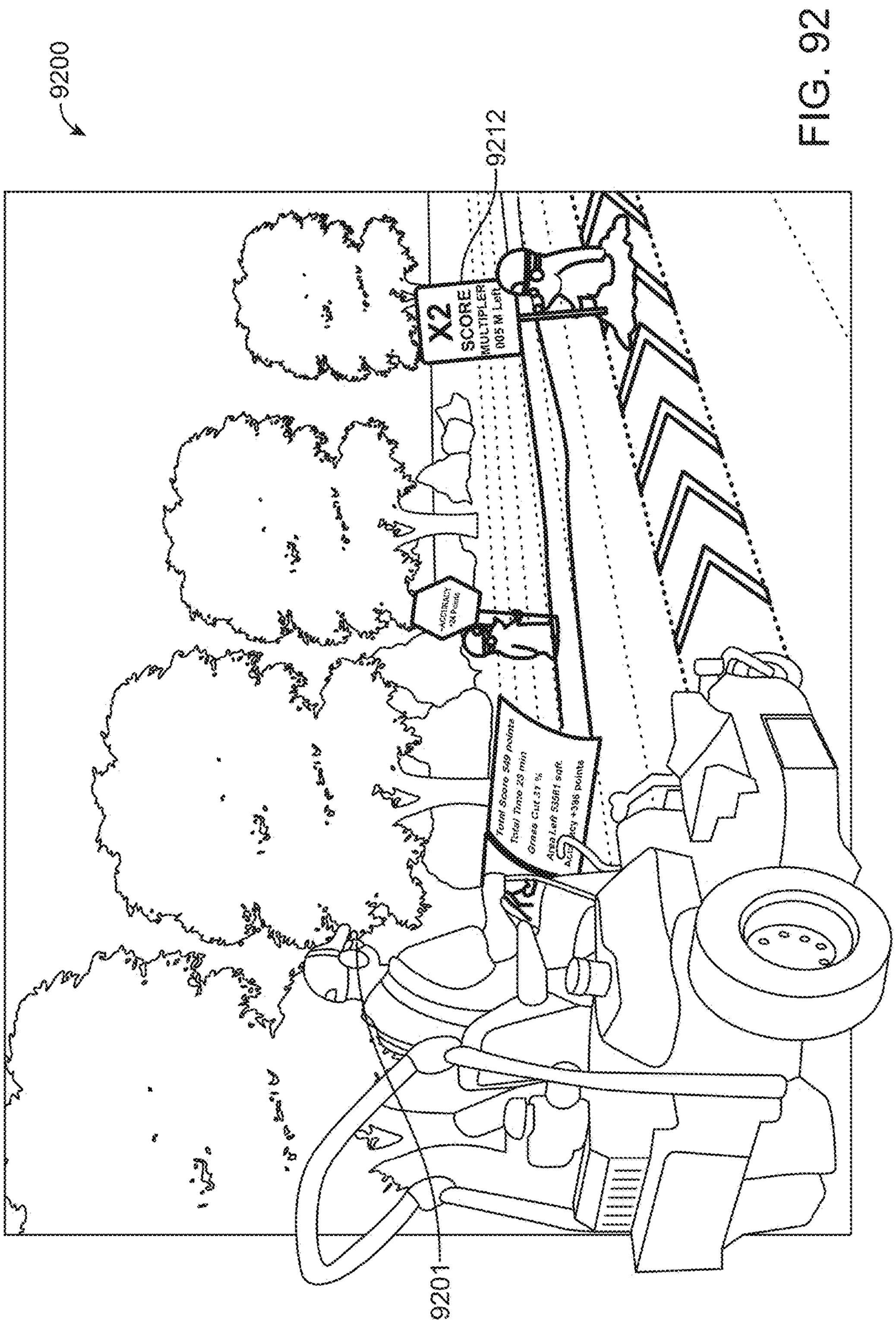
FIG. 92 illustrates an example labor experience with the AR system, according to one or more embodiments.

FIG. 92 shows a scenario 9200 in which a worker employs an AR system 9201 in a work environment, according to one illustrated embodiment. In particular, FIG. 92 shows a landscaping worker operating machinery (e.g., lawn mower). Like many repetitive jobs, cutting grass can be tedious. Workers may lose interest after some period of time, thereby increasing the probability of an accident. Further, it may be difficult to attract qualified workers, or to ensure that workers are performing adequately.

The worker wears an individual AR system 9201, which renders virtual content in the user's field of view to enhance job performance. For example, the AR system may render a virtual game 9212, in which the goal is to follow a virtually mapped pattern. Points are received for accurately following the pattern and hitting certain score multipliers before they disappear. Points may be deducted for straying from the pattern or straying too close to certain physical objects (e.g., trees, sprinkler heads, roadway).

While only one example environment is illustrated, this approach can be implemented in a large variety of work situations and environments. For example, a similar approach can be used in warehouses for retrieving items, or in retail environments for stacking shelves, or for sorting items such as mail. This approach may reduce or eliminate the need for training, since a game or pattern may be provided for many particular tasks.

Figures 93A, 93B, 93C:
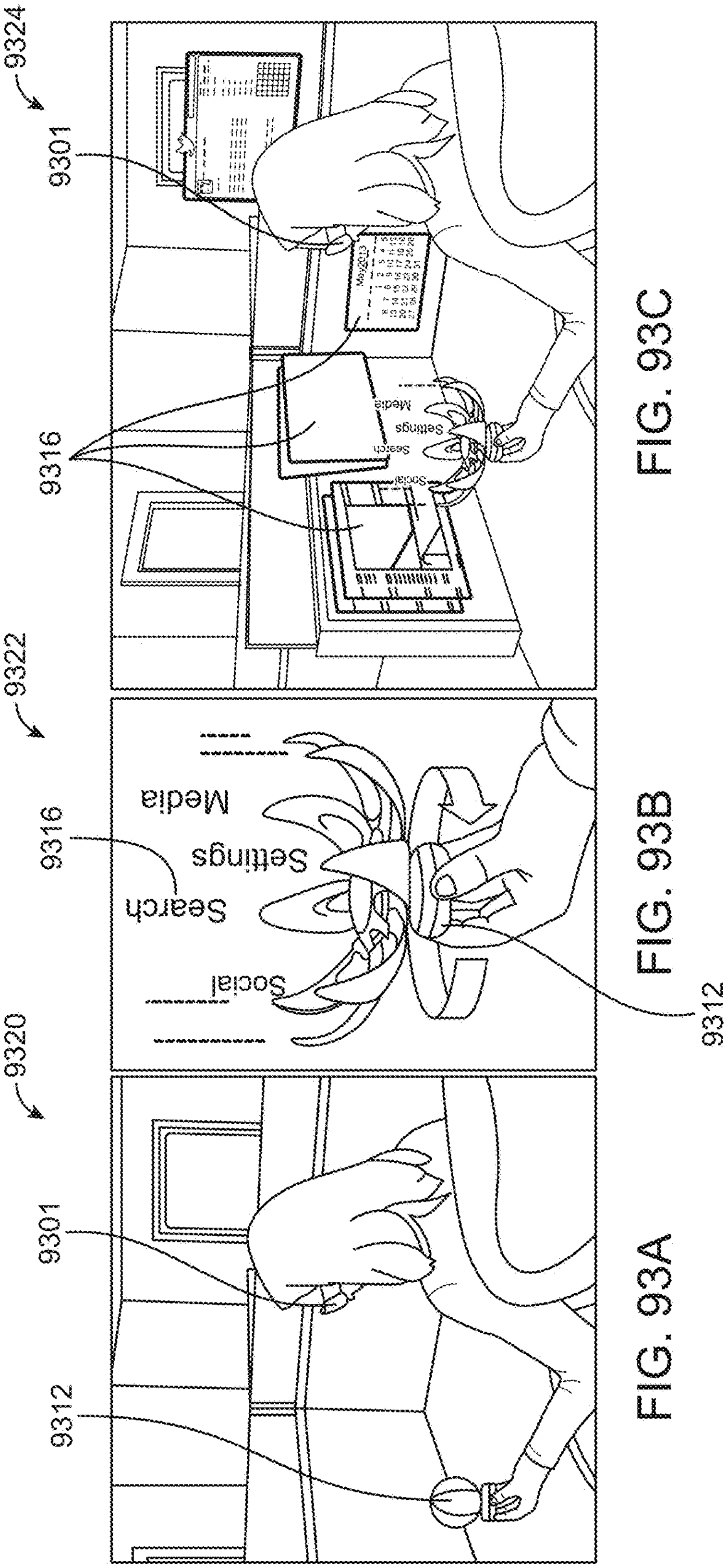
FIGS. 93A-93L illustrate an example workspace experience with the AR system, according to one or more embodiments.

FIGS. 93A-93C show a user of an AR system 9301 in a physical office environment, interacting with a physical orb shaped totem 9312 (e.g., orb totem), according to another illustrated embodiment. As illustrated in FIG. 93B, with a twist of her wrist, the user activates the AR system's virtually primary navigation menu, which is rendered in the user's field of vision to appears above the orb totem. As best illustrated in FIG. 93C, the AR system also renders previously mapped virtual content to appear around the workspace as well. For example, the AR system also renders may render a virtual user interface associated with a social media account (e.g., Twitter®, Facebook®), calendar, Web browser, electronic mail application.

In the illustrated embodiment, the user of the AR system 9301 uses a clockwise (or counter-clockwise) motion to "open" the totem 9312. The totem 9312 may be thought of as a virtual user interface that allows the user to interact with the AR system.

In the illustrated embodiment, in scene 9320, the user picks up the totem 9312. In scene 9322, the use makes a predetermined gesture or movement in relation to the totem 9312 to display a set of virtual menu 9316. It should be appreciated that this mapping of the totem and the virtual interface may be pre-mapped such that the AR system recognizes the gesture and/or movement, and displays the user interface appropriately.

In scene 924, one or more virtual items 9318 are also displayed in the user's physical space. For example, the user may have selected one or more items to display through the user interface 9316. The user's physical space is now surrounded by virtual content desired by the user. In one or more embodiments, the virtual items 9318 may float in relation to the user (e.g., body-centric, head-centric, hand-centric, etc.) or be fixed to the physical surroundings (e.g., world-centric). The orb totem 9312 serves as a sort of backpack, allowing the user to take along a set of virtual content desired by the user.

Figure 93D:
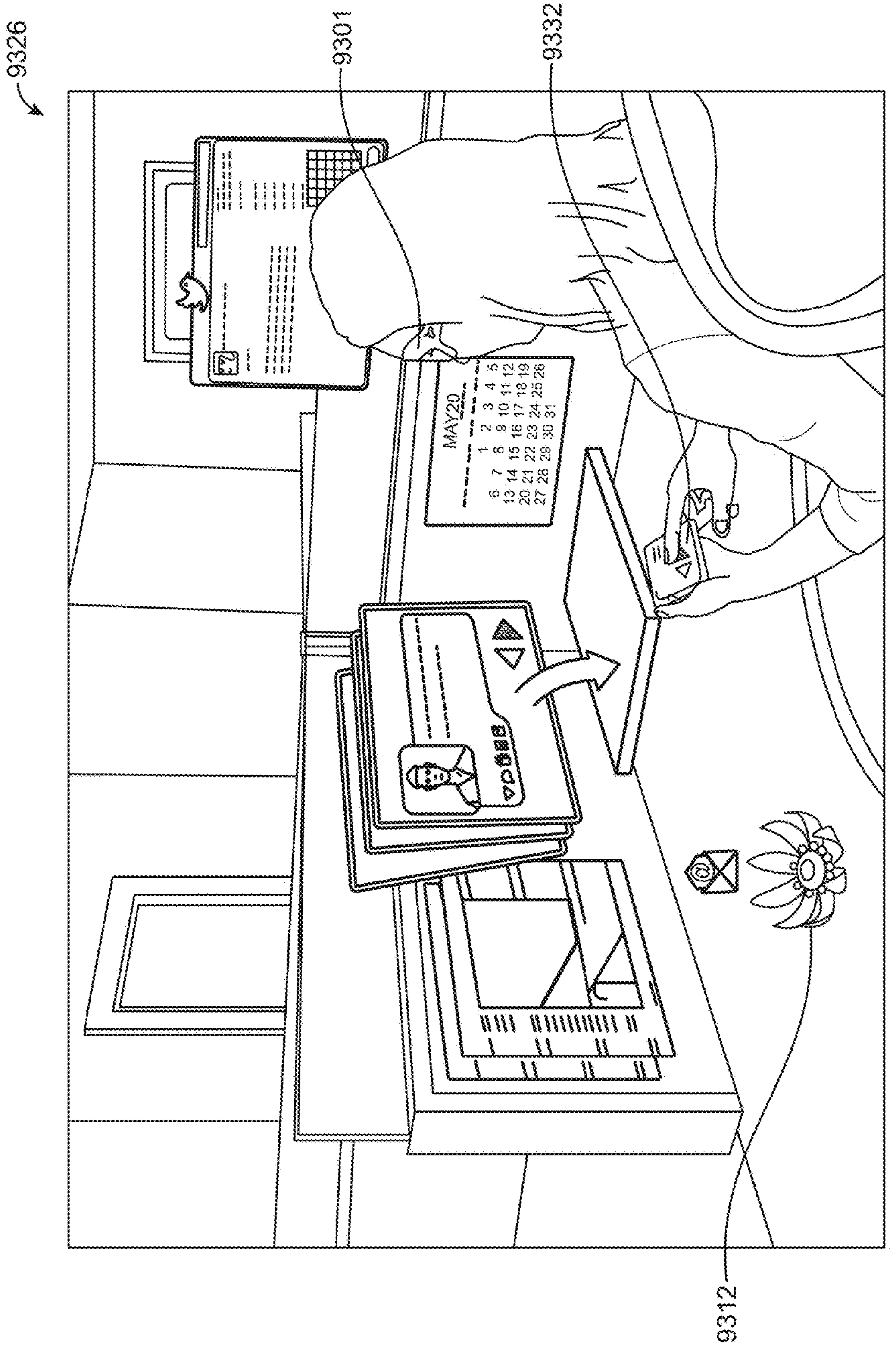

FIG. 93D shows scene 9326 in which the user is interacting with a second physical totem 9332 rendered by the AR system 9301, according to another illustrated embodiment.

The AR system 9301 collects image information, for example via one or more outward facing cameras on the body or head worn component. The AR system 9301 may, optionally, collect additional information about the physical space, for example an identity of any available wireless communications networks, GPS location information, compass, etc. The AR system processes the collected information in order to determine an identity of the particular physical space in which the user is located. For example, the AR system may employ a variety of object recognizers to recognize various physical objects in the environment (e.g., walls, desk, chair). Also for example, the AR system may combine such with other information (e.g., GPS, compass, wireless network related), for instance as a topographical map, in order to ascertain the physical location of the user. For example, the AR system may employ a geometric map to propagate connectivity to a topological map. The topological map be an index into geometry, for example based on basis vectors (e.g., WI-FI, GPS, RSS, hash of space objects, hash of features, histogram profiles, optical markers).

The AR system may also optionally determine a current time at the physical location (e.g., 9:15 AM). Based on the determined physical location, and optionally the current time, AR system renders virtual content to the field of view of the user, generating a view of a virtual office space, populated with virtual objects, people, and/or avatars.

The AR system may, for example, render a virtual calendar. The AR system may render the virtual calendar to, for instance, appear to the user as if the virtual calendar were hanging on a physical wall in the user's workspace in the physical office environment. The AR system may, for example, render a one or more virtual pieces of work (e.g., virtual charts, virtual diagrams, virtual presentations, virtual documents). The AR system may render the pieces of work to, for instance, appear to the user as if the virtual pieces of work were posted in front of a physical wall in the user's workspace in the physical office environment.

The AR system may render a virtual social network (e.g., Twitter®) user interface. The AR system may, for example, render virtual social network user interface to, for instance, appear to the user as if the virtual calendar were hanging on a physical wall in the user's workspace in the physical office environment.

The AR system may render a virtual electronic mail (e.g., email) user interface. The AR system may, for example, render a plurality of virtual email messages in a set, which can be scrolled through via gestures performed by the user and detected by the AR system. For instance, the AR system may render a set of virtual email messages to be read and a set of virtual email messages which the user has already read. As the user scrolls through the virtual email messages, the AR system re-renders the virtual content such that the read virtual email messages are moved from the unread set to the read set. The user may choose to scroll in either direction, for example via appropriate gestures. On receipt of a new email message, the AR system may render a virtual icon in the field of view of the user, indicative of the arrival of the new email message. The virtual icon may, for example, appear to fly through the air, for instance toward the orb totem.

As illustrated in FIG. 93D, the user can interact with the second physical totem 9332, to which the AR system may have mapped a virtual key pad. Thus, the AR system may render a virtual key pad in the user's field of view, so as to appear as if the virtual key pad were on a surface of the second physical totem 9332. The user interacts with the second physical totem 9332, for example via typing type finger motions and/or tablet type finger motions (e.g., swiping). The AR system captures image information of the user's interactions with the second physical totem. The AR system interprets the user interactions in light of a mapping between locations of interactions and locations of various virtual keys being rendered. The AR system 9301 converts the interactions into key stroke data, which may be represented in any of a large variety of forms (e.g., ASCII, extended ASCII). This may allow the user to, for example, interact with email messages, social network interfaces, calendars, and/or pieces of work.

Figure 93E:
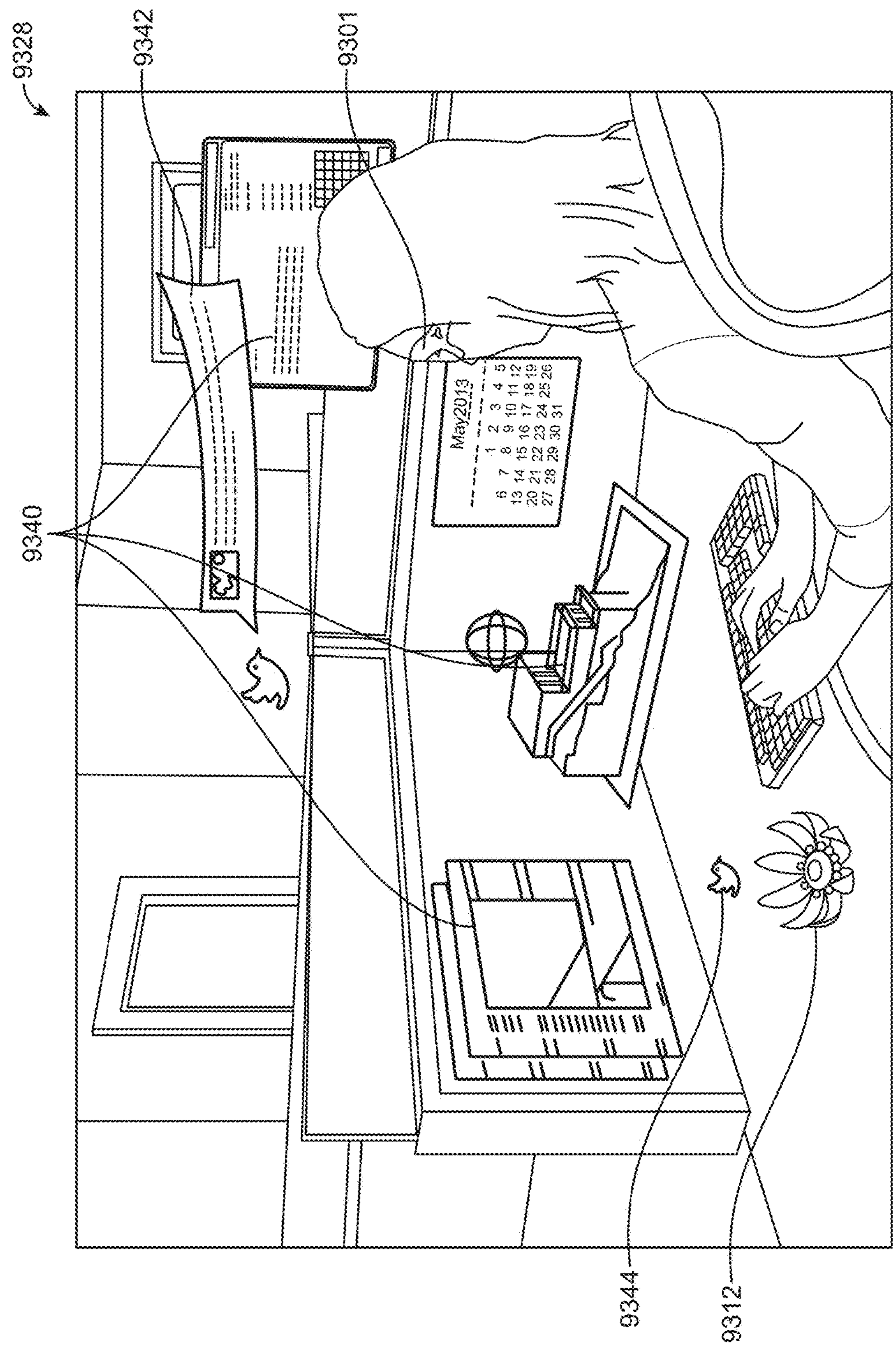

FIG. 93E shows scene 9328 in which the user in a physical office environment is interacting with a physical keyboard, according to another illustrated embodiment.

The AR system maps and renders virtual content 9340 in the virtual office space, mapped to seem to the user to appear at various locations in the physical office space. The virtual content 9340 may include various work related applications or application user interfaces. For example, the AR system 9301 may render a 3D program including a 3D architectural model to help the user visualize a structure.

In response to receipt of a new message, the AR system may provide a notification to the user. For example, the AR system may render a virtual visual effect of a message 9342 (e.g., email, Tweet®) flying into the user' field of view, and optionally an aural alert or notification. In some implementations, the AR system assess a relative importance of the message, for instance rendering the visual and/or audio affect only for significantly important message.

In response to receipt of a new gift (e.g., a virtual gift from a friend), the AR system may provide a notification to the user. For example, the AR system may render a virtual visual effect of a bird 9344 flying into the user' field of view and dropping a virtual package next to the orb totem 9312. The AR system may additionally, or alternatively provide an aural alert or notification. The user may gesture to open the virtual package. In response to the gesture, the AR system renders images of the virtual package opening to reveal that the gift is a game for the user to play.

As shown in FIG. 93E, the user may interact with the physical (real) keyboard to interact with the virtual content. The physical keyboard may be an actual keyboard, yet may function as a totem. For example, the AR system may have mapped a set of virtual keys to the physical keyboard. The user interacts with the physical keyboard, for example via typing type finger motions. The AR system captures image information of the user's interactions with the physical keyboard. The AR system interprets the user interactions in light of a mapping between locations of interactions and locations of various physical keys.

The AR system converts the interactions into key stroke data, which may be represented in any of a large variety of forms (e.g., ASCII, extended ASCII). This may allow the user to, for example, interact with email messages, social network interfaces, calendars, and/or pieces of work. Notably, there may be no wired or wireless communications from the physical keyboard to any other component.

Figure 93F:
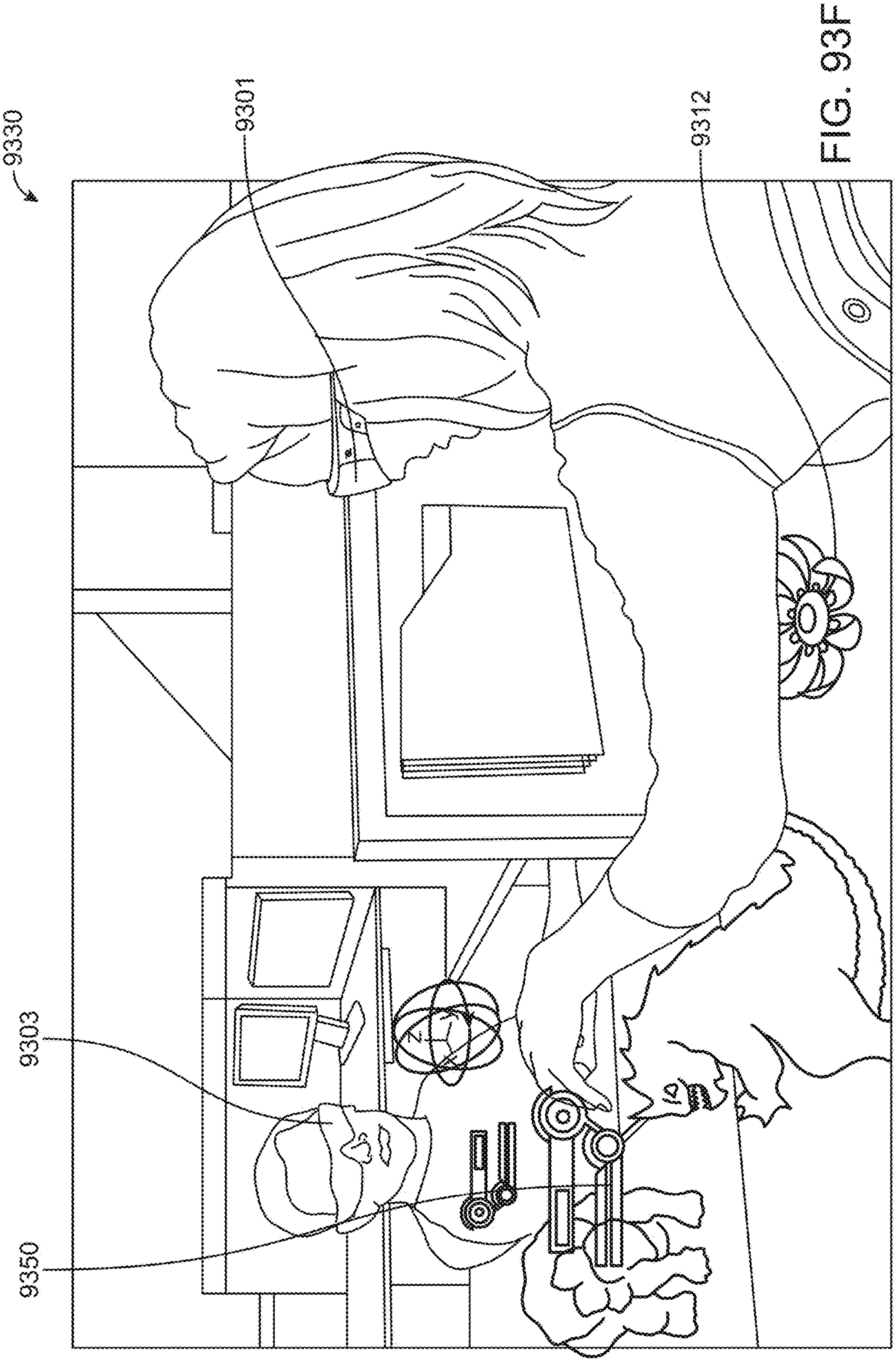

FIG. 93F shows scene 9330 of a pair of users (wearing AR devices 9301 and 9303 respectively) in a physical office environment, interacting with a virtual office space and game, according to another illustrated embodiment.

As illustrated in FIG. 93F, the user of AR system 9303 may have launched a game 9350. The AR system 9303 communicates, either directly or indirectly, with the first AR system 9301, for example via passable world models. The interaction between the two individual AR systems causes the first user's individual AR system to render a scene which includes a virtual monster character peeking over the cubicle wall to challenge the first user to a particular game. This serves as a virtual invitation to join the game. The first user may accept by selecting her own virtual monster, and assigning it to a battleground at the end of the first user's desk. The game may evolve from that point, each user experiencing the same game via rendering to their respective individual AR systems. While illustrated with two users, a game may involve a single user, or more than two users. In some implementations, games may include thousands of users.

Figure 93G:
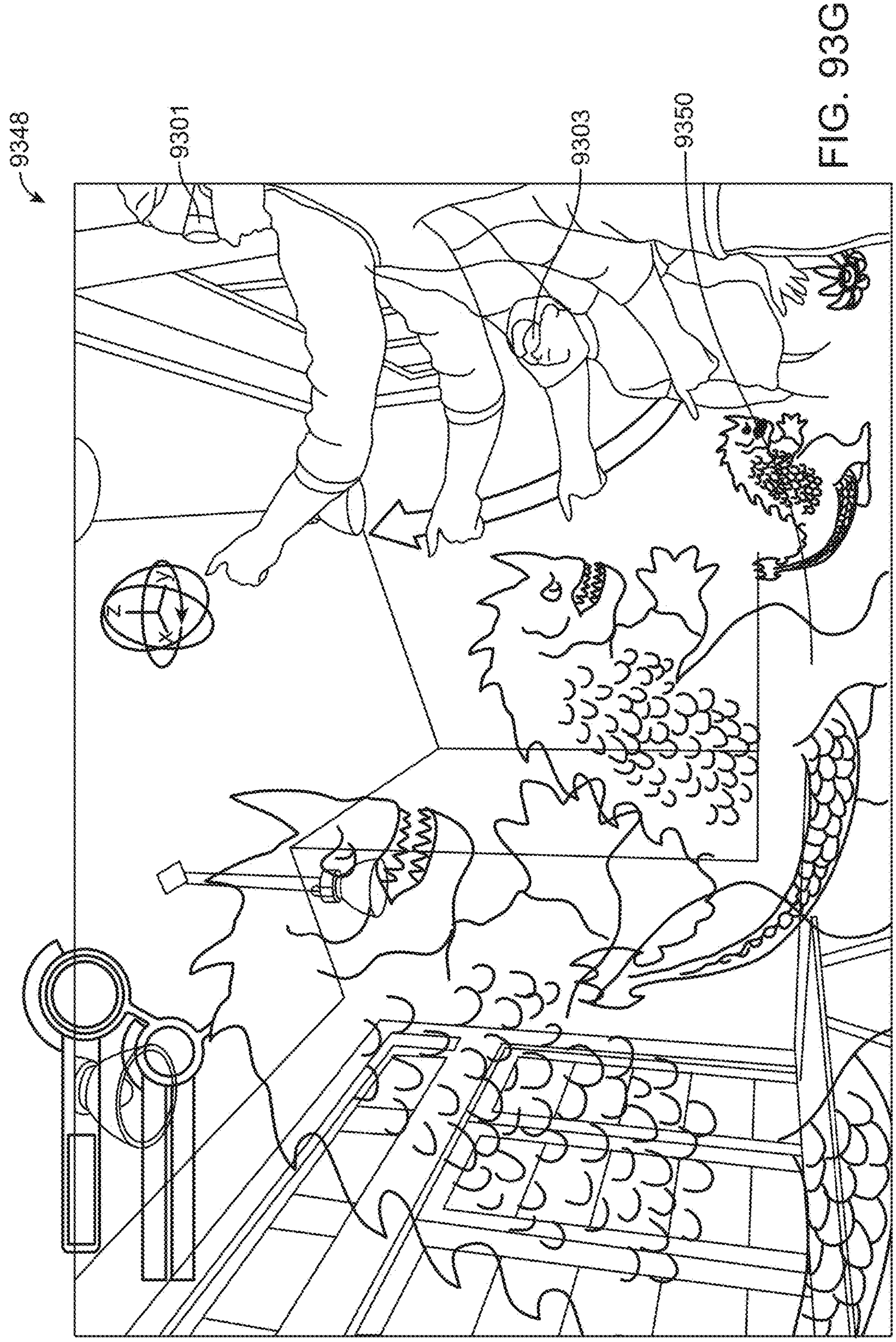

FIG. 93G shows scene 9348 of a pair of users in a physical office environment, interacting with a virtual office space and game through their respective AR systems 9301 and 9303.

As illustrated in FIG. 93G, the first user reassigns a battleground for their player (e.g., monster) from the end of her desk to a floor of the physical office environment. In response, the AR system may re-render the virtual content related to the game so as to appear to each of the users as if the battle is taking place on the floor. The AR system may adapt the game to changes in physical location. For example, the AR system may automatically scale the rendered content based on a size of an area or volume to which the virtual content has been mapped.

In the illustrated example, moving her monster from the desk to the ground increases the available space. Hence, the AR system may automatically scale the size of the first user's monster up, to fill the available space.

Figure 93H:
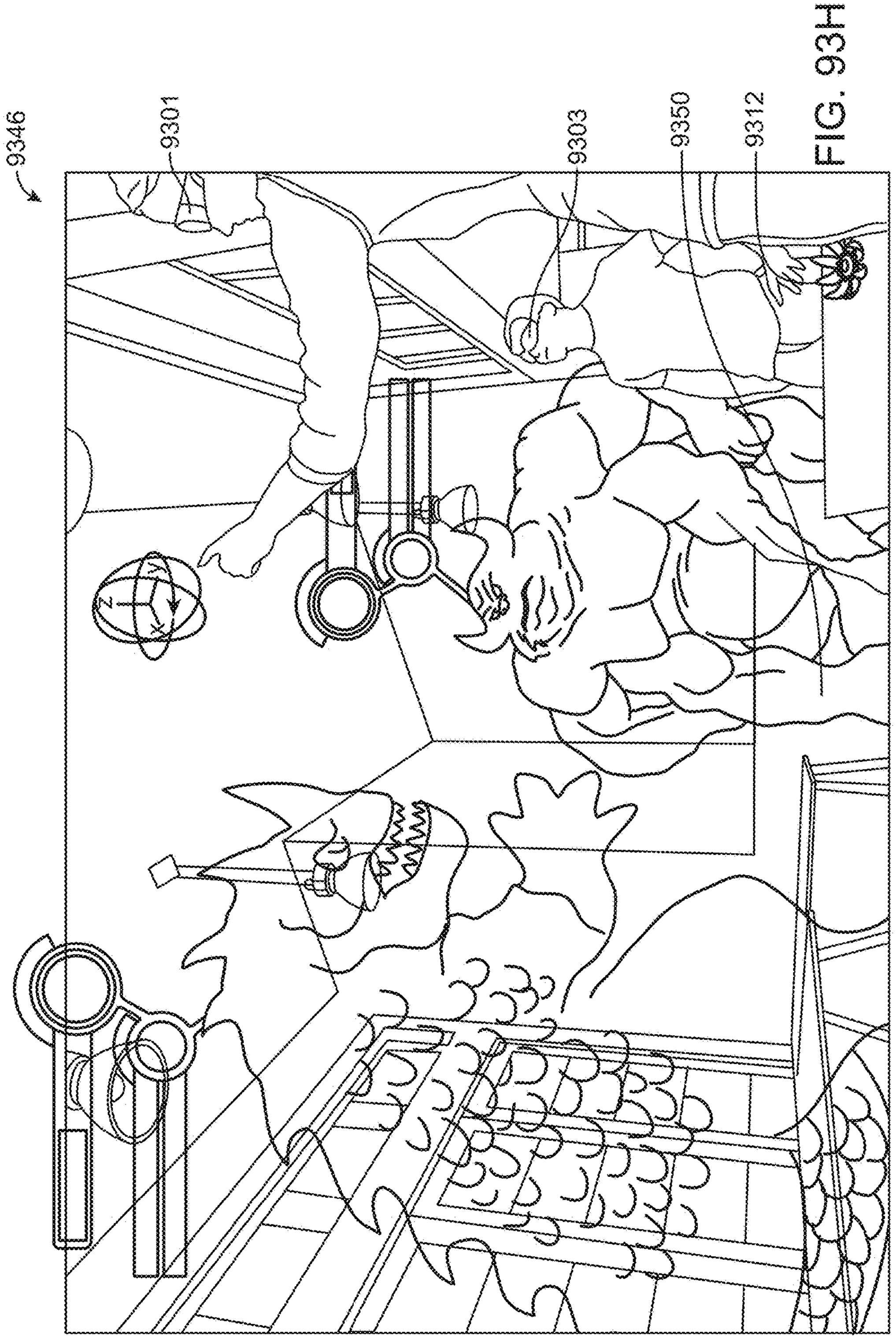

FIG. 93H shows scene 9346 of a pair of users in a physical office environment, interacting with a virtual office space and game through their respective AR systems 9301 and 9303.

As illustrated in FIG. 93H, the AR system renders the first user's monster as scaled up from a previous rendering (FIG. 93F). The second user or co-worker accepts by placing his monster on the new battleground (e.g., the physical floor of the office space). In response, the AR system may re-render the virtual content related to the game so as to appear to each of the users as if the battle is taking place on the floor. The AR system may adapt the game to changes in physical location. For example, the AR system may automatically scale the size of the co-worker's monster up, to fill the available space, and allow the battle to start or continue.

Figure 93I:
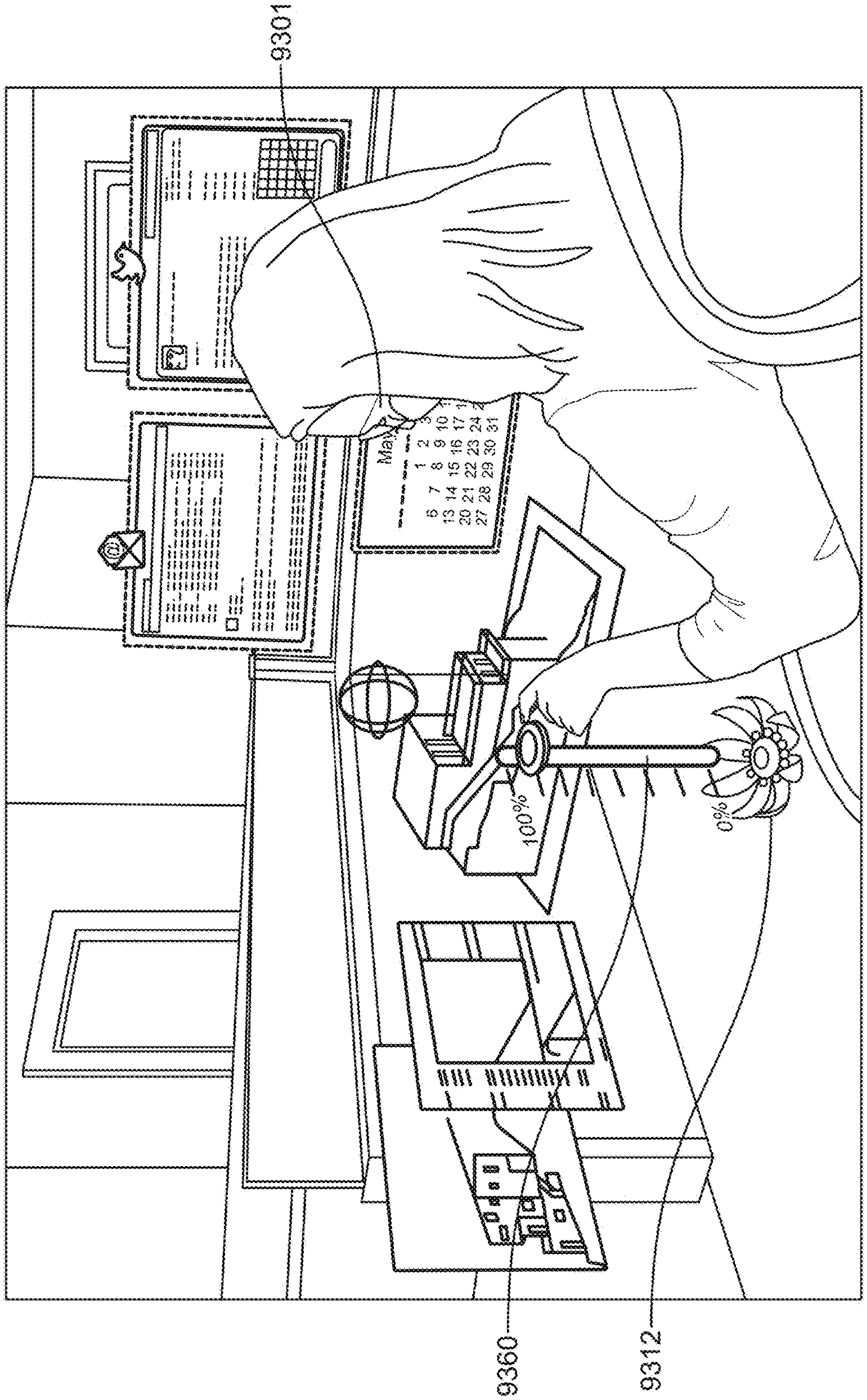
Figure 93J:
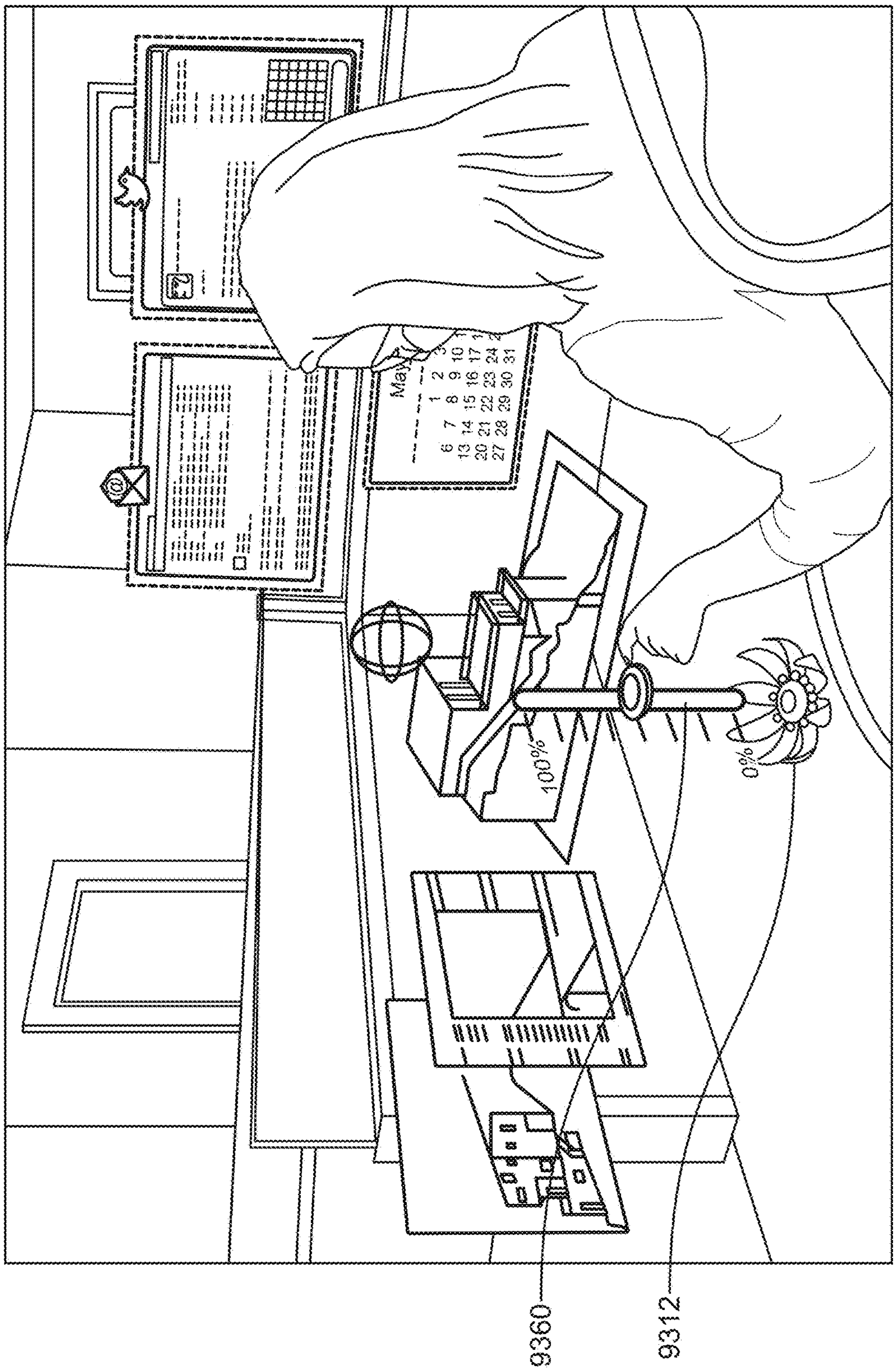
Figure 93K:
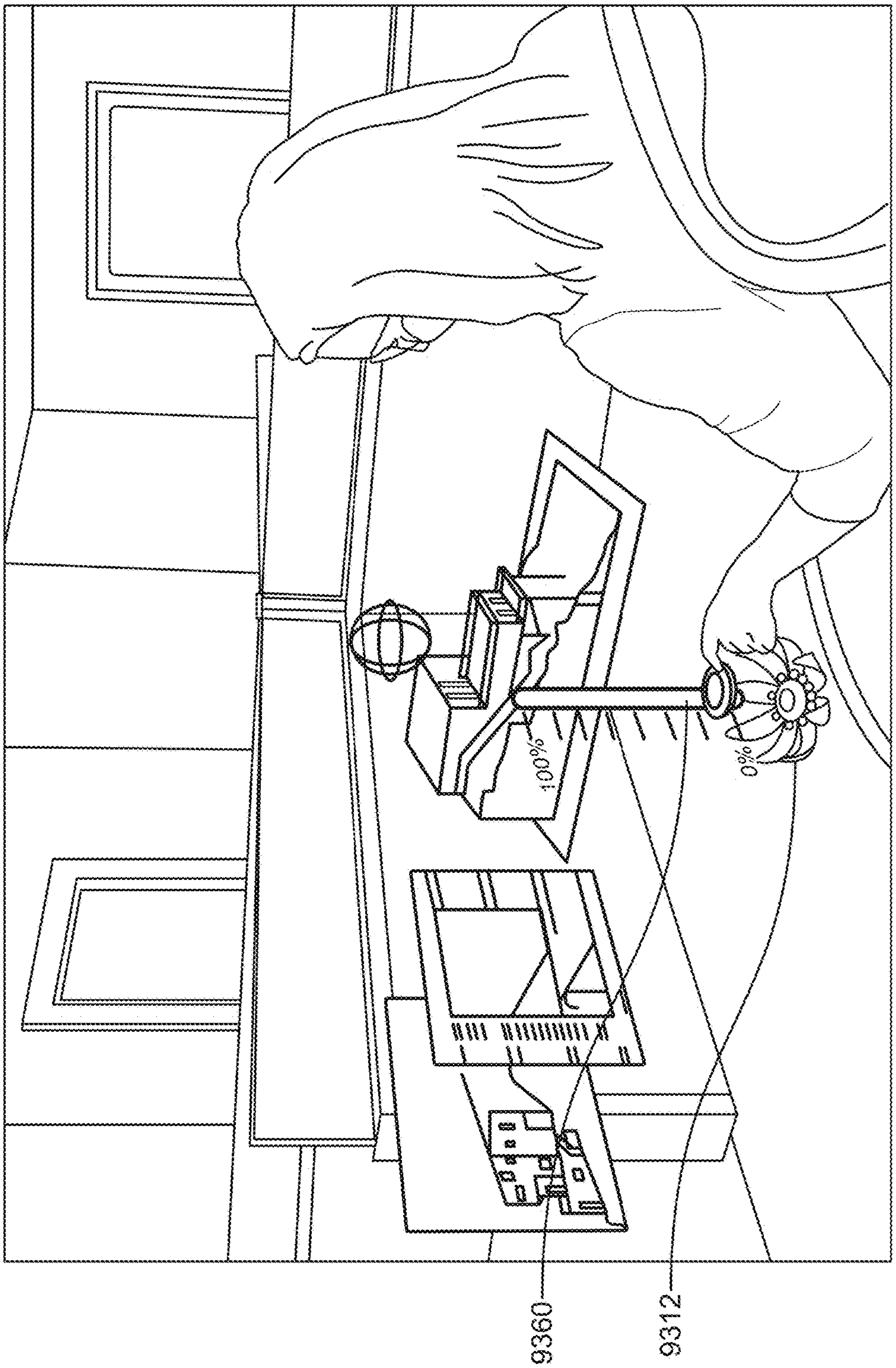

FIGS. 93I-93K show a user of the AR system 9301 interacting with virtual content of a virtual office space rendered by an AR system, according to another illustrated embodiment.

In particular, FIGS. 93I-93K represent sequential instances of time, during which the user gestures to a scaling tool 9360 to scale the amount of non-work related images that are visible in her environment. In response, the AR system re-renders the virtual room or virtual space, to for example, reduce a relative size of visual content that is not related to the user's work. Alternatively, the user may select certain applications, tools, functions, and/or virtual rooms or virtual spaces off or moved to a background (e.g., radially spaced outwardly). As shown in FIG. 93J, the scaling tool 9360 has been moved to a represent a smaller percentage that what was shown in FIG. 93I. Similarly in FIG. 93K, the scaling tool 9360 has been moved to represent an even smaller percentage as compared to FIGS. 93I and 93J.

Figure 93L:
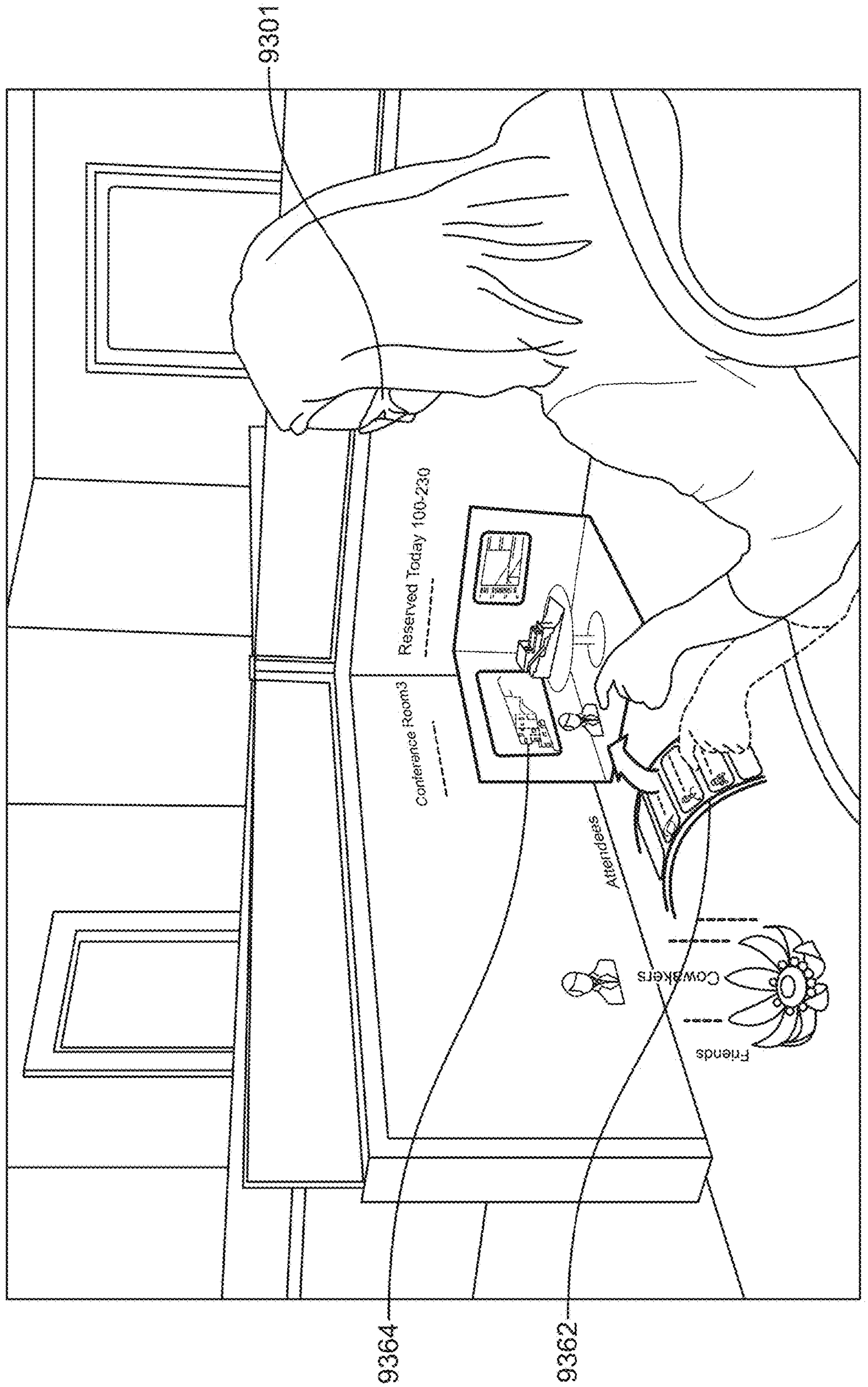

FIG. 93L shows a user of the AR system interacting with virtual content of a virtual office space, according to another illustrated embodiment. The user selects, through a virtual contact list a number of contacts to invite to a group meeting from her contact application via a virtual contact use interface 9362. The user may invite the attendees by dragging and dropping their names and/or images into a virtual meeting room 9364, which is rendered in the user's field of view by the AR system 9301. The user may interact with the virtual user interface 9362 constructs via various gestures, or alternatively via voice commands. The AR system detects the gestures or voice commands, and generates meeting requests, which are electronically sent to the invitee, in one or more embodiments.

FIG. 93L shows a number of users in a physical conference room environment, interacting with virtual content rendered by an AR system, according to another illustrated embodiment.

The meeting may be in response to the group meeting invites sent by a first one of the users (FIG. 93L). The first user and a second user who is one of the invitees or group meeting participants may be physically present in the physical meeting room. A third user who is another one of the invitees or group meeting participants may be virtually present in the physical meeting room. That is, a virtual representation of the third user is visually and aurally rendered to the first and the second users via their respective individual AR systems. The respective individual AR systems may render the representation of the third to appear to be seated across a physical table from the first and the second users. The AR system achieves this using the passable world models generated from image information captured by the various individual AR systems, and optionally by any room or space based sensor systems if present.

Likewise, a virtual representation of the first and second users, along with the conference room, is visually and aurally rendered to the third user via the third user's respective individual AR system. The individual AR systems may render the representations of the first and second user, as well as the conference room, to appear to the third user as if the first and the second users are seated across the physical table from the third user. The AR system achieves this using the passable world models generated from image information captured by the various individual AR systems, and optionally by any room or space based sensor systems if present.

The AR system may render virtual content which is shared by two or more of the users attending the meeting. For example, the AR system may render a virtual 3D model (e.g., light field representation of a building). Also for example, the AR system may render virtual charts, drawings, documents, images, photographs, presentations, etc., viewable by all of the users, whether physically present or only virtually present.

Each of the users may visually perceive the virtual content, from their own perspectives. For example, each of the users may visually perceive the virtual 3D model, from their own perspectives. Thus, any one of the users may get up and walk around the virtual 3D model, visually inspecting the 3D model from different vantage or viewpoints. Changes or modifications to the virtual 3D model are viewable by each of the users. For example, if the first user makes a modification to the 3D model, the AR system re-renders the modified virtual 3D model to the first, the second, and the third users.

While illustrated with the first and second users in the same physical location and the third user located at a different physical location, in one or more embodiments. For example, each person may be in a respective physical location, separate and/or remote from the others. Alternatively, all attendees may be present in the same physical space, while gaining advantage of shared virtual content (e.g., virtual 3D model). Thus, the specific number of attendees and their respective specific locations are not limiting. In some implementations, other users can be invited to join a group meeting which is already in progress. Users can likewise, drop out of group meetings when desirable. Other users can request to be invited to a group meeting, either before the group meeting starts or while the group meeting is in progress. The AR system may implement such invites in a fashion similar as discussed above for arranging the group meeting.

The AR system may implement a handshaking protocol before sharing virtual content between users. The handshaking may include authenticating or authorizing users who wish to participate. In some implementations, the AR system employs peer-to-peer connections between the individual devices sharing points of view, for instance via passable world models.

In some implementations, the AR system may provide real-time written translation of speech. For example, a first user can elect to receive a real-time written translation of what one or more of the other users say. Thus, a first user who speaks English may request that the AR system provide a written translation of the speech of at least one of the second or the third users, who for example speak French. The AR system detects the speakers' speech via one or more microphones, for example microphones which are part of the individual AR system worn by the speaker. The AR system may have a chip or system (or application) that converts voice data to text, and may have a translation system that translates text one language to another. The AR system performs, or has performed, a machine-translation of the speakers' speech. The AR system renders the translation in written form to the field of view of the first user.

The AR system may, for example, render the written translation to appear proximate a visual representation of the speaker. For example, when the speaker is the third user, the AR system renders the written text to appear proximate a virtual representation of the third user in the first user's field of view. When the speaker is the second user, the AR system renders the written text to appear proximate the real image of the second user in the first user's field of view. It should be appreciated that the translation application may be used for travel applications, and may make it easier for people to understand signs/languages/commands encountered in languages other than their native languages.

In other implementations, similar to the example above, the AR system may display metadata ("profile information") as virtual content adjacent to the physical body of the person. For example, assume a user walks into a business meeting and is unfamiliar with people at the meeting. The AR system, may, based on a person's facial features (e.g., eye position, face shape, etc.) recognize the person, retrieve that person's profile information, or business profile information, and display that information in virtual form right next to the person. Thus, the user, may be able to have a more productive and constructive meeting, having read up some prior information about the person. It should be appreciated that persons may opt out of having their information displayed if they chose to, as described in the privacy section above. In the preferred embodiment, the live translation and/or unlocking of metadata may either be performed on the user's system (beltpack, computer).

Figure 94:
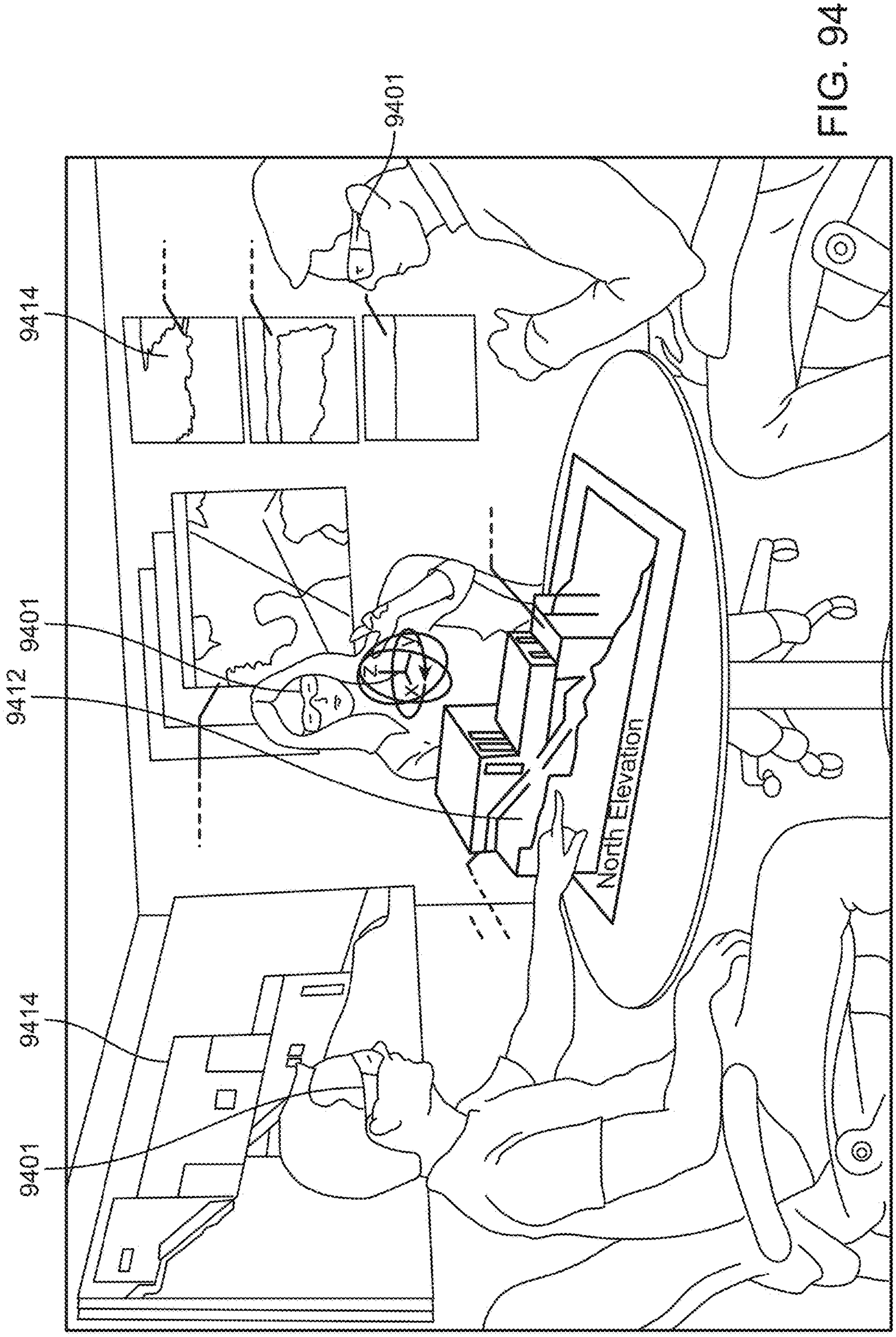
FIG. 94 illustrates another example workspace experience with the AR system, according to one or more embodiments.

Referring now to FIG. 94, an example scene between users wearing respective AR systems 9401 is illustrated. As shown in FIG. 94, the users may be employees of an architectural firm, for example, and may be discussing an upcoming projecting. Advantageously, the AR system 9401 may allow the users to interact with each other, and discuss the project by providing a visual representation of an architectural model 9412 on the physical table. As shown in FIG. 94, the users may be able to build onto the virtual architectural model 9412, or make any edits or modification to it. As shown in FIG. 94, the users may also interact with a virtual compass that allows the users to better understand aspects of the structure.

Also, as illustrated in FIG. 94, various virtual content 9414 may be tethered to the physical room that the users are occupying, thereby enabling a productive meeting for the users. For example, the virtual content 9414 may be drawings of other similar architectural plans. Or, the virtual content 9414 may be associated with maps of where the structure is to be constructed in the real world, etc.

FIGS. 95A-95E show a user of an AR system 9501 in an outdoor physical environment, interacting with virtual content rendered by an AR system at successive intervals, according to another illustrated embodiment.

Figure 95A:
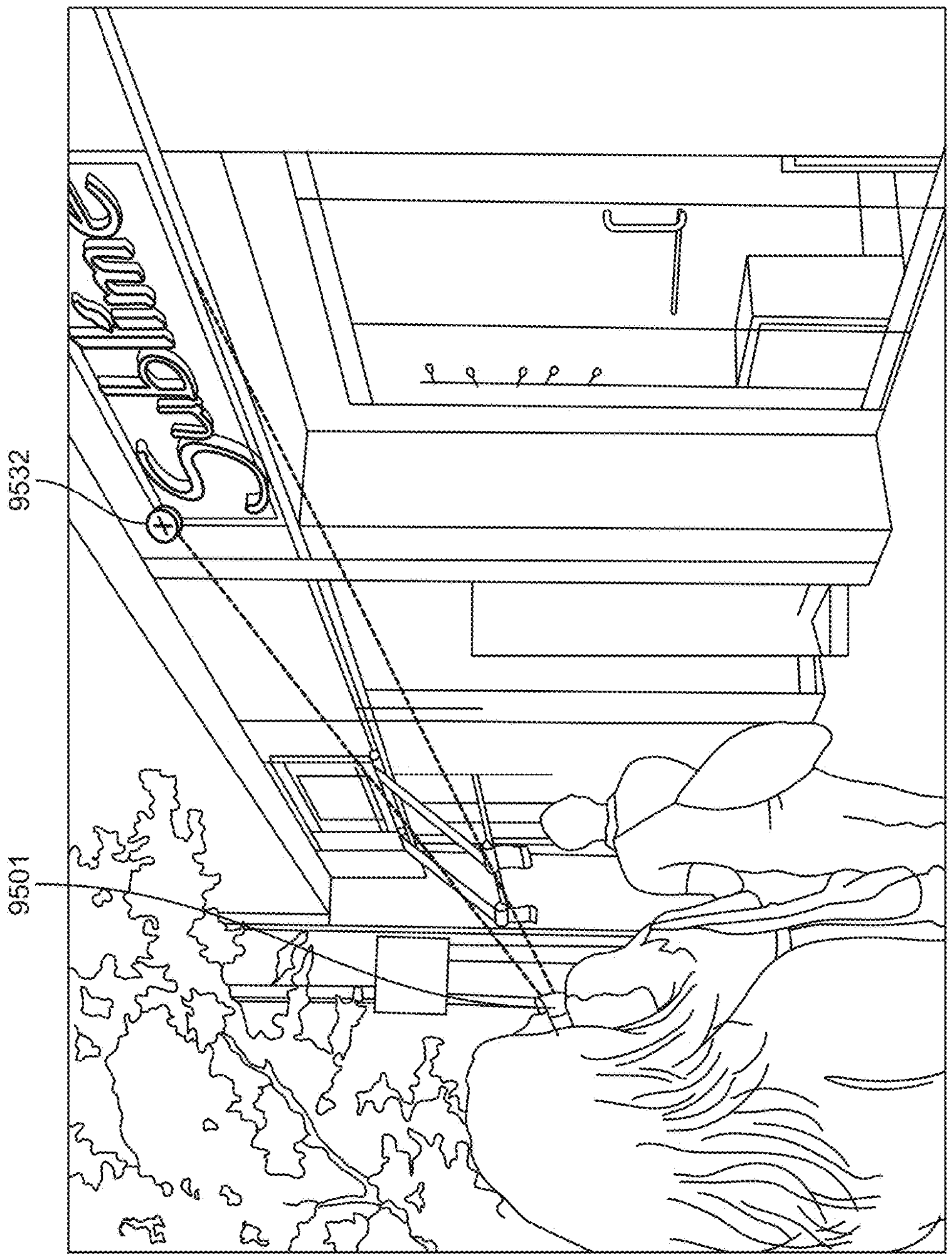
FIGS. 95A-95E illustrates another AR experience, according to one or more embodiments.

In particular, FIG. 95A shows a user walking home along a city street, which includes a number of buildings. An establishment (e.g., restaurant, store, building) catches the user's attention. The user turns and gazes at the establishment's sign or logo, as shown in FIG. 95A. The AR system 9501 detects the sign or logo appearing in the user's field of view to determine if metadata or other information is available. If metadata or other information is available, the AR system renders a cue to the user indicating that metadata or other information is available. For example, the AR system may cause a visual affect (e.g., highlight, halo, marquee, color) at least proximate the sign or logo. In the illustrated embodiment, a virtual "+" sign 9532 is rendered next to the sign to indicate that metadata is available.

Figure 95B:
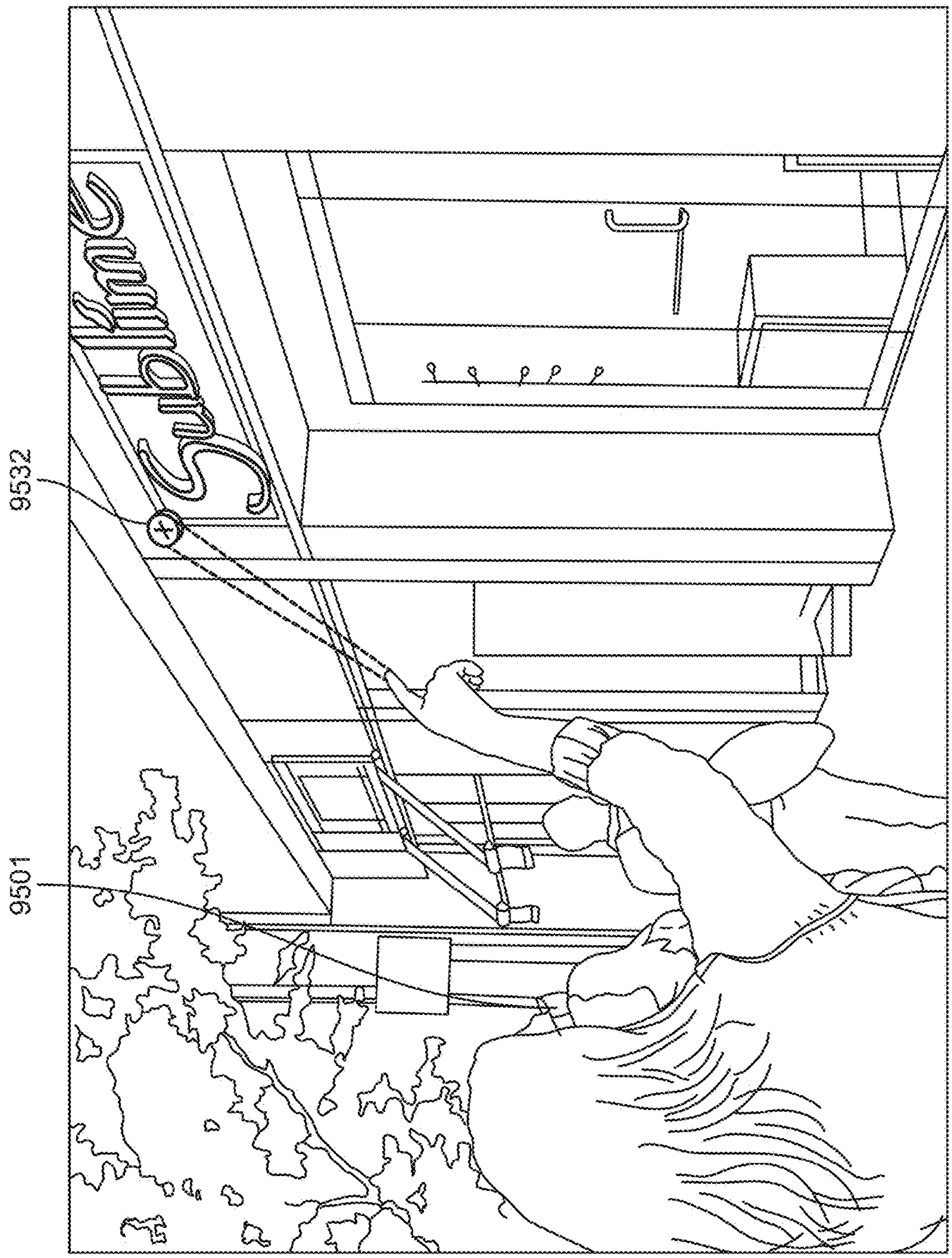

As illustrated in FIG. 95B, the user may select the virtual icon 9532 to view the metadata or other information associated with the establishment (e.g., restaurant, store, building) with which the sign or logo is associated. For example, the user may gesture, for instance making a pointing gesture towards the sign or logo.

Figure 95C:
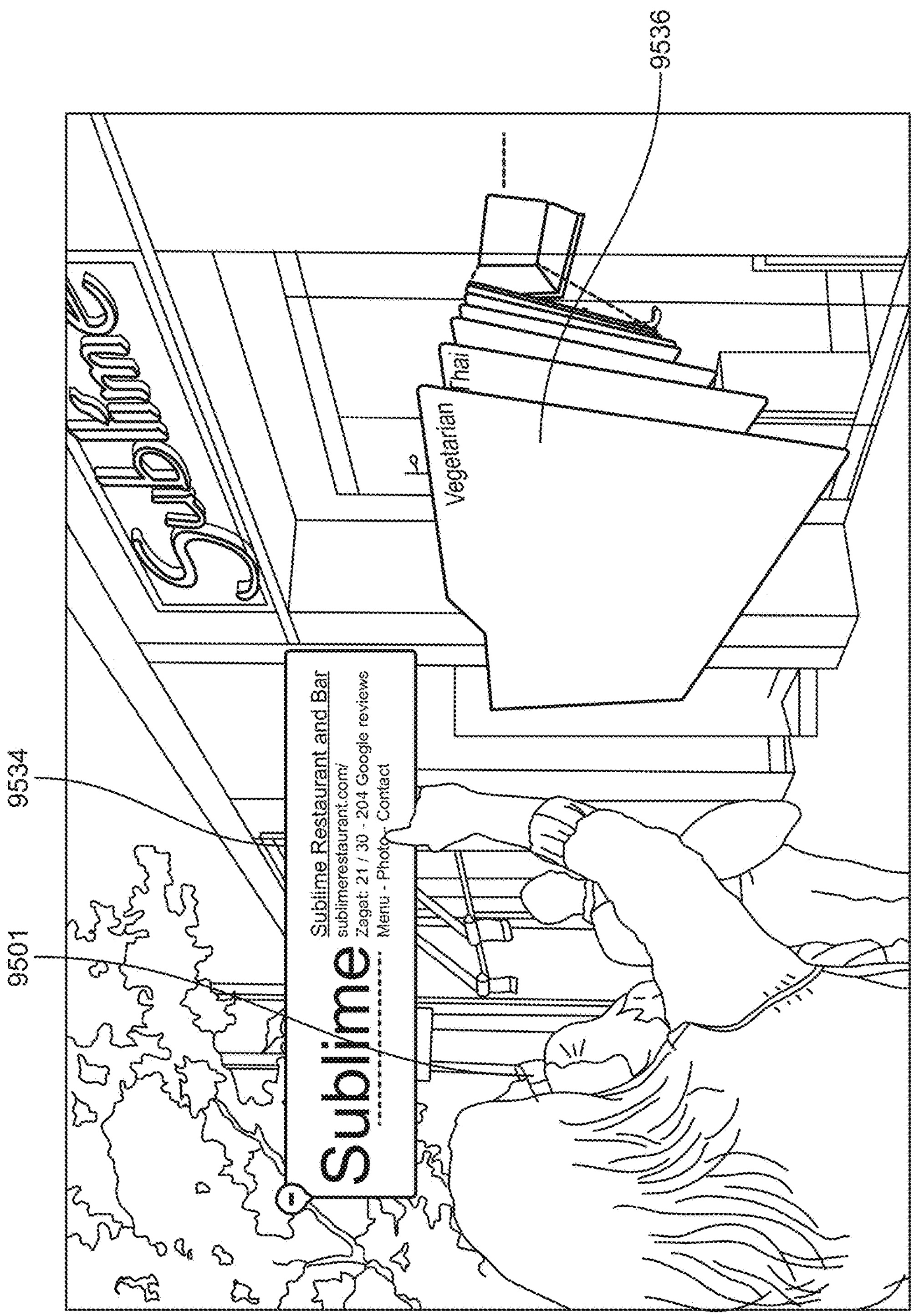

As illustrated in FIG. 95C, in response to the user selection, the AR system 9501 renders representations of information and/or metadata proximately associated with the establishment (e.g., restaurant, store, building) through a virtual content box 9534. For instance, the AR system 9501 may render a menu, photographs and reviews in another virtual folder 9536 that may be viewed by the user.

In fact, the AR system 9501 may render representations of information and/or metadata proximately associated with various different types of physical and/or virtual objects. For example, the AR system may render metadata on or proximate a building, person, vehicle, roadway, piece of equipment, piece of anatomy, etc., which appears in a field of view of a user. When the AR system is rendering metadata concerning a physical object, the AR system first captures images of the physical object, and processes the images (e.g., object recognizers) to identify the physical object.

The AR system may determine metadata logically associated with the identified physical object. For example, the AR system may search for a name and location, architect, year built, height, photographs, number of floors, points of interest, available amenities, hours of operation of a building. Also for example, the AR system may find a menu, reviews by critics, review by friends, photographs, coupons, etc., for a restaurant. Also for example, the AR system may find a show times, ticket information, reviews by critics, reviews by friends, coupons, etc., for a theater, movie or other production. Also for example, the AR system may find a name, occupation, and/or title of a person, relationship to the person, personal details such as spouse's name, children's names, birthday, photographs, favorite foods, or other preferences of the person.

The metadata may be defined logically associated with an object (e.g., inanimate object or person) for an entire universe of users, or may be specific to a single user or a set of users (e.g., co-workers). The AR system may allow a user to choose what metadata or other information to share with other users, to identify which other users may access the metadata or other information. For example, a user may define a set of metadata or other information related to a physical location (e.g., geographic coordinates, building) or a person. That user may define a set of users (e.g., subset of the universe of users) who are authorized or provided with privileges to access the metadata or other information. The authorization or privileges may be set on various levels, for example read only access, write access, modify access, and/or delete access.

When a user is at a location or views an object for which the user has authorization or privilege to at least read or otherwise access information of metadata associated with the location or object, the AR system provides the user a cue indicative of the availability of the metadata or other information. For example, the individual AR system may render a defined visual affect in the user's field of view, so as to appear at least proximate the object or person for which metadata or other information is available. The AR system may, for example, render a line that appears to glow. The AR system renders the metadata or other information in the user's field of view in response to a trigger, for instance a gesture or voice command.

Figure 95D:
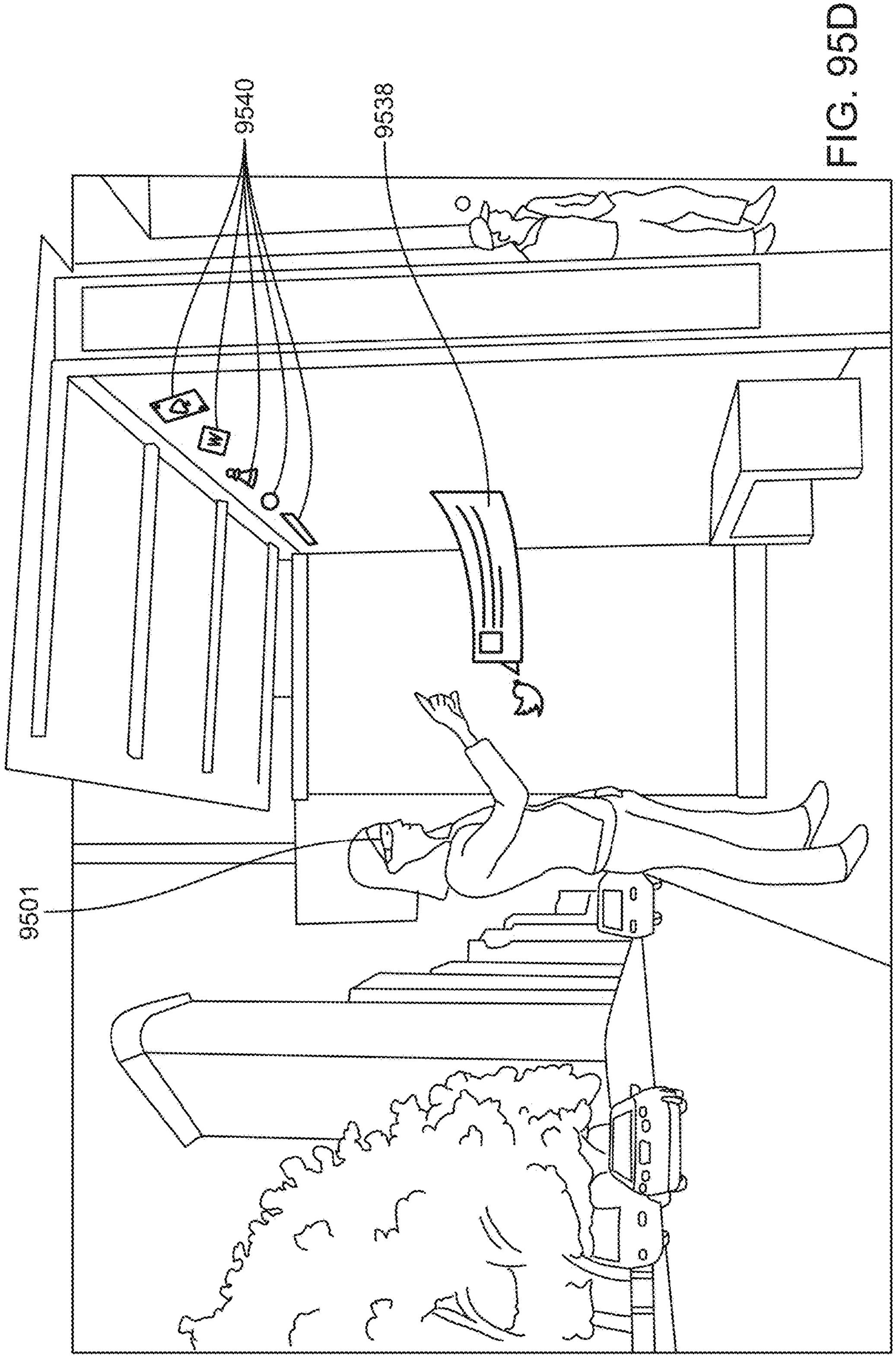

FIG. 95D shows a user of the AR system 9501 at a bus stop with a shelter and buildings in the background. In the illustrated embodiment, the AR system 9501 may detect a location of the user based on visual information and/or additional information (e.g., GPS location information, compass information, wireless network information). For example, object recognizers may identify various physical objects present in the outdoor environment, for example the shelter or buildings. The AR system finds locations with matching physical objects. As previously described, the AR system may employ a topographical map of information (e.g., identity and/or signal strength of available wireless networks, GPS location information) in assessing or determining a physical location.

The AR system may detect the appearance of the shelter in the view of the user, and detect a pause sufficiently long to determine that the user is gazing at the shelter or at something on the shelter. In response, the AR system may render appropriate or corresponding virtual content. For example, the AR system may render virtual content in the user's field of view such that the virtual content appears to be on or extending from one or more surfaces of the shelter. Alternatively, virtual content may be rendered to appear on other surfaces (e.g., sidewalk) or even appear to be floating in air.

The AR system may recognize at the bus stop that the bus stop is regularly used by the user. In response, the AR system may render a first set of virtual content 9538 which the user typically uses when waiting for their public transit (e.g., bus, train) or other transportation (e.g., taxi, aircraft). For example, the AR system may render a social networking user interface (e.g., Twitter®, Facebook®, etc.). In another instance, the AR system may render a cue to the use's field of view in response to an incoming message (e.g., Tweet®).

Also for example, the AR system may render reading material (e.g., newspaper, magazine, book), or other media (e.g., news, television programming, movie, video, games). As a further example, the AR system may render information about the transportation (e.g., time until a bus arrives and/or current location of the next bus).

In another embodiment, the AR system may recognize the bus stop as a bus stop not regularly used by the user. In response, the AR system additionally or alternatively render a second set of virtual content 9540 which the user typically would like when waiting for public transit (e.g., bus, train) or other transportation (e.g., taxi, aircraft). For example, the AR system may render virtual representations of route maps, schedules, current route information, proximate travel time, and/or alternative travel options.

Figure 95E:
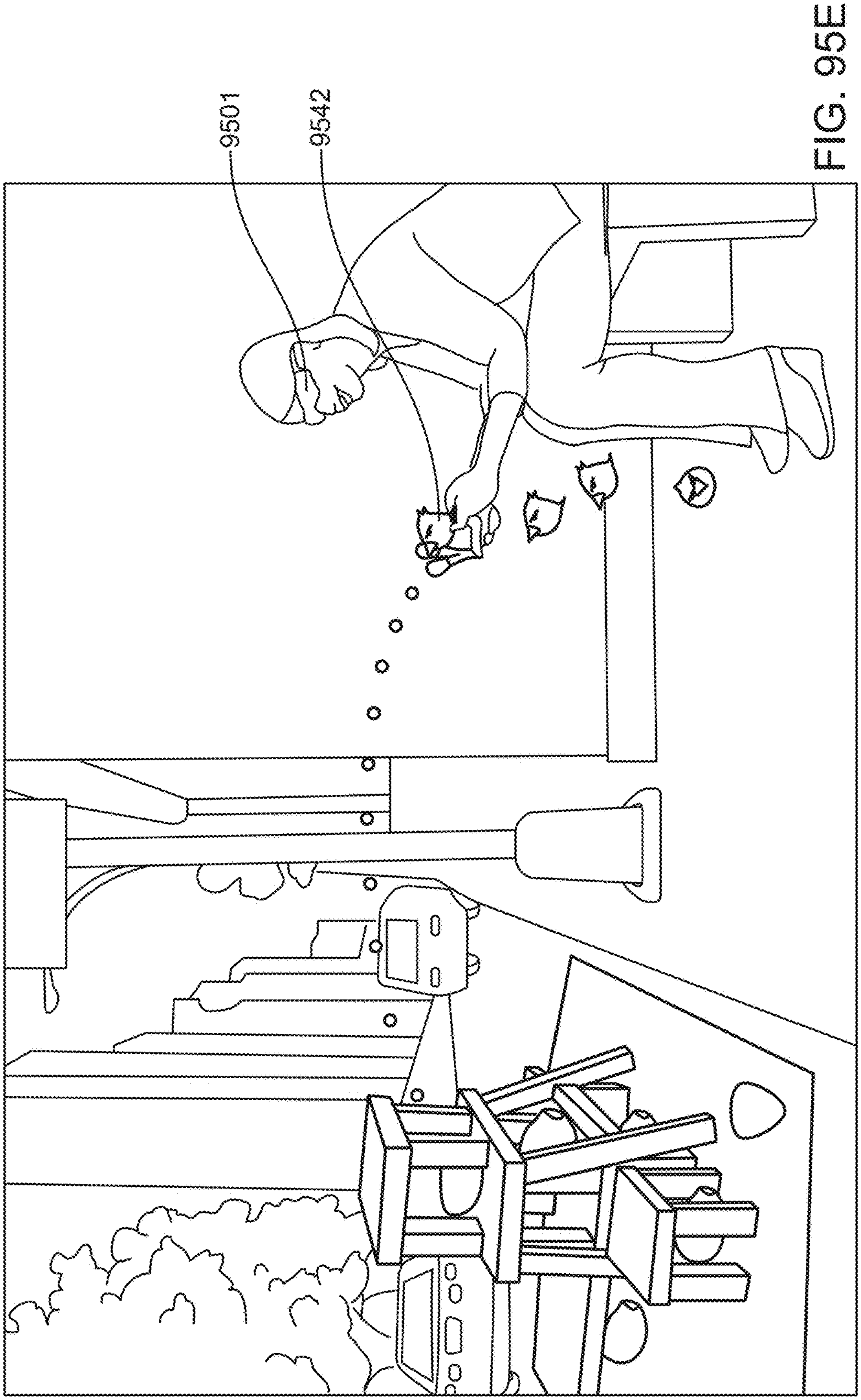

FIG. 95E shows a user of the AR system 9501 playing a game at the bus stop. As shown in FIG. 95E, the user of the AR system 9501 may be playing a virtual game 9542 while waiting for the bus.

In the illustrated embodiment, the AR system renders a game to appear in the user's field of view. In contrast to traditional 2D games, portions of this 3D game realistically appear to be spaced in depth from the user. For example, a target (e.g., fortress guarded by pigs) may appear to be located in the street, several feet or even meters from the user. The user may use a totem as a launching structure (e.g., sling shot), which may be an inanimate object or may be the user's own hand. Thus, the user is entertained while waiting for the bus.

FIGS. 96A-96D show a user of an AR system 9601 in a physical kitchen, interacting with virtual content rendered by the AR system 9601 at successive intervals, according to another illustrated embodiment.

The AR system 9601 detects a location of the user, for example based on visual information and/or additional information (e.g., GPS location information, compass information, wireless network information). For example, object recognizers may identify various physical objects present in the kitchen environment, for example the walls, ceiling, floor, counters, cabinets, appliances, etc. The AR system finds locations with matching physical objects. As previously described, the AR system may employ a topographical map of information (e.g., identity and/or signal strength of available wireless networks, GPS location information) in assessing or determining a physical location.

Figure 96A:
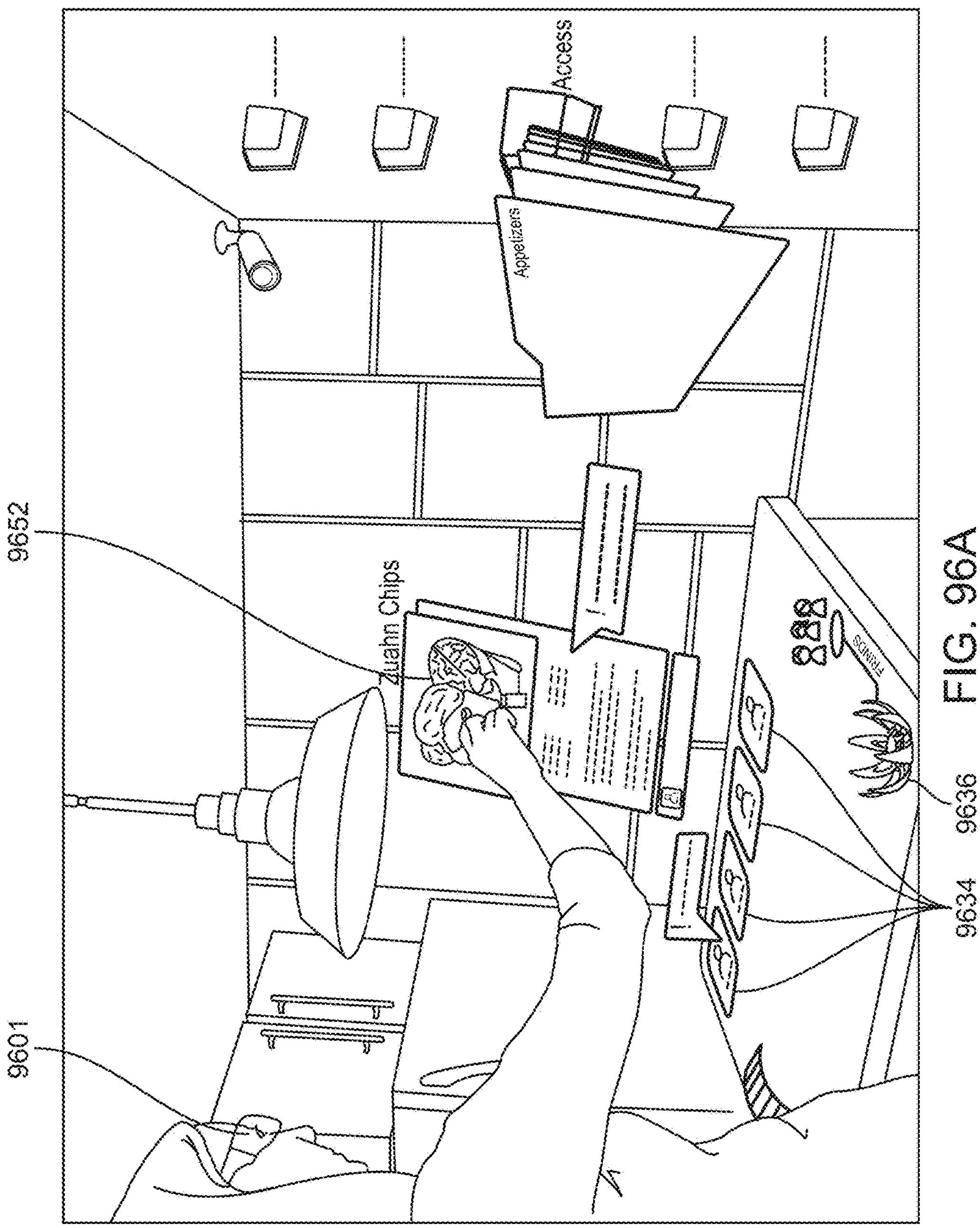
FIGS. 96A-96D illustrates yet another AR experience, according to one or more embodiments.

As illustrated in FIG. 96A, in response to recognizing that the user is, for example, in the kitchen, the AR system 9601 may render appropriate or corresponding virtual content. For example, the AR system may render virtual content 9632 in the user's field of view so that the virtual content 9632 appears to be on or extending from one or more surfaces (e.g., walls of the kitchen, countertops, backsplash, appliances, etc.). Virtual content may even be rendered on an outer surface of a door of a refrigerator or cabinet, providing an indication (e.g., list, images) of the expected current contents of the refrigerator or cabinet based on recently previous captured images of the interior of the refrigerator or cabinets. Virtual content may even be rendered so as to appear to be within the confines of an enclosed volume such as an interior of a refrigerator or cabinet.

The AR system 9601 may render a virtual recipe user interface including categories of types of recipes for the user to choose from, for example via a gesture. The AR system may render a set of food images (e.g., a style wall) in the user's field of view, for instance appearing as if mapped to the wall of the kitchen. The AR system may render various virtual profiles 9634 of the user's friends, for instance appearing to be mapped to a counter top, and alert the user to any food allergies or dietary restrictions or preferences of the friends. FIG. 96A also illustrates a totem 9636 that may be used to interact with the AR system, and "carry" a set of virtual content with the user at all given times. Thus, a side wall of the kitchen may be populated with virtual social media 9638, while counters may be populated with recipes, etc.

Figure 96B:
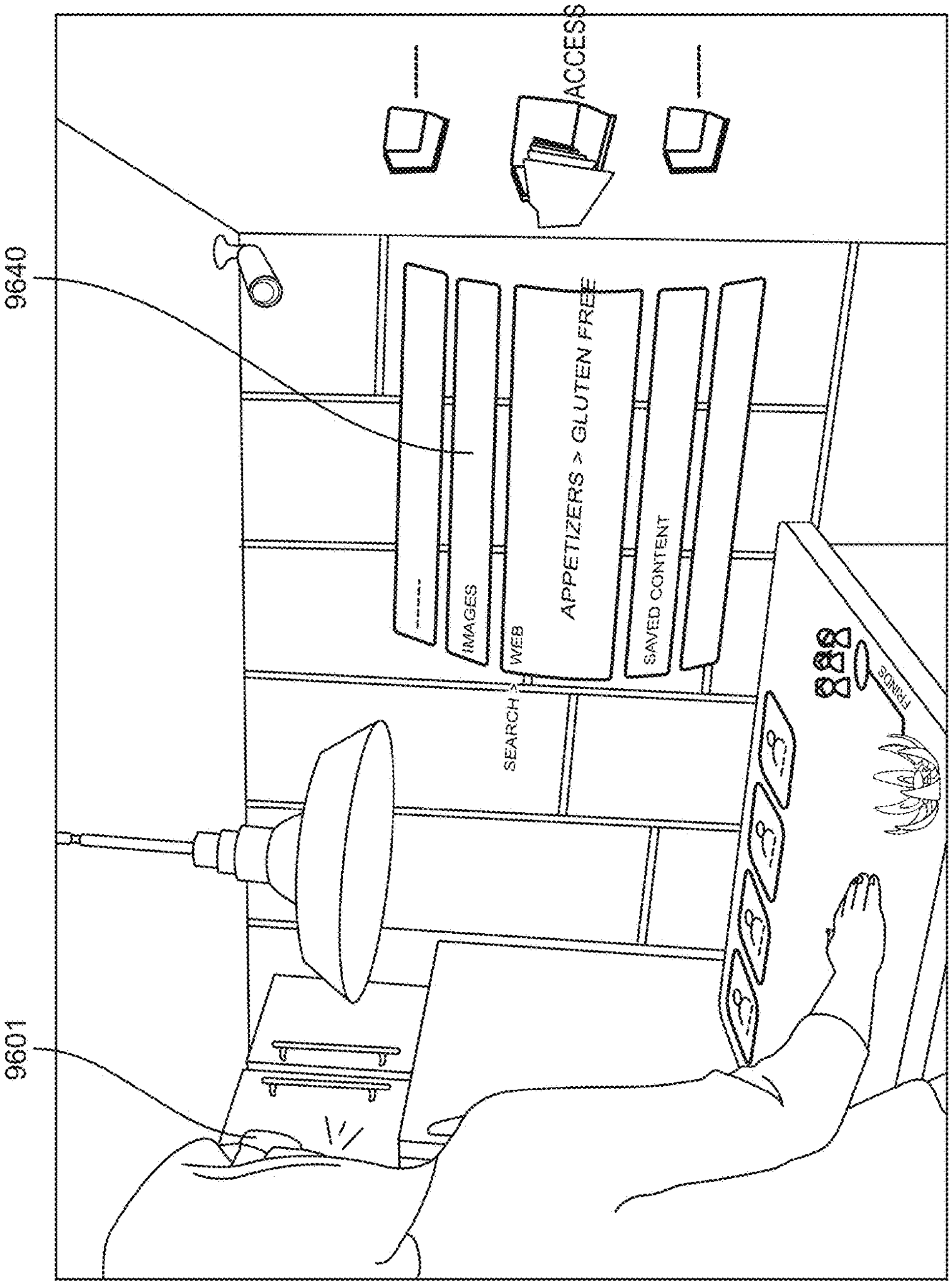

As illustrated in FIG. 96B, the user may use a virtual recipe finder user interface 9640 to search for recipes using various parameters, criteria or filters through a virtual search box 9642. For example, the user may search for a gluten-free appetizers recipe.

Figure 96C:
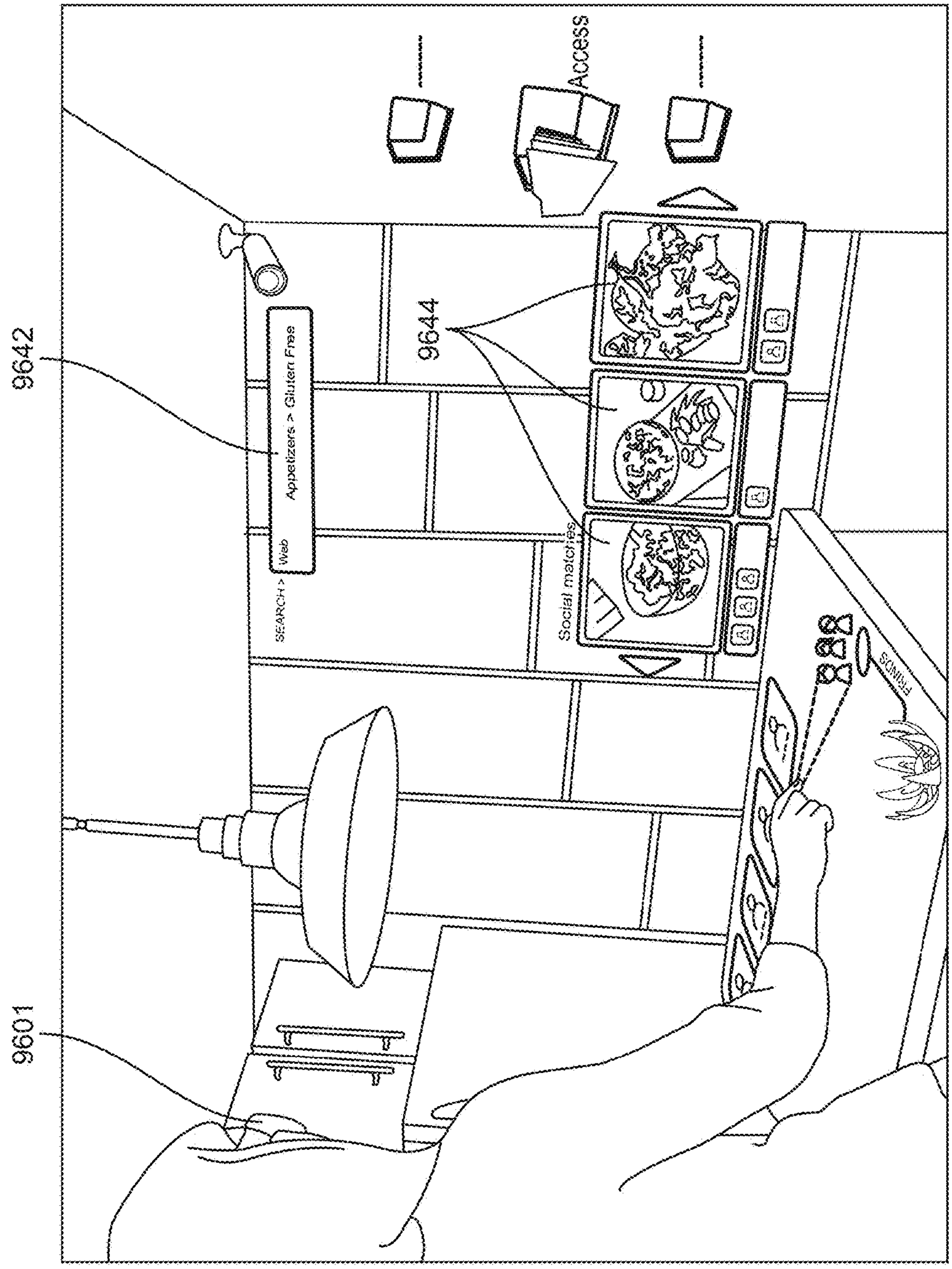

As illustrated in FIG. 96C, the user interface of the virtual recipe finder 9640 virtually presents various results 9644 of the search for recipes matching certain criteria (e.g., gluten-free AND appetizer). The user interface may have one or more user selectable icons, selection of which allows the user to scroll through the search results. The user may select to scroll in any desired direction in which the search results 9644 are presented.

If unsure of what recipe to use, the user may use the virtual interface to contact another user. For example, the user may select her mother to contact, for example by selecting an appropriate or corresponding entry (e.g., name, picture, icon) from a set (e.g., list) of the user's contacts. The user may make the selection via an appropriate gesture, or alternatively via a voice or spoken command. The AR system detects the gesture or voice or spoken command, and in response attempts to contact the other user (e.g., mother).

Figure 96D:
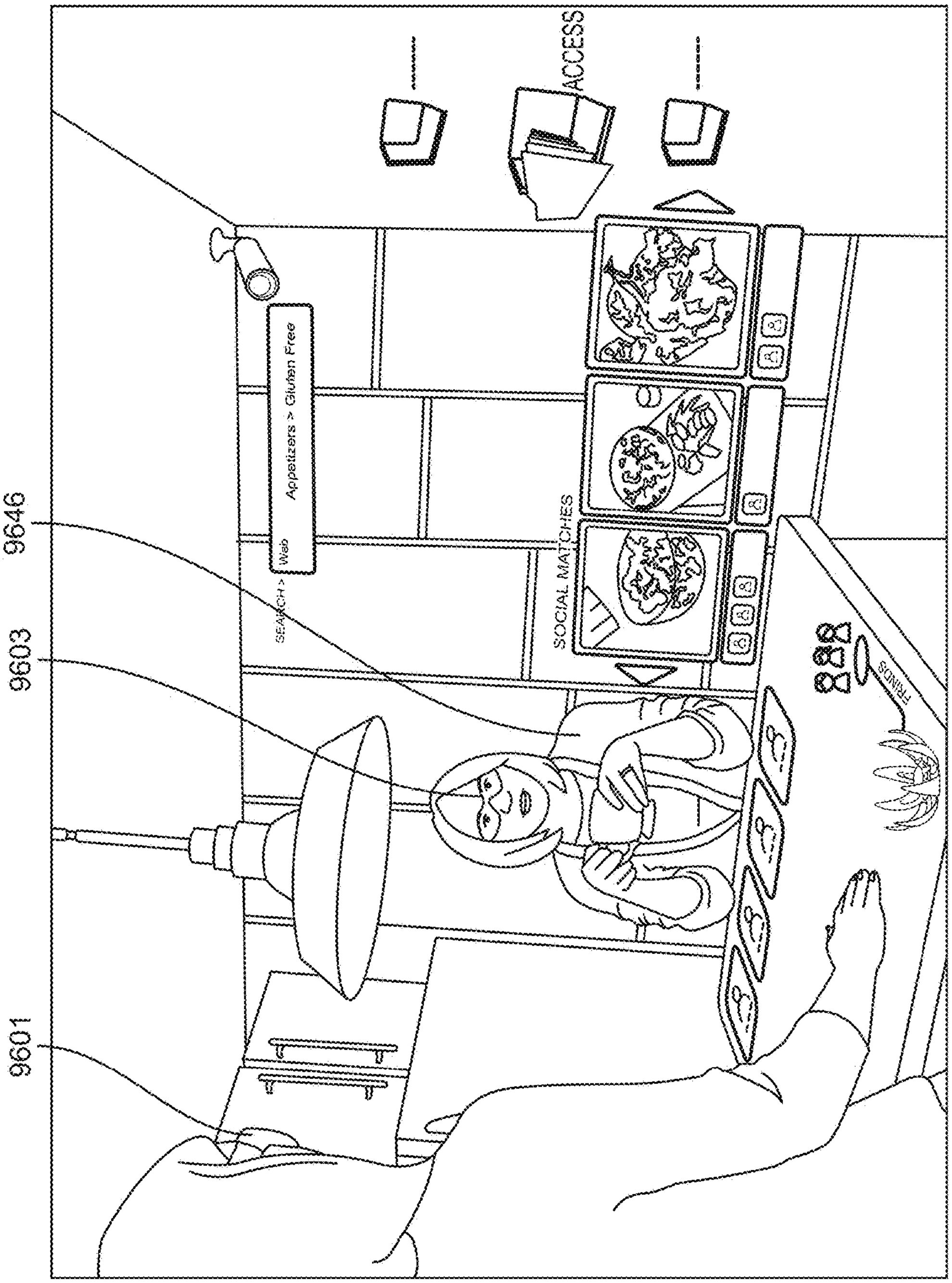

As illustrated in FIG. 96D, the user interface of a social networking application produces a cue indicative of the selected contact responding to the contact attempt. For example, the AR system may render a cue in a field of view of the user, indicative of the contact responding. For instance, the AR system may visually emphasize a corresponding name, picture or icon in the set of contacts. Additionally or alternatively, the AR system may produce an aural alert or notification.

In response, the user may accept the contact attempt to establish a communications dialog with the contact or other user (e.g., mother). For example, the user may make an appropriate gesture, which the AR system detects, and responds by establishing the communications dialog. For example, the AR system may render a virtual representation 9646 of the other user (e.g., mother) using the AR device 9603 into the field of view of the first user. The representation may take many forms, for example a simple caricature representation or a complex light field which realistically represents the other person in three-dimensions. The representation may be rendered to appear as if they are standing or sitting across a counter from the first user. Likewise, the other user may view a representation of the first user.

The two users can interact with one another, and with shared virtual content as if they were both present in the same physical space. The AR system may advantageously employ passable world models to implement the user experience, as discussed in detail above.

FIGS. 97A-97F show users wearing AR systems 9701 in a living room of their home, interacting with virtual content rendered by an AR system at successive intervals, according to another illustrated embodiment.

Figure 97A:
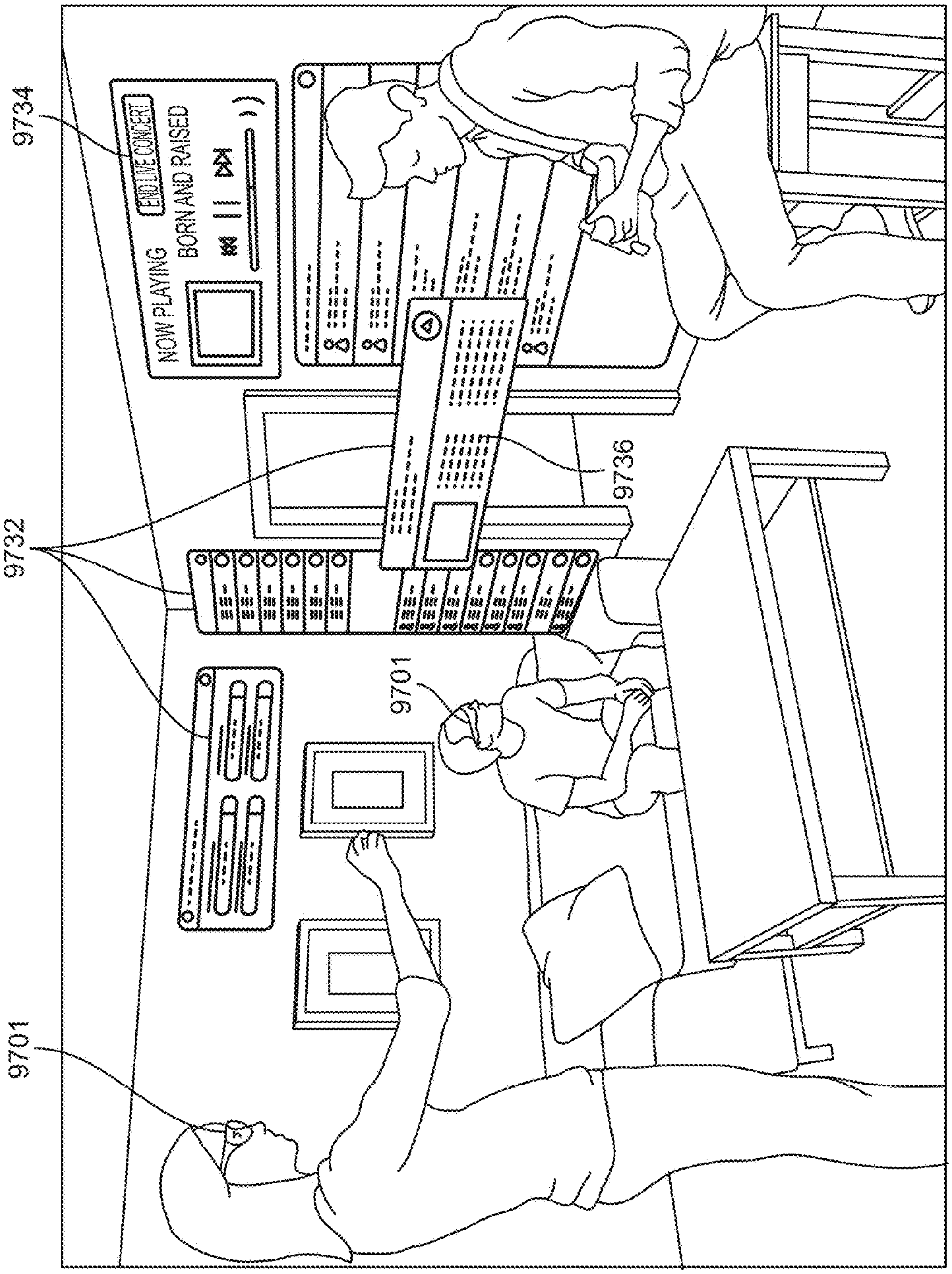
FIGS. 97A-97H illustrates a gaming experience with the AR system, according to one or more embodiments.

As illustrated in FIG. 97A, in response to recognizing that the user is, for example, in their own living room and/or recognizing various guests, the AR system 9701 may render appropriate or corresponding virtual content. Additionally or alternatively, the AR system may respond to a scheduled event, for example a live or a recorded concert for which the user has signed up or purchased a feed of or a ticket to participate.

For example, the AR system may render virtual content 9732 in the user's field of view so that the virtual content appears to be on or extending from one or more surfaces (e.g., walls, ceiling, floor, etc.) or elsewhere within the volume of the physical space. If guests are present, individual AR systems worn by the guests may render virtual content in the respective fields of view of the guests. The virtual content 9732 may be rendered to each person's AR system based on that person's current position and/or orientation to render the virtual content from the perspective of the respective user.

Also as illustrated in FIG. 97A, the user may, for example, use a virtual user interface 9736 to browse one or more music libraries, for example shared music libraries, for instance in preparation for a dinner party the user is hosting. The user may select songs or musical pieces by, for example, dragging and dropping virtual representations 9734 (e.g., icons, titles) of the user's favorites songs and/or artists and/or albums into a personal virtual Beats Music Room, to create a perfect atmosphere to host the user's guests.

In some implementations, the user may buy a ticket or right to access music, a concert, performance or other event. The music, concert, performance or other event may be live or may be previously recorded. As illustrated in FIG. 97A, the AR system may render the concert, performance or other event as a virtual space, mapped onto a user's physical space. The AR system may employ passable world models to implement such. The AR system may, for example pass a passable world model of a venue to the individual AR systems worn by the various users. An initial passable world model may include information representing an entire venue, including details. Subsequent passable world models may reflect only changes from previous passable world models.

Audio or sound may be provided in standard two channel stereo, in 5.1 or 7.1 surround sound, or in 3D spatial sound (e.g., sound wave phase shifter). Audio or sound may be delivered by personal speakers or by shared speakers which provide sound to two or more users simultaneously. Personal speakers may take the form of ear buds, on ear head phones or over ear head phones. These may be integrated into the head worn component which provides the virtual images (e.g., 4D light field).

Shared speakers may take the form of bookshelf speakers, floor standing speakers, monitor speakers, reference speakers or other audio transducers. Notably, it will be easier to deliver a realistic sound field using personal speakers since the AR system does not have to account for different listener positions in such an arrangement. In another embodiment, the AR system may deliver a realistic sound/audio based on the digital environment that the user is supposed to be in.

For example, the AR system may simulate audio controls such that they appear to be originating from a particular source or space. For example, sound emanating from a small enclosed room may be very different than sound emanating from an opera house. As discussed above, the sound wavefront may be successfully used to create the right sound quality to accompany the visuals of the AR system.

The AR system can render virtual content to cause the user(s) to perceive a performance as occurring in their own location (e.g., living room). Alternatively, the AR system can render virtual content to cause the user(s) to perceive themselves as attending a performance occurring in the venue, for example from any given vantage point, even with the ability to see the crowd around them. The user may, for example, select any desired vantage point in a venue, including front row, on stage or backstage.

In some implementations, an artist who is preforming live may have a respective individual AR system which allows the artist to perceive an audience which is a composite of the various users attending the performance remotely. Images and/or sounds from the various audience members may be captured via the individual AR systems worn by the respective audience members. This may allow for interaction between the performer and the audience, including for example a question and answer session. The use of 4D light field provides for a more realistic experience the might otherwise be achieved using more conventional approaches.

Figure 97B:
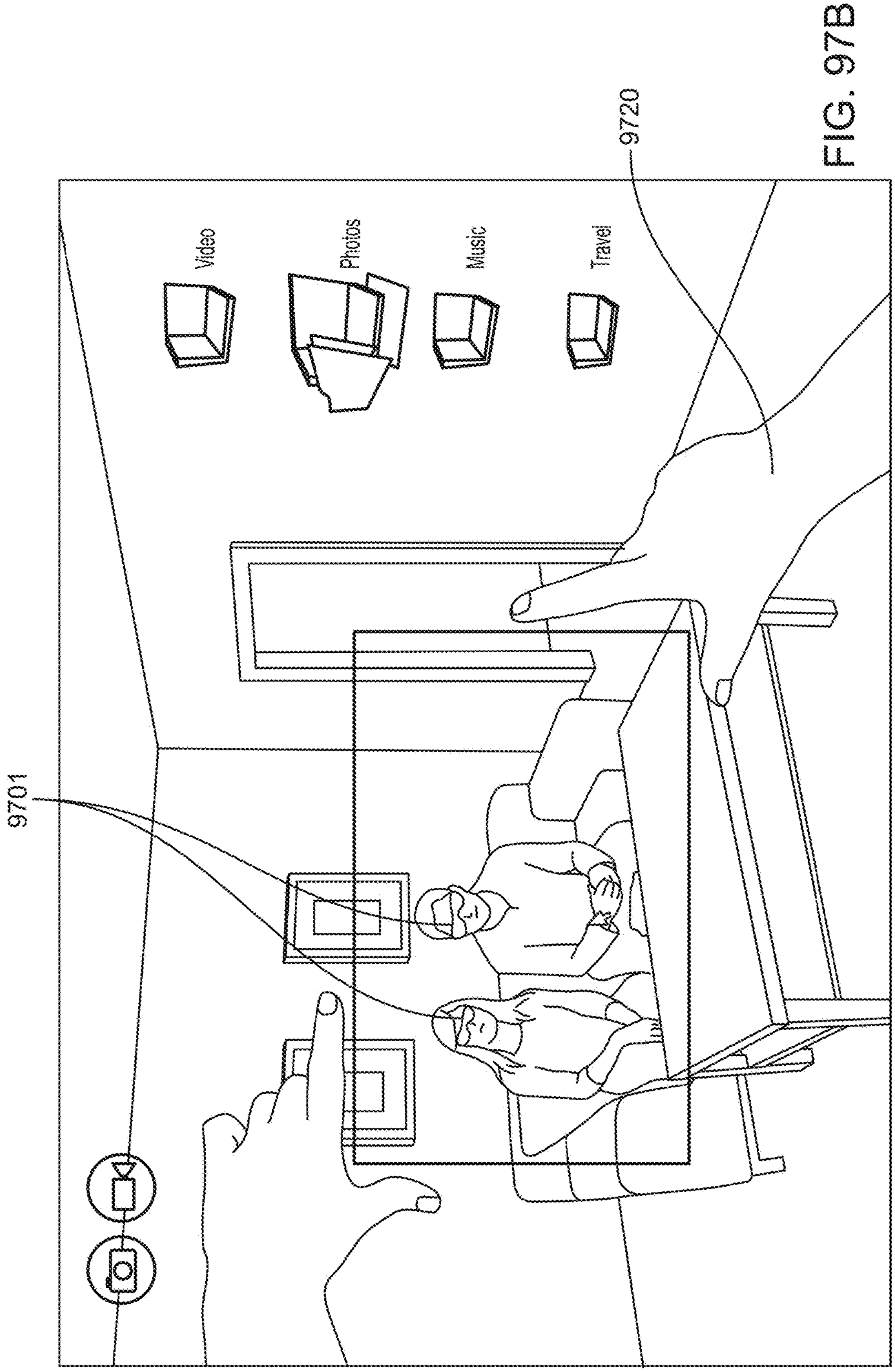

FIG. 97B shows a pair of guests having AR systems 9701 in the physical living room. The host user 9720 decides to take a picture of the guest. The host user makes a corresponding gesture (e.g., index finger and thumb at right angles on both hands), held in opposition to form a rectangle or frame. The host user's own individual AR system detects the gesture, interprets the gesture, and in response captures an image, for example via one or more outward facing cameras that form part of the individual AR system worn by the host user. The gesture also serves as an indication to the guests that their picture is being taken, thereby protecting privacy.

Once the user has taken a picture (e.g., digital photograph), the user may quickly edit the picture (e.g., crop, add caption, add filters), and post the picture to a social network. All this is performed using gestures via the AR system. In a related embodiment, once the user has taken a picture, a virtual copy of the picture may be pinned into the physical space.

For example, the user may pin the virtual picture onto a physical wall in the room, or alternatively, may even pin the virtual picture into a virtual wall created by the AR system. It should be appreciated that the photographs may either be in 2D form, or even 3D photographs, in some embodiment. Thus, the AR system constantly acquires 3D information, which may be retrieved and reused at a later time. For example, text messages or any items may appear in either 2D or 3D based on the user's preferences. The user may manipulate the virtual content by using gestures, as will be discussed further below, and may bring content toward himself or away simply by using gestures or any other user input.

Figure 97C:
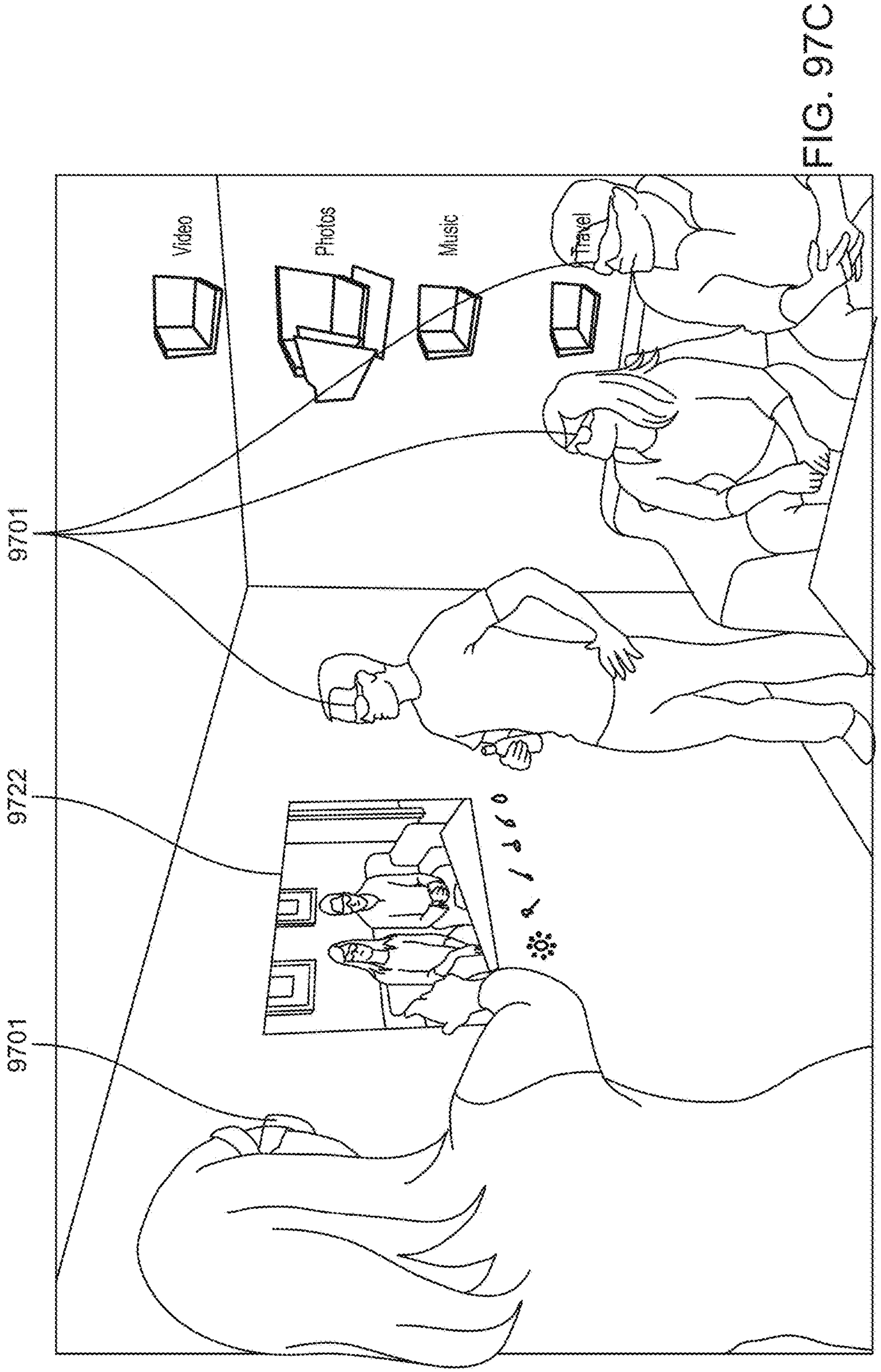

FIG. 97C shows the host user and guests in the physical living room enjoying pictures, for example pictures captured during the party. As illustrated, the virtual picture 9722 has been pinned to the living room's physical wall. The AR system 9701 may render the pictures, for example such that each user perceives the pictures to be on a wall. The users can scale the pictures via appropriate gestures.

The party wall lets others experience or re-experience the party, and the people attending the party. The party may be captured as a full light field experience of the whole party. This allows going back and reliving the party, not as a video, but as full point of view experience. In other words, a user would be able to wander around the room, seeing the people walk by the user, and viewing the party after the fact from essentially any vantage point.

Figure 97D:
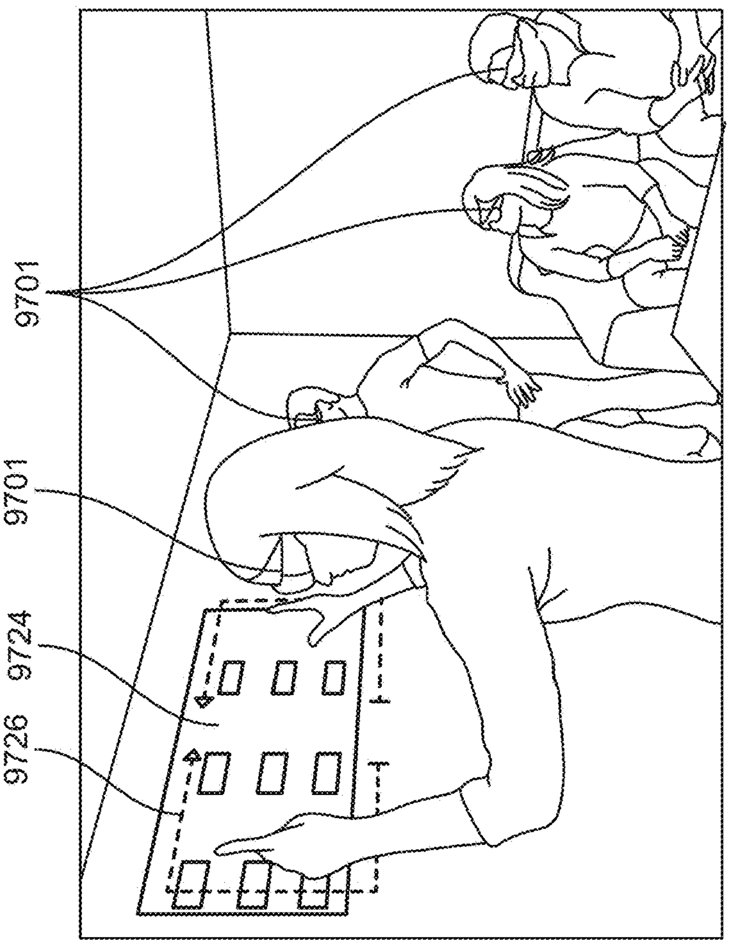

FIG. 97D shows the host user and guests in the physical living room setting up a virtual display, monitor or screen to enjoy media content, for example a movie.

As illustrated in FIG. 97D, the host user may gesture to create a virtual display 9724, monitor or screen and to otherwise indicate or command the AR system to set up to display media content, for example a movie, television type programming, or video. In particular, the host user uses a two hand gesture 9726 to frame an area, for example facing a wall on which the media content should be rendered to appear. The host user may spread the index finger and thumb at right angles to make an L-shape to outline a desired perimeter of the virtual display 9724, monitor or screen.

The host user may adjust the dimensions of the virtual display, monitor or screen 9724 through another gesture. Notably, the use of a 4D light field directed to the retina of the users' eyes allows the size of the virtual display, monitor or screen to be virtually unlimited since there is practically no mechanical limit on scaling, the only appreciable limit being the resolution of the human eye.

Further, it is noted that the individual AR system of the host user (e.g., worn by host user) may coordinate with the individual AR systems of the guest users, such that the guest user can share the experience of the host user. Thus, the host user's individual AR system may detect the host user's gesture(s), define the virtual display, monitor or screen, and even identify user-selected media content for presentation. The host user's individual AR system may communicate this information, either directly or indirectly, to the individual AR system of the guest users. This may be accomplished, through the passable world model, in one or more embodiments.

Figure 97E:
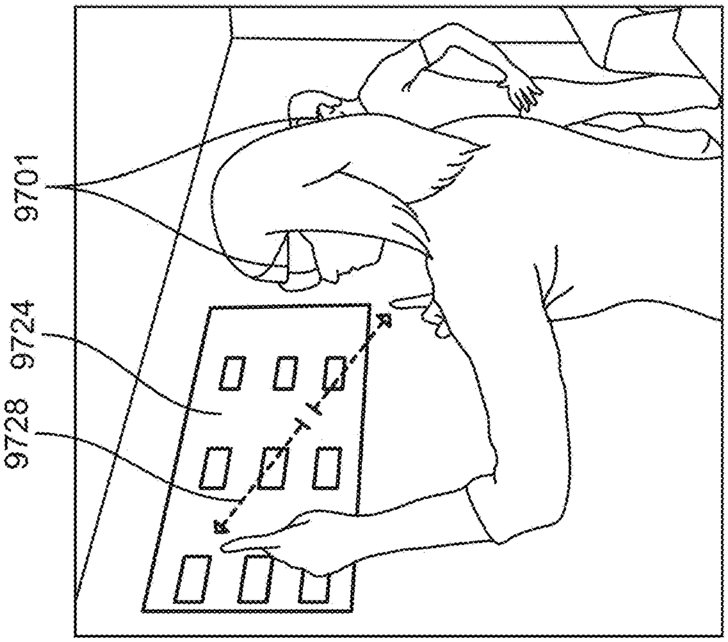

FIG. 97E shows the host user and guests in the physical living room setting up a virtual display, monitor or screen to enjoy media content, for example a movie.

In contrast to FIG. 97D, the host user makes another gesture 9728 that draws a diagonal with a pointed index finger, to indicate a position and size of the desired virtual display, monitor or screen.

Figure 97F:
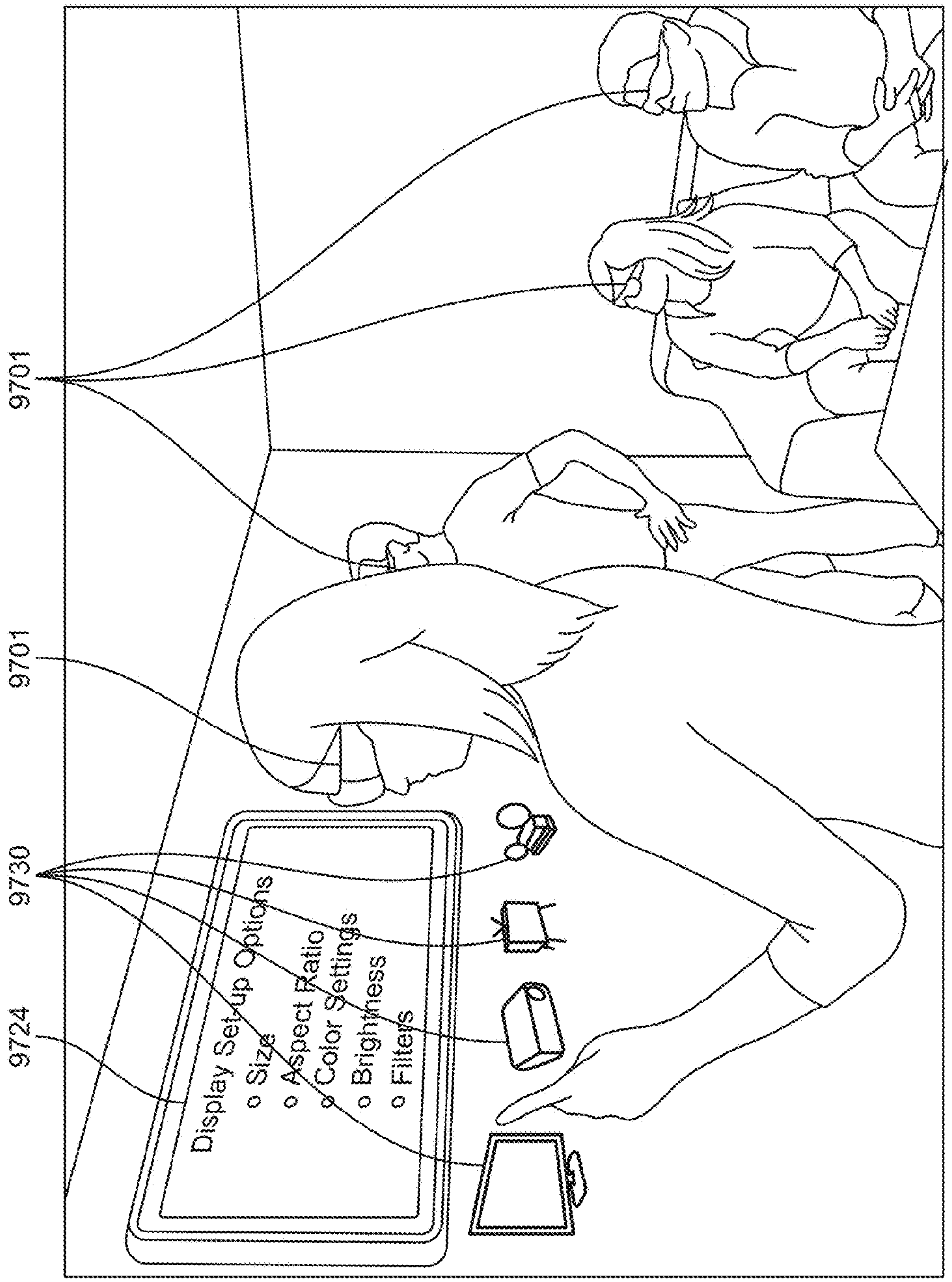

In FIG. 97F, the user may further pick characteristics for the virtual display, monitor or screen 9724. For example, the user may gesture to pick aesthetic characteristics, for example of a border, bezel or frame through virtual icons 9730. The user may also gesture to pick operational characteristics, for example characteristics related to image reproduction and/or quality. For example, the user may select from a variety of legacy physical monitors or televisions. The AR system can replicate the picture characteristics of legacy monitors or televisions (e.g., a color television from 1967).

Thus, the host user may select a monitor or television from a list of makes and models and years, to replicate historically accurate devices, with the same physical cabinet look, same visual or picture characteristics look, and even replicate older sound. The user can experience older programs or media content on period realistic monitors or televisions. The user may experience new program or media content on older monitors or televisions.

The AR system may create a virtual display, monitor, or television 9724 that faithfully replicates a top of line current day television or monitor, or even future televisions or monitors. These types of embodiments essentially obviate any reason to purchase a physical display system (e.g., computer, television, etc.).

In fact, multiple users may use multiple televisions, with each television screen displaying different content. The AR system may also render virtual content to match the picture characteristics of movie projectors, whether classic period pieces, or the most up to date digital movie projectors. For example, the AR system may render virtual content to replicate one or more features of an a large scale cinematic projector and screen or screen. Depending on the speaker configuration that is available, the AR system may even replicate the sound system of a movie theater.

The AR system may render virtual content that replicates sitting in a theater. For example, the AR system may render virtual content that matches or closely resembles the architecture of a theater. Thus user may select a theater for replication, for example from a list of classic theaters. The AR system may even create an audience that at least partially surrounds a user. The virtual content may, for example, be locked to the body coordinate frame. Thus, as the user turns or tilts their head, the user may see virtual representations of different parts (e.g., walls, balcony) of a theater along with virtual representations of people who appear to be seated around the user. The user may even pick a seating position, or any other vantage point.

A Website or application store may be set up to allow users to design and share filters or other software which replicates the look and feel of classic televisions, monitors, projectors and screens, as well as various performance venues such as movie theaters, concert halls, etc.

Thus, a user may select a particular theater, location in the theater, a particular projector type and/or sound system type. All these features may simply be rendered on the user's AR system. For example, the user may desire to watch a particular vintage TV show on a vintage television set of the early 1960s. The user may experience sitting the episode in a virtual theater, seeing those sitting around and/or in front of the user. A body-centric field of view may allow the user so see others as the user turns. The AR system can recreate or replicate a theater experience. Likewise, a user can select a particular concert venue, a particular seat or location (e.g., on stage, back stage) in the venue. In one or more embodiments, venues may be shared between users.

Figure 97G:
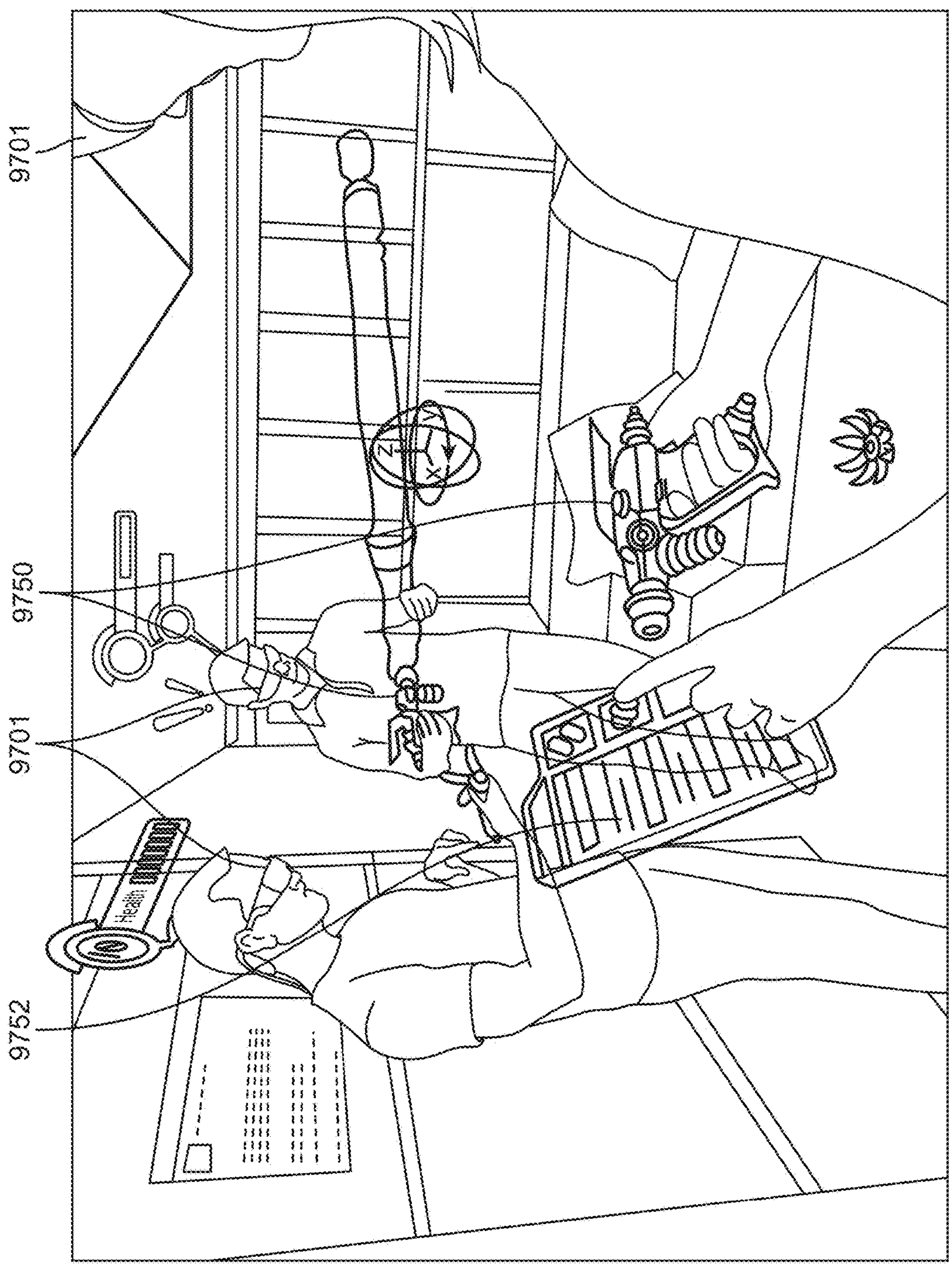

FIG. 97G shows a number of users, each holding a respective physical ray gun totem 9750, interacting with a virtual user interface 9752 rendered by an AR system to customize their weapons, according to one illustrated embodiment.

Before play, each user may pick one or more virtual customization components for their respective ray gun totem. The user may select customizations via a virtual customization user interface renders to each user's field of view by their respective individual AR systems. For example, the users may pick custom accessories (e.g., scopes, night vision scopes, laser scopes, fins, lights), for example by gesturing or by voice commands.

Each user's respective individual AR systems may detect the user's gestures or selections. Rather than adding on additional physical components, the individual AR systems (e.g., body and/or head worn components) may render virtual content which customizes each ray gun in each user or player's field of view. Thus, the various individual AR systems may exchange information, either directly or indirectly, for example by utilizing the passable world model, for example.

Notably, the physical ray gun totems 9750 may be simple devices which, for example, may not actually be functional. Rather they are simply physical objects that may be given life through virtual content delivered in relation to the physical objects. As with previously described totems, the AR system detects user interaction, for example via image information captured outward facing cameras of each user's individual augmented reality device (e.g., head worn component).

Likewise, the AR systems may render blasts or other visual and/or aural affects in the users' fields of vision to replicate shooting of the ray guns. For example, a first individual AR device worn by a first user may detect the first user aiming the first ray gun totem which first user is carrying and detect the first user activating a trigger. In response, the first individual AR device renders a virtual blast affect to the field of view of the first user and/or a suitable sound to the ears of the first user, which appear to originate with the first ray gun totem.

The first individual AR device passes a passable world mode, either directly or indirectly, to a second and a third individual AR system, worn by the second and the third users, respectively. This causes the second and the third individual AR systems, to render a virtual blast visual affect in the field of view of the second and third users so as to appear to have originated from the first ray gun totem. The second and the third individual AR systems may also render a virtual blast aural or sound affect to the ears of the second and third users so as to appear to have originated from the first ray gun totem.

While illustrated with a generally gun shaped totem, this approach may be used with other totems including inanimate totems and even animate totems. For example, a user could choose to "weaponized" a portion of the body (e.g., hand). For example, a user may choose to place virtual rockets on their hands and/or to have virtual fireballs emanate from their fingertips. It is of course possible to have the AR systems render many other virtual affects.

Figure 97H:
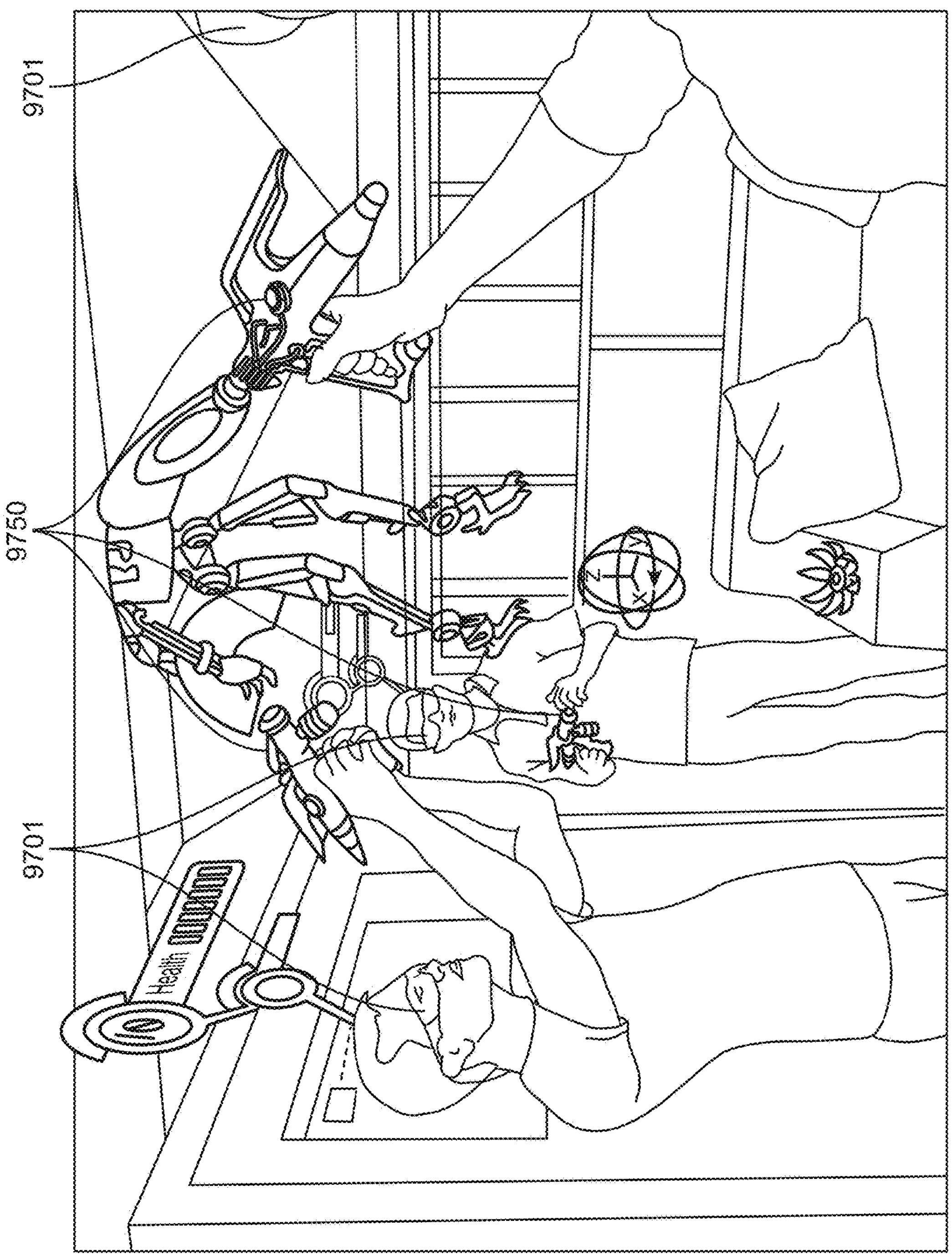

FIG. 97H shows a number of users of AR systems 9701, each holding a respective physical ray gun totem 9750, with virtual customizations, playing a game with virtual content rendered via the AR system, according to one illustrated embodiment.

As illustrated in FIG. 97H, the users may play a game in which the battle virtual aliens or robots from another world.

The individual AR systems render the virtual aliens in the fields of view of the respective users. As noted above, the respective individual AR systems may track the respective user's aiming and firing interactions, and relay the necessary information to the other ones of the individual AR systems. The users may cooperate in the game, or may play against each other. The individual AR systems may render a virtual scoreboard in the users' fields of vision. Scores or even portions of the game play may be shared via social media networks.

Figure 98A:
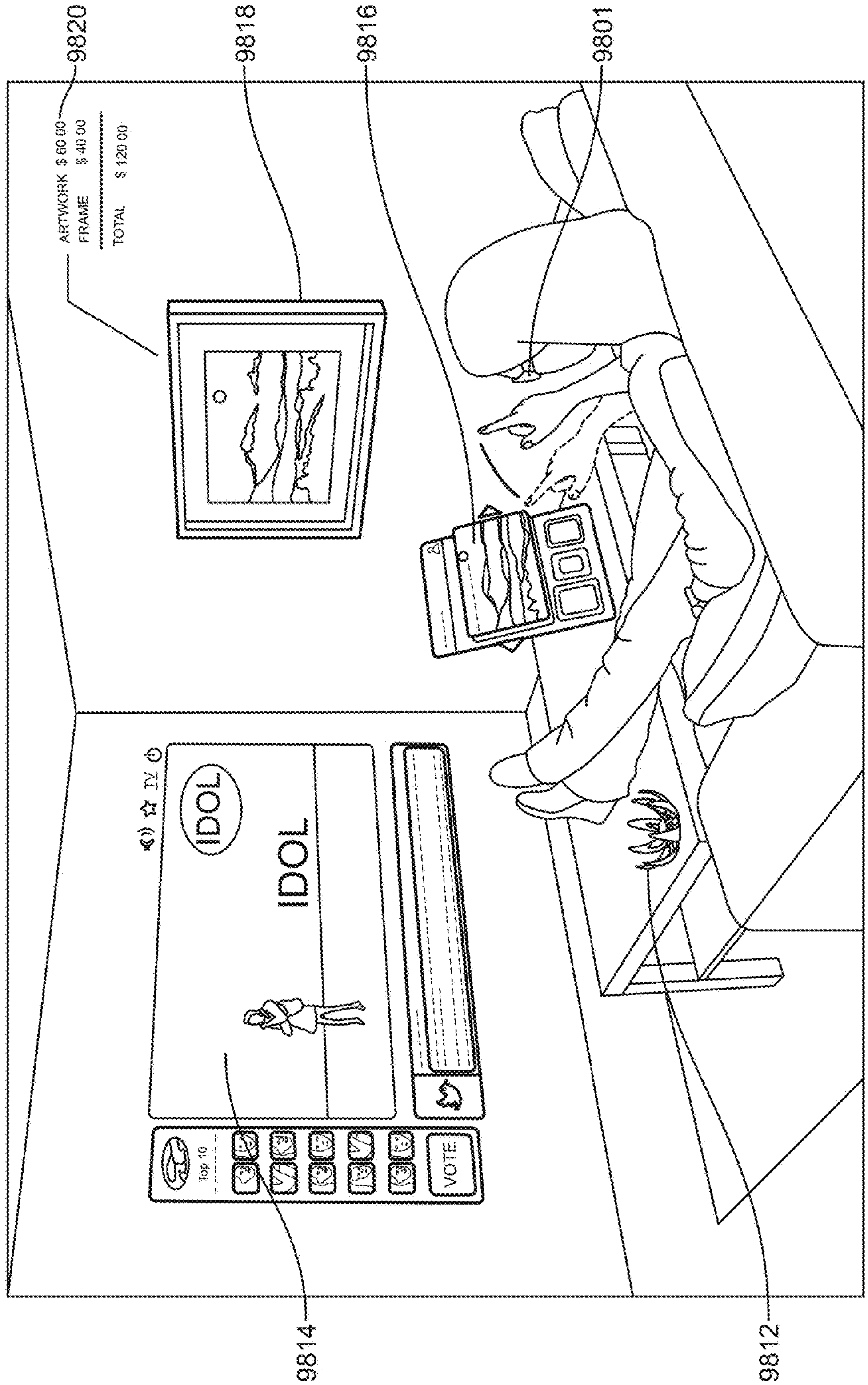
FIGS. 98A-98D illustrate a web shopping experience with the AR system, according to one or more embodiments.
Figure 98B:
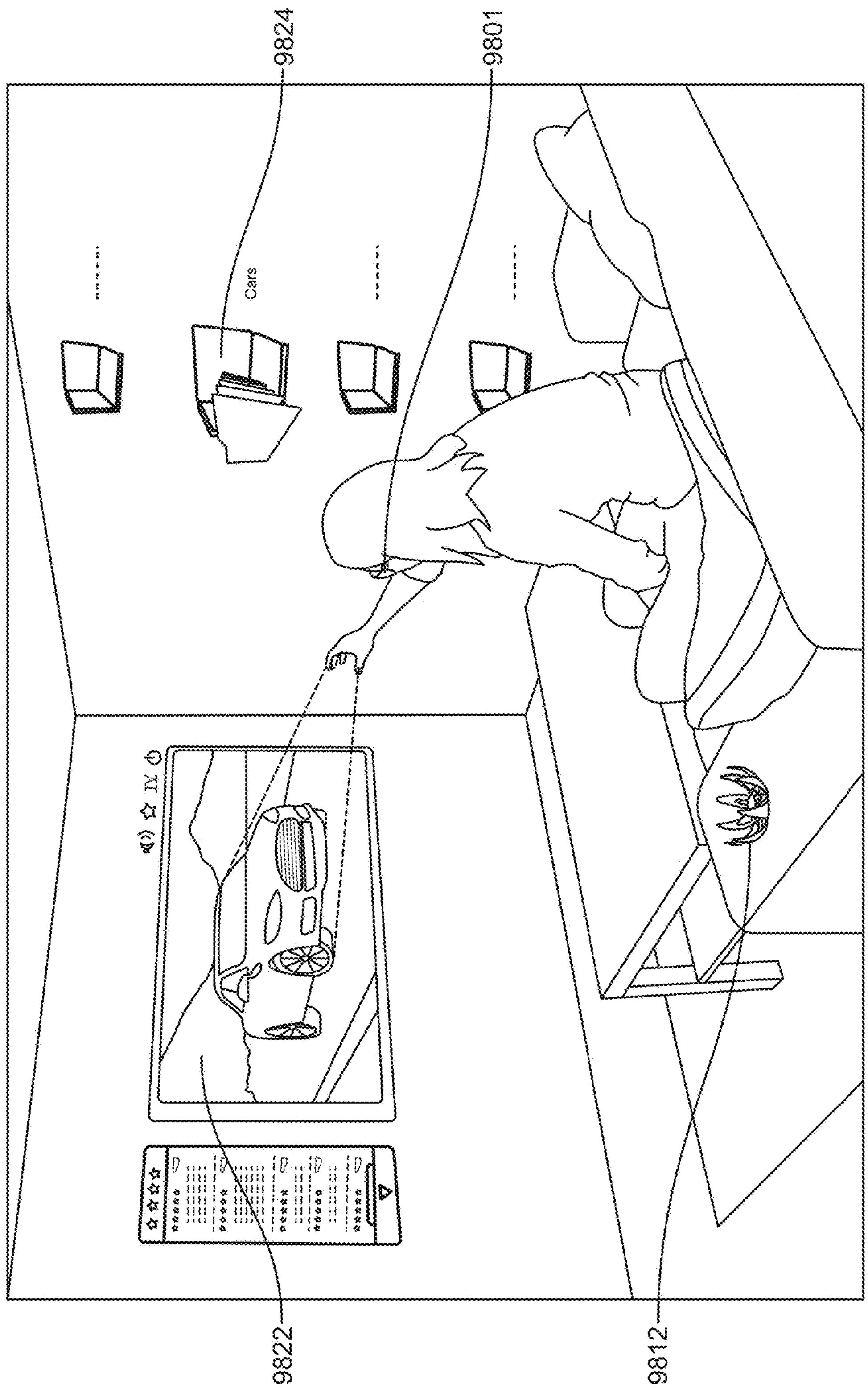
Figure 98C:
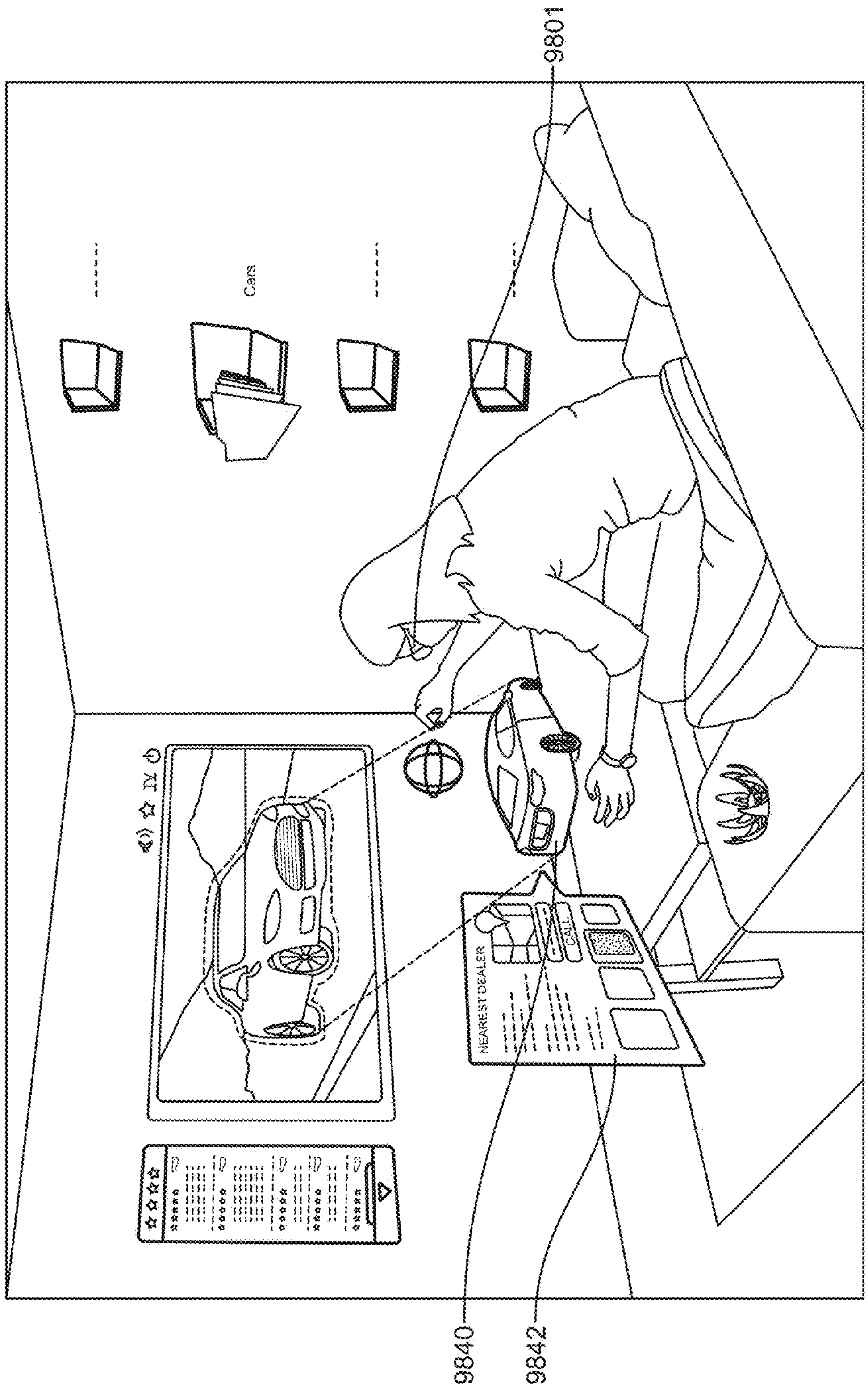

FIGS. 98A-98C show a user in a living room of her home, interacting with virtual content rendered by an AR system at successive intervals, according to another illustrated embodiment.

As illustrated in FIG. 98A, in response to recognizing that the user is, for example, in her own living room, the AR system may render appropriate or corresponding virtual content. For example the user may by watching a television program on a virtual television 9814 which her individual AR system 9801 has rendered in her field of vision to appear as if on a physical wall of the living room. The individual AR system 9801 may also render a second virtual screen 9816 with related media content (e.g., voting menu, contestant rankings or standings) to provide the user with a second screen experience. The individual AR system 9801 may further render a third screen (not shown) with additional content, for example social media content, or electronic messages or mail.

The user may also, for example, view or shop for artwork. For example, the individual AR system may render an artwork viewing or shopping user interface to a totem 9812. As previously discussed the totem 9812 may be any physical object (e.g., sheet of metal or wood). The totem may, for instance, resemble a tablet computing device is terms of area dimensions, although could have a much smaller thickness since no on-board electronics are required.

Also as previously discussed, the individual AR system 9801 detects user interactions with the totem, for instance finger gestures, and produces corresponding input. The individual AR system 9801 may further produce a virtual frame 9818 to view artwork as it would appear on a wall of the user's living room. The user may control the dimensions of the frame using simple gestures, such as those previously described for establishing the dimensions of a virtual display, monitor or screen. The user may also select a frame design, for example from a set of frame images. Thus, the user is able to see how various pieces of art fits the décor of the house. The individual AR system 9801 may even render pricing information proximate the selected artwork and frame as shown in virtual box 9820.

As illustrated in FIG. 98B, in response to seeing an advertisement 9822 for a vehicle the user likes, the user gestures to perform research on the particular vehicle.

In response, the individual AR system 9801 may re-render the second virtual screen with related media content (e.g., vehicle specifications, vehicle reviews from experts, vehicle reviews from friends, recent cost trends, repair trends, recall notices).

As also illustrated in FIG. 98B, the individual AR system 9801 may, for example, render a high level virtual menu 9824 of the use's virtual spaces in the user's field of view, to appear as if the virtual menu is on a physical wall of the user's living room. The user may interact with the menu using simple gestures to interact with the virtual spaces, which the individual AR system monitors. The virtual menu may be scrollable in response to defined gestures.

As also illustrated in FIG. 98B, the user may gesture (e.g., grasping and pulling gesture) to pull a virtual 3D model of the vehicle from the virtual television or virtual monitor.

As illustrated in FIG. 99C, in response to the user grasping and pulling gesture (FIG. 98B), the AR system may render a virtual three-dimensional model 9840 to the user's field of vision, for example located between the user and the virtual television or virtual monitor. When using a light field, a user may even be able to walk around the vehicle or rotate the three-dimensional model of the vehicle in order to examine the vehicle from various different viewpoints or perspectives.

It may even be possible to render the interior of the vehicle, as if the user were sitting in the vehicle. The AR system may render the vehicle in any user selected color. The AR system may also render dealer information, color choices and other vehicle specifications in another virtual screen 9842, as shown in FIG. 98C.

Virtual enhancements such as the ability to retrieve a three-dimensional model may be synchronized with, or triggered by, broadcast content or programming. Alternatively, visual enhancements may be based on user selections.

The user may save the three-dimensional model 9840 of the vehicle and/or vehicle related research to a vehicle virtual room or virtual space. For example, the user may make a gesture (e.g., waving or backhanded sweeping motion) toward the appropriate folder of the virtual menu. The AR system 9801 may recognize the gesture, and save the vehicle related information in a data structure associated with the vehicle virtual room or virtual space for later recall.

Figure 98D:
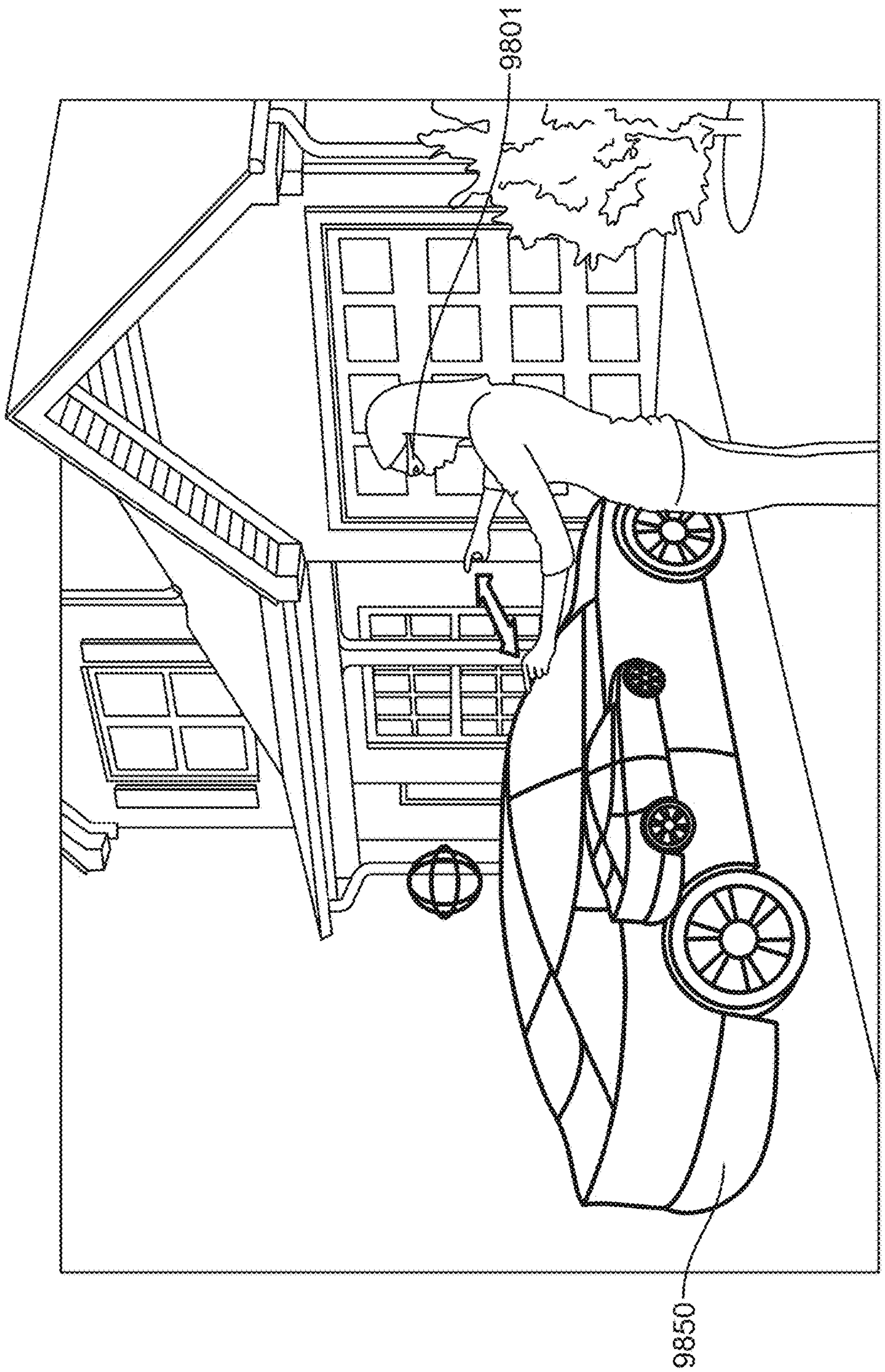

FIG. 98D shows a user of the AR system 9801 in a driveway, interacting with virtual content 9850 rendered by the AR system 9801, according to another illustrated embodiment.

The user may step out to the driveway, to see how the vehicle would appear parked in front of the user's home. The AR system renders a three-dimensional view of the vehicle 9850 to the user's field of vision to make the vehicle appear to be positioned in the driveway. The AR system may automatically scale the appearance of the virtual vehicle through gestures, as shown in FIG. 98D.

In one or more embodiments, the AR system may use a separate operating system, which may function somewhat similarly to game engines. While a traditional game engine may work for some systems, other systems may impose additional requirements making the user of a traditional game engine difficult. In one or more embodiments, the operating system may be split into two distinct modes, and corresponding solutions and/or architectures, to meet the requirements of both modes.

Like a traditional computer system, the operating system (OS) operates in 2 distinct modes: i) Modal, and ii) Nonmodal. Nonmodal mode is similar to a typical computer desktop, with multiple applications running simultaneously so that the user can surf the web, instant message (IM), and check email simultaneously.

Modal mode is similar to a typical videogame in which all the applications shut down (or goes into the background), and the game completely takes over the system. Many games fit into such a mode, while traditional computing functions will need a nonmodal approach.

To achieve this, the OS may be split into two components: (a) the Subsystem, and (b) the Windowing Interface. This is similar in some respects to how modern operating systems work. For an example, under a particular operating system, the kernel and many applications work together to provide the Subsystem, but then other operating systems may provide the user a traditional desktop, icons, and windows.

Similarly, the OS may likewise be split into a Subsystem of one type of operating system (e.g., Linux Kernel for basic operations) and custom applications (e.g., PACER, gyros, GPS, passable world modeling, etc.), for another operating system (e.g., Windows® System). The two modes would apply only to the Window® System, as the subsystems would by necessity run continuously.

However, the two modes may also introduce additional complexities to the system. While the nonmodal system may offer traditional computing features, it operates in a decidedly nontraditional way. The 3D nature of it, along with a combination of planar surfaces (screens) combined with nonplanar objects (3D objects placed within the user's view) introduce questions about collision, gravity, and depth, many traits shared by modern game engines. For this reason, the "Operating System" portion of the system may be custom-designed.

The simplest nonmodal application is the "surface." A simple virtual 2D planar surface rendered in the 3D environment and running traditional computing tools (e.g., Web browser, etc.). It is anticipated that most users will run the system with several surfaces in both a body-centric orientation (e.g., Twitter® feed to the left, Facebook® on the right) and in a world-centric orientation (e.g., Hulu® stuck on the wall over the fireplace).

The next nonmodal application step is "notifiers." These may, for example, be 2D planar surfaces augmented with 3D animation to notify the user of some action. For example, email will probably remain a traditional 2D planar system, but notification of new mail could be done, for instance via a bird flying by and dropping off a letter on the surface, with a similar effect of a water droplet in a pond as the message is "received."

Another nonmodal application step relates full 3D applications. Not all applications may fit into this space and initially the offerings will be limited. Virtual pets are perfect examples of full 3D, nonmodal applications: a fully 3D rendered and animated "creature" following the user throughout the day. Nonmodal applications may also be the foundation of "inherited" applications from an existing platform.

It is anticipated that most AR systems will be full-modal applications. For example, when a game is launched (e.g., in which users use ray gun totems to battle virtual invaders rendered into their respective fields of vision), a modal application is used. When launched, all the user's surfaces and virtual content will disappear and the entire field will be replaced with objects and items from game. Upon leaving the game, the user's individual virtual surfaces and virtual content may be revived.

Modal systems may rely on a game engine. Some games may make use of a higher-end game engine, while others require simpler gaming engines. Each game may select a game engine fit to their design choices and corporate guidance.

In one or more embodiments, a virtual collection of various gadgets in a modal system may be utilized. At start the user defines a "play area" (maybe a tabletop or floor space) and then begins placing virtual "toys." Initially, the virtual toys could be very basic objects (e.g., balls, sticks, blocks) with only fundamental physics principles (e.g., gravity, collision detection).

Then, the user can progress to more advanced virtual toys, for example purchased in-game via a virtual store or coming as bundled add-ons with other games (e.g., Army Men). These more advanced virtual toys may bring along their own animations or special attributes. Each virtual toy may come with basic animations and behaviors to allow interactions with other objects. Using a system of "tags" and "properties," unexpected behaviors could develop during use or play.

For example, a user may drops a simple virtual cartoon character on a table. The virtual cartoon character may immediately go into a "patrol mode". Shortly afterwards, the virtual cartoon character toy recognize similarly tagged objects and start to coordinate formations. Similarly, other such virtual characters may be brought onto the table using the virtual collection.

This approach brings several interesting aspects to the system. There may be few or no rules at all, other than those specifically stipulated by the user. Thus, the virtual collection is designed to be a true play zone.

It one embodiment, games may be branded to be virtual collection "compatible". In addition, elements may be sold (e.g., through micro-transactions) directly to others. This may also the first step toward introducing the user to merging real and virtual objects into cohesive single experiences. If the physical table could be accurately and dynamically mapped then any physical object can become a virtual character, in one or more embodiments.

The virtual collection game may be used by any user of the system, but they may not buy it simply for the experience. This is because the virtual collection is not a standalone game. People may buy the system to play a set of compatible games (e.g., games with a roughly common UI, table-top interaction paradigm, and an offering of in-game assets in the appropriate format).

Figure 99:
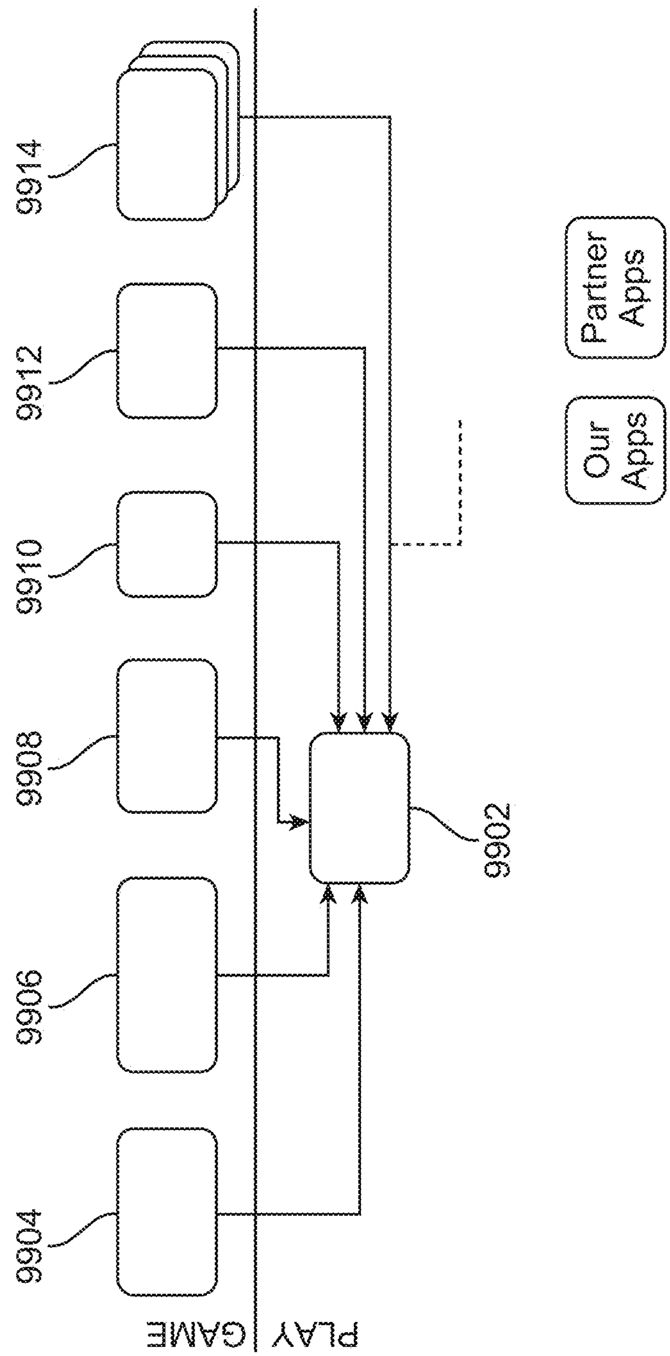
FIG. 99 illustrates a block diagram of various games in a gaming platform, according to one or more embodiments.

As illustrated in FIG. 99, a variety of different types of games and game titles are suitable to be made as compatible games through the virtual game collection 9902. For example, any classic board-games 9914 in new "digital" formats may be included. Also for example, tower-defense games 9904 (e.g., arranging assets on the table, in an attempt to block oncoming waves of enemies) may be included. As another example, "God" Strategy games 9906 may be included. As yet a further example, even popular sports games 9908 (Football, Soccer, Baseball, etc.) may be included. Other adventure games 9910 may also be included in the virtual game collection.

The class of compatible table top games is strategically important. External developers can make compelling games using an existing game engine which would most likely need to be modified to accept new input (e.g., hand/eye/totem tracking) and import to the AR system.

Toy Box

The AR system may implement various games what have inter-operable components. The games may, for example be designed for tabletop use. Each game may essentially be independent from other games, yet a construct allows sharing of elements or assets between games, even though those elements or assets may not be specifically designed into the game into which the element or asset is being shared. Thus, a first game may not have explicit definition of an element or asset that is explicitly defined and used in a second game. Yet, when the element or asset from the second game appears unexpectedly in the first game, the first game is able to accommodate the element or asset based on an application of a defined set of rules and one or more characteristics associated with the element.

In one or more embodiments, a virtual toy collection interface may be implemented in which elements or assets of every installed game (that is compatible with the virtual toy collection interface) is available in one integration location. This interface may be understood by all the games that is compatible with the interface.

A first game designer may define a first game with a first set of elements or assets. A second game designer may define a second game with a second set of elements or assets, different from the first set of elements or assets. The second designer may be completely unrelated to the first designer and may have never seen, or even heard of the first game, and may know nothing of the elements or assets of the first game. However, each game designer may make respective games with elements or assets that understand physics as their baseline interaction. This renders the elements or assets interchangeable between different games. For example, a first game may include a tank character, which is capable of moving, rotating a turret and firing a canon. A second game may include a dress up doll character (e.g., Barbie® doll), and may have no explicit definition of a tank or properties associated with a tank character. A user may then cause the tank character from the first game to visit the second game.

Both games may include fundamental characteristics or properties (e.g., an ontology of game space). If both the first and the second games have a common construct (e.g., understand physics, physics engine) the second game can, at least to some extent, handle the introduction of the character (e.g., tank) from the first game. Thus, the character (e.g., tank) from the first game can interact with the character (e.g., Barbie® doll) from the second game. For instance, the character (e.g., tank) from the first game may shoot the character (e.g., Barbie® doll) from the second game, via message passing. The character from the second game (e.g., Barbie® doll) does not know how to receive or does not understand the message (e.g., "you got shot"). However, both games have basic physics in common. Thus, while the first character (e.g., tank) cannot shoot the second character (e.g., Barbie® doll), the first character (e.g., tank) can run over the second character (e.g., Barbie® doll). The world is used as the communication mechanism.

The AR system may rely on passable world model for communication. In the above example the first and second characters do not need a common language, since they have physics in common. It would be conceivable to take a ball from one game, and use a doll from another game as a bat to hit the ball, since the physics of two objects colliding are defined.

Thus, if the physics are shared, the games or applications do not need a communication protocol between virtual objects belong to each. Again, if a tank runs into a doll, the doll gets run over, even if getting run over by a tank was not explicitly defined in the second game, or for that matter the first game.

Various levels in the AR system are maps of the real world. The user interface is based primarily on tracking of hands, eye, and/or totem. Tracking a user's hands includes tracking gestures. Tracking totem use includes tracking pose of the totem, as well as interaction of a user's hands or fingers with the totem.

It should be appreciated that the capabilities of an individual AR system may be augmented by communicatively connecting (tethered or wirelessly) the individual AR system to non-portable equipment (e.g., desktop personal computer, AR server, etc.) to improve performance. User worn components may pass-through information to the AR device (e.g., desktop personal computer, AR server, etc.), which may provide extra computational power. For example, additional computational power may be desired, for instance for rendering, to run more object recognizers, to cache more cloud data, and/or to render extra shaders.

Other Applications

In one or more embodiments, the AR system may allow users to interact with digital humans. For example, a user may walk into an abandoned warehouse, but the space may become populated with digital humans such that it resembles a bank. The user may walk up to a teller who may be able to look at the user's eyes and interact with him/her. Because the system tracks the user's eyes, the AR system can render the digital human such that the digital human makes eye contact with the user.

Or, in a related embodiment, eye-tracking technology may be used in other applications as well. For example, if a user walks toward a kiosk, the kiosk may be equipped with eye-trackers that are able to determine what the user's eyes are focusing on. Based on this information, a digital human, or video representation of a human at the kiosk (e.g., a video at the kiosk) may be able to look into the user's eyes while interacting with the user.

In another embodiment, a performer may be able to create virtual representations of himself or herself such that a digital version of the performer may appear in the user's physical space. For example, a musician may simply be playing music at a green-room that is recording the performance, and this performance may be broadcast to the living rooms of multiple users. However, the system may only use change data to broadcast what is changing in the user's performance rather than having to re-render every aspect of the performer while he is performing. Thus, a very accurate rendering of the virtual representation of the performed may be rendered in multiple user's living rooms. In yet another improvement, having the eye-tracking data of the user, the digital human (the virtual representation of the performer in this case) may be rendered such that the digital human is making eye contact with the user. Thus, this may improve the user experience by having virtual representations/digital human interact directly with multiple users.

In one or more embodiments, the AR system may be used for educational purposes. For example, a series of educational virtual content may be displayed to a child. The child may physically touch the virtual object, or in other embodiment, the child may simply look at the virtual object for a longer period of time to unlock metadata related to the object. For example, the child may be surrounded by various sea creatures in his/her living room. Based on the user input, metadata related to the virtual object may be duly unlocked. This provides an entirely new paradigm in education in that virtually any space may be transformed to an educational space. As illustrated in the shopping experience of FIGS. 89A-J, even a grocery store may be used as an educational playground.

Similarly, the AR system may be used in advertising applications as well. For example, the user may see a particular advertisement on TV, or maybe see a pair of shoes he/she may like on a peer. Based on the user input (eye gaze, touching, or any other input), the user may be directed to the company's webpage, or to another seller who may be selling the item. For example, virtual icon may automatically populate within the field-of-view of the user, providing various purchase-related options to the user. Or, in a related embodiment, the item may simply be placed in a "shopping cart" or similar storage bag, such that the user can check out the item later.

In related embodiments, a different type of advertising paradigm may be envisioned. For example, a visual impression ("click" and buy-through) model may be utilized for purchases. For example, if a user sees a pair of shoes on a peer, and takes the step of going to the retailer's website, and at least place a similar pair of shoes in the online shopping cart, the advertiser may perhaps pay the peer through a referral program. In other words, the AR system knows, through eye tracking techniques that the user has seen the peer's pair of shoes, and that the user has become aware of shoes due to that interaction (e.g., even if the peer and the user do not talk about the shoes). This information may be leveraged advantageously, and the peer may be rewarded by the advertiser or the retailer.

Or, in anther embodiment, a user may sell his impressions, clicks and buy-throughs to advertisers. In other words, advertisers may choose to buy data directly from a set of users. Thus, rather than advertisers having to publish ads and subsequently monitor user behavior, individual users may simply sell their behavior data to the advertiser. This empowers users with control to utilize the data based on individual preferences.

In yet another embodiment, a revenue share program may be implemented such that advertisers share their revenue with users in exchange for content/data. For example, an advertiser may directly pay the user to collect or receive data collected through the AR systems.

In yet another implementation, the AR system may be used for personalized advertising. Thus, rather than seeing images or advertising content being displayed on models or celebrities, advertising content may be personalized such that each person sees an advertisement with his/her own avatar. For example, rather than seeing a billboard advertisement with a celebrity, the advertisement may feature the user himself wearing the product, say shoes. This may also be a way for the consumer to model the product and judge whether the item or product is desirable to them. Moreover, the personalized advertisement may be more appealing to users since it's a direct appeal to each user, and the AR system may tap into personality traits of the user to advertise directly to him/her.

In another application, the AR system may be implemented as a parental guidance application that may monitor children's usage of the AR system, or generally monitor children's behavior even when the parent is not physically proximate to the child. The AR system may use it's mapping capabilities to retrieve images/videos of spaces such that parents can virtually be anywhere at any time with the kids. Thus, even if the child is at school, or at a park, the parent may be able to create an avatar of himself/herself to plant themselves into that space and watch over the kids if need be.

In another embodiment, the AR system may allow users to leave virtual objects for other users to discover in a real physical space (e.g., FIG. 125J). This may be implemented within a game setting (e.g., scavenger hunt gaming application, etc.) in which users strive to unlock virtual objects at various physical spaces. Or, similarly, a user may leave important information in the form of virtual content for a friend who may later be occupying the same physical space. In an optional embodiment the user may "lock" the virtual content such that it may only be unlocked by a trusted source or friend. Given that the AR system may "recognize" users based on unique identifiers, or else, based on a user's appearance, the AR system may only unlock the virtual content, or metadata related to the virtual content when "touched" or activated by the intended recipient, to ensure privacy and safety.

In another gaming application, one or more users may be able to play their favorite video games in a physical space. Thus, rather than playing a video game or mobile game on a screen, the AR system may render the game in 3D and in the physical scale most appropriate to the user and the physical location. For example, the AR system may render virtual bricks and "birds" that may be physically clutched by the user and be thrown toward virtual bricks, to gain points and progress to the next level. These games may be played in any physical environment. For example, New York City may be transformed to a virtual playground with multiple users of the AR system using both physical and virtual objects to interact with each other. Thus, the AR system may have many such gaming applications.

In yet another application, the AR system may be used for exercising purposes. The AR system may transform exercise into an enjoyable game. For example, the AR system may render virtual dragons that may appear to be chasing a user, to make the user run faster, for example. The user may go on a run in his neighborhood, and the AR system may render virtual content that makes the run more enjoyable. For example, the exercise application may take the form of a scavenger hunt that the user has to get to within a fixed period of time, forcing the user to run/exercise more efficiently.

In another embodiment, the AR system may render a "plant" or any other virtual content whose form, shape or characteristics may change based on the user's behavior. For example, the AR system may render a plant that blooms when the user exhibits "good" behavior and wither away when the user does not. In a specific example, the plant may bloom when the user is being a good boyfriend, for example (e.g., buys flowers for girlfriend, etc.) and may wither away when the user has failed to call his girlfriend all day. It should be appreciated that in other embodiments, the plant or other object may be a physical object or totem that registers to the AR system's machine vision, such that the physical object is tied to the AR system. Thus, many such gaming applications may be used to make the user experience more fun and interactive with the AR system and/or other users of the AR system.

In yet another embodiment, the AR system may have applications in the field of health insurance. Given the AR system's ability to constantly monitor a user's behavior, companies may be able to gauge a user's health based on his behaviors and accordingly price insurance premiums for the individual. This may serve as an incentive for healthy behavior to drive premiums down for insurance because the company may see that the user is healthy and is low-risk for insurance purposes. On the other hand, the company may assess unhealthy behavior and accordingly price the user's premiums at a higher rate based on this collected data.

Similarly, the AR system may be used to gauge productivity of employees at a company. The company may collect data on an employee's work habits and productivity and may be able to accordingly provide incentives or compensation to the employee based on the observed productivity.

In another health application, the AR system may be implemented in the healthcare space, and may be used in virtual radiology, for instance. For example, rather than relying simply on 2D images or MRI scans, the AR system may instead render a virtual model of a particular organ, enabling the doctor to determined exactly where, in the 3D space the tumor or infection is located (e.g., FIG. 91A). The AR system may use a combination of MRI and CT scan images, for example, to create an accurate virtual model of a patient's organ. For example, the system may create a virtual heart based on received data such that the doctor can see where there might be a problem within the 3D space of the heart. It should be appreciated that the AR system may thus have many utilities in the health care and hospital space, and may help doctors (e.g., surgeon, radiologist etc.) accurately visualize various organs in the body to diagnose or treat their patients accordingly.

In a related embodiment, the AR system may help improve healthcare because the doctor may have access to all of the patient's medical history at his/her disposal. This may include patient behavior (e.g., information not necessarily contained in medical records). Thus, in one or more embodiments, the history of patient behavior may be appropriately categorized, and presented to the doctor/medical technician such that the doctor can treat the patient accordingly. For example, if the patient is unconscious, the doctor may (based on the user's privacy controls) be able to search through the record of the user's behavior in the recent past to determine a cause of the ailment and treat the patient accordingly.

Because the AR system has advanced eye tracking capabilities (e.g., gaze tracking that monitors the pupil, and the cornea), the AR system may detect certain patterns in eye movements (e.g., changes in speech, rapid changes in pupil size, etc.), or the retina when the patient is having a seizure. The AR system may then analyze the pattern, and determine if it is a recurring pattern every time a user is having a seizure. For example, all seizure patients may have a similar eye patterns or changes in pupil size, or other similar symptoms. Or, every patient may have a distinct pattern or eye movements/pupil size changes etc. when undergoing a seizure. In either case, equipped with patterns that are unique to seizures or individual patients that have undergone seizures, the AR system may program the back of a user's retina with light signals or patterns that may treat or prevent seizures.

In one or more embodiments, a light therapy program may be periodically administered to the patient, which may act as a distraction or therapy while the user is having a seizure. Over time, such a therapy may reduce or stop the occurrences of seizures in the user/patient.

For example, a particular light pattern (e.g., frequency, wavelength, color, etc.) may be known to help mitigate or otherwise treat or prevent seizures altogether. It has been observed that seizures may be instigated by certain types of light; therefore light patterns delivered to the back of the retina may have the effect of un-doing the effects of that type of light, in some cases. Thus, the AR system may be used to detect seizures, and may also be used to prevent or treat them. In an optional embodiment, based on collected information from the patient's eye movements, the AR system may create a retina map that may be used to program various aspects of the brain through retina photonic wavefronts.

There may be other applications of using light signals that are projected into the retina. This light therapy may further be used in psychological applications, and subtly controlling brain signals to change the user's thoughts or impulses.

In another embodiment, the AR system may detect patterns of a user's behavior and actively improve a user's health. For example, a user of the AR system may suffer from obsessive compulsive disorder (OCD). The AR system may monitor the user's behavior. When the patient is displaying symptoms of OCD (e.g., nervous ticks, counting, scratching, etc.) the system may automatically render a virtual image of the user's doctor who may help calm the user down.

In another embodiment, the AR system may automatically display virtual content that has a calming effect on the patient. Or, in another embodiment, the AR system may be linked to a drug delivery system that may immediately administer prescribed medication whenever the patient displays a certain kind of behavior. For example, if the user is physical hurting himself during fits of an OCD episode, the AR system that is linked to an intravenal drug delivery system may automatically administer medication that may make the patient drowsy, and therefore prevent the patient from harming himself.

In yet another embodiment, the AR system may help refocus a user at work if the user is distracted or seems unable to focus on work. This may help the user be more efficient and productive at work. Because the AR system is constantly capturing images and videos, the AR system may detect unproductive behavior (e.g., unrelated internet browsing, low productivity, etc.), and may appropriately render virtual content to help motivate the user.

In some embodiments, the AR system may be used to shape a pre-existing generalized model of a human (e.g., man, woman, child, etc.) by morphing a set of control points extracted from a data cloud of another person. Thus, the AR system may use a 3D model generalized model of a person's body, but sculpt another person's face into the 3D model. Possible advantages of such an approach are that an existing rigged model can have many elements (ligament, muscle function, detail etc.) that cannot be captured by a simple scan of a person's face. However, the simple scan may provide enough information about the user's face to make the generalized model resemble a particular person in fine detail. In other words, the AR system can benefit from the highly precise 3D model and supplement it with necessary detail captured from the simple scan to produce an accurate 3D version of the person.

Garden Overview (Plants)

For high-dimensional representation of information, the AR system may map content to familiar natural shapes. Nature encodes vast amounts of information in trees, grass, etc. For example, the AR system may represent each person or role in an organization as a virtual "plant" having parameters that can be modified by the respective user, and optionally modified by others.

The users may, for example, encode the color, shape, leaves, flowers, etc., of the plant with their respective status. If a user is overworked, the respective plant could appear withered. If a user is unhappy, the leaves of the respective plant could fall off. If the user has a lack of resources, the leaves of the respective plant that represents the user may turn brown, etc. The users may provide their respective plants to a leader (e.g., manager, CEO). The leader can place all the plants in a virtual garden. This provides the leader with a high-bandwidth view of organization, through the general color or concept of a garden. Such graphical illustration of problems facilitates visual recognition of problems or lack thereof with the organization.

Email

In one or more embodiments, the AR system may implement an electronic mail or message interface using a similar natural or plant approach. For example, the AR system may render a tree, where each branch corresponds to or represents a person, entity or logical address. The AR system may represent each message (e.g., email message) as a leaf of the tree, the leaves visually associated with a branch that represents the person, entity or address from which the respective message was either received or sent.

The AR system may render relatively old messages as brown and/or dried out, these leaves eventually falling from the tree to the ground. Sub-branches or twigs may represent connectivity with other persons, entities or logical address, for example those copied or blind copied on a message. This allows a user to easily prune branches representing annoying people, or place those branches on a back of the tree or otherwise out of direct view.

In yet another embodiment, in response to a user selection/manipulation or picking up an object, the AR system may provide an indication of what is semantically known about the object. For example, the AR system may cause the world to glow softly with respect to what is semantically known. For instance, if a user picked up a television, the AR system can render virtual content that shows places that a television could be placed.

"Remember This" Application

In yet another embodiment, the AR system may allow a user to explicitly designate important objects in an environment (e.g., favorite cup, car keys, smartphone, etc.) for tracking. In particular, the AR system may employ an interactive modeling/analysis stage, and then track the designated object(s) visually and essentially continuously. This allows the AR system to recall a last known position of the designated object(s) upon request (e.g., "Where was my phone last seen?") of a user.

For example, if the user has designated a cell phone as such an object, a specific cell phone object recognizer may execute to identify a presence of the particular user's cell phone in captured image information. The resulting location information for each time cell phone is detected can be distributed back to a cloud based computer system. When the user has misplaced the cell phone, the user may simply query the AR system to search for the location in which cell phone was most recently detected.

Body Worn Component Picture Application

It should be appreciated that the image sensor(s) (e.g., camera(s)) of the body worn (e.g., head worn) component can capture image information in a variety of forms. For example, the camera(s) can capture 2D still images or pictures, 2D moving pictures or video, or a 4D light field (e.g., world model).

The AR system may execute or provide image information to an application, which formats or transforms the image information and forwards or provides the formatted or transformed information as instructed. For example, the application allows for 2D image printing, 2D image sharing, 2D video sharing, 3D video sharing, for instance with others having AR system, and 3D physical printing, etc.

For native 2D cameras and 2D videos, if the AR system tracks head pose, it can re-render a virtual traversal of a space based on where a user moves, using the passable world model.

For implementations with cameras that capture 4D light field, an application may allow capture of 2D images or 2D videos from the 4D light field. Transforming to 2D images or 2D videos allows sharing or printing using conventional 2D software and printers. The AR system may also share 3D views, for example a 3D view that is locked to a user's head. Such embodiments may use techniques similar to rendering in a game engine. In some implementations, the camera may be capable of capturing a 3D wide field of view moving images or video. Such images or videos, for example, may be presented via an AR system component capable or rendering 3D wide field of view images or some other device that can present to a user a wide field of view.

Calibration

The following section will go through calibration elements in a global coordinate system in relation to tracking cameras of the individual AR system. Referring to the FIG. 136, for illustrative purposes it can be assumed that the AR system utilizes a camera system (such as a single camera or camera arrays) (e.g., FOV cameras, depth cameras, infrared cameras, etc.) to detect and estimate the three-dimensional structure of the world. As discussed above, this information may, in turn, be used to populate the Map (e.g., passable world model) with information about the world that may be advantageously retrieved as needed.

In the AR system, the display system may be generally fixed with regard to the camera physically (e.g., the cameras and the display system may be fixedly coupled or fastened together, such as by virtue of the structures of a head mounted display). Any pixel rendered in the virtual display may be characterized by a pixel value (e.g., notation exchangeable as pixel coordinates) and a three-dimensional position.

Referring to the FIG. 136, given an arbitrary 3D point P 13602 in the world, the goal may be to compute a pixel U 13604 in the display (e.g. with a resolution 1280×720), so that the 3D position of the pixel U lies exactly between P and the user's pupil E 13606.

In this model, the 3D location of pupil and the 3D configuration of the virtual display screen 13610 are explicitly modeled (an image floating in the air as perceived by a user, which is created by the display optics). The 3D location of pupil E is parametrized as a 3D point within the camera reference system.

The virtual display 13610 is parametrized by 3 external corners (anchor points) A0 13612, A1 13614, and A2 13616 (3×1 vectors). The pixel values of these anchor points as a0, a1, a2 are also known (2×1 vectors).

Given a pixel location u, the 3D location of the pixel location u may be computed using the following equation:

$$U=A0+[A1-A0,A2-A0]*[a1-a0,a2-a0]^{\wedge}-T*(u-a0)$$

Let A represent the simplified multiplication matrix applied to [u:1]. Thus, the above equation becomes equivalent to the following equation:

$$U=A*[u^{\wedge}T,1]^{\wedge}T \qquad \text{(Equation 1)}$$

It should be noted that A is not composed from A0, A1, A2 directly. Anchor points can be arbitrarily chosen, but A remains fixed to a specific screen. It should be appreciated that the illustration of A0, A1, A2 in FIG. 136 is only used for illustrative purposes, and that A0, A1, A2 may not computed specifically during the calibration process. Rather, it may be sufficient to compute the value for A.

A is a 3×3 matrix whose degree of freedom is at most 9:3 for A0, 3 for A1, 3 for A2. If A1−A0 is assumed to be perpendicular to A2−A0, the degree of freedom (DOF) of A is deducted by 1. If the aspect ratio of the virtual screen 13610 is known, the DOF of A is again deducted by 1. If the distance between the screen center to the pupil 13506 is known, the DOF is again deducted 1. If the field of view of the screen is known, the DOF deducts are at most 5. Thus, the only unknown may be the distance (1), in-plane rotation (2) and view angle (3)

It should be appreciated that the goal of calibration is to estimate A and E. In the rendering stage, given an arbitrary 3D location P 13602 (in the camera reference system), the pixel value u which corresponds to the point where the line between P and E intersects with the virtual screen may be calculated.

Since U=A*[u^T, 1]^T, the constraints that E−U and E−P are aligned is equivalent to:

$$P-E=c*(U-E) \qquad \text{(Equation 2)}$$

It should be appreciated that c is an unknown multiplier. Equation (2) has 3 equations, and 3 unknowns (u_x, u_y, c).

By solving equation (2), the simplified closed form solution can be written as the following equations:

$$u\_x=(A1\_2*A2\_3*E3-A1\_2*A3\_3*E2-A1\_3*A2\_2*E3+A1\_3*A3\_2*E2+A2\_2*A3\_3*E1-A2\_3*A3\_2*E1-A1\_2*A2\_3*P3+A1\_2*A3\_3*P2+A1\_3*A2\_2*P3-A1\_3*A3\_2*P2-A2\_2*A3\_3*P1+A2\_3*A3\_2*P1+A1\_2*E2*P3-A1\_2*E3*P2-A2\_2*E1*P3+A2\_2*E3*P1+A3\_2*E1*P2-A3\_2*E2*P1)/(A1\_1*A2\_2*E3-A1\_1*A3\_2*E2-A1\_2*A2\_1*E3+A1\_2*A3\_1*E2+A2\_1*A3\_2*E1-A2\_2*A3\_1*E1-A1\_1*A2\_2*P3+A1\_1*A3\_2*P2+A1\_2*A2\_1*P3-A1\_2*A3\_1*P2-A2\_1*A3\_2*P1+A2\_2*A3\_1*P1) \quad \text{(Equation 3)}$$

$$u\_y=(A1\_1*A2\_3*E3-A1\_1*A3\_3*E2-A1\_3*A2\_1*E3+A1\_3*A3\_1*E2+A2\_1*A3\_3*E1-A2\_3*A3\_1*E1-A1\_1*A2\_3*P3+A1\_1*A3\_3*P2+A1\_3*A2\_1*P3-A1\_3*A3\_1*P2-A2\_1*A3\_3*P1+A2\_3*A3\_1*P1+A1\_1*E2*P3-A1\_1*E3*P2-A2\_1*E1*P3+A2\_1*E3*P1+A3\_1*E1*P2-A3\_1*E2*P1)/(A1\_1*A2\_2*E3-A1\_1*A3\_2*E2-A1\_2*A2\_1*E3+A1\_2*A3\_1*E2+A2\_1*A3\_2*E1-A2\_2*A3\_1*E1-A1\_1*A2\_2*P3+A1\_1*A3\_2*P2+A1\_2*A2\_1*P3-A1\_2*A3\_1*P2-A2\_1*A3\_2*P1+A2\_2*A3\_1*P1) \quad \text{(Equation 4)}$$

As discussed above, the calculation of c is omitted here for purposes of simplicity. It should be appreciated that the above solution has no prior assumption on the screen geometry. If those assumptions (e.g., screen sides of the virtual screen are perpendicular, the screen axis is parallel to the ray of sight, etc.) are counted for, the above equations may be simplified further.

In view of the above considerations, in one embodiment a suitable calibration process may comprise the steps outlined below. It should be appreciated that such a calibration generally requires the user to wear the head mounted AR system, and to provide some responses based upon what the user sees through the AR device while viewing the physical world. The example calibration outlined below envisions an aiming system utilizing a reticle. Of course, other approaches may be similarly used, and the following steps should not be read as limiting.

First, a marker may be printed out. In one or more embodiments, ArUco markers may be used. ArUco is a minimal C++ library for detection of augmented reality markers. The library relies on the use of coded markers. Each marker may have a unique code (e.g., unique black and white patterns).

Next, the marker may be placed in front of the user such that that a missing part of the marker is placed at a corner of the user's field of view. Next, a rough location of the user's pupil with regards to the camera is measured (e.g., centimeters).

The location may be measured in the camera coordinate system. The camera aperture may be located at 0,0,0 in a 3D coordinate space. The rough location measurement may at most cost a one centimeter error.

Next, the user may wear the wearable AR system in a manner such that the marker may be seen both by the user and the camera. A configuration program may be run in order to determine if the camera detects the marker. If the camera detects the marker, the user will see the color image on the screen.

Given a reasonable initial calibration value, the user may also see, through a display device of the AR system, a green grid roughly aligned with a chess board. However, even if the user does not see it the first time, the user may be asked to continue.

Next, either the left eye or the right eye may be calibrated first. When the calibration process starts, the user may move his or her head so that the corner of the marker highlighted in the HMD screen aims at the physical corresponding corner of the marker.

The user may make a selection to command the software to move to the next target. The targets may be randomly selected. This process may be repeated N times (e.g., based on a predetermined value). N is recommended to be more than twice the number of DOFs of a calibration model.

After N data points are collected, the program may pause during an optimization process, subsequent to which the software may present both eyes with a grid. The eye, having undergone the calibration may see the green grid well aligned with the physical board. This result may be auto-saved in the file.

The calibration process provides a set of correspondences (X_i, Y_i, Z_i, u_i, v_i) in which, i=1:N, and X,Y,Z are the 3d points detected by the camera and u,v is the screen pixel location aligned by a user.

There may a number of constraints, such as the following equation:

$$\{E, A\} = \text{argmin}_{E,A} \sum_i (u(E, A, X_i, Y_i, Z_i) - u_i)^2 + (v(E, A, X_i, Y_i.Z_i) - v_i)^2$$

Prior knowledge of screen physical structure may also provide constraints:

Perpendicular screen side constraints may be represented by the following equation:

$$\{E\}=\text{argmin}_E[0,1,1]A^T A[1,0,1]$$

Screen to pupil distance (assumed to be d) constraints may be represented by the following equation:

$$\{E,A\}=\text{argmin}_{A,E}(|A[w/2,h/2,1]-E|^2-d^2)$$

Combining the constraints above, E and A may be solved using a quadratic optimization method (e.g., Newton's method for optimization, etc.).

In other words, referring back to the FIG. 136, the goal of calibration is to determine a location of an image plane relative to the tracking camera (which may be mounted on the user's head). Further, a location of the user's eye may also be accounted for. The eye is located at a particular distance away from the image plane and looks at the physical world through the AR system.

In one embodiment the user will receive the virtual aspects of the AR experience from a spatial light modulator (e.g., fiber scanning device, etc.) mounted to the AR system, and this imagery may be presented at a known focal length (the representative image plane for the "virtual screen", and that focal plane can be warped, rotated, etc.). Again, the goal of the calibration is to estimate where the image plane is located relative to the camera. In other words, there may or may not be a camera looking at the eye ("eye tracking camera") for gaze, etc. While the eye tracking cameras may make calibration more accurate, it should be appreciated that the calibration process may work with or without the eye tracking camera.

Generally, the tracking cameras and the AR device will be rigidly coupled, so a set of known assumptions may be made about the relationship between the tracking cameras and the AR device. Thus one can perform the virtual scan calibration once for the user, but every time a new user wears the AR system, a new calibration may be conducted. The user's eye position may be referred to as E as shown in FIG. 136 (which is a 3×1 vector; (x,y,z)). The calibration system also takes input from the camera, as described above.

Coordinate values of various points may be measured by the cameras. Based on these values, a coordinate system with respect to the camera may be constructed. For example, assuming there is a point in the real world that is x,y,z, this point may be defined as being 0,0,0 on the camera itself. One goal of doing such a calibration is to measure a point on the virtual screen—so that when the user looks through the AR system, the point on the image plane, and the point in real world space are on the same line in space.

This allows for the system to render virtual content at the appropriate location on the virtual screen/image plane. In other words, if the virtual screen is "A", and a point U is to be rendered on (a 2×1 pixel value), a point Po in real space P0 $(x,y,z)$ may need to be determined. In other words, one needs to determine a function U=Fu (P, E, A). For example, a pixel location U needs to be determined given that P is known, E is unknown and A is unknown (with reference to FIG. 136).

The goal is to determine E and A in the above relationship. One can start from a reverse perspective on the problem to solve the relationship. The first step may be to calculate the 3-D coordinate position of the U pixel on the image plane A. Thus a reverse process of rendering is presented: given a 2-D pixel value, how can a 3-D location (as opposed to rendering, wherein a 3-D location is known and one needs to determine the 2-D pixel) be calculated. One may recall that the virtual screen or plane A need not be perpendicular to the user, but rather could be at any orientation relative to the user of the AR system. In one or more embodiments, there may be warping.

Plane A may be defined by three corners: a0, a1, a2. For example, say that a virtual screen resolution is 800×600 pixels: one can say that a0 is 0,0; a1 is 800,0; a2 is 800,600. These coordinates may be referred to as the 3-D coordinate values for these three points A0, A1, and A2.

If (U−a0) is subtracted, a vector from point a0 to the point U is obtained. If one multiplies it by the reverse and transposes it, then it becomes ([a1−a0, a2−a0]−1). Then if it is multiplied [A1−A0, A2−A0] (this is a 3×2 matrix), then a 3-D coordinate of the U with respect to A0 may be obtained.

Now if this is added to A0, the 3-D coordinates of the U pixel inside of the camera workspace/coordinate system may be obtained. Thus, a linear algebra relationship for V (think of "V" as "capital u") may be used. For example, if U is (x,y), this may be simplified as: V=A*[Ux, Uy, 1]. Thus everything may be condensed into a 3×3 matrix. Thus far, in this configuration the values for A0, A1, or A2 are not known. Therefore, one goal of calibration may be to determine the value of matrix A. In other words, if the values of matrix A is known, the exact geometry of the image plane may also be known. In other words, the geometry of the image plane is encoded by matrix A.

As discussed above, the goal of this calibration in this scenario is to render a pixel U such that E, the pixel U, and P0 form a line. As described above, when an AR system is placed on a new user, the AR system may be calibrated. The calibration system may present a point—so that the user may attempt to align that point to a physical aspect of the real world. This may be repeated for a plurality of points (e.g., 20 points), after which the user may be calibrated and ready to operate. Such a process may be presented to the user as a simple game that takes only a few seconds (e.g., user fires a laser through eye movement, or hitting virtual targets with the eye).

In one embodiment, another formula may be used that will enforce the three subject points being on the same line. In other words, a point may be presented, and the user may be asked to align that point to a physical object in the real world: P−E (the vector for P to the Eye) is equivalent to a multiple of, or some constant C and vector (V−E). One may recall from the discussion above that U and P are known, so P−E=C*(V−E). Then P−E=C*(A*[Ux, Uy, 1]−E).

Thus for each point that the user playing the calibration game aims, he/she may generate such a constraint, each of which consists of three equations (for x, y, and z). Thus, $$P1-E=C1*(A*[U1x,Y1y,1]-E)$$

$$P2-E=C2*(A*[U2x,Y2y,1]-E) \text{ and}$$

$$P3-E=C3*(A*[U3x,Y3y,1]-E).$$

Of course, if 20 such equations are accumulated, then there will be 60 constraints (e.g., 20×3). The unknown is A, which is a 3×3 matrix; E is a 3×1 matrix. If there are some assumptions about A (e.g., that the screen is not skewed, and the aspect ratio of the screen is known, the actual distance of the virtual plane to the tracking camera, etc.), then there may be some regularization when solving these equations.

Thus, after accounting for such regularizations, there may be 12 unknowns plus the unknown Cs. C is a scalar. If there is no prior knowledge, then the number of unknowns are: 3+9−n (where n is the number of calibrating points; each time there is at least one additional C). The number of constraints is n*3. Also, one needs an initial rough guess of the position of the virtual plane relative to the tracking camera.

So if 3+9−n<3n; 12<4n; or 3<n. In other words, there are only 4 points. Thus a larger number of points may be collected from the user to try to obtain at least a squares solution, or a robust estimator solution.

Regularizations

In order to determine a screen-to-eye distance, another equation may be used. The distance between the center of the pupil E and the center of the screen may need to be determined. The center of the screen is simply the width of screen w divided by 2 (w/2) and height of screen h divided by 2 (h/2). Thus, the screen center in the camera coordinate system may be represented by the following equation:

$$A*[w/2,h/2,1]$$

Then, one may subtract the pupil E and place constraints to make the squared value equal to some prior value d(s−e) (screen to eye). This may produce an equation as follows:

$$\left\| A\begin{bmatrix} w/2 \\ h/2 \\ 1 \end{bmatrix} - E \right\|^2 = d_{s-e}$$

Next, if one knows that the screen is not skewed, then there are two sides of the screen are always perpendicular to each other. This perpendicular screen constraint means the inverse of the first column of A * the second column of A=0. This may be called the "perpendicular screen constraint".

Next, if one knows that the screen is not rotated with respect to the eye (e.g., the screen is always right in front of the user in an upright position), this information may also be critical. The vector from E to the center of the screen may be represented as the following equation:

$$A[w/2,h/2,1]-E.$$

Perhaps this vector may be termed "alpha," representing a distance from the eye to screen center. One knows that the first column of A is along the width of the screen and second column of A is along the height of the screen. Thus one has:

transpose of $(Acol1)$*alpha=0 and transpose of $(Acol2)$*alpha=0.

Thus, in such a configuration, the width is perpendicular to the user's ray of sight, and the height is also perpendicular to the user's ray of sight. Therefore, that screen may be perpendicular to the user's ray of sight (could be one or the other).

Thus there are four constraints; this reduces the total DOF of A down to 5. Thus more regularizations allow a smaller number of calibration data points, and also increase the accuracy thereof significantly.

It should be appreciated that if the calibration is done once, a relationship between the virtual screen and the eye is known. The unknowns have been separated out with regard to the screen versus those unrelated to the screen. This is good because user eye configurations can differ. Given that data pertaining to A is known, the only unknown becomes the location of the eye E. In other words, if one conducts the calibration routine having the user aiming 10 points, then there will be 10 arrays stacked together that can be solved; the only unknown will be E (e.g., the A may be eliminated). Thus one can use the same solver equation with less unknowns, but much higher accuracy using this technique.

If the system has an eye tracking camera (e.g., an image capture device directed toward the eyes of the user), then E may be a given as well. In such a case, when the user wears the head-mounted AR device, calibration may not be needed, because A, the geometry of the screen plane, is pre-calibrated (by the factory, by some other users, or by the same user previously). Since the eye camera directly measures E, a rendering may be done without any calibration. It is worth noting that if these kinds of constraints are not accurate, there may be a fourth kind of regularization: prior knowledge of the eye location. In other words, it is desirable that the distance of the current eye location to the position of a previous eye location be very small. Therefore, in least squares representation, it may be represented by the following equation:

$$(E-E\text{prior})^2=0.$$

Of course, it should be appreciated the value of the Eprior may be derived through the eye-tracking cameras.

Referring now to FIG. 145, an example method 145 of performing calibration on AR systems is discussed. At F14502 a virtual image is displayed to a user. The virtual image may be any image. As discussed above, the virtual image may simply comprise a point at which the user is focused at. In other embodiments, the virtual image may be any image, and the user may be directed to focus at a particular pixel (e.g., denoted by a particular color, etc.).

At 14504, the AR system determines a location of the virtual image. In one or more embodiments, the location of the virtual image may be known because the system knows the depth at which the virtual image is being displayed to the user. At 14506, the AR system may calculate a location of the user's eye pupil. This may be calculated through the various techniques outlined above. At 14508, the AR system, may user the calculated location of the user's eye pupil to determine a location at which a pixel of the virtual image is displayed to the user. User input may also be utilized to determine the location of the pixel.

At 14510, the user may be asked to align the pixel point to a known point in space. At 14512, a determination may be made as to whether enough points N have been collected. It should be appreciated that the various pixel points may be strategically located at various points, and in various directions, to obtain accurate calibration values for a number of parts of the display of the AR system. As described above, in some embodiments, the number of points (e.g., 20 pixel points) should be rather high to get higher accuracy.

If it is determined that more points are needed, then the process goes back to 14502 to collect data for other pixel points. If, at 14512, it is determined that enough points have been collected, various values of the pixel and/or displayed may be adjusted based on the collected data (14514).

Transaction-Assistance Configurations

The subject AR systems are ideally suited for assisting users with various types of transactions, financial and otherwise, because the AR systems are well suited to identify, localize, authenticate, and even determine gaze of the user.

In one or more embodiments, a user may be identified based on eye-tracking. The subject AR system generally has knowledge pertaining to the user's gaze and point of focus. As discussed above, in various embodiments, the head-mounted AR system features one or more cameras that are oriented to capture image information pertinent to the user's eyes. In one configuration, such as that depicted in FIG. 137, each eye of the user may have a camera 13702 focused on the eye, along with 3 or more LEDs (in one embodiment directly below the eyes as shown) with known offset distances to the camera, to induce glints upon the surfaces of the eyes, as described in detail above.

Three LEDs are used with known offset is because by triangulation, one can deduce the 3D distance from the camera to each glint point. With at least 3 points and approximate spherical model of the eye, the curvature of the eye may be deduced. With 3D offset and known orientation to the eye, one can form an exact (images) or abstract (gradients or other features) template of the iris or retina and (in other embodiments the retina and the pattern of veins in and over the eye). This allows for precise identification of the user:

In one or more embodiments, iris identification may be used to identify the user. The pattern of muscle fibers in the iris of an eye forms a stable and unique pattern for each person. This information may be advantageously used as an identification code in many different ways. The goal is to extract a sufficiently rich texture from the eye. Since the cameras of the AR system point at the eye from below or from the side, the code need not be rotation invariant.

FIG. 138 shows an example code 13800 from an iris just for reference. There may be cameras below and many other LEDs that provide 3D depth information. This may be used to form a template code, and be normalized for pupil diameter and its 3D position. Such a code may be captured over time from several different views as the user is registering with the device (e.g., during a set-up time, etc.).

As described above, in one embodiment the HMD comprises a diffraction display driven by a laser scanner steered by a steerable fiber optic cable. This cable may also be utilized to look into the eye and view the retina itself which is also a unique pattern of rods, cones (visual receptors) and blood vessels. These also form a pattern unique to each individual and can therefore be used to uniquely identify each person.

Referring now to FIG. 139, an image of the retina 13900 is illustrated. Similar to the above embodiment, the image of the retina may also be converted to pattern using any number of conventional means. For example, a pattern of dark and light blood vesicles may be unique to each user. This may be converted to a "dark-light" code by standard techniques such as running gradient operators on the image and counting high/low transitions in a standardized grid centered at the center of the retina.

Since the various AR systems described here are designed to be worn persistently, they may also be utilized to monitor any slow changes in the user's eyes (e.g., such as the development of cataracts, etc.). Further, visualization of the iris and retina may also be utilized to alert the user of other health changes, such as congestive heart failure, atherosclerosis, and cholesterol, signs of which often first appear in the eyes.

Thus the subject systems may be utilized to identify and assist the user with enhanced accuracy for at least the following reasons. First, the system can determine the curvature/size of the eye, which assists in identifying the user since eyes are of similar but not exactly the same size between people. Second, the system has knowledge of temporal information; the system can determine the user's normal heart rate, if the user's eyes are producing a water firm, if the eyes verge and focus together, if breathing patterns, blink rates, or blood pulsing status in the vessels are normal, etc. Next, the system also can use correlated information; for example, the system can correlate images of the environment with expected eye movement patterns, and can also check that the user is seeing the same expected scene that is supposed to be located at that location, (e.g., as derived from GPS, Wi-Fi signals and maps of the environment, etc.). For example, if the user is supposedly at home, the system should be seeing expected pose correct scenes inside of the known home. Finally, the system can use hyperspectral and/skin/muscle conductance to also identify the user.

All the above may be advantageously used to develop an extremely secure form of user identification. In other words, the system may be utilized to determine an identity of the user with a relatively high degree of accuracy. Since the system can be utilized to know who the user is with unusual certainty and on a persistent basis (the temporal information), it can also be utilized to allow micro-transactions.

Passwords or sign up codes may be eliminated. The subject system may determine an identity of the user with high certainty. With this information the user may be allowed access to any website after a simple notice (e.g., a floating virtual box) about the terms of that site.

In one embodiment the system may create a few standard terms so that the user instantly knows the conditions on that site. If one or more websites do not adhere to a fair set of conditions, then the AR system may not automatically allow access or micro transactions (as will be described below) on that particular website.

On a given website, the AR system may ensure that the user has not only viewed or used some content but the AR system may also determine a length of time for which the content was used (e.g., a quick browse might be free, but there may be a charge on a larger amount of usage).

In one more embodiments, as described above, micro-transactions may be easily performed through such a system. For example different products or services may be priced at a fraction of a penny (e.g., a news article may cost ⅓ of a cent; a book may be charged at a penny a page; music at 10 cents a listen, etc.). Within the current currency paradigm, it is hardly practical to utilize micro-transactions, because it may be more difficult to keep track of such activity amongst users. However, with the AR system, the AR system may easily determine the user activity and track it.

In one or more embodiments, the AR system may receive a small percentage of the transaction (e.g., 1% transaction fee, etc.). In one embodiment, the system may be utilized to create an account, controllable by the user in which a set of micro transactions are aggregated. This set may be aggregated such that the user may pay the website or entity when the amount exceeds a threshold value. Or, in another embodiment, the amount may simply be cleared on a routine basis, if the threshold value has not been reached.

In another embodiment, parents may have similar access to their children's accounts. For example, policies may be set allowing no more than a certain percentage of spending, or creating a limit on spending. Various embodiments may be facilitated, as will be described using the following embodiments. Goods may be delivered to the user's preferred location, even if the user is not physically present, due to the AR telepresence concept. That is, with AR telepresence, the user may be at an office location, but may let the delivery person in to their home, or else appear to the delivery person by avatar telepresence.

Since the system may be utilized to track the eye, it can also allow "one glance" shopping. That is, the user may simply look at an object (say a robe in a hotel) and create a stipulation such as, "I want that, when my account goes back over $3000 dollars". When a user views a particular object of interest, similar products may also be displayed virtually to the user.

In one or more embodiments, the AR system may read barcodes. This may also facilitate the user in making the transaction. In one or more embodiments, a used market may be rendered for as many products and product categories as possible. The used items may always be contrasted against the new ones.

For many items, since the AR system may be utilized to render a 3D object, the user may simply walk around the 3D object to examiner it from all sides. It is envisioned, that over time, most items may correspond to a 3D model which may be updated by a quick scan of the object. Indeed, many items, such as cellphones or smartphones, may become virtualized such that the user gets the same functionality without having to purchase or carry the conventional hardware.

In one or more embodiments, users of the AR system may manage possessions by always having access to a catalog of objects, each of which can be instantly put on the market at a suggested or user settable rate. In one or more embodiments, the AR system may have an arrangement with local companies to store goods at a cost to the user, and split the cost with one or more websites.

In one or more embodiments, the AR system may provide virtual markets. In other words, the AR system may host market places that may be entirely virtual (via servers) or entirely real. In one or more embodiments, the AR system may develop a unique currency system. The currency system may be indexed to the very reliable identification of each person using the subject technology. In such a case there could be no stealing when every actor is securely known.

Such a currency may grow over time when the number of users increases. That is, every user who joins the system may add to the total money in the system. Similarly, every time an item is purchased, the currency may inflate beyond a point such that users do not have an incentive to keep large amounts of money. This encourages free movement of money in the economy. The currency may be modeled to stimulate maximum interaction/maximum economic growth.

New money may be distributed in inverse ratio to existing wealth of money. New users may receive more, and wealthy people may receive less. The reverse may be true if the money supply shrinks past a threshold limit.

Rather than being subject to human intervention, this currency system may run on an adaptive mathematical model using best known economic practices. That is, during a recession, the inflation factor of the currency may become bigger such that money starts flowing into the system. When there's a boom in the economy, money might even shrink to dampen market swings. In one or more embodiments, the model parameters would be publically broadcast and the currency would float on other currencies.

In one embodiment, a retinal signature secured data access may be utilized. In such an embodiment, the subject system may allow text, image, and content to be selectively transmittable to and displayable only on trusted secure hardware devices, which allow access when the user can be authenticated based on one or more dynamically measured retinal signatures. Since the display device projects directly onto the user's retina, only the intended recipient (identified by retinal signature) may be able to view the protected content. Further, because the viewing device actively monitors the user's retina, the dynamically-read retinal signature may be recorded as proof that the content was in fact presented to the users eyes (e.g. a form of digital receipt, possibly accompanied by a verification action such as executing a requested sequence of eye movements).

Spoof detection may rule out attempts to use previous recordings of retinal images, static or 2D retinal images, generated images etc. based on models of natural variation expected. A unique fiducial/watermark may be generated and projected onto the retinas to generate a unique retinal signature for auditing purposes.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. An augmented reality display system, comprising:

an image capturing device of the augmented reality display system to capture at least one image, wherein the image capturing device comprises one or more image capturing sensors, at least a portion of the at least one image is perceived within a field of view of a user, and the at least one image captures at least one gesture that is created by the user and interacts with virtual content projected by the augmented reality display system to the user; and a processor coupled directly with no intervening elements or indirectly with one or more intervening elements to the image capturing device to recognize the at least one gesture as at least one recognized gesture, the processor configured to recognize the at least one gesture as the at least one recognized gesture is further configured to:

identify a plurality of candidate gestures and a plurality of computational utilization or expense requirements for gesture recognition of the at least one gesture;

determine whether the at least one image includes one or more identifiable depth points at least by performing a line search for the at least one image with one or more lines or line segments;

determine an order of processing in which a plurality of analysis nodes is executed to perform respective gesture identification processes on the at least one gesture with respect to the plurality of candidate gestures based at least in part upon the plurality of computational resource utilization or expense requirements;

during one or more earlier stages in the order of processing, generate one or more reduced sets of candidate gestures from the plurality of candidate gestures at least by executing one or more first gesture identification processes of the respective gesture identification processes that analyze the at least one image with a first analysis node to remove one or more candidate gestures from the plurality of candidate gestures based at least in part upon a first computational resource utilization or expense requirement of the plurality of computational resource utilization or expense requirements; and during one or more later stages in the order of processing, determine and recognize the at least one gesture from the one or more reduced sets of candidate gestures as the at least one recognized gesture at least by analyzing the at least one image based at least in part on the one or more reduced sets of candidate gestures with a second analysis node corresponding to a second computational expense criterion and at least by executing one or more second gesture identification processes on the at least one gesture and the one or more reduced sets of candidate gestures, wherein the one or more second gesture identification processes consume a larger amount of processing power than the one or more first gesture identification processes; and the processor further configured to determine a user input based at least in part on the at least one recognized gesture.

2. The augmented reality display system of claim 1, wherein the processor is configured to generate a scoring value for a set of points identified for the at least one gesture based at least in part on comparison between the set of points and predetermined gestures and to recognize the at least one gesture when the scoring value exceeds a threshold value.

3. The augmented reality display system of claim 1, further comprising a database to store predetermined gestures, wherein the computational resource utilization or expense requirement includes reducing or minimizing computational resource utilization for the gesture recognition for the at least one gesture, the first computational resource or expense requirement corresponds to a relatively lower computation resource utilization, and the second computational resource or expense requirement corresponds to a relatively higher computational resource utilization when compared to the first computational resource or expense requirement.

4. The augmented reality display system of claim 3, further comprising a networked memory to access the database of predetermined gestures.

5. The augmented reality display system of claim 1, wherein the processor is further configured to recognize the at least one gesture that comprises a hand gesture or motion or a finger gesture or a finger motion.

6. The augmented reality display system of claim 1, wherein the augmented reality display system comprises a user wearable apparatus to display a virtual world as well as at least a portion of a physical environment in which the user is located.

7. The augmented reality display system of claim 1, where the processor is further configured to recognize the at least one gesture that comprises an inter-finger interaction.

8. The augmented reality display system of claim 1, wherein the processor is further configured to recognize the at least one gesture comprising at least one of inter-finger interactions, pointing, tapping, or rubbing.

9. The augmented reality display system of claim 1, further comprising a spatial light modulator that is coupled directly without intervening elements or indirectly with one or more elements to the processor, and the processor controls the spatial light modulator in a manner such that one or more virtual objects are displayed to the user based at least in part on the user input.

10. The augmented reality display system of claim 9, further comprising a virtual user interface to receive the user input or a user interaction with the virtual user interface or with the one or more virtual objects.

11. A method for determining user input, comprising:

capturing an image corresponding to a field of view of a user through an augmented reality system, wherein the image comprises a gesture image of at least one gesture that is created by the user and interacts with virtual content projected by the augmented reality system to the user, and at least a portion of the image is perceived by the user within the field of view provided by the augmented reality system;

identifying a plurality of candidate gestures and a plurality of computational utilization or expense requirements for gesture recognition of the at least one gesture;

determining whether the image includes one or more identifiable depth points at least by performing a line search for the image with one or more lines or line segments;

determining an order of processing in which a plurality of analysis nodes is executed to perform respective gesture identification processes on the at least one gesture with respect to the plurality of candidate gestures based at least in part upon a plurality of computational resource utilization or expense requirements;

during one or more earlier stages in the order of processing, generating one or more reduced sets of candidate gestures from the plurality of candidate gestures at least by executing one or more first gesture identification processes of the respective gesture identification processes that analyze the at least one image with a first analysis node to remove one or more candidate gestures from the plurality of candidate gestures based at least in part upon a first computational resource utilization or expense requirement of the plurality of computational resource utilization or expense requirements;

during one or more later stages in the order of processing, determining and recognizing the at least one gesture from the one or more reduced sets of candidate gestures as the at least one recognized gesture at least by analyzing the at least one image based at least in part on the one or more reduced sets of candidate gestures with a second analysis node corresponding to a second computational resource or expense requirement and at least by executing one or more second gesture identification processes on the at least one gesture and the one or more reduced sets of candidate gestures, wherein the one or more second gesture identification processes consume a larger amount of processing power than the one or more first gesture identification processes; and determining a user input based in part or in whole upon the at least one recognized gesture.

12. The method of claim 11, further comprising generating a scoring value for a set of points for the at least one gesture based in part or in whole on results of comparing the set of points to a first set of points associated with a database including predetermined gestures.

13. The method of claim 12, further comprising recognizing the at least one gesture when the scoring value exceeds a threshold value.

14. The method of claim 11, further comprising overlaying a virtual world with at least a portion of a physical environment in which the user is located.

15. The method of claim 14, further comprising accessing a networked memory to access a database including predetermined gestures.

16. The method of claim 11, determining the user input further comprising recognizing the at least one gesture that comprises a hand gesture, a hand motion, a finger gesture, or a finger motion.

17. The method of claim 11, further comprising capturing and recognizing a sensory input from the user or from a physical environment in which the user is located.

18. The method of claim 11, determining the user input further comprising recognizing the at least one gesture that comprises an inter-finger interaction.

19. The method of claim 11, determining the user input further comprising recognizing the at least one gesture that comprises at least one of inter-finger interactions, pointing, tapping, or rubbing.

20. The method of claim 11, further comprising displaying one or more virtual objects to the user based at least in part on the user input.

21. The method of claim 20, further comprising recognizing a user interaction with the one or more virtual objects or with a virtual world in which the one or more virtual objects are displayed in a virtual user interface based in part or in whole upon the at least one gesture.

22. The method of claim 11, further comprising:

generating, at a processor of the augmented reality system, a scoring value for a set of points identified for the at least one gesture based at least in part on comparison between the set of points and predetermined gestures; and recognizing the at least one gesture as the at least one recognized gesture when the scoring value exceeds a threshold value.

* * * * *